US011999891B2

(12) United States Patent
Haensel et al.

(10) Patent No.: US 11,999,891 B2
(45) **Date of Patent: *Jun. 4, 2024**

(54) LIQUID-CRYSTAL MEDIUM COMPRISING POLYMERISABLE COMPOUNDS AND THE USE THEREOF IN LIQUID-CRYSTAL DISPLAYS

(71) Applicant: MERCK PATENT GMBH, Darmstadt (DE)

(72) Inventors: Helmut Haensel, Muehltal (DE); Qiong Tong, Darmstadt (DE); Edward Plummer, Frankfurt am Main (DE); Rocco Fortte, Frankfurt am Main (DE); Thomas Eichhorn, Darmstadt (DE)

(73) Assignee: MERCK PATENT GMBH, Darmstadt (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/299,982

(22) PCT Filed: Dec. 4, 2019

(86) PCT No.: PCT/EP2019/083586
§ 371 (c)(1),
(2) Date: Jun. 4, 2021

(87) PCT Pub. No.: WO2020/115089
PCT Pub. Date: Jun. 11, 2020

(65) Prior Publication Data

US 2023/0007940 A1 Jan. 12, 2023

(30) Foreign Application Priority Data

Dec. 7, 2018 (EP) .................................... 18210994

(51) Int. Cl.

| | |
|---|---|
| ***G02F 1/1333*** | (2006.01) |
| ***C09K 19/12*** | (2006.01) |
| ***C09K 19/32*** | (2006.01) |
| ***C09K 19/56*** | (2006.01) |
| *C09K 19/04* | (2006.01) |

(52) U.S. Cl.
CPC ............ *C09K 19/12* (2013.01); *C09K 19/322* (2013.01); *C09K 19/56* (2013.01); *C09K 2019/0448* (2013.01); *C09K 2019/122* (2013.01); *C09K 2019/123* (2013.01); *C09K 2323/06* (2020.08)

(58) Field of Classification Search
CPC ...... C09K 19/12; C09K 19/32; C09K 19/322; C09K 19/56; C09K 2019/0448; C09K 2019/122; C09K 2019/123; G02F 1/1333
See application file for complete search history.

(56) References Cited

U.S. PATENT DOCUMENTS

| | | | | |
|---|---|---|---|---|
| 9,428,694 | B2 * | 8/2016 | Engel | C09K 19/3003 |
| 9,594,283 | B2 * | 3/2017 | Tong | G02F 1/1334 |
| 9,809,748 | B2 * | 11/2017 | Archetti | G02F 1/1337 |
| 9,963,637 | B2 * | 5/2018 | Lee | C09K 19/542 |
| 10,120,331 | B2 * | 11/2018 | Nakata | G03C 1/49872 |
| 10,851,301 | B2 * | 12/2020 | Yoon | C09K 19/12 |
| 11,312,909 | B2 * | 4/2022 | Tong | C09K 19/12 |
| 2010/0304015 | A1 | 12/2010 | Kim et al. | |
| 2015/0315469 | A1 | 5/2015 | Sudo et al. | |
| 2015/0252265 | A1 | 10/2015 | Archetti et al. | |
| 2017/0002267 | A1 | 1/2017 | Lee et al. | |
| 2017/0335195 | A1 | 11/2017 | Hung et al. | |
| 2018/0057743 | A1 | 1/2018 | Archetti et al. | |
| 2018/0171231 | A1 | 6/2018 | Archetti et al. | |
| 2023/0002678 | A1 * | 1/2023 | Tong | C09K 19/32 |

FOREIGN PATENT DOCUMENTS

| | | | |
|---|---|---|---|
| CN | 106318406 | A | 1/2017 |
| CN | 107400521 | A | 11/2017 |
| CN | 109593040 | A | 4/2019 |
| EP | 2918658 | A2 | 9/2015 |
| EP | 2933308 | A1 | 10/2015 |
| WO | 2017041893 | A1 | 3/2017 |

OTHER PUBLICATIONS

International Search Report for PCT/EP2019/083586 dated Feb. 19, 2020.
English Abstract for CN109593040, Publication Date: Apr. 9, 2019.
Office Action in corresponding CN application 201980080334.5 dated Mar. 2, 2024 (pp. 1-10).

* cited by examiner

*Primary Examiner* — Geraldina Visconti
(74) *Attorney, Agent, or Firm* — Millen, White, Zelano & Branigan, P.C.; Csaba Henter

(57) ABSTRACT

The present invention relates to a liquid-crystal (LC) medium comprising one or more polymerisable compounds and to the use of the LC medium for optical, electro-optical and electronic purposes, in particular in LC displays, especially in LC displays of the polymer sustained alignment (PS, PSA) or self-aligning (SA) type.

27 Claims, No Drawings

LIQUID-CRYSTAL MEDIUM COMPRISING POLYMERISABLE COMPOUNDS AND THE USE THEREOF IN LIQUID-CRYSTAL DISPLAYS

The present invention relates to a liquid-crystal (LC) medium comprising one or more polymerisable compounds and to the use of the LC medium for optical, electro-optical and electronic purposes, in particular in LC displays, especially in LC displays of the polymer sustained alignment (PS, PSA) or self-aligning (SA) type.

BACKGROUND OF THE INVENTION

One of the liquid-crystal display (LCD) modes used at present is the TN ("twisted nematic") mode. However, TN LCDs have the disadvantage of a strong viewing-angle dependence of the contrast.

In addition, so-called VA ("vertically aligned") displays are known which have a broader viewing angle. The LC cell of a VA display contains a layer of an LC medium between two transparent electrodes, where the LC medium usually has a negative dielectric anisotropy. In the switched-off state, the molecules of the LC layer are aligned perpendicular to the electrode surfaces (homeotropically) or have a tilted homeotropic alignment. On application of an electrical voltage to the two electrodes, a realignment of the LC molecules parallel to the electrode surfaces takes place.

Furthermore, OCB ("optically compensated bend") displays are known which are based on a birefringence effect and have an LC layer with a so-called "bend" alignment and usually positive dielectric anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

Also known are so-called IPS ("in-plane switching") displays, which contain an LC layer between two substrates, where the two electrodes are arranged on only one of the two substrates and preferably have intermeshed, comb-shaped structures. On application of a voltage to the electrodes, an electric field which has a significant component parallel to the LC layer is thereby generated between them. This causes realignment of the LC molecules in the layer plane.

Furthermore, so-called FFS ("fringe-field switching") displays have been reported (see, inter alia, S. H. Jung et al., Jpn. J. Appl. Phys., Volume 43, No. 3, 2004, 1028), which contain two electrodes on the same substrate, one of which structured in a comb-shaped manner and the other is unstructured. A strong, so-called "fringe field" is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

FFS displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

Furthermore, FFS displays have been disclosed (see S. H. Lee et al., Appl. Phys. Lett. 73(20), 1998, 2882-2883 and S. H. Lee et al., Liquid Crystals 39(9), 2012, 1141-1148), which have similar electrode design and layer thickness as FFS displays, but comprise a layer of an LC medium with negative dielectric anisotropy instead of an LC medium with positive dielectric anisotropy. The LC medium with negative dielectric anisotropy shows a more favourable director orientation that has less tilt and more twist orientation compared to the LC medium with positive dielectric anisotropy, as a result of which these displays have a higher transmission. The displays further comprise an alignment layer, preferably of polyimide provided on at least one of the substrates that is in contact with the LC medium and induces planar alignment of the LC molecules of the LC medium. These displays are also known as "Ultra Brightness FFS (UB-FFS)" mode displays. These displays require an LC medium with high reliability.

The term "reliability" as used hereinafter means the quality of the performance of the display during time and with different stress loads, such as light load, temperature, humidity, voltage, and comprises display effects such as image sticking (area and line image sticking), mura, yogore etc. which are known to the skilled person in the field of LC displays. As a standard parameter for categorising the reliability usually the voltage holding ration (VHR) value is used, which is a measure for maintaining a constant electrical voltage in a test display. Among other factors, a high VHR is a prerequisite for a high reliability of the LC medium.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes.

In so-called MVA ("multidomain vertical alignment") displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In so-called PVA ("patterned VA") displays, protrusions are rendered completely superfluous in that both electrodes are structured by means of slits on the opposite sides, which results in increased contrast and improved transparency to light, but is technologically difficult and makes the display more sensitive to mechanical influences ("tapping", etc.). For many applications, such as, for example, monitors and especially TV screens, however, a shortening of the response times and an improvement in the contrast and luminance (transmission) of the display are demanded.

A further development are displays of the so-called PS ("polymer sustained") or PSA ("polymer sustained alignment") type, for which the term "polymer stabilised" is also occasionally used. In these, a small amount (for example 0.3% by weight, typically <1% by weight) of one or more polymerisable, compound(s), preferably polymerisable monomeric compound(s), is added to the LC medium and, after filling the LC medium into the display, is polymerised or crosslinked in situ, usually by UV photopolymerisation, optionally while a voltage is applied to the electrodes of the display. The polymerisation is carried out at a temperature where the LC medium exhibits a liquid crystal phase, usually at room temperature. The addition of polymerisable mesogenic or liquid-crystalline compounds, also known as reactive mesogens or "RMs", to the LC mixture has proven particularly suitable.

Unless indicated otherwise, the term "PSA" is used hereinafter when referring to displays of the polymer sustained alignment type in general, and the term "PS" is used when referring to specific display modes, like PS-VA, PS-TN and the like.

Also, unless indicated otherwise, the term "RM" is used hereinafter when referring to a polymerisable mesogenic or liquid-crystalline compound.

In the meantime, the PS(A) principle is being used in various conventional LC display modes. Thus, for example, PS-VA, PS-OCB, PS-IPS, PS-FFS, PS-UB-FFS and PS-TN displays are known. The polymerisation of the RMs preferably takes place with an applied voltage in the case of PS-VA and PS-OCB displays, and with or without, preferably without, an applied voltage in the case of PS-IPS displays. As can be demonstrated in test cells, the PS(A) method results in a pretilt in the cell. In the case of PS-OCB displays, for example, it is possible for the bend structure to be stabilised so that an offset voltage is unnecessary or can be reduced. In the case of PS-VA displays, the pretilt has a positive effect on response times. For PS-VA displays, a standard MVA or PVA pixel and electrode layout can be used. In addition, however, it is also possible, for example, to manage with only one structured electrode side and no protrusions, which significantly simplifies production and at the same time results in very good contrast and in very good transparency to light.

Furthermore, the so-called posi-VA displays ("positive VA") have proven to be a particularly suitable mode. Like in classical VA displays, the initial orientation of the LC molecules in posi-VA displays is homeotropic, i.e. substantially perpendicular to the substrates, in the initial state when no voltage is applied. However, in contrast to classical VA displays, in posi-VA displays LC media with positive dielectric anisotropy are used. Like in the usually used IPS displays, the two electrodes in posi-VA displays are arranged on only one of the two substrates, and preferably exhibit intermeshed and comb-shaped (interdigital) structures. By application of a voltage to the interdigital electrodes, which create an electrical field that is substantially parallel to the layer of the LC medium, the LC molecules are transferred into an orientation that is substantially parallel to the substrates. In posi-VA displays polymer stabilisation, by addition of RMs to the LC medium which are polymerised in the display, has also proven to be advantageous, as a significant reduction of the switching times could thereby be realised.

PS-VA displays are described, for example, in EP 1 170 626 A2, U.S. Pat. Nos. 6,861,107, 7,169,449, US 2004/0191428 A1, US 2006/0066793 A1 and US 2006/0103804 A1. PS-OCB displays are described, for example, in T.-J- Chen et al., Jpn. J. Appl. Phys. 45, 2006, 2702-2704 and S. H. Kim, L.-C-Chien, Jpn. J. Appl. Phys. 43, 2004, 7643-7647. PS-IPS displays are described, for example, in U.S. Pat. No. 6,177,972 and Appl. Phys. Lett. 1999, 75(21), 3264. PS-TN displays are described, for example, in Optics Express 2004, 12(7), 1221.

Below the layer formed by the phase-separated and polymerised RMs which induce the above mentioned pretilt angle, the PSA display typically contains an alignment layer, for example of polyimide, that provides the initial alignment of the LC molecules before the polymer stabilisation step.

Rubbed polyimide layers have been used for a long time as alignment layers. However, the rubbing process causes a number of problems, like mura, contamination, problems with static discharge, debris, etc. Generally the effort and costs for production of such a polyimide layer are relatively great. Therefore instead of rubbed polyimide layers it was proposed to use polyimide layers prepared by photoalignment, utilizing a light-induced orientational ordering of the alignment surface. This can be achieved through photodecomposition, photodimerisation or photoisomerisation by means of polarised light.

In addition, it was observed that unfavourable interaction of the polyimide alignment layer with certain compounds of the LC medium often leads to a reduction of the electrical resistance of the display. The number of suitable and available LC compounds is thus significantly reduced, at the expense of display parameters like viewing-angle dependence, contrast, and response times which are aimed to be improved by the use of such LC compounds. It was therefore desired to omit the polyimide alignment layers.

For some display modes this was achieved by adding a self alignment agent or additive to the LC medium that induces the desired alignment, for example homeotropic or planar alignment, in situ by a self assembling mechanism. Thereby the alignment layer can be omitted on one or both of the substrates. These display modes are also known as "self-aligned", "self-aligning" or "self-alignment" (SA) modes.

In SA displays a small amount, typically 0.1 to 2.5%, of a self-aligning additive is added to the LC medium. Suitable self-aligning additives are for example compounds having an organic core group and attached thereto one or more polar anchor groups, which are capable of interacting with the substrate surface, causing the additives on the substrate surface to align and induce the desired alignment also in the LC molecules. Preferred self-aligning additives comprise for example a mesogenic group and a straight-chain or branched alkyl side chain that is terminated with one or more polar anchor groups, for example selected from hydroxy, carboxy, amino or thiol groups. The self-aligning additives may also contain one or more polymerisable groups that can be polymerised under similar conditions as the RMs used in the PSA process.

Hitherto SA-VA displays haven been disclosed. Suitable self-aligning additives to induce homeotropic alignment, especially for use in VA mode displays, are disclosed for example in US 2013/0182202 A1, US 2014/0138581 A1, US 2015/0166890 A1 and US 2015/0252265 A1.

The SA mode can also be used in combination with the PSA mode. An LC medium for use in a display of such a combined mode thus contains both one or more RMs and one or more self-aligning additives.

Displays which combine both the SA and the PSA mode are hereinafter also shortly referred to as "PS-SA" displays. Also, unless stated otherwise the terms "PSA mode" or "PSA display" as used hereinafter are understood to be inclusive of SA and PS-SA modes and displays.

LC displays, including those of the PSA and SA mode, can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

If the display is not one of the SA mode, it may also comprise an alignment layer on one or both of the substrates forming the display cell. The alignment layer is usually applied on the electrodes (where such electrodes are present) such that it is in contact with the LC medium and induces initial alignment of the LC molecules. The alignment layer may comprise or consist of, for example, a polyimide, which may also be rubbed, or may be prepared by a photoalignment method.

In particular for monitor and especially TV applications, optimisation of the response times, but also of the contrast and luminance (thus also transmission) of the LC display continues to be demanded. The PSA method can provide significant advantages here. In particular in the case of PS-VA, PS-IPS or PS-FFS displays, a shortening of the response times, which correlate with a measurable pretilt in test cells, can be achieved without significant adverse effects on other parameters.

Prior art has suggested biphenyl diacrylates or dimethacrylates, which are optionally fluorinated as RMs for use in PSA displays.

However, the problem arises that not all combinations consisting of an LC mixture and one or more RMs are suitable for use in PSA displays because, for example, an inadequate tilt or none at all becomes established or since, for example, the VHR is inadequate for TFT display applications. In addition, it has been found that, on use in PSA displays, the LC mixtures and RMs known from the prior art do still have some disadvantages. Thus, not every known RM which is soluble in LC mixtures is suitable for use in PSA displays. In addition, it is often difficult to find a suitable selection criterion for the RM besides direct measurement of the pretilt in the PSA display. The choice of suitable RMs becomes even smaller if polymerisation by means of UV light without the addition of photoinitiators is desired, which may be advantageous for certain applications.

In addition, the selected combination of LC host mixture/RM should have the lowest possible rotational viscosity and the best possible electrical properties. In particular, it should have the highest possible VHR. In PSA displays, a high VHR after irradiation with UV light is particularly necessary since UV exposure is a requisite part of the display production process, but also occurs as normal exposure during operation of the finished display.

In particular, it would be desirable to have available novel materials for PSA displays which produce a particularly small tilt angle. Preferred materials here are those which produce a lower tilt angle during polymerisation for the same exposure time than the materials known to date, and/or through the use of which the (higher) tilt angle that can be achieved with known materials can already be achieved after a shorter exposure time. The production time ("tact time") of the display could thus be shortened and the costs of the production process reduced.

A further problem in the production of PSA displays is the presence or removal of residual amounts of unpolymerised RMs, in particular after the polymerisation step for production of the tilt angle in the display. For example, unreacted RMs of this type may adversely affect the properties of the display by, for example, polymerising in an uncontrolled manner during operation after finishing of the display.

Thus, the PSA displays known from the prior art often exhibit the undesired effect of so-called "image sticking" or "image burn", i.e. the image produced in the LC display by temporary addressing of individual pixels still remains visible even after the electric field in these pixels has been switched off or after other pixels have been addressed.

This "image sticking" can occur on the one hand if LC host mixtures having a low VHR are used. The UV component of daylight or the backlighting can cause undesired decomposition reactions of the LC molecules therein and thus initiate the production of ionic or free-radical impurities. These may accumulate, in particular, at the electrodes or the alignment layers, where they may reduce the effective applied voltage. This effect can also be observed in conventional LC displays without a polymer component.

In addition, an additional "image sticking" effect caused by the presence of unpolymerised RMs is often observed in PSA displays. Uncontrolled polymerisation of the residual RMs is initiated here by UV light from the environment or by the backlighting. In the switched display areas, this changes the tilt angle after a number of addressing cycles. As a result, a change in transmission in the switched areas may occur, while it remains unchanged in the unswitched areas.

It is therefore desirable for the polymerisation of the RMs to proceed as completely as possible during production of the PSA display and for the presence of unpolymerised RMs in the display to be excluded as far as possible or reduced to a minimum. Thus, RMs and LC mixtures are required which enable or support highly effective and complete polymerisation of the RMs. In addition, controlled reaction of the residual RM amounts would be desirable. This would be simpler if the RM polymerised more rapidly and effectively than the compounds known to date.

A further problem that has been observed in the operation of PSA displays is the stability of the tilt angle. Thus, it was observed that the tilt angle, which was generated during display manufacture by polymerising the RM as described above, does not remain constant but can deteriorate after the display was subjected to voltage stress during its operation. This can negatively affect the display performance, e.g. by increasing the black state transmission and hence lowering the contrast.

Another problem to be solved is that the RMs of prior art do often have high melting points, and do only show limited solubility in many currently common LC mixtures, and therefore frequently tend to spontaneously crystallise out of the mixture. In addition, the risk of spontaneous polymerisation prevents the LC host mixture being warmed in order to dissolve the polymerisable component, meaning that the best possible solubility even at room temperature is necessary. In addition, there is a risk of separation, for example on introduction of the LC medium into the LC display (chromatography effect), which may greatly impair the homogeneity of the display. This is further increased by the fact that the LC media are usually introduced at low temperatures in order to reduce the risk of spontaneous polymerisation (see above), which in turn has an adverse effect on the solubility.

Another problem observed in prior art is that PSA-SA displays which do not contain a polyimide (PI) alignment layer (hereinafter also referred to as "PI-free" displays) may show an undesired the reflectivity depending on the layer stack. This is because the PI layer is replaced by a polymerised RM layer, which is formed in a subsequent polymerisation step after assembly of the display cell, and which does usually have a lower thickness and lower refractive index than the PI layer. This can cause an undesired reflectivity at the interface with the substrate, because the refractive index match between the previously used PI layer and the substrate may no longer be met by the polymerised RM layer. As a consequence a deterioration of the contrast may be observed. This is a serious drawback especially for displays in high-end applications where a high contrast also in daylight view is desired.

Another problem observed in prior art is that the use of conventional LC media in LC displays, including but not limited to displays of the SA and PSA type, often leads to the occurrence of mura in the display, especially when the LC medium is filled in the display cell manufactured using the one drop filling (ODF) method. This phenomenon is also known as "ODF mura". It is therefore desirable to provide LC media which lead to reduced ODF mura.

Another problem observed in prior art is that LC media for use in LC displays, including but not limited to displays of the PSA type, do often exhibit high viscosities and, as a consequence, high switching times. In order to reduce the viscosity and switching time of the LC medium, it has been suggested in prior art to add LC compounds with an alkenyl group. However, it was observed that LC media containing alkenyl compounds often show a decrease of the reliability and stability, and a decrease of the VHR especially after exposure to UV radiation. Especially for use in PSA displays this is a considerable disadvantage, because the photopolymerisation of the RMs in the PSA display is usually carried out by exposure to UV radiation, which may cause a VHR drop in the LC medium.

There is thus still a great demand for LC displays, especially those of the SA and PSA mode, and LC media and polymerisable compounds for use in such displays, which do not show the drawbacks as described above, or only do so to a small extent, and have improved properties.

In particular, there is a great demand for SA and/or PSA displays, and LC media and polymerisable compounds for use in such displays, which enable a high specific resistance at the same time as a large working-temperature range, short response times, even at low temperatures, and a low threshold voltage, a low tilt angle, a multiplicity of grey shades, high contrast and a broad viewing angle, good reflectivity and high contrast also in daylight. In addition the compounds and LC media should show high reliability and high values for the VHR after UV exposure, and, in case of the polymerisable compounds, have low melting points and a high solubility in the LC host mixtures. In displays for mobile applications, it is especially desired to have available LC media that show low threshold voltage and high birefringence.

In prior art several types of RMs have been reported for use in SA and PSA displays, for example RMs having a biphenyl or terphenyl mesogenic core and attached thereto two or three polymerisable acrylate or methacrylate groups. Biphenyl RMs were shown to exhibit limited polymerisation speed but good reliability parameters, like high VHR or tilt stability, while terphenyl RMs were shown to exhibit fast polymerisation speed but limited reliability parameters. It is therefore desirable to have available RMs that exhibit both fast polymerisation speed and good reliability parameters.

The invention is based on the object of providing novel suitable materials, in particular RMs and LC media comprising the same, for use in LC displays, especially in SA and PSA displays, which do not have the disadvantages indicated above or do so to a reduced extent.

In particular, the invention is based on the object of providing RMs, and LC media comprising them, for use in SA and PSA displays, which enable very high specific resistance values, high VHR values, high reliability, low threshold voltages, short response times, high birefringence, high contrast, show good UV absorption especially at longer wavelengths, enable quick and complete polymerisation of the RMs, allow the generation of a low tilt angle, preferably as quickly as possible, enable a high stability of the tilt angle even after longer time and/or after UV exposure, reduce or prevent the occurrence of "image sticking" and "ODF mura" in the display, and in case of the RMs polymerise as rapidly and completely as possible and show a high solubility in the LC media which are typically used as host mixtures in PSA displays.

A further object of the invention is to provide RMs for use in PSA displays which exhibit both fast polymerisation speed and good reliability parameters, like high VHR or tilt stability.

A further object of the invention is the provision of novel RMs, in particular for optical, electro-optical and electronic applications, and of suitable processes and intermediates for the preparation thereof.

These objects have been achieved in accordance with the present invention by materials and processes as described in the present application. In particular, it has been found, surprisingly, that the use of LC media as described hereinafter allows achieving the advantageous effects as mentioned above. These LC media compounds contain an RM with an aromatic mesogenic core that is substituted by at least one alkenyl group and further comprises one or more polymerisable reactive groups.

It was surprisingly found that the use of these LC media in PSA displays facilitates a quick and complete UV-photopolymerisation reaction in particular at longer UV wavelengths in the range from 300-380 nm and especially above 320 nm, even without the addition of photoinitiator, leads to a fast generation of a low and stable tilt angle, reduces image sticking and ODF mura in the display, leads to a high reliability and a high VHR value after UV photopolymerisation, especially in case of LC host mixtures containing LC compounds with an alkenyl group, and enables to achieve fast response times, a low threshold voltage and a high birefringence.

It was also surprisingly found that the use of the LC media as disclosed and claimed hereinafter in SA-PSA displays leads to higher refractive index of the polymerised layer and thus helps to avoid problems related to undesired reflectivity changes and low contrast on the display.

In addition, the RMs used in the LC media of the present invention have low melting points, good solubility in a wide range of LC media, especially in commercially available LC host mixtures for PSA use, and a low tendency to crystallisation. Besides, they show good absorption at longer UV wavelengths, in particular in the range from 300-380 nm, and enable a quick and complete polymerisation with small amounts of residual, unreacted RMs in the cell.

U.S. Pat. No. 8,355,110 B2 discloses a liquid crystal display comprising a liquid crystal compound and at least two reactive mesogens, one of which comprises a phenyl group that is substituted with a vinyl group, and further discloses the compound 2-vinyl-biphenyl-4,4'-dimethacrylate, but does neither disclose nor suggest the LC media as disclosed and claimed hereinafter.

SUMMARY OF THE INVENTION

The invention relates to an LC medium comprising a polymerisable component A) comprising, preferably consisting of, one or more polymerisable compounds, at least one of which is a compound of formula I, a liquid-crystalline component B), hereinafter also referred to as "LC host mixture", comprising, preferably consisting of, one or more mesogenic or liquid-crystalline compounds, and optionally one or more additives selected from the group consisting of self-alignment additives of formula II and stabilizers, $$\text{P-Sp—A}^1\text{-(Z}^1\text{—A}^2)_z\text{-R}^b \qquad \text{I}$$

$$\text{MES-R}^a \qquad \text{II}$$

wherein the individual radicals, independently of each other and on each occurrence identically or differently, have the following meanings $R^b$ P-Sp- or R, R F, Cl, —CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F or Cl, P a polymerisable group, Sp a spacer group which is optionally substituted by P, or a single bond, $A^1$, $A^2$ a monocyclic or polycyclic aromatic or heteroaromatic group with 4 to 20 ring atoms, which is optionally substituted by one or more groups L, A or P-Sp-, wherein the compounds of formula I contain at least one group $A^1$ or $A^2$ that is substituted by at least one group A, $Z^1$ —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$-, —$CF_2CH_2$—, —$CH_2CF_2$—, —$(CF_2)_{n1}$—, —CH═CH—, —CF═CF—, —CH═CF—, —CF═CH—, —C≡C—, —CH═CH—CO—O—, —O—CO—CH═CH—, —$CH_2$—$CH_2$—CO—O—, —O—CO—$CH_2$—$CH_2$—, —$CR^0R^{00}$—, or a single bond, $R^0$, $R^{00}$ H or alkyl having 1 to 12 C atoms, A alkenyl with 2 to 7, preferably 3 to 7, C-atoms, preferably —CH═$CH_2$, —$CH_2$—CH═$CH_2$, —CH═CH—$CH_3$, —CH═CH—CH═$CH_2$ or —C($CH_3$)═$CH_2$, L F, Cl, —CN, P-Sp- or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by P-Sp-, F or Cl, z 0, 1, 2 or 3, n1 1, 2, 3 or 4, MES a calamitic mesogenic group comprising two or more rings, which are connected directly or indirectly to each other or which are condensed to each other, which are optionally substituted and which mesogenic group is optionally substituted additionally by one or more polymerizable groups, which are connected to MES directly or via a spacer, and $R^a$ a polar anchor group, residing in a terminal position of the calamitic mesogenic group MES which comprises at least one carbon atom and at least one group selected from —OH, —SH, —COOH, —CHO or primary or secondary amine function, preferably one or two OH groups, and which optionally contains one or two polymerizable groups P.

The liquid-crystalline component B) of an LC medium according to the present invention is hereinafter also referred to as "LC host mixture", and preferably comprises one or more, preferably at least two mesogenic or LC compounds selected from low-molecular-weight compounds which are unpolymerisable.

The invention furthermore relates to an LC medium as described above and below, wherein the LC host mixture or component B) comprises at least one mesogenic or LC compound comprising an alkenyl group.

The invention furthermore relates to an LC medium or LC display as described above, wherein the compounds of formula I, or the polymerisable compounds of component A), are polymerised.

The invention furthermore relates to a process for preparing an LC medium as described above and below, comprising the steps of mixing one or more mesogenic or LC compounds, or an LC host mixture or LC component B) as described above and below, with one or more compounds of formula I, and optionally with further LC compounds and/or additives like those of formula II.

The invention furthermore relates to the use of the LC media according to the invention in SA or PSA displays.

The invention furthermore relates to an LC display comprising one or more compounds of formula I or an LC medium according to the invention, in particular a PSA display, particularly preferably a PS-VA, PS-OCB, PS-IPS, PS-FFS, PS-UB-FFS, PS-posi-VA or PS-TN display.

The invention furthermore relates to the use of compounds of formula I and LC media according to the invention in polymer stabilised SA-VA and SA-FFS displays, and to a polymer stabilised SA-VA or SA-FFS display comprising one or more compounds of formula I or an LC medium according to the invention.

The invention furthermore relates to an LC display comprising a polymer obtainable by polymerisation of one or more compounds of formula I or of a polymerisable component A) as described above, or comprising an LC medium according to the invention, which is preferably a PSA display, very preferably a PS-VA, PS-OCB, PS-IPS, PS-FFS, PS-UB-FFS, PS-posi-VA, PS-TN, or polymer stabilised SA-VA or SA-FFS display.

The invention furthermore relates to an LC display of the PSA type comprising two substrates, at least one which is transparent to light, an electrode provided on each substrate or two electrodes provided on only one of the substrates, and located between the substrates a layer of an LC medium that comprises one or more polymerisable compounds and an LC component as described above and below, wherein the polymerisable compounds are polymerised between the substrates of the display.

The invention furthermore relates to a process for manufacturing an LC display as described above and below, comprising the steps of filling or otherwise providing an LC medium, which comprises one or more polymerisable compounds as described above and below, between the substrates of the display, and polymerising the polymerisable compounds.

The PSA displays according to the invention have two electrodes, preferably in the form of transparent layers, which are applied to one or both of the substrates. In some displays, for example in PS-VA, PS-OCB, PS-TN or polymer stabilised SA-VA displays, one electrode is applied to each of the two substrates. In other displays, for example in PS-posi-VA, PS-IPS or PS-FFS, PS-UB-FFS or polymer stabilised SA-FFS displays, both electrodes are applied to only one of the two substrates.

In a preferred embodiment the polymerisable component is polymerised in the LC display while a voltage is applied to the electrodes of the display.

The polymerisable compounds of the polymerisable component are preferably polymerised by photopolymerisation, very preferably by UV photopolymerisation.

The alkenyl group A in the compounds of formula I as disclosed and claimed in this application is not considered to be within the meaning of the term "polymerisable group" as used herein. Preferably the LC media disclosed and claimed in the present application do not contain an additive that initiates or enhances participation of the alkenyl group A in a polymerisation reaction.

DETAILED DESCRIPTION OF THE INVENTION

The LC media according to the present invention show the following advantageous properties when used in PSA and PS-SA displays:

- a low refractive index and low reflectivity,
- a suitable tilt generation which is inside a certain process window,
- fast polymerization leading to minimal residues of RM after the UV-process,
- a high voltage-holding-ratio after the UV-process,
- good tilt stability,
- sufficient stability against heat,
- sufficient solubility of the polymerisable compounds in organic solvents typically used in display manufacture.

In particular, the LC media according to the present invention do surprisingly show a higher refractive index and a lower reflectivity when used in PI-free PS-SA displays, compared to LC media known from prior art.

It was also surprisingly found that in the compounds of formula I the lateral alkenyl substituents on the benzene or naphthylene rings do not seem to negatively affect the properties like polymerisation speed and conversion rate, tilt generation, or reliability.

Unless stated otherwise, the compounds of formula I are preferably selected from achiral compounds.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display), and will be understood to be inclusive of "pretilt" and "pretilt angle". The tilt angle here denote the average angle (<90°) between the longitudinal molecular axes of the LC molecules (LC director) and the surface of the plane-parallel outer plates which form the LC cell. A low absolute value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid crystalline skeleton, and one or more functional groups attached thereto which are suitable for polymerisation and are also referred to as "polymerisable group" or "P".

Unless stated otherwise, the term "polymerisable compound" as used herein will be understood to mean a polymerisable monomeric compound.

An SA-VA or SA-FFS display according to the present invention will be of the polymer stabilised mode as it contains, or is manufactured by use of, an LC medium containing an RM of formula I. Consequently as used herein, the terms "SA-VA display" and "SA-FFS display", when referring to a display according to the present invention, will be understood to refer to a polymer stabilised SA-VA or SA-FFS display even if not explicitly mentioned.

As used herein, the term "low-molecular-weight compound" will be understood to mean to a compound that is monomeric and/or is not prepared by a polymerisation reaction, as opposed to a "polymeric compound" or a "polymer".

As used herein, the term "unpolymerisable compound" will be understood to mean a compound that does not contain a functional group that is suitable for polymerisation under the conditions usually applied for the polymerisation of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerisable group(s) in a polymerisable mesogenic compound.

Above and below,

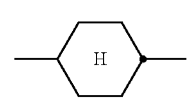

denote a trans-1,4-cyclohexylene ring, and

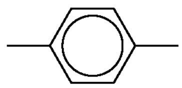

denote a 1,4-phenylene ring.

In a group

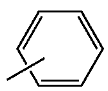

the single bond shown between the two ring atoms can be attached to any free position of the benzene ring.

Above and below "organic group" denote a carbon or hydrocarbon group.

"Carbon group" denote a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denote a carbon group which additionally contains one or more H atoms and optionally one or more heteroatoms, such as, for example, N, O, S, B, P, Si, Se, As, Te or Ge.

"Halogen" denote F, Cl, Br or I, preferably F or Cl.

—CO—, —C(=O)— and —C(O)— denote a carbonyl group, i.e.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denote an aromatic carbon group or a group derived therefrom. The term "heteroaryl" denote "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denote H, F, Cl, CN, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by F or Cl, or denote an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3- oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, hereinafter also referred to as "$L^S$", are, for example, F, Cl, Br, I, —CN, —$NO_2$, —NCO, —NCS, —OCN, —SCN, —C(═O)N($R^x$)$_2$, —C(═O)$Y^1$, —C(═O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denote H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P- or P-Sp-, and $Y^1$ denote halogen.

"Substituted silyl or aryl" preferably means substituted by halogen, —CN, $R^0$, —O$R^0$, —CO—$R^0$, —CO—O—$R^0$, —O—CO—$R^0$ or —O—CO—O—$R^0$, wherein $R^0$ denote H or alkyl with 1 to 20 C atoms.

Particularly preferred substituents $L^S$ are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

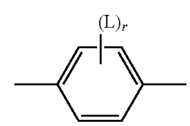

is preferably

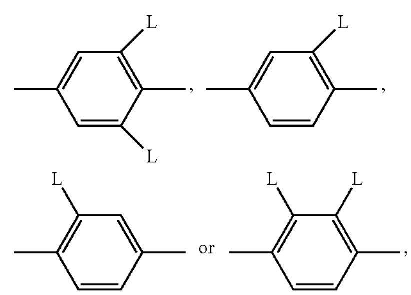

in which L has one of the meanings indicated above.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C═C double bond or —C≡C— triple bond, and groups which are suitable for polymerisation with ring opening, such as, for example, oxetane or epoxide groups.

Preferred groups P are selected from the group consisting of $CH_2$═C$W^1$—CO—O—, $CH_2$═C$W^1$—CO—,

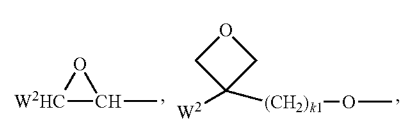

-continued

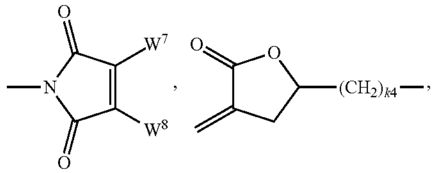

$CH_2{=}CW^2{-}(O)_{k3}{-}$, $CW^1{=}CH{-}CO{-}(O)_{k3}{-}$, $CW^1{=}CH{-}CO{-}NH{-}$, $CH_2{=}CW^1{-}CO{-}NH{-}$, $CH_3{-}CH{=}CH{-}O{-}$, $(CH_2{=}CH)_2CH{-}OCO{-}$, $(CH_2{=}CH{-}CH_2)_2CH{-}OCO{-}$, $(CH_2{=}CH)_2CH{-}O{-}$, $(CH_2{=}CH{-}CH_2)_2N{-}$, $(CH_2{=}CH{-}CH_2)_2N{-}CO{-}$, $HO{-}CW^2W^3{-}$, $HS{-}CW^2W^3{-}$, $HW^2N{-}$, $HO{-}CW^2W^3{-}NH{-}$, $CH_2{=}CW^1{-}CO{-}NH{-}$, $CH_2{=}CH{-}(COO)_{k1}$-Phe-$(O)_{k2}{-}$, $CH_2{=}CH{-}(CO)_{k1}$-Phe-$(O)_{k2}{-}$, Phe—CH═CH—, HOOC—, OCN- and $W^4W^5W^6Si{-}$, in which $W^1$ denote H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denote 1,4-phenylene, which is optionally substituted by one or more radicals L as defined above which are other than P-Sp-, $k_1$, $k_2$ and $k_3$ each, independently of one another, denote 0 or 1, $k_3$ preferably denote 1, and $k_4$ denote an integer from 1 to 10.

Very preferred groups P are selected from the group consisting of $CH_2{=}CW^1{-}CO{-}O{-}$, $CH_2{=}CW^1{-}CO{-}$,

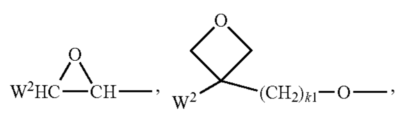

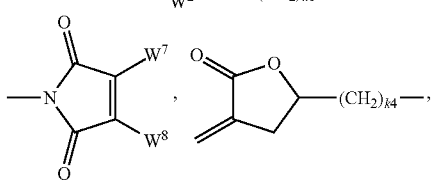

$CH_2{=}CW^2{-}O{-}$, $CH_2{=}CW^2{-}$, $CW^1{=}CH{-}CO{-}(O)_{k3}{-}$, $CW^1{=}CH{-}CO{-}NH{-}$, $CH_2{=}CW^1{-}CO{-}NH{-}$, $(CH_2{=}CH)_2CH{-}OCO{-}$, $(CH_2{=}CH{-}CH_2)_2CH{-}OCO{-}$, $(CH_2{=}CH)_2CH{-}O{-}$, $(CH_2{=}CH{-}CH_2)_2N{-}$, $(CH_2{=}CH{-}CH_2)_2N{-}CO{-}$, $CH_2{=}CW^1{-}CO{-}NH{-}$, $CH_2{=}CH{-}(COO)_{k1}$-Phe-$(O)_{k2}{-}$, $CH_2{=}CH{-}(CO)_{k1}$-Phe-$(O)_{k2}{-}$, Phe—CH═CH— and $W^4W^5W^6Si{-}$, in which $W^1$ denote H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denote 1,4-phenylene, $k_1$, $k_2$ and $k_3$ each, independently of one another, denote 0 or 1, $k_3$ preferably denote 1, and $k_4$ denote an integer from 1 to 10.

Very particularly preferred groups P are selected from the group consisting of $CH_2{=}CW^1{-}CO{-}O{-}$, in particular $CH_2{=}CH{-}CO{-}O{-}$, $CH_2{=}C(CH_3){-}CO{-}O$- and $CH_2{=}CF{-}CO{-}O{-}$, furthermore $CH_2{=}CH{-}O{-}$, $(CH_2{=}CH)_2CH{-}O{-}CO{-}$, $(CH_2{=}CH)_2CH{-}O{-}$,

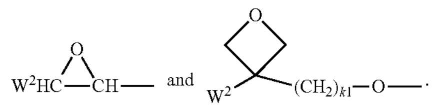

Further preferred polymerisable groups P are selected from the group consisting of vinyloxy, acrylate, methacrylate, fluoroacrylate, chloroacrylate, oxetane and epoxide, most preferably from acrylate and methacrylate.

If the spacer group Sp is different from a single bond, it is preferably of the formula Sp"-X", so that the respective radical P-Sp- conforms to the formula P-Sp"-X"—, wherein Sp" denote linear or branched alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—O—, —O—CO—, —O—CO—O—, —S—CO—, —CO—S—, —N($R^{00}$)—CO—O—, —O—CO—N($R^0$)—, —N($R^0$)—CO—N($R^{00}$)—, —CH═CH— or —C≡C— in such a way that O and/or S atoms are not linked directly to one another, X" denote —O—, —S—, —CO—, —CO—O—, —O—CO—, —O—CO—O—, —CO—N($R^0$)—, —N($R^0$)—CO—, —N($R^0$)—CO—N($R^{00}$)—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH═N—, —N═CH—, —N═N—, —CH═$CR^0$—, —$CY^2$═$CY^3$—, —C≡C—, —CH═CH—CO—O—, —O—CO—CH═CH— or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably —O—, —S—, —CO—, —COO—, —OCO—, —O—COO—, —CO—

In a preferred embodiment of the invention the compounds of formula I and its subformulae contain a spacer group Sp that is substituted by one or more polymerisable groups P, so that the group Sp-P corresponds to Sp(P)$_s$, with s being ≥2 (branched polymerisable groups).

Preferred compounds of formula I according to this preferred embodiment are those wherein s is 2, i.e. compounds which contain a group Sp(P)$_2$. Very preferred compounds of formula I according to this preferred embodiment contain a group selected from the following formulae:

-X-alkyl—CHPP  Sp1

-X-alkyl—CH(($CH_2$)$_{aa}$P)(($CH_2$)$_{bb}$P)  Sp2

-X-N(($CH_2$)$_{aa}$P)(($CH_2$)$_{bb}$P)  Sp3

-X-alkyl—CHP—$CH_2$—$CH_2$P  Sp4

-X-alkyl-C($CH_2$P)($CH_2$P)—$C_{aa}H_{2aa+1}$  Sp5

-X-alkyl—CHP—$CH_2P$ Sp6

-X-alkyl-CPP-$C_{aa}H_{2aa+1}$ Sp7

-X-alkyl—CHPCHP-$C_{aa}H_{2aa+1}$ Sp8 in which P is as defined in formula I, alkyl denote a single bond or straight-chain or branched alkylene having 1 to 12 C atoms which is unsubstituted or mono- or polysubstituted by F, Cl or CN and in which one or more non-adjacent $CH_2$ groups may each, independently of one another, be replaced by —C($R^0$)═C($R^0$)—, —C≡C—, —N($R^0$)—, —O—, —S—, —CO—, —CO—O—, —O—CO—, —O—CO—O— in such a way that O and/or S atoms are not linked directly to one another, where $R^0$ has the meaning indicated above, aa and bb each, independently of one another, denote 0, 1, 2, 3, 4, 5 or 6, X has one of the meanings indicated for X", and is preferably 0, CO, $SO_2$, O—CO—, CO—O or a single bond.

Preferred spacer groups $Sp(P)_2$ are selected from formulae Sp1, Sp2 and Sp3.

Very preferred spacer groups $Sp(P)_2$ are selected from the following subformulae:

—CHPP Sp1a

—O—CHPP Sp1b

—$CH_2$—CHPP Sp1c

—$OCH_2$—CHPP Sp1d

—CH($CH_2$—P)($CH_2$—P) Sp2a

—OCH($CH_2$—P)($CH_2$—P) Sp2b

—$CH_2$—CH($CH_2$—P)($CH_2$—P) Sp2c

—$OCH_2$—CH($CH_2$—P)($CH_2$—P) Sp2d

—CO—N H($(CH_2)_2$P)($(CH_2)_2$P) Sp3a

In the compounds of formula I and its subformulae as described above and below, P is preferably selected from the group consisting of vinyloxy, acrylate, methacrylate, fluoroacrylate, chloroacrylate, oxetane and epoxide, most preferably from acrylate and methacrylate.

Further preferred are compounds of formula I and its subformulae as described above and below, wherein all polymerisable groups P that are present in the compound have the same meaning, and very preferably denote acrylate or methacrylate, most preferably methacrylate.

Further preferred are compounds of formula I and its subformulae as described above and below, wherein Rb is P-Sp-.

Further preferred are compounds of formula I and its subformulae as described above and below, wherein Sp denote a single bond or —$(CH_2)_{p1}$—, —O—$(CH_2)_{p1}$—, —O—CO—$(CH_2)_{p1}$, or —CO—O—$(CH_2)_{p1}$, wherein p1 is 2, 3, 4, 5 or 6, and, if Sp is —O—$(CH_2)_{p1}$—, —O—CO—$(CH_2)_{p1}$ or —CO—O—$(CH_2)_{p1}$ the O-atom or CO-group, respectively, is linked to the benzene ring.

Further preferred are compounds of formula I and its subformulae as described above and below, wherein at least one group Sp is a single bond.

Further preferred are compounds of formula I and its subformulae as described above and below, wherein at least one group Sp is different from a single bond, and is preferably selected from —$(CH_2)_{p1}$—, —O—$(CH_2)_{p1}$—, —O—CO—$(CH_2)_{p1}$, or —CO—O—$(CH_2)_{p1}$, wherein p1 is 2, 3, 4, 5 or 6, and, if Sp is —O—$(CH_2)_{p1}$—, —O—CO—$(CH_2)_{p1}$ or —CO—O—$(CH_2)_{p1}$ the O-atom or CO-group, respectively, is linked to the benzene ring.

Preferably $A^1$ and $A^2$ in formula I denote benzene, naphthalene, phenanthrene, anthracene, dibenzofuran or dibenzothiophene, all of which are optionally substituted by one or more groups A, L or P-Sp-, and wherein at least one group $A^1$ or $A^2$ is substituted by at least one group A.

Preferably —$A^1$-($Z^1$—$A^2$)$_z$- in formula I denote benzene, biphenylene, p-terphenylene (1,4-diphenylbenzene), m-terphenylene (1,3-diphenylbenzene), naphthylene, 2-phenyl-naphthylene, phenanthrene or anthracene, dibenzofuran or dibenzothiophene, all of which are optionally substituted by one or more groups A, L or P-Sp- and are at least monosubstituted by A.

Further preferred are compounds of formula I and its subformulae as described above and below, wherein —$A^1$-(Z—$A^2$)$_z$- is selected from the following formulae

A1

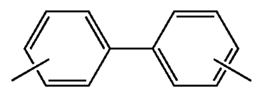

A2

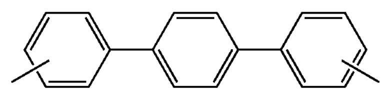

A3

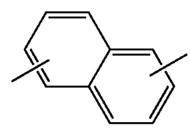

A4

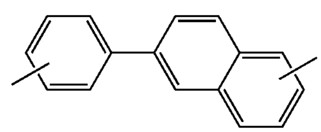

A5

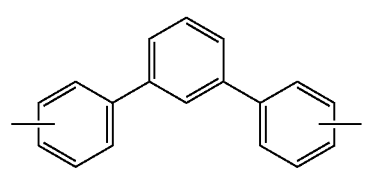

A6

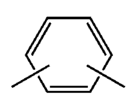

wherein the benzene rings are optionally further substituted by one or more groups A, L or P-Sp- as defined in formula I, and at least one benzene ring is substituted by at least one group A.

Preferred compounds of formula I are selected from the following subformulae

I1

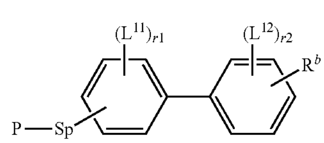

-continued

I2

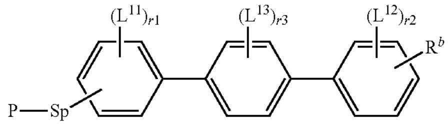

I3

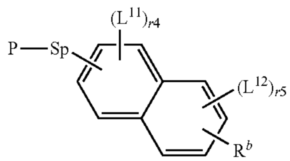

I4a

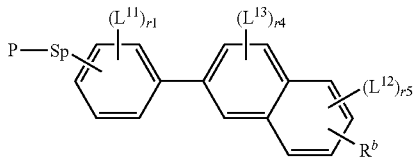

I4b

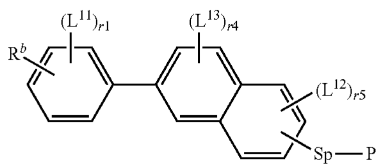

I5

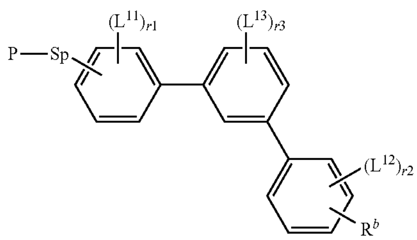

I6

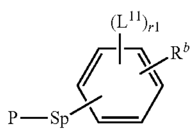

wherein the individual radicals, independently of each other, and on each occurrence identically or differently, have the following meanings A, P, Sp, $R^b$ one of the meanings given in formula I or one of the preferred meanings as given above and below, $L^{11}$, $L^{12}$, $L^{13}$ L or A, preferably F, Cl or A, r1, r2, r3 0, 1, 2, 3 or 4, preferably 0, 1 or 2, very preferably 0 or 1, wherein $r1+r2+r3\geq1$, r4, r5 0, 1, 2 or 3, preferably 0, 1 or 2, very preferably 0 or 1, wherein in formula I3 $r4+r5\geq1$ and in formula I4a and I4b $r1+r4+r5\geq1$, wherein the compounds contain at least group $L^{11}$, $L^{12}$ or $L^{13}$ that is A.

Preferred are compounds of formula I and I1-I5 wherein Rb is P-Sp.

Further preferred are compounds of formula I and I1-I5 wherein Rb is different from P-Sp.

Very preferred are compounds of formula I1, I2 and I5.

Preferred compounds of formula I and I1 to I5 are selected from the following subformulae:

I1A

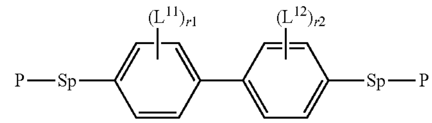

I1B

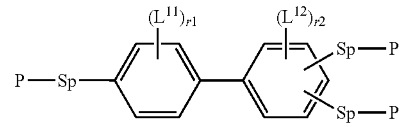

I1C

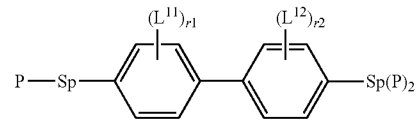

I1D

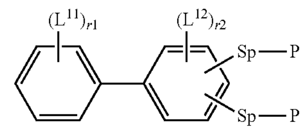

I2A

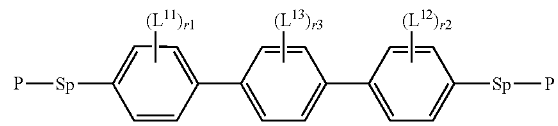

I2B

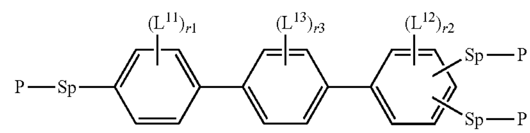

I2C

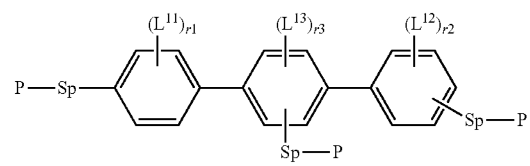

I2D

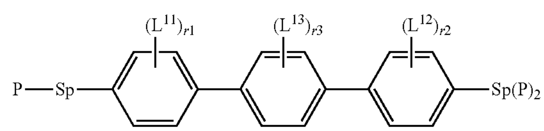

I3A

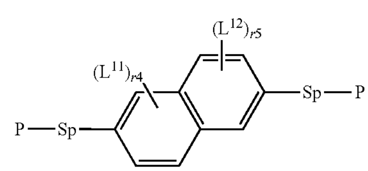

I3B

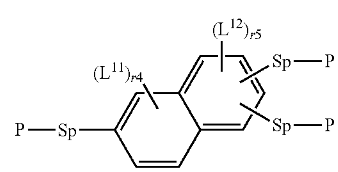

-continued

I3C

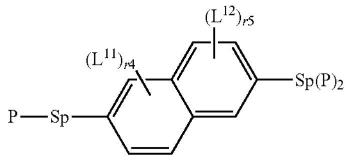

I4A

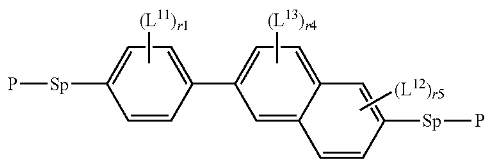

I4B

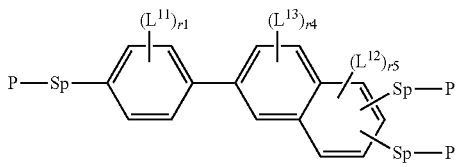

I4C

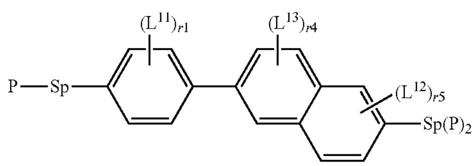

I4D

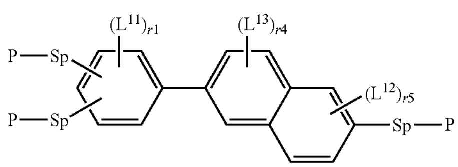

I4E

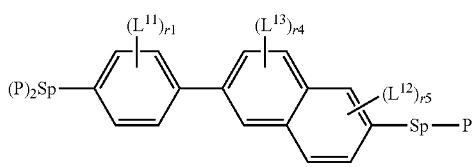

I5A

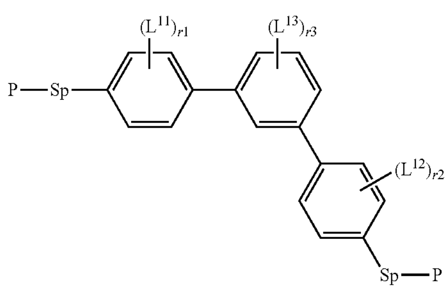

I5B

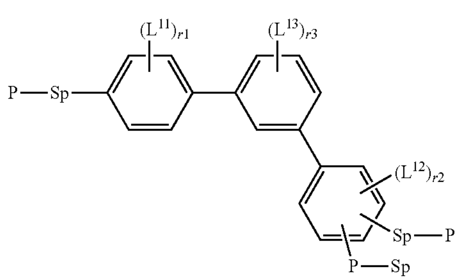

-continued

I5C

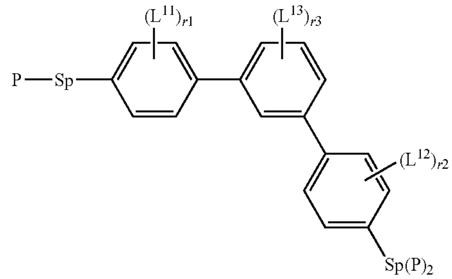

I5D

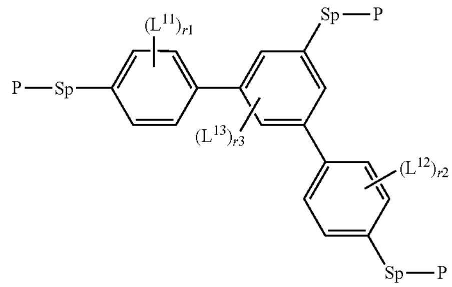

I6A

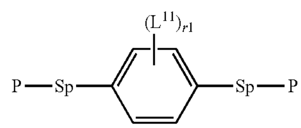

I6B

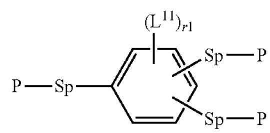

I6C

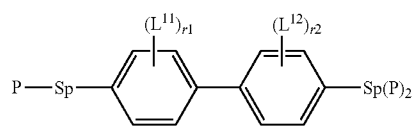

wherein P, Sp, $L^{11-13}$ and r1-r5 have the meanings given in formula I or one of the preferred meanings as given above and below, c is 1 or 2, $Sp(P)_2$ denote a spacer group Sp that is substituted by two polymerisable groups P at identical or different positions, wherein r1+r2+r3≥1, in formula I3 r4+r5≥1, and in formula I4A to I4E r1+r4+r5≥1, and wherein the compounds contain at least group $L^{11}$, $L^{12}$ or $L^{13}$ that is A.

Further preferred compounds of formula I and I1-I6 are selected from the following subformulae

I*A

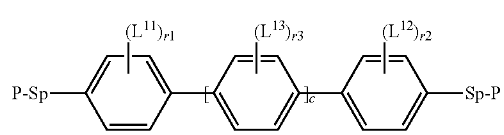

I*B

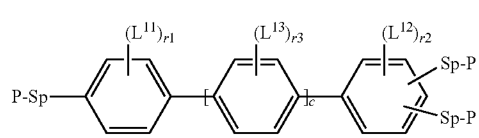

-continued

I*C

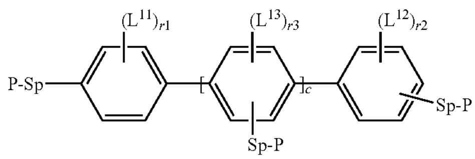

I*D

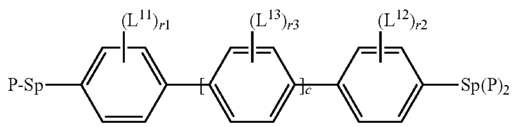

wherein P, Sp, $Sp(P)_2$, $L^{11-13}$ and r1-r3 have the meanings given in formula I2D or one of the preferred meanings as given above and below, c is 0 or 1, the compounds contain x groups $L^{11}$, $L^{12}$ or $L^{13}$ that denote $C_m$-alkenyl, with x being 1, 2, 3 or 4 and m being an integer from 2 to 7, and wherein in formula I*A, preferably in formula I*A, I*B, I*C and I*D, c+x+m is ≥4, preferably 4, 5, 6, 7 or 8, very preferably 4, 5 or 6.

Further preferred compounds of formula I, I1 to I6, I*A to I*D and I1A-I6C are selected from the following subformulae:

I1A-1

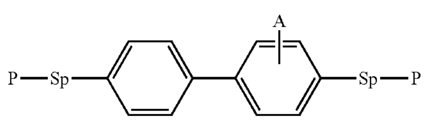

I1A-2

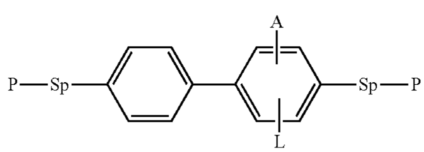

I1A-3

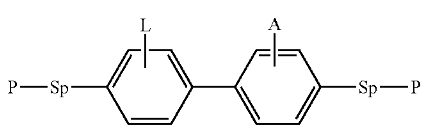

I1A-4

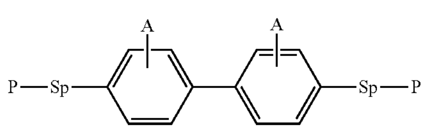

I1A-5

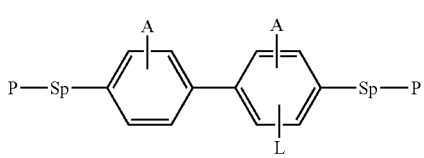

I1A-6

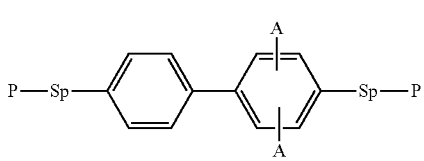

-continued

I1A-7

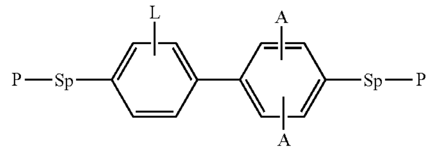

I1B-1

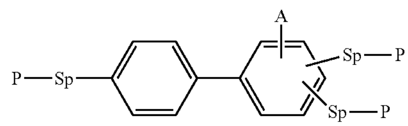

I1B-2

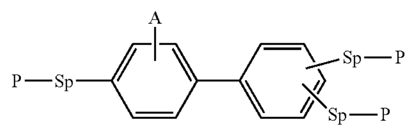

I1B-3

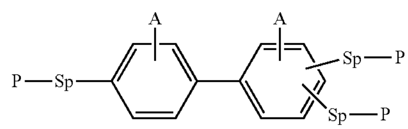

I1B-4

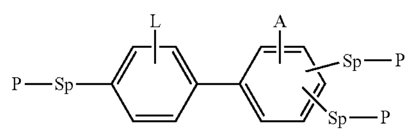

I1B-5

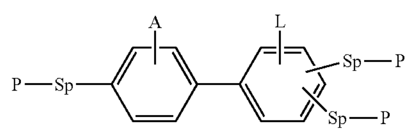

I1B-6

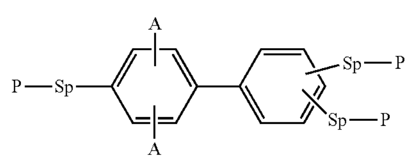

I1B-7

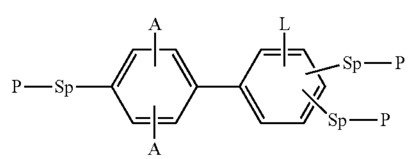

I1B-8

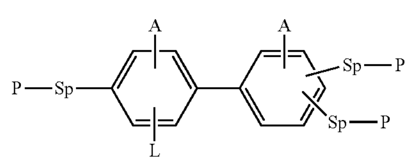

I1C-1

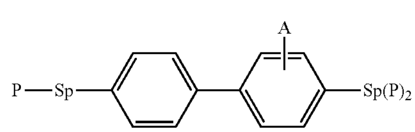

I1C-2

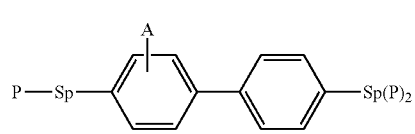

-continued
I1C-3
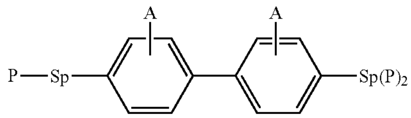
I1C-4
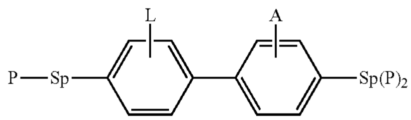
I1C-5
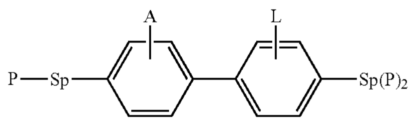
I1C-6
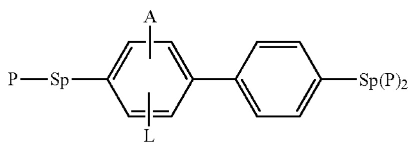
I1C-7
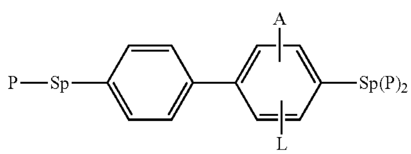
I1C-8
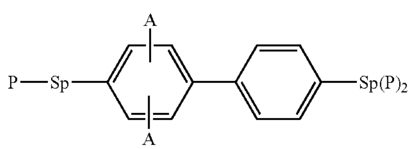
I1C-9
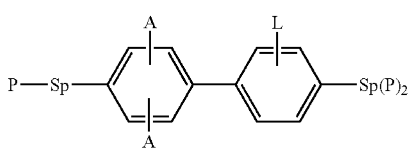
I1C-10
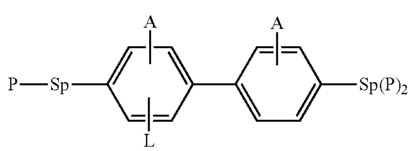
I1C-11
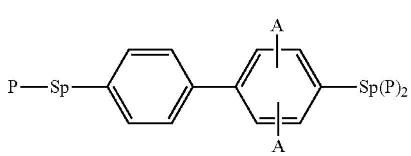
I1C-12
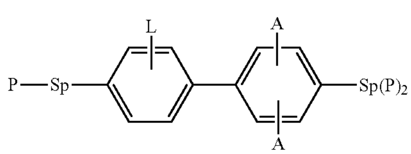
I1C-13
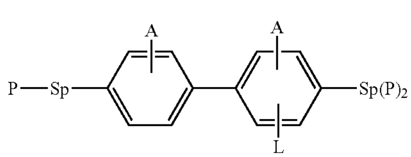
-continued
I1D-1
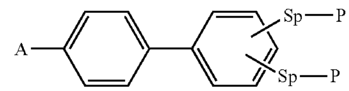
I1D-2
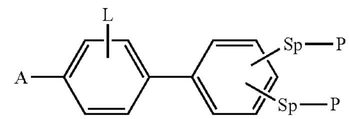
I1D-3
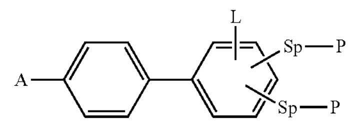
I1D-4
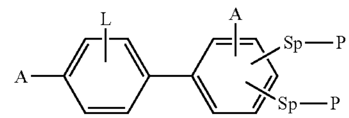
I1D-5
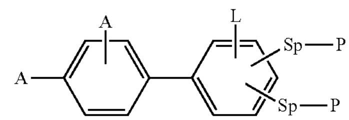
I2A-1
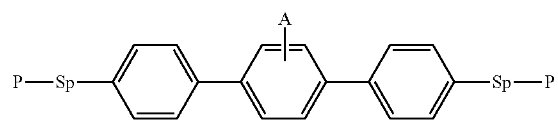
I2A-2
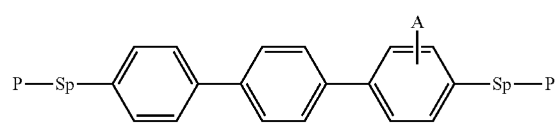
I2A-3
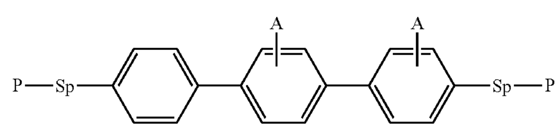
I2A-4
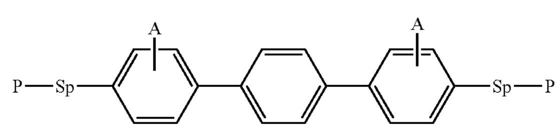
I2A-5
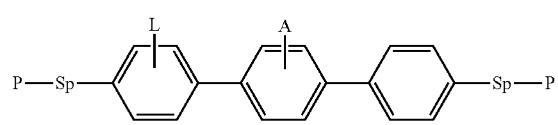
I2A-6
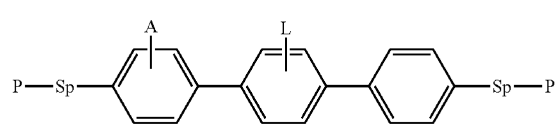

-continued
I2A-7
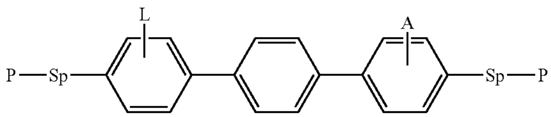
I2A-8
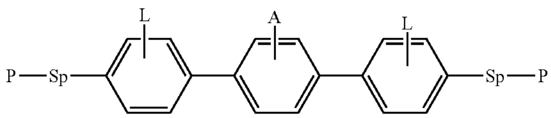
I2A-9
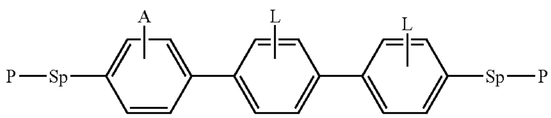
I2A-10
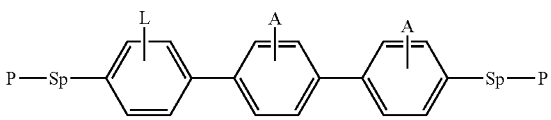
I2A-11
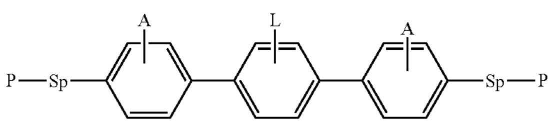
I2A-12
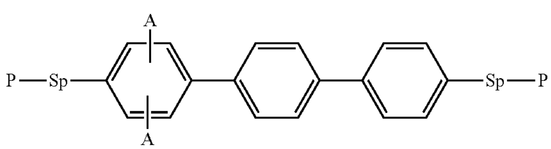
I2A-13
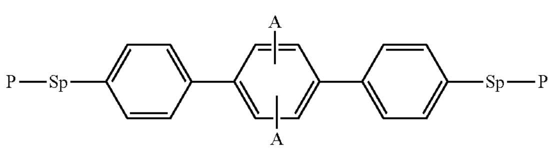
I2A-14
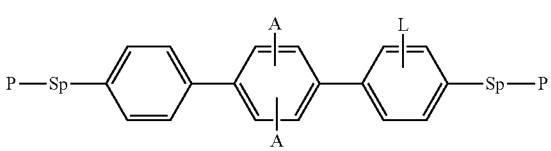
I2A-15
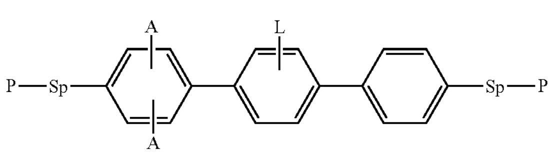
I2A-16
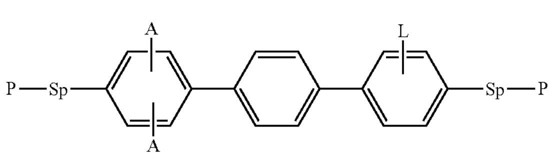
-continued
I2A-17
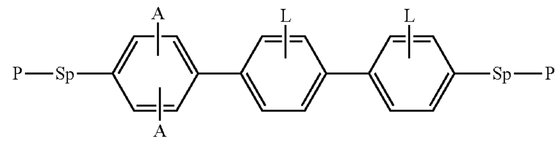
I2A-18
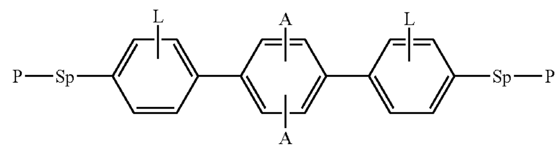
I2B-1
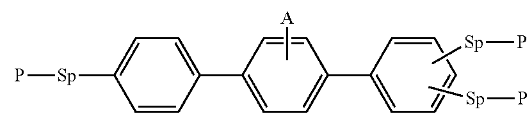
I2B-2
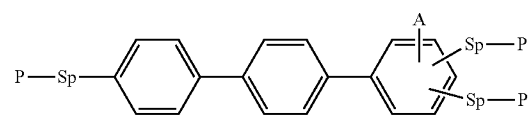
I2B-3
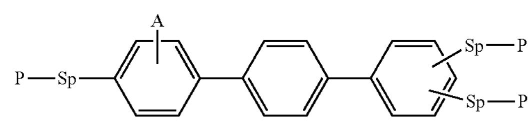
I2B-4
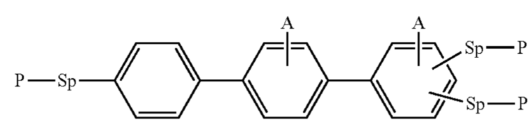
I2B-5
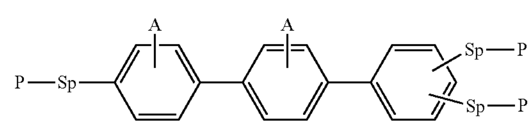
I2B-6
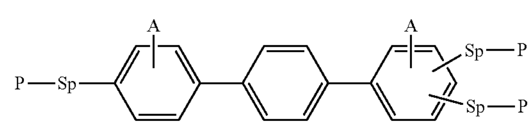
I2B-7
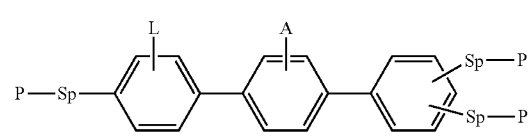
I2B-8
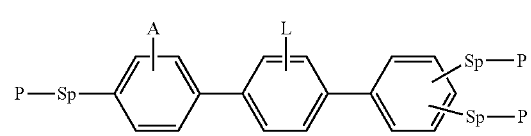

-continued
I2B-9
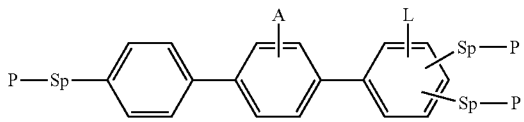
I2B-10
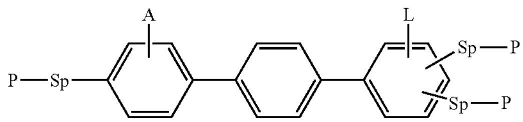
I2B-11
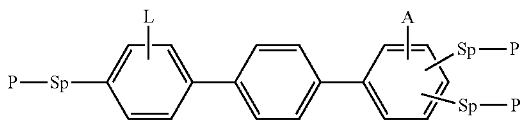
I2B-12
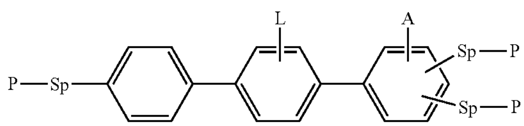
I2B-13
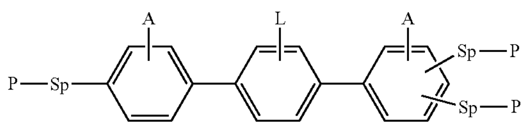
I2B-14
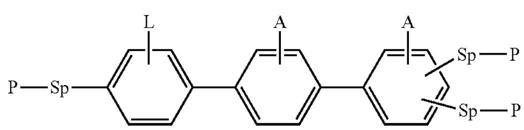
I2B-15
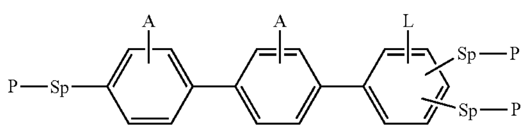
I2B-16
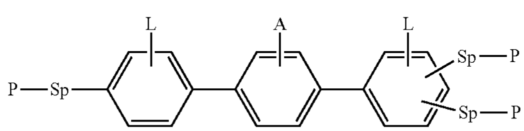
I2B-16
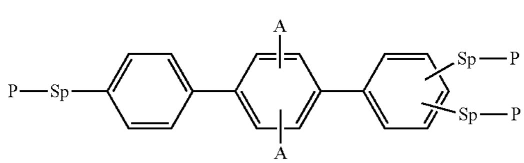
I2B-17
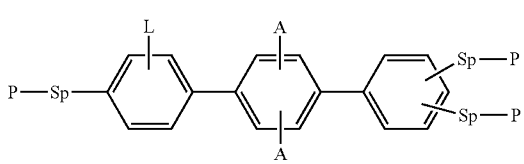
-continued
I2B-18
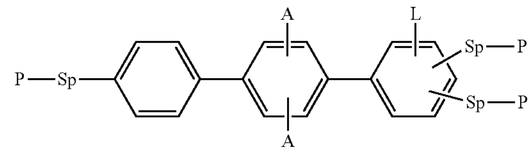
I2B-19
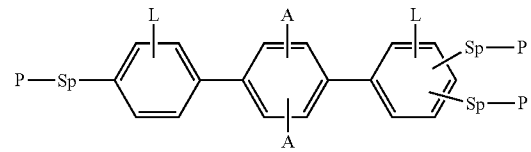
I2B-20
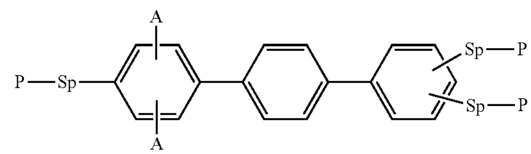
I2B-21
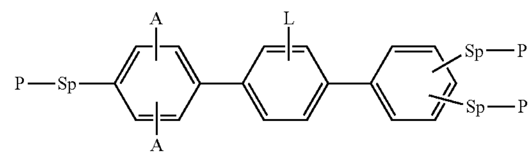
I2B-22
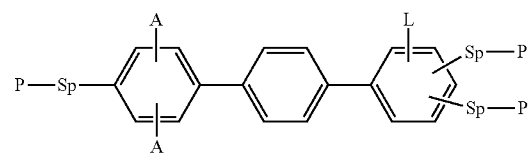
I2B-23
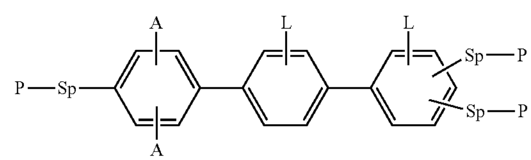
I2C-1
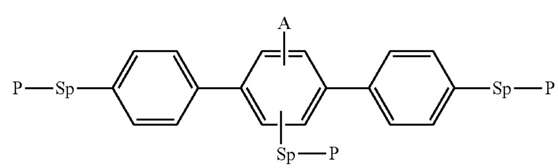
I2C-2
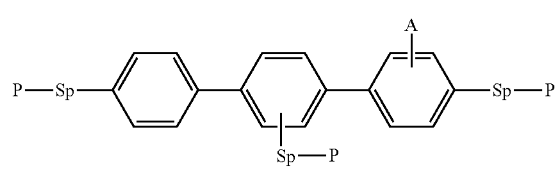
I2C-3
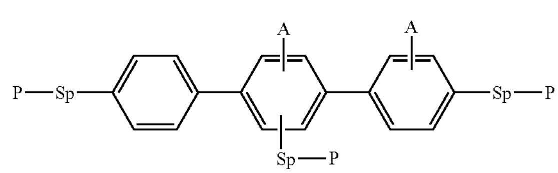

-continued
I2C-4
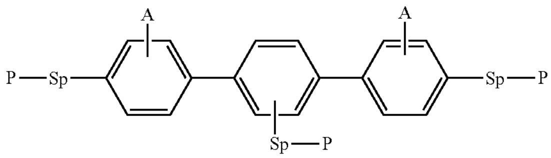
I2C-5
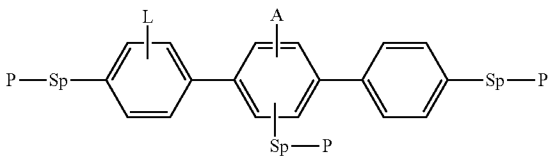
I2C-6
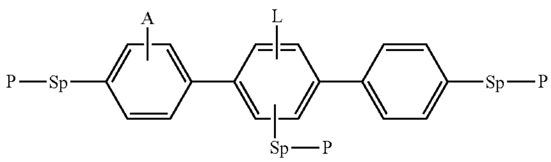
I2C-7
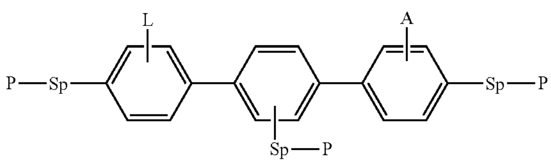
I2C-8
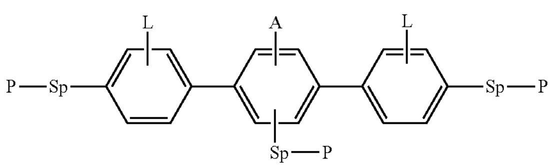
I2C-9
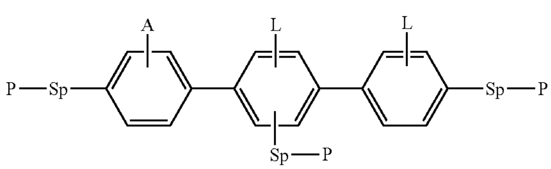
I2C-10
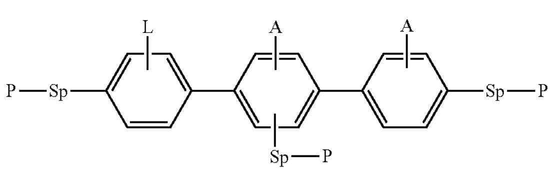
I2c-11
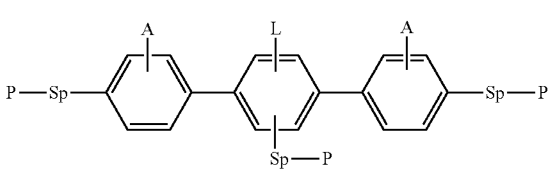
-continued
I2C-12
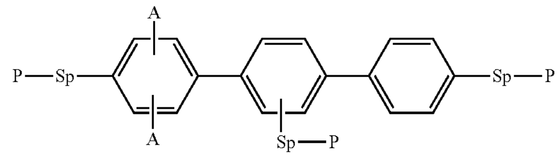
I2C-13
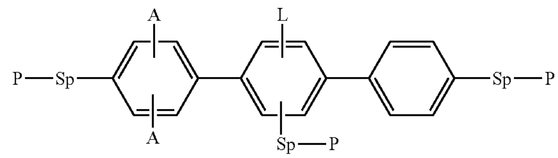
I2C-14
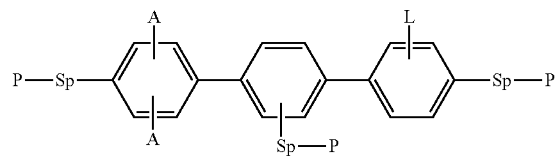
I2C-15
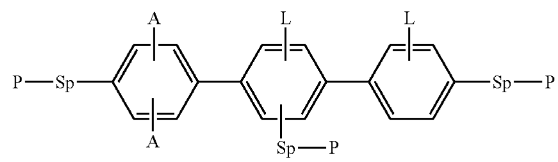
I2D-1
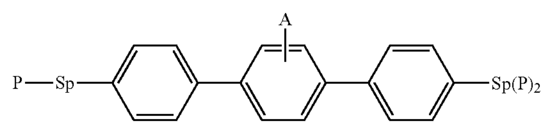
I2D-2
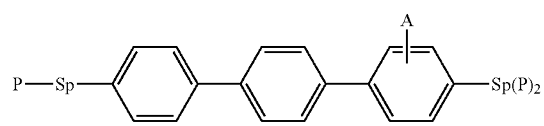
I2D-3
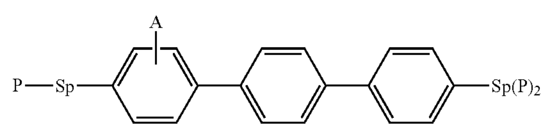
I2D-4
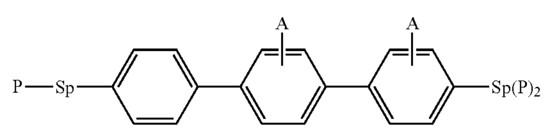
I2D-5
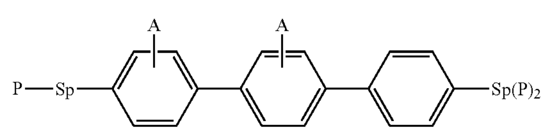
I2D-6
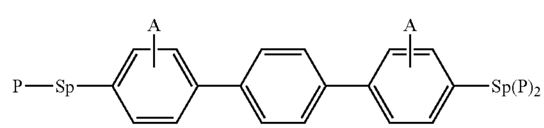

-continued
I2D-7
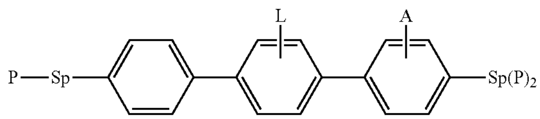
I2D-8
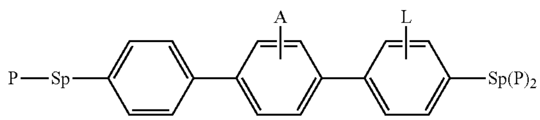
I2D-9
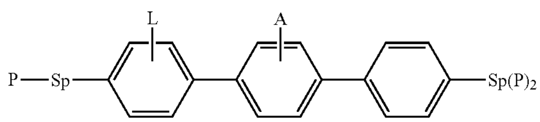
I2D-10
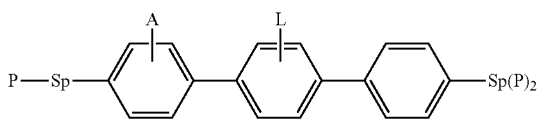
I2D-11
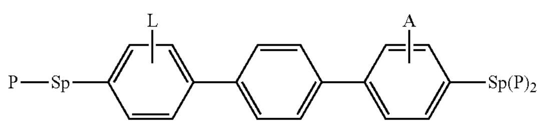
I2D-12
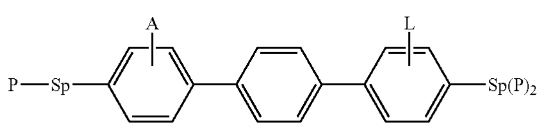
I2D-13
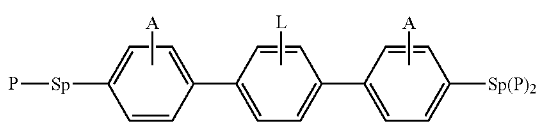
I2D-14
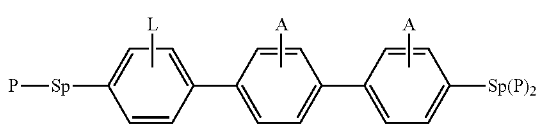
I2D-15
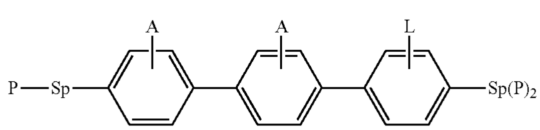
I2D-16
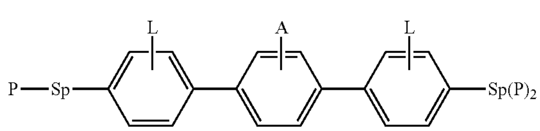
I2D-17
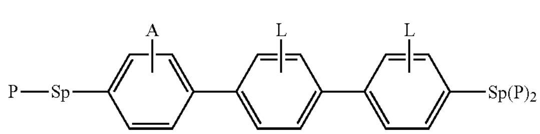
-continued
I2D-18
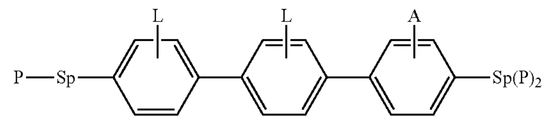
I2D-19
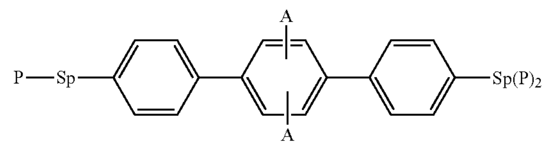
I2D-20
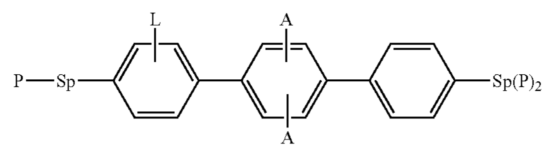
I2D-21
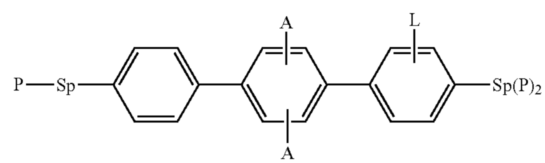
I2D-22
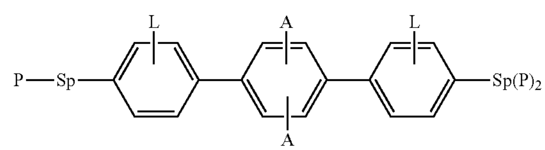
I2D-23
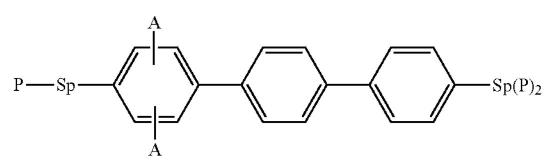
I2D-24
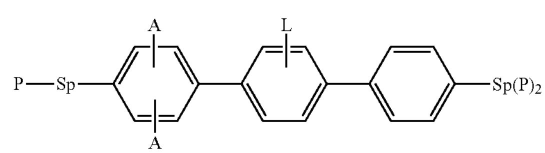
I2D-25
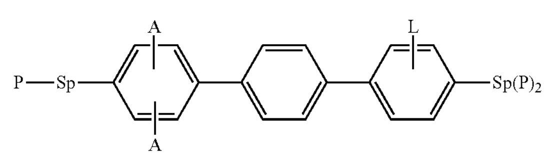
I2D-26
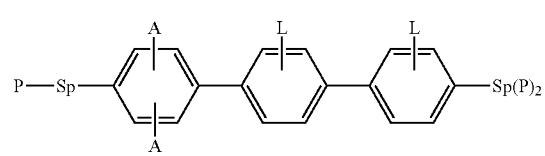

-continued
I2D-27
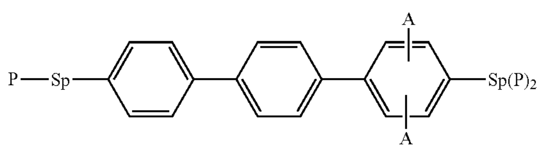
I2D-28
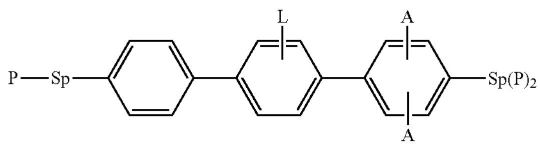
I2D-29
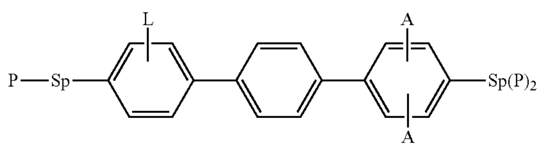
I2D-30
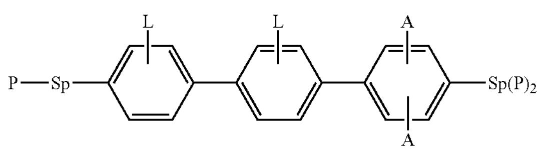
I3A-1
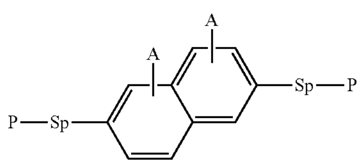
I3A-2
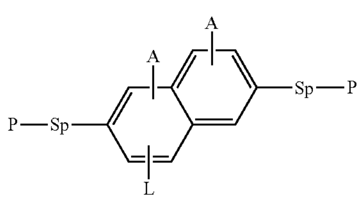
I3B-1
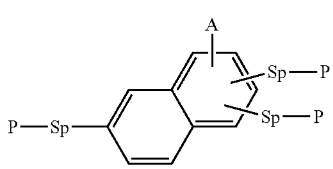
I3B-2
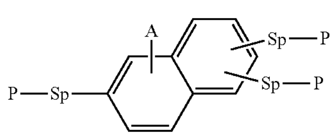
I3B-3
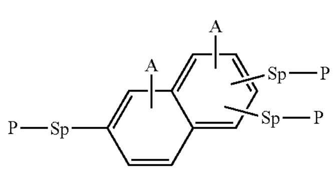
-continued
I3B-4
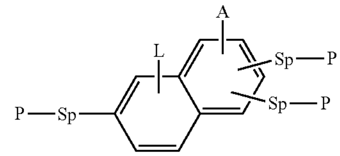
I3B-5
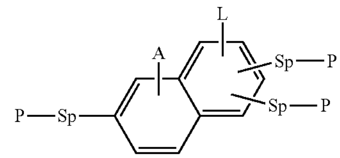
I3C-1
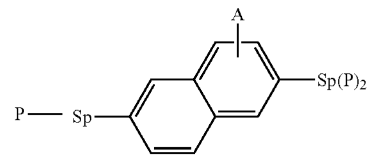
I3C-2
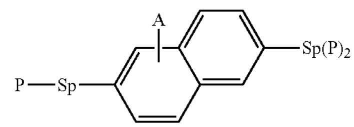
I3C-3
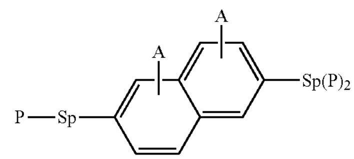
I3C-4
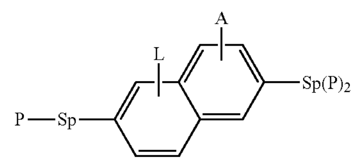
I3C-5
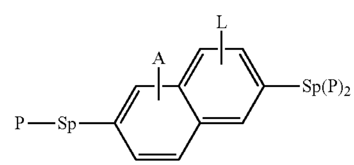
I4A-1
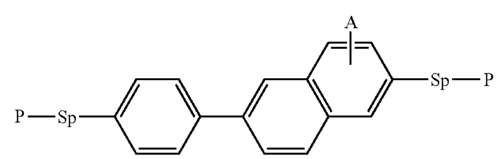
I4A-2
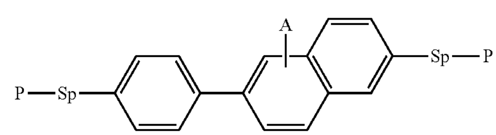
I4A-3
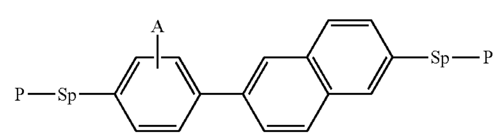

-continued
I4A-4
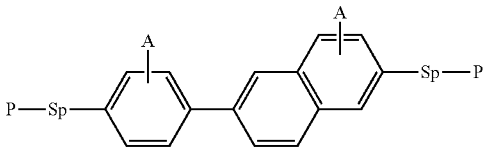
I4A-5
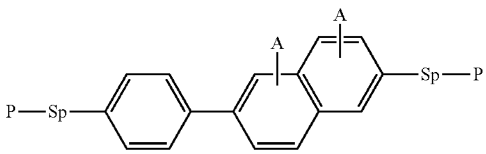
I4A-6
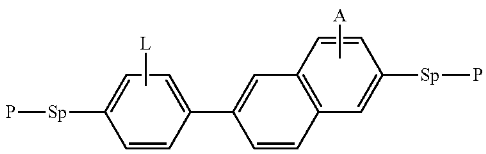
I4A-7
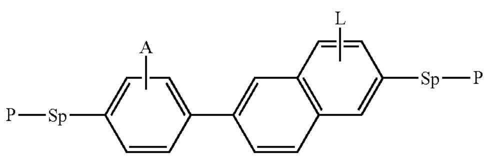
I4A-8
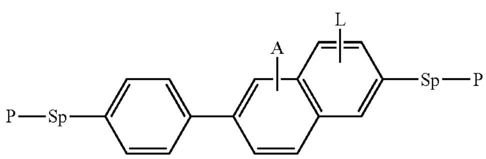
I4A-9
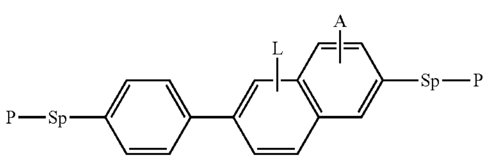
I4A-10
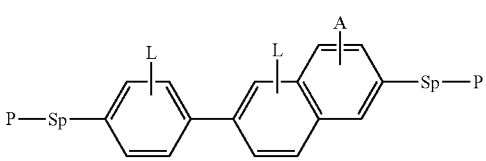
I4A-11
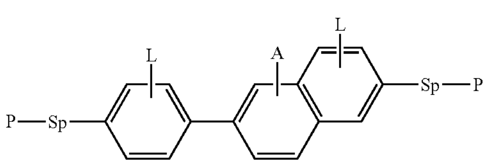
I4A-12
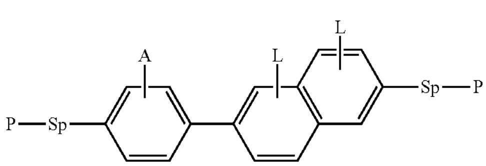
-continued
I4A-13
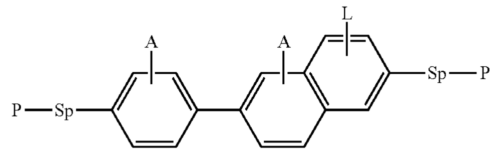
I4A-14
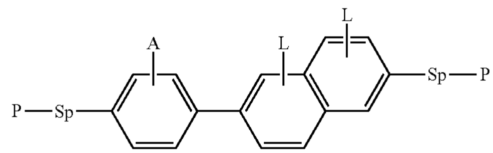
I4A-15
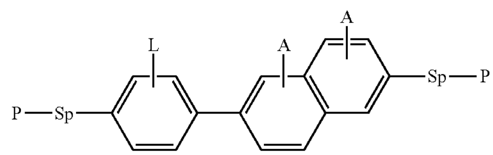
I4A-16
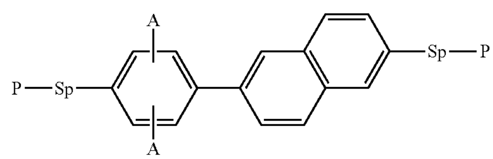
I4A-17
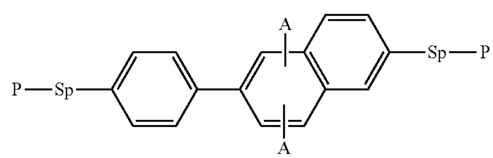
I4A-18
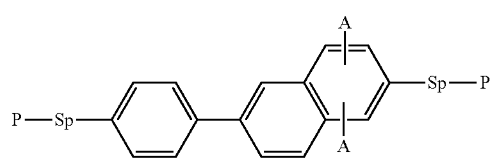
I4A-19
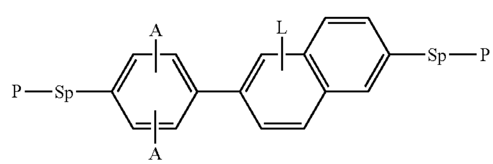
I4A-20
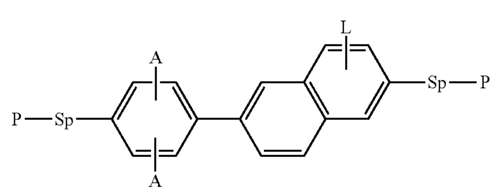

-continued
I4A-21
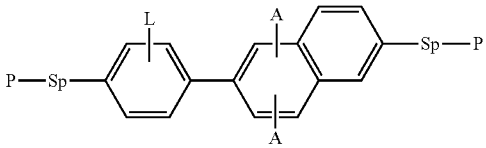
I4A-22
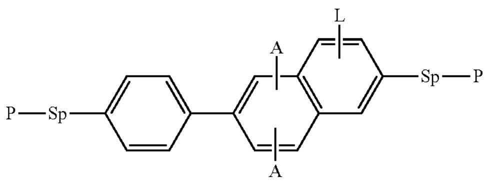
I4A-23
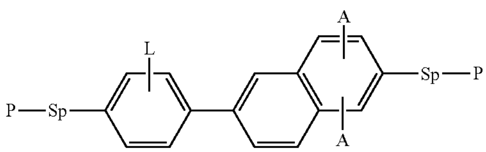
I4A-24
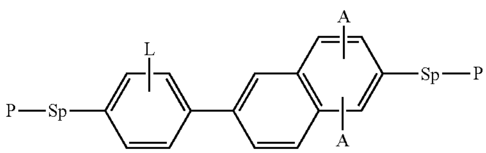
I4A-25
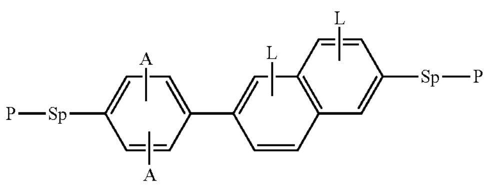
I4A-26
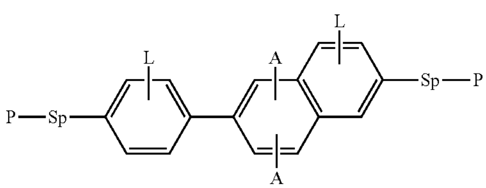
I4A-27
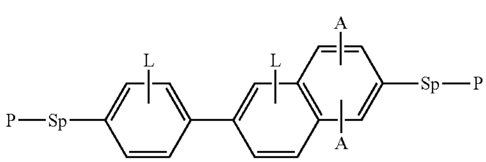
I4B-1
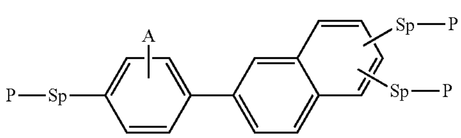
I4B-2
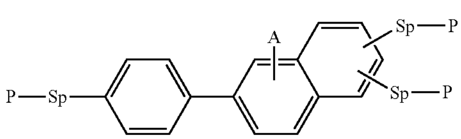
-continued
I4B-3
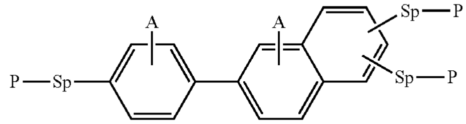
I4B-4
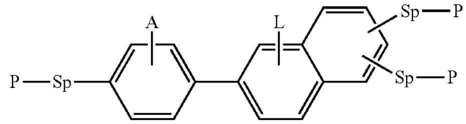
I4B-5
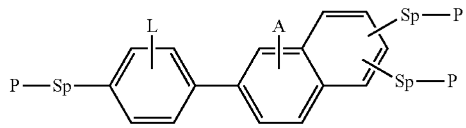
I4B-6
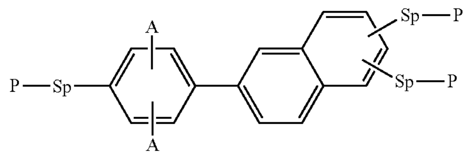
I4B-7
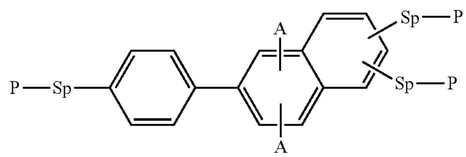
I4B-8
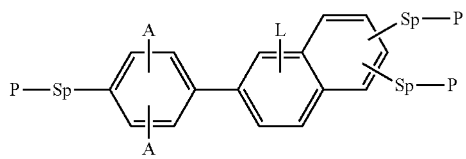
I4B-9
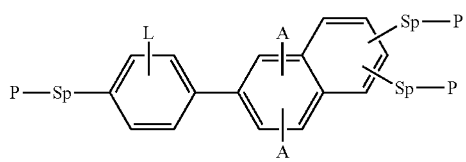
I4C-1
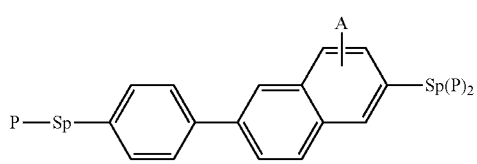
I4C-2
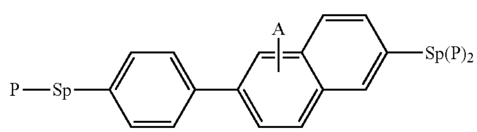
I4C-3
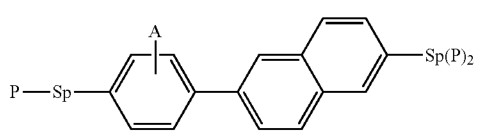

I4C-4
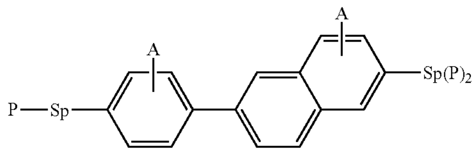
I4C-5
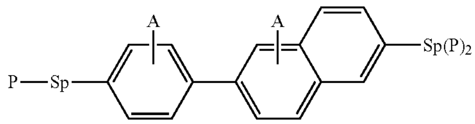
I4C-6
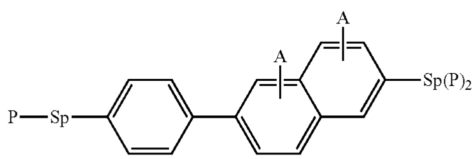
I4C-7
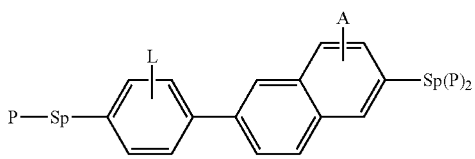
I4C-8
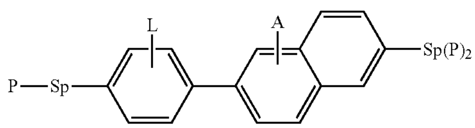
I4C-9
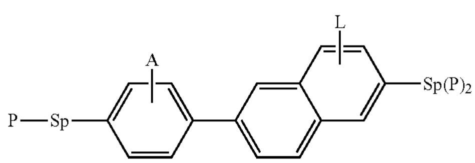
I4C-10
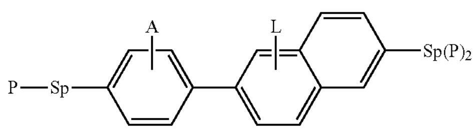
I4C-11
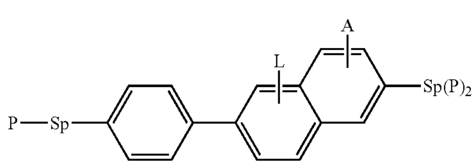
I4C-12
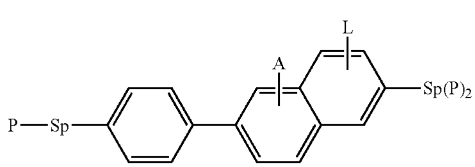
I4C-13
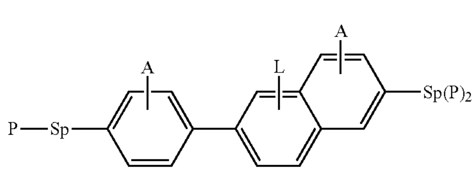
I4C-14
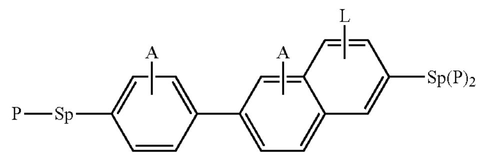
I4C-15
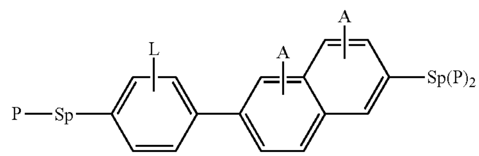
I4C-16
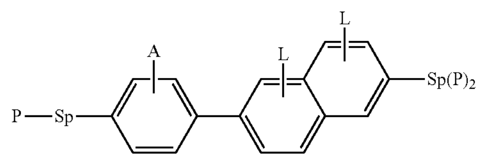
I4C-17
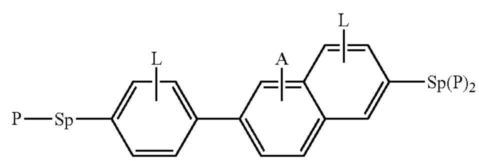
I4C-18
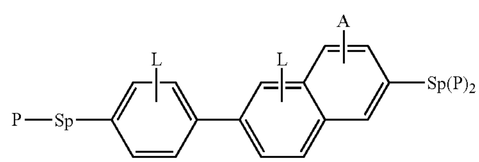
I4C-19
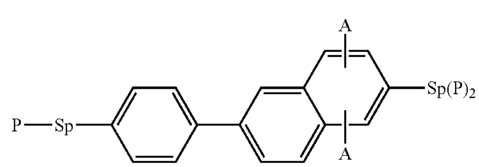
I4C-20
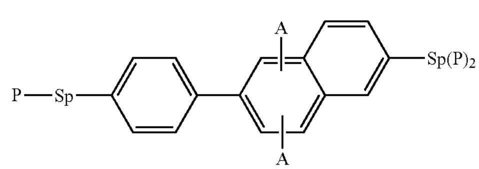
I4C-21
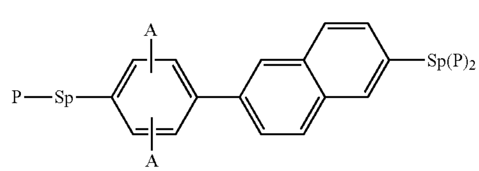

-continued
I4C-22
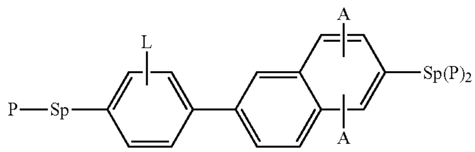
I4C-23
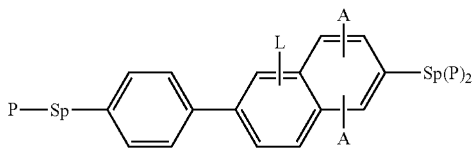
I4C-24
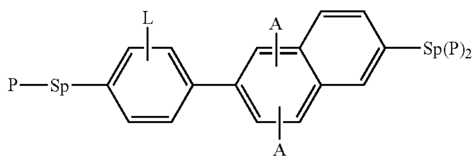
I4C-25
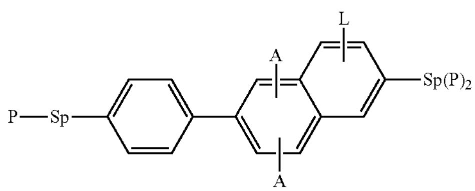
I4C-26
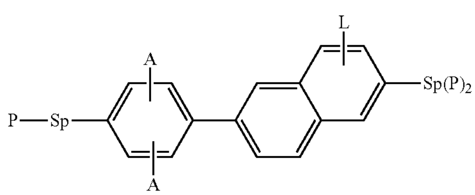
I4C-27
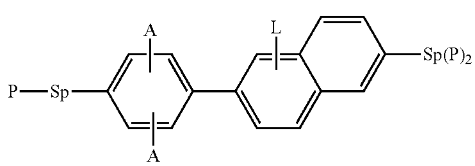
I4C-28
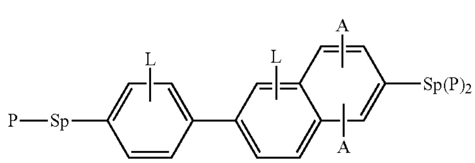
I4C-29
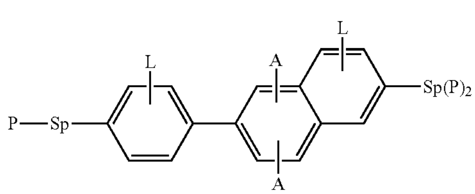
-continued
I4C-30
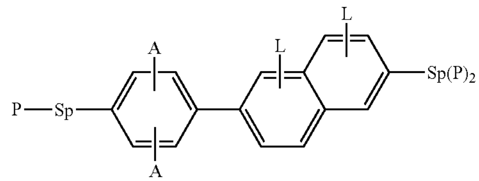
I4D-1
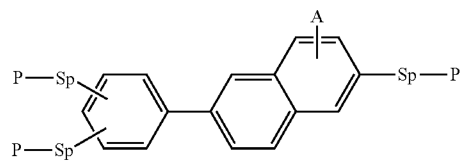
I4D-2
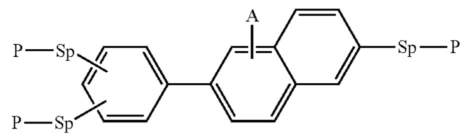
I4D-3
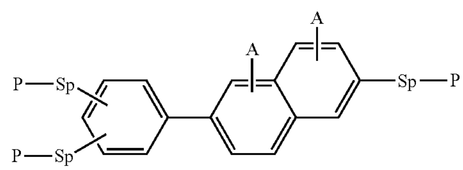
I4D-4
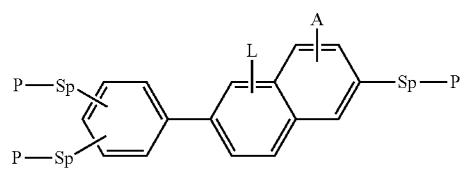
I4D-5
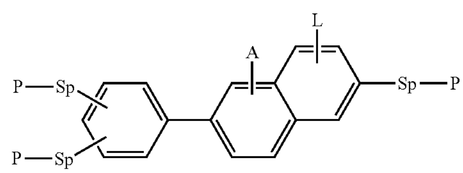
I4D-6
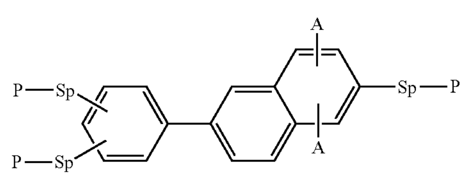
I4D-7
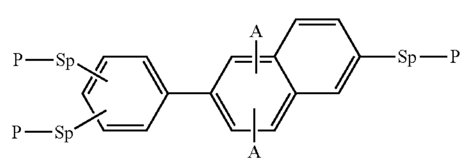
I4D-8
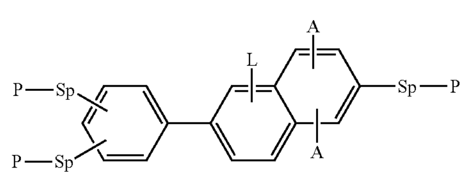

-continued
I4D-9
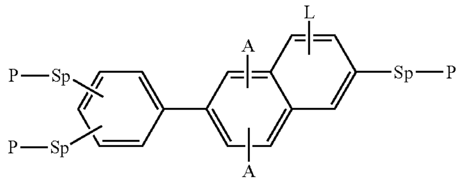
I4E-1
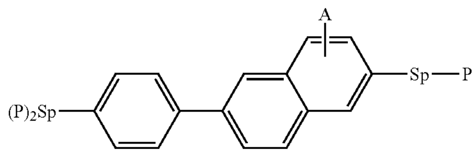
I4E-2
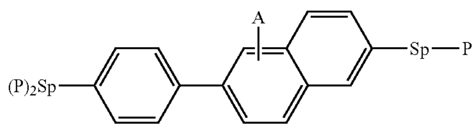
I4E-3
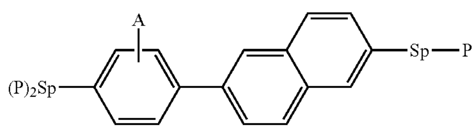
I4E-4
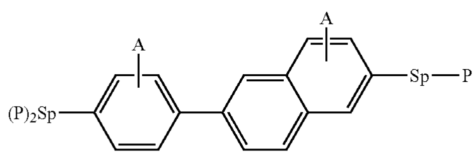
I4E-5
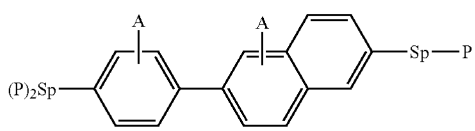
I4E-6
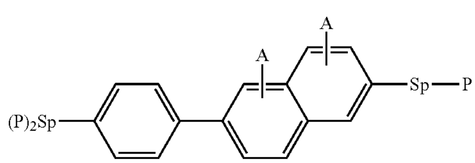
I4E-7
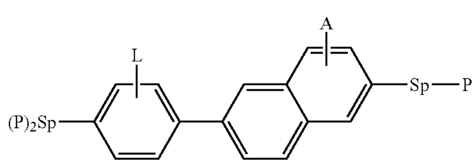
I4E-8
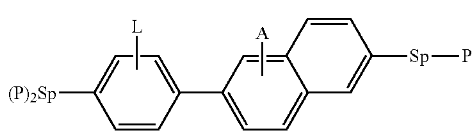
I4E-9
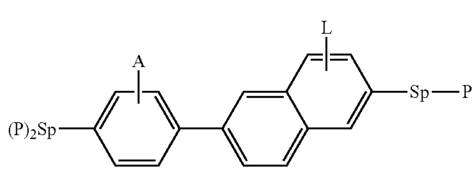
-continued
I4E-10
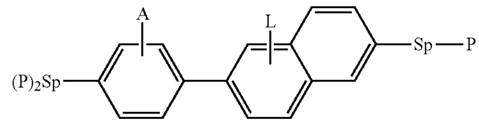
I4E-11
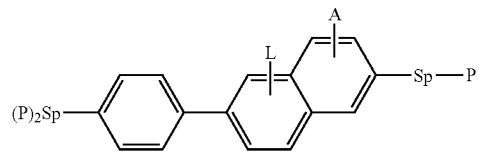
I4E-12
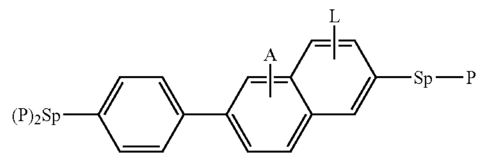
I4E-13
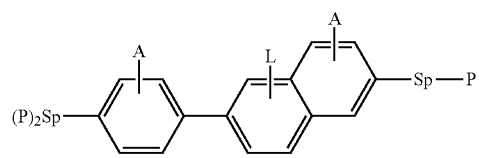
I4E-14
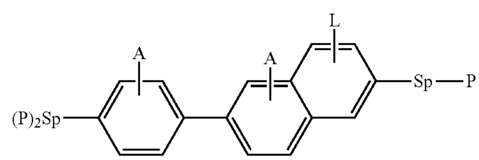
I4E-15
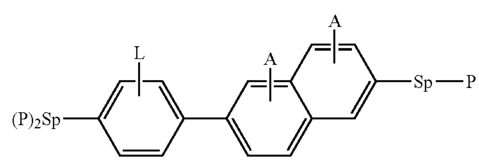
I4E-16
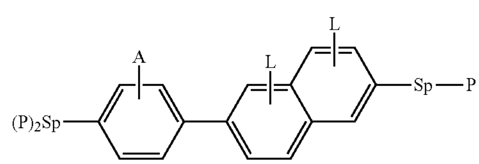
I4E-17
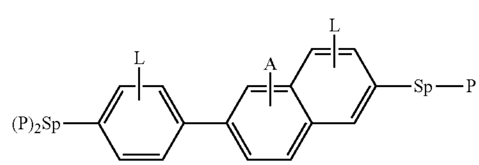
I4E-18
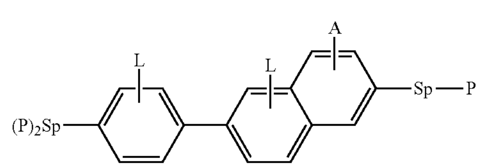

-continued
I4E-19
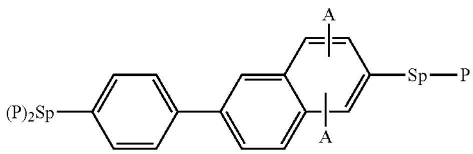
I4E-20
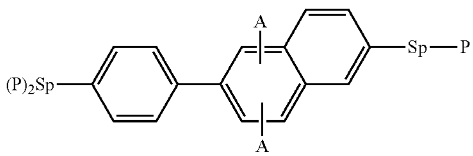
I4E-21
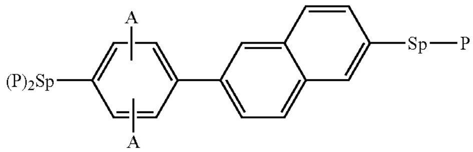
I4E-22
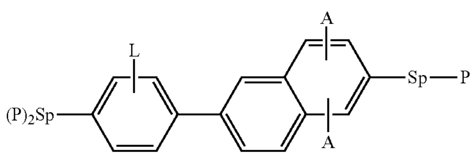
I4E-23
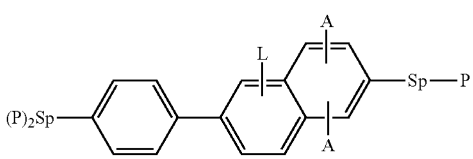
I4E-24
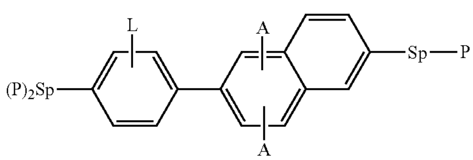
I4E-25
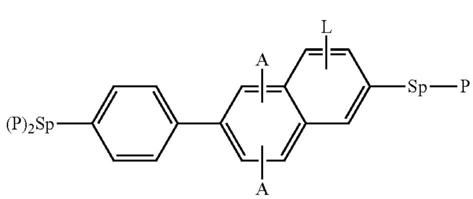
I4E-26
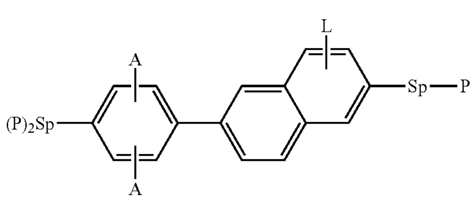
-continued
I4E-27
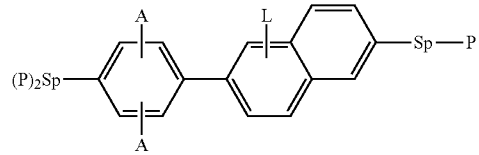
I4E-28
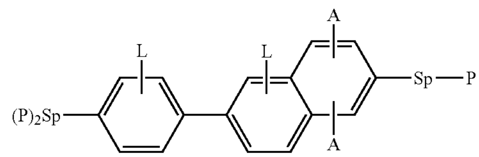
I4E-29
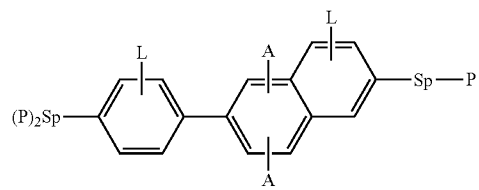
I4E-30
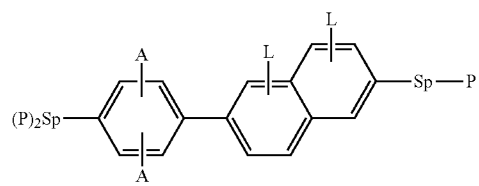
I5A-1
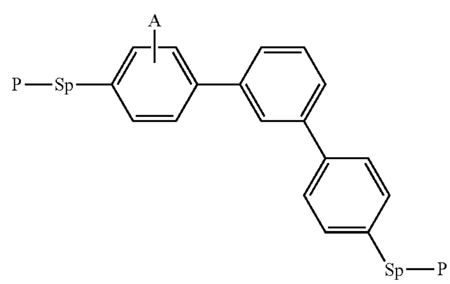
I5A-2
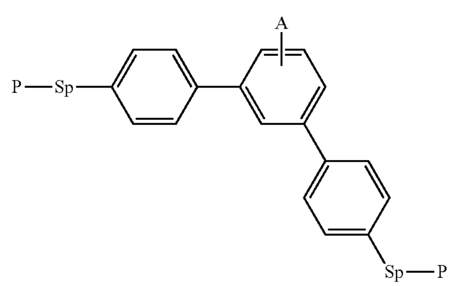
I5A-3
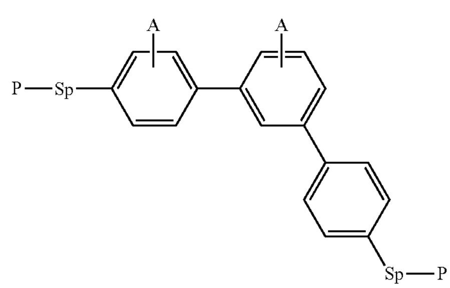

-continued
I5A-4
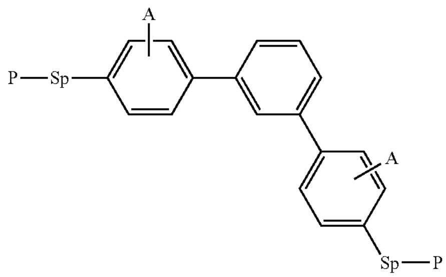
I5A-5
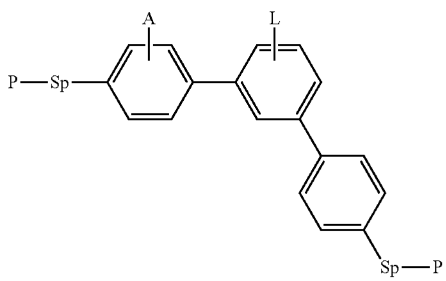
I5A-6
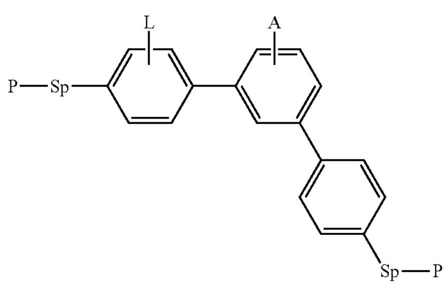
I5A-7
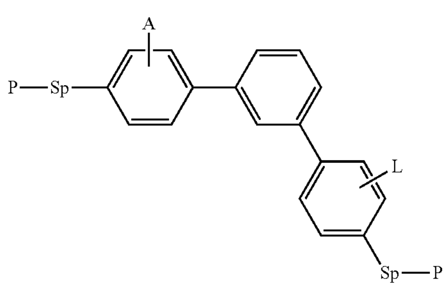
I5A-8
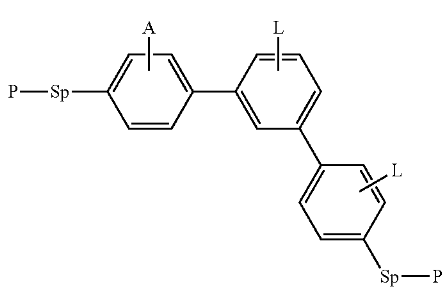
-continued
I5A-9
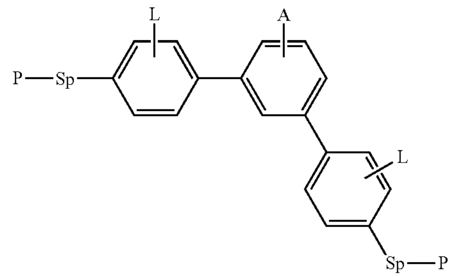
I5A-10
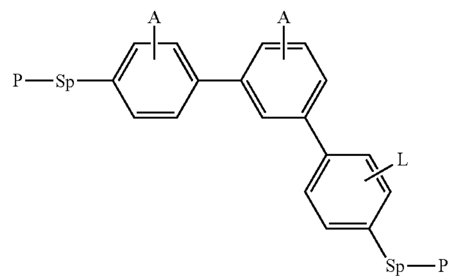
I5A-11
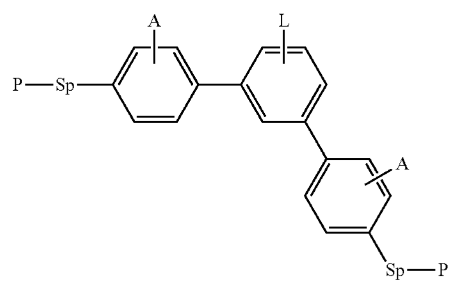
I5A-12
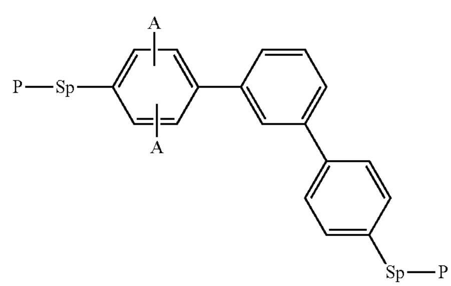
I5A-13
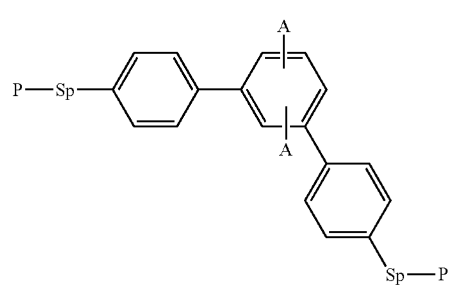

-continued
I5A-14
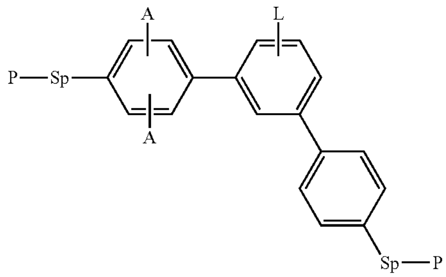
I5A-15
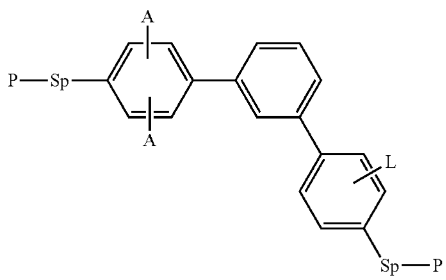
I5A-16
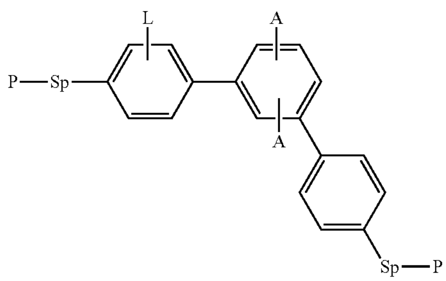
I5A-17
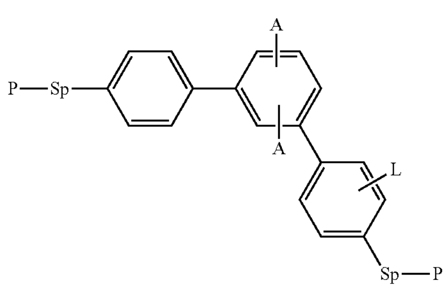
I5A-18
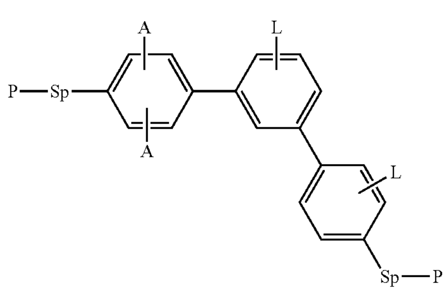
-continued
I5A-19
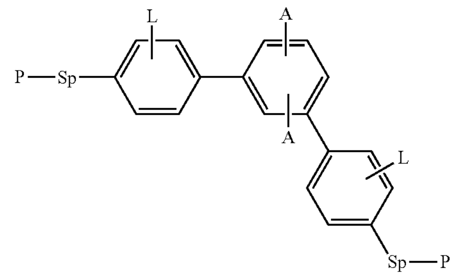
I5B-1
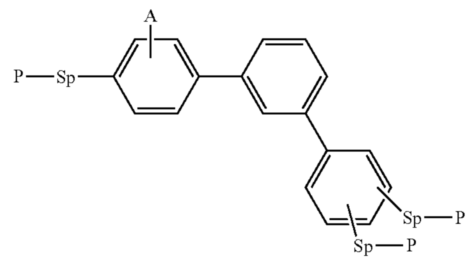
I5B-2
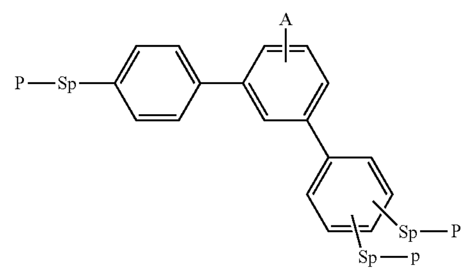
I5B-3
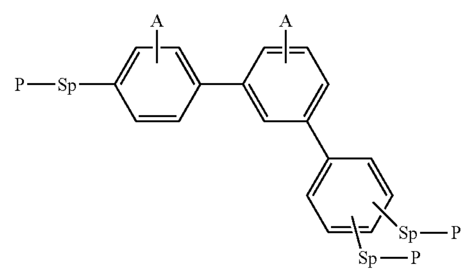
I5B-4
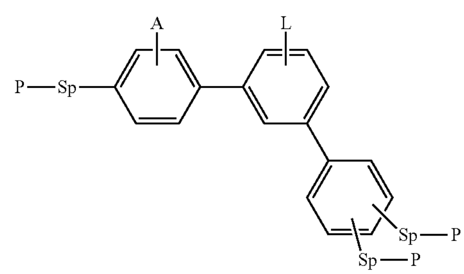
I5B-5
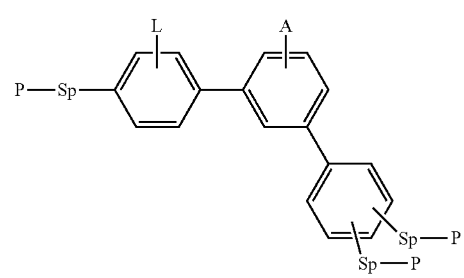

-continued
I5B-6
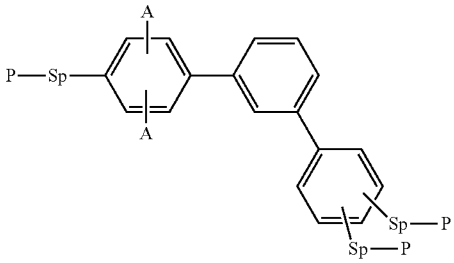
I5B-7
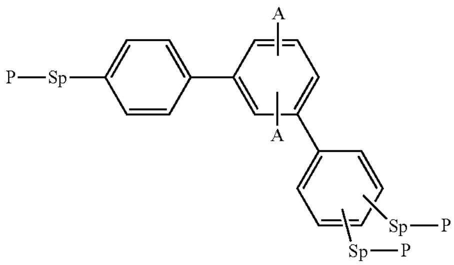
I5B-8
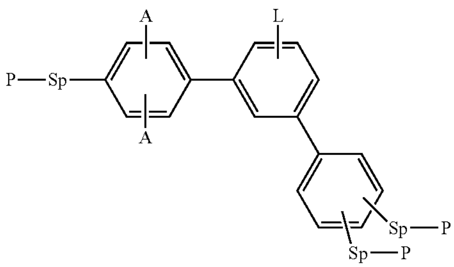
I5B-9
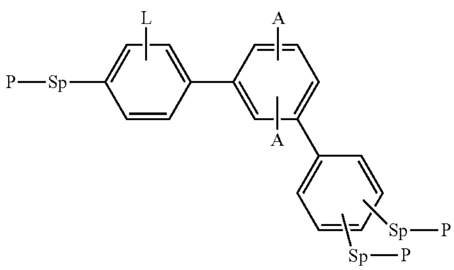
I5C-1
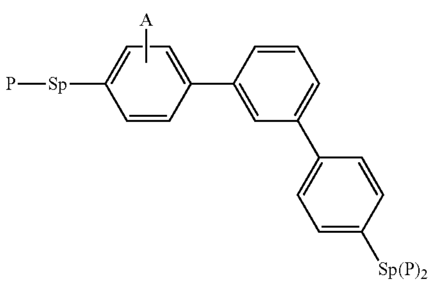
I5C-2
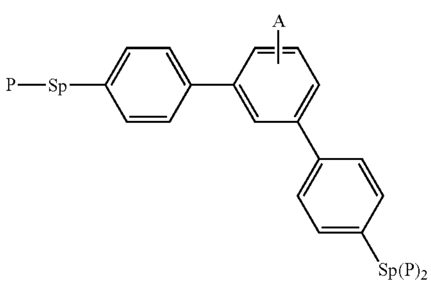
-continued
I5C-3
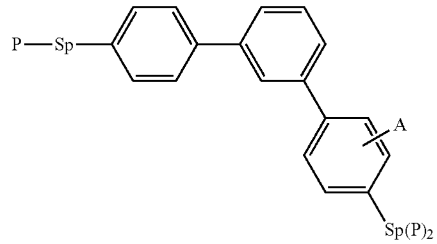
I5C-4
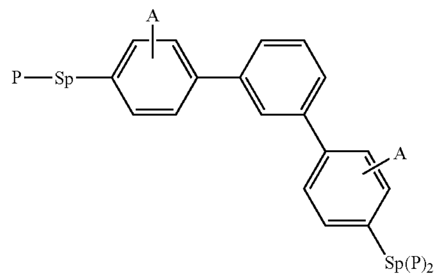
I5C-5
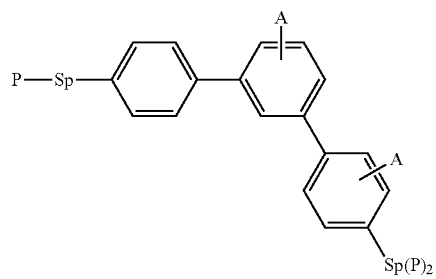
I5C-6
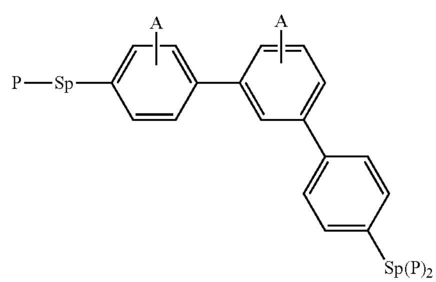
I5C-7
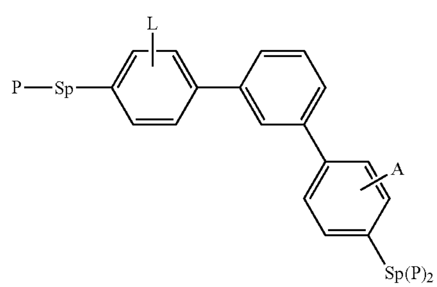

-continued
I5C-8
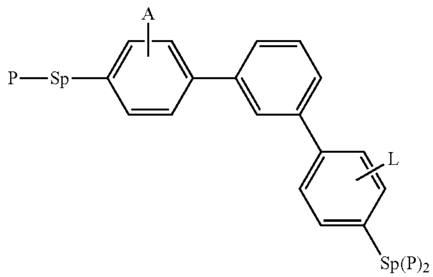
I5C-9
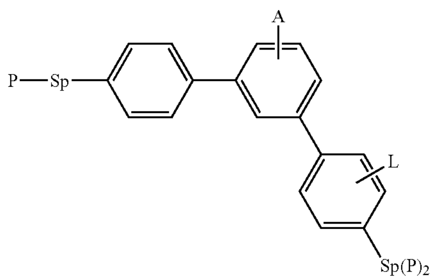
I5C-10
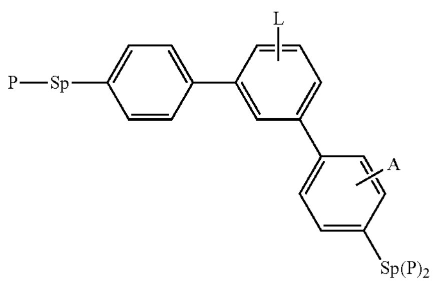
I5C-11
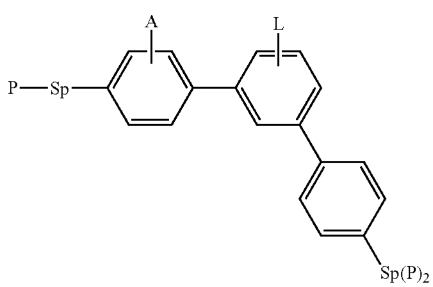
I5C-12
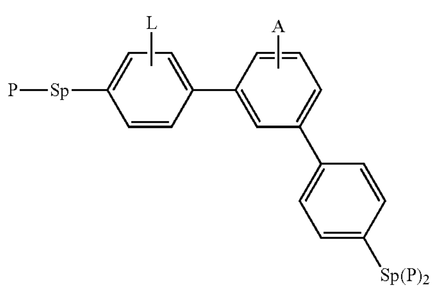
-continued
I5C-13
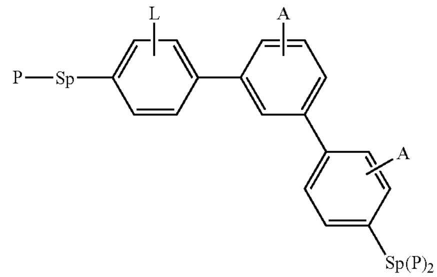
I5C-14
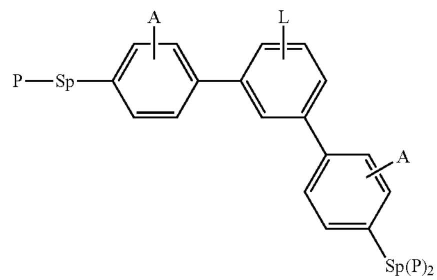
I5C-15
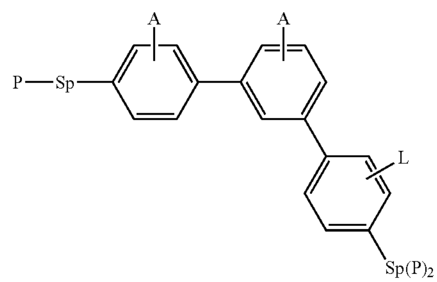
I5C-16
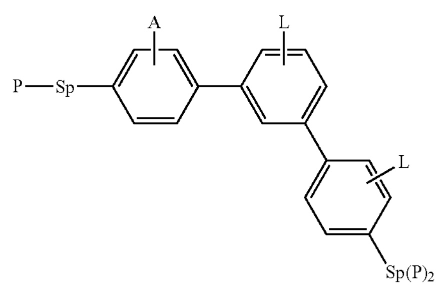
I5C-17
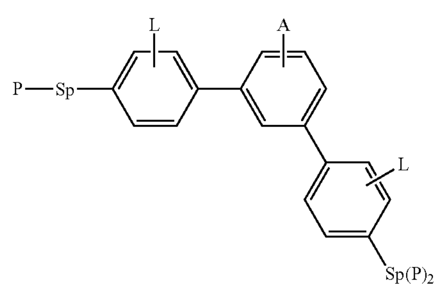

-continued
I5C-18
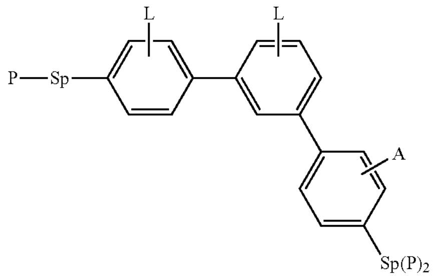
I5C-19
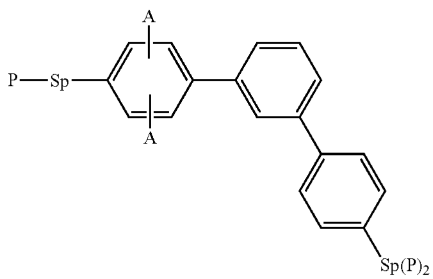
I5C-20
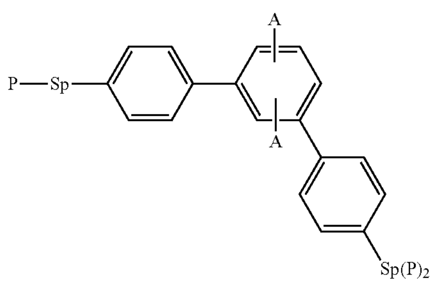
I5C-21
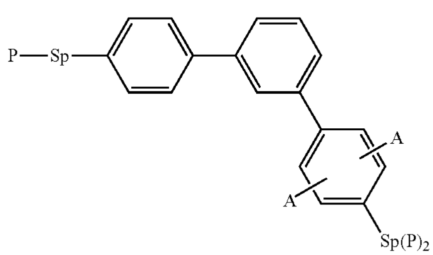
I5C-22
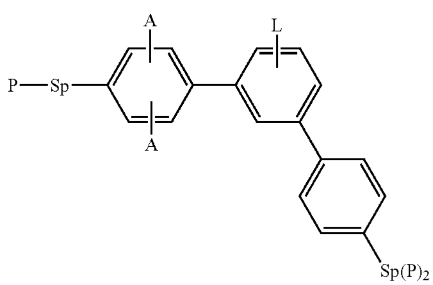
-continued
I5C-23
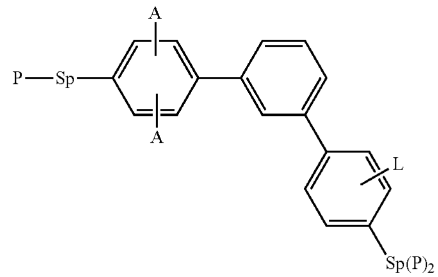
I5C-24
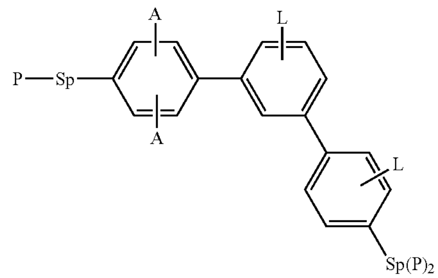
I5C-25
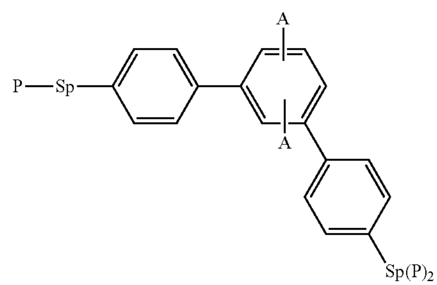
I5C-26
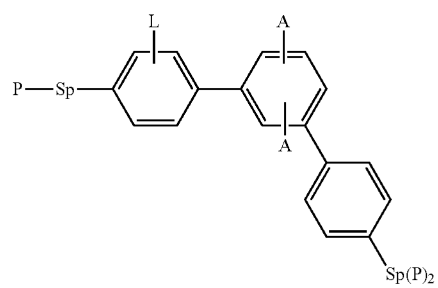
I5C-27
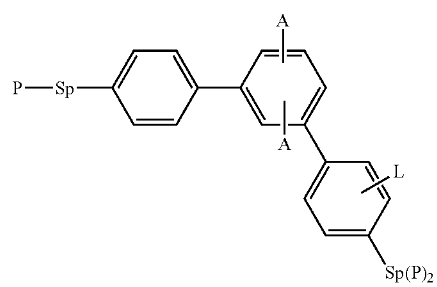

-continued
I5C-28
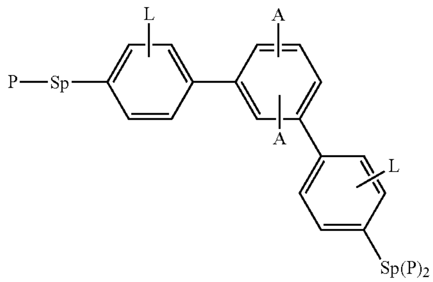
I5D-1
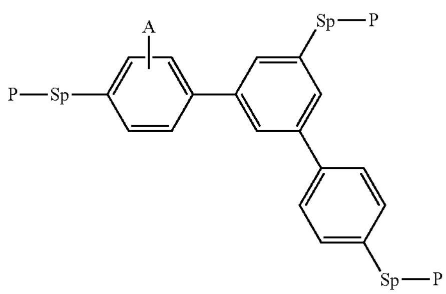
I5D-2
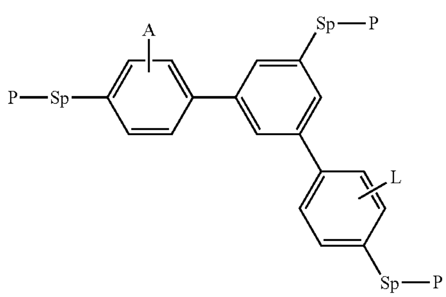
I5D-3
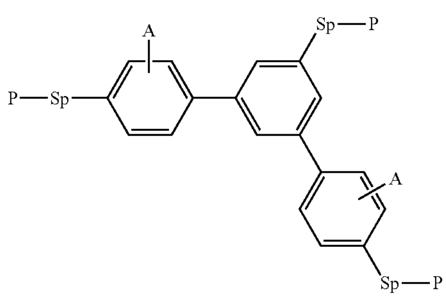
I5D-4
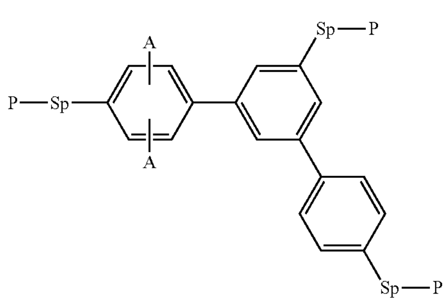
-continued
I5D-5
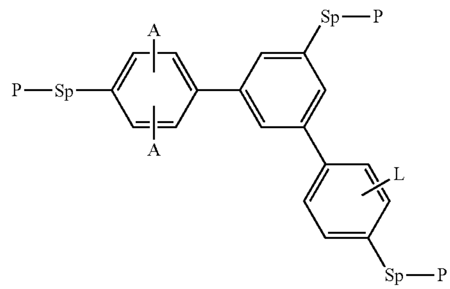
I6A-1
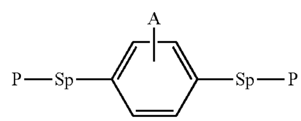
IA6-2
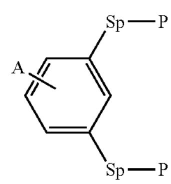
IA6-3
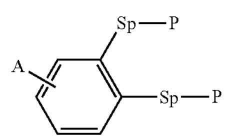
I6A-4
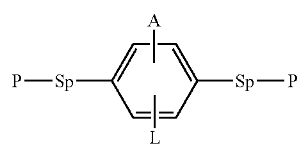
IA6-5
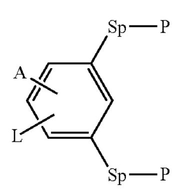
IA6-6
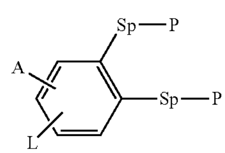
IA6-7
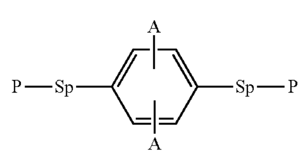
IA6-8
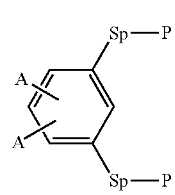

-continued

IA6-9

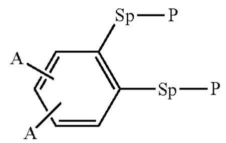

I6B-10

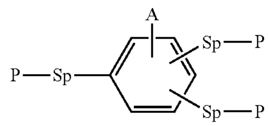

I6B-12

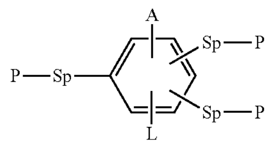

I6B-12

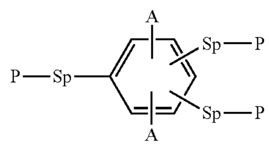

I6C-1

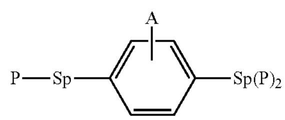

I6C-2

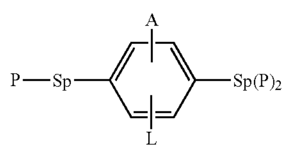

I6C-3

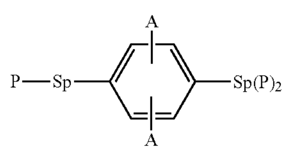

wherein P, Sp, $Sp(P)_2$, A and L have the meanings given in formula I or one of the preferred meanings as given above and below, L is preferably F, Cl or CN, and A is preferably $—CH{=}CH_2$, $—CH_2—CH{=}CH_2$, $—CH{=}CH—CH_3$, $—CH{=}CH—CH{=}CH_2$ or $—C(CH_3){=}CH_2$.

Further preferred compounds of formula I, I1 to I6, I*A to I*D, I1A to I6C and I1A-1 to I6C-3 are selected from the following subformulae:

I1A-1-1

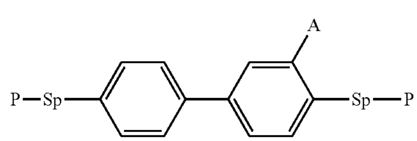

I1A-1-2

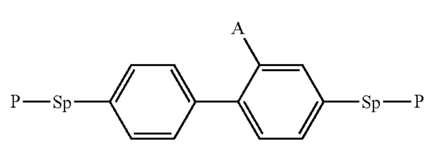

-continued

I1A-2-1

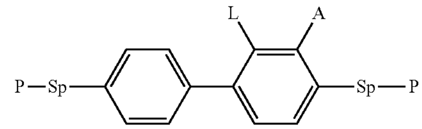

I1A-2-2

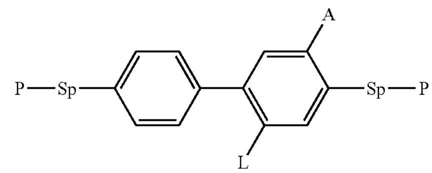

I1A-2-3

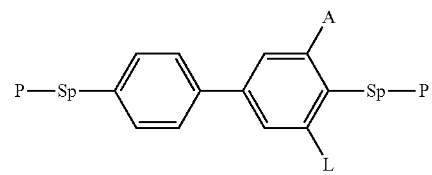

I1A-2-4

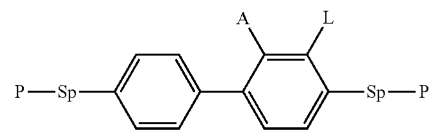

I1A-2-5

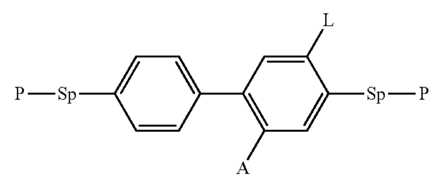

I1A-2-6

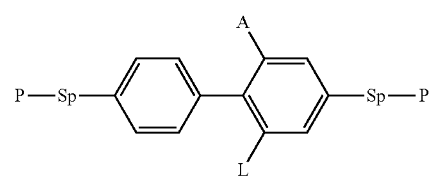

I1A-3-1

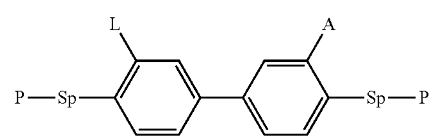

I1A-3-2

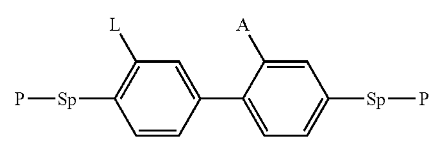

I1A-3-3

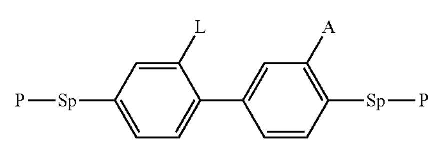

I1A-3-4

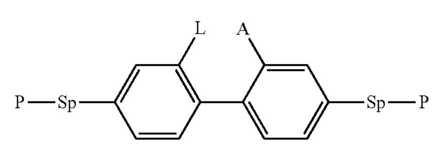

-continued
I1A-4-1
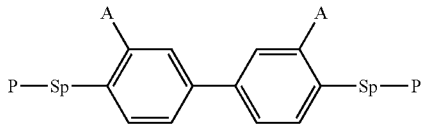
I1A-4-2
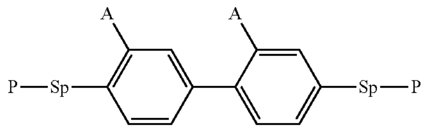
I1A-4-3
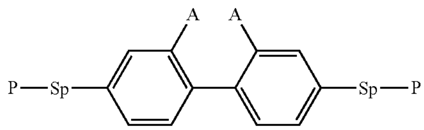
I1A-5-1
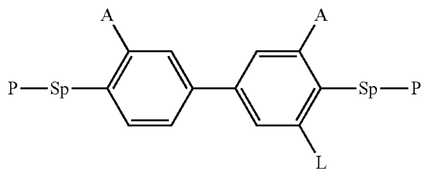
I1A-5-2
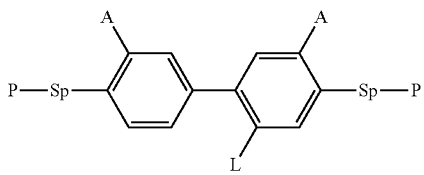
I1A-5-3
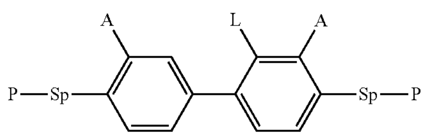
I1A-6-1
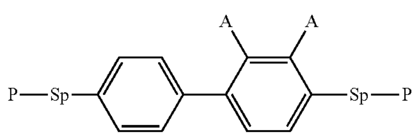
I1A-6-2
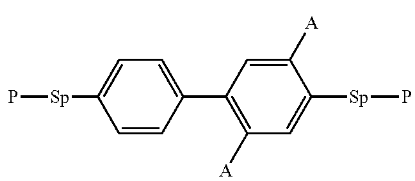
I1A-6-3
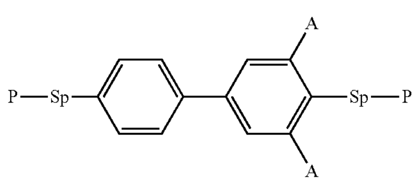
I1A-7-1
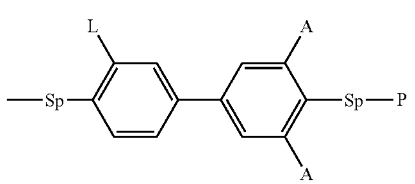
-continued
I1A-7-2
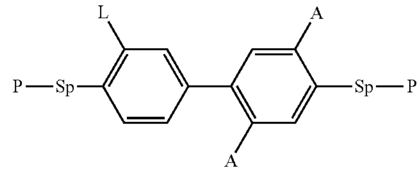
I1A-7-3
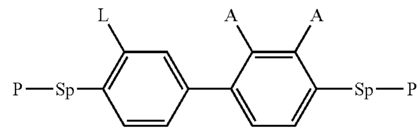
I1B-1-1
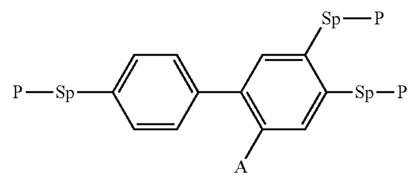
I1B-1-2
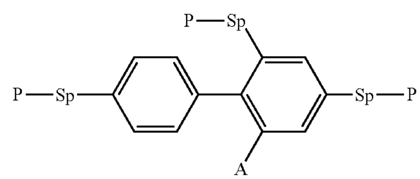
I1B-2-1
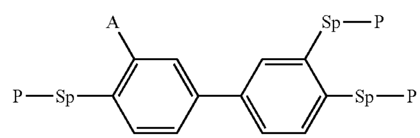
I1B-2-2
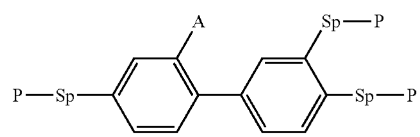
I1B-2-3
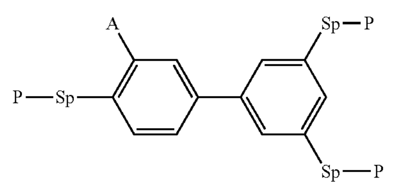
I1B-2-4
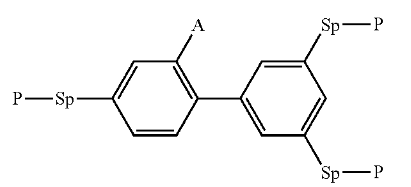
I1B-2-5
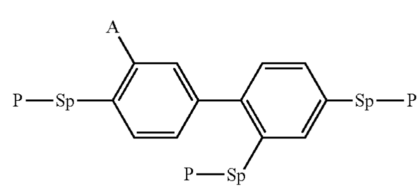

-continued
I1B-2-6
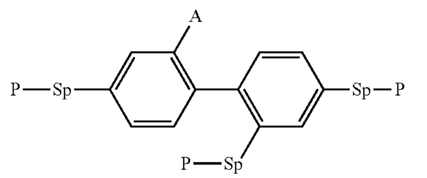
I1B-3-1
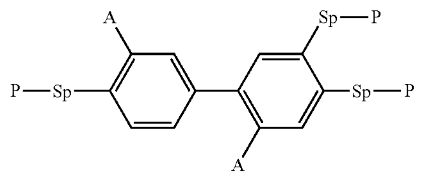
I1B-3-2
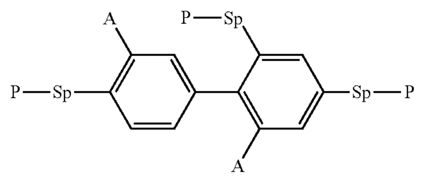
I1B-4-1
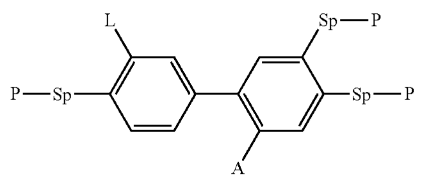
I1B-4-2
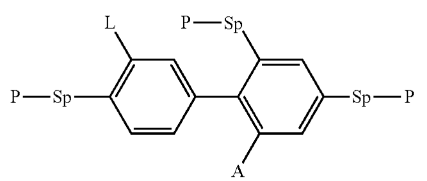
I1B-5-1
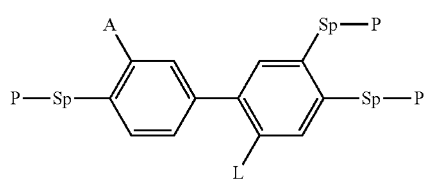
I1B-5-2
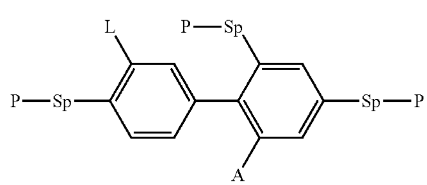
I1B-6-1
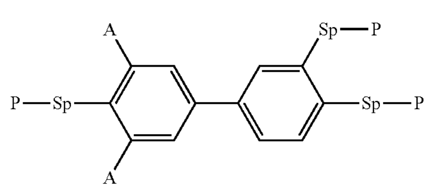
I1B-6-2
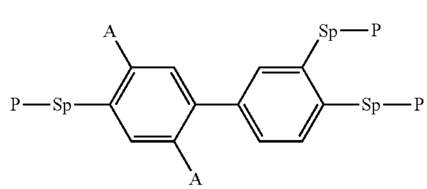
-continued
I1B-6-3
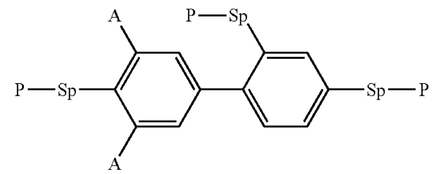
I1B-6-4
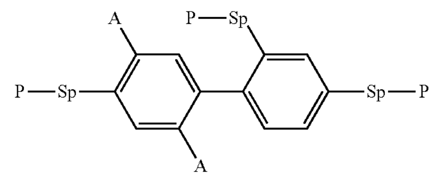
I1B-7-1
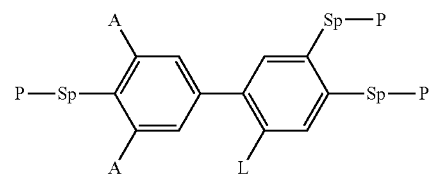
I1B-7-2
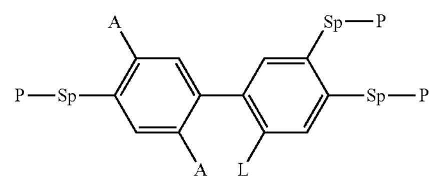
I1B-7-3
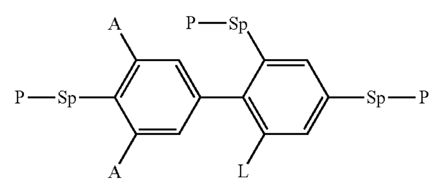
I1B-7-4
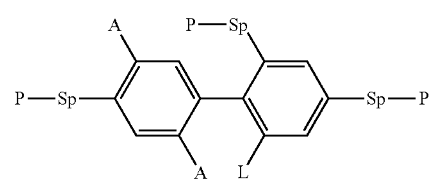
I1B-8-1
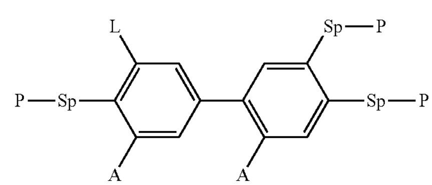
I1B-8-2
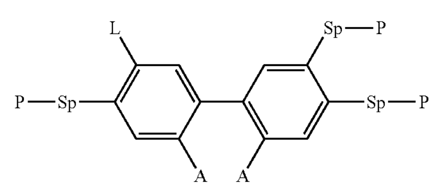
I1B-8-3
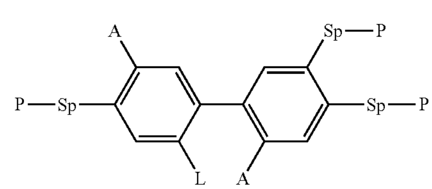

-continued
I1B-8-4
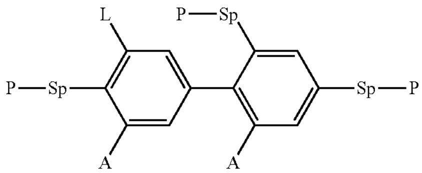
I1B-8-5
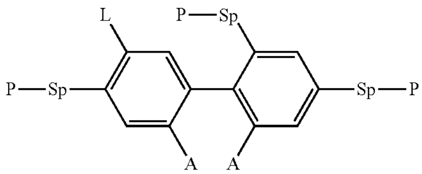
I1B-8-6
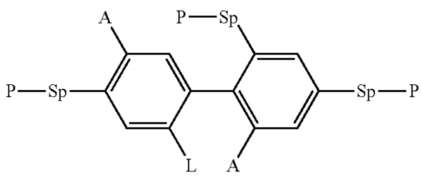
I1C-1-1
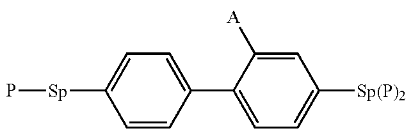
I1C-1-2
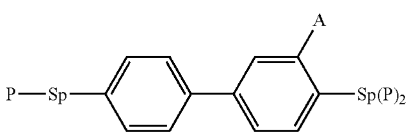
I1C-2-1
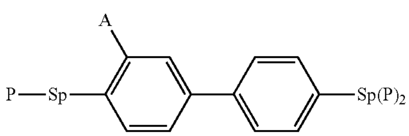
I1C-2-2
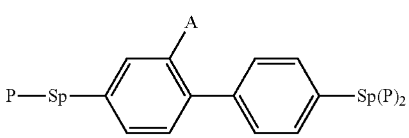
I1C-3-1
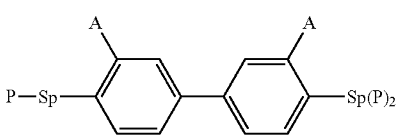
I1C-3-2
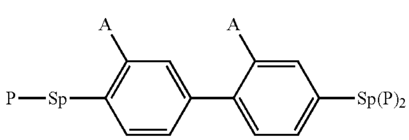
I1C-3-3
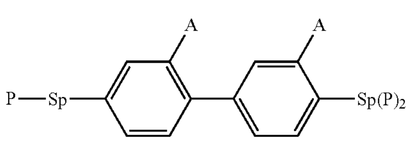
-continued
I1C-3-4
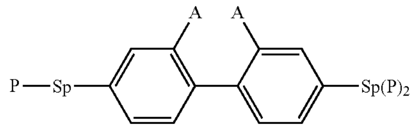
I1C-4-1
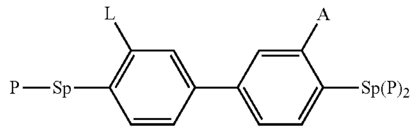
I1C-4-2
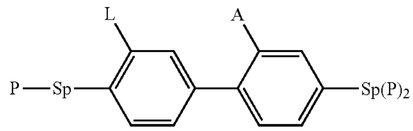
I1C-4-3
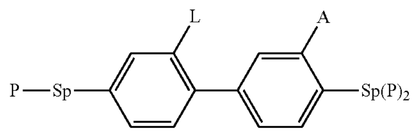
I1C-4-4
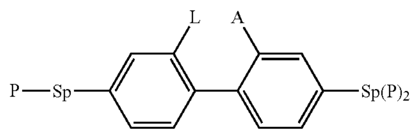
I1C-5-1
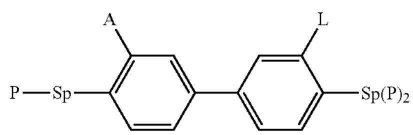
I1C-5-2
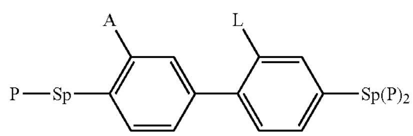
I1C-5-3
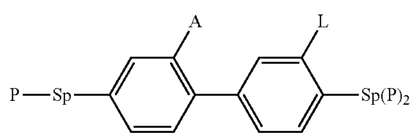
I1C-5-4
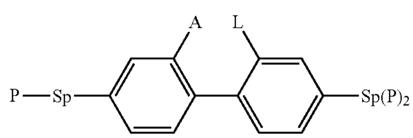
I1C-6-1
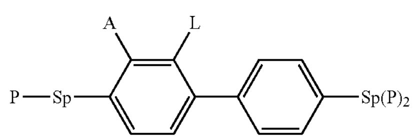
I1C-6-2
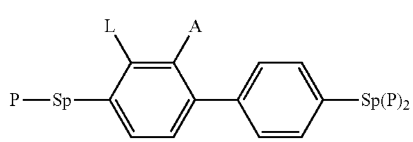

-continued
I1C-6-3
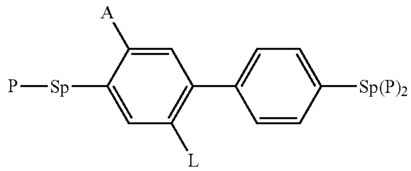
I1C-7-1
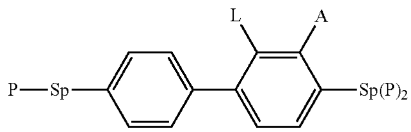
I1C-7-2
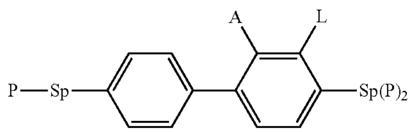
I1C-7-3
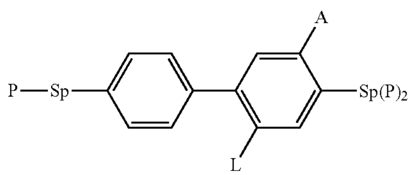
I1C-8-1
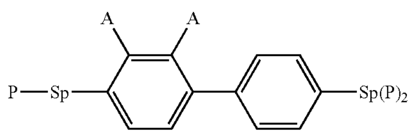
I1C-8-2
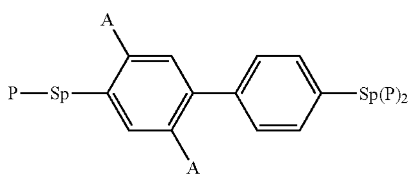
I1C-8-3
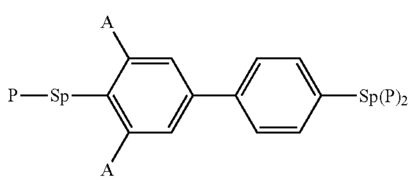
I1C-9-1
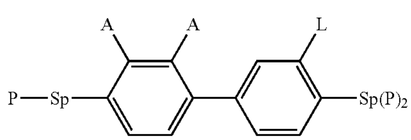
I1C-9-2
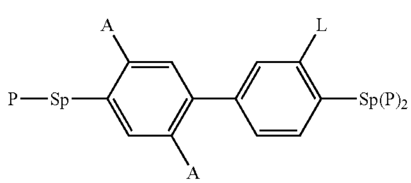
I1C-9-3
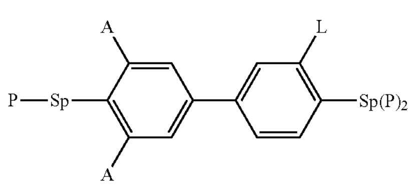
-continued
I1C-10-1
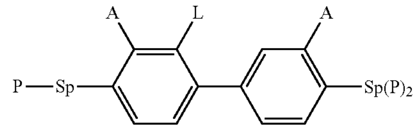
I1C-10-2
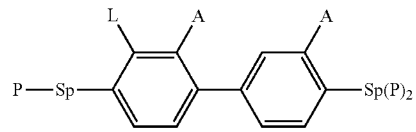
I1C-10-3
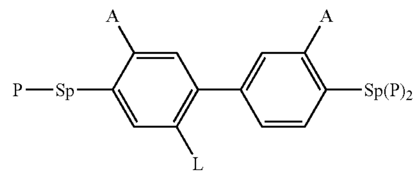
I1C-11-1
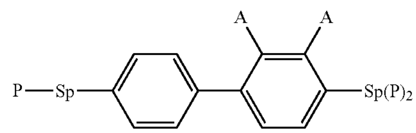
I1C-11-2
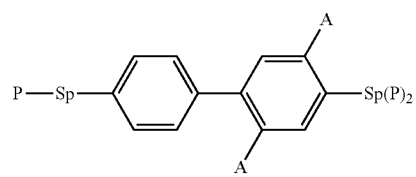
I1C-11-3
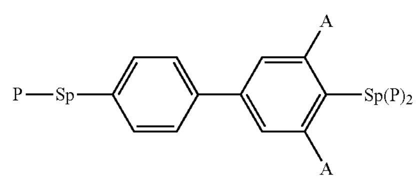
I1C-12-1
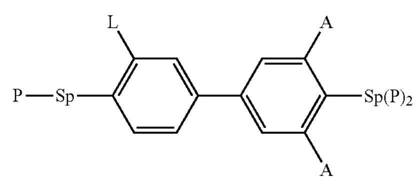
I1C-12-2
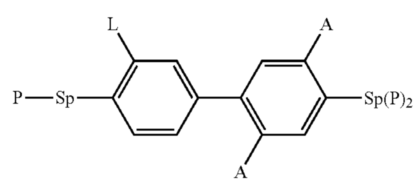
I1C-12-3
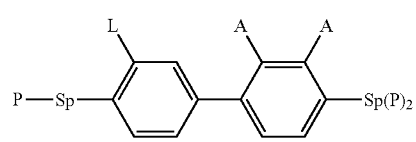
I1C-13-1
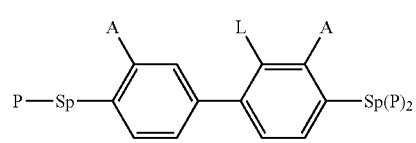

-continued
I1C-13-2
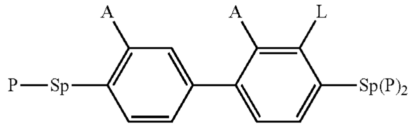
I1C-13-3
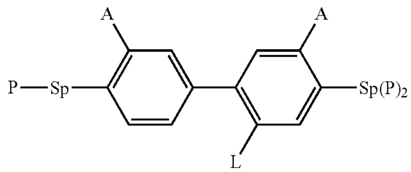
I1D-1-1
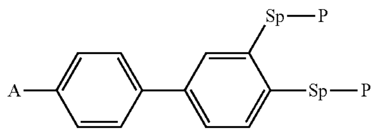
I1D-1-2
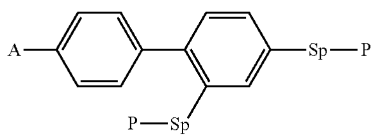
I1D-1-3
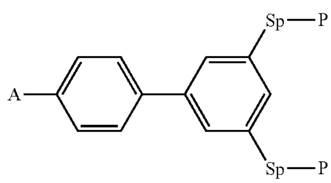
I1D-2-1
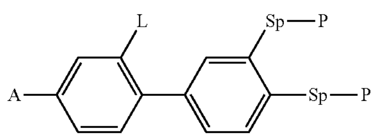
I1D-2-2
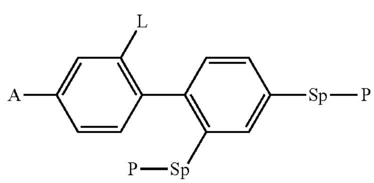
I1D-2-3
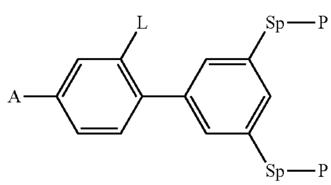
I2A-1-1
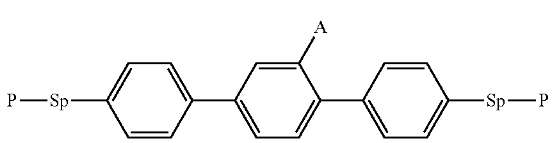
I2A-2-1
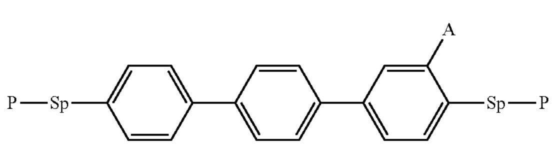
-continued
I2A-2-2
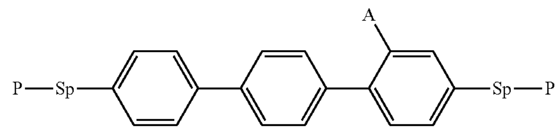
I2A-3-1
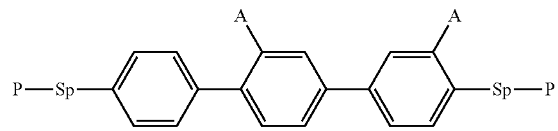
I2A-3-2
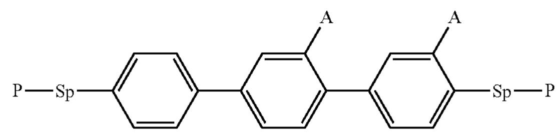
I2A-3-3
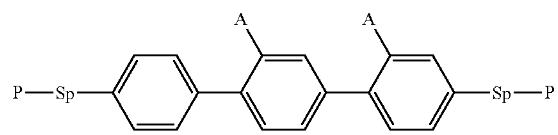
I2A-3-4
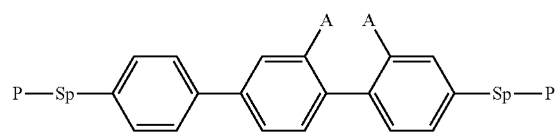
I2A-4-1
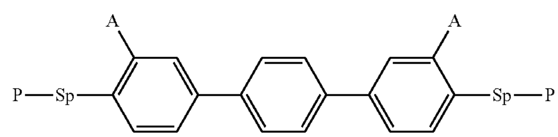
I2A-4-2
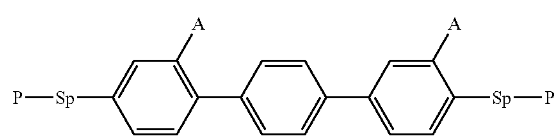
I2A-4-3
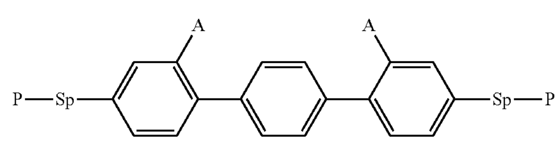
I2A-5-1
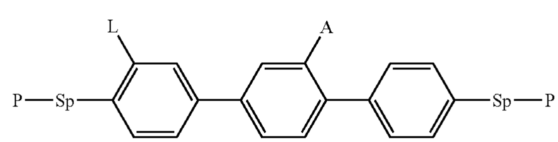
I2A-5-2
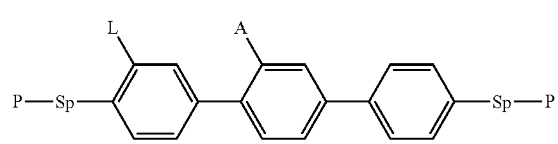

-continued
I2A-5-3
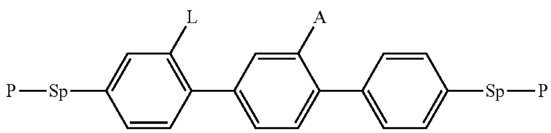
I2A-5-4
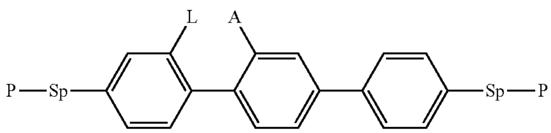
I2A-6-1
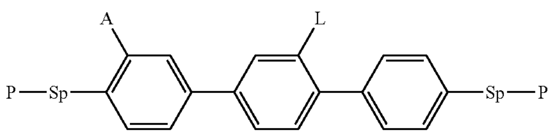
I2A-6-2
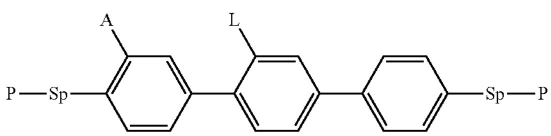
I2A-6-3
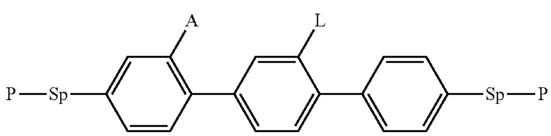
I2A-6-4
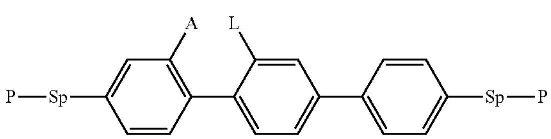
I2A-7-1
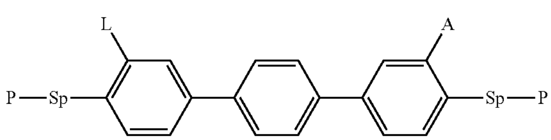
I2A-7-2
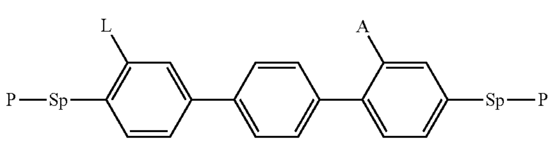
I2A-7-3
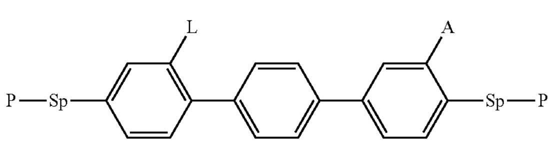
I2A-7-4
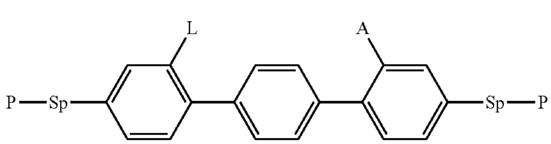
-continued
I2A-8-1
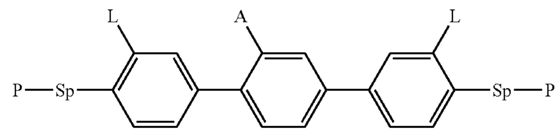
I2A-8-2
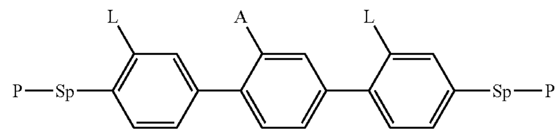
I2A-9-1
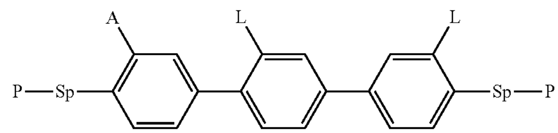
I2A-9-2
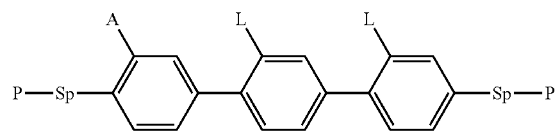
I2A-9-3
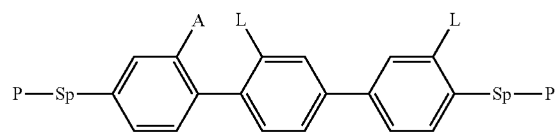
I2A-9-4
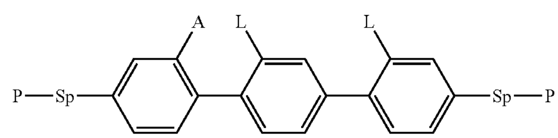
I2A-10-1
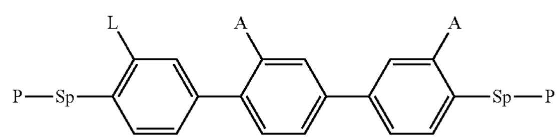
I2A-10-2
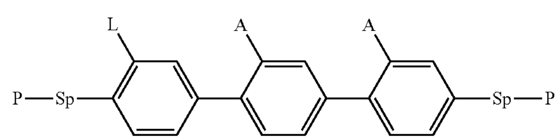
I2A-10-3
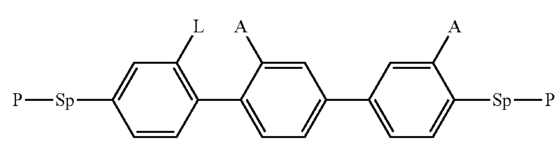
I2A-10-4
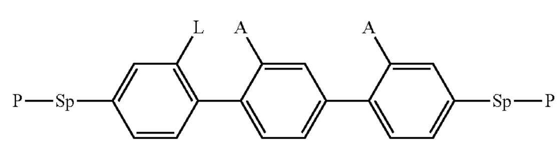

-continued
I2A-11-1
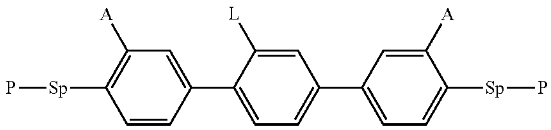
I2A-11-2
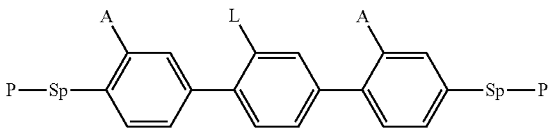
I2A-12-1
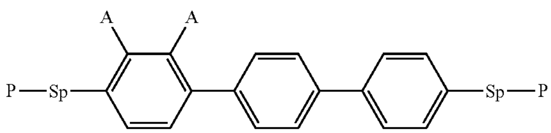
I2A-12-2
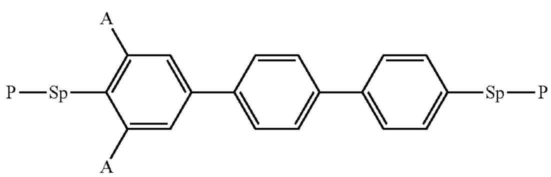
I2A-12-3
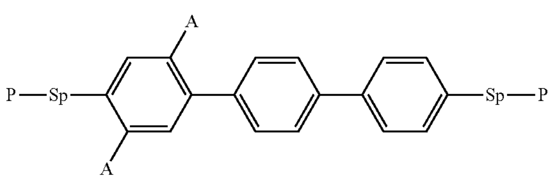
I2A-13-1
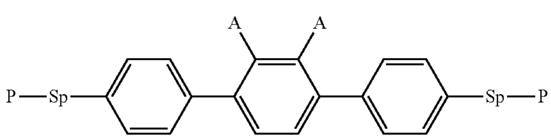
I2A-13-2
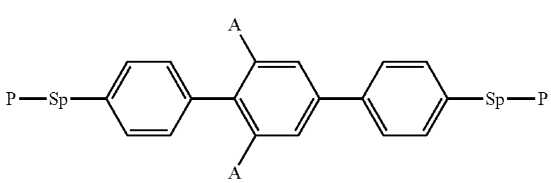
I2A-13-3
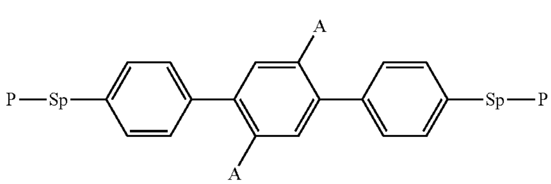
I2A-14-1
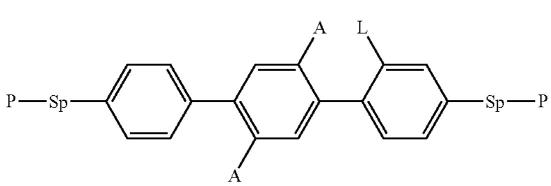
-continued
I2A-14-2
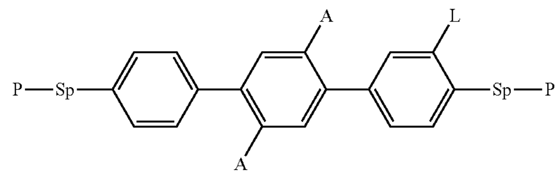
I2A-14-3
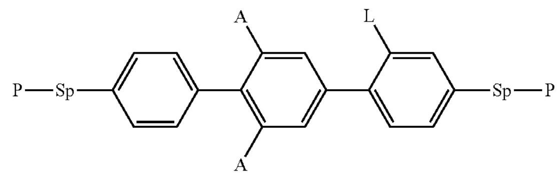
I2A-14-4
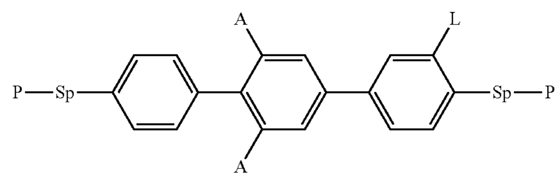
I2A-15-1
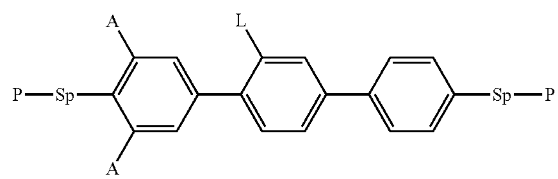
I2A-15-2
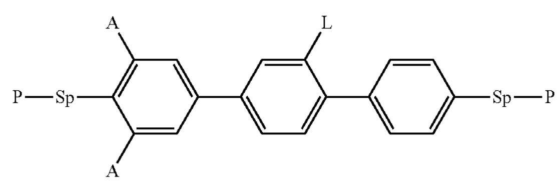
I2A-15-3
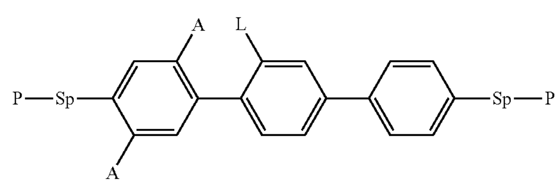
I2A-15-4
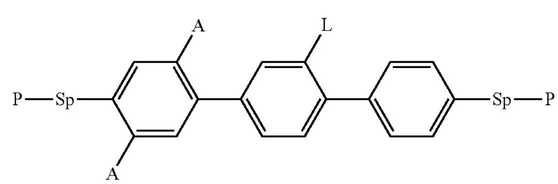
I2A-16-1
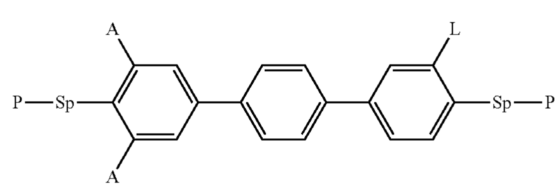

-continued
I2A-16-2
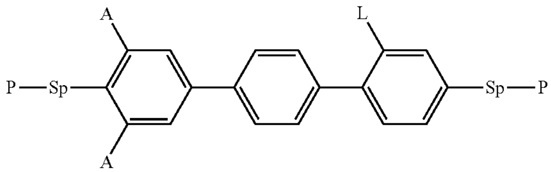
I2A-16-3
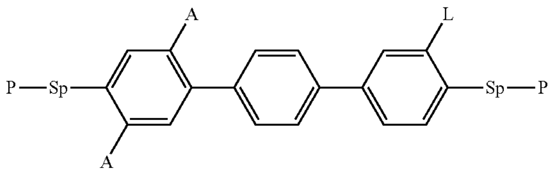
I2A-16-4
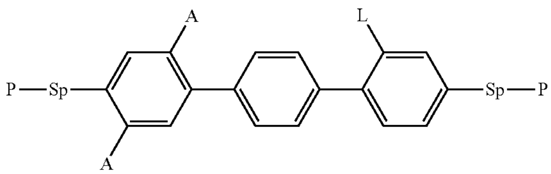
I2A-17-1
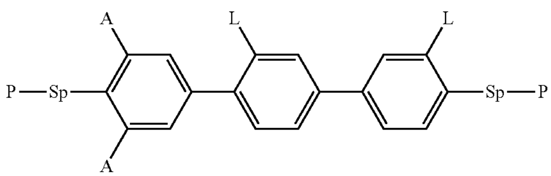
I2A-17-2
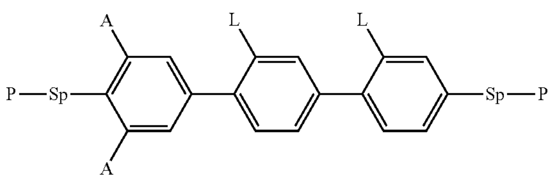
I2A-17-3
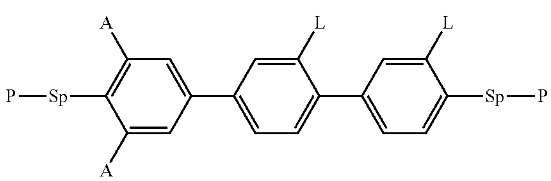
I2A-17-4
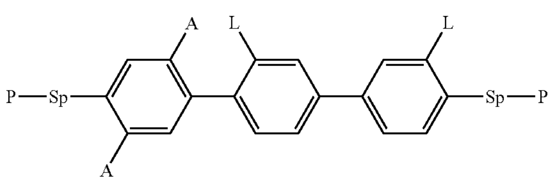
I2A-17-5
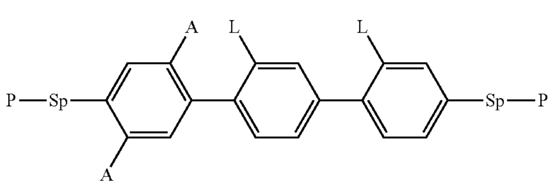
-continued
I2A-17-6
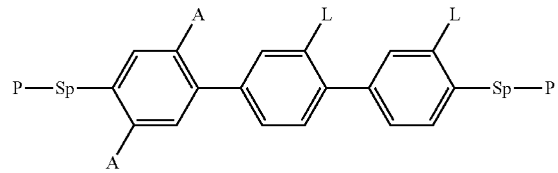
I2A-18-1
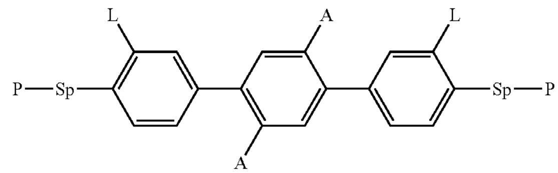
I2A-18-2
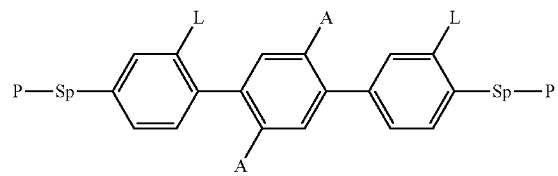
I2B-1-1
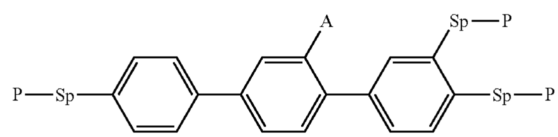
I2B-1-2
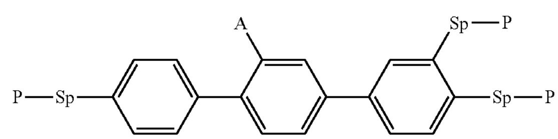
I2B-1-3
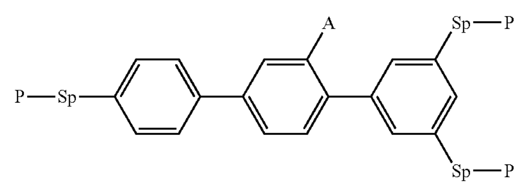
I2B-1-4
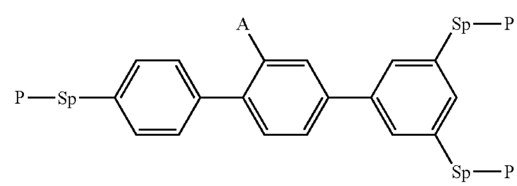
I2B-1-5
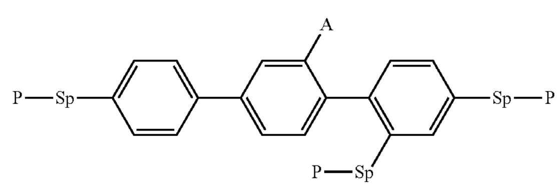

-continued
I2B-1-6
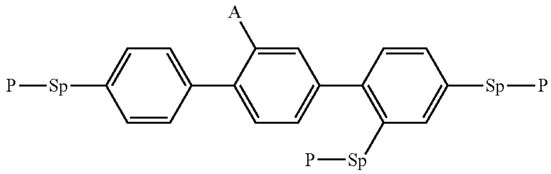
I2B-3-1
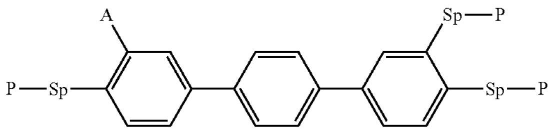
I2B-3-2
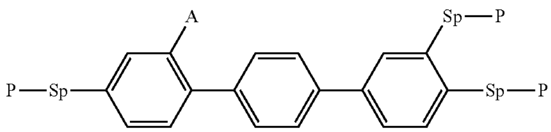
I2B-3-3
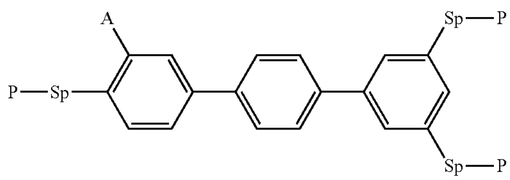
I2B-3-4
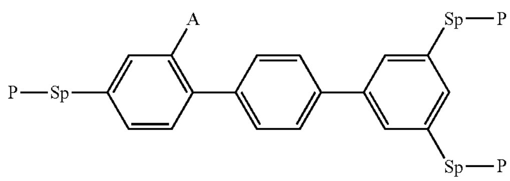
I2B-3-5
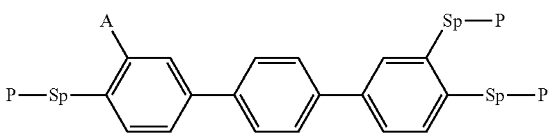
I2B-3-6
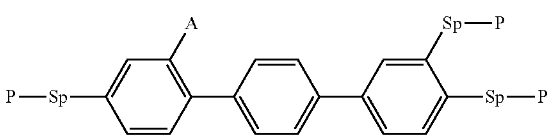
I2B-5-1
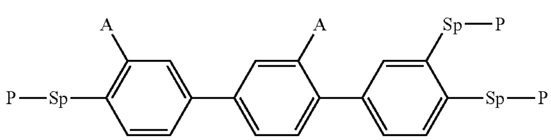
I2B-5-2
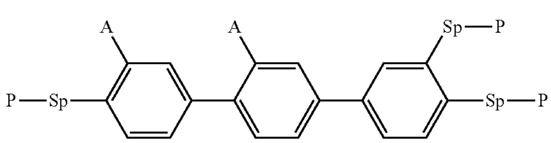
-continued
I2B-5-3
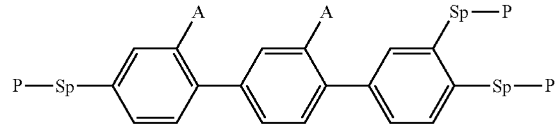
I2B-5-4
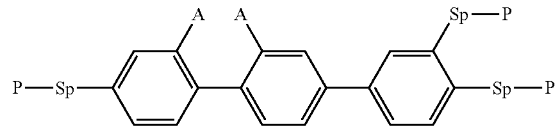
I2B-5-5
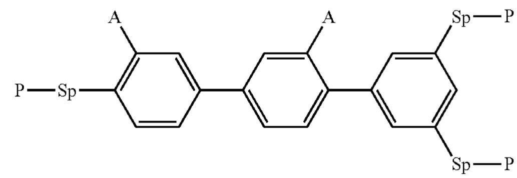
I2B-5-6
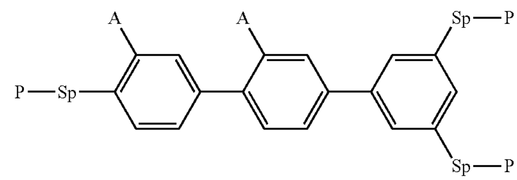
I2B-5-7
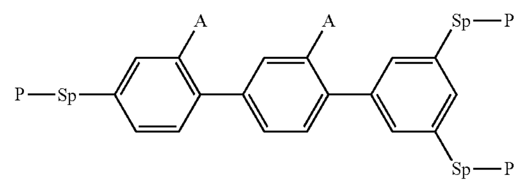
I2B-5-8
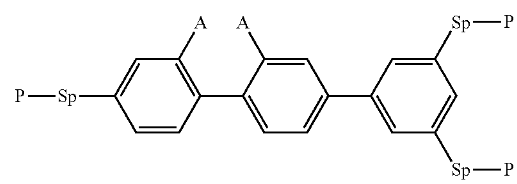
I2B-5-9
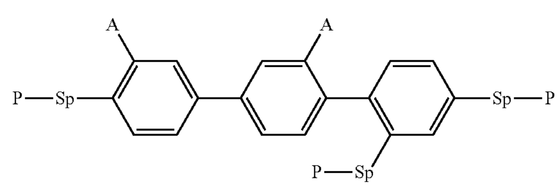
I2B-5-10
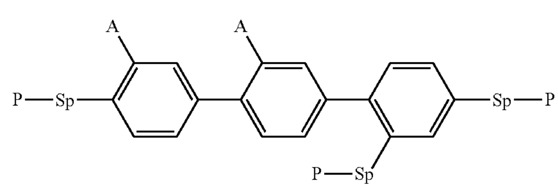

-continued
I2B-5-11
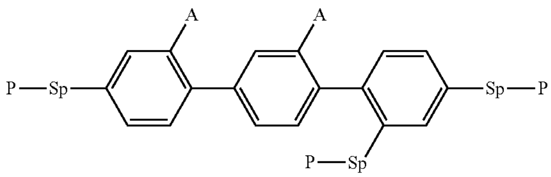
I2B-5-12
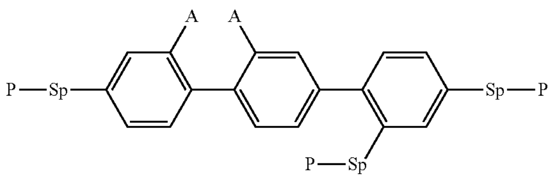
I2B-7-1
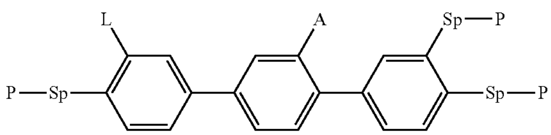
I2B-7-2
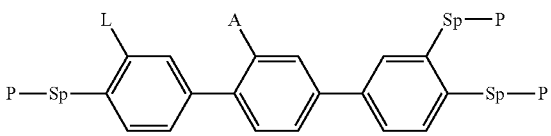
I2B-7-3
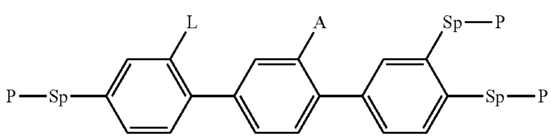
I2B-7-4
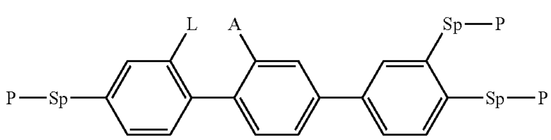
I2B-7-5
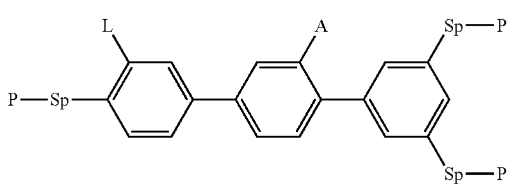
I2B-7-6
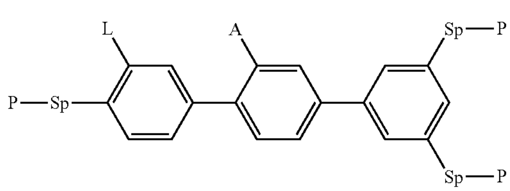
-continued
I2B-7-7
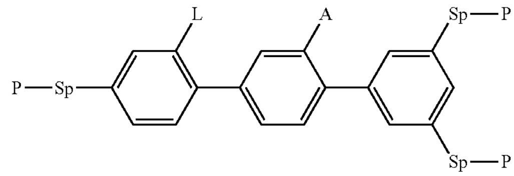
I2B-7-8
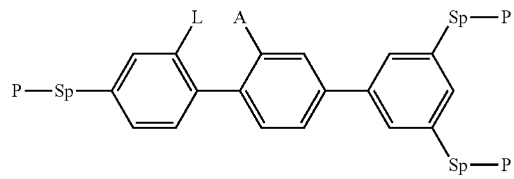
I2B-7-9
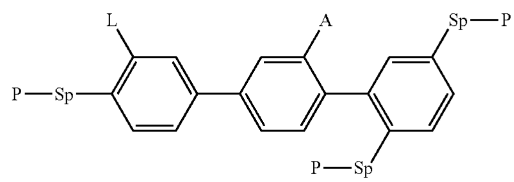
I2B-7-10
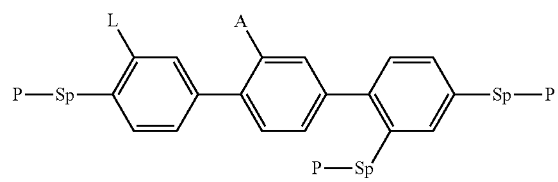
I2B-7-11
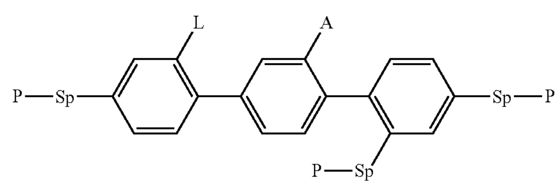
I2B-7-12
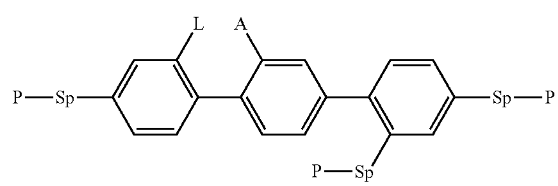
I2B-8-1
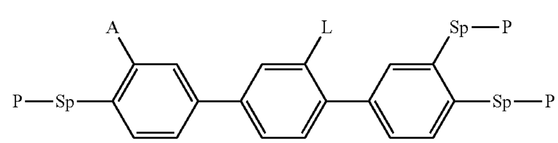
I2B-8-2
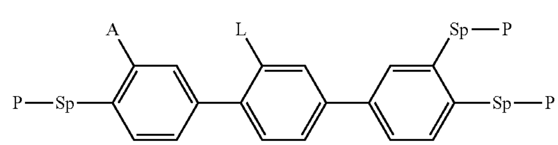

-continued
I2B-8-3
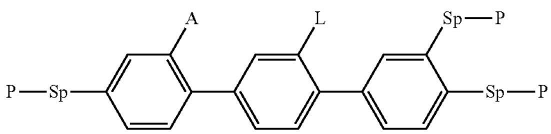
I2B-8-4
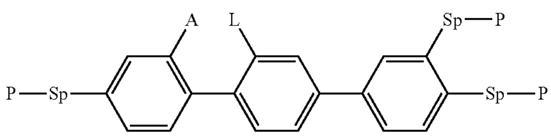
I2B-8-5
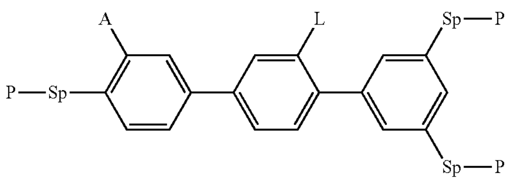
I2B-8-6
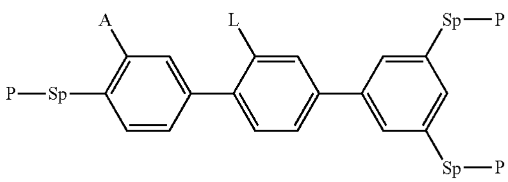
I2B-8-7
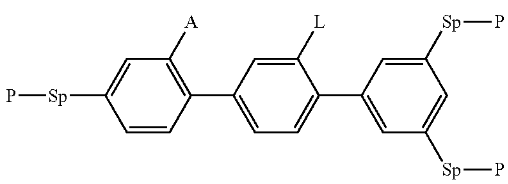
I2B-8-8
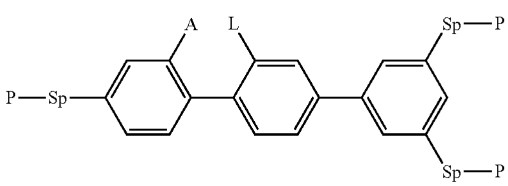
I2B-8-9
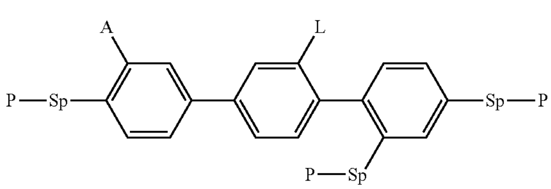
I2B-8-10
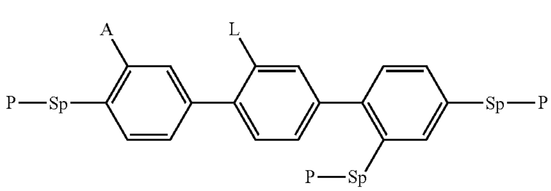
-continued
I2B-8-11
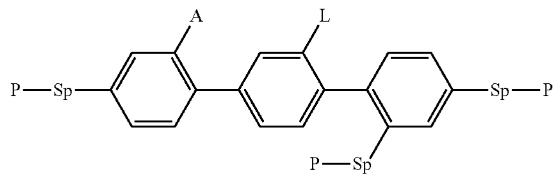
I2B-8-12
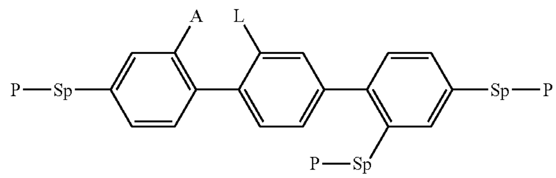
I2B-16-1
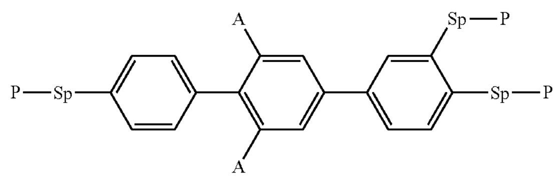
I2B-16-2
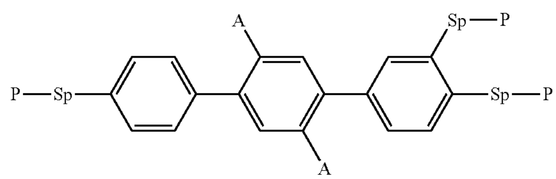
I2B-16-3
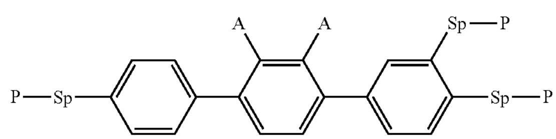
I2B-16-4
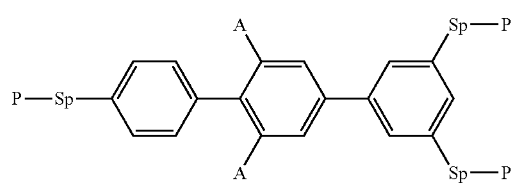
I2B-16-5
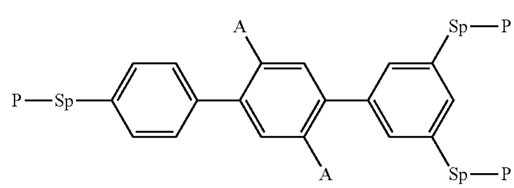
I2B-16-6
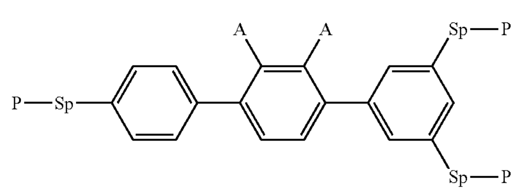

-continued
I2B-16-7
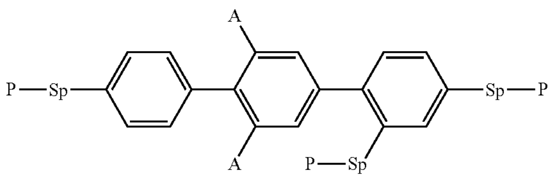
I2B-16-8
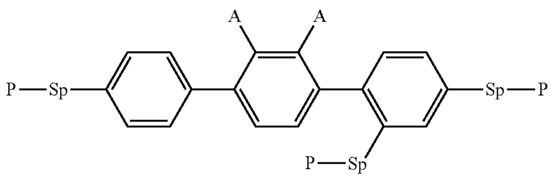
I2B-17-1
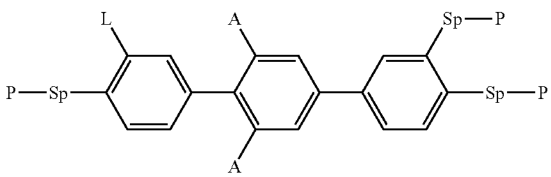
I2B-17-2
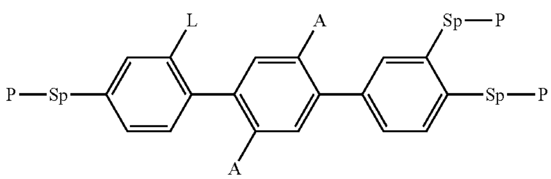
I2B-17-3
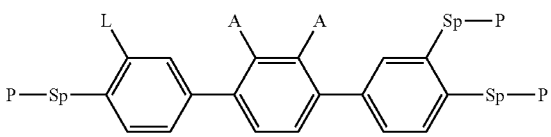
I2B-17-4
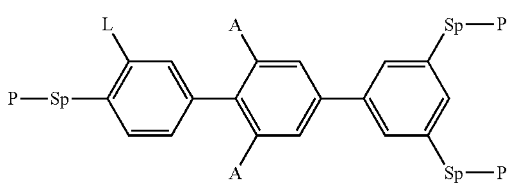
I2B-17-5
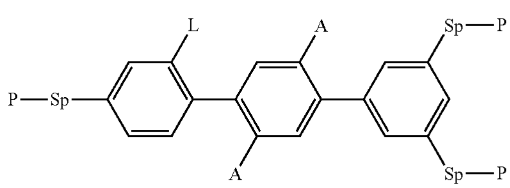
I2B-17-6
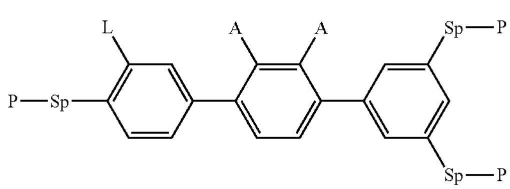
-continued
I2B-17-7
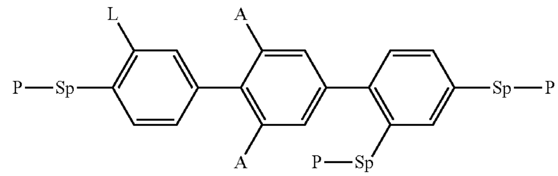
I2B-17-8
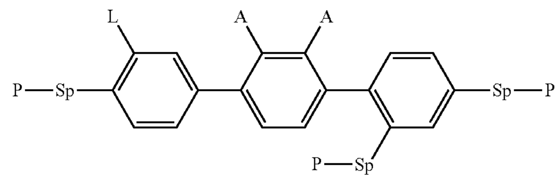
I2B-20-1
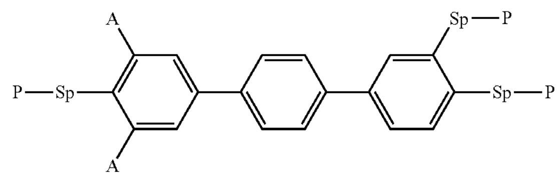
I2B-20-2
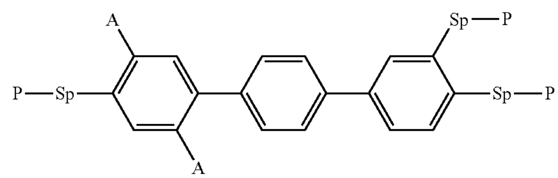
I2B-20-3
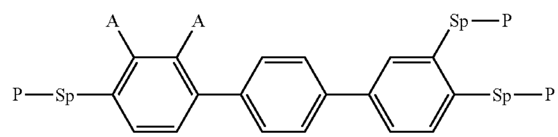
I2B-20-4
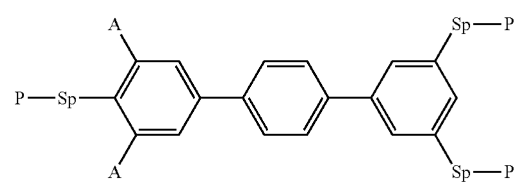
I2B-20-5
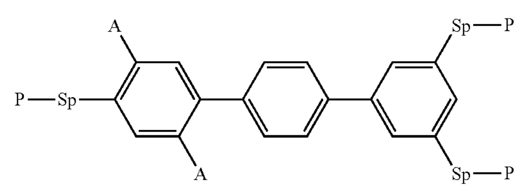
I2B-20-6
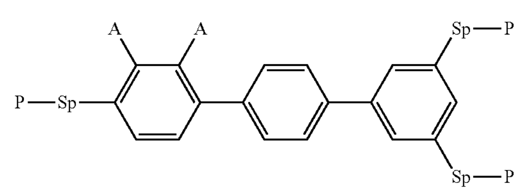

-continued
I2B-20-7
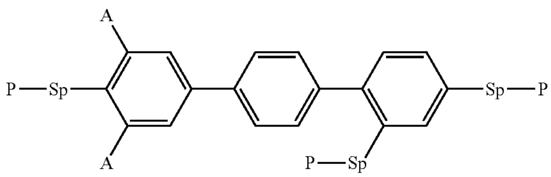
I2B-20-8
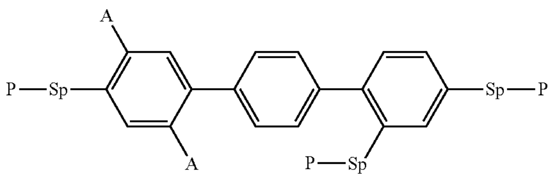
I2B-20-9
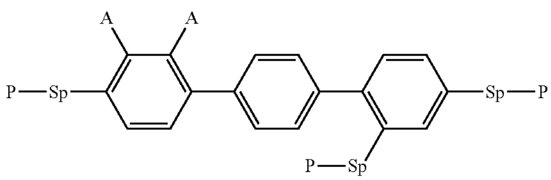
I2B-21-1
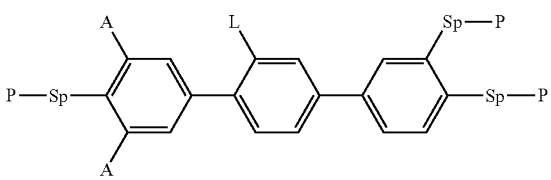
I2B-21-2
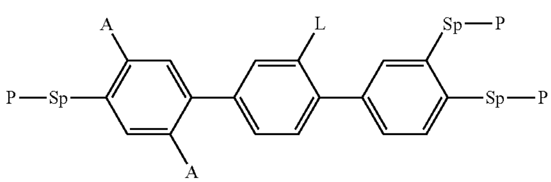
I2B-21-3
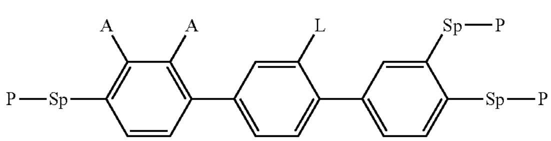
I2B-21-4
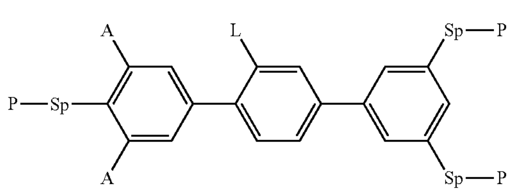
I2B-21-5
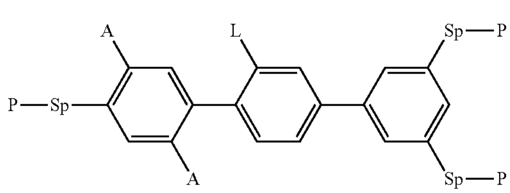
-continued
I2B-21-6
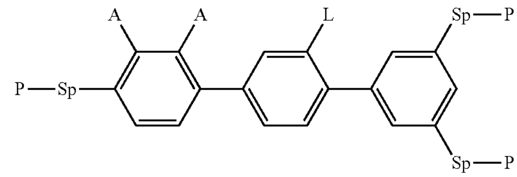
I2B-21-7
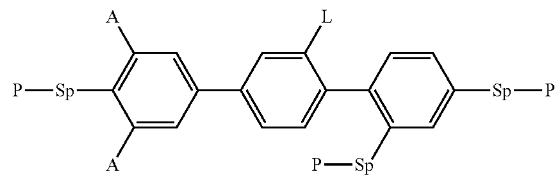
I2B-18-8
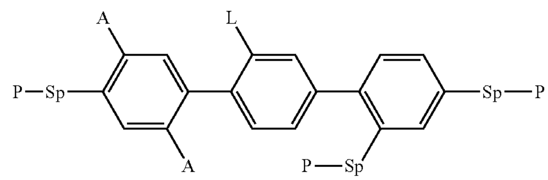
I2B-21-9
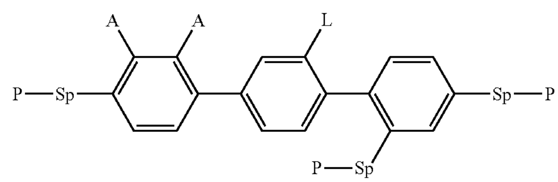
I2C-1-1
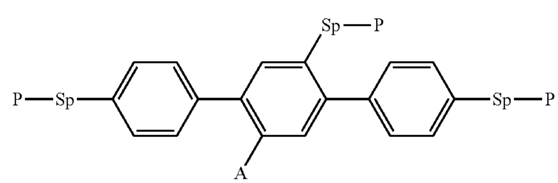
I2C-1-2
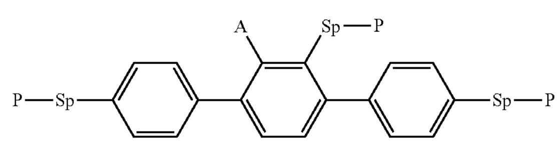
I2C-1-3
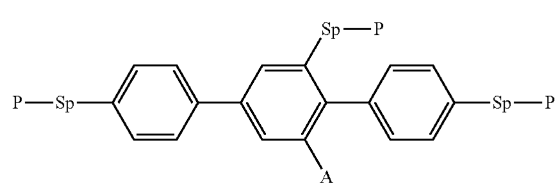
I2C-2-1
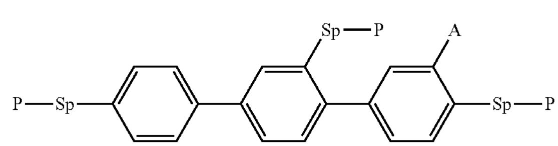

-continued
I2C-2-2
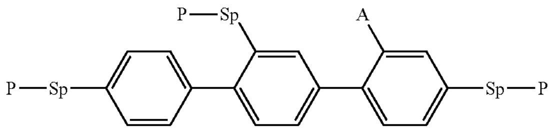
I2C-2-3
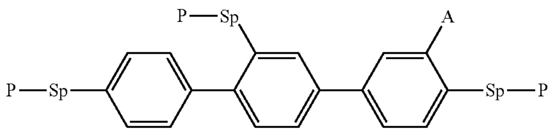
I2C-3-1
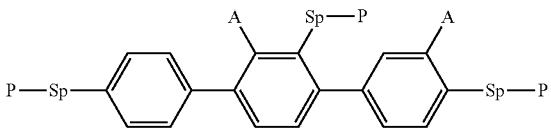
I2C-3-2
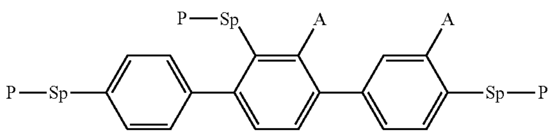
I2C-3-3
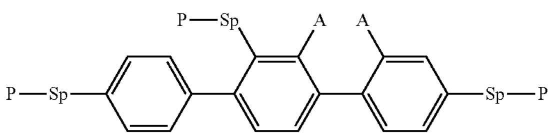
I2C-4-1
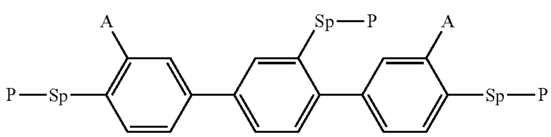
I2C-4-2
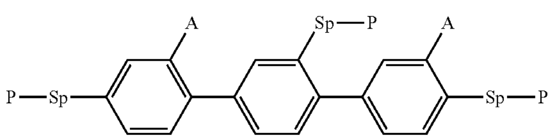
I2C-4-3
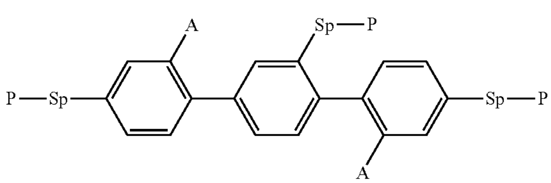
I2C-5-1
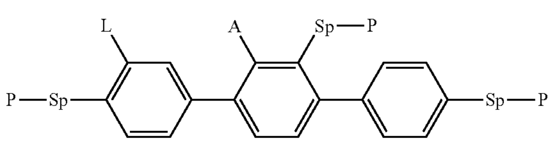
I2C-5-2
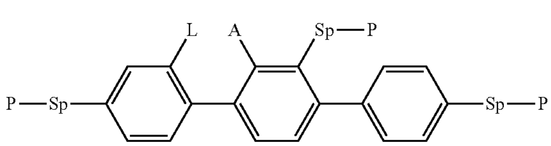
-continued
I2C-5-3
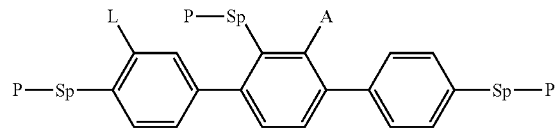
I2C-6-1
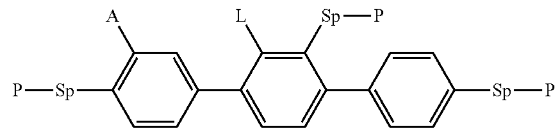
I2C-6-2
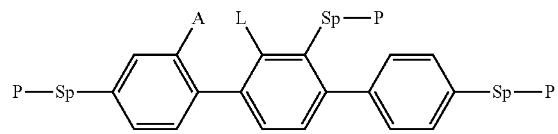
I2C-6-3
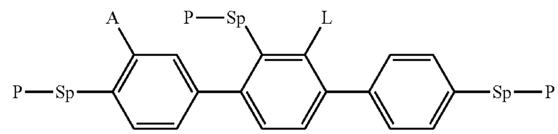
I2C-7-1
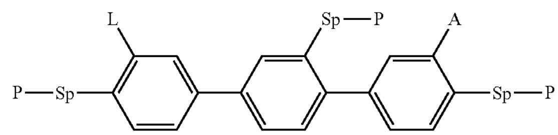
I2C-7-2
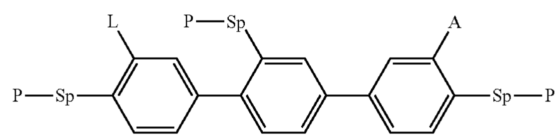
I2C-7-3
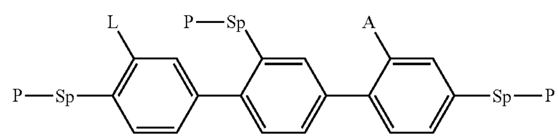
I2C-8-1
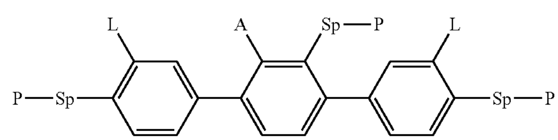
I2C-8-2
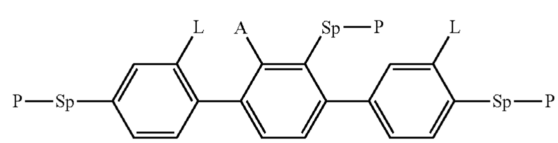
I2C-8-3
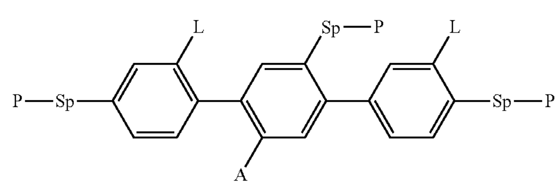

-continued
I2C-9-1
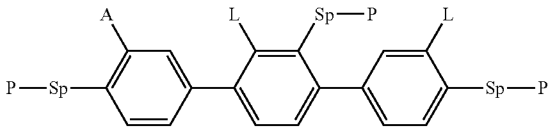
I2C-9-2
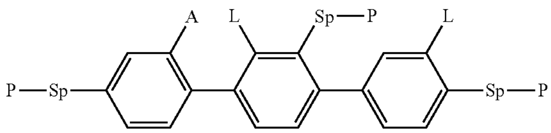
I2C-9-3
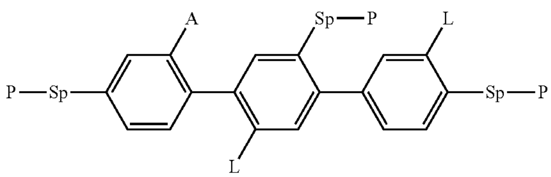
I2C-10-1
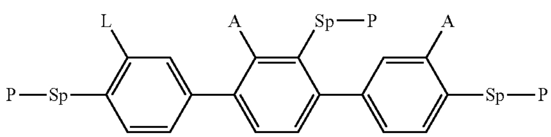
I2C-10-2
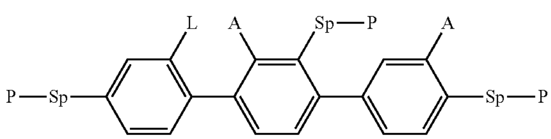
I2C-10-3
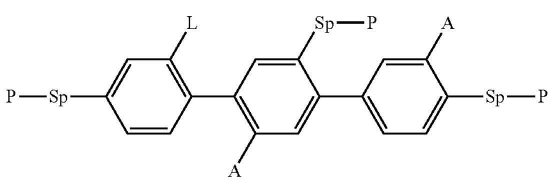
I2C-11-1
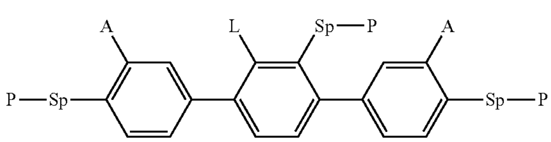
I2C-11-2
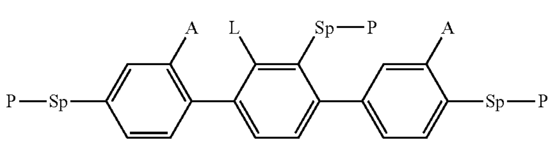
I2C-11-3
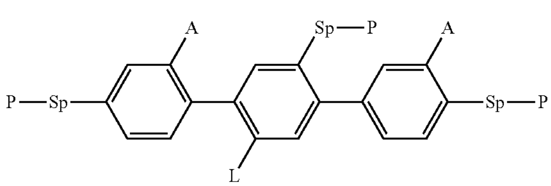
-continued
I2C-12-1
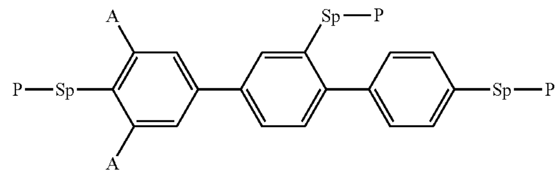
I2C-12-2
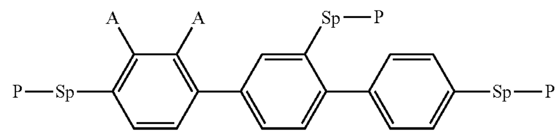
I2C-12-3
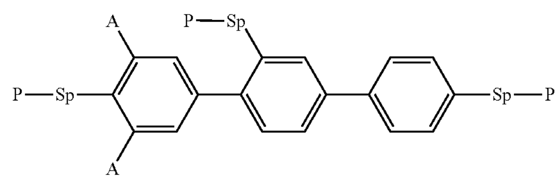
I2C-12-4
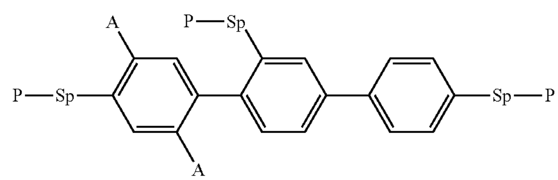
I2C-13-1
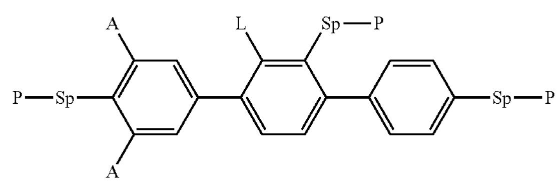
I2C-13-2
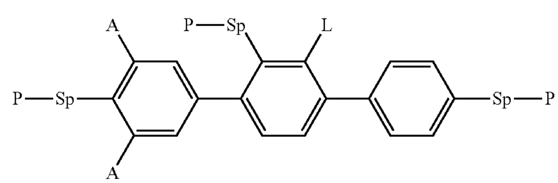
I2C-13-3
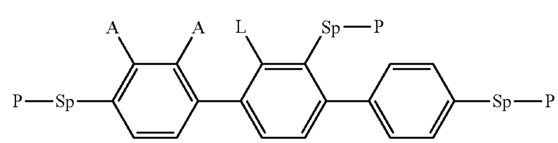
I2C-13-4
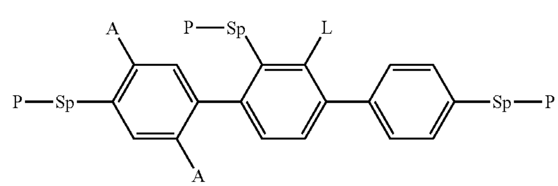

-continued
I2C-14-1
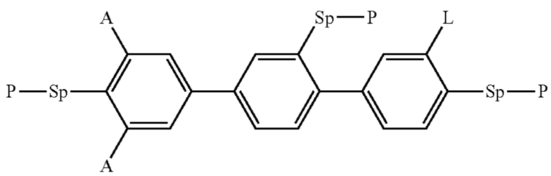
I2C-14-2
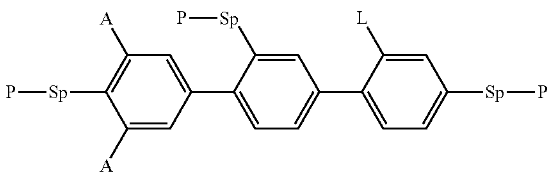
I2C-14-3
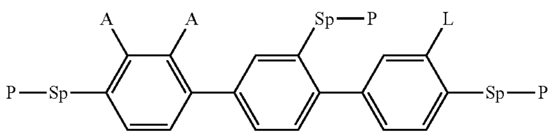
I2C-14-4
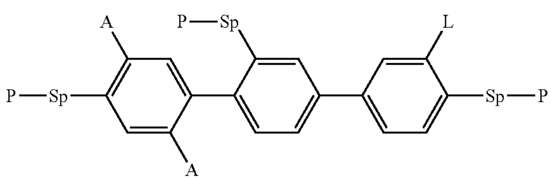
I2C-15-1
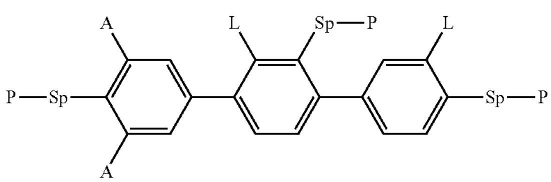
I2C-15-2
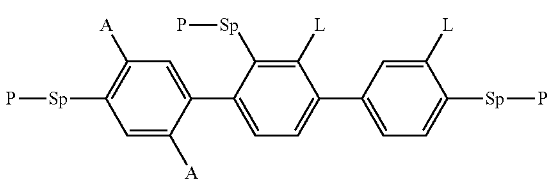
I2C-15-3
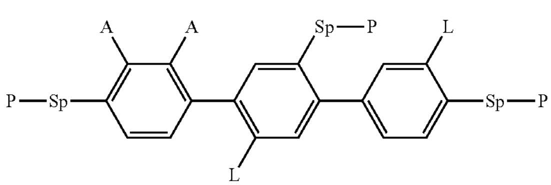
I2C-15-4
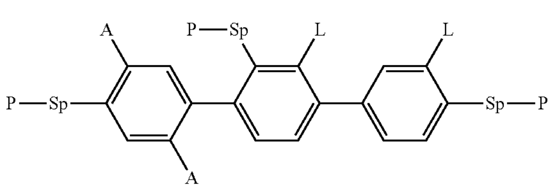
-continued
I2D-1-1
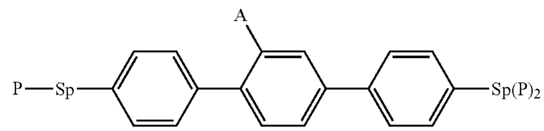
I2D-1-2
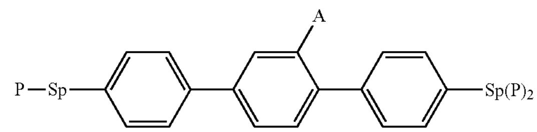
I2D-2-1
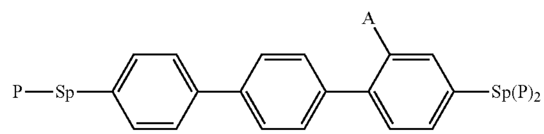
I2D-2-2
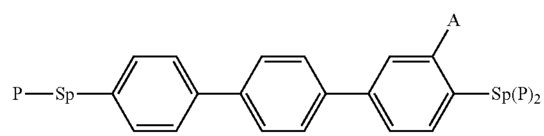
I2D-3-1
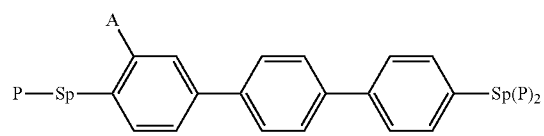
I2D-3-2
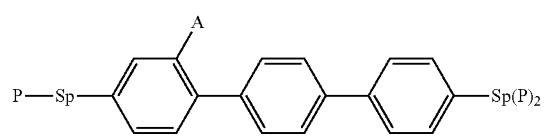
I2D-4-1
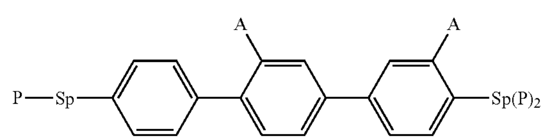
I2D-4-2
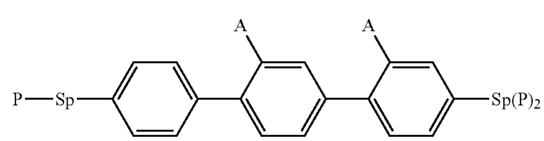
I2D-4-3
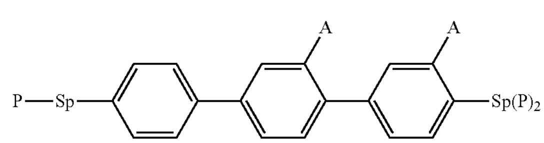
I2D-4-4
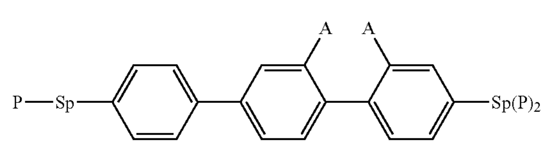

-continued
I2D-5-1
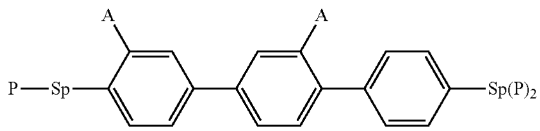
I2D-5-2
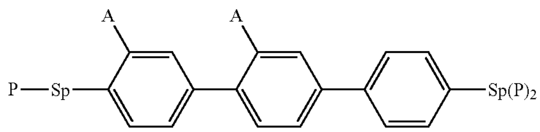
I2D-5-3
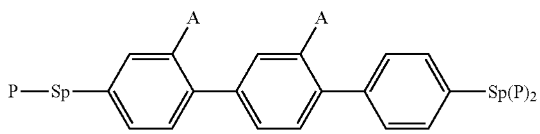
I2D-5-4
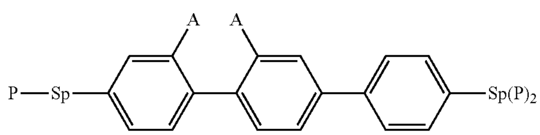
I2D-6-1
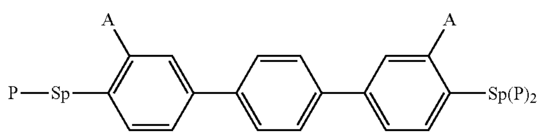
I2D-6-2
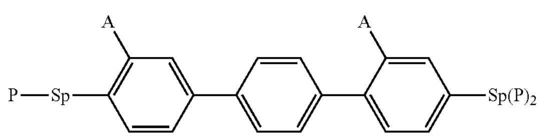
I2D-6-3
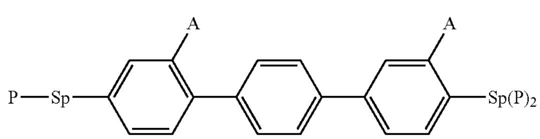
I2D-6-4
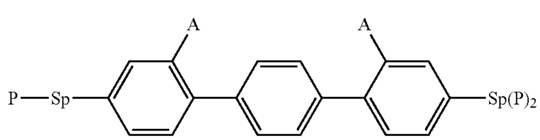
I2D-7-1
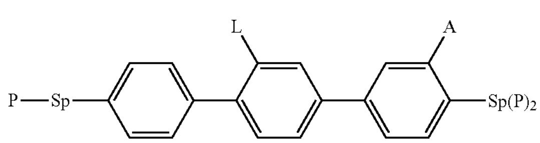
I2D-7-2
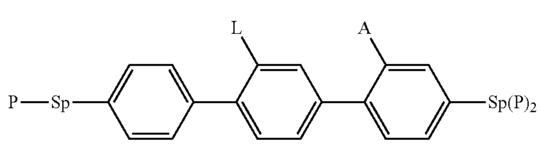
-continued
I2D-7-3
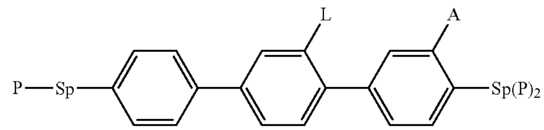
I2D-7-4
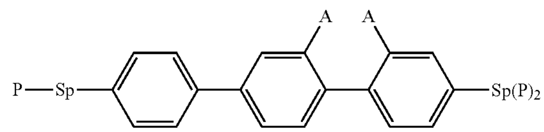
I2D-8-1
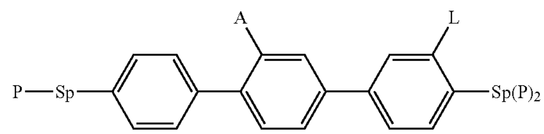
I2D-8-2
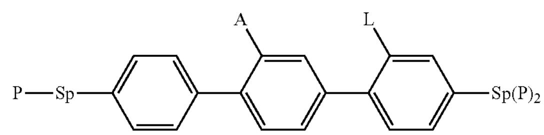
I2D-8-3
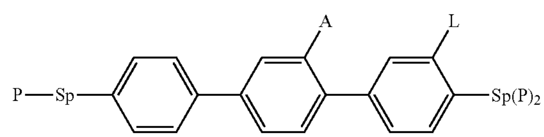
I2D-8-4
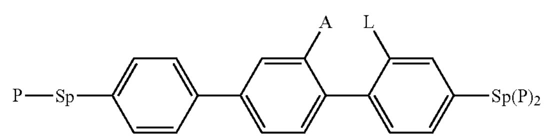
I2D-9-1
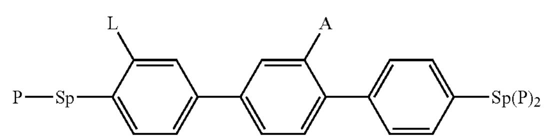
I2D-9-2
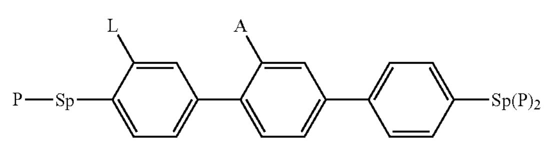
I2D-9-3
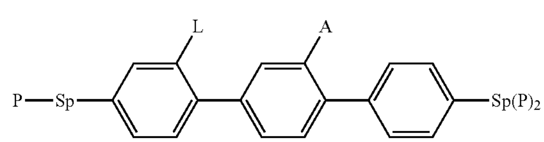
I2D-9-4
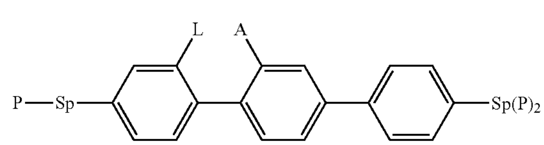

-continued
I2D-10-1
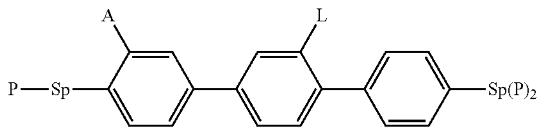
I2D-10-2
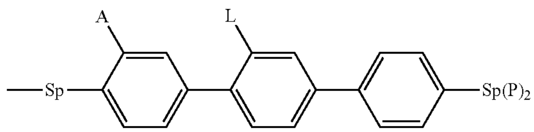
I2D-10-3
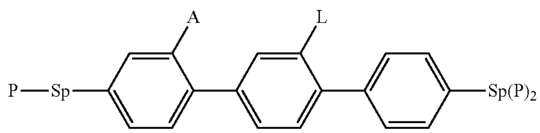
I2D-10-4
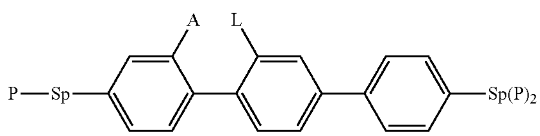
I2D-11-1
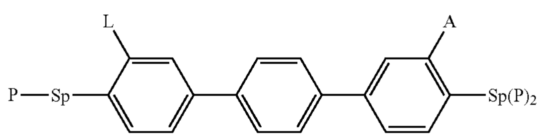
I2D-11-2
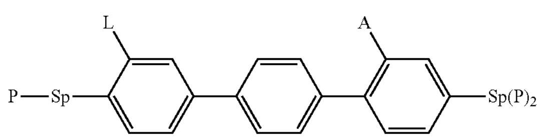
I2D-11-3
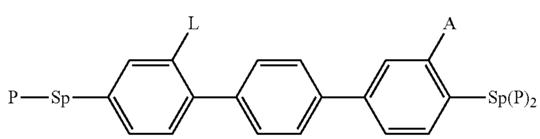
I2D-11-4
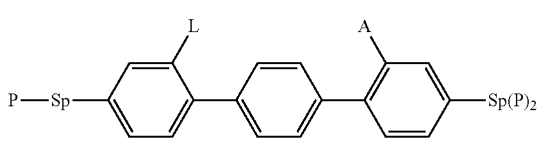
I2D-12-1
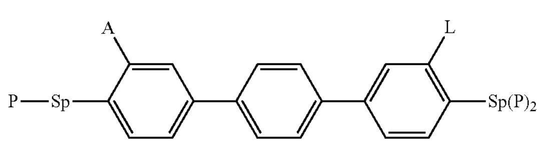
I2D-12-2
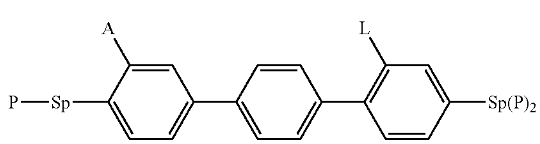
-continued
I2D-12-3
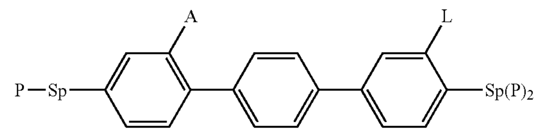
I2D-12-4
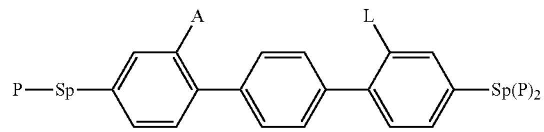
I2D-13-1
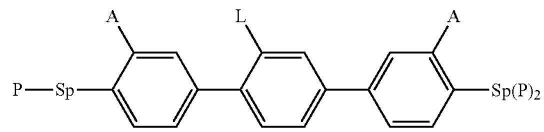
I2D-13-2
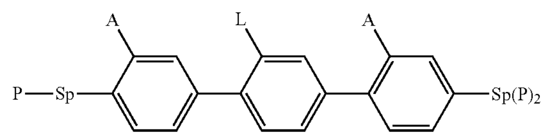
I2D-13-3
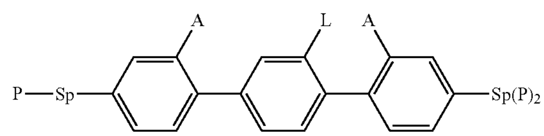
I2D-13-4
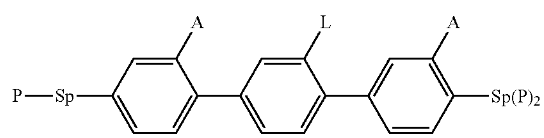
I2D-14-1
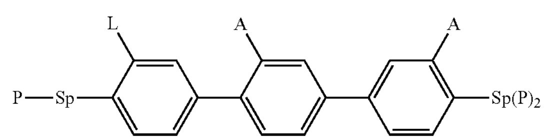
I2D-14-2
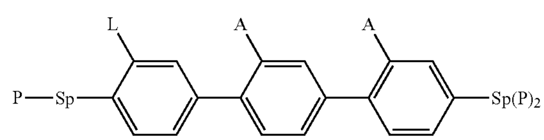
I2D-14-3
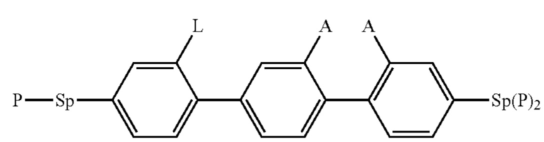
I2D-14-4
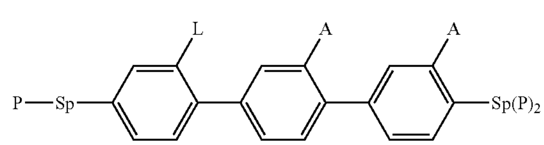

-continued
I2D-15-1
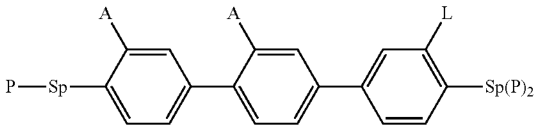
I2D-15-2
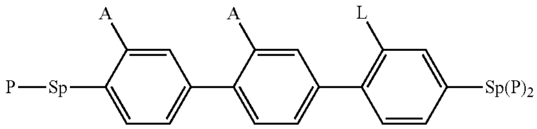
I2D-15-3
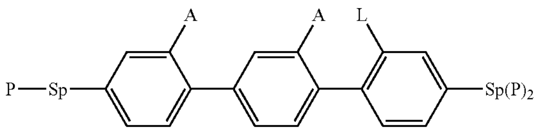
I2D-15-4
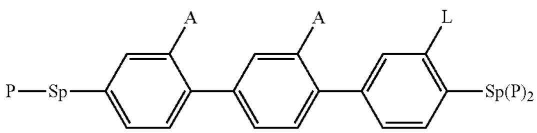
I2D-16-1
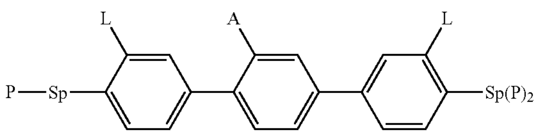
I2D-16-2
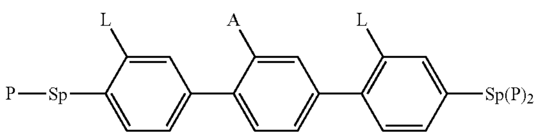
I2D-16-3
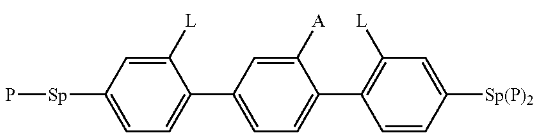
I2D-16-4
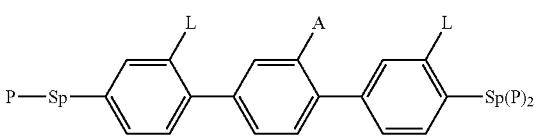
I2D-17-1
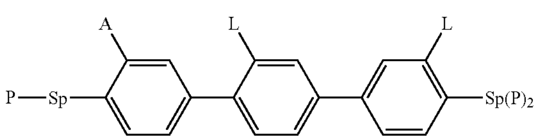
I2D-17-2
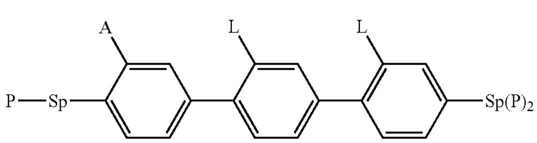
-continued
I2D-17-3
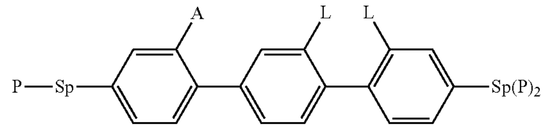
I2D-17-4
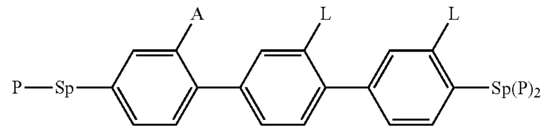
I2D-19-1
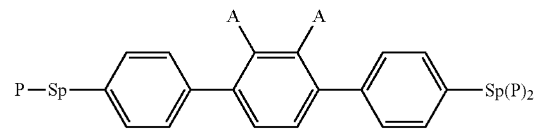
I2D-19-2
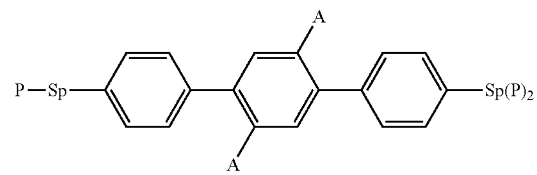
I2D-19-3
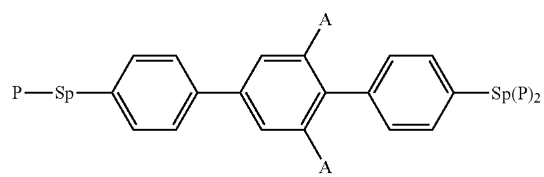
I2D-20-1
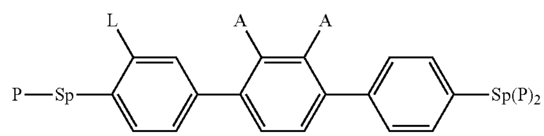
I2D-20-2
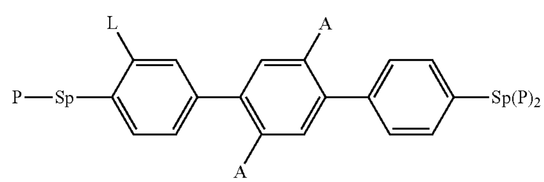
I2D-20-3
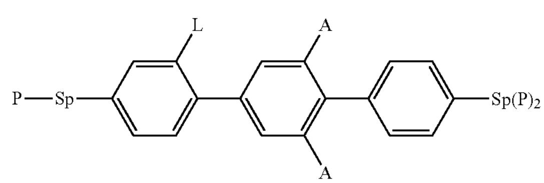
I2D-21-1
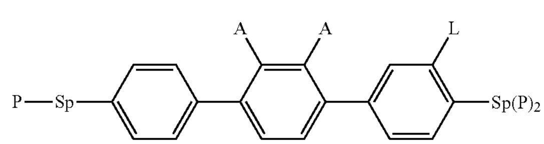

-continued
I2D-21-2
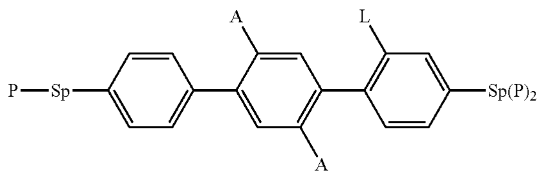
I2D-21-3
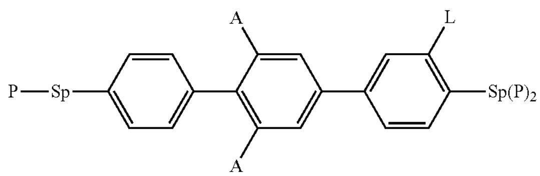
I2D-22-1
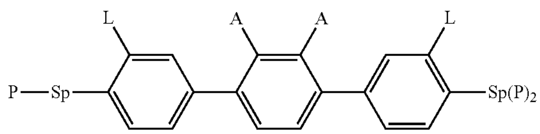
I2D-22-2
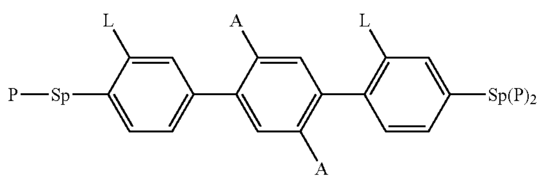
I2D-22-3
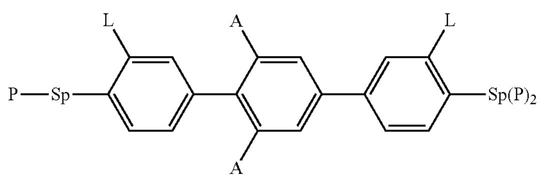
I2D-22-4
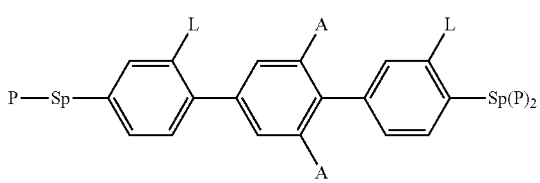
I2D-23-1
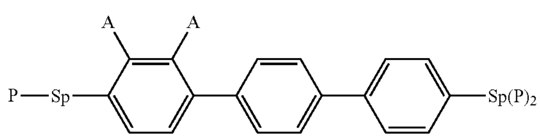
I2D-23-2
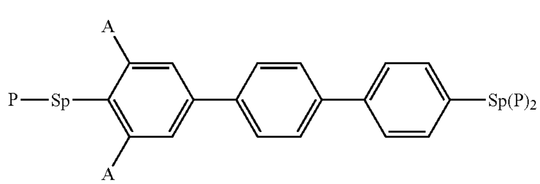
-continued
I2D-23-3
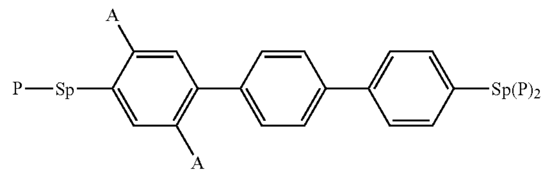
I2D-24-1
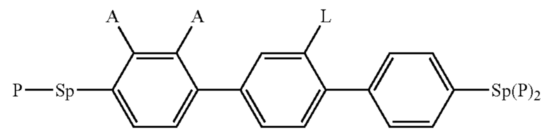
I2D-24-2
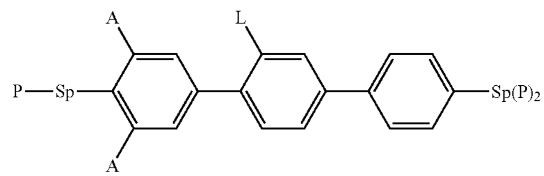
I2D-24-3
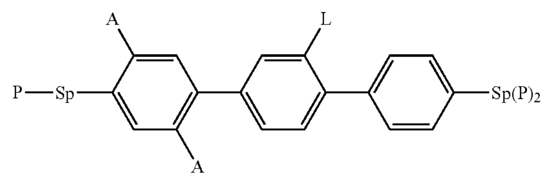
I2D-25-1
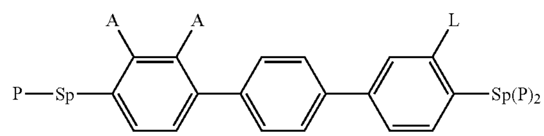
I2D-25-2
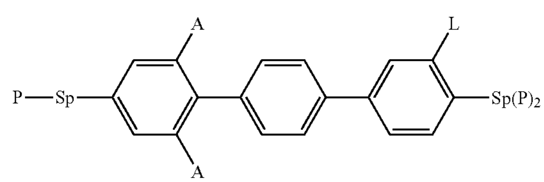
I2D-25-3
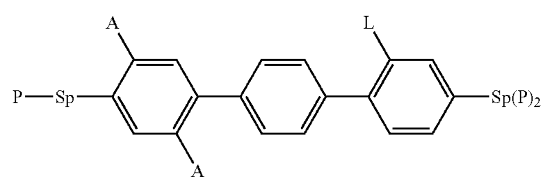
I2D-26-1
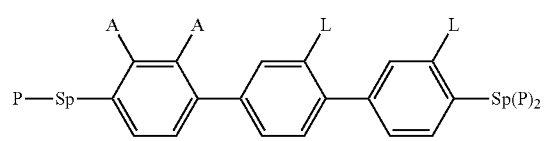

-continued
I2D-26-2
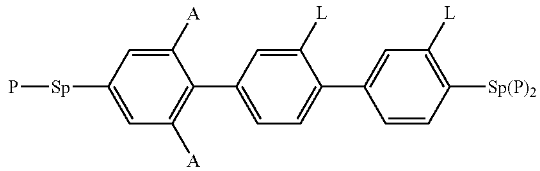
I2D-26-3
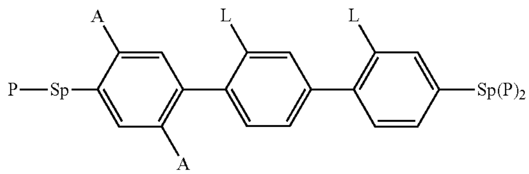
I2D-26-4
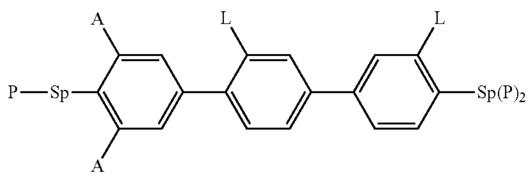
I2D-27-1
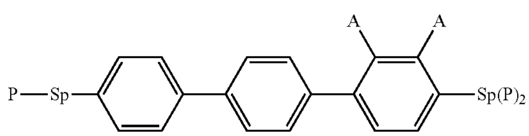
I2D-27-2
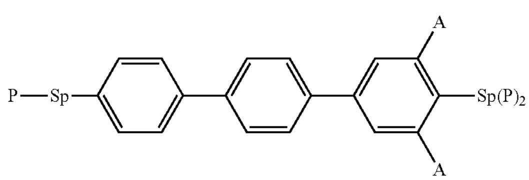
I2D-27-3
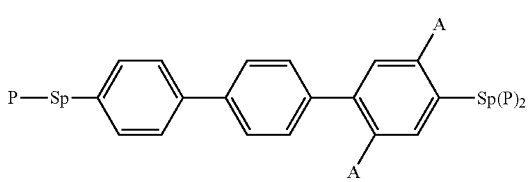
I2D-28-1
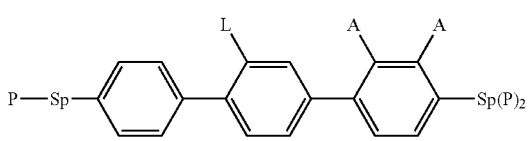
I2D-28-2
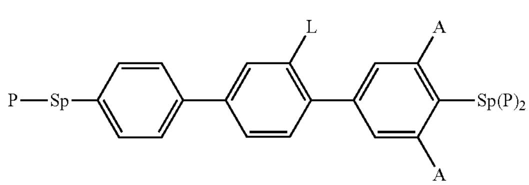
-continued
I2D-28-3
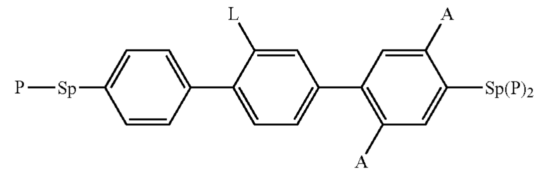
I2D-29-1
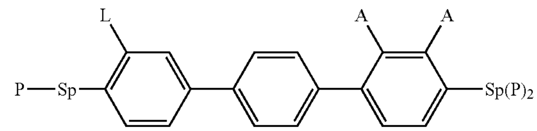
I2D-29-2
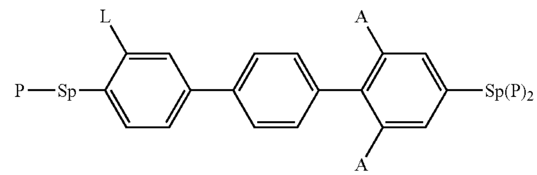
I2D-29-3
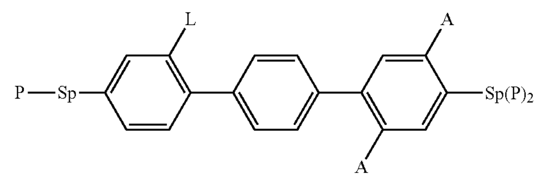
I2D-30-1
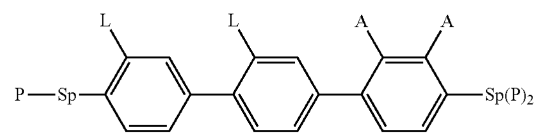
I2D-30-2
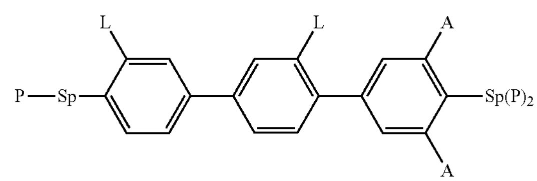
I2D-30-3
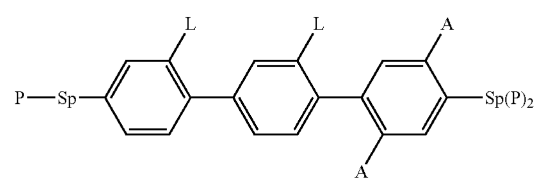
I2D-30-4
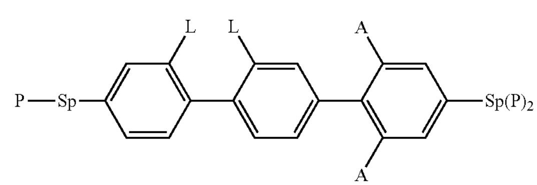

-continued
I5A-1-1
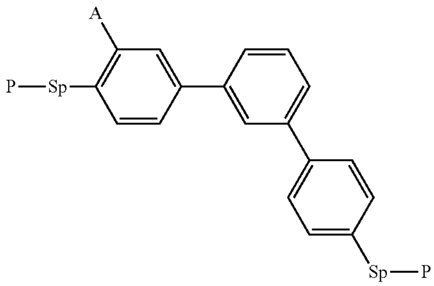
I5A-1-2
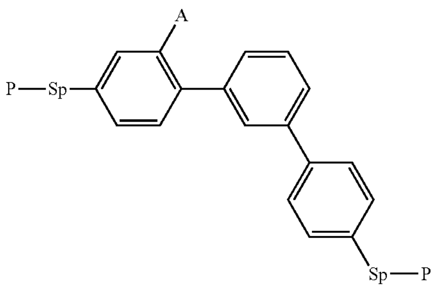
I5A-2-1
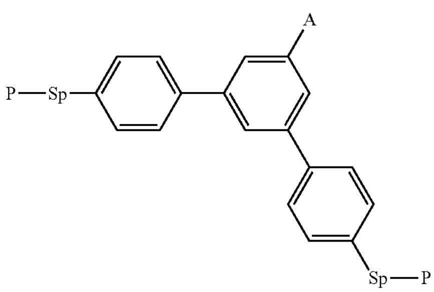
I5A-2-2
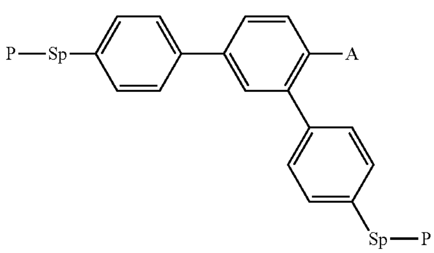
I5A-2-3
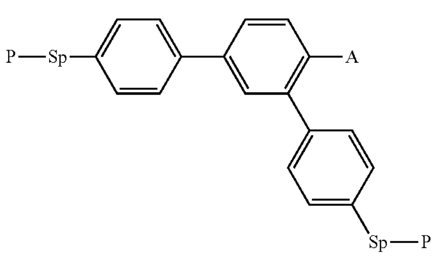
-continued
I5A-3-1
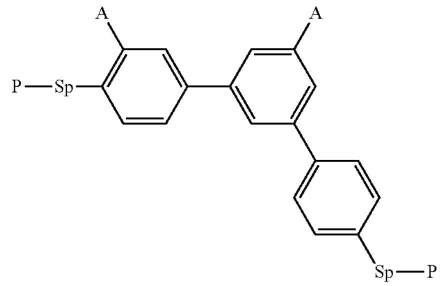
I5A-3-2
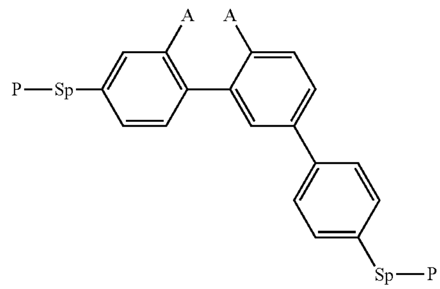
I5A-3-3
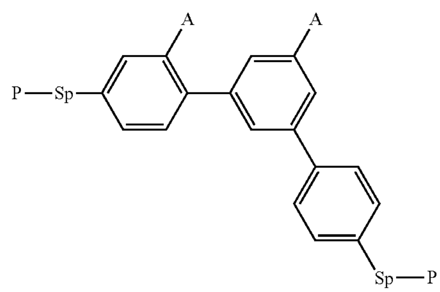
I5A-3-4
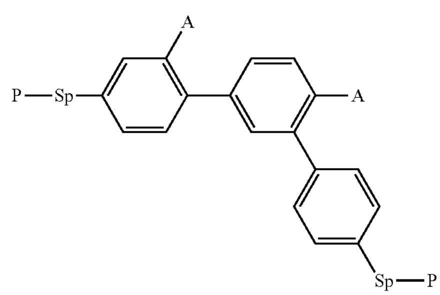
I5A-3-5
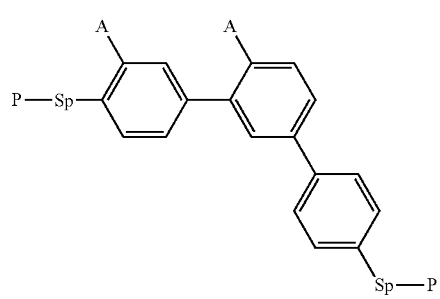

-continued
I5A-3-6
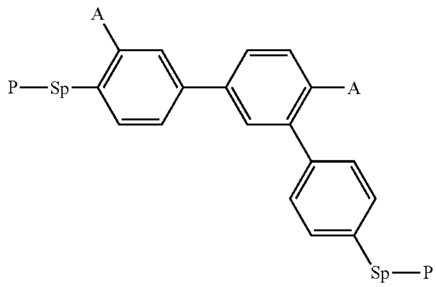
I5A-3-7
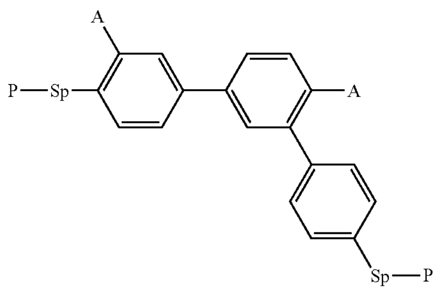
I5A-4-1
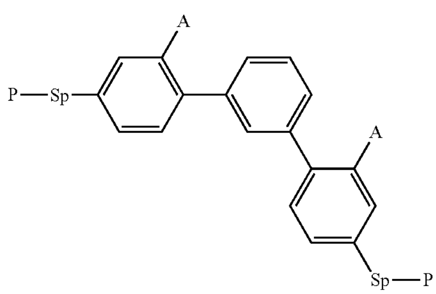
I5A-4-2
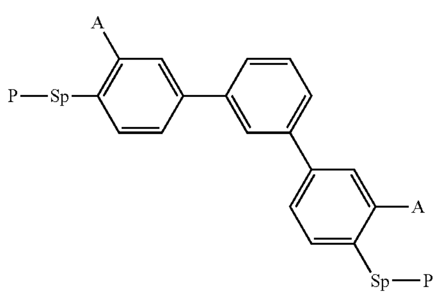
I5A-4-3
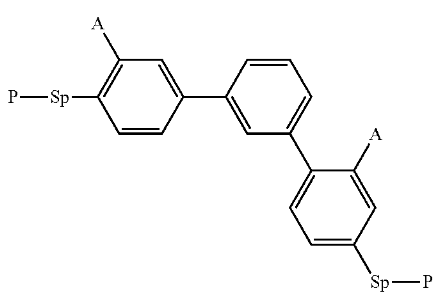
-continued
I5A-5-1
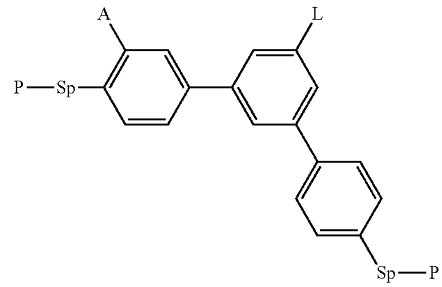
I5A-5-2
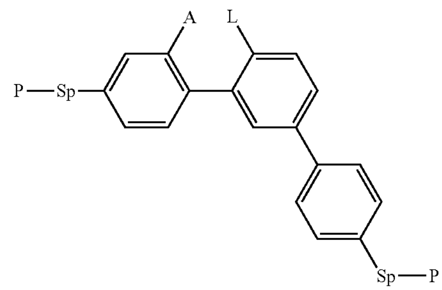
I5A-5-3
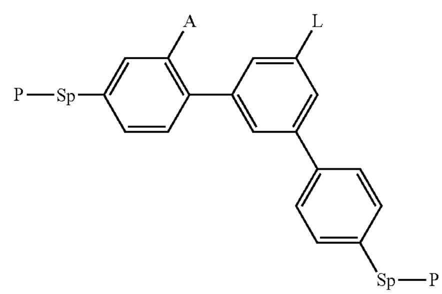
I5A-5-4
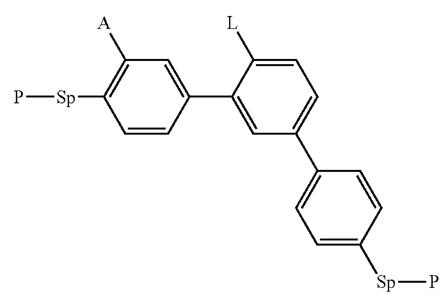
I5A-5-5
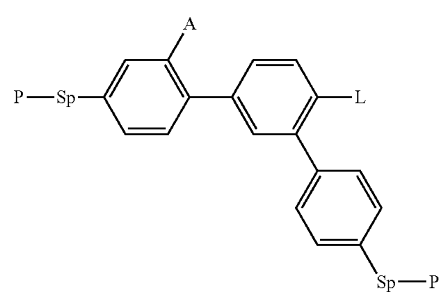

-continued
I5A-5-6
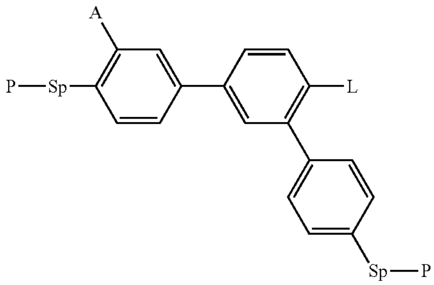
I5A-5-7
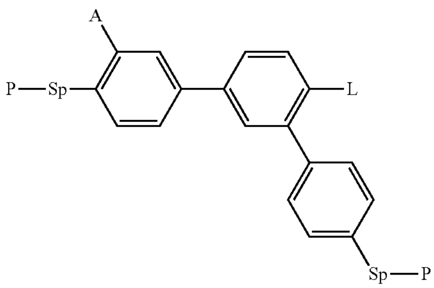
I5A-6-1
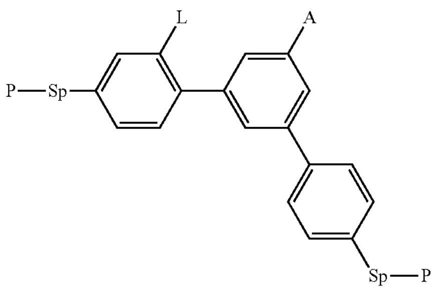
I5A-6-2
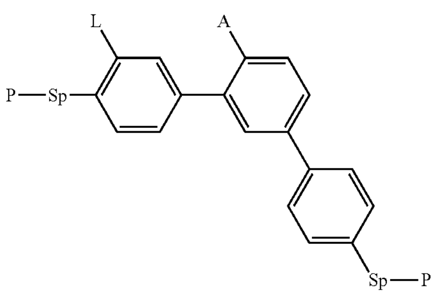
I5A-6-3
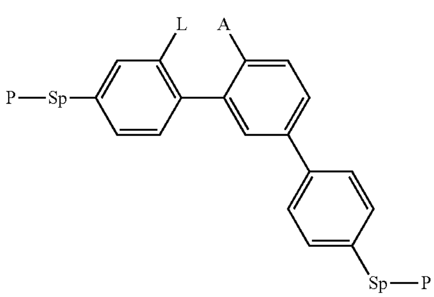
-continued
I5A-6-4
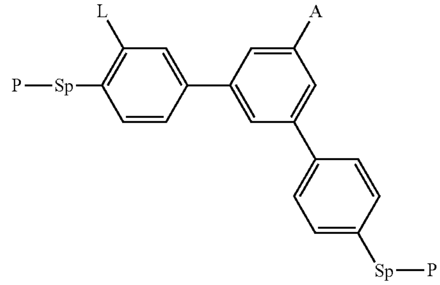
I5A-6-5
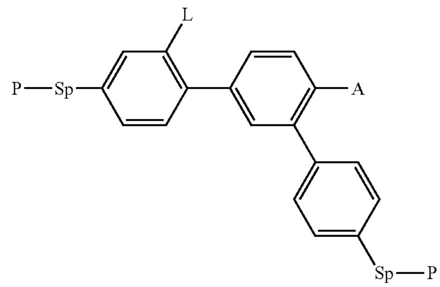
I5A-6-6
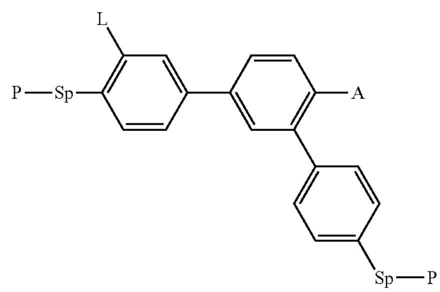
I5A-7-1
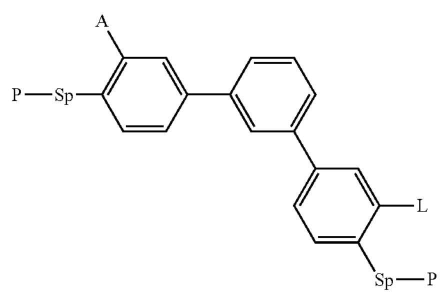
I5A-7-2
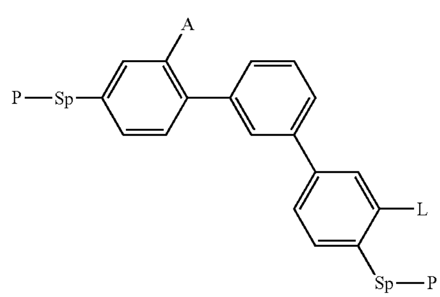

-continued
I5A-7-3
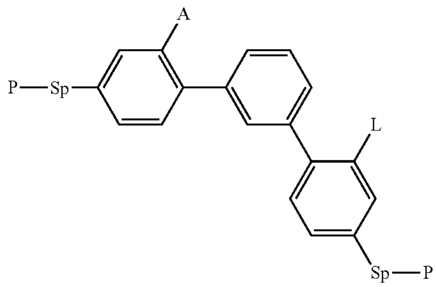
I5A-7-4
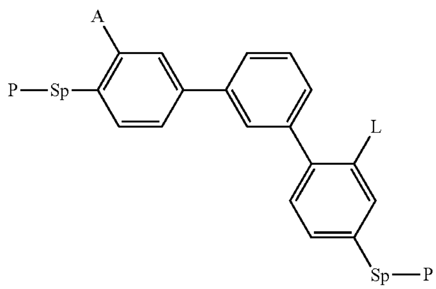
I5A-8-1
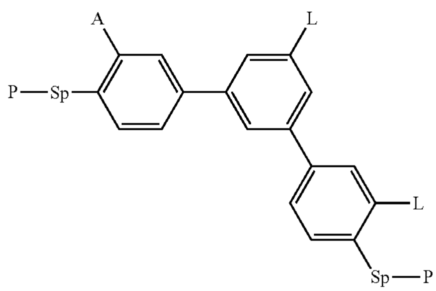
I5A-8-2
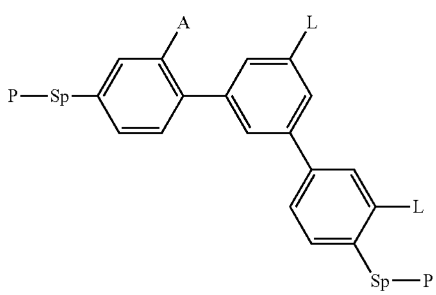
I5A-8-3
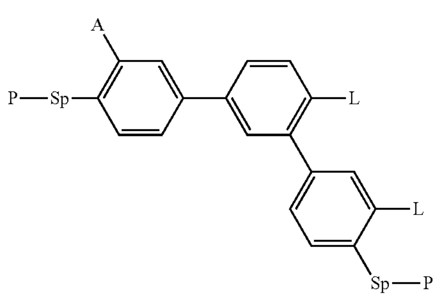
-continued
I5A-8-4
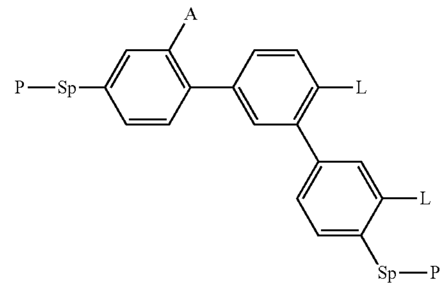
I5A-9-1
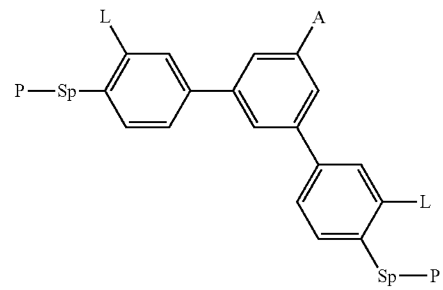
I5A-9-2
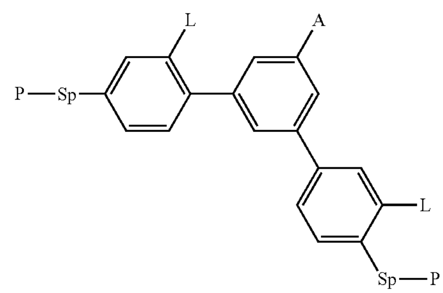
I5A-9-3
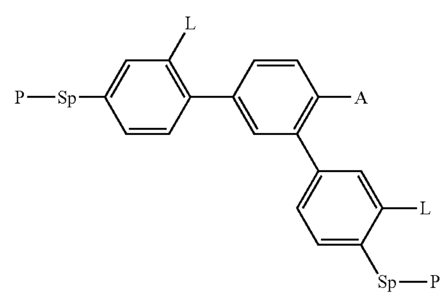
I5A-9-4
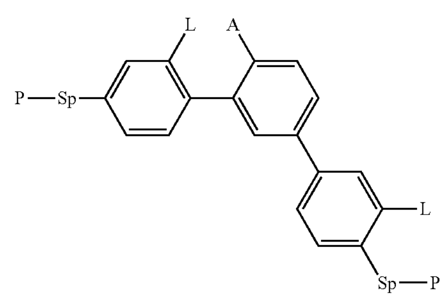

-continued
I5A-9-5
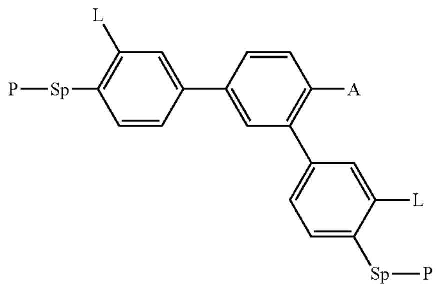
I5A-10-1
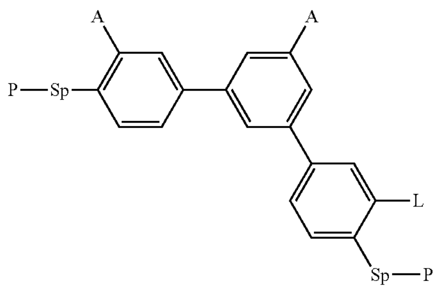
I5A-10-2
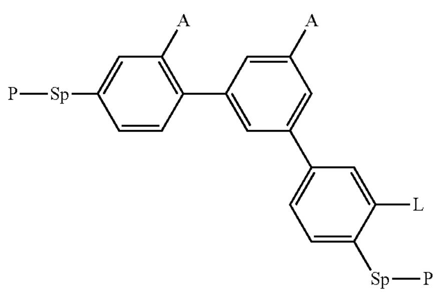
I5A-10-3
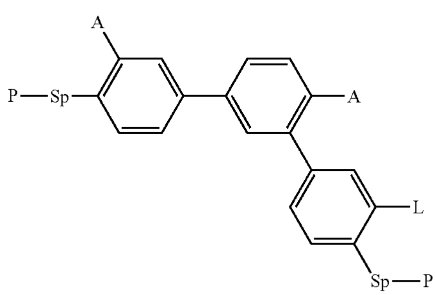
I5A-10-4
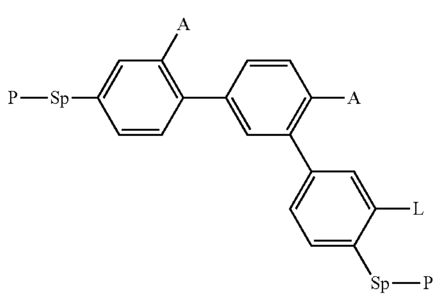
-continued
I5A-11-1
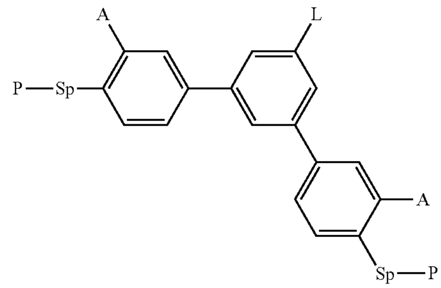
I5A-11-2
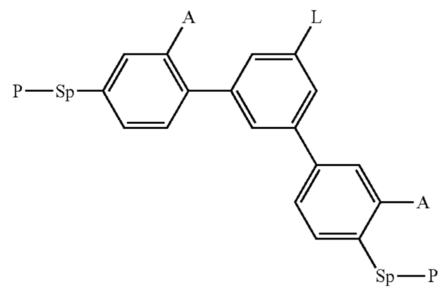
I5A-11-3
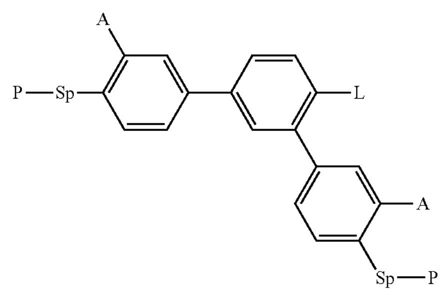
I5A-11-4
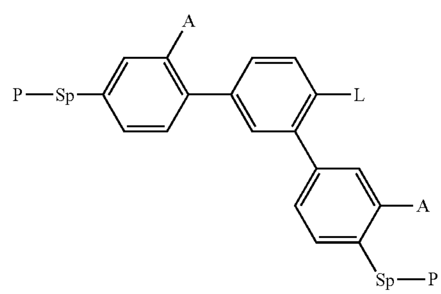
I5A-12-1
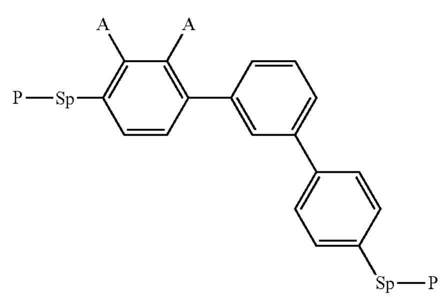

-continued
I5A-12-2
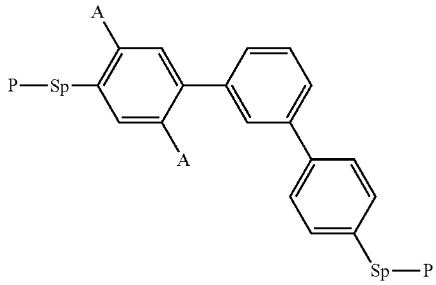
I5A-12-3
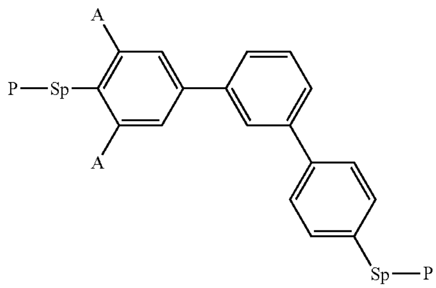
I5A-12-4
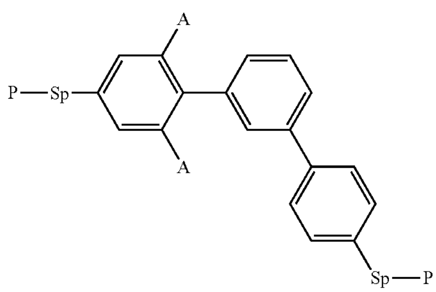
I5A-13-1
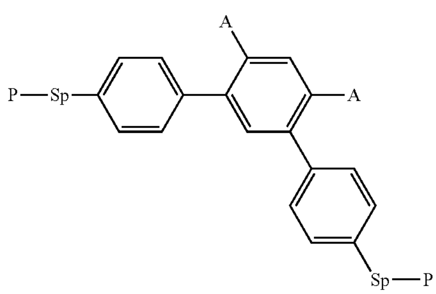
I5A-13-2
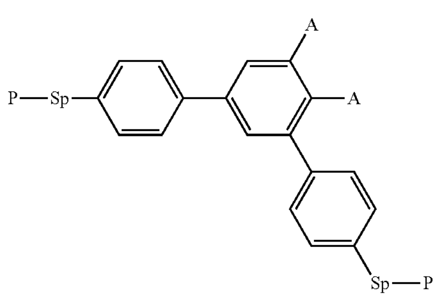
-continued
I5A-13-3
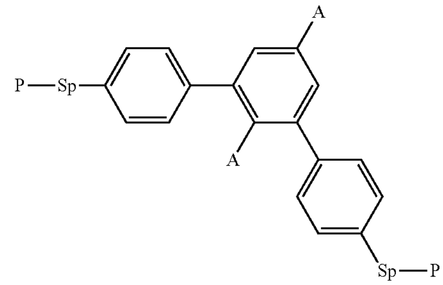
I5A-14-1
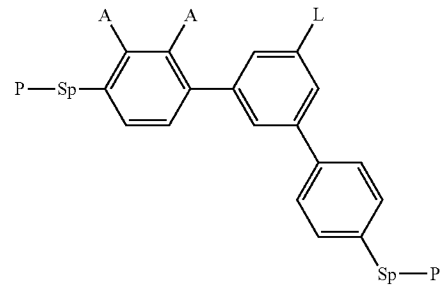
I5A-14-2
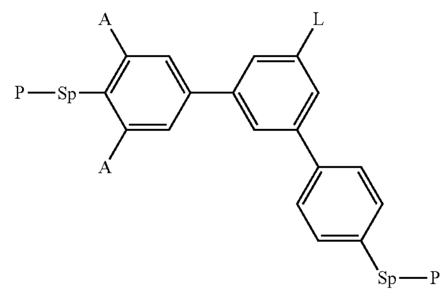
I5A-14-3
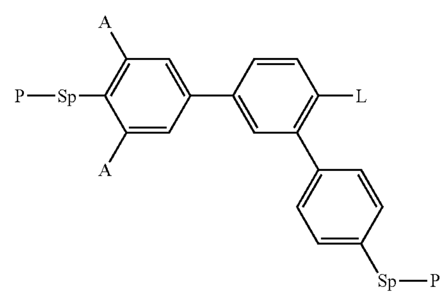
I5A-15-1
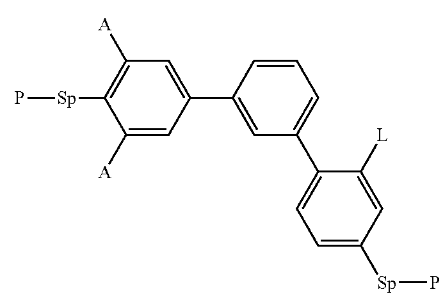

-continued
I5A-15-2
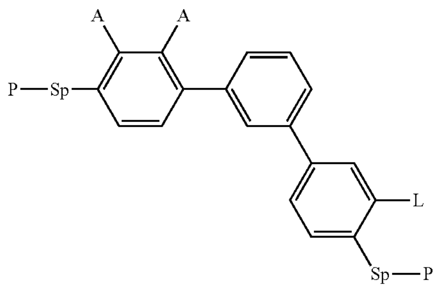
I5A-16-1
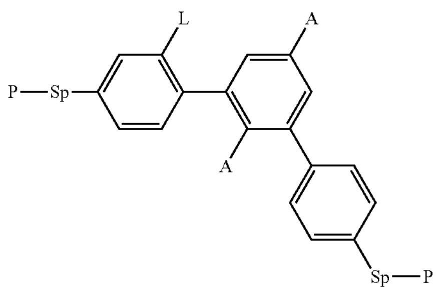
I5A-16-2
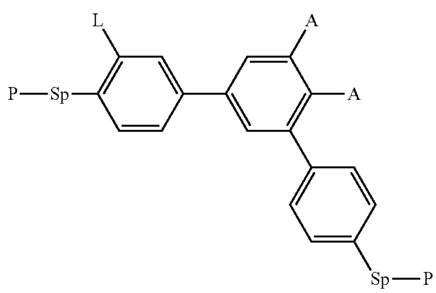
I5A-18-1
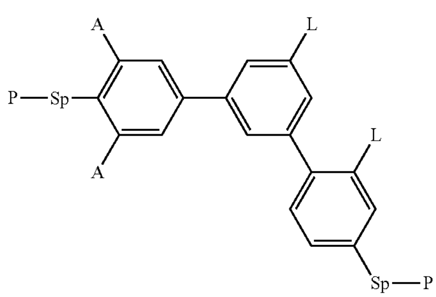
I5A-18-2
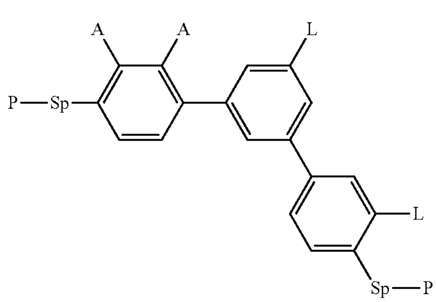
-continued
I5A-19-1
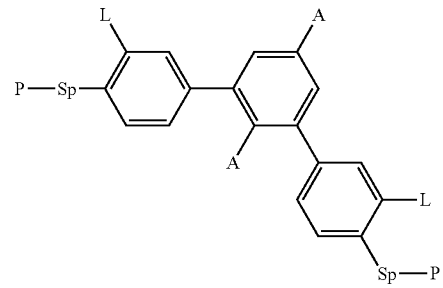
I5A-19-2
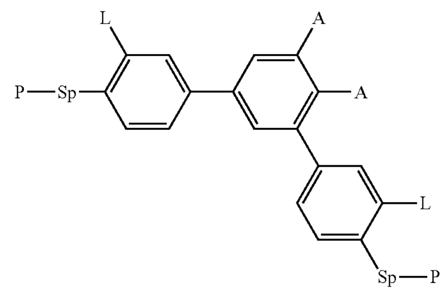
I5A-19-3
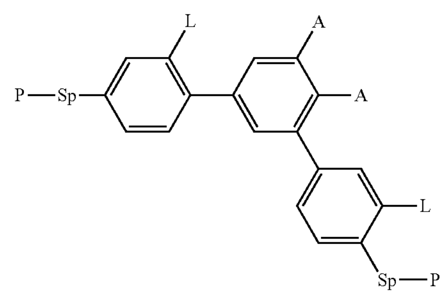
I5B-1-1
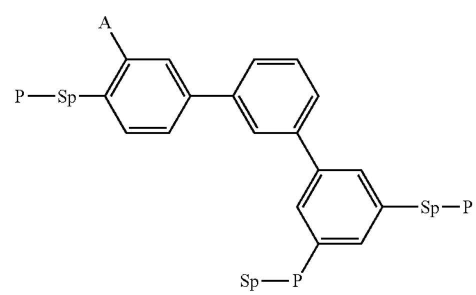
I5B-1-2
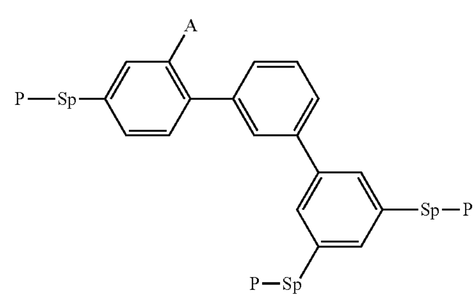

-continued
I5B-1-3
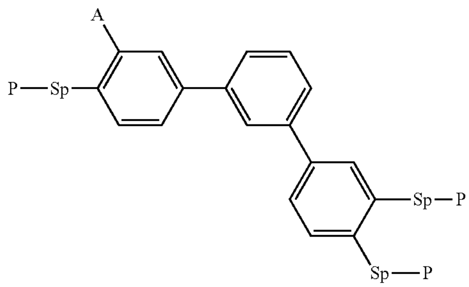
I5B-1-4
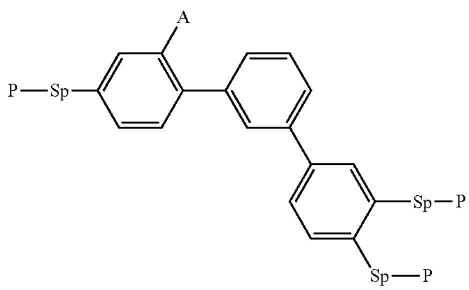
I5B-2-1
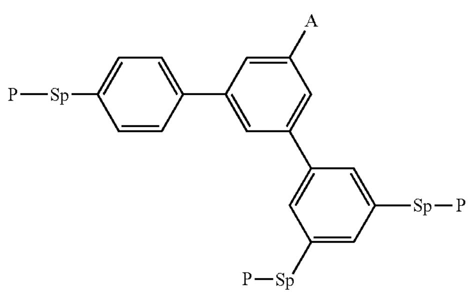
I5B-2-2
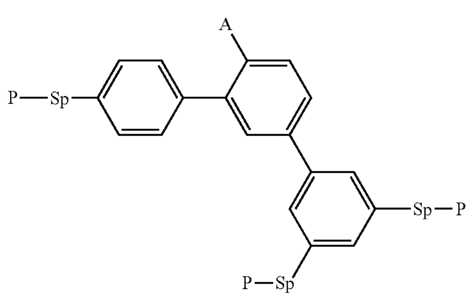
I5B-2-3
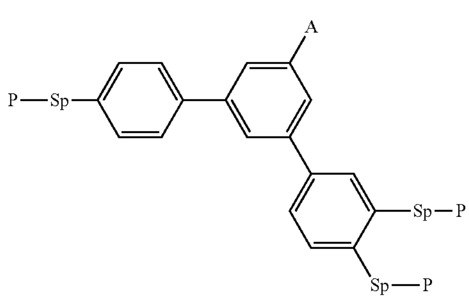
-continued
I5B-2-4
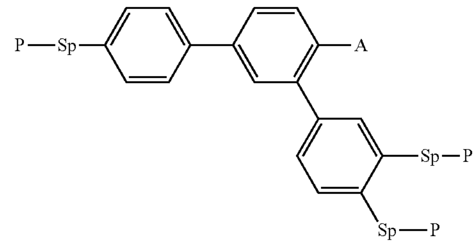
I5B-3-1
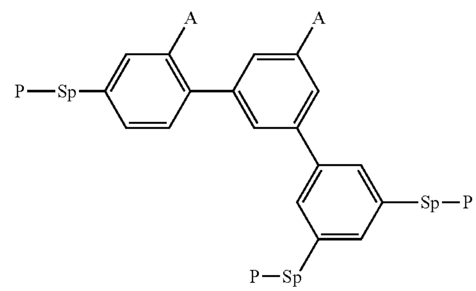
I5B-3-2
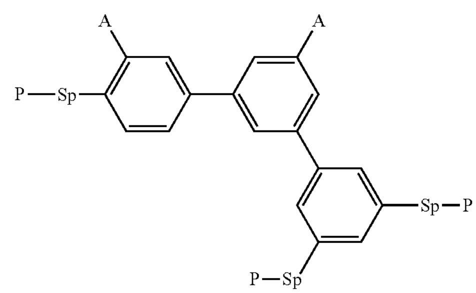
I5B-3-3
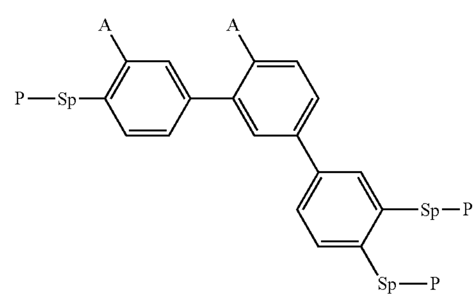
I5B-3-4
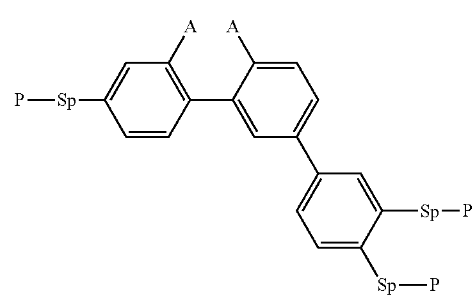

-continued
I5B-4-1
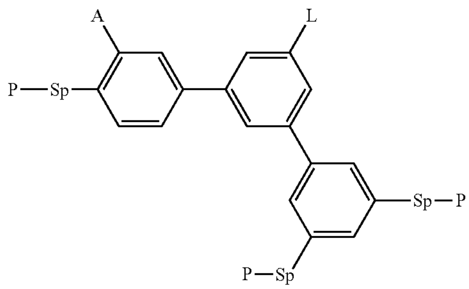
I5B-4-2
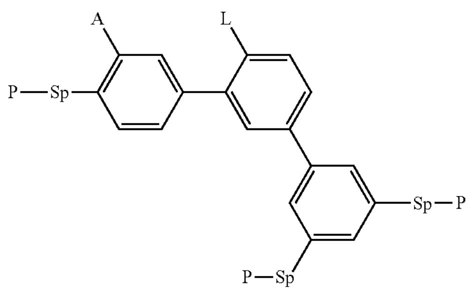
I5B-4-3
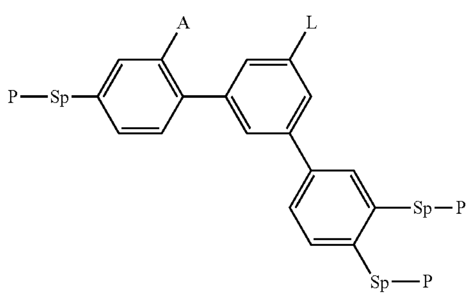
I5B-4-4
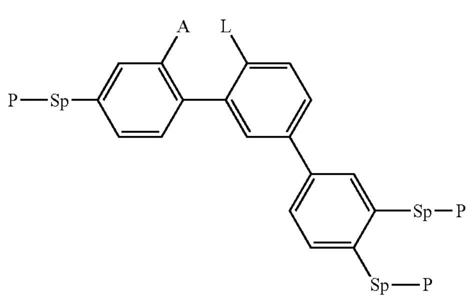
I5B-5-1
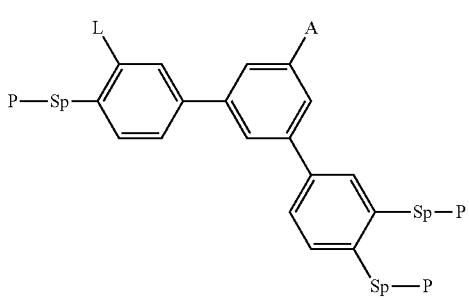
-continued
I5B-5-2
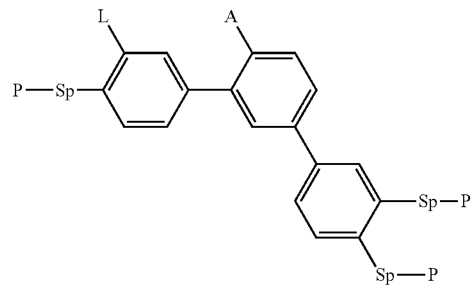
I5B-5-3
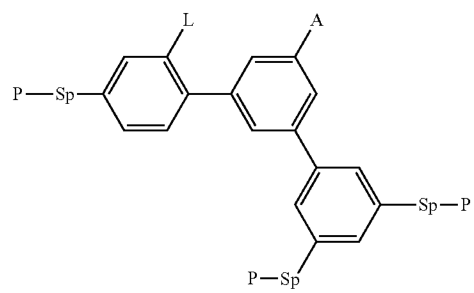
I5B-5-4
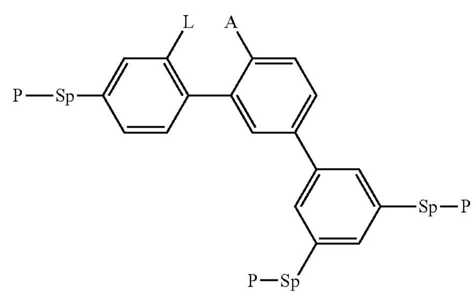
I5B-6-1
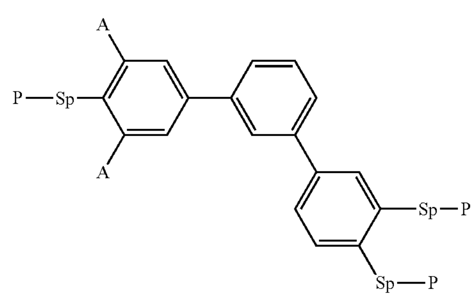
I5B-6-2
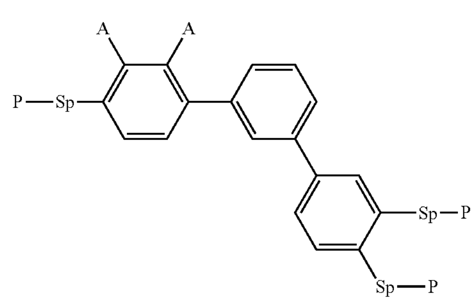

-continued
I5B-6-3
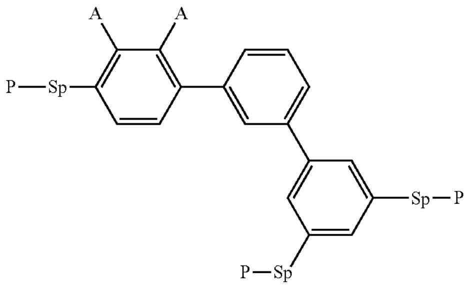
I5B-6-4
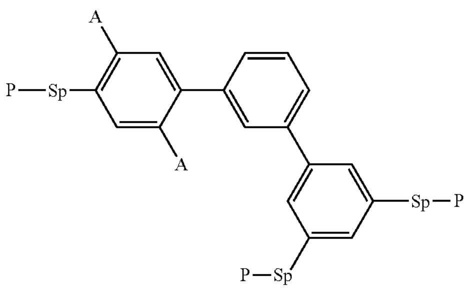
I5B-7-1
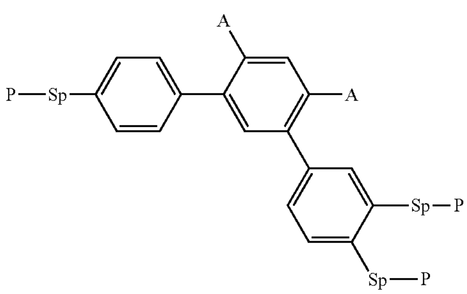
I5B-7-2
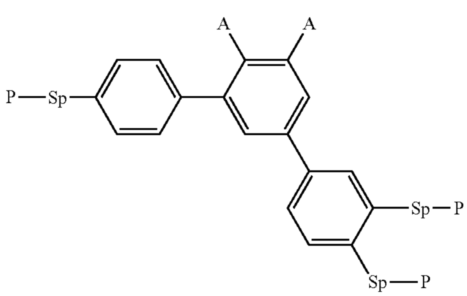
I5B-7-3
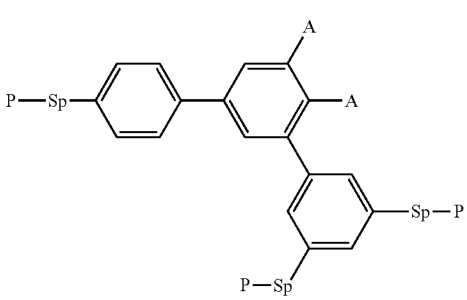
-continued
I5B-7-4
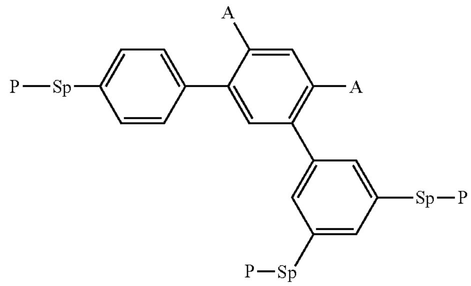
I5B-8-1
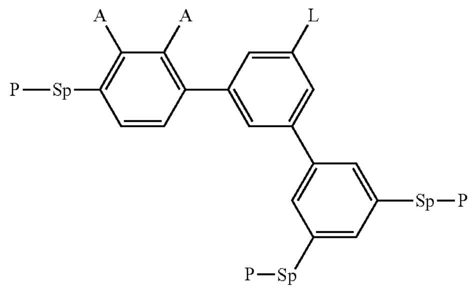
I5B-8-2
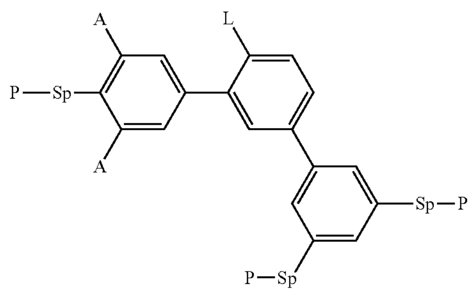
I5B-8-3
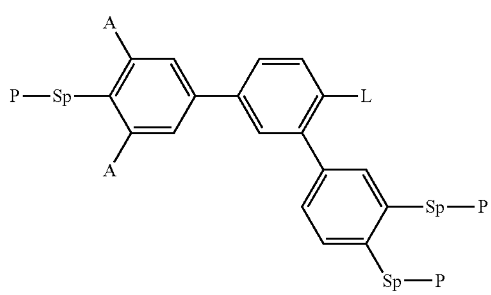
I5B-8-4
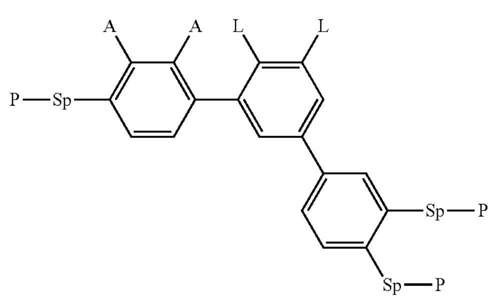

-continued
I5B-9-1
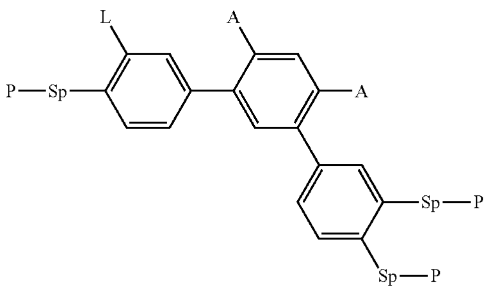
I5B-9-2
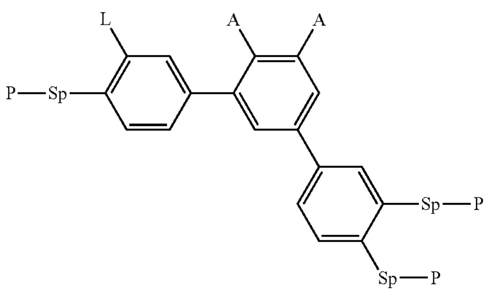
I5B-9-3
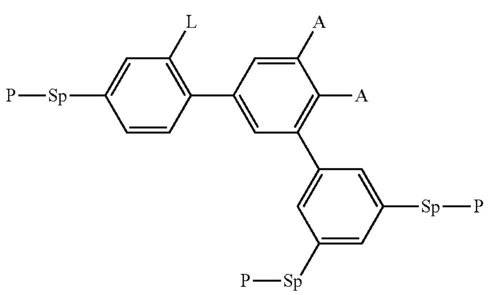
I5B-9-4
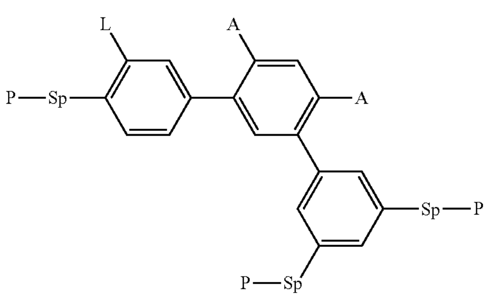
I5C-1-1
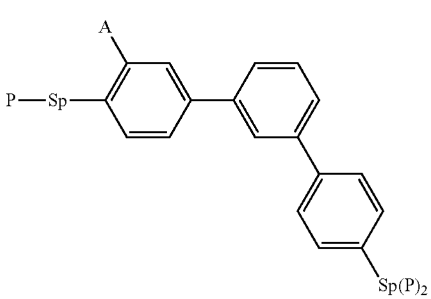
-continued
I5C-1-2
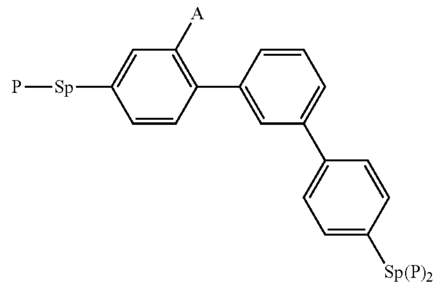
I5C-2-1
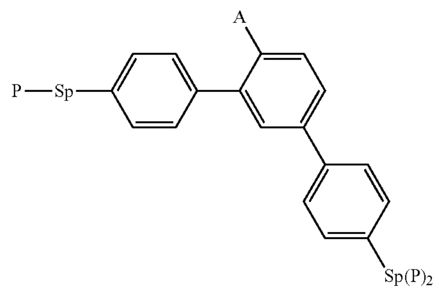
I5C-2-2
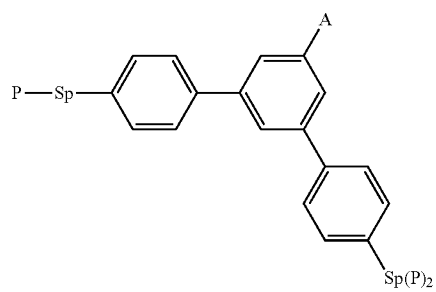
I5C-2-3
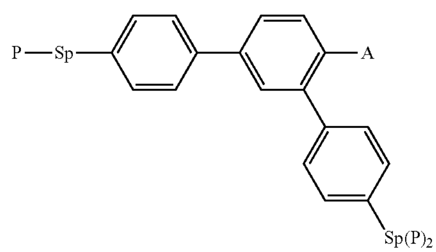
I5C-3-1
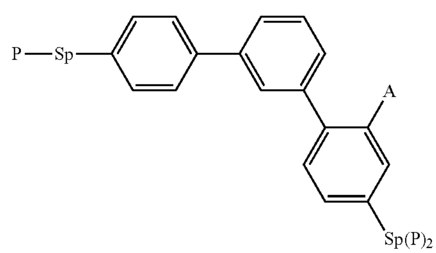
I5C-3-2
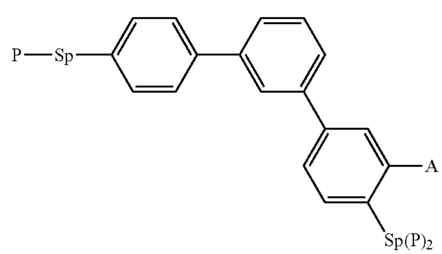

-continued
I5C-4-1
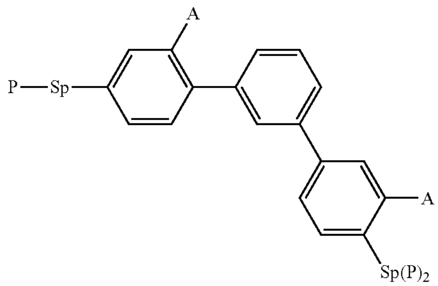
I5C-4-2
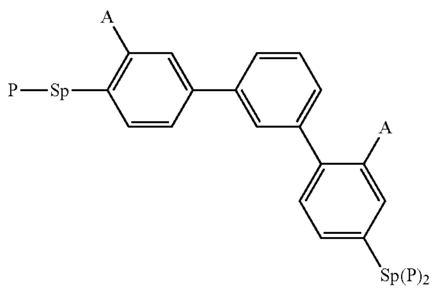
I5C-5-1
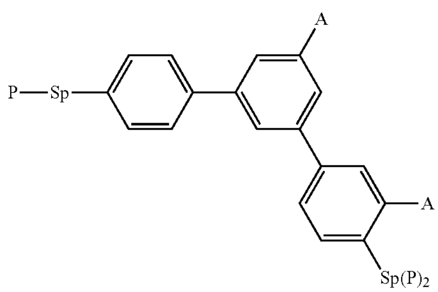
I5C-5-2
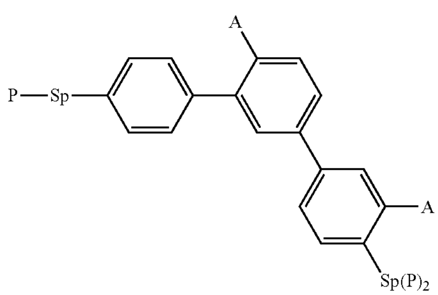
I5C-6-1
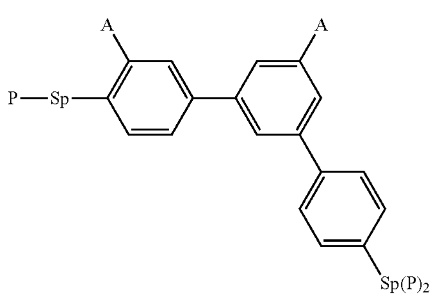
-continued
I5C-6-2
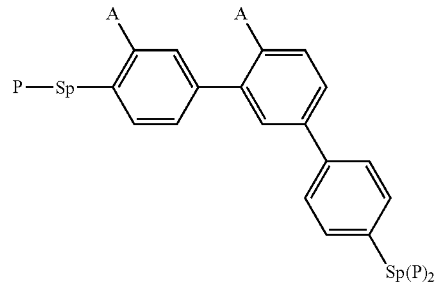
I5C-7-1
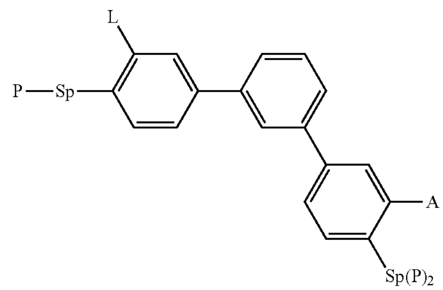
I5C-7-2
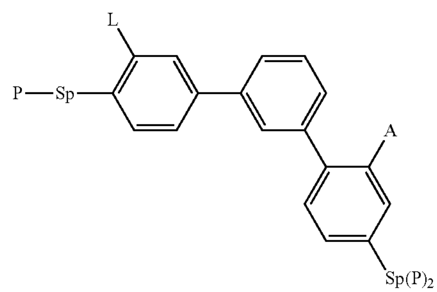
I5C-7-3
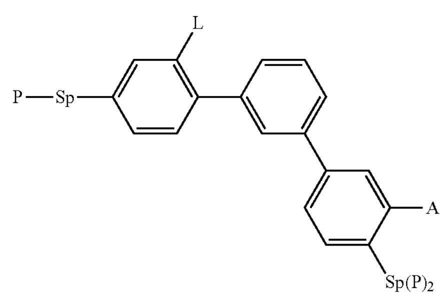
I5C-8-1
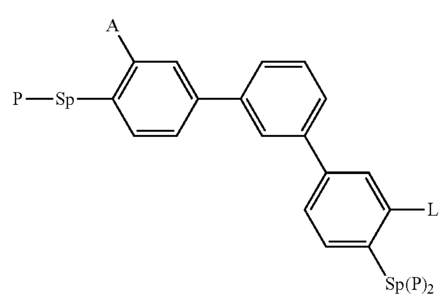

-continued
I5C-8-2
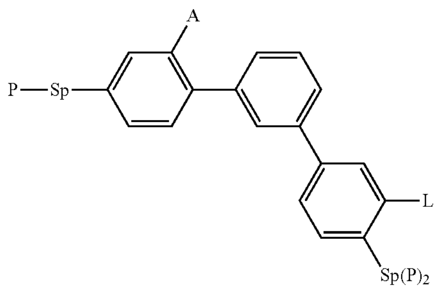
I5C-8-3
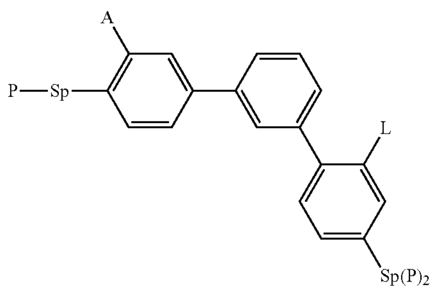
I5C-9-1
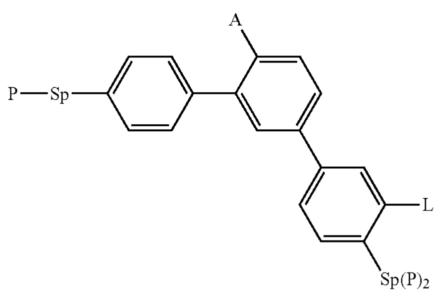
I5C-9-2
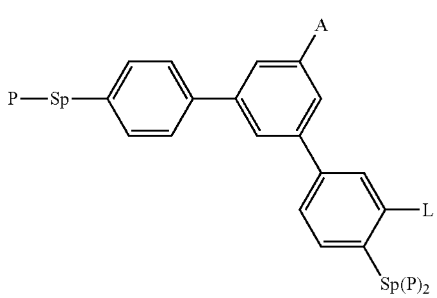
I5C-9-3
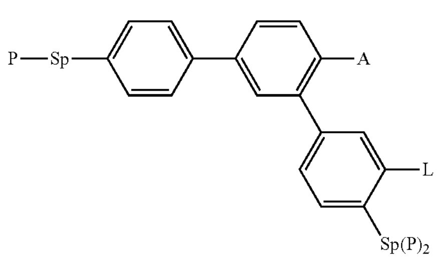
-continued
I5C-9-4
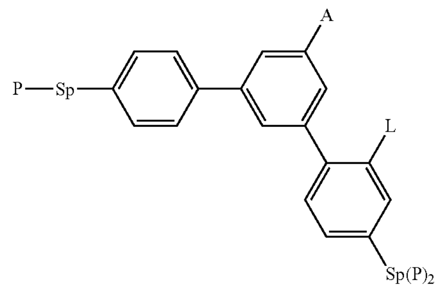
I5C-10-1
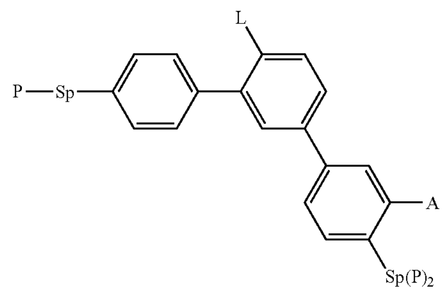
I5C-10-2
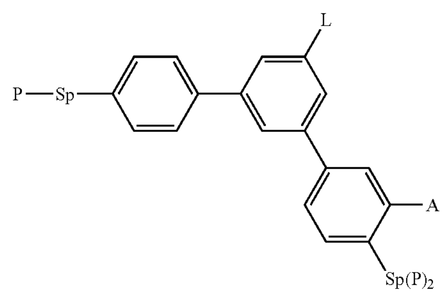
I5C-10-3
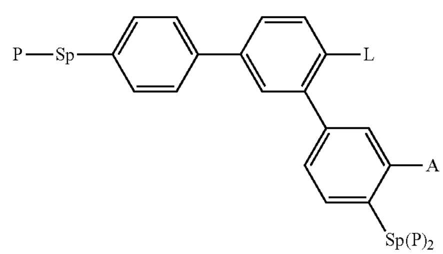
I5C-10-4
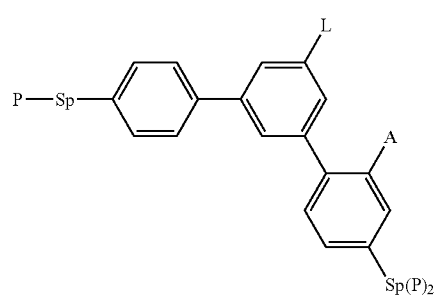

-continued
I5C-11-1
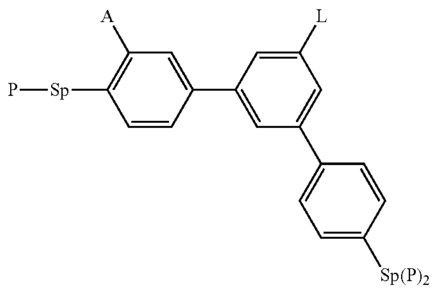
I5C-11-2
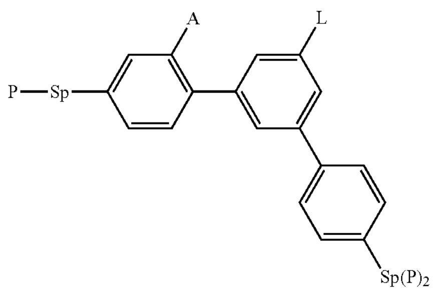
I5C-11-3
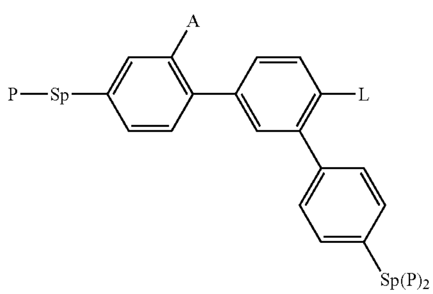
I5C-12-1
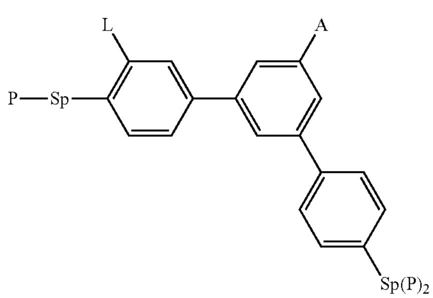
I5C-12-2
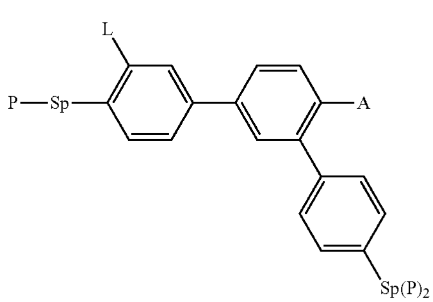
-continued
I5C-12-3
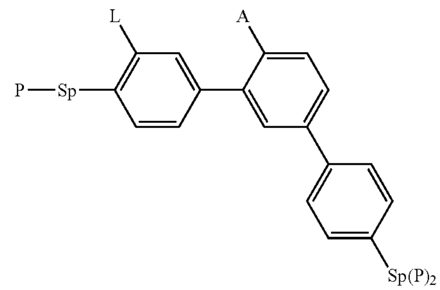
I5C-12-4
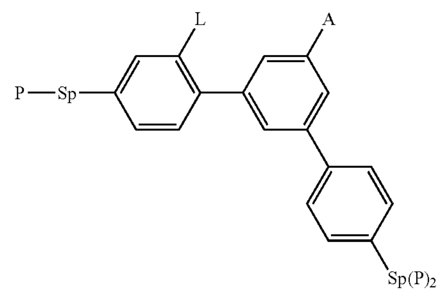
I5C-13-1
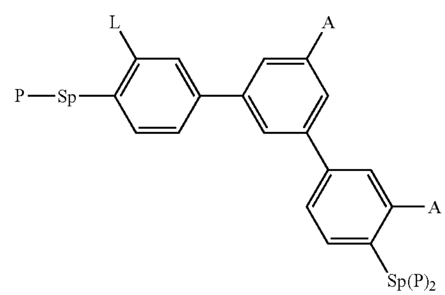
I5C-13-2
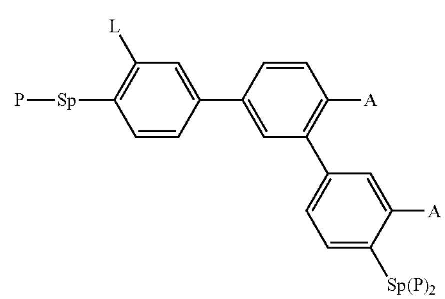
I5C-13-3
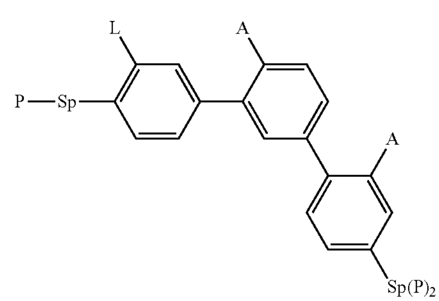

-continued
I5C-13-4
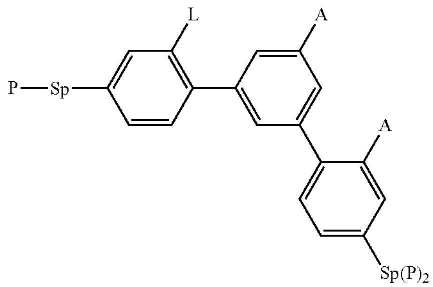
I5C-14-1
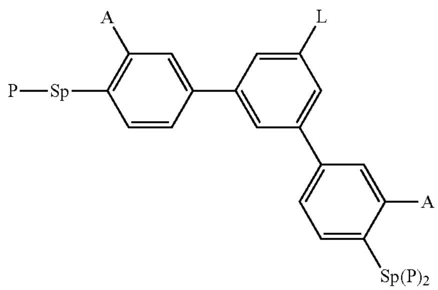
I5C-14-2
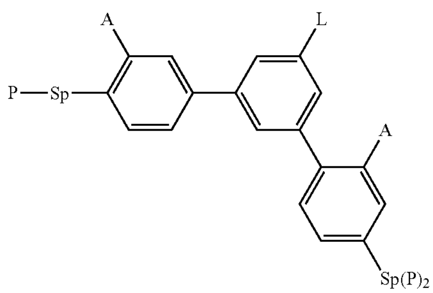
I5C-14-3
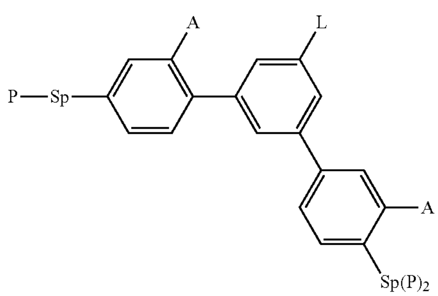
I5C-14-4
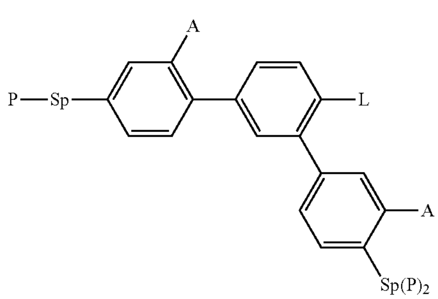
-continued
I5C-15-1
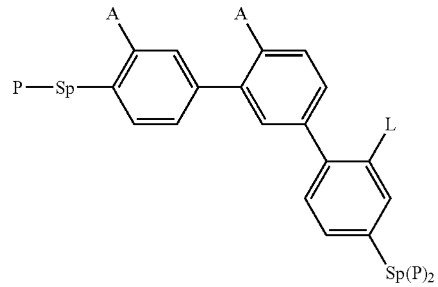
I5C-15-2
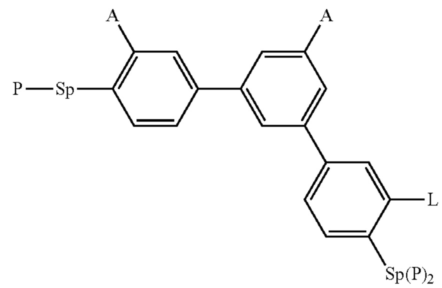
I5C-15-3
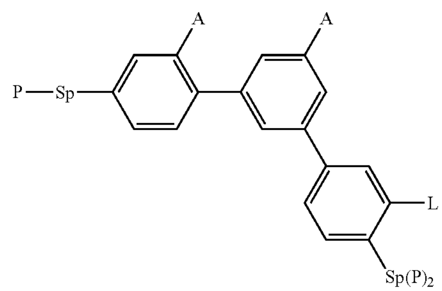
I5C-15-4
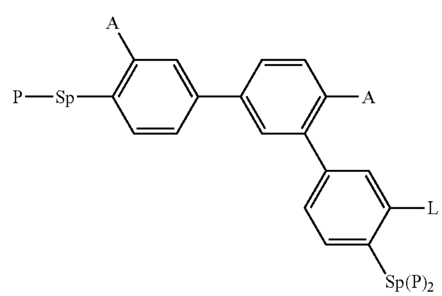
I5C-16-1
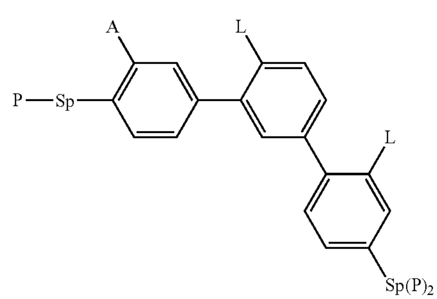

-continued
I5C-16-2
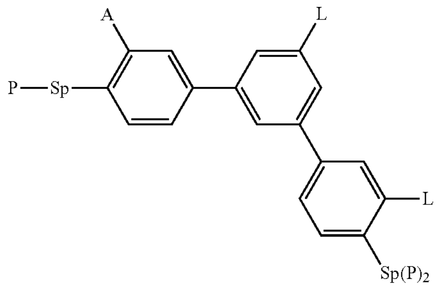
I5C-16-3
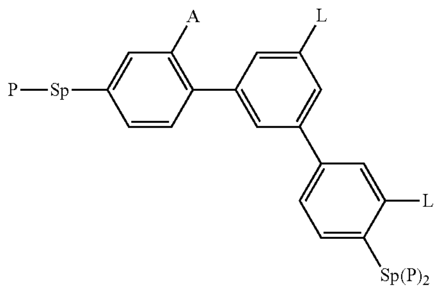
I5C-16-4
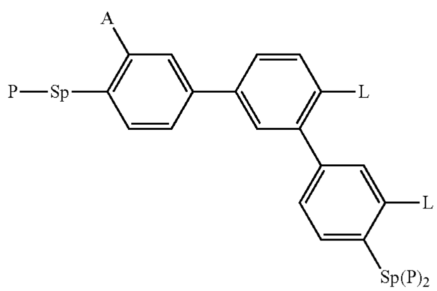
I5C-17-1
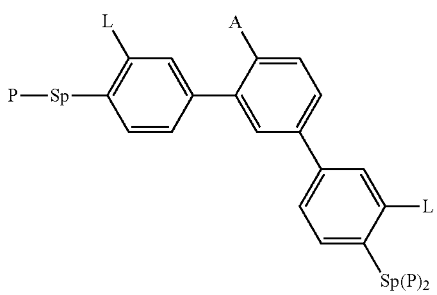
I5C-17-2
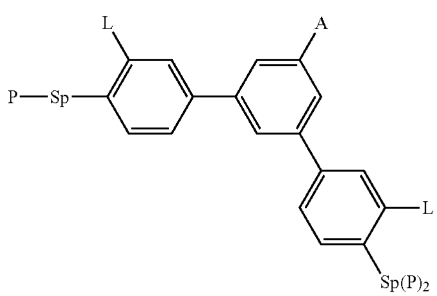
-continued
I5C-17-3
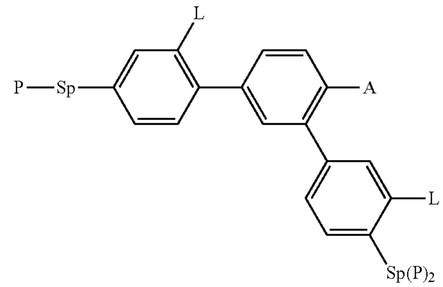
I5C-17-4
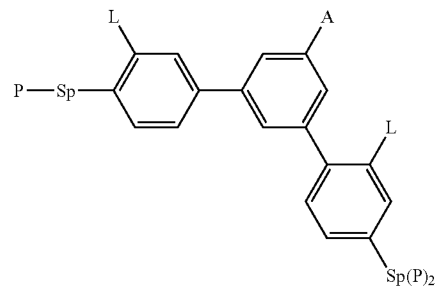
I5C-18-1
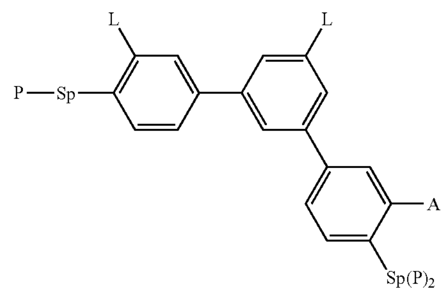
I5C-18-2
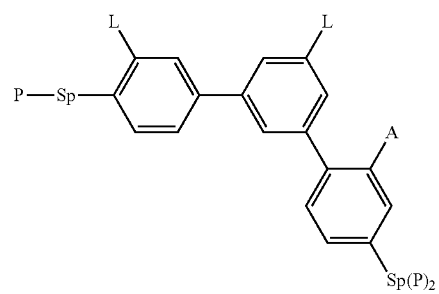
I5C-18-3
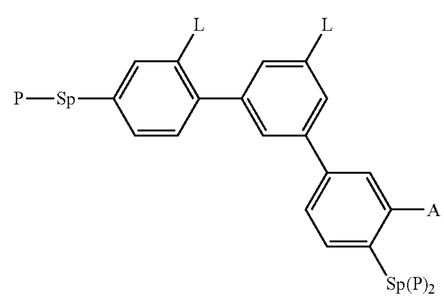

-continued
I5C-18-4
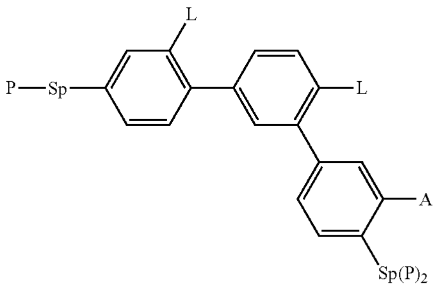
I5C-19-1
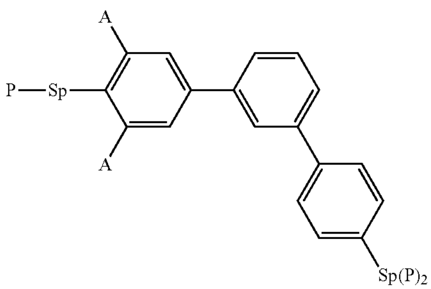
I5C-19-2
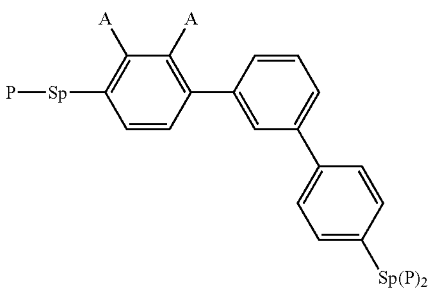
I5C-20-1
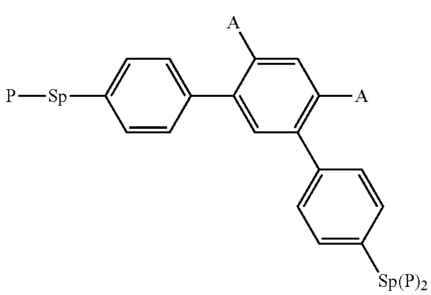
I5C-20-2
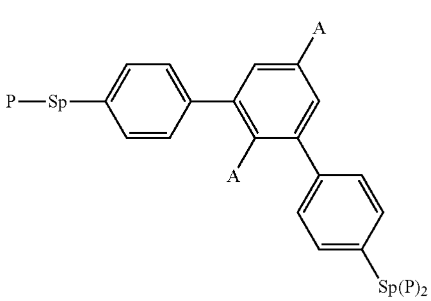
-continued
I5C-20-3
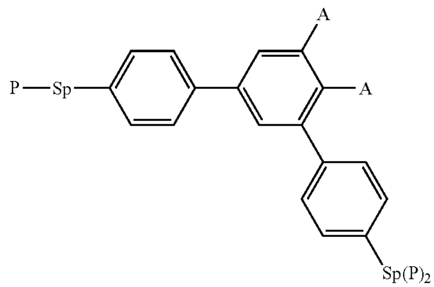
I5C-21-1
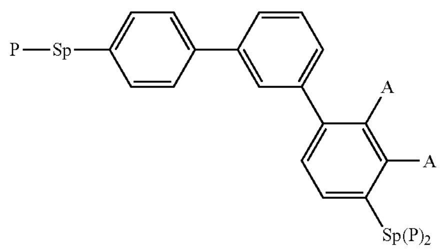
I5C-21-2
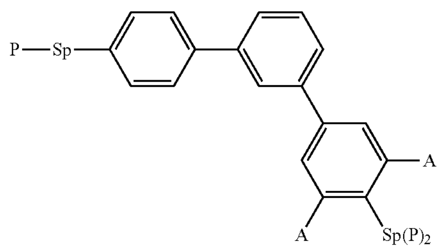
I5C-22-1
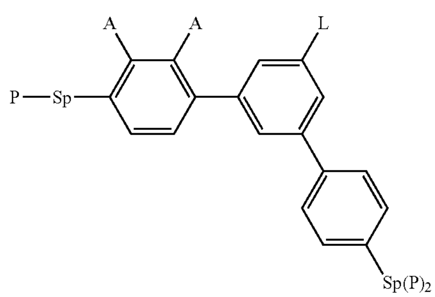
I5C-22-2
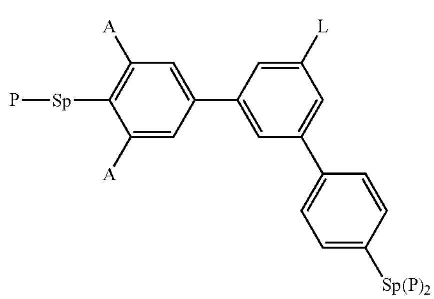

-continued
I5C-22-3
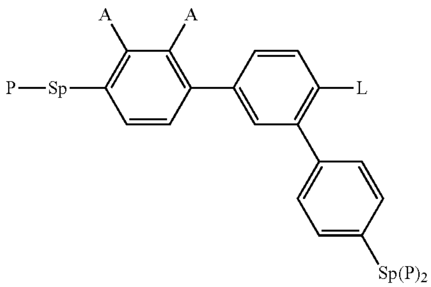
I5C-23-1
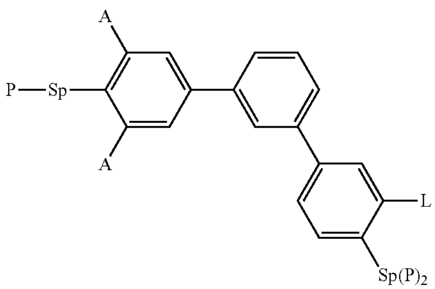
I5C-23-2
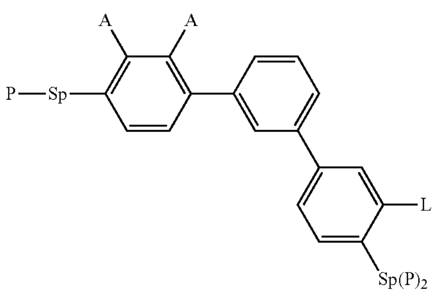
I5C-23-3
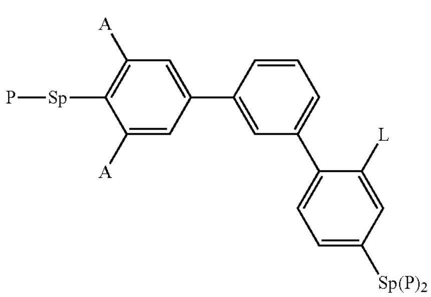
I5C-24-1
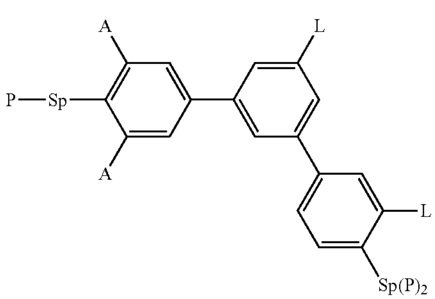
-continued
I5C-24-2
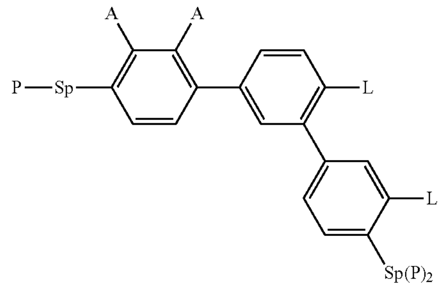
I5C-24-3
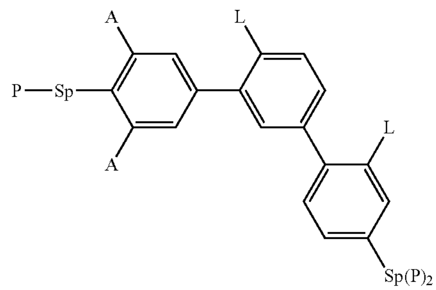
I5C-24-4
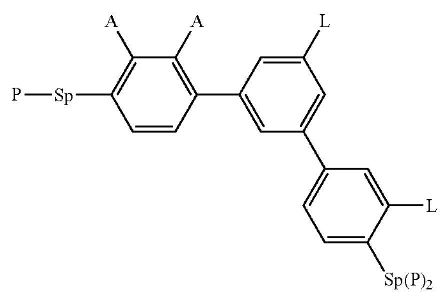
I5C-26-1
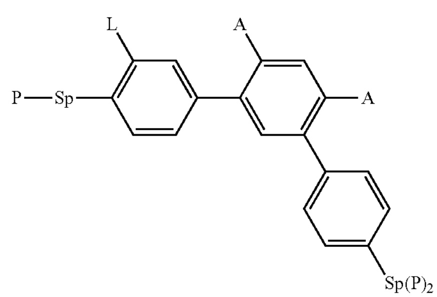
I5C-26-2
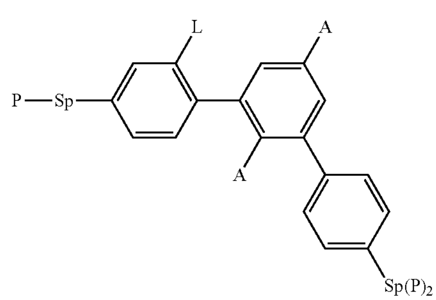

-continued
I5C-26-3
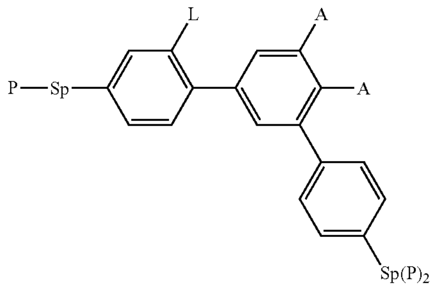
I5C-27-1
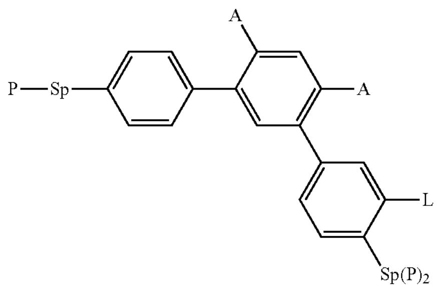
I5C-27-2
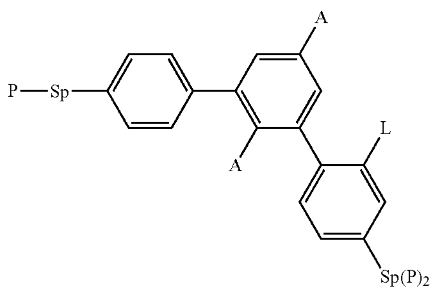
I5C-27-3
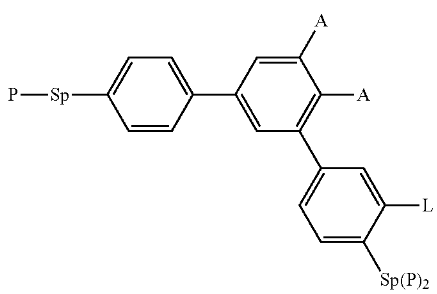
I5C-28-1
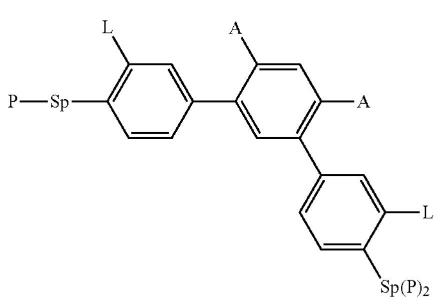
-continued
I5C-28-2
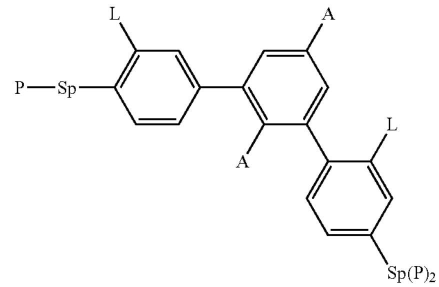
I5C-28-3
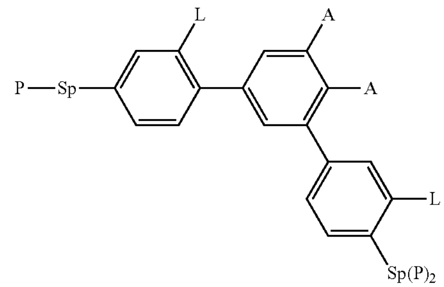
I5D-1-1
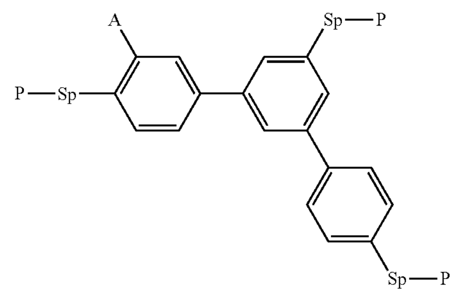
I5D-1-2
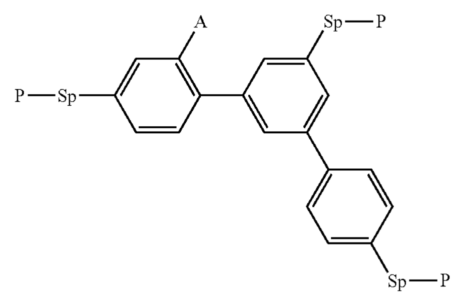
I5D-2-1
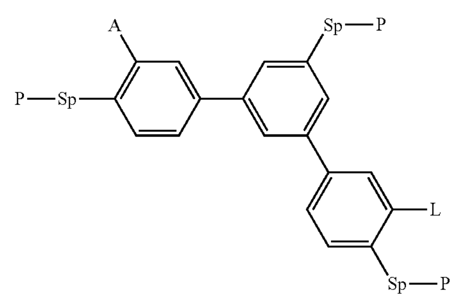

-continued
I5D-2-2
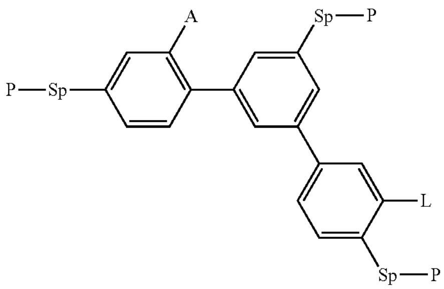
I5D-3-1
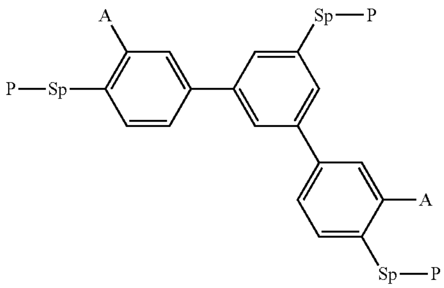
I5D-3-2
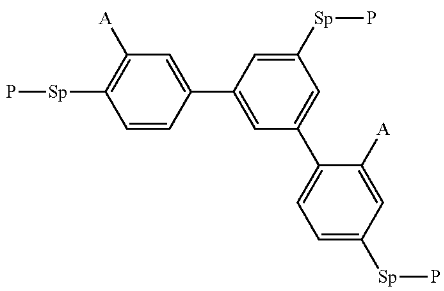
I5D-3-3
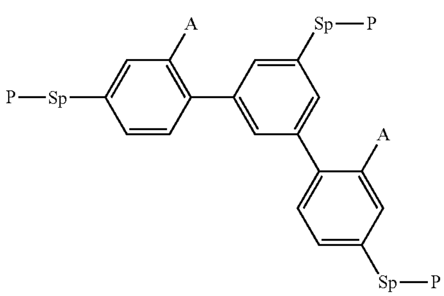
I5D-4-1
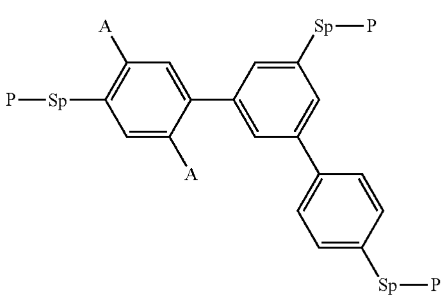
-continued
I5D-4-2
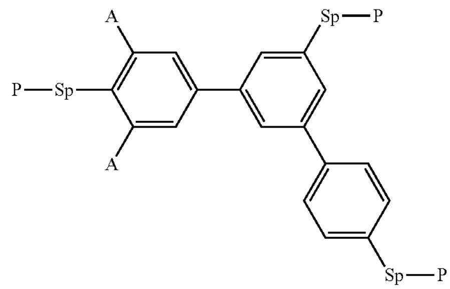
I5D-4-3
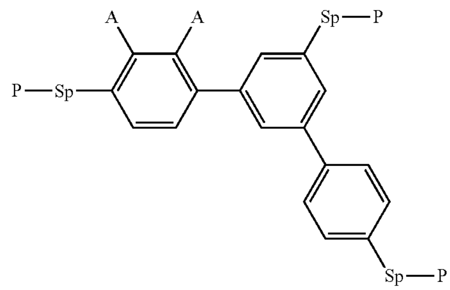
I5D-5-1
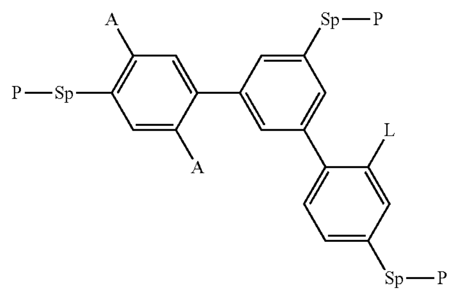
I5D-5-2
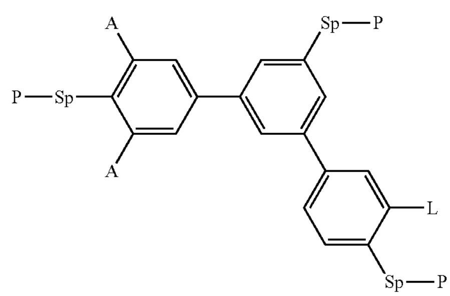
I5D-5-3
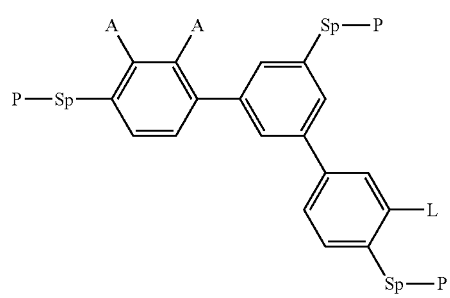
I6A-1-1
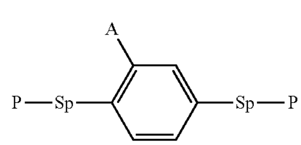

-continued

I6A-2-1

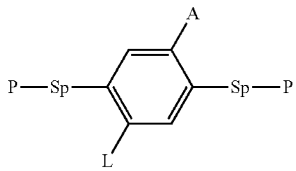

I6A-2-2

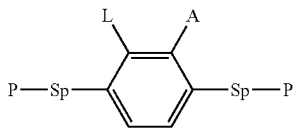

I6A-2-1

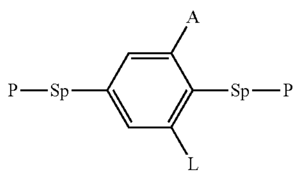

I6B-1-1

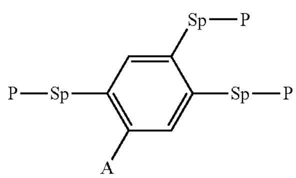

I6B-1-2

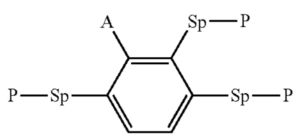

I6B-1-3

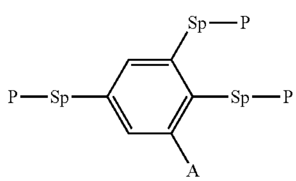

I6B-2-1

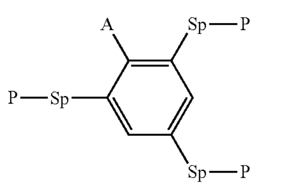

I6C-1-1

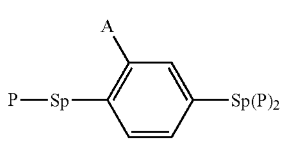

I6C-1-2

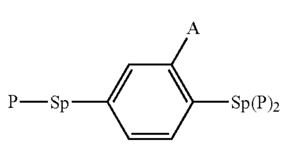

-continued

I6C-2-1

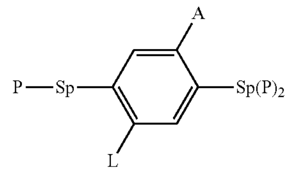

I6C-2-2

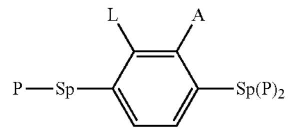

I6C-2-3

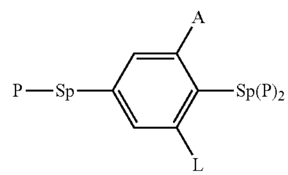

(include tetrareactives)

wherein A, P, Sp and $Sp(P)_2$ have the meanings given in formula I or one of the preferred meanings given above and below, and A is preferably —CH=$CH_2$, —$CH_2$—CH=$CH_2$, —CH=CH—$CH_3$, —CH=CH—CH=$CH_2$ or —C($CH_3$)=$CH_2$.

Preferred compounds of the formulae I1A-1-1 to I6C-2-3 are those wherein all groups Sp are a single bond. Further preferred compounds of the formulae I1A-1-1 to I6C-2-3 are those wherein one of the groups Sp is a single bond and the other groups Sp are different from a single bond.

Further preferred compounds of the formulae I1A-1-1 to I6C-2-3 are those wherein A denote —CH=$CH_2$, —$CH_2$—CH=$CH_2$, —CH=CH—$CH_3$, —CH=CH—CH=$CH_2$ or —C($CH_3$)=$CH_2$.

Further preferred compounds of the formulae I1A-1-1 to I6C-2-3 are those wherein A denote $C_{3-7}$ alkenyl, preferably —$CH_2$—CH=$CH_2$, —CH=CH—$CH_3$, —CH=CH—CH=$CH_2$ or —C($CH_3$)=$CH_2$.

Further preferred compounds of the formulae I1A-1-1 to I6C-2-3 are those wherein L denote F, Cl, CN or $OCH_3$, very preferably F.

Further preferred compounds of the formulae I1A-1-1 to I6C-2-3 are those wherein P denote acrylate or methacrylate, very preferably methacrylate.

Further preferred compounds of the formulae I1A-1-1 to I6C-2-3 are those wherein Sp, when being different from a single bond, denote alkylene with 2 to 6 C atoms.

Preferred compounds of formula I and II and their sub-formulae are selected from the following preferred embodiments, including any combination thereof:

- the compounds contain two or more groups A,
- the compounds contain one or more groups A and one or more groups L,
- the compounds contain three or more, preferably three or four unfused or fused benzene rings,
- the compounds contain at least one group A that is alkenyl with 3 to 7, preferably 3, 4 or 5, C-atoms, preferably —$CH_2$—CH=$CH_2$, —CH=CH—$CH_3$, —CH=CH—CH=$CH_2$ or —C($CH_3$)=$CH_2$,
- A is alkenyl with 3 to 7, preferably 3, 4 or 5, C-atoms, preferably —$CH_2$—CH=$CH_2$, —CH=CH—$CH_3$, —CH=CH—CH=$CH_2$ or —C($CH_3$)=$CH_2$,

- A is alkenyl with 2 to 4 C atoms, preferably —CH═$CH_2$, —$CH_2$—CH═$CH_2$, —CH═CH—$CH_3$, —CH═CH—CH═$CH_2$ or —C($CH_3$)═$CH_2$,
- the compounds contain exactly two polymerizable groups (represented by the groups P),
- the compounds contain at least three, preferably exactly three, polymerizable groups (represented by the groups P),
- P is selected from the group consisting of acrylate, methacrylate and oxetane, very preferably acrylate or methacrylate,
- P is methacrylate,
- Pg is a hydroxyl group,
- all groups Sp are a single bond,
- at least one of the groups Sp is a single bond and at least one of the groups Sp is different from a single bond,
- Sp, when being different from a single bond, is —$(CH_2)_{p2}$—, —$(CH_2)_{p2}$—O—, —$(CH_2)_{p2}$—CO—O—, —$(CH_2)_{p2}$—O—CO—, wherein p2 is 2, 3, 4, 5 or 6, and the O-atom or the CO-group, respectively, is connected to the benzene ring,
- Sp is a single bond or denote —$(CH_2)_{p2}$—, —$(CH_2)_{p2}$—O—, —$(CH_2)_{p2}$—CO—O—, —$(CH_2)_{p2}$—O—CO—, wherein p2 is 2, 3, 4, 5 or 6, and the 0-atom or the CO-group, respectively, is connected to the benzene ring,
- $Sp(P)_2$ is selected from subformulae Sp1a-Sp3a, Rb denote P-Sp-,
- $R^b$ does not denote or contain a polymerizable group,
- $R^b$ does not denote or contain a polymerizable group and denote straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F or Cl,
- L and $L^{14-16}$ are selected from the group consisting of F, Cl, CN, alkyl, alkoxy, alkylcarbonyl, alkoxycarbonyl, alkylcarbonyloxy or alkoxycarbonyloxy each having 1 to 6 C atoms, in which one or more H atoms may optionally be replaced by F or Cl, preferably F, Cl, CN or $OCH_3$, very preferably F.

Very preferred compounds of formula I and its subformulae are selected from the following subformulae:

I-1

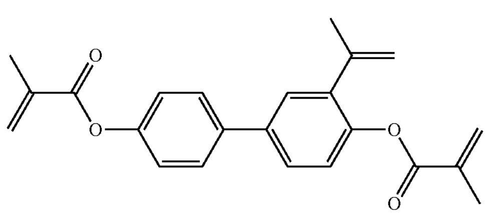

I-2

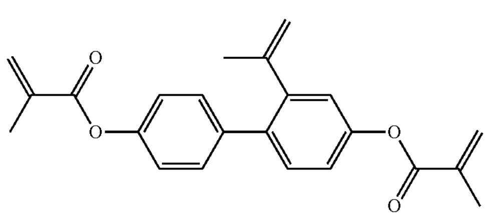

-continued

I-3

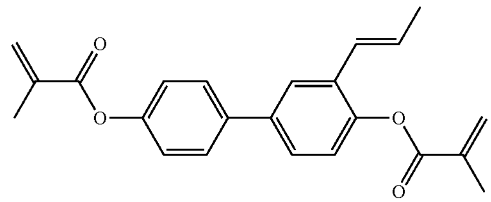

I-4

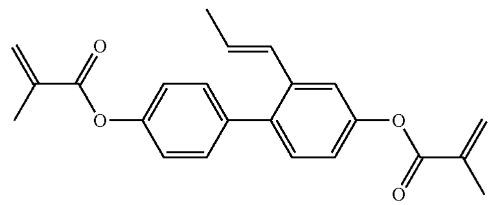

I-5

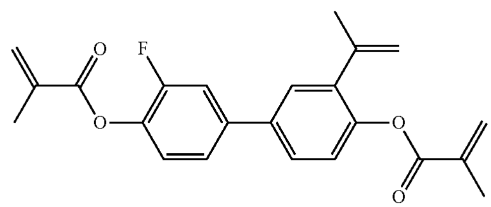

I-6

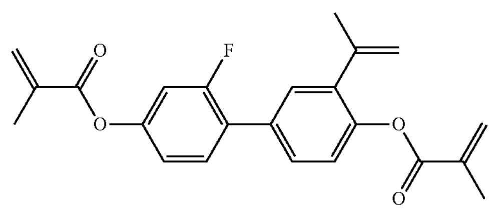

I-7

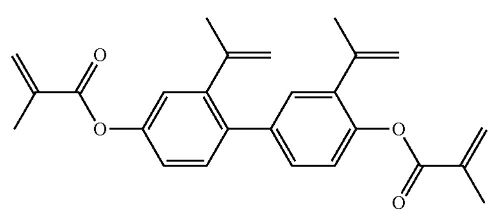

I-8

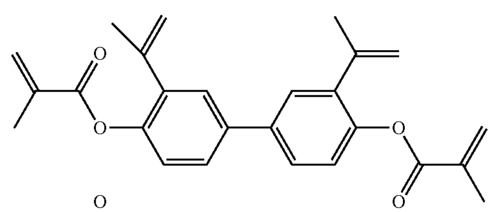

I-9

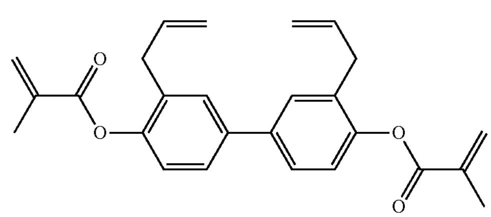

-continued
I-10
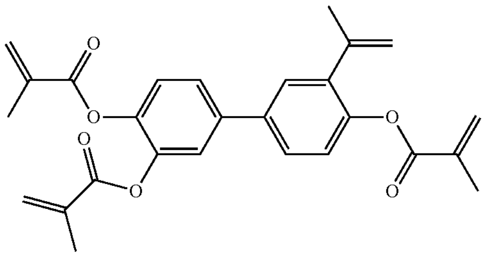
I-11
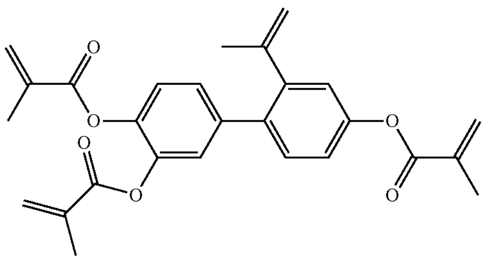
I-12
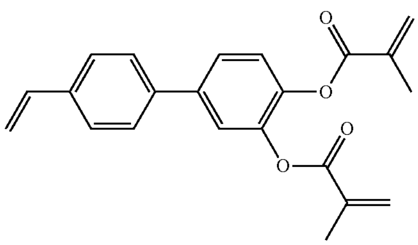
I-13
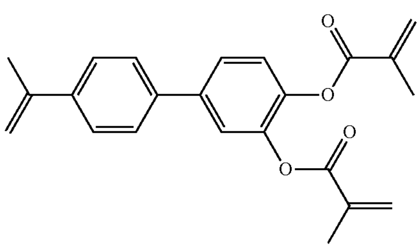
I-14
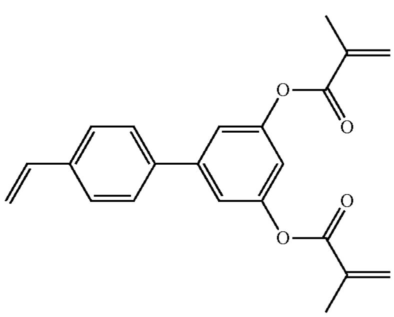
I-15
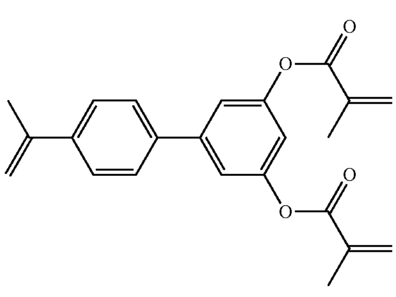
-continued
I-16
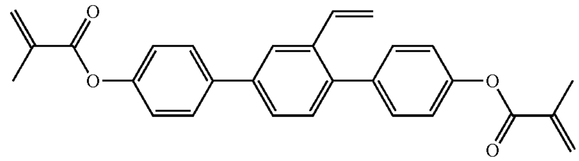
I-17
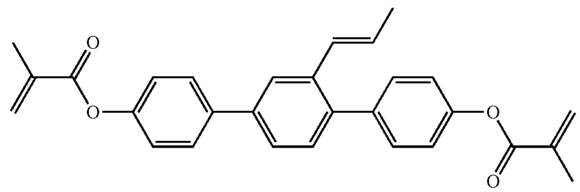
I-18
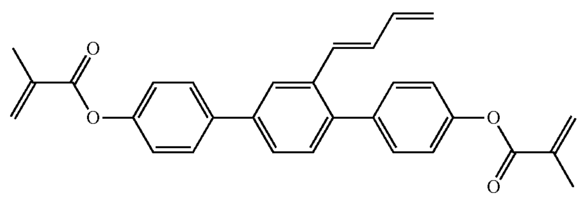
I-19
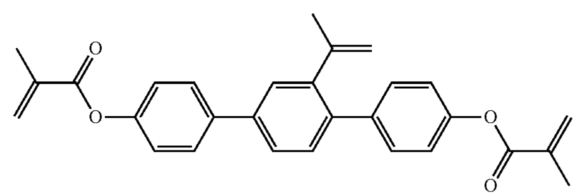
I-20
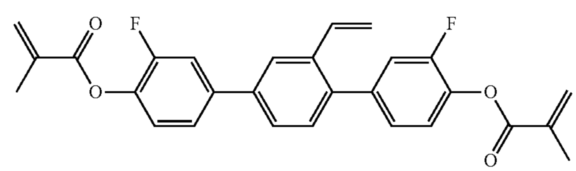
I-21
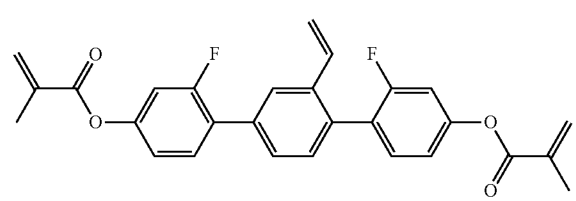
I-22
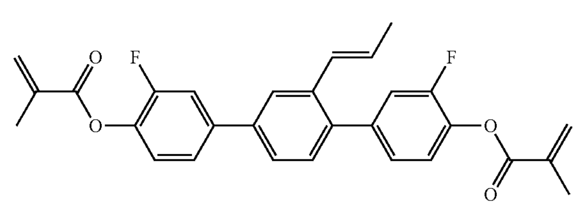

-continued

I-23

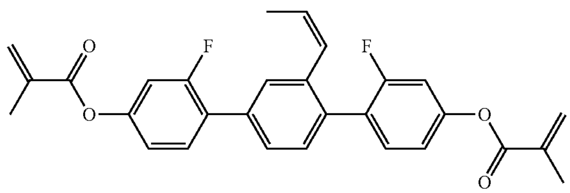

I-24

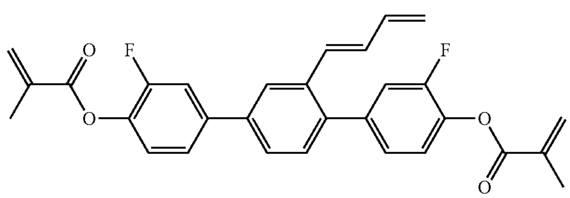

I-25

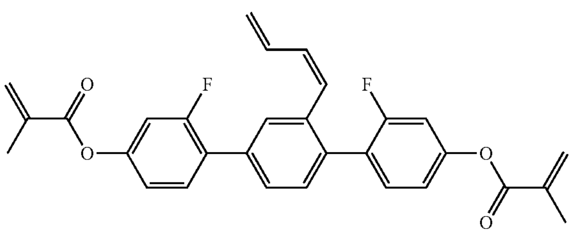

I-26

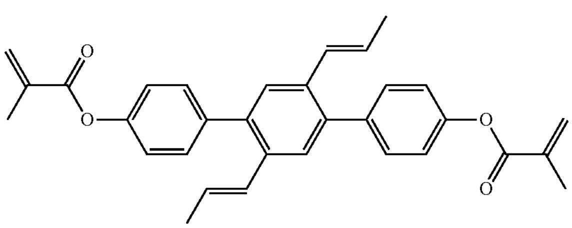

I-27

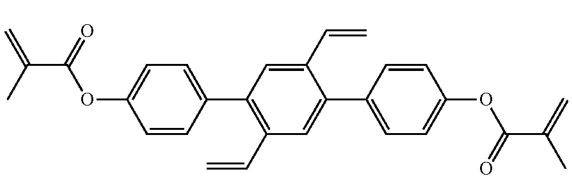

I-28

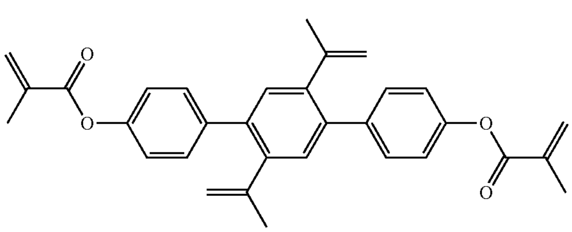

-continued

I-29

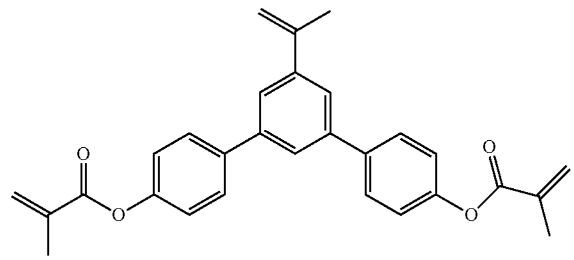

I-30

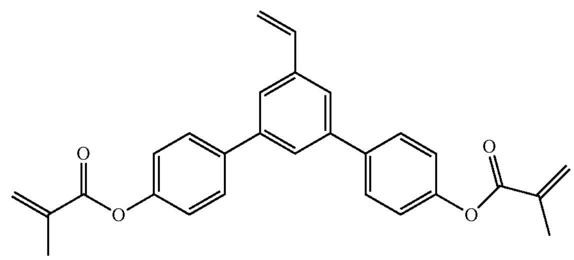

(include tetrareactives)

Preferably the LC medium according to the present invention contains one or more of self-alignment additives of formula II.

Suitable SA additives to induce homeotropic alignment, especially for use in SA-VA mode displays, are disclosed for example in US 2013/0182202, A1, US 2014/0838581 A1, US 2015/0166890 A1 and US 2015/0252265 A1. Self-alignment additives containing a polymerisable group can be polymerised in the LC medium under similar conditions as applied for the RMs in the PSA process.

Preferably in the self-alignment additives of formula II the group MES contains two or more rings which are selected from aromatic, alicyclic and hererocyclic groups as defined above, including their preferred meanings. Most preferred rings are 1,4-phenylene, which may be substituted by $L^{12}$ and P-Sp- as defined below, or 1,4-cyclohexylene.

In formula II the group MES preferably is a group selected from the following structures, which may be mono- or polysubstituted by any of the substituents $L^{12}$ and P-Sp-:

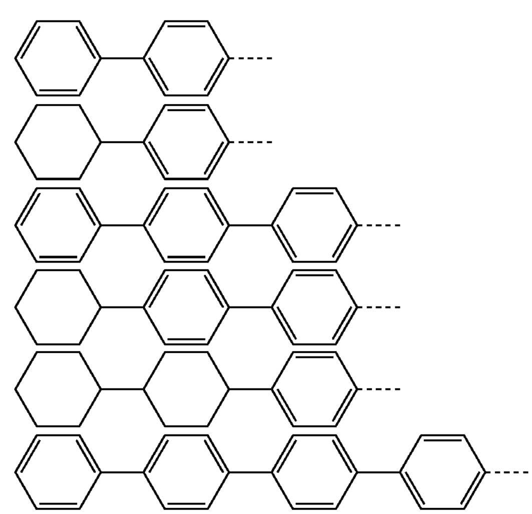

-continued

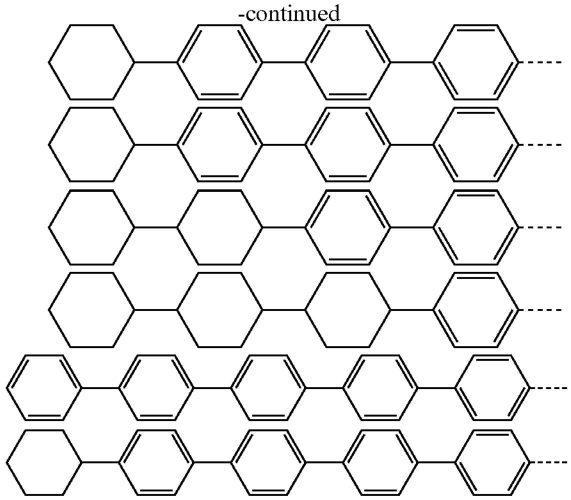

wherein $L^{12}$ in each case, independently of one another, denote F, Cl, Br, I, —CN, —$NO_2$, —NCO, —NCS, —OCN, —SCN, —C(═O)N($R^0$)$_2$, —C(═O)$R^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having up to 25 C atoms, in which, in addition, one or more H atoms may each be replaced by F or Cl, P denote a polymerizable group, and Sp denote a spacer group or a single bond, and the dotted line indicates the attachment point of the polar anchor group $R^a$.

Preferably the self-alignment additive for vertical alignment is selected of formula IIa $$R^{21}\text{-}[A^{22}\text{-}Z^{22}]_{m2}\text{—}A^{22}\text{-}R^a \qquad \text{IIa}$$

in which $A^{21}$, $A^{22}$ each, independently of one another, denote an aromatic, heteroaromatic, alicyclic or heterocyclic group, which may also contain fused rings, and which may also be mono- or polysubstituted by a group $L^{12}$ or -Sp-P, $L^{12}$ in each case, independently of one another, denote F, Cl, Br, I, —CN, —$NO_2$, —NCO, —NCS, —OCN, —SCN, —C(═O)N($R^0$)$_2$, —C(═O)$R^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having up to 25 C atoms, in which, in addition, one or more H atoms may each be replaced by F or Cl, P denote a polymerizable group, Sp denote a spacer group or a single bond, $Z^{22}$ in each case, independently of one another, denote a single bond, —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —($CH_2$)$_{n1}$—, —$CF_2CH_2$—, —$CH_2CF_2$—, —($CF_2$)$_{n1}$—, —CH═CH—, —CF═CF—, —C≡C—, —CH═CH—COO—, —OCO—CH═CH—, —($CR^0R^{00}$)$_{n1}$—, —CH(—Sp-P)—, —$CH_2$CH(—Sp-P)—, or —CH(—Sp-P)CH(—Sp-P)—, n1 denote 1, 2, 3 or 4, m2 denote 1, 2, 3, 4, 5 or 6, $R^0$ in each case, independently of one another, denote alkyl having 1 to 12 C atoms, $R^{00}$ in each case, independently of one another, denote H or alkyl having 1 to 12 C atoms, $R^{21}$ independently of one another, denote H, halogen, straight-chain, branched or cyclic alkyl having 1 to 25 C atoms, in which, in addition, one or more non-adjacent $CH_2$ groups may each be replaced by —O—, —S—, —CO—, —CO—O—, —O—CO—, or —O—CO—O— in such a way that O and/or S atoms are not linked directly to one another and in which, in addition, one or more H atoms may each be replaced by F or Cl, or a group P-Sp-, and $R^a$ is defined as above, preferably denote a polar anchor group further defined by having at least one group selected from —OH, —$NH_2$, $NHR^{22}$, C(O)OH and —CHO, where $R^{22}$ denote alkyl having 1 to 12 C atoms.

In another preferred embodiment an LC medium or a polymer stabilised SA-VA display according to the present invention contains one or more self-alignment additives selected from Table E below.

The anchor group Ra of the self-alignment additive is more preferably defined as $R^a$ an anchor group of the formula

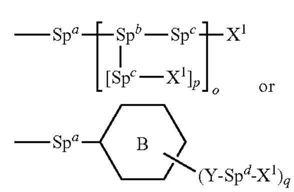

wherein p denote 1 or 2, q denote 2 or 3,

B denote a substituted or unsubstituted ring system or condensed ring system, preferably a ring system selected from benzene, pyridine, cyclohexane, dioxane or tetrahydropyran, Y on each occurrence identically or differently denote —O—, —S—, —C(O)—, —C(O)O—, —OC(O)—, —$NR^{11}$— or a single bond, denote 0 or 1, $X^1$ on each occurrence identically or differently denote H, alkyl, fluoroalkyl, OH, $NH_2$, $NHR^{22}$, $NR^{22}_2$, $OR^{22}$, C(O)OH, or —CHO, where at least one group $X^1$ denote a radical selected from —OH, —$NH_2$, $NHR^{22}$, C(O)OH and —CHO, $R^{22}$ denote alkyl having 1 to 12 C atoms, $Sp^a$, $Sp^c$, $Sp^d$ each, independently of one another, denote a spacer group or a single bond, and $Sp^b$ denote a tri- or tetravalent group, preferably CH, N or C.

Formulae II and IIa optionally include polymerizable compounds. Within this disclosure the "medium comprising a compound of formula II/IIa" refers to both, the medium comprising the compound of formula II/IIa and, alternatively, to the medium comprising the compound in its polymerized form.

For the case the one or more compounds of formula II are substituted with one or more polymerizable groups (—Sp-P), the LC medium according to the invention comprises a polymerisable component A) comprising, preferably consisting of, polymerisable compounds, at least one of which is a compound of formula I and at least one of which is of formula II, a liquid-crystalline component B), hereinafter also referred to as "LC host mixture", comprising, preferably consisting of, one or more mesogenic or liquid-crystalline compounds.

In the compounds of the formulae IIa, and subformulae thereof, $Z^{22}$ preferably denote a single bond, —$C_2H_4$—, —$CF_2O$— or —$CH_2O$—. In a specifically preferred embodiment $Z^{22}$ denote a single bond.

In the compounds of the formula IIa, the group $L^{12}$, in each case independently, preferably denote F or alkyl, preferably $CH_3$, $C_2H_5$ or $C_3H_7$.

Preferred compounds of the formula IIa are illustrated by the following sub-formulae II—A to II-D

II-A

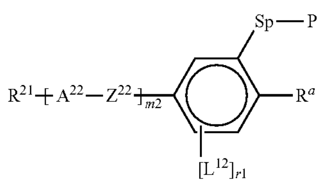

II-B

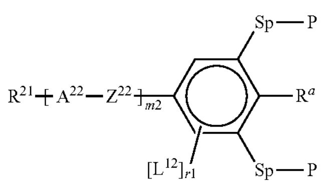

II-C

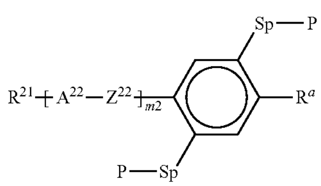

II-D

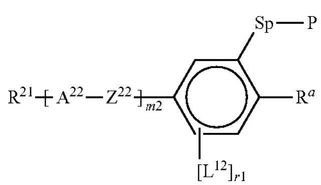

in which $R^{21}$, $R^a$, $A^{22}$, $Z^{22}$, Sp, P and $L^{12}$ have the meanings as defined for formula IIa above, m2 independently is 1, 2 or 3, and r1 independently is 0, 1, 2, 3, or 4, preferably 0, 1 or 2.

In the compounds of the formulae II—A to II-D, $L^{12}$ preferably denote F or alkyl, preferably $CH_3$, $C_2H_5$ or $C_3H_7$.

In a preferred embodiment r1 denote 0.

The polymerizable group P of formulae II, IIa, II—A to II-D preferably is methacrylate, acrylate or another substituted acrylate, most preferably methacrylate.

In the above and below formulae IIa or II—A to II-D and their subformulae $Z^{22}$ preferably independently denote a single bond or —$CH_2CH_2$—, and very particularly a single bond.

$R^a$ denote preferably

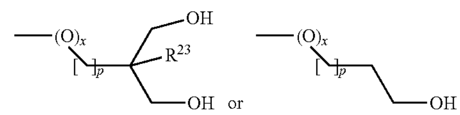

wherein p is 1, 2, 3, 4, 5 or 6, x is 1 or 0, preferably 1, and $R^{23}$ is H, methyl, ethyl, n-propyl, i-propyl, n-butyl, tert-butyl, n-pentyl, or —$CH_2CH_2$-tert-butyl, $R^a$ denote very preferably —$O(CH_2)_2$—OH, —$O(CH_2)_3$—OH,

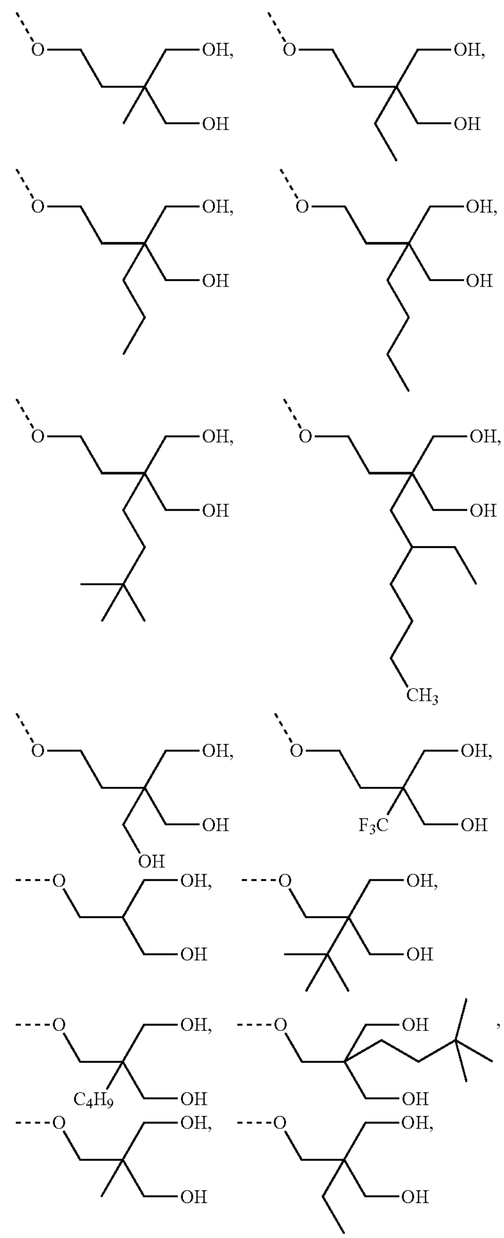

-continued

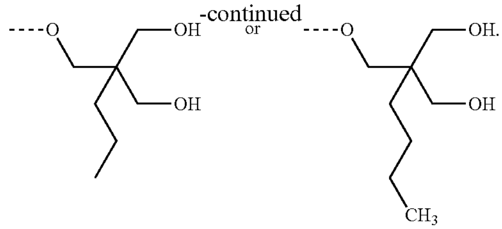

In the formula IIa and in the sub-formulae of the formula IIa $R^{21}$ preferably denote a straight-chain alkyl or branched alkyl radical having 1-8 C atoms, preferably a straight-chain alkyl radical. In the compounds of the formulae IIa or II—A to II-D $R^1$ more preferably denote $CH_3$, $C_2H_5$, n-$C_3H_7$, n-$C_4H_9$, n-$C_5H_{11}$, n-$C_6H_{13}$ or $CH_2CH(C_2H_5)C_4H_9$. $R^{21}$ furthermore may denote alkenyloxy, in particular $OCH_2CH{=}CH_2$, $OCH_2CH{=}CHCH_3$, $OCH_2CH{=}CHC_2H_5$, or alkoxy, in particular $OC_2H_5$, $OC_3H_7$, $OC_4H_9$, $OC_5H_{11}$ and $OC_6H_{13}$. Particularly preferable $R^{21}$ denote a straight chain alkyl residue, preferably $C_5H_{11}$.

In a preferred embodiment of the invention the LC medium comprises a compound of formula II, which is polymerizable. The following combinations of polmerizable additives of formula I and II are preferred:

The LC medium comprises one or more compounds selected from formulae I1 to I6, preferably from formulae I1A to I6C, more preferably from formulae I1A-1 to I6C-3, very preferably from formulae I1A-1-1 to I6C-2-3, most preferably from formulae I-1 to I-30, and one or more compounds of formula II;

the LC medium comprises one or more compounds selected from formulae I1 to I6, preferably from formulae I1A to I6C, more preferably from formulae I1A-1 to I6C-3, very preferably from formulae I1A-1-1 to I6C-2-3, most preferably from formulae I-1 to I-30, and one or more compounds of formula II—A or II-B;

the LC medium comprises one or more compounds selected from formulae I1 to I6, preferably from formulae I1A to I6C, more preferably from formulae I1A-1 to I6C-3, very preferably from formulae I1A-1-1 to I6C-2-3, most preferably from formulae I-1 to I-30, and one or more compounds of formula II-B.

The compounds of the formula I and its sub-formulae and their intermediates can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

For example, compounds of formula I can be synthesised by esterification or etherification of intermediates, wherein the group Sp-P denote OH, using corresponding acids, acid derivatives, or halogenated compounds containing a polymerisable group P.

For example, acrylic or methacrylic esters can be prepared by esterification of the corresponding alcohols with acid derivatives like, for example, (meth)acryloyl chloride or (meth)acrylic anhydride in the presence of a base like pyridine or triethyl amine, and 4-(N,N-dimethylamino)pyridine (DMAP). Alternatively the esters can be prepared by esterification of the alcohols with (meth)acrylic acid in the presence of a dehydrating reagent, for example according to Steglich with dicyclohexylcarbodiimide (DCC), N-(3-dimethylaminopropyl)-N'-ethylcarbodiimide (EDC) or N-(3-dimethylaminopropyl)-N'-ethylcarbodiimide hydrochloride and DMAP.

Further suitable methods are shown in the examples.

For the production of PSA displays, the polymerisable compounds contained in the LC medium are polymerised or crosslinked (if one compound contains two or more polymerisable groups) by in-situ polymerisation in the LC medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

A preferred PSA type LC display of the present invention comprises:

a first substrate including a pixel electrode defining pixel areas, the pixel electrode being connected to a switching element disposed in each pixel area and optionally including a micro-slit pattern, and optionally a first alignment layer disposed on the pixel electrode, a second substrate including a common electrode layer, which may be disposed on the entire portion of the second substrate facing the first substrate, and optionally a second alignment layer, an LC layer disposed between the first and second substrates and including an LC medium comprising a polymerisable component A and a liquid crystal component B as described above and below, wherein the polymerisable component A may also be polymerised.

The first and/or second alignment layer controls the alignment direction of the LC molecules of the LC layer. For example, in PS-VA displays the alignment layer is selected such that it imparts to the LC molecules homeotropic (or vertical) alignment (i.e. perpendicular to the surface) or tilted alignment. Such an alignment layer may for example comprise a polyimide, which may also be rubbed, or may be prepared by a photoalignment method.

The LC layer with the LC medium can be deposited between the substrates of the display by methods that are conventionally used by display manufacturers, for example the so-called one-drop-filling (ODF) method. The polymerisable component of the LC medium is then polymerised for example by UV photopolymerisation. The polymerisation can be carried out in one step or in two or more steps.

The PSA display may comprise further elements, like a colour filter, a black matrix, a passivation layer, optical retardation layers, transistor elements for addressing the individual pixels, etc., all of which are well known to the person skilled in the art and can be employed without inventive skill.

The electrode structure can be designed by the skilled person depending on the individual display type. For example for PS-VA displays a multi-domain orientation of the LC molecules can be induced by providing electrodes having slits and/or bumps or protrusions in order to create two, four or more different tilt alignment directions.

Upon polymerisation the polymerisable compounds form a crosslinked polymer, which causes a certain tilt of the LC molecules in the LC medium. Without wishing to be bound to a specific theory, it is believed that at least a part of the crosslinked polymer, which is formed by the polymerisable compounds, will phase-separate or precipitate from the LC medium and form a polymer layer on the substrates or electrodes, or the alignment layer provided thereon. Microscopic measurement data (like SEM and AFM) have confirmed that at least a part of the formed polymer accumulates at the LC/substrate interface.

The polymerisation can be carried out in one step. It is also possible firstly to carry out the polymerisation, optionally while applying a voltage, in a first step in order to produce a tilt angle, and subsequently, in a second polymerisation step without an applied voltage, to polymerise or crosslink the compounds which have not reacted in the first step ("end curing").

Suitable and preferred polymerisation methods are, for example, thermal or photopolymerisation, preferably photopolymerisation, in particular UV induced photopolymerisation, which can be achieved by exposure of the polymerisable compounds to UV radiation.

Optionally one or more polymerisation initiators are added to the LC medium. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If a polymerisation initiator is employed, its proportion is preferably 0.001 to 5% by weight, particularly preferably 0.001 to 1% by weight.

The polymerisable compounds according to the invention are also suitable for polymerisation without an initiator, which is accompanied by considerable advantages, such, for example, lower material costs and in particular less contamination of the LC medium by possible residual amounts of the initiator or degradation products thereof. The polymerisation can thus also be carried out without the addition of an initiator. In a preferred embodiment, the LC medium thus does not contain a polymerisation initiator.

The LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerisable component (component A), is preferably 10-50,000 ppm, particularly preferably 50-5,000 ppm.

In a preferred embodiment the liquid-crystalline media contain one or more chiral dopants, preferably in a concentration from 0.01 to 1% by weight, very preferably from 0.05 to 0.5% by weight. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the liquid-crystalline media contain a racemate of one or more chiral dopants, which are preferably selected from the chiral dopants mentioned in the previous paragraph.

In another preferred embodiment of the present invention the liquid-crystalline media contain one or more further stabilisers, preferably selected from the group consisting of the following formulae

S1

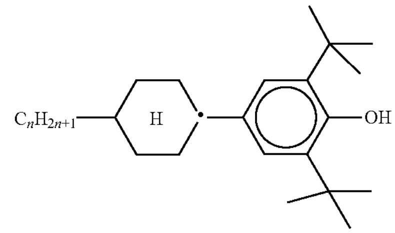

S2

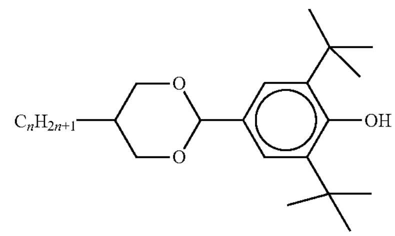

S3

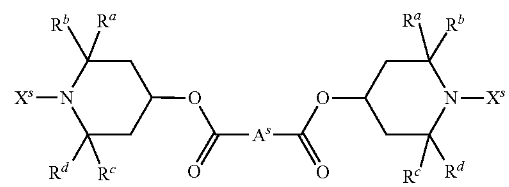

wherein the individual radicals, independently of each other and on each occurrence identically or differently, have the following meanings $R_{a-d}$ straight-chain or branched alkyl with 1 to 10, preferably 1 to 6, very preferably 1 to 4 C atoms, most preferably methyl, $X_S$ H, $CH_3$, OH or O*, $A^S$ straight-chain, branched or cyclic alkylene with 1 to 20 C atoms which is optionally substituted, n an integer from 1 to 6, preferably 3.

Preferred stabilisers of formula S3 are selected from formula S3A

S3A

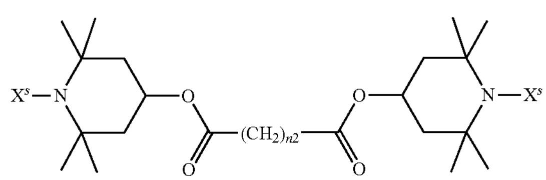

wherein n2 is an integer from 1 to 12, and wherein one or more H atoms in the group $(CH_2)_{n2}$ are optionally replaced by methyl, ethyl, propyl, butyl, pentyl or hexyl.

Very preferred stabilisers are selected from the group consisting of the following formulae S1-1
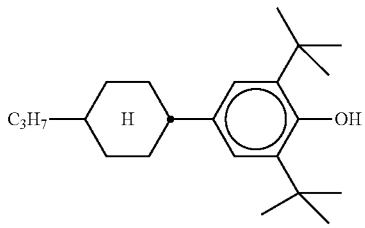
S2-1
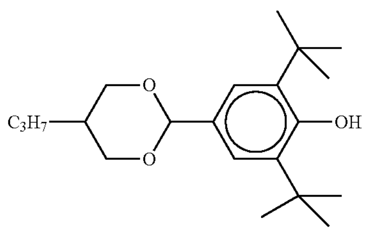
S3-1
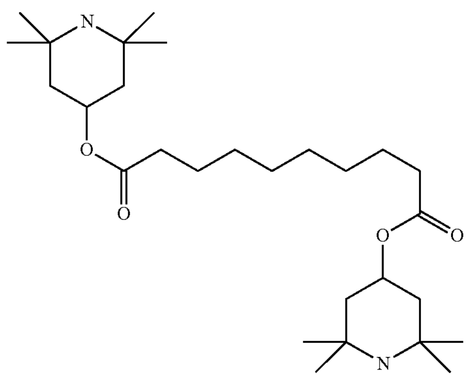
S3-2
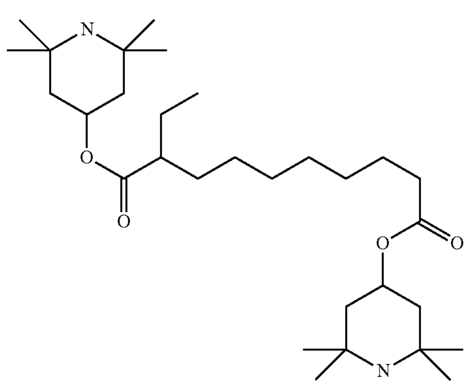
-continued
S3-3
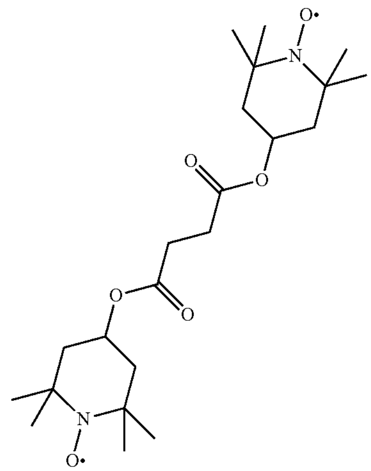
S3-4
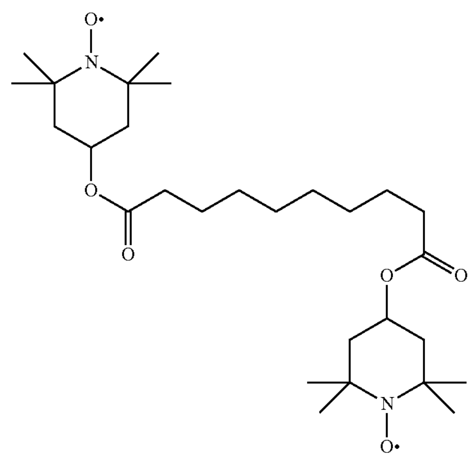
S3-5
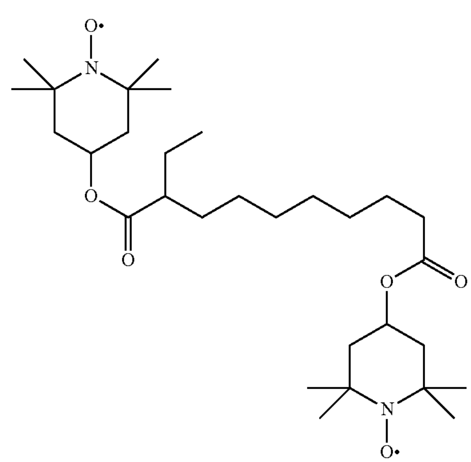

-continued

S3-6

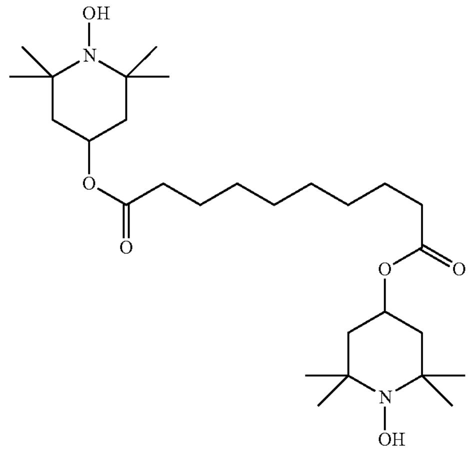

S3-7

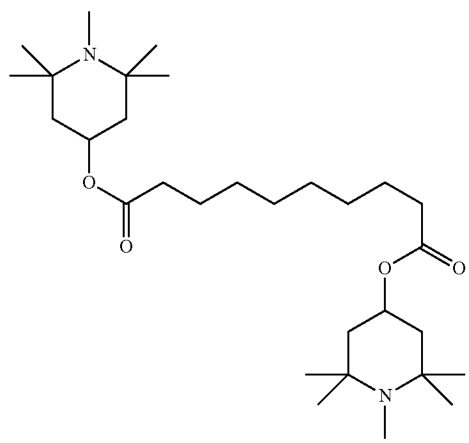

In a preferred embodiment the liquid-crystalline medium comprises one or more stabilisers selected from the group consisting of formulae S1-1, S2-1, S3-1, S3-1 and S3-3.

In a preferred embodiment the liquid-crystalline medium comprises one or more stabilisers selected from Table D.

Preferably the proportion of stabilisers, like those of formula S1—S3, in the liquid-crystalline medium is from 10 to 500 ppm, very preferably from 20 to 100 ppm.

In another preferred embodiment the LC medium according to the present invention contains one or more SA additives selected from formula II or its subformulae. The concentration of the SA additives in the LC medium is preferably from 0.1 to 5%, very preferably from 0.2 to 3%, most preferably from 0.2 to 1.5%.

In a preferred embodiment the LC medium or display according to the present invention contains one or more SA additives selected from Table F below.

In another preferred embodiment the SA-VA or SA-FFS display according to the present invention does not contain a polyimide alignment layer.

The polymerisable compounds of formula I do in particular show good UV absorption in, and are therefore especially suitable for, a process of preparing a PSA display including one or more of the following features:

the polymerisable medium is exposed to UV light in the display in a 2-step process, including a first UV exposure step ("UV-1 step") to generate the tilt angle, and a second UV exposure step ("UV-2 step") to finish polymerization, the polymerisable medium is exposed to UV light in the display generated by an energy-saving UV lamp (also known as "green UV lamps"). These lamps are characterized by a relative low intensity (1/100-1/10 of a conventional UV1 lamp) in their absorption spectra from 300-380 nm, and are preferably used in the UV2 step, but are optionally also used in the UV1 step when avoiding high intensity is necessary for the process.

the polymerisable medium is exposed to UV light in the display generated by a UV lamp with a radiation spectrum that is shifted to longer wavelengths, preferably 340 nm or more, to avoid short UV light exposure in the PS-VA process.

Both using lower intensity and a UV shift to longer wavelengths protect the organic layer against damage that may be caused by the UV light.

A preferred embodiment of the present invention relates to a process for preparing a PSA display as described above and below, comprising one or more of the following features:

the polymerisable LC medium is exposed to UV light in a 2-step process, including a first UV exposure step ("UV-1 step") to generate the tilt angle, and a second UV exposure step ("UV-2 step") to finish polymerization, the polymerisable LC medium is exposed to UV light generated by a UV lamp having an intensity of from 0.5 $mW/cm^2$ to 10 $mW/cm^2$ in the wavelength range from 300-380 nm, preferably used in the UV2 step, and optionally also in the UV1 step, the polymerisable LC medium is exposed to UV light having a wavelength of 340 nm or more, and preferably 400 nm or less.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm$<\lambda<$400 nm. When irradiation with UV light of wavelength X of more than 340 nm is desired, UV exposure can be carried out using a cut-off filter being substantially transmissive for wavelengths $\lambda>$340 nm.

"Substantially transmissive" means that the filter transmits a substantial part, preferably at least 50% of the intensity, of incident light of the desired wavelength(s). "Substantially blocking" means that the filter does not transmit a substantial part, preferably at least 50% of the intensity, of incident light of the undesired wavelengths. "Desired (undesired) wavelength" e.g. in case of a band pass filter means the wavelengths inside (outside) the given range of λ, and in case of a cut-off filter means the wavelengths above (below) the given value of λ.

This preferred process enables the manufacture of displays by using longer UV wavelengths, thereby reducing or even avoiding the hazardous and damaging effects of short UV light components.

UV radiation energy is in general from 6 to 100 J, depending on the production process conditions.

Preferably the LC medium according to the present invention does essentially consist of a polymerisable component A), or one or more polymerisable compounds of formula I, and an LC component B), or LC host mixture, as described above and below. However, the LC medium may additionally comprise one or more further components or additives, preferably selected from the list including but not limited to co-monomers, chiral dopants, polymerisation initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

Particular preference is given to LC media comprising one, two or three polymerisable compounds of formula I.

Preference is furthermore given to LC media in which the polymerisable component A) contains only polymerisable compounds that are selected of formula I, i.e. it does not contain any other polymerisable compounds which are different from formula I.

Preference is furthermore given to LC media in which the liquid-crystalline component B) or the LC host mixture has a nematic LC phase, and preferably has no chiral liquid crystal phase.

The LC component B), or LC host mixture, is preferably a nematic LC mixture.

Preference is furthermore given to achiral compounds of formula I, and to LC media in which the compounds of component A and/or B are selected exclusively from the group consisting of achiral compounds.

Preferably the proportion of the polymerisable component A) in the LC medium is from >0 to <5%, very preferably from >0 to <3%, more preferably from 0.01 to 2.0, especially for use in SA-VA displays. In another preferred embodiment the proportion of the polymerisable component A) in the LC medium is from 0.01 to 1.0%, most preferably from 0.01 to 0.5%, especially for use in PSA displays.

Preferably the proportion of compounds of formula I in the LC medium is from >0 to <5%, very preferably from >0 to <3%, more preferably from 0.01 to 2.0, especially for use in SA-VA displays. In another preferred embodiment the proportion of the compounds of formula I in the LC medium is from 0.01 to 1.0%, most preferably from 0.01 to 0.5%, especially for use in PSA displays.

Preferably the proportion of compounds of formula II in the LC medium is from >0.1 to <5%, very preferably from >0.2 to <3%, most preferably from 0.2 to 1.5%.

Preferably the proportion of the LC component B) in the LC medium is from 95 to <100%, very preferably from 96.5 to <100%, most preferably from 98 to <100%. In another preferred embodiment the proportion of the LC component B) in the LC medium is from 99 to <100%.

In a preferred embodiment the polymerisable compounds of the polymerisable component B) are exclusively selected from formula I.

In another preferred embodiment the polymerisable component B) comprises, in addition to the compounds of formula I, one or more further polymerisable compounds ("co-monomers"), preferably selected from RMs.

Suitable and preferred mesogenic comonomers are selected from the following formulae:

M1

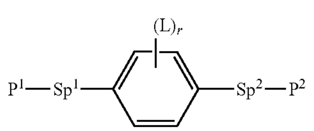

M2

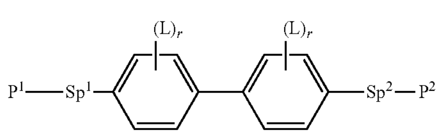

-continued

M3

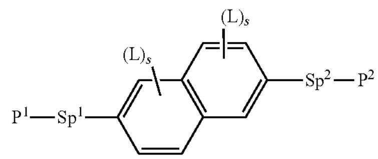

M4

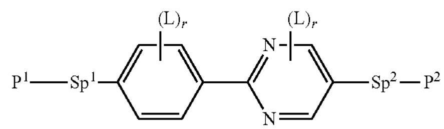

M5

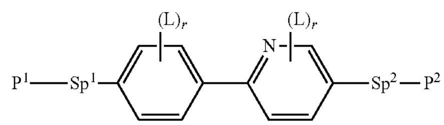

M6

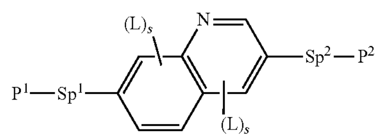

M7

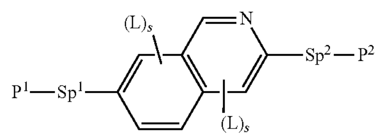

M8

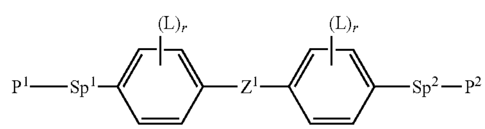

M9

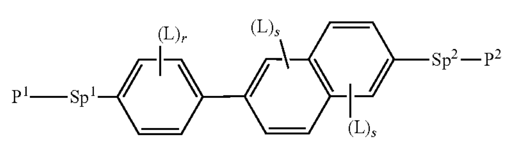

M10

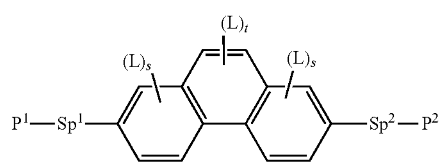

M11

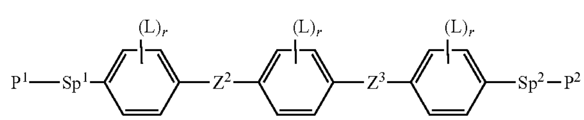

M12

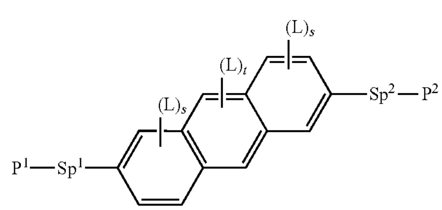

-continued
M13
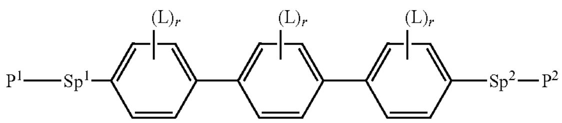
M14
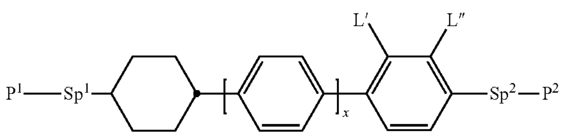
M15
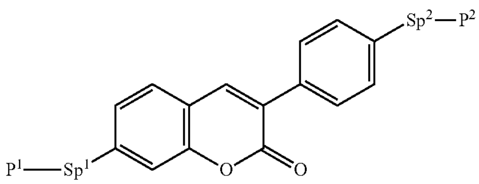
M16
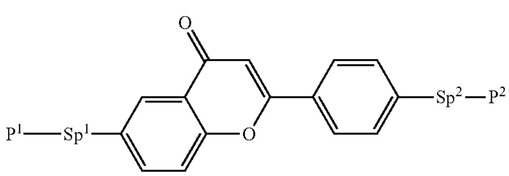
M17
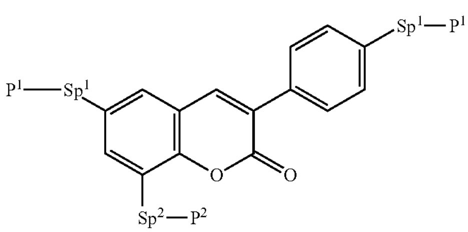
M18
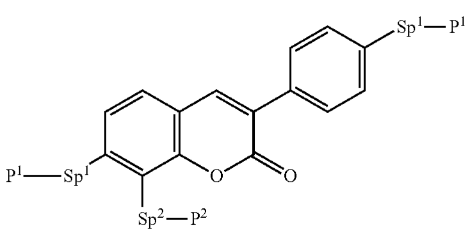
M19
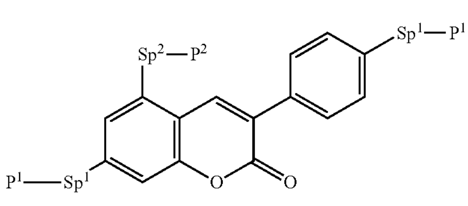
M20
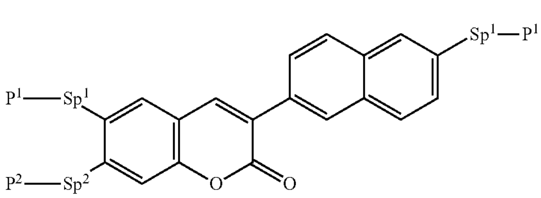
-continued
M21
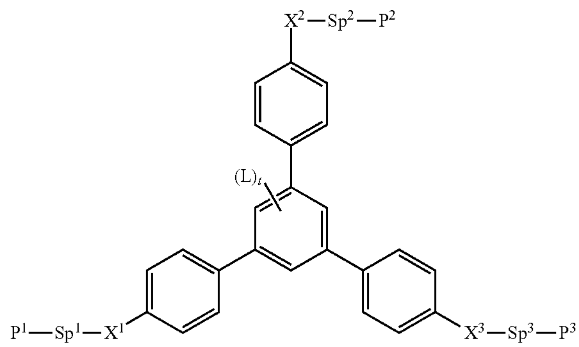
M22
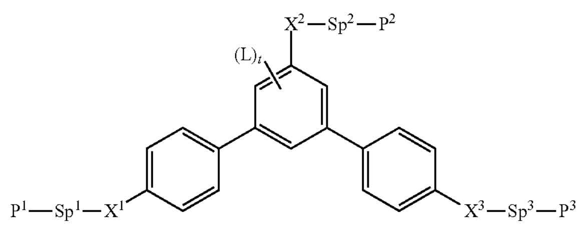
M23
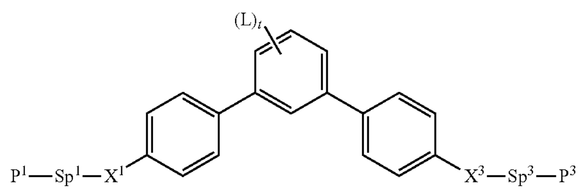
M24
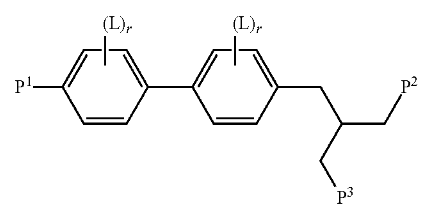
M25
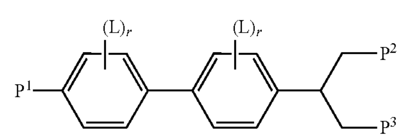
M26
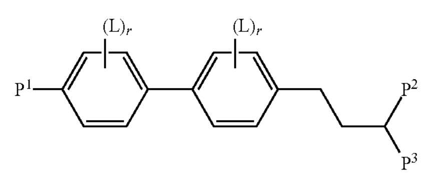
M27
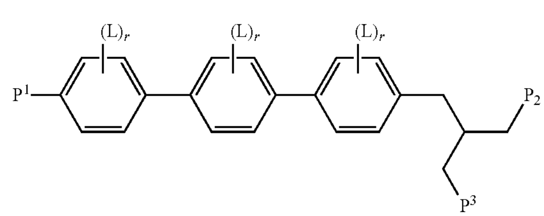

-continued

M28

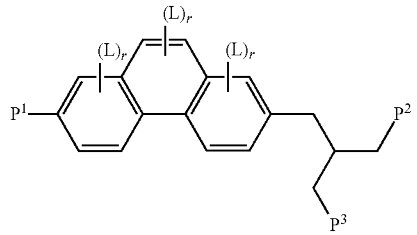

M29

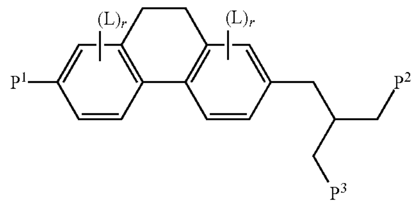

M30

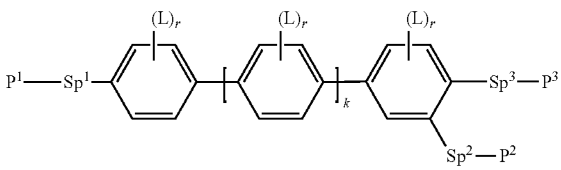

M31

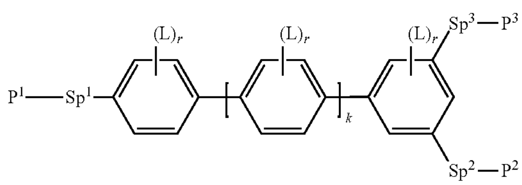

M32

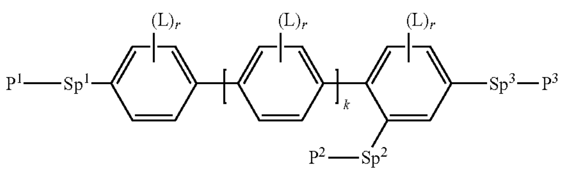

in which the individual radicals have the following meanings:

$P^1$, $P^2$ and $P^3$ each, independently of one another, denote an acrylate or methacrylate group, $Sp^1$, $Sp^2$ and Spa each, independently of one another, denote a single bond or a spacer group having one of the meanings indicated above and below for Sp, and particularly preferably denote —$(CH_2)_{p1}$—, —$(CH_2)_{p1}$—O—, —$(CH_2)_{p1}$—CO—O—, —$(CH_2)_{p1}$—O—CO— or —$(CH_2)_{p1}$—O—CO—O—, in which p1 is an integer from 1 to 12, where, in addition, one or more of the radicals $P^1$-$Sp^1$-, $P^1$-$Sp^2$- and $P^3$-$Sp^3$- may denote $R^{aa}$, with the proviso that at least one of the radicals $P^1$-$Sp^1$-, P2-Sp2 and P3-Sp3- present is different from $R^{aa}$, $R^{aa}$ denote H, F, Cl, CN or straight-chain or branched alkyl having 1 to 25 C atoms, in which, in addition, one or more non-adjacent $CH_2$ groups may each be replaced, independently of one another, by C($R^0$)═C($R^{00}$)—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, —O—CO— or a single bond, $Z^1$ denote —O—, —CO—, —C($R^yR^z$)— or —$CF_2CF_2$—, $Z^2$ and $Z^3$ each, independently of one another, denote —CO—O—, —O—CO—, —$CH_2O$—, —$OCH_2$—, —$CF_2O$—, —$OCF_2$- or —$(CH_2)_n$—, where n is 2, 3 or 4, L on each occurrence, identically or differently, denote F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, k denote 0 or 1, r denote 0, 1, 2, 3 or 4, s denote 0, 1, 2 or 3, t denote 0, 1 or 2, x denote 0 or 1.

Especially preferred are compounds of formulae M2, M13, M17, M22, M23, M24, M30, M31 and M32.

Further preferred are trireactive compounds M15 to M30, in particular M17, M18, M19, M22, M23, M24, M25, M26, M30, M31 and M32.

In another preferred embodiment the polymerisable component B) comprises, in addition to the compounds of formula I, one or more co-monomers selected from Table D below.

In the compounds of formulae M1 to M32 the group

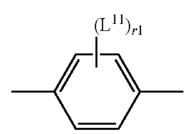

is preferably

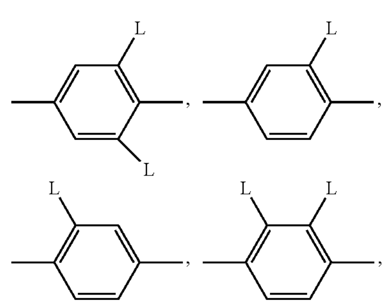

-continued

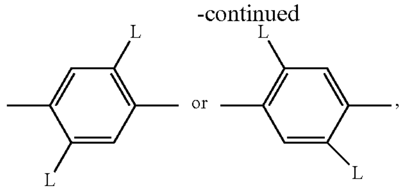

wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $CO_2H_5$, $COCH_3$, $COC_2H_5$, $COOCH_3$, $COOC_2H_5$, $CF_3$, $OCF_3$, $OCHF_2$, $CO_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ oder $OCF_3$, especially F or $CH_3$.

Besides the polymerisable compounds described above, the LC media for use in the LC displays according to the invention comprise an LC mixture ("host mixture") comprising one or more, preferably two or more LC compounds which are selected from low-molecular-weight compounds that are unpolymerisable. These LC compounds are selected such that they stable and/or unreactive to a polymerisation reaction under the conditions applied to the polymerisation of the polymerisable compounds.

In principle, any LC mixture which is suitable for use in conventional displays is suitable as host mixture. Suitable LC mixtures are known to the person skilled in the art and are described in the literature, for example mixtures in VA displays in EP 1 378 557 A1 and mixtures for OCB displays in EP 1 306 418 A1 and DE 102 24 046 A1.

The polymerisable compounds of formula I are especially suitable for use in an LC host mixture that comprises one or more mesogenic or LC compounds comprising an alkenyl group (hereinafter also referred to as "alkenyl compounds"), wherein said alkenyl group is stable to a polymerisation reaction under the conditions used for polymerisation of the compounds of formula I and of the other polymerisable compounds contained in the LC medium. Compared to RMs known from prior art the compounds of formula I do in such an LC host mixture exhibit improved properties, like solubility, reactivity or capability of generating a tilt angle.

Thus, in addition to the polymerisable compounds of formula I, the LC medium according to the present invention comprises one or more mesogenic or liquid crystalline compounds comprising an alkenyl group, ("alkenyl compound"), where this alkenyl group is preferably stable to a polymerisation reaction under the conditions used for the polymerisation of the polymerisable compounds of formula I or of the other polymerisable compounds contained in the LC medium.

The alkenyl groups in the alkenyl compounds are preferably selected from straight-chain, branched or cyclic alkenyl, in particular having 2 to 25 C atoms, particularly preferably having 2 to 12 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F and/or Cl.

Preferred alkenyl groups are straight-chain alkenyl having 2 to 7 C atoms and cyclohexenyl, in particular ethenyl, propenyl, butenyl, pentenyl, hexenyl, heptenyl, 1,4-cyclohexen-1-yl and 1,4-cyclohexen-3-yl.

The concentration of compounds containing an alkenyl group in the LC host mixture (i.e. without any polymerisable compounds) is preferably from 5% to 100%, very preferably from 20% to 60%.

Especially preferred are LC mixtures containing 1 to 5, preferably 1, 2 or 3 compounds having an alkenyl group.

The mesogenic and LC compounds containing an alkenyl group are preferably selected from formulae AN and AY as defined below.

Besides the polymerisable component A) as described above, the LC media according to the present invention comprise an LC component B), or LC host mixture, comprising one or more, preferably two or more LC compounds which are selected from low-molecular-weight compounds that are unpolymerisable. These LC compounds are selected such that they stable and/or unreactive to a polymerisation reaction under the conditions applied to the polymerisation of the polymerisable compounds.

In a first preferred embodiment the LC medium contains an LC component B), or LC host mixture, based on compounds with negative dielectric anisotropy. Such LC media are especially suitable for use in PS-VA and PS-UB-FFS displays. Particularly preferred embodiments of such an LC medium are those of sections a)-z3) below:

a) LC medium wherein the component B) or LC host mixture comprises one or more compounds selected from formulae CY and PY:

CY

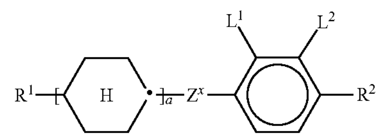

PY

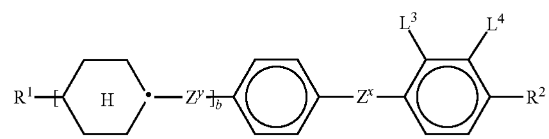

wherein a denote 1 or 2, b denote 0 or 1,

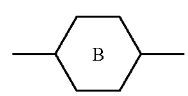

denote

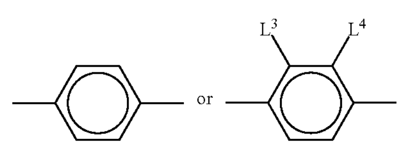

$R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $Z^x$ and $Z^y$ each, independently of one another, denote —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$- or a single bond, preferably a single bond, $L^{1-4}$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denote F and the other denote Cl, or both $L^3$ and $L^4$ denote F or one of $L^3$ and $L^4$ denote F and the other denote Cl.

The compounds of the formula CY are preferably selected from the group consisting of the following sub-formulae:

CY1

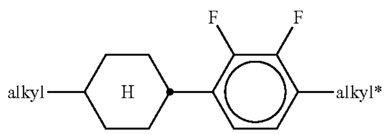

CY2

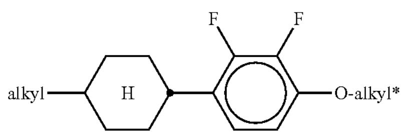

CY3

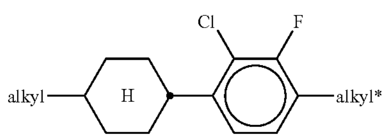

CY4

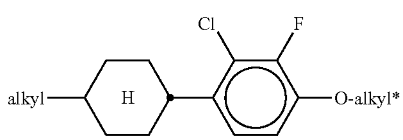

CY5

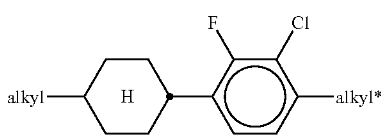

CY6

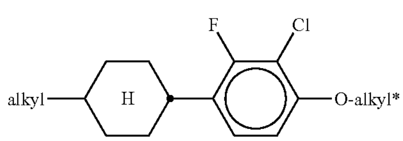

CY7

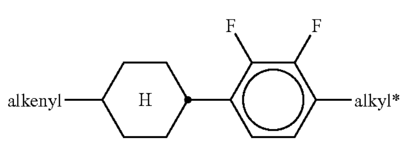

CY8

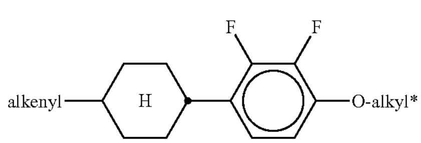

-continued

CY9

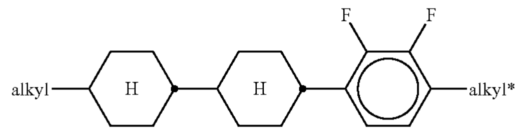

CY10

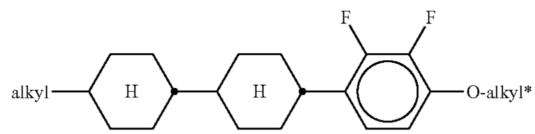

CY11

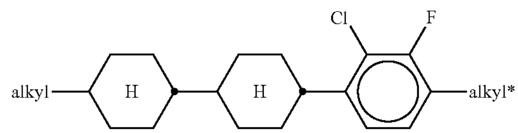

CY12

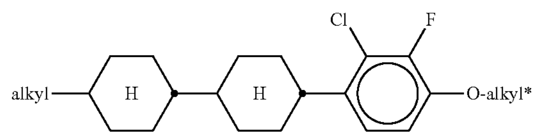

CY13

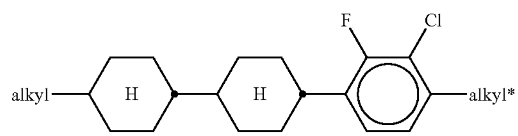

CY14

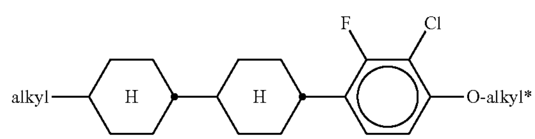

CY15

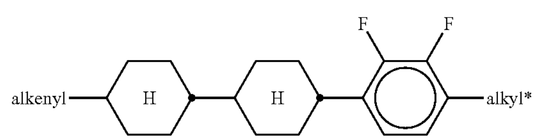

CY16

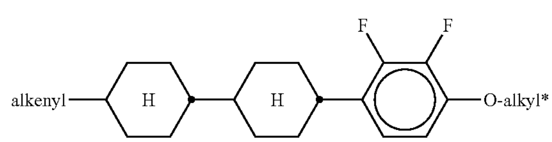

CY17

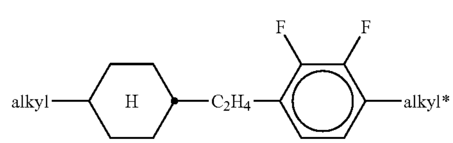

CY18

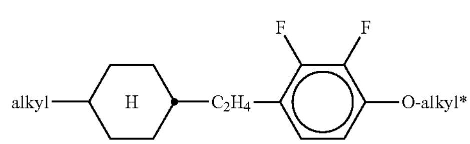

-continued

CY19

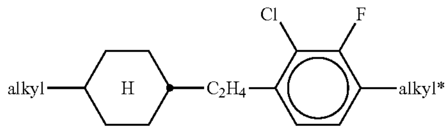

CY20

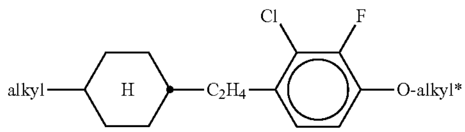

CY21

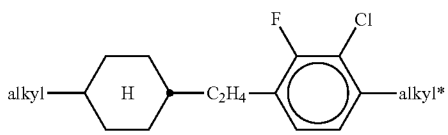

CY22

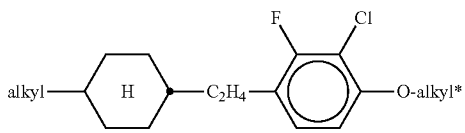

CY23

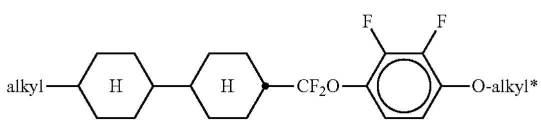

CY24

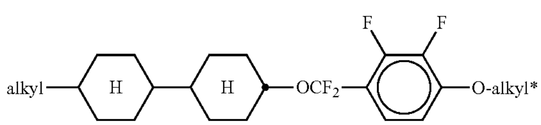

CY25

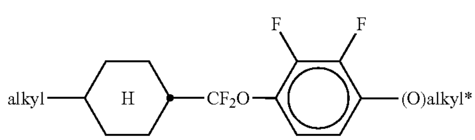

CY26

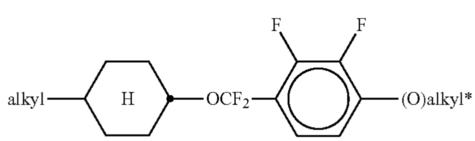

CY27

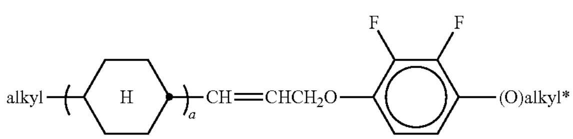

CY28

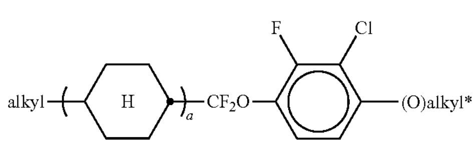

-continued

CY29

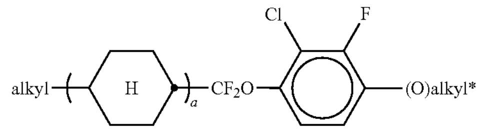

CY30

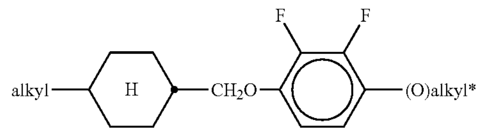

CY31

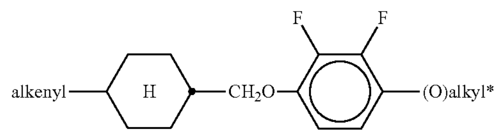

CY32

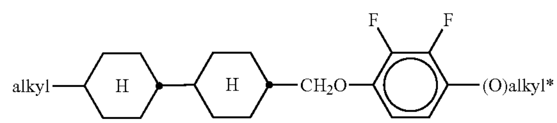

CY33

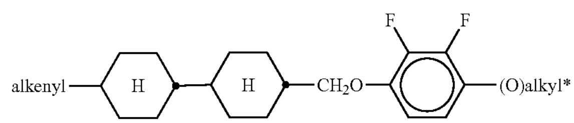

in which a denote 1 or 2, alkyl and alkyl* each, independently of one another, denote a straight-chain alkyl radical having 1-6 C atoms, and alkenyl denote a straight-chain alkenyl radical having 2-6 C atoms, and (O) denote an oxygen atom or a single bond. Alkenyl preferably denote $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

The compounds of the formula PY are preferably selected from the group consisting of the following sub-formulae:

PY1

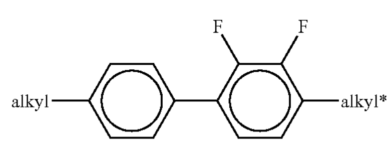

PY2

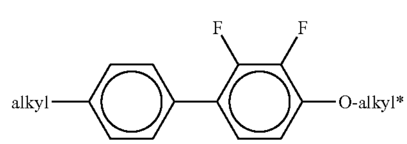

PY3

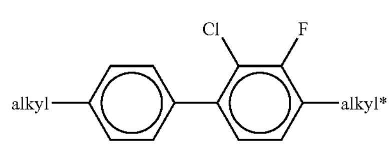

-continued

PY4

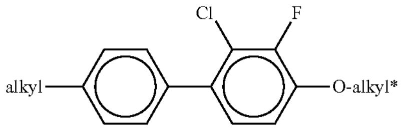

PY5

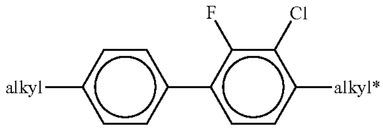

PY6

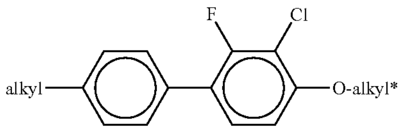

PY7

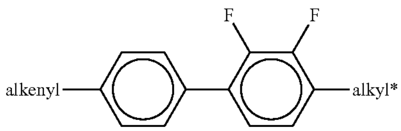

PY8

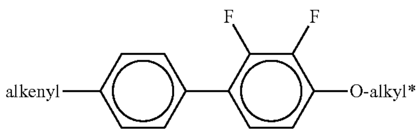

PY9

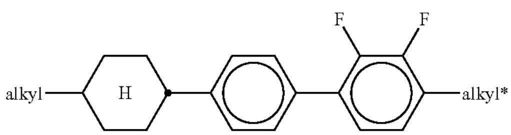

PY10

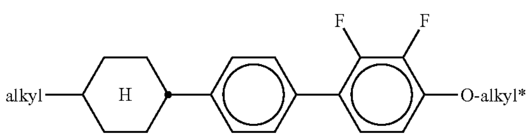

PY11

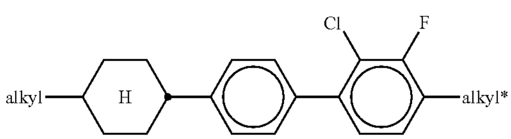

PY12

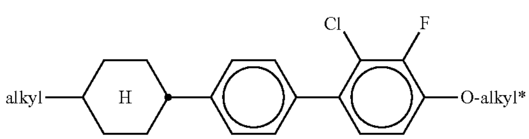

PY13

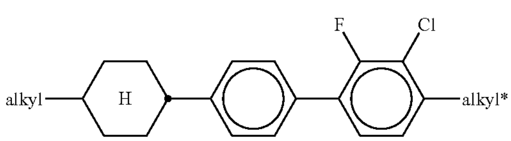

-continued

PY14

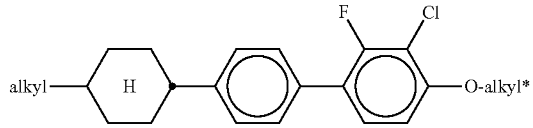

PY15

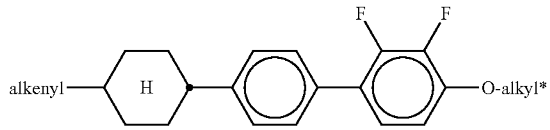

PY16

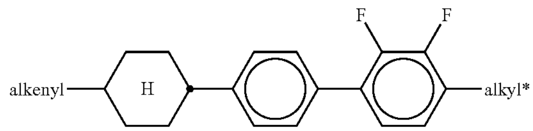

PY17

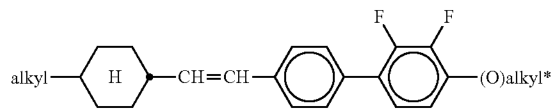

PY18

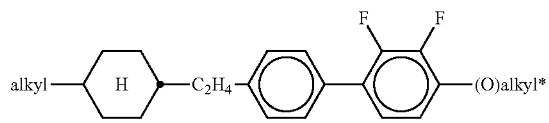

PY19

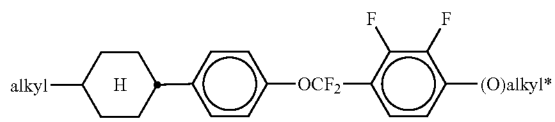

PY20

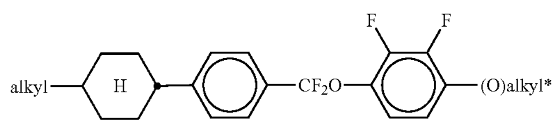

in which alkyl and alkyl* each, independently of one another, denote a straight-chain alkyl radical having 1-6 C atoms, and alkenyl denote a straight-chain alkenyl radical having 2-6 C atoms, and (O) denote an oxygen atom or a single bond. Alkenyl preferably denote $CH_2$═CH—, $CH_2$═$CHCH_2CH_2$—, $CH_3$—CH═CH—, $CH_{3\text{-}o}H_2$—CH═CH—, $CH_3$—$(CH_2)_2$—CH═CH—, $CH_3$—$(CH_2)_3$—CH═CH— or $CH_3$—CH═CH—$(CH_2)_2$—.

b) LC medium wherein the component B) or LC host mixture comprises one or more mesogenic or LC compounds comprising an alkenyl group (hereinafter also referred to as “alkenyl compounds”), wherein said alkenyl group is stable to a polymerisation reaction under the conditions used for polymerisation of the polymerisable compounds contained in the LC medium.

Preferably the component B) or LC host mixture comprises one or more alkenyl compounds selected from formulae AN and AY

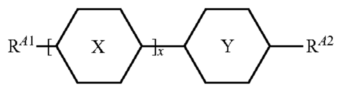

AN

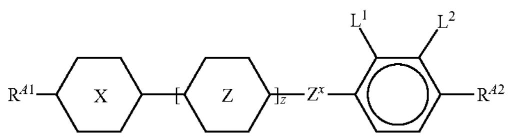

AY in which the individual radicals, on each occurrence identically or differently, and each, independently of one another, have the following meaning:

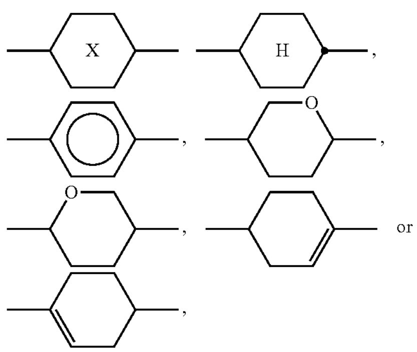

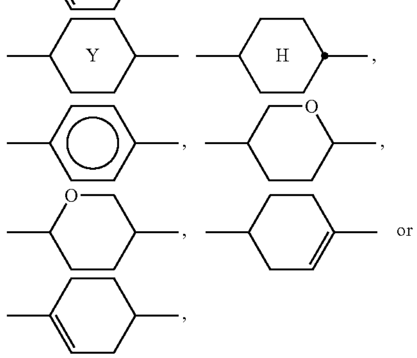

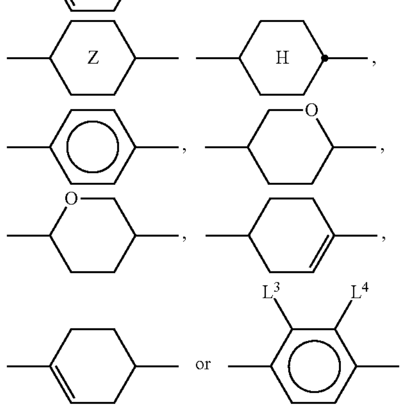

$R^{A1}$ alkenyl having 2 to 9 C atoms or, if at least one of the rings X, Y and Z denote cyclohexenyl, also one of the meanings of $R^{A2}$, $R^{A2}$ alkyl having 1 to 12 C atoms, in which, in addition, one or two non-adjacent $CH_2$ groups may be replaced by —O—, —CH═CH—, —CO—, —OCO— or —COO— in such a way that O atoms are not linked directly to one another, $Z^x$ —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$—, or a single bond, preferably a single bond, $L^{1,2}$ H, F, Cl, $OCF_3$, $CF_3$, $CH_3$, $CH_2F$ or $CHF_2H$, preferably H, F or Cl, x 1 ort, z 0 or 1.

Preferred compounds of formula AN and AY are those wherein $R^{A2}$ is selected from ethenyl, propenyl, butenyl, pentenyl, hexenyl and heptenyl.

In a preferred embodiment the component B) or LC host mixture comprises one or more compounds of formula AN selected from the following sub-formulae:

AN1

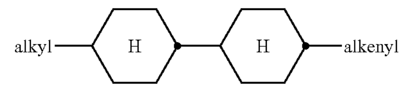

AN2

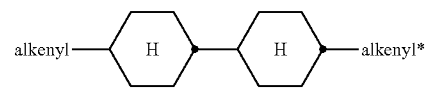

AN3

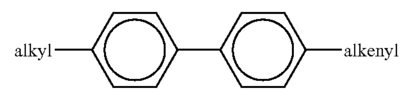

AN4

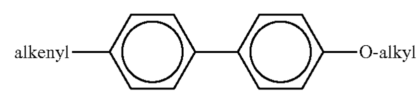

AN5

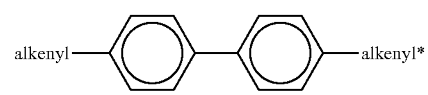

AN6

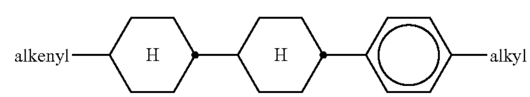

AN7

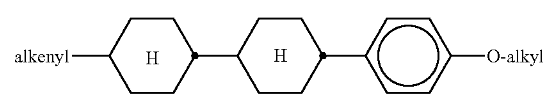

AN8

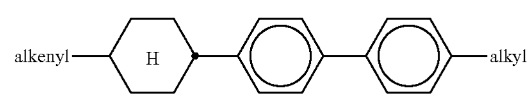

AN9

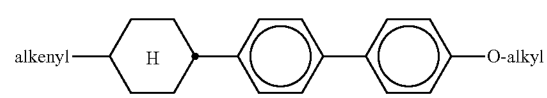

AN10

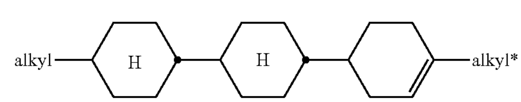

AN11

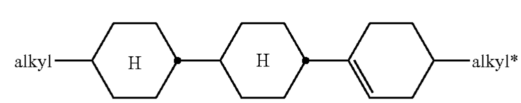

-continued

AN12

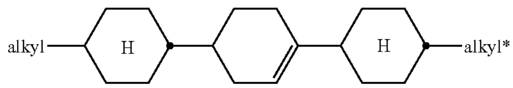

in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

Preferably the component B) or LC host mixture comprises one or more compounds selected from formulae AN1, AN2, AN3 and AN6, very preferably one or more compounds of formula AN1.

In another preferred embodiment the component B) or LC host mixture comprises one or more compounds of formula AN selected from the following sub-formulae:

AN1a

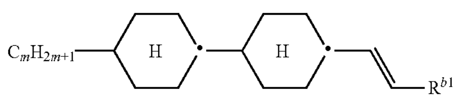

AN3a

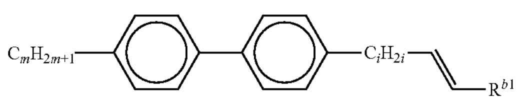

AN6a

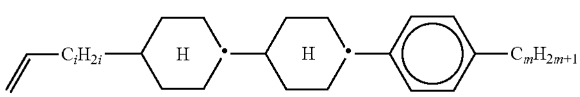

in which m denote 1, 2, 3, 4, 5 or 6, i denote 0, 1, 2 or 3, and $R_{b1}$ denote H, $CH_3$ or $C_2H_5$.

In another preferred embodiment the component B) or LC host mixture comprises one or more compounds selected from the following sub-formulae:

AN1a1

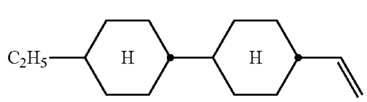

AN1a2

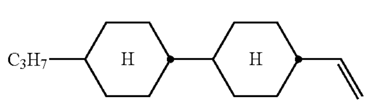

AN1a3

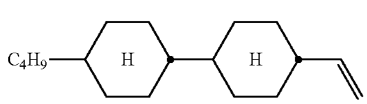

AN1a4

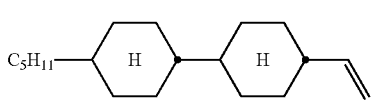

-continued

AN1a5

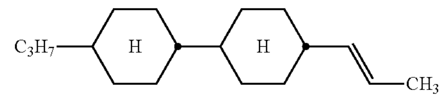

Most preferred are compounds of formula AN1a2 and AN1a5.

In another preferred embodiment the component B) or LC host mixture comprises one or more compounds of formula AY selected from the following sub-formulae:

AY1

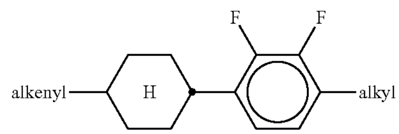

AY2

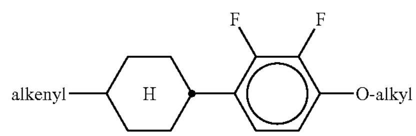

AY3

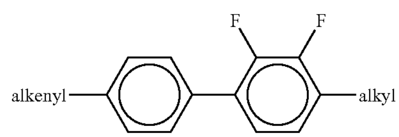

AY4

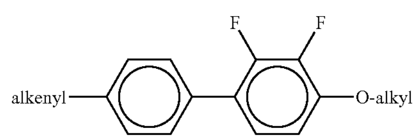

AY5

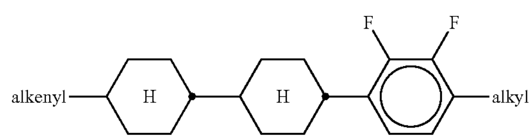

AY6

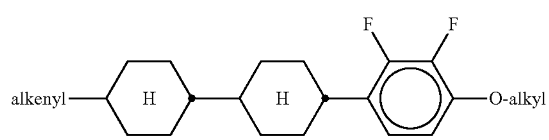

AY7

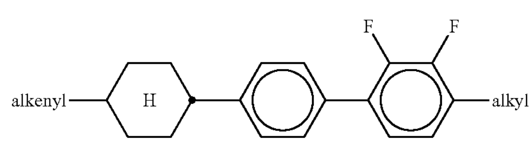

AY8

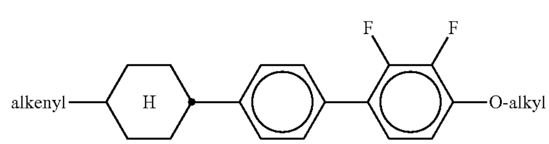

-continued
AY9
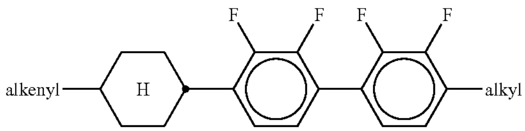
AY10
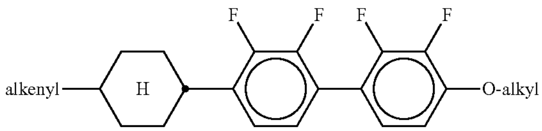
AY11
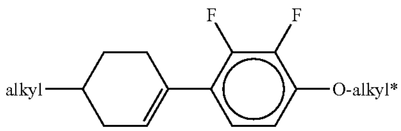
AY12
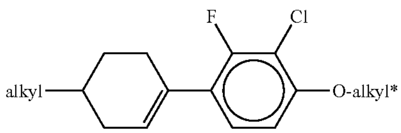
AY13
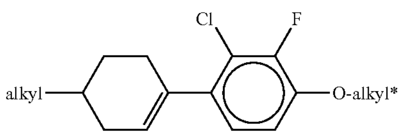
AY14
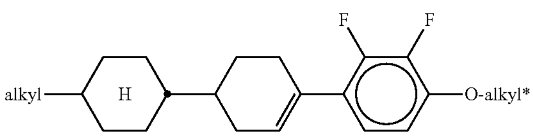
AY15
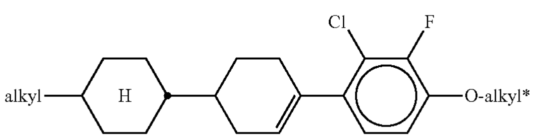
AY16
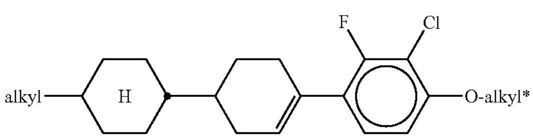
AY17
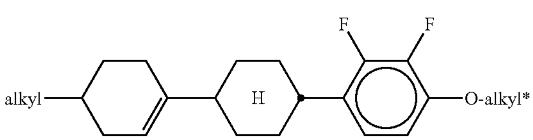
AY18
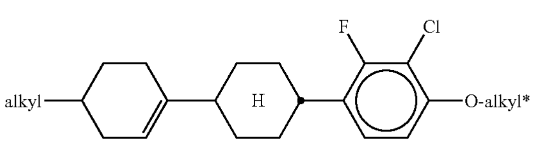
-continued
AY19
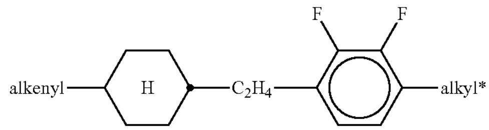
AY20
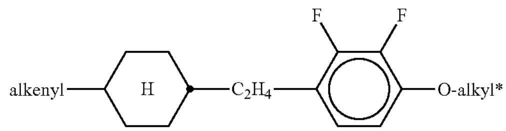
AY21
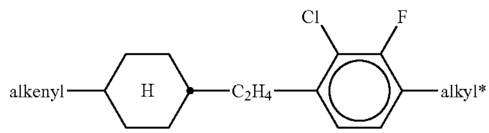
AY22
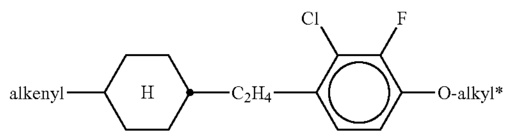
AY23
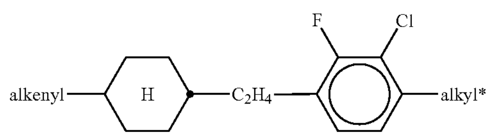
AY24
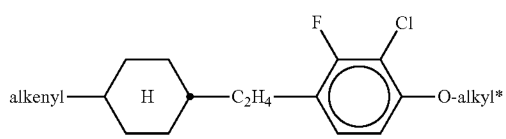
AY25
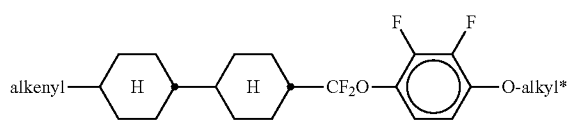
AY26
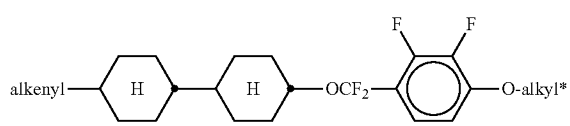
AY27
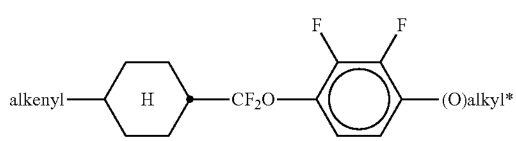
AY28
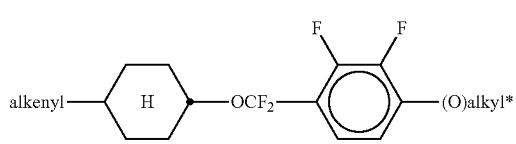

-continued

AY29

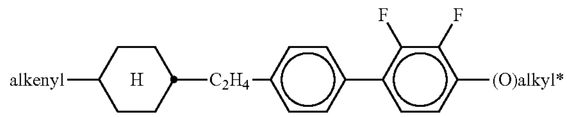

AY30

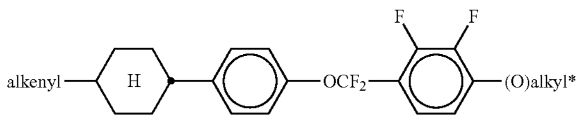

AY31

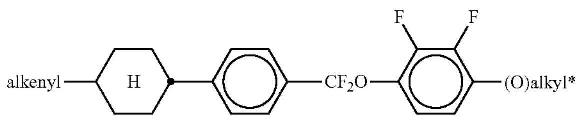

in which alkyl and alkyl* each, independently of one another, denote a straight-chain alkyl radical having 1-6 C atoms, "(O)" denote an O-atom or a single bond, and alkenyl and alkenyl* each, independently of one another, denote a straight-chain alkenyl radical having 2-7 C atoms. Alkenyl and alkenyl* preferably denote $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2$.

In another preferred embodiment the component B) or LC host mixture comprises one or more compounds of formula AY selected from the following sub-formulae:

AY5a

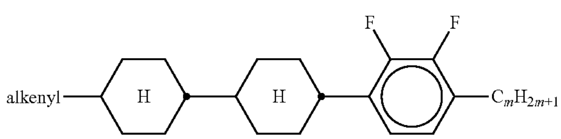

AY6a

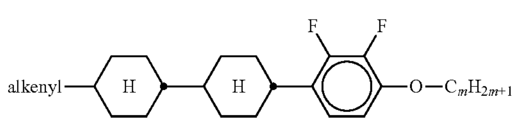

AY9a

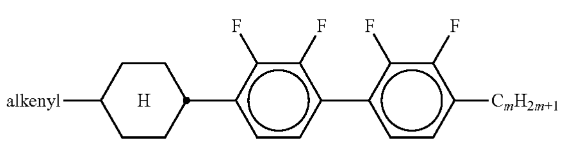

AY10a

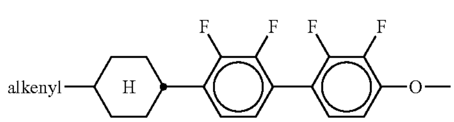

AY11a

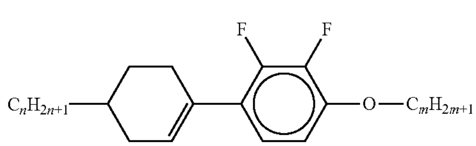

-continued

AY14a

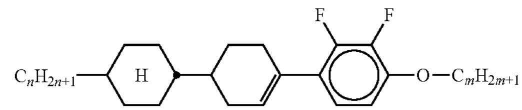

in which m and n each, independently of one another, denote 1, 2, 3, 4, 5 or 6, and alkenyl denote $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Preferably the proportion of compounds of formula AN and AY in the LC medium is from 2 to 70% by weight, very preferably from 5 to 60% by weight, most preferably from 10 to 50% by weight.

Preferably the LC medium or LC host mixture contains 1 to 5, preferably 1, 2 or 3 compounds selected from formulae AN and AY.

In another preferred embodiment of the present invention the LC medium comprises one or more compounds of formula AY14, very preferably of AY14a. The proportion of compounds of formula AY14 or AY14a in the LC medium is preferably 3 to 20% by weight.

The addition of alkenyl compounds of formula AN and/or AY enables a reduction of the viscosity and response time of the LC medium.

c) LC medium wherein the component B) or LC host mixture comprises one or more compounds of the following formula:

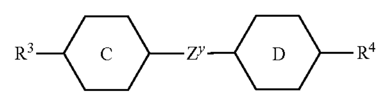

ZK in which the individual radicals have the following meanings:

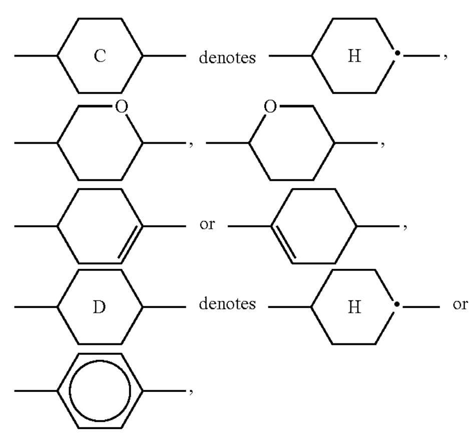

$R^3$ and $R^4$ each, independently of one another, denote alkyl having 1 to 12 C atoms, in which, in addition, one or two non-adjacent $CH_2$ groups may be replaced by —O—, —CH═CH—, —CO—, —O—CO— or —CO—O— in such a way that O atoms are not linked directly to one another, $Z^y$ denote —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, preferably a single bond.

The compounds of the formula ZK are preferably selected from the group consisting of the following sub-formulae:

ZK1

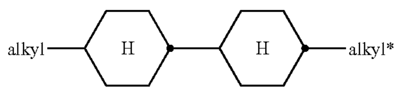

ZK2

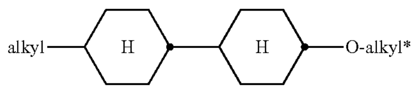

ZK3

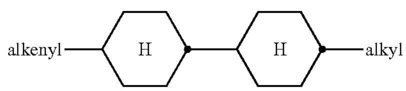

ZK4

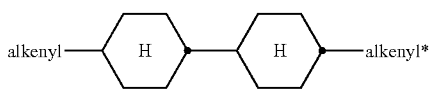

ZK5

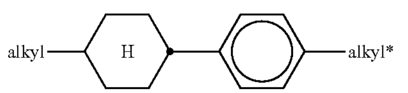

ZK6

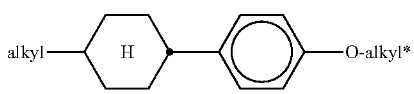

ZK7

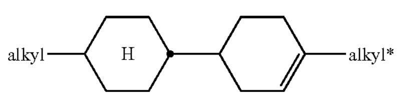

ZK8

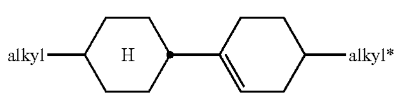

ZK9

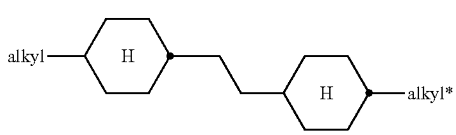

ZK10

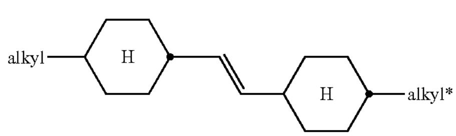

in which alkyl and alkyl* each, independently of one another, denote a straight-chain alkyl radical having 1-6 C atoms, and alkenyl denote a straight-chain alkenyl radical having 2-6 C atoms. Alkenyl preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Especially preferred are compounds of formula ZK1.

Particularly preferred compounds of formula ZK are selected from the following sub-formulae:

ZK1a

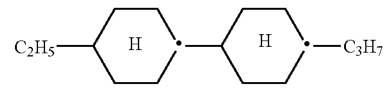

ZK1b

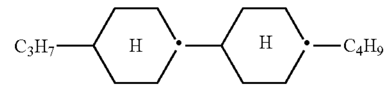

ZK1c

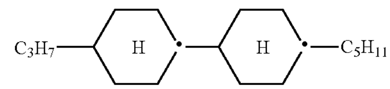

ZK1d

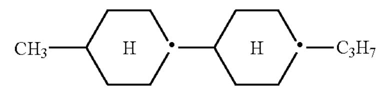

wherein the propyl, butyl and pentyl groups are straight-chain groups.

Most preferred are compounds of formula ZK1a.

d) LC medium wherein component B) or the LC host mixture additionally comprises one or more compounds of the following formula:

DK

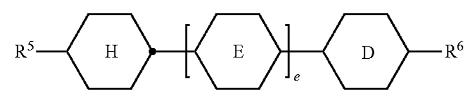

in which the individual radicals on each occurrence, identically or differently, have the following meanings:

$R^5$ and $R^6$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms,

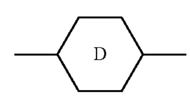

denote

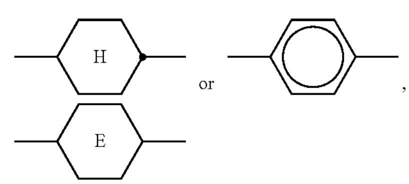

denote

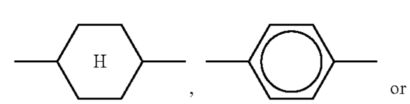

-continued

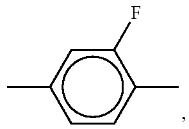

and e denote 1 or 2.

The compounds of the formula DK are preferably selected from the group consisting of the following sub-formulae:

DK1

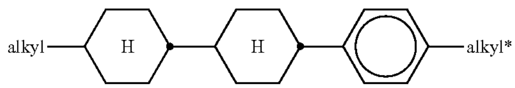

DK2

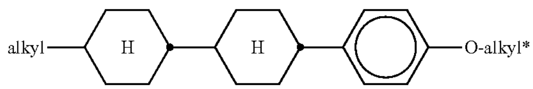

DK3

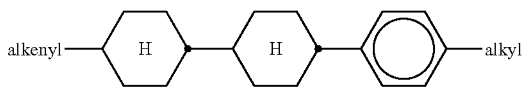

DK4

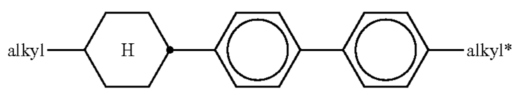

DK5

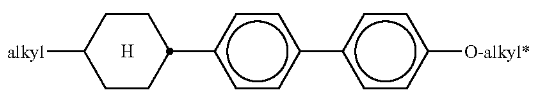

DK6

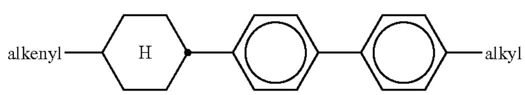

DK7

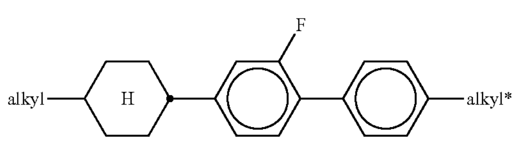

DK8

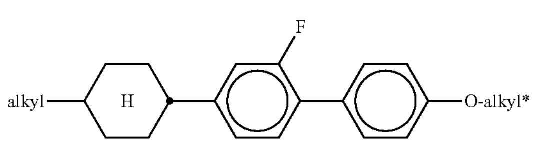

DK9

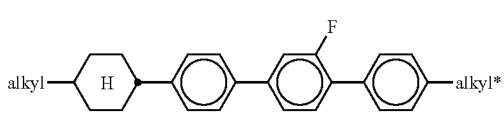

DK10

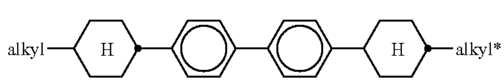

-continued

DK11

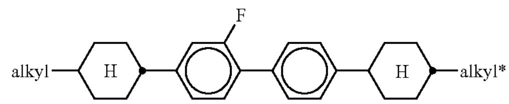

DK12

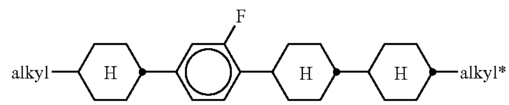

in which alkyl and alkyl* each, independently of one another, denote a straight-chain alkyl radical having 1-6 C atoms, and alkenyl denote a straight-chain alkenyl radical having 2-6 C atoms. Alkenyl preferably denote $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

e) LC medium wherein component B) or the LC host mixture additionally comprises one or more compounds of the following formula:

LY

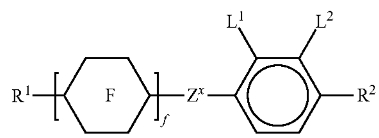

in which the individual radicals have the following meanings:

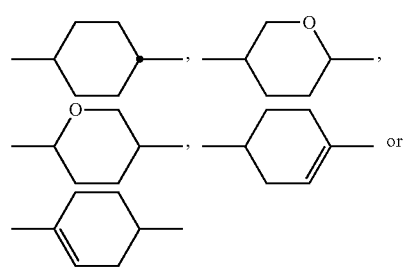

denote

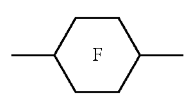

with at least one ring F being different from cyclohexylene, f denote 1 or 2, $R^1$ and $R^2$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, $Z^x$ denote $—CH_2CH_2—$, —CH═CH—, $—CF_2O—$, $—OCF_2—$, $—CH_2O—$, $—OCH_2—$, —CO—O—, —O—

CO—, —$C_2F_4$—, —CF═CF—, —CH═CH—$CH_2$O- or a single bond, preferably a single bond, $L^1$ and $L^2$ each, independently of one another, denote F, Cl, $OCF_3$, $CF_3$, $CH_3$, $CH_2F$, $CHF_2$.

Preferably, both radicals $L^1$ and $L^2$ denote F or one of the radicals $L^1$ and $L^2$ denote F and the other denote Cl.

The compounds of the formula LY are preferably selected from the group consisting of the following sub-formulae:

LY1

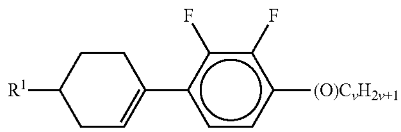

LY2

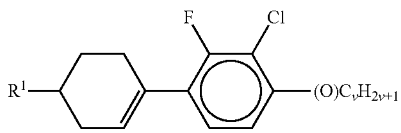

LY3

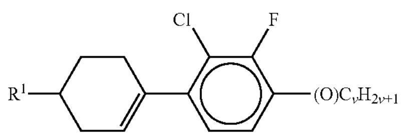

LY4

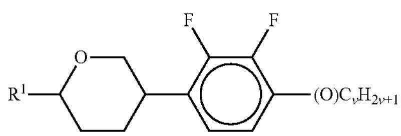

LY5

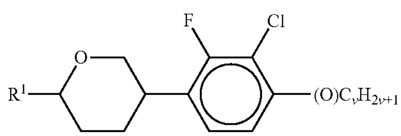

LY6

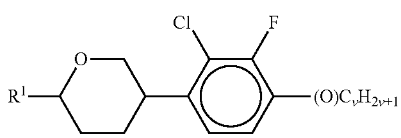

LY7

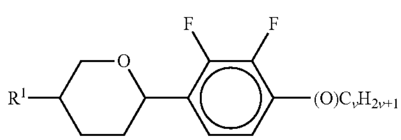

LY8

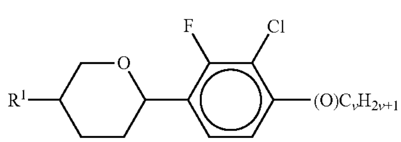

LY9

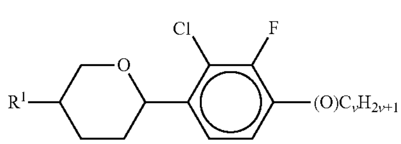

-continued

LY10

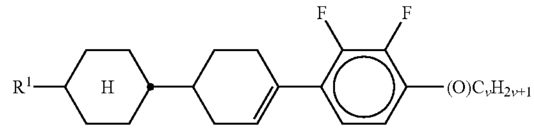

LY11

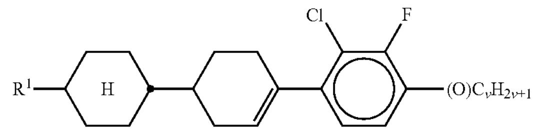

LY12

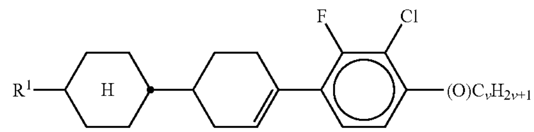

LY13

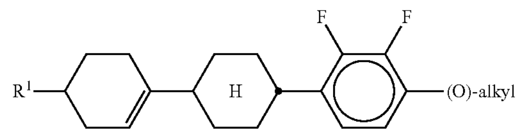

LY14

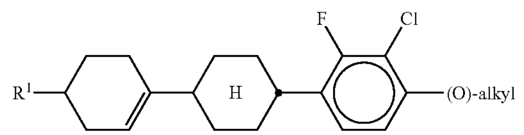

LY15

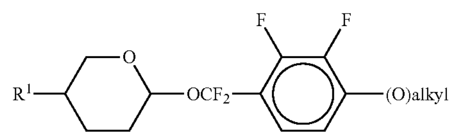

LY16

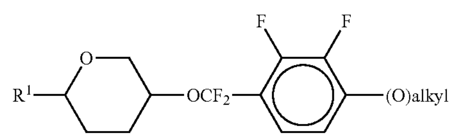

LY17

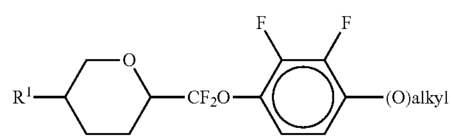

LY18

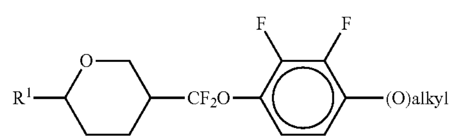

LY19

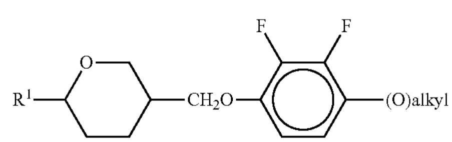

LY20

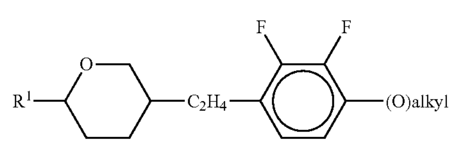

-continued

LY21

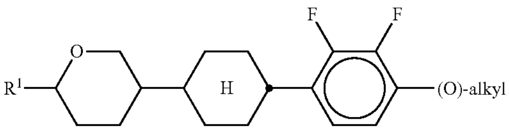

LY22

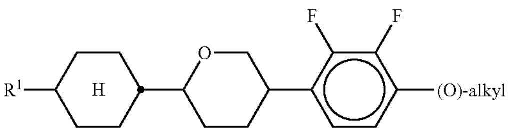

LY23

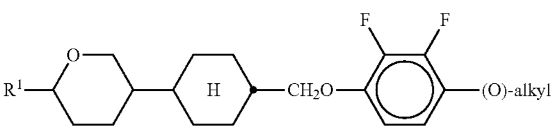

LY24

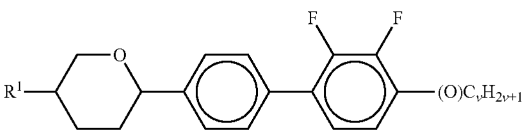

in which $R^1$ has the meaning indicated above, alkyl denote a straight-chain alkyl radical having 1-6 C atoms, (O) denote an oxygen atom or a single bond, and v denote an integer from 1 to 6. $R^1$ preferably denote straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

f) LC medium wherein component B) or the LC host mixture additionally comprises one or more compounds selected from the group consisting of the following formulae:

G1

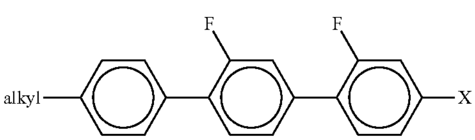

G2

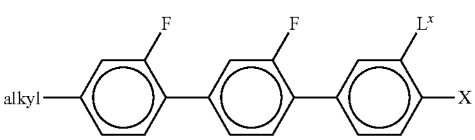

G3

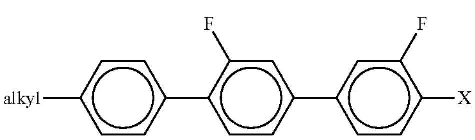

G4

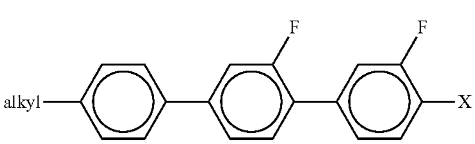

in which alkyl denote $C_{1-6}$-alkyl, Lx denote H or F, and X denote F, Cl, $OCF_3$, $OCHF_2$ or OCH═$CF_2$. Particular preference is given to compounds of the formula G1 in which X denote F.

g) LC medium wherein component B) or the LC host mixture additionally comprises one or more compounds selected from the group consisting of the following formulae:

Y1

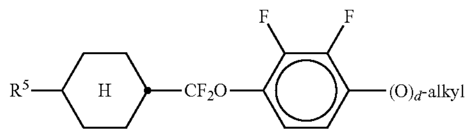

Y2

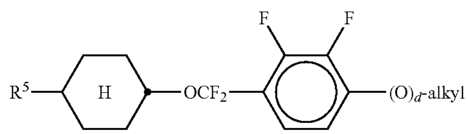

Y3

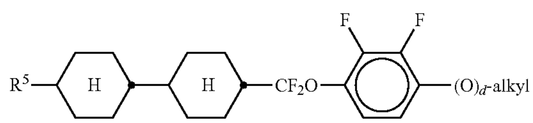

Y4

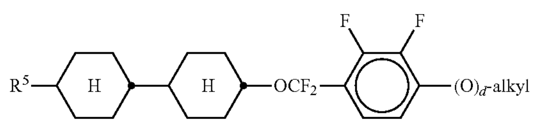

Y5

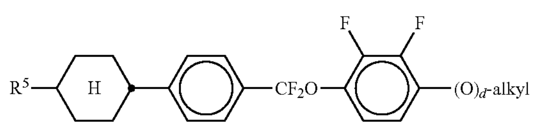

Y6

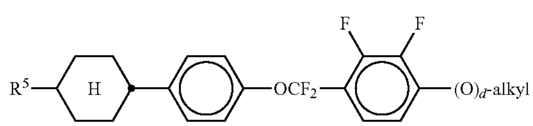

Y7

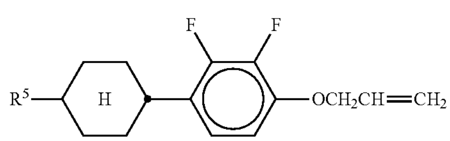

Y8

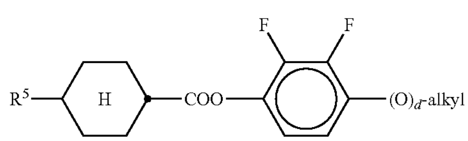

Y9

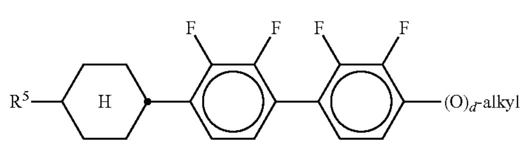

-continued

Y10

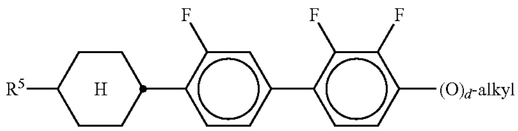

Y11

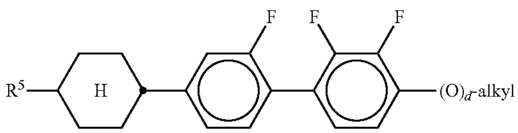

Y12

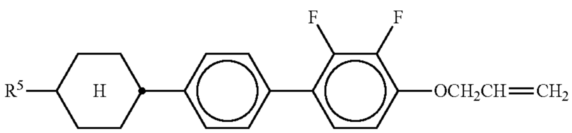

Y13

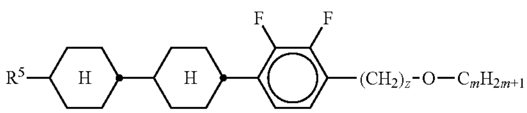

Y14

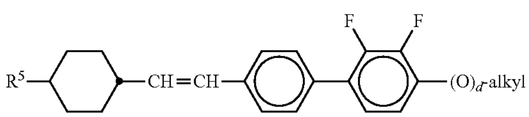

Y15

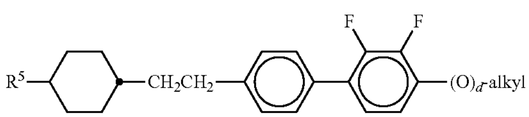

Y16

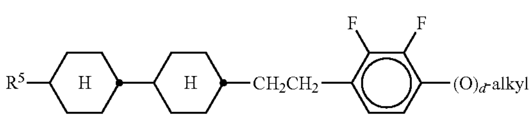

in which $R^5$ has one of the meanings indicated above for $R^1$, alkyl denote $C_{1-6}$-alkyl, d denote 0 or 1, and z and m each, independently of one another, denote an integer from 1 to 6. $R^5$ in these compounds is particularly preferably $C_{1-6}$-alkyl or —alkoxy or $C_{2-6}$-alkenyl, d is preferably 1. The LC medium according to the invention preferably comprises one or more compounds of the above-mentioned formulae in amounts of 5% by weight.

h) LC medium wherein component B) or the LC host mixture additionally comprises one or more biphenyl compounds selected from the group consisting of the following formulae:

B1

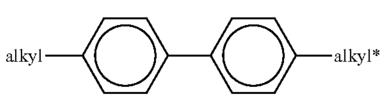

B2

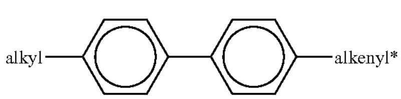

-continued

B3

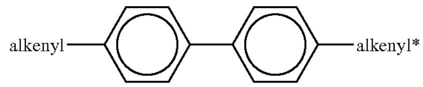

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

The proportion of the biphenyls of the formulae B1 to B3 in the LC host mixture is preferably at least 3% by weight, in particular 5% by weight.

The compounds of the formula B2 are particularly preferred.

The compounds of the formulae B1 to B3 are preferably selected from the group consisting of the following subformulae:

B1a

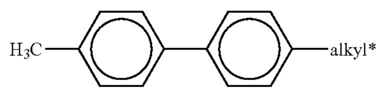

B2a

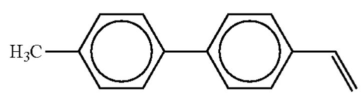

B2b

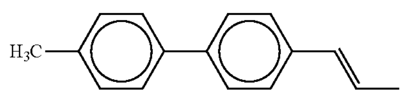

B2c

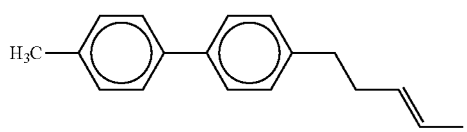

in which alkyl* denote an alkyl radical having 1-6 C atoms. The medium according to the invention particularly preferably comprises one or more compounds of the formulae B1a and/or B2c.

i) LC medium wherein component B) or the LC host mixture additionally comprises one or more terphenyl compounds of the following formula:

T

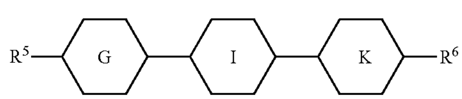

in which $R^5$ and $R^6$ each, independently of one another, have one of the meanings indicated above, and

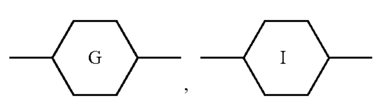

and

-continued
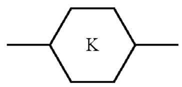
each, independently of one another, denote
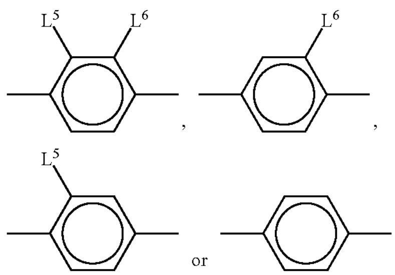
in which $L^5$ denote F or Cl, preferably F, and $L^6$ denote F, Cl, $OCF_3$, $CF_3$, $CH_3$, $CH_2F$ or $CHF_2$, preferably F.
The compounds of the formula T are preferably selected from the group consisting of the following sub-formulae:
T1
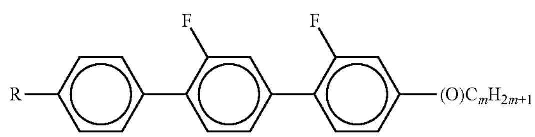
T2
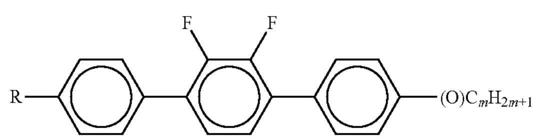
T3
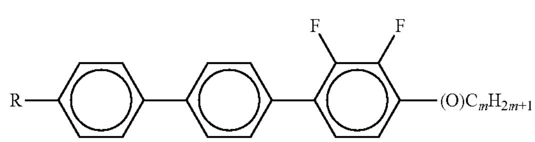
T4
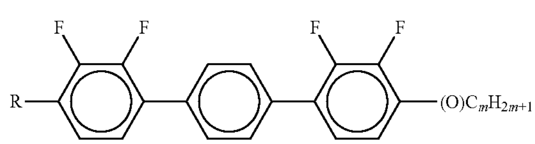
T5
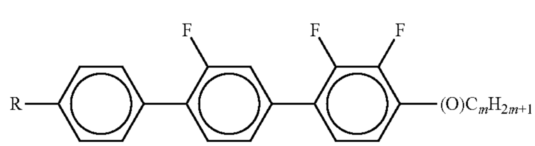
T6
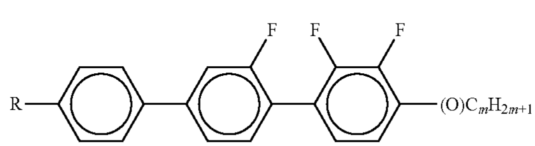
-continued
T7
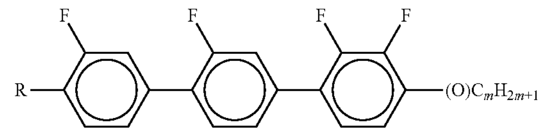
T8
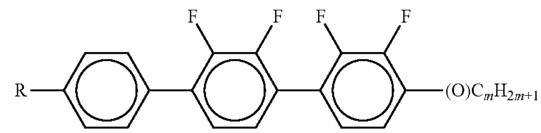
T9
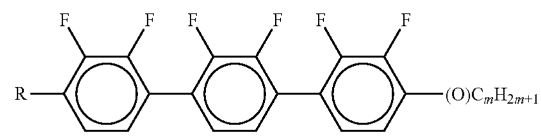
T10
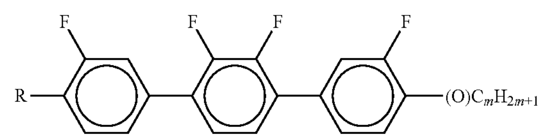
T11
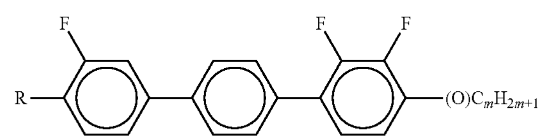
T12
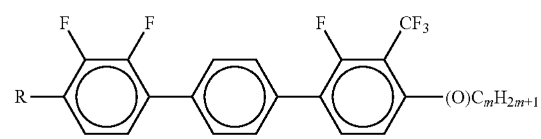
T13
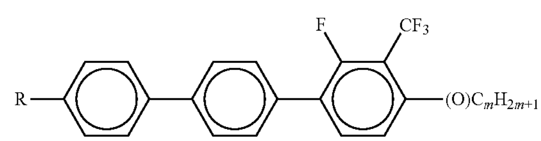
T14
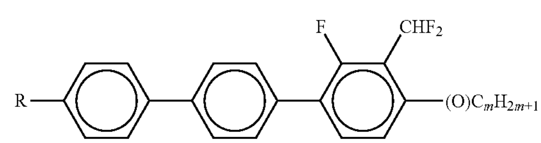
T15
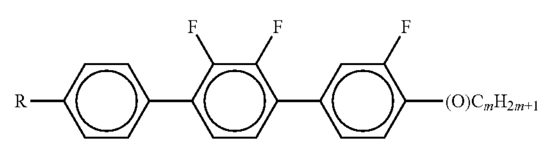
T16
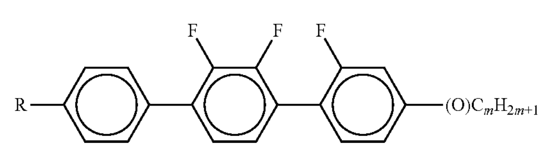

-continued

T17

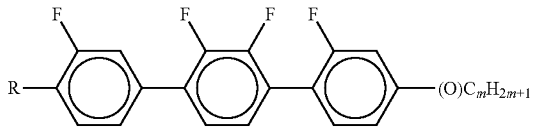

T18

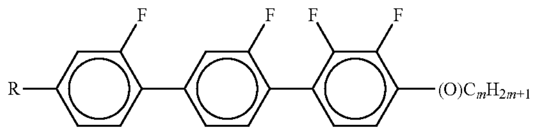

T19

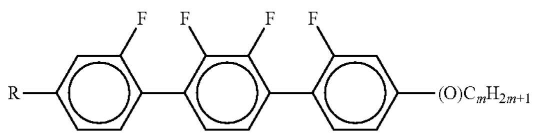

T20

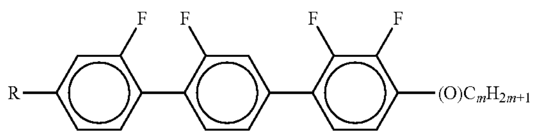

T21

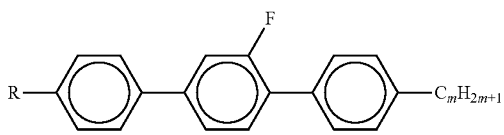

T22

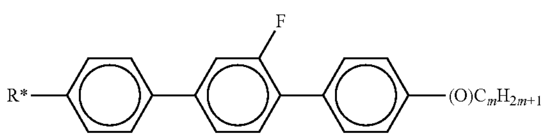

T23

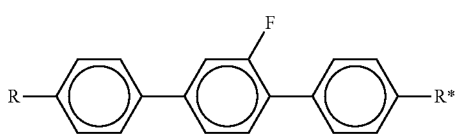

T24

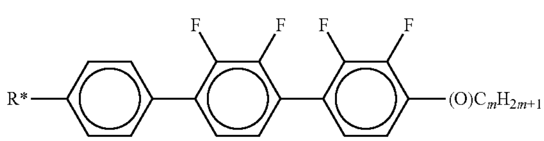

in which R denote a straight-chain alkyl or alkoxy radical having 1-7 C atoms, R* denote a straight-chain alkenyl radical having 2-7 C atoms, (O) denote an oxygen atom or a single bond, and m denote an integer from 1 to 6. R* preferably denote $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

R preferably denote methyl, ethyl, propyl, butyl, pentyl, hexyl, methoxy, ethoxy, propoxy, butoxy or pentoxy.

The LC host mixture according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denote alkyl, furthermore alkoxy, each having 1-5 C atoms.

The terphenyls are preferably employed in LC media according to the invention if the Δn value of the mixture is to be ≥0.1. Preferred LC media comprise 2-20% by weight of one or more terphenyl compounds of the formula T, preferably selected from the group of compounds T1 to T22.

k) LC medium wherein component B) or the LC host mixture additionally comprises one or more quaterphenyl compounds selected from the group consisting of the following formulae:

Q

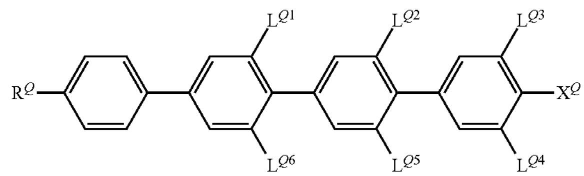

wherein $R^Q$ is alkyl, alkoxy, oxaalkyl or alkoxyalkyl having 1 to 9 C atoms or alkenyl or alkenyloxy having 2 to 9 C atoms, all of which are optionally fluorinated, $X^Q$ is F, Cl, halogenated alkyl or alkoxy having 1 to 6 C atoms or halogenated alkenyl or alkenyloxy having 2 to 6 C atoms, $L^{Q1}$ to $L^{Q6}$ independently of each other are H or F, with at least one of $L^{Q1}$ to $L^{Q6}$ being F.

Preferred compounds of formula Q are those wherein $R^Q$ denote straight-chain alkyl with 2 to 6 C-atoms, very preferably ethyl, n-propyl or n-butyl.

Preferred compounds of formula Q are those wherein $L^{Q3}$ and $L^{Q4}$ are F. Further preferred compounds of formula Q are those wherein $L^{Q3}$, $L^{Q4}$ and one or two of $L^{Q1}$ and $L^{Q2}$ are F.

Preferred compounds of formula Q are those wherein $X^Q$ denote F or $OCF_3$, very preferably F.

The compounds of formula Q are preferably selected from the following subformulae

Q1

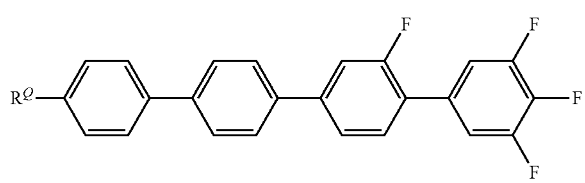

Q2

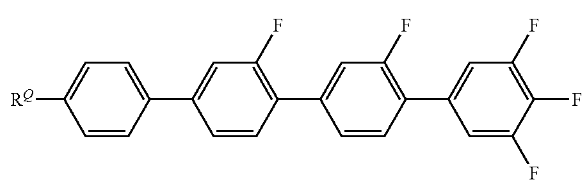

wherein $R^Q$ has one of the meanings of formula Q or one of its preferred meanings given above and below, and is preferably ethyl, n-propyl or n-butyl.

Especially preferred are compounds of formula Q1, in particular those wherein $R^Q$ is n-propyl.

Preferably the proportion of compounds of formula Q in the LC host mixture is from >0 to ≤5% by weight, very preferably from 0.1 to 2% by weight, most preferably from 0.2 to 1.5% by weight.

Preferably the LC host mixture contains 1 to 5, preferably 1 or 2 compounds of formula Q.

The addition of quaterphenyl compounds of formula Q to the LC host mixture enables to reduce ODF mura, whilst maintaining high UV absorption, enabling quick and complete polymerisation, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants $\varepsilon_{\|}$ and $\varepsilon_{\perp}$, and in particular enables to achieve a high value of the dielectric constant $\varepsilon_{\|}$ while keeping the dielectric anisotropy $\Delta\varepsilon$ constant, thereby reducing the kick-back voltage and reducing image sticking.

l) LC medium wherein component B) or the LC host mixture additionally comprises one or more compounds of formula CC:

CC

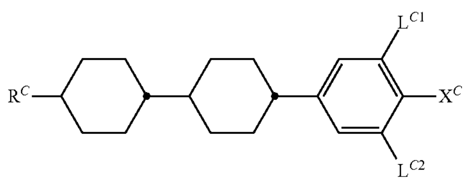

wherein $R^C$ denote alkyl, alkoxy, oxaalkyl or alkoxyalkyl having 1 to 9 C atoms or alkenyl or alkenyloxy having 2 to 9 C atoms, all of which are optionally fluorinated, $X^C$ denote F, Cl, halogenated alkyl or alkoxy having 1 to 6 C atoms or halogenated alkenyl or alkenyloxy having 2 to 6 C atoms, $L^{C1}$, $L^{C2}$ independently of each other denote H or F, with at least one of $L^{C1}$ and $L^{C2}$ being F.

Preferred compounds of formula CC are those wherein RC denote straight-chain alkyl with 2 to 6 C-atoms, very preferably ethyl, n-propyl or n-butyl.

Preferred compounds of formula CC are those wherein $L^{C1}$ and $L^{C2}$ are F.

Preferred compounds of formula CC are those wherein $X^C$ denote F or $OCF_3$, very preferably F.

Preferred compounds of formula CC are selected from the following formula

CC1

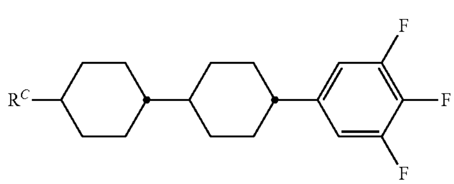

wherein $R^C$ has one of the meanings of formula CC or one of its preferred meanings given above and below, and is preferably ethyl, n-propyl or n-butyl, very preferably n-propyl.

Preferably the proportion of compounds of formula CC in the LC host mixture is from >0 to ≤10% by weight, very preferably from 0.1 to 8% by weight, most preferably from 0.2 to 5% by weight.

Preferably the LC host mixture contains 1 to 5, preferably 1, 2 or 3 compounds of formula CC.

The addition of compounds of formula CC, which have positive dielectric anisotropy, to the LC medium with negative dielectric anisotropy allows a better control of the values of the dielectric constants $\varepsilon_{\|}$ and $\varepsilon_{\perp}$, and in particular enables to achieve a high value of the dielectric constant $\varepsilon_{\|}$ while keeping the dielectric anisotropy $\Delta\varepsilon$ constant, thereby reducing the kick-back voltage and reducing image sticking. Besides, the addition of compounds of formula CC enables to reduce the viscosity and the response time of the LC medium.

m) LC medium wherein component B) or the LC host mixture additionally comprises one or more compounds selected from the group consisting of the following formulae:

O1

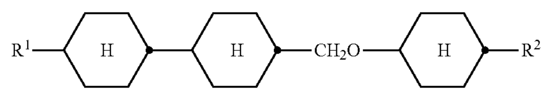

O2

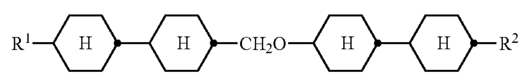

O3

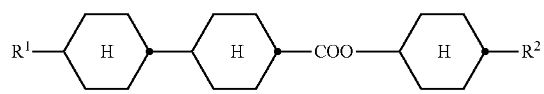

O4

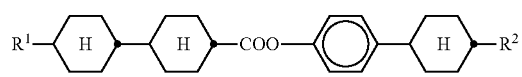

O5

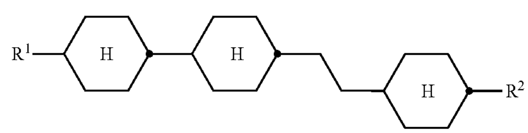

O6

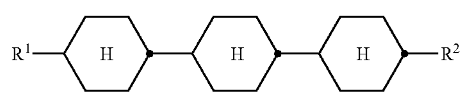

O7

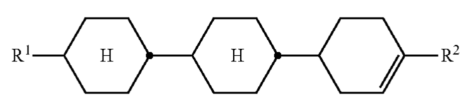

O8

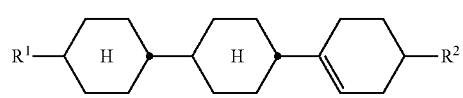

O9

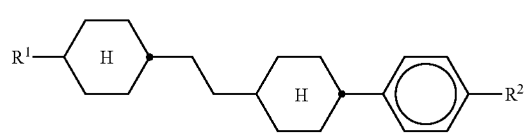

-continued

O10

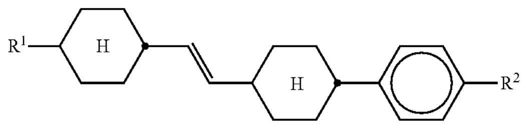

O11

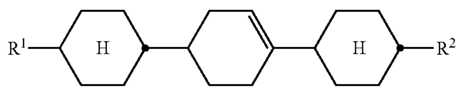

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae 01, 03 and 04.

n) LC medium wherein component B) or the LC host mixture additionally comprises one or more compounds of the following formula:

FI

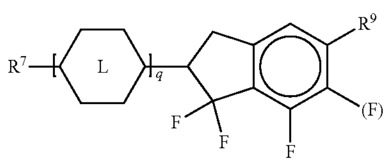

in which

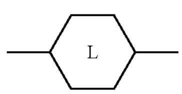

denote

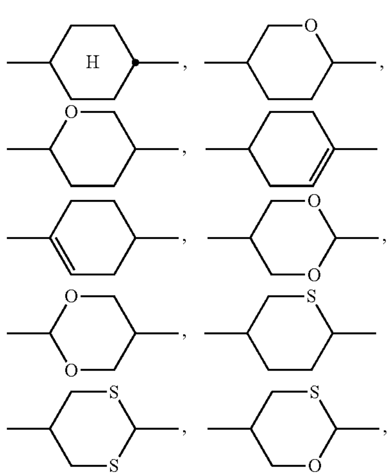

$R^9$ denote H, $CH_3$, $C_2H_5$ or n-$C_3H_7$, (F) denote an optional fluorine substituent, and q denote 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

FI1

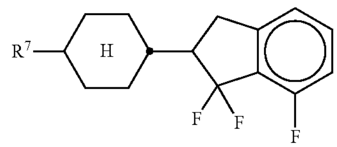

FI2

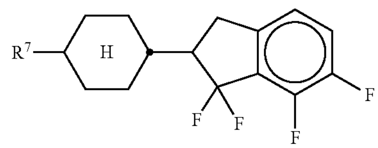

FI3

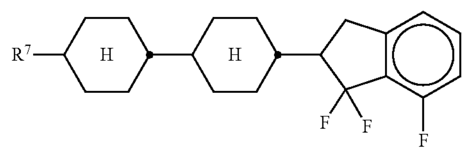

FI4

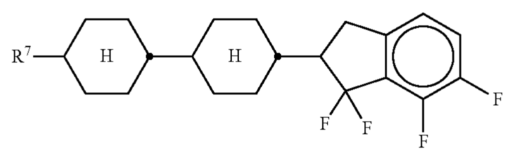

FI5

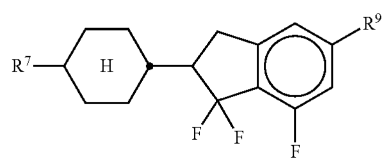

FI6

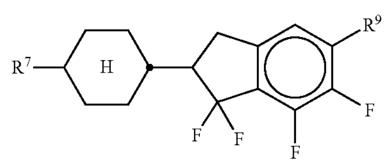

FI7

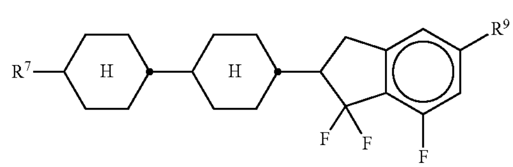

FI8

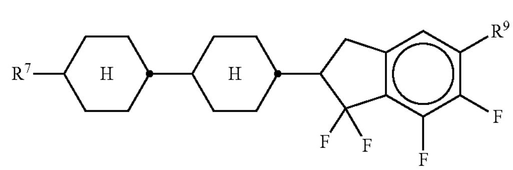

in which $R^7$ preferably denote straight-chain alkyl, and $R^9$ denote $CH_3$, $C_2H_5$ or n-$C_3H_7$. Particular preference is given to the compounds of the formulae FI1, FI2 and FI3.

o) LC medium wherein component B) or the LC host mixture additionally comprises one or more compounds selected from the group consisting of the following formulae:

VK1

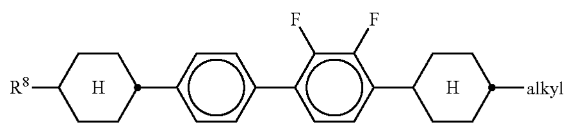

VK2

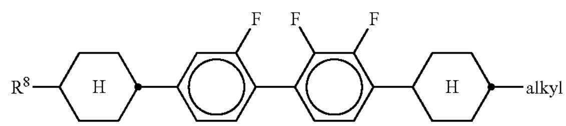

VK3

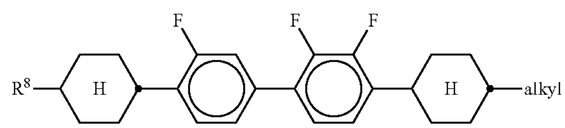

VK4

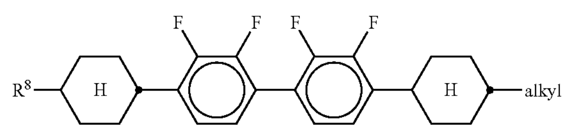

in which $R^8$ has the meaning indicated for $R^1$, and alkyl denote a straight-chain alkyl radical having 1-6 C atoms.

p) LC medium wherein component B) or the LC host mixture additionally comprises one or more compounds which contain a tetrahydronaphthyl or naphthyl unit, such as, for example, the compounds selected from the group consisting of the following formulae:

N1

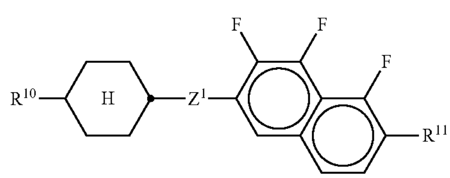

N2

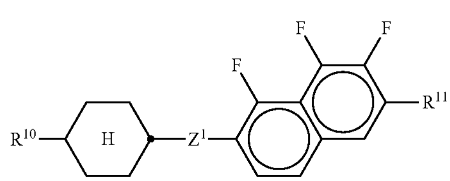

N3

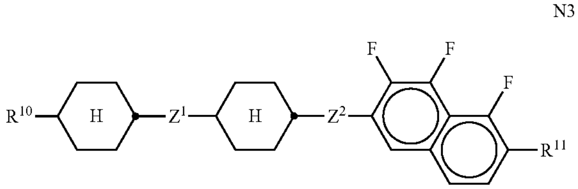

N4

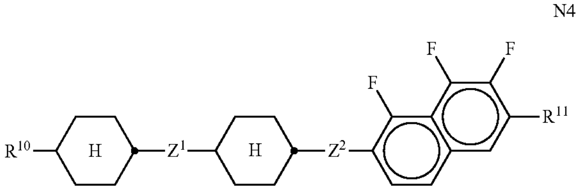

-continued

N5

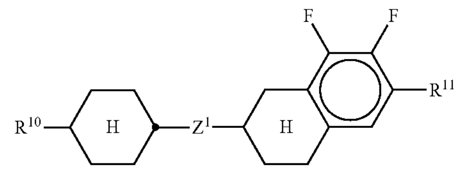

N6

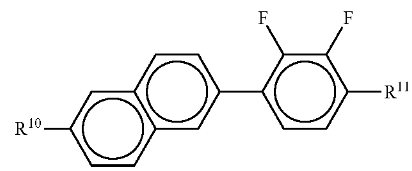

N7

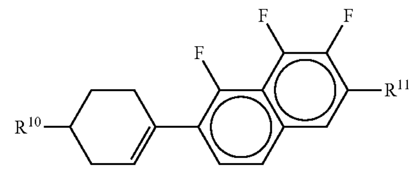

N8

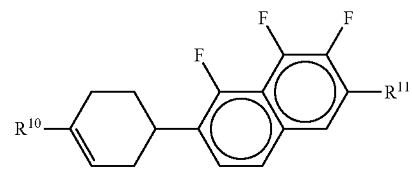

N9

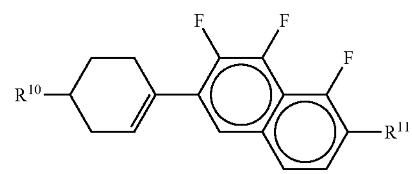

N10

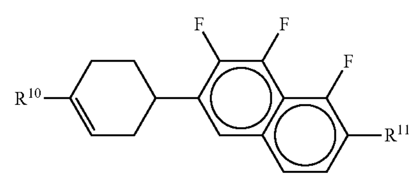

in which $R^{10}$ and $R^{11}$ each, independently of one another, denote alkyl having 1 to 12 C atoms, where, in addition, one or two non-adjacent $CH_2$ groups may be replaced by —O—, —CH═CH—, —CO—, —OCO— or —COO— in such a way that O atoms are not linked directly to one another, preferably alkyl or alkoxy having 1 to 6 C atoms, and $R^{10}$ and $R^{11}$ preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$-, —CH═CH—, —$(CH_2)_4$—, —$(CH_2)_3$O—, —O$(CH_2)_3$—, —CH═CH—$CH_2CH_2$—, —$CH_2CH_2$CH═CH—, —$CH_2$O—, —O$CH_2$—, —CO—O—, —O—CO—, —$C_2F_4$—, —CF═CF—, —CF═CH—, —CH═CF—, —$CH_2$- or a single bond.

q) LC medium wherein component B) or the LC host mixture additionally comprises one or more difluorodibenzochromans and/or chromans of the following formulae:

BC

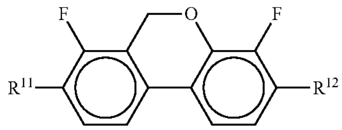

CR

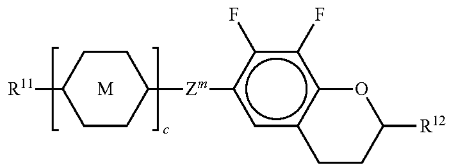

RC

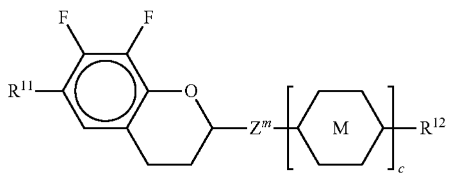

in which $R^{11}$ and $R^{12}$ each, independently of one another, have one of the meanings indicated above for $R^{11}$, ring M is trans-1,4-cyclohexylene or 1,4-phenylene, $Z^m$ —$C_2H_4$—, —$CH_2O$—, —$OCH_2$—, —CO—O- or —O—CO—, c is 0, 1 or 2, preferably in amounts of 3 to 20% by weight, in particular in amounts of 3 to 15% by weight.

Particularly preferred compounds of the formulae BC, CR and RC are selected from the group consisting of the following sub-formulae:

BC1

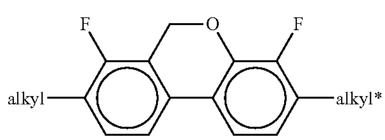

BC2

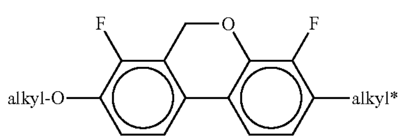

BC3

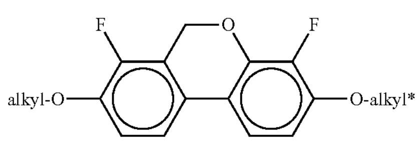

BC4

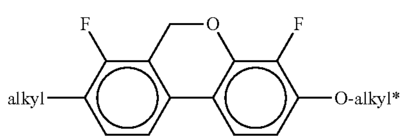

BC5

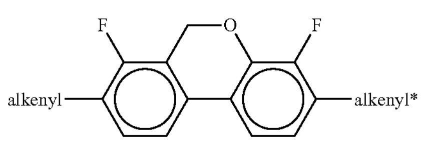

-continued

BC6

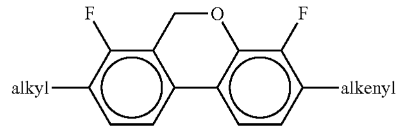

BC7

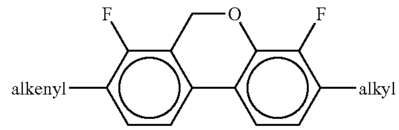

CR1

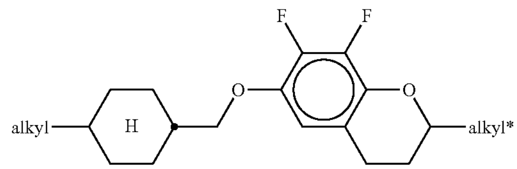

CR2

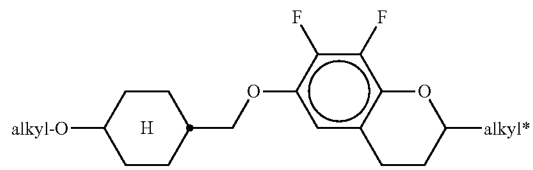

CR3

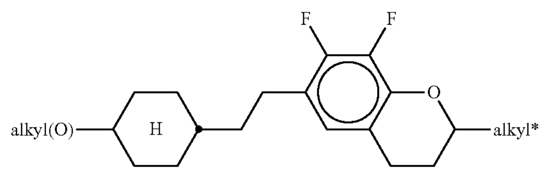

CR4

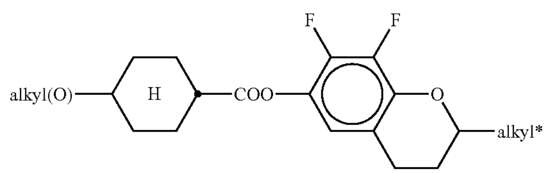

CR5

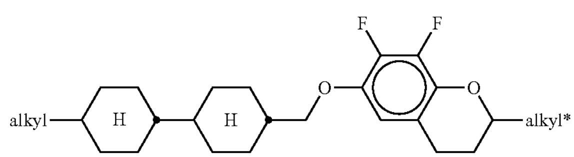

CR6

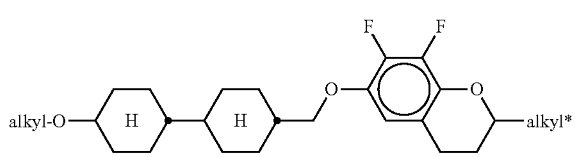

CR7

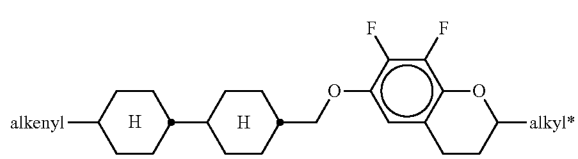

-continued

CR8

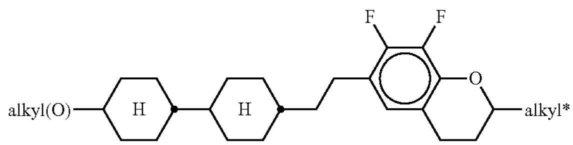

CR9

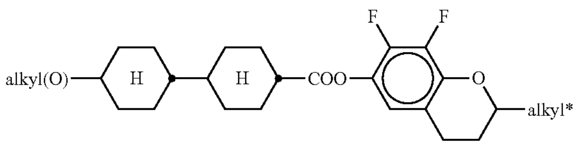

RC1

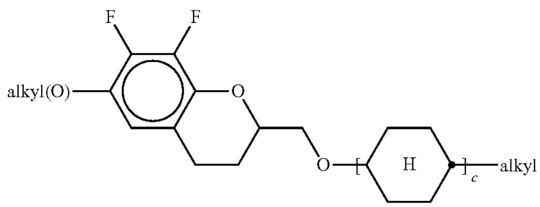

RC2

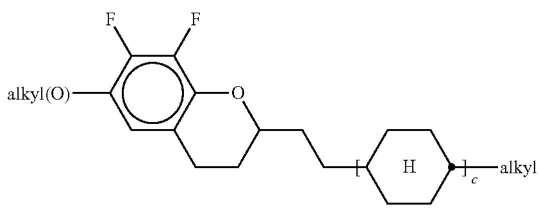

RC3

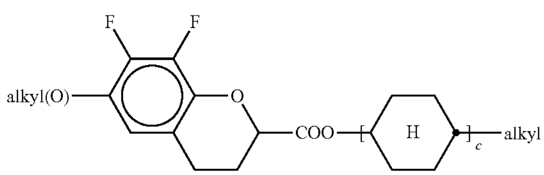

in which alkyl and alkyl* each, independently of one another, denote a straight-chain alkyl radical having 1-6 C atoms, (O) denote an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

Very particular preference is given to LC host mixtures comprising one, two or three compounds of the formula BC-2.

r) LC medium wherein component B) or the LC host mixture additionally comprises one or more fluorinated phenanthrenes and/or dibenzofurans of the following formulae:

PH

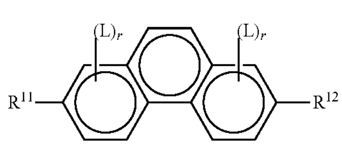

-continued

BF

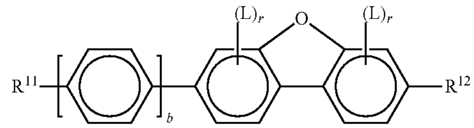

in which $R^{11}$ and $R^{12}$ each, independently of one another, have one of the meanings indicated above for $R^{11}$, b denote 0 or 1, L denote F, and r denote 1, 2 or 3.

Particularly preferred compounds of the formulae PH and BF are selected from the group consisting of the following sub-formulae:

PH1

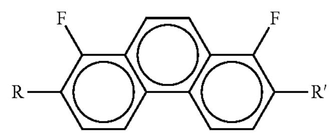

PH2

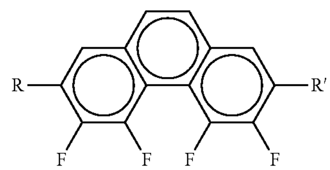

BF1

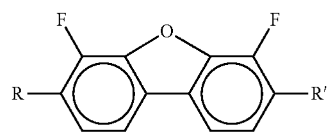

BF2

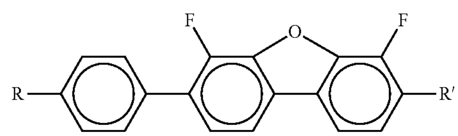

in which R and R' each, independently of one another, denote a straight-chain alkyl or alkoxy radical having 1-7 C atoms.

s) LC medium wherein component B) or the LC host mixture additionally comprises one or more monocyclic compounds of the following formula

Y

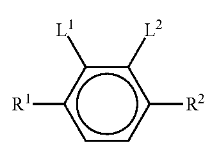

wherein $R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denote F and the other denote Cl, The compounds of the formula Y are preferably selected from the group consisting of the following sub-formulae:

Y1

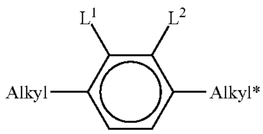

Y2

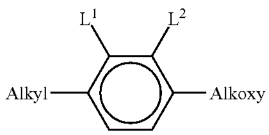

Y3

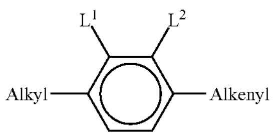

Y4

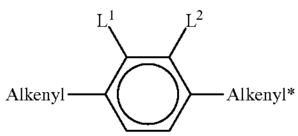

Y5

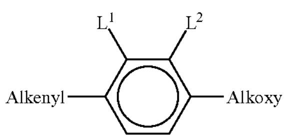

Y6

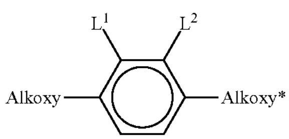

Y7

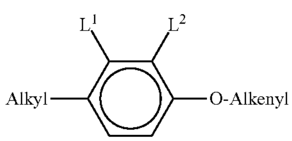

Y8

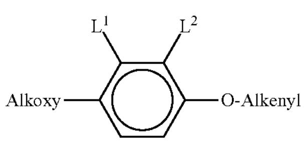

Y9

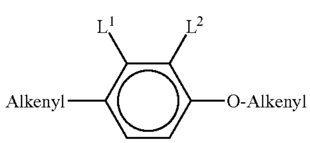

Y10

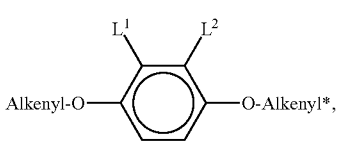

in which, Alkyl and Alkyl* each, independently of one another, denote a straight-chain alkyl radical having 1-6 C atoms, Alkoxy denote a straight-chain alkoxy radical having 1-6 C atoms, Alkenyl and Alkenyl* each, independently of one another, denote a straight-chain alkenyl radical having 2-6 C atoms, and O denote an oxygen atom or a single bond. Alkenyl and Alkenyl* preferably denote $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

Particularly preferred compounds of the formula Y are selected from the group consisting of the following sub-formulae:

Y6A

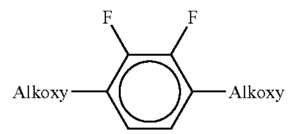

Y6B

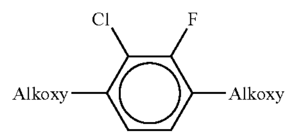

wherein Alkoxy preferably denote straight-chain alkoxy with 3, 4, or 5 C atoms.

t) LC medium which, apart from the polymerisable compounds as described above and below, does not contain a compound which contains a terminal vinyloxy group (~O—CH=$CH_2$).

u) LC medium wherein component B) or the LC host mixture comprises 1 to 8, preferably 1 to 5, compounds of the formulae CY1, CY2, PY1 and/or PY2. The proportion of these compounds in the LC host mixture as a whole is preferably 5 to 60%, particularly preferably 10 to 35%. The content of these individual compounds is preferably in each case 2 to 20%.

v) LC medium wherein component B) or the LC host mixture comprises 1 to 8, preferably 1 to 5, compounds of the formulae CY9, CY10, PY9 and/or PY10. The proportion of these compounds in the LC host mixture as a whole is preferably 5 to 60%, particularly preferably 10 to 35%. The content of these individual compounds is preferably in each case 2 to 20%.

w) LC medium wherein component B) or the LC host mixture comprises 1 to 10, preferably 1 to 8, compounds of the formula ZK, in particular compounds of the formulae ZK1, ZK2 and/or ZK6. The proportion of these compounds in the LC host mixture as a whole is preferably 3 to 25%, particularly preferably 5 to 45%. The content of these individual compounds is preferably in each case 2 to 20%.

x) LC medium in which the proportion of compounds of the formulae CY, PY and ZK in the LC host mixture as a whole is greater than 70%, preferably greater than 80%.

y) LC medium in which the LC host mixture contains one or more compounds containing an alkenyl group, preferably selected from formulae AN and AY, very preferably selected from formulae AN1, AN3, AN6 and AY14, most preferably from formulae AN1a, AN3a, AN6a and AY14. The concentration of these compounds in the LC host mixture is preferably from 2 to 70%, very preferably from 3 to 55%.

z) LC medium wherein component B) or the LC host mixture contains one or more, preferably 1 to 5, compounds selected of formula PY1-PY8, very preferably of formula PY2. The proportion of these compounds in the LC host mixture as a whole is preferably 1 to 30%, particularly preferably 2 to 20%. The content of these individual compounds is preferably in each case 1 to 20%.

z1) LC medium wherein component B) or the LC host mixture contains one or more, preferably 1, 2 or 3, compounds selected from formulae T1, T2 and T5, very preferably from formula T2. The content of these compounds in the LC host mixture as a whole is preferably 1 to 20%.

z2) LC medium in which the LC host mixture contains one or more compounds selected from formulae CY and PY, one or more compounds selected from formulae AN and AY, and one or more compounds selected from formulae T and Q.

z3) LC medium in which the LC host mixture contains one or more, preferably 1, 2 or 3, compounds of formula BF1, and one or more, preferably 1, 2 or 3, compounds selected from formulae AY14, AY15 and AY16, very preferably of formula AY14. The proportion of the compounds of formula AY14—AY16 in the LC host mixture is preferably from 2 to 35%, very preferably from 3 to 30%. The proportion of the compounds of formula BF1 in the LC host mixture is preferably from 0.5 to 20%, very preferably from 1 to 15%. Further preferably the LC host mixture according to this preferred embodiment contains one or more, preferably 1, 2 or 3 compounds of formula T, preferably selected from formula T1, T2 and T5, very preferably from formula T2 or T5. The proportion of the compounds of formula T in the LC host mixture medium is preferably from 0.5 to 15%, very preferably from 1 to 10%.

In a second preferred embodiment the LC medium contains an LC host mixture based on compounds with positive dielectric anisotropy. Such LC media are especially suitable for use in PS-OCB-, PS-TN-, PS-Posi-VA-, PS-IPS- or PS-FFS-displays.

A

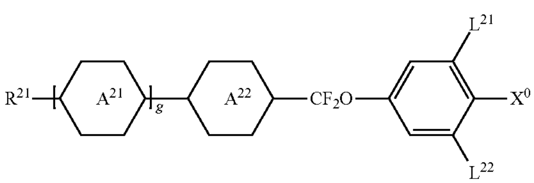

B

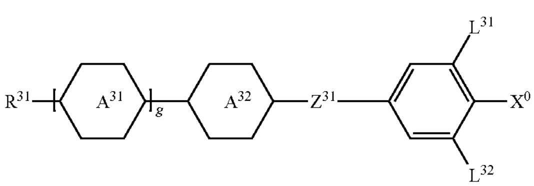

in which the individual radicals have, independently of each other and on each occurrence identically or differently, the following meanings:

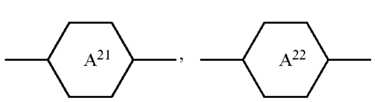

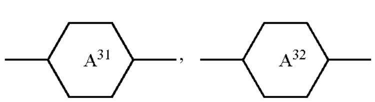

each, independently of one another, and on each occurrence, identically or differently

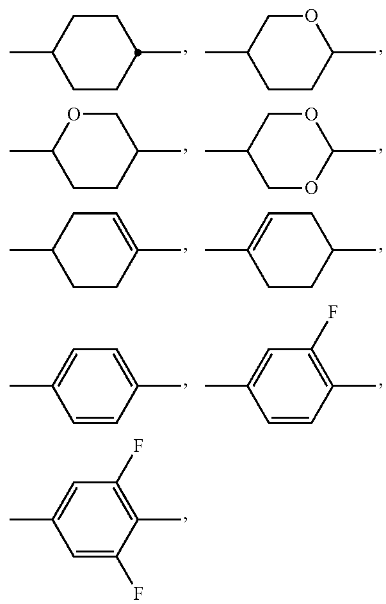

$R^{21}$, $R^{31}$ each, independently of one another, alkyl, alkoxy, oxaalkyl or alkoxyalkyl having 1 to 9 C atoms or alkenyl or alkenyloxy having 2 to 9 C atoms, all of which are optionally fluorinated, $X^0$ F, Cl, halogenated alkyl or alkoxy having 1 to 6 C atoms or halogenated alkenyl or alkenyloxy having 2 to 6 C atoms, $Z^{31}$ —$CH_2CH_2$—, —$CF_2CF_2$—, —COO—, trans—CH═CH—, trans-CF═CF—, —$CH_2O$- or a single bond, preferably —$CH_2CH_2$—, —COO—, trans—CH═CH— or a single bond, particularly preferably —COO—, trans—CH═CH— or a single bond, $L^{21}$, $L^{22}$, $L^{31}$, $L^{32}$ each, independently of one another, H or F, g 0, 1, 2 or 3.

In the compounds of formula A and B, $X^0$ is preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or CH═$CF_2$, very preferably F or $OCF_3$, most preferably F.

In the compounds of formula A and B, $R^{21}$ and $R^{31}$ are preferably selected from straight-chain alkyl or alkoxy with 1, 2, 3, 4, 5 or 6 C atoms, and straight-chain alkenyl with 2, 3, 4, 5, 6 or 7 C atoms.

In the compounds of formula A and B, g is preferably 1 or 2.

In the compounds of formula B, $Z^{31}$ is preferably COO, trans—CH═CH or a single bond, very preferably COO or a single bond.

Preferably component B) of the LC medium comprises one or more compounds of formula A selected from the group consisting of the following formulae:

A1

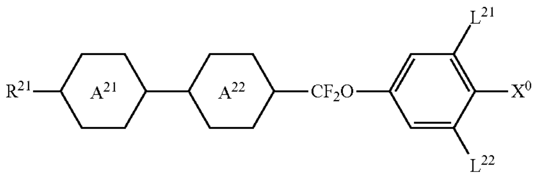

A2

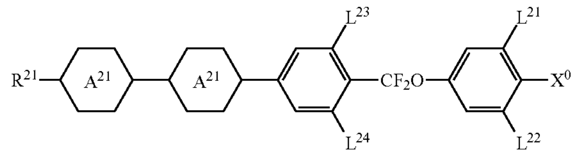

A3

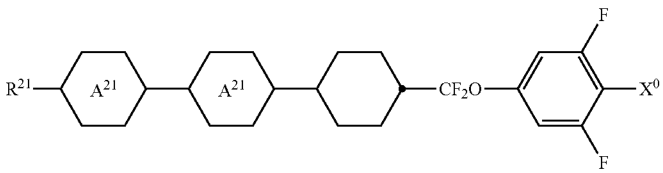

A4

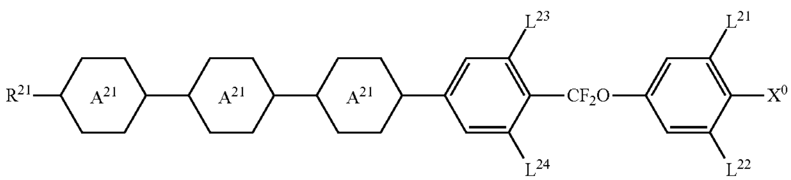

in which $A^{21}$, $A^{22}$, $R^{21}$, $X^0$, $L^{21}$ and $L^{22}$ have the meanings given in formula A, $L^{23}$ and $L^{24}$ each, independently of one another, are H or F, and $X^0$ is preferably F. Particularly preferred are compounds of formulae A1 and A2.

Particularly preferred compounds of formula A1 are selected from the group consisting of the following subformulae:

A1a

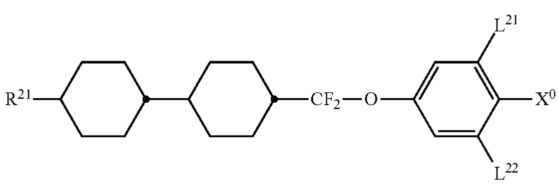

A1b

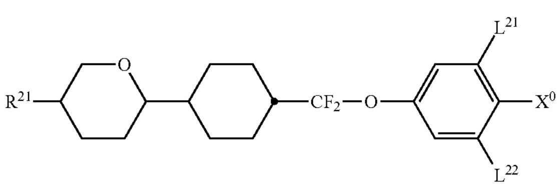

A1c

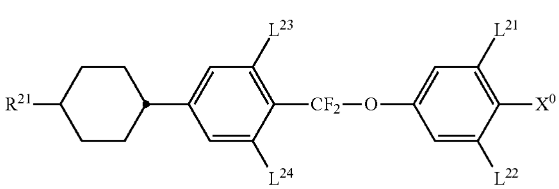

-continued

A1d

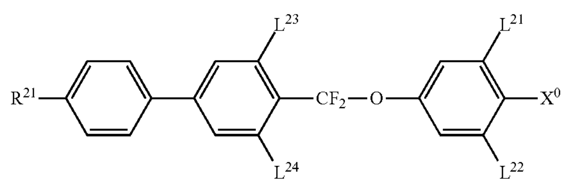

A1e

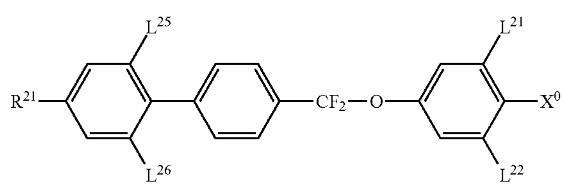

A1f

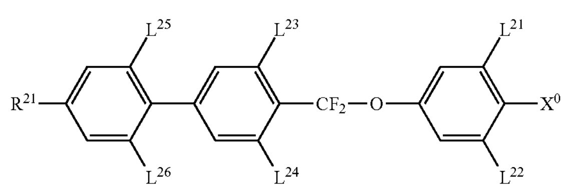

in which $R^{21}$, $X^0$, $L^{21}$ and $L^{22}$ have the meaning given in formula A1, $L^{23}$, $L^{24}$, $L^{25}$ and $L^{26}$ are each, independently of one another, H or F, and $X^0$ is preferably F.

Very particularly preferred compounds of formula A1 are selected from the group consisting of the following subformulae:

A1a1
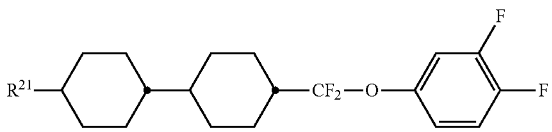
A1a2
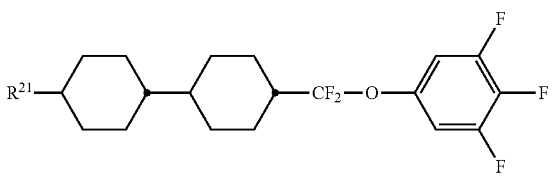
A1b1
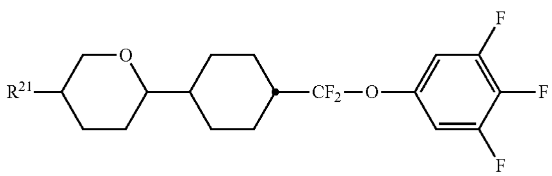
A1d1
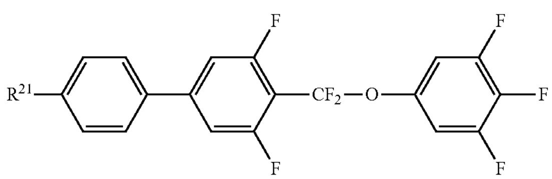
A1e1
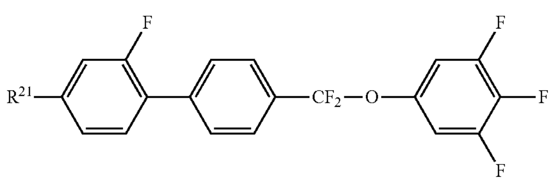
A1f1
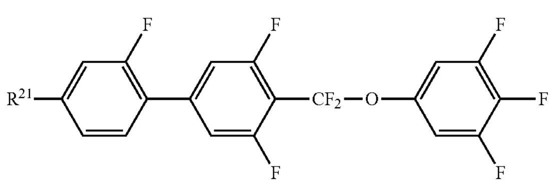
In which $R^{21}$ is as defined in formula A1.
Particularly preferred compounds of formula A2 are selected from the group consisting of the following subformulae:
A2a
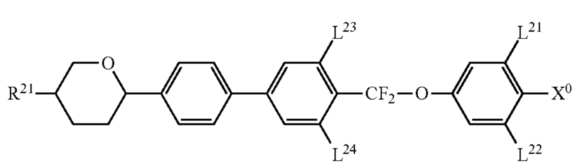
-continued
A2b
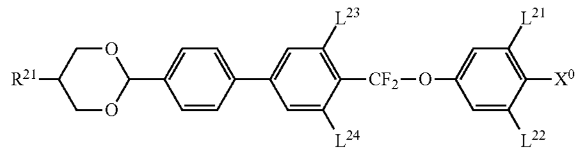
A2c
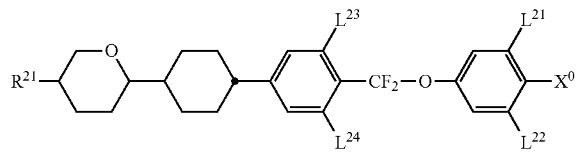
A2d
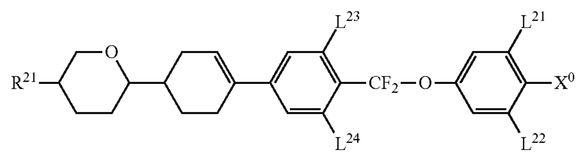
A2e
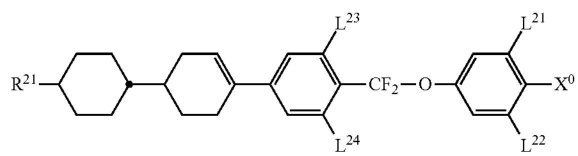
A2f
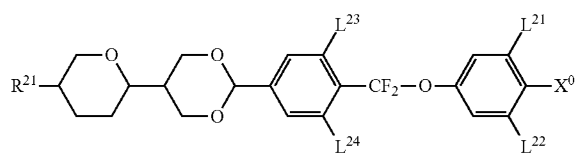
A2g
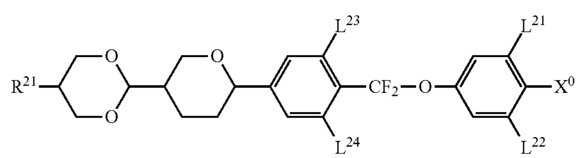
A2h
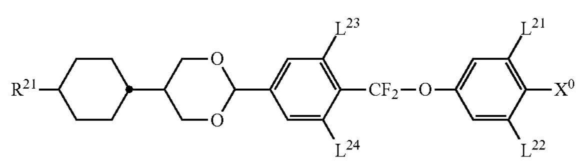
A2i
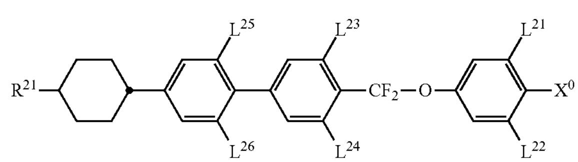
A2k
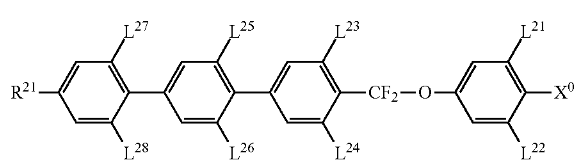

-continued

A2l

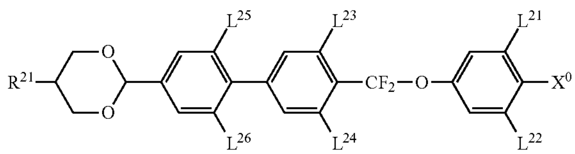

in which $R^{21}$, $X^0$, $L^{21}$ and $L^{22}$ have the meaning given in formula A2, $L^{23}$, $L^{24}$, $L^{25}$ and $L^{26}$ each, independently of one another, are H or F, and $X^0$ is preferably F.

Very particularly preferred compounds of formula A2 are selected from the group consisting of the following subformulae:

A2a1

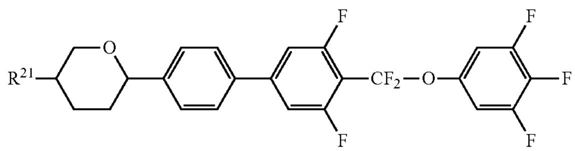

A2c1

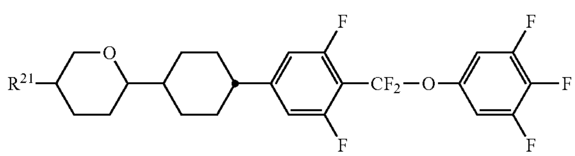

A2d1

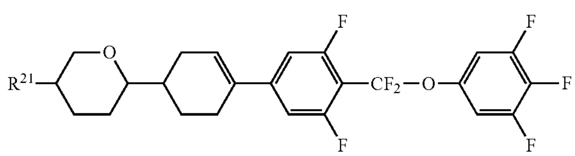

A2e1

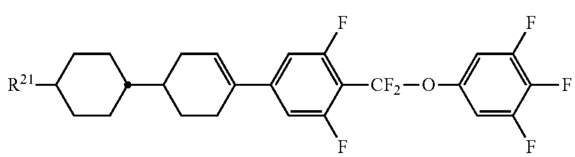

A2f1

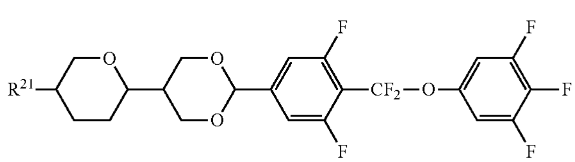

A2h1

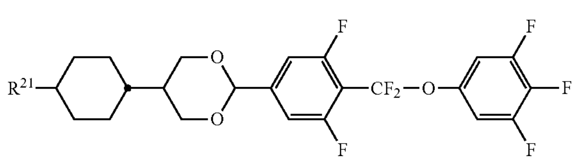

-continued

A2i1

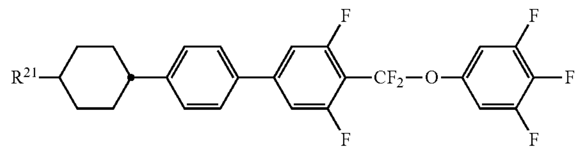

A2i2

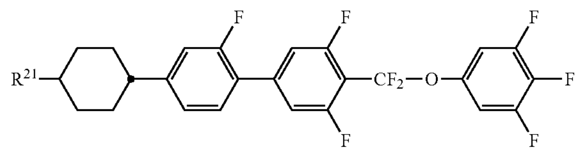

A2k1

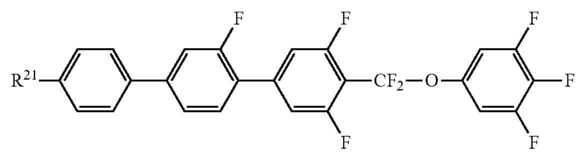

A2k2

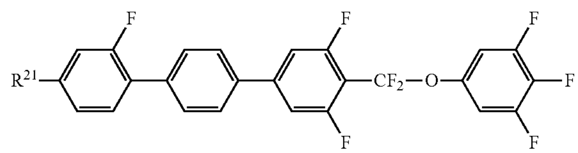

A2l2

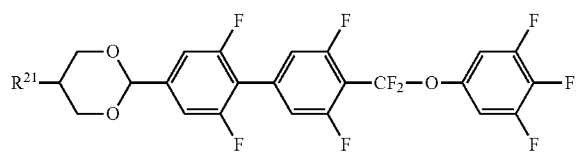

in which $R^{21}$ and $X^0$ are as defined in formula A2.

Particularly preferred compounds of formula A3 are selected from the group consisting of the following subformulae:

A3a

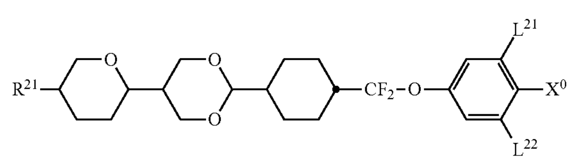

A3b

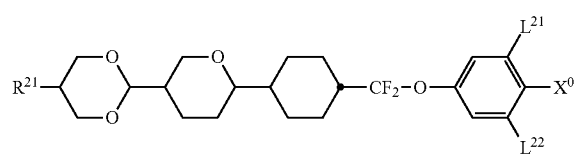

A3c

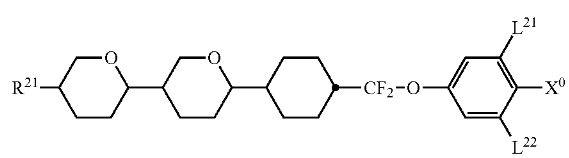

in which $R^{21}$, $X^0$, $L^{21}$ and $L^{22}$ have the meaning given in formula A3, and $X^0$ is preferably F.

Particularly preferred compounds of formula A4 are selected from the group consisting of the following subformulae:

A4a

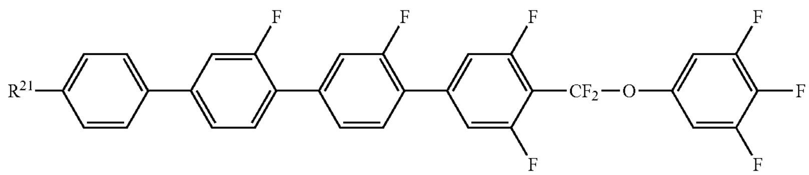

in which $R^{21}$ is as defined in formula A4.

Preferably component B) of the LC medium comprises one or more compounds of formula B selected from the group consisting of the following formulae:

B1

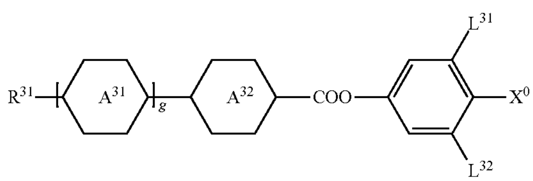

B2

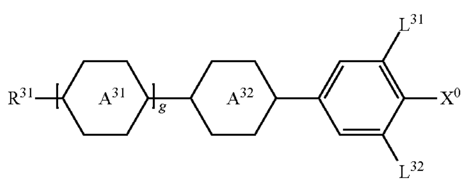

B3

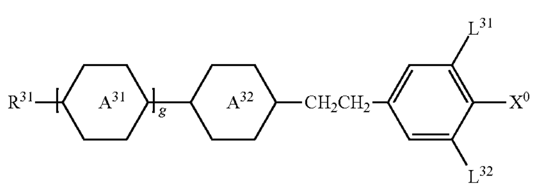

in which g, $A^{31}$, $A^{32}$, $R^{31}$, $X^0$, $L^{31}$ and $L^{32}$ have the meanings given in formula B, and $X^0$ is preferably F. Particularly preferred are compounds of formulae B1 and B2.

Particularly preferred compounds of formula B1 are selected from the group consisting of the following subformulae:

B1a

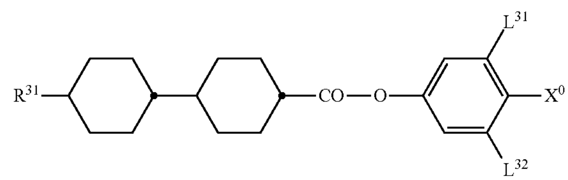

B1b

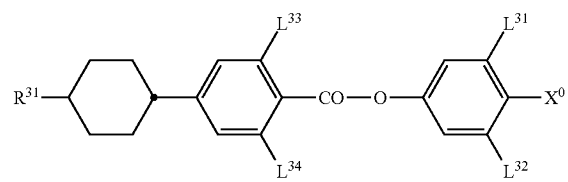

in which $R^{31}$, $X^0$, $L^{31}$ and $L^{32}$ have the meaning given in formula B1, and $X^0$ is preferably F.

Very particularly preferred compounds of formula B1a are selected from the group consisting of the following subformulae:

B1a1

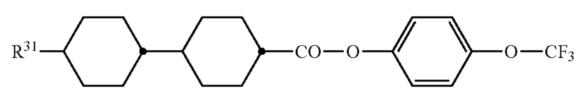

B1a2

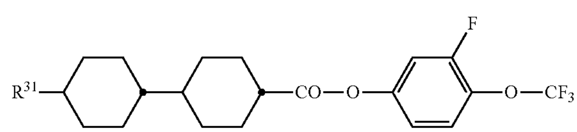

B1a3

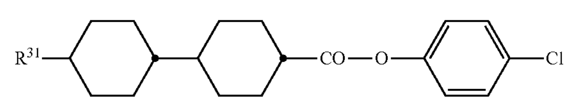

B1a4

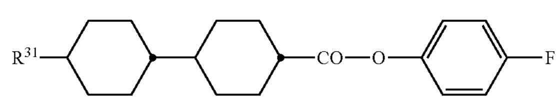

B1a5

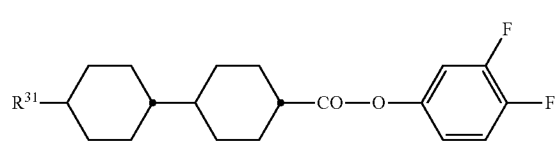

-continued

B1a6

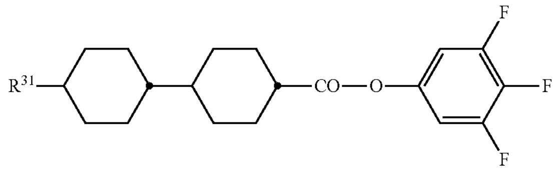

in which $R^{31}$ is as defined in formula B1.

Very particularly preferred compounds of formula B1b are selected from the group consisting of the following subformulae:

B1b1

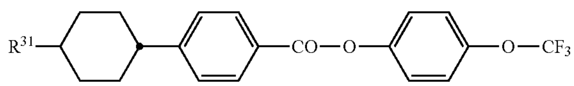

B1b2

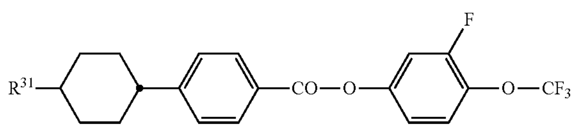

B1b3

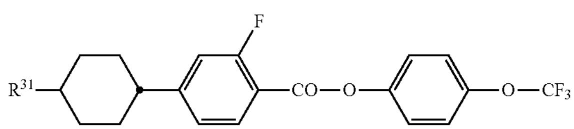

B1b4

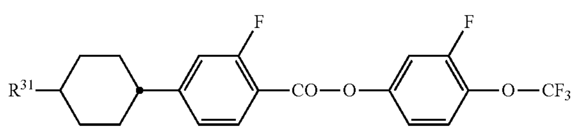

in which $R^{31}$ is as defined in formula B1.

Particularly preferred compounds of formula B2 are selected from the group consisting of the following subformulae:

B2a

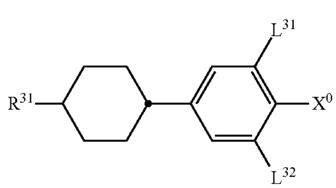

B2b

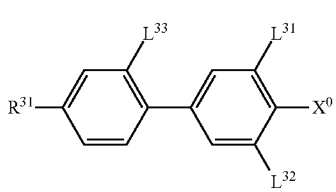

-continued

B2c

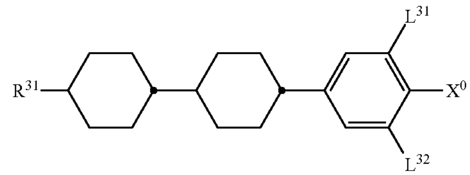

B2d

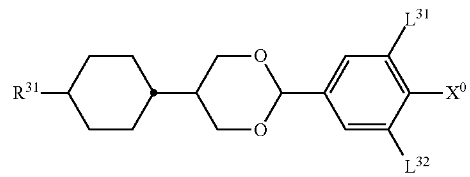

B2e

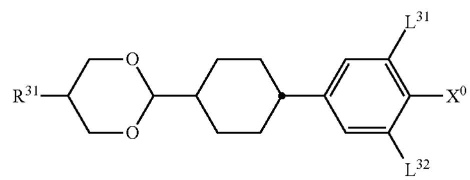

B2f

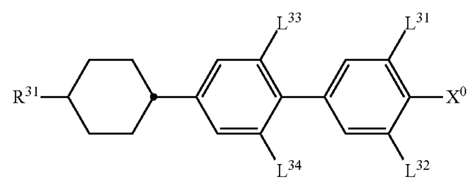

B2g

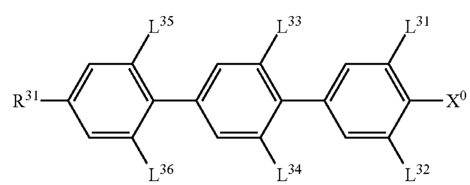

B2h

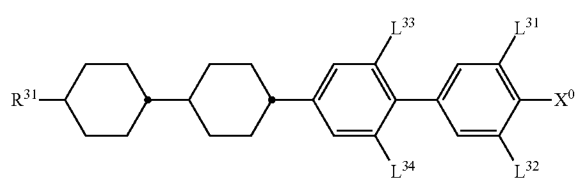

B2i

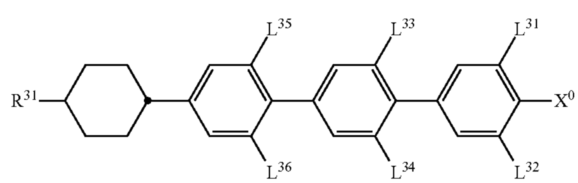

B2k

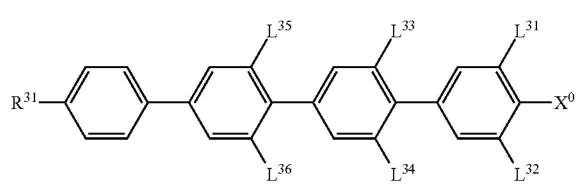

-continued

B21

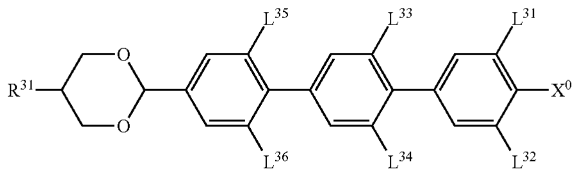

in which $R^{31}$, $X^0$, $L^{31}$ and $L^{32}$ have the meaning given in formula B2, $L^{33}$, $L^{34}$, $L^{35}$ and $L^{36}$ are each, independently of one another, H or F, and $X^0$ is preferably F.

Very particularly preferred compounds of formula B2 are selected from the group consisting of the following subformulae:

B2a1

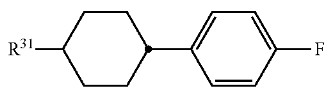

B2a2

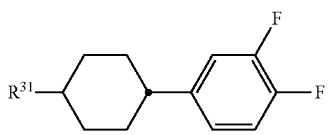

B2a3

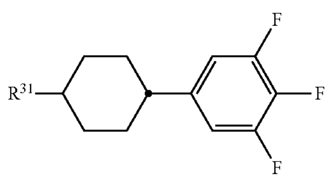

B2a4

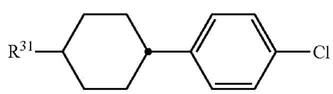

B2a5

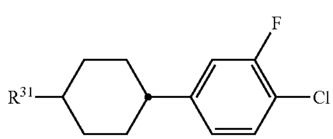

in which $R^{31}$ is as defined in formula B2.

Very particularly preferred compounds of formula B2b are selected from the group consisting of the following subformulae B2b1

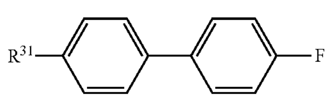

B2b2

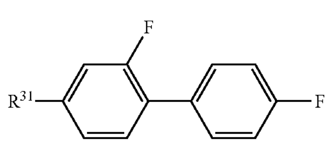

B2b3

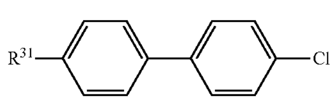

-continued

B2b4

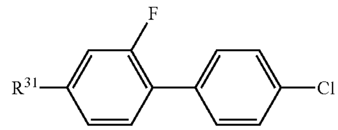

in which $R^{31}$ is as defined in formula B2.

Very particularly preferred compounds of formula B2c are selected from the group consisting of the following subformulae:

B2c1

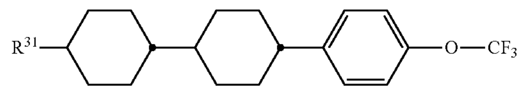

B2c2

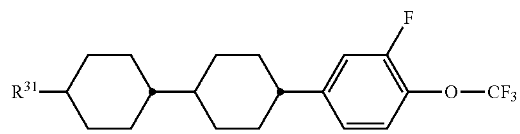

B2c3

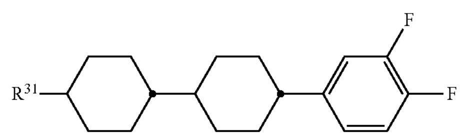

B2c4

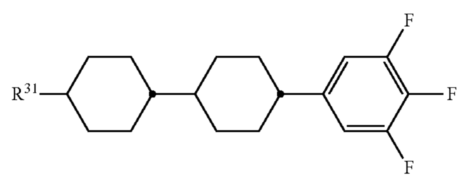

B2c5

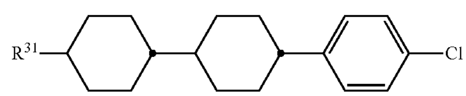

in which $R^{31}$ is as defined in formula B2.

Very particularly preferred compounds of formula B2d and B2e are selected from the group consisting of the following subformulae:

B2d1

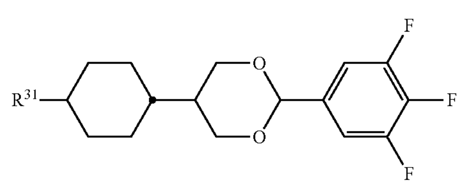

B2e1

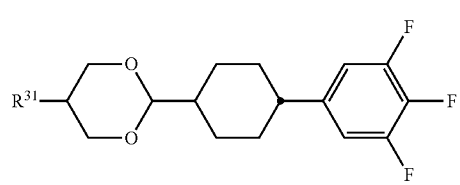

in which $R^{31}$ is as defined in formula B2.

Very particularly preferred compounds of formula B2f are selected from the group consisting of the following subformulae:

B2f1

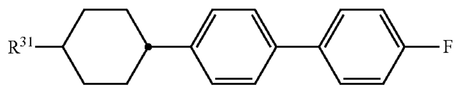

B2f2

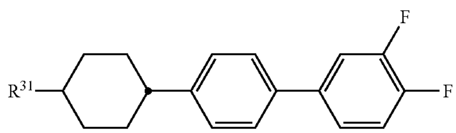

B2f3

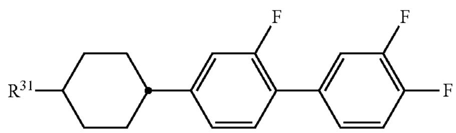

B2f4

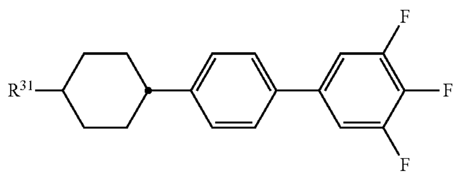

B2f5

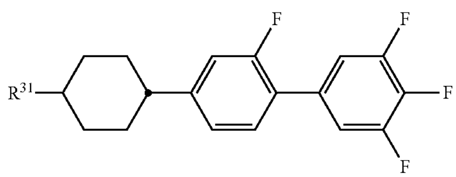

in which $R^{31}$ is as defined in formula B2.

Very particularly preferred compounds of formula B2g are selected from the group consisting of the following subformulae:

B2g1

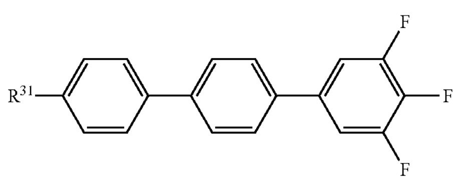

B2g2

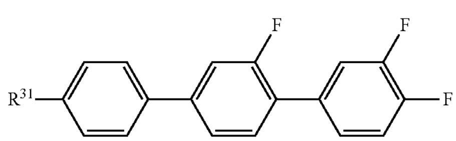

B2g3

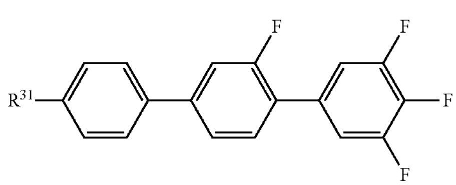

-continued

B2g4

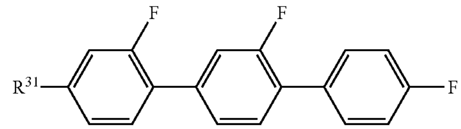

B2g5

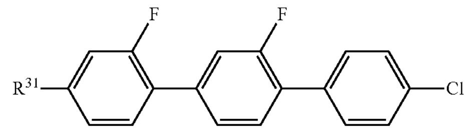

in which $R^{31}$ is as defined in formula B2.

Very particularly preferred compounds of formula B2h are selected from the group consisting of the following subformulae:

B2h1

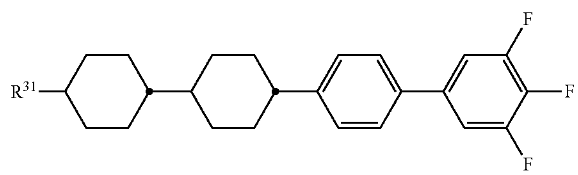

B2h2

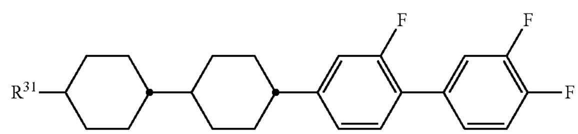

B2h3

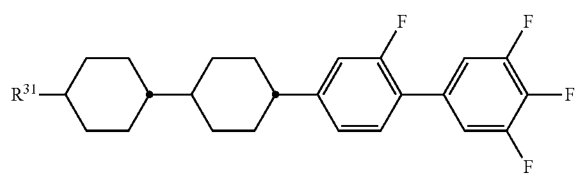

in which $R^{31}$ is as defined in formula B2.

Very particularly preferred compounds of formula B2i are selected from the group consisting of the following subformulae:

B2i1

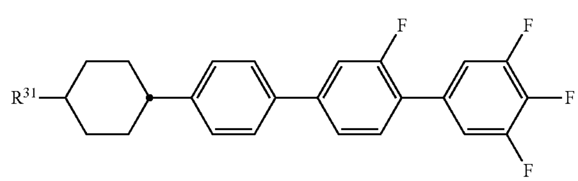

in which $R^{31}$ is as defined in formula B2.

Very particularly preferred compounds of formula B2k are selected from the group consisting of the following subformulae:

B2k1

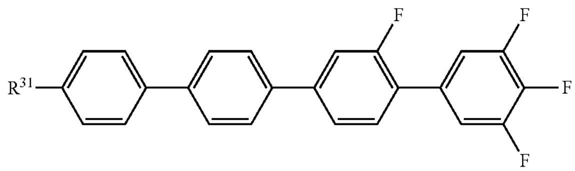

B2k2

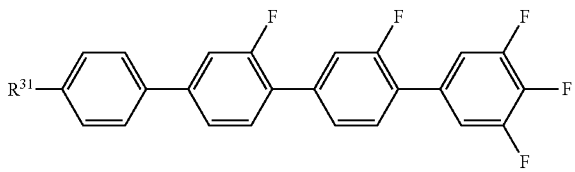

in which $R^{31}$ is as defined in formula B2.

Very particularly preferred compounds of formula B21 are selected from the group consisting of the following subformulae:

B2l1

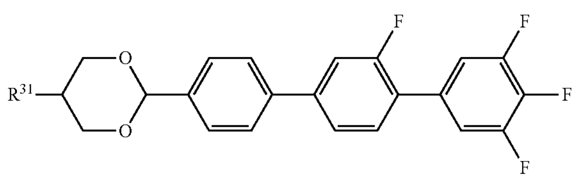

B2l2

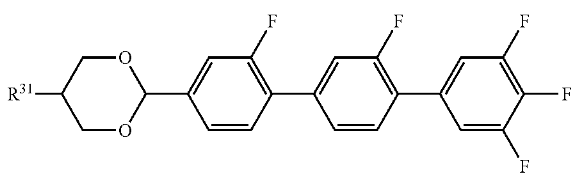

in which $R^{31}$ is as defined in formula B2.

Alternatively to, or in addition to, the compounds of formula B1 and/or B2 component B) of the LC medium may also comprise one or more compounds of formula B3 as defined above.

Particularly preferred compounds of formula B3 are selected from the group consisting of the following subformulae:

B3a

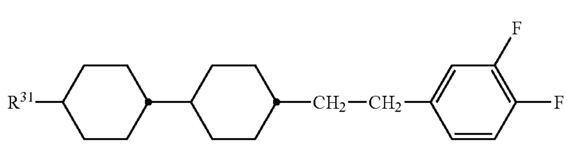

B3b

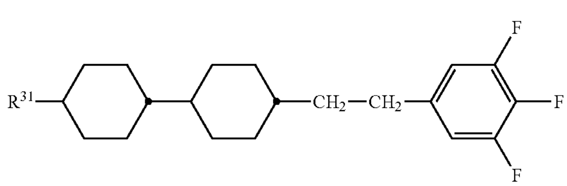

in which $R^{31}$ is as defined in formula B3.

Preferably component B) of the LC medium comprises, in addition to the compounds of formula A and/or B, one or more compounds of formula C

C

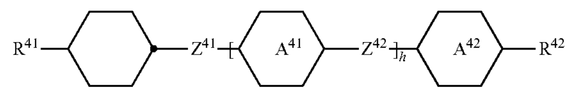

in which the individual radicals have the following meanings:

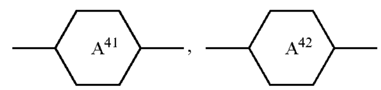

each, independently of one another, and on each occurrence, identically or differently

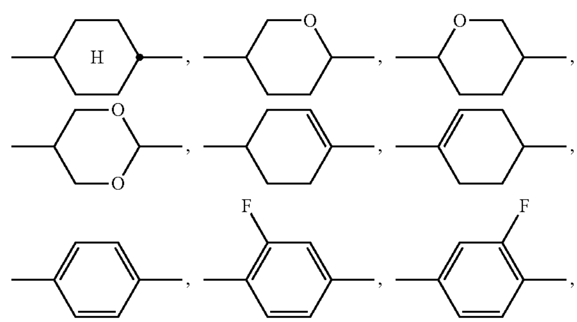

$R^{41}$, $R^{42}$ each, independently of one another, alkyl, alkoxy, oxaalkyl or alkoxyalkyl having 1 to 9 C atoms or alkenyl or alkenyloxy having 2 to 9 C atoms, all of which are optionally fluorinated, $Z^{41}$, $Z^{42}$ each, independently of one another, —$CH_2CH_2$—, —COO—, trans—CH═CH—, trans-CF═CF—, —$CH_2O$—, —$CF_2O$—, —C≡C— or a single bond, preferably a single bond, h 0, 1, 2 or 3.

In the compounds of formula C, $R^{41}$ and $R^{42}$ are preferably selected from straight-chain alkyl or alkoxy with 1, 2, 3, 4, 5 or 6 C atoms, and straight-chain alkenyl with 2, 3, 4, 5, 6 or 7 C atoms.

In the compounds of formula C, h is preferably 0, 1 or 2.

In the compounds of formula C, $Z^{41}$ and $Z^{42}$ are preferably selected from COO, trans—CH═CH and a single bond, very preferably from COO and a single bond.

Preferred compounds of formula C are selected from the group consisting of the following subformulae:

C1

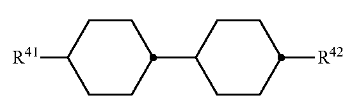

C2

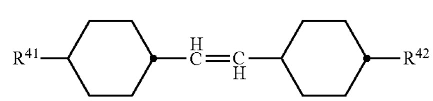

-continued

C3

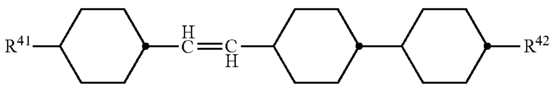

C4

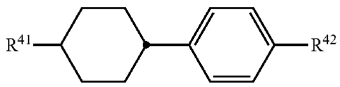

C5

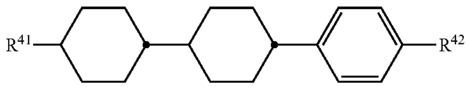

C6

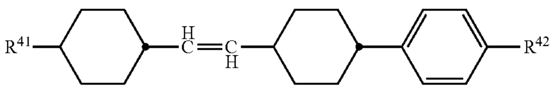

C7

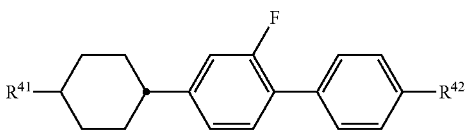

C8

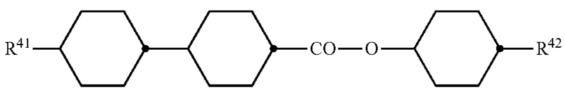

C9

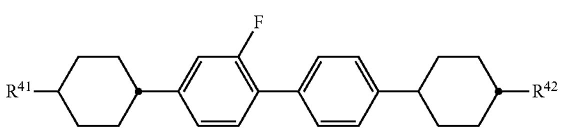

C10

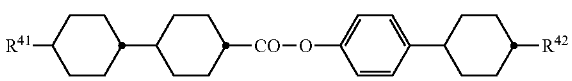

C11

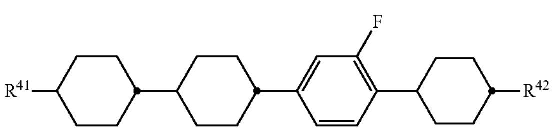

C12

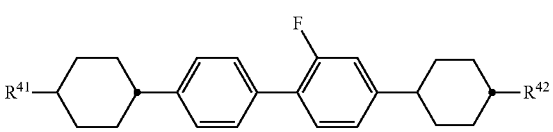

C13

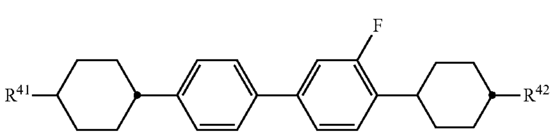

C14

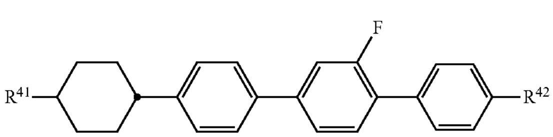

wherein $R^{41}$ and $R^{42}$ have the meanings given in formula C, and preferably denote each, independently of one another, alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms.

Further preferably component B) of the LC medium comprises, in addition to the compounds of formula A and/or B, one or more compounds of formula D

D

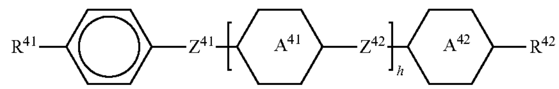

in which $A^{41}$, $A^{42}$, $Z^{41}$, $Z^{42}$, $R^{41}$, $R^{42}$ and h have the meanings given in formula C or one of the preferred meanings given above.

Preferred compounds of formula D are selected from the group consisting of the following subformulae:

D1

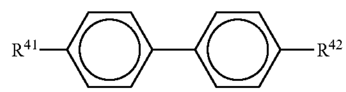

D2

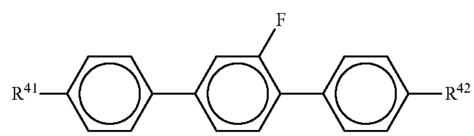

in which $R^{41}$ and $R^{42}$ have the meanings given in formula D and $R^{41}$ preferably denote alkyl bedeutet, and in formula D1 $R^{42}$ preferably denote alkenyl, particularly preferably —$(CH_2)_2$—CH═CH—$CH_3$, and in formula D2 $R^{42}$ preferably denote alkyl, —$(CH_2)_2$—CH═$CH_2$ or —$(CH_2)_2$—CH═CH—$CH_3$.

Further preferably component B) of the LC medium comprises, in addition to the compounds of formula A and/or B, one or more compounds of formula E containing an alkenyl group

E

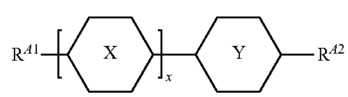

in which the individual radicals, on each occurrence identically or differently, each, independently of one another, have the following meaning:

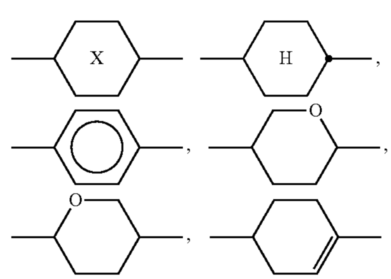

or

-continued

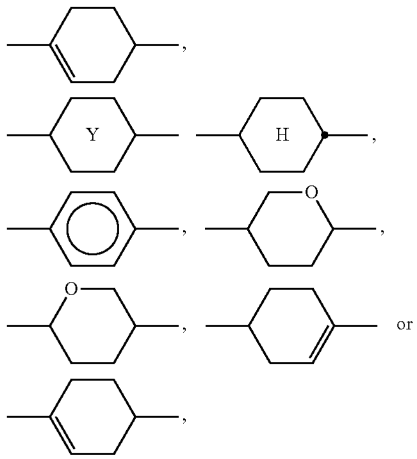

$R^{A1}$ alkenyl having 2 to 9 C atoms or, if at least one of the rings X, Y and Z denote cyclohexenyl, also one of the meanings of $R^{A2}$, $R^{A2}$ alkyl having 1 to 12 C atoms, in which, in addition, one or two non-adjacent $CH_2$ groups may be replaced by —O—, —CH═CH—, —CO—, —OCO— or —COO— in such a way that O atoms are not linked directly to one another, x 1 or 2.

$R^{A2}$ is preferably straight-chain alkyl or alkoxy having 1 to 8 C atoms or straight-chain alkenyl having 2 to 7 C atoms.

Preferred compounds of formula E are selected from the following sub-formulae:

E1

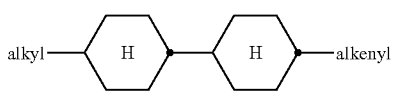

E2

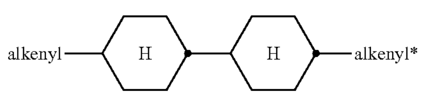

E3

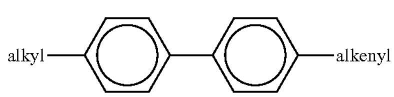

E4

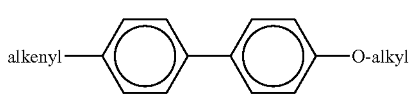

E5

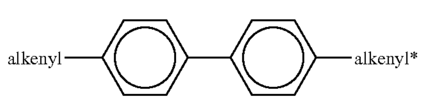

E6

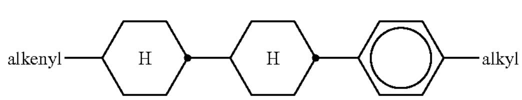

E7

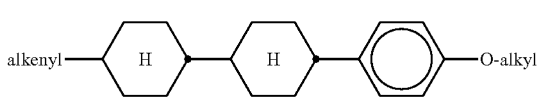

-continued

E8

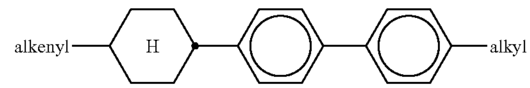

E9

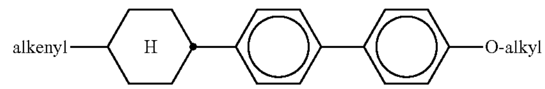

E10

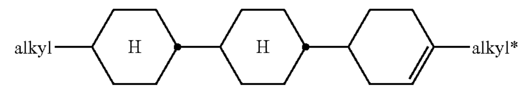

E11

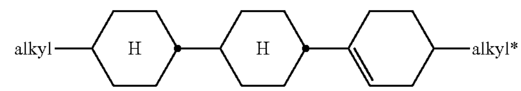

E12

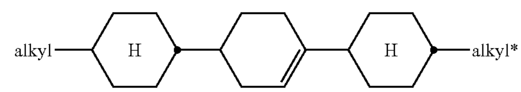

in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Very preferred compounds of the formula E are selected from the following sub-formulae:

E1a

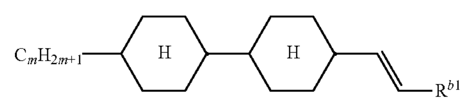

E3a

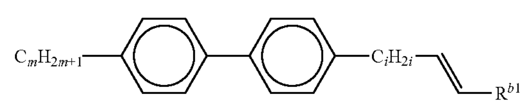

E6a

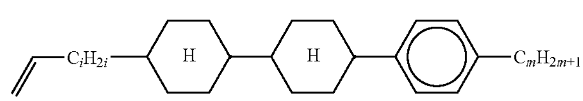

in which m denote 1, 2, 3, 4, 5 or 6, i denote 0, 1, 2 or 3, and Rb' denote H, $CH_3$ or $C_2H_5$.

Very particularly preferred compounds of the formula E are selected from the following sub-formulae:

E1a1

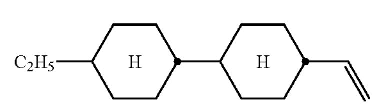

-continued

E1a2

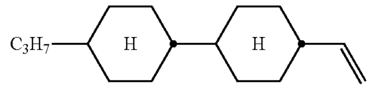

E1a3

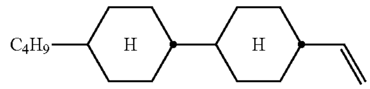

E1a4

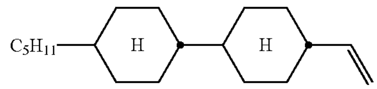

E1a5

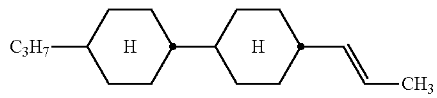

E3a1

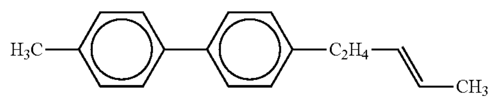

E6a1

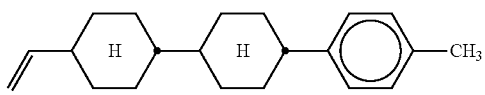

Most preferred are compounds of formula E1a2, E1a5, E3a1 and E6a1.

Further preferably component B) of the LC medium comprises, in addition to the compounds of formula A and/or B, one or more compounds of formula F

F

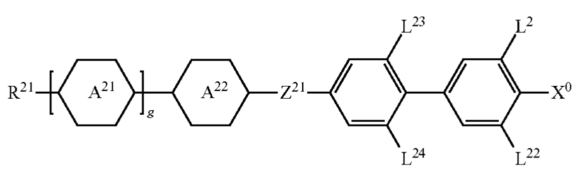

in which the individual radicals have, independently of each other and on each occurrence identically or differently, the following meanings:

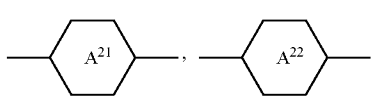

denote

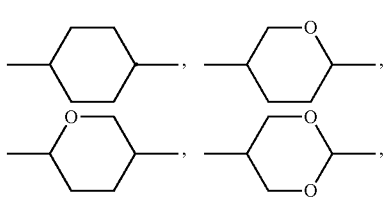

-continued

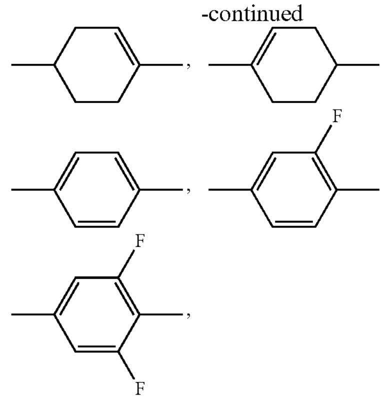

$R^{21}$, $R^{31}$ each, independently of one another, alkyl, alkoxy, oxaalkyl or alkoxyalkyl having 1 to 9 C atoms or alkenyl or alkenyloxy having 2 to 9 C atoms, all of which are optionally fluorinated, $X^0$ F, Cl, halogenated alkyl or alkoxy having 1 to 6 C atoms or halogenated alkenyl or alkenyloxy having 2 to 6 C atoms, $Z^{21}$ —$CH_2CH_2$—, —$CF_2CF_2$—, —COO—, trans—CH═CH—, trans-CF═CF—, —$CH_2$O- or a single bond, preferably —$CH_2CH_2$—, —COO—, trans—CH═CH— or a single bond, particularly preferably —COO—, trans—CH═CH— or a single bond, $L^{21}$, $L^{22}$, $L^{23}$, $L^{24}$ each, independently of one another, H or F, g 0, 1, 2 or 3.

Particularly preferred compounds of formula F are selected from the group consisting of the following formulae:

F1

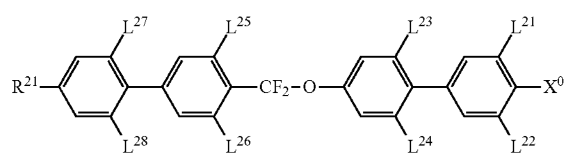

F2

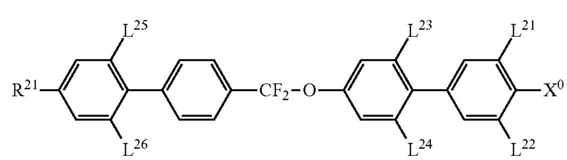

F3

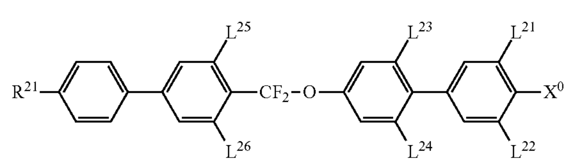

in which $R^{21}$, $X^0$, $L^{21}$ and $L^{22}$ have the meaning given in formula F, $L^{25}$ and $L^{26}$ are each, independently of one another, H or F, and $X^0$ is preferably F.

Very particularly preferred compounds of formula F1-F3 are selected from the group consisting of the following subformulae:

F1a

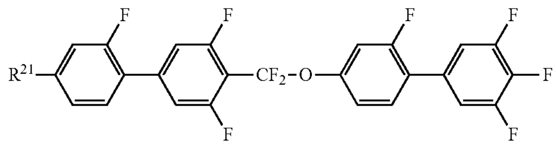

F1b

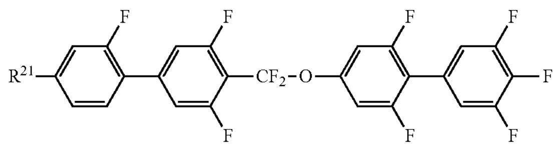

F2a

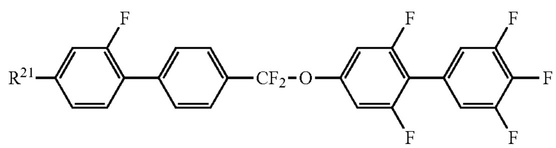

F2b

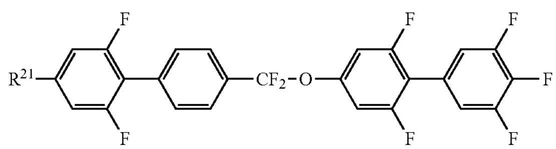

F3a

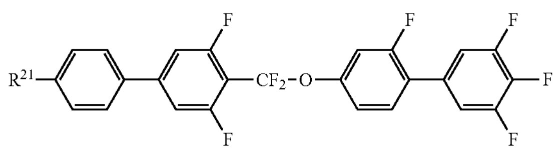

F3b

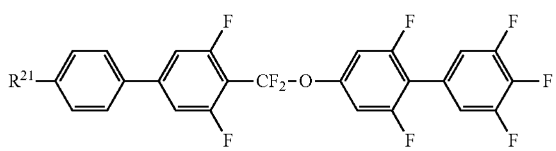

In which $R^{21}$ is as defined in formula F1.

The concentration of the compounds of formula A and B in the LC host mixture is preferably from 2 to 60%, very preferably from 3 to 45%, most preferably from 4 to 35%.

The concentration of the compounds of formula C and D in the LC host mixture is preferably from 2 to 70%, very preferably from 5 to 65%, most preferably from 10 to 60%.

The concentration of the compounds of formula E in the LC host mixture is preferably from 5 to 50%, very preferably from 5 to 35%.

The concentration of the compounds of formula F in the LC host mixture is preferably from 2 to 30%, very preferably from 5 to 20%.

Further preferred embodiments of this second preferred embodiment of the present invention are listed below, including any combination thereof.

2a) The LC host mixture comprises one or more compounds of formula A and/or B with high positive dielectric anisotropy, preferably with $\Delta\varepsilon>15$.

2b) The LC host mixture comprises one or more compounds selected from the group consisting of formulae A1a2, A1b1, A1d1, A1f1, A2a1, A2h1, A2l2, A2k1, B2h3, B2l1, F1a. The proportion of these compounds in the LC host mixture is preferably from 4 to 40%, very preferably from 5 to 35%.

2c) The LC host mixture comprises one or more compounds selected from the group consisting of formulae B2c1, B2c4, B2f4, C14. The proportion of these compounds in the LC host mixture is preferably from 4 to 40%, very preferably from 5 to 35%.

2d) The LC host mixture comprises one or more compounds selected from the group consisting of formulae C3, C4, C5, C9 and D2. The proportion of these compounds in the LC host mixture is preferably from 8 to 70%, very preferably from 10 to 60%.

2e) The LC host mixture comprises one or more compounds selected from the group consisting of formulae E1, E3 and E6, preferably E1a, E3a and E6a, very preferably E1a2, E1a5, E3a1 and E6a1. The proportion of these compounds in the LC host mixture is preferably from 5 to 60%, very preferably from 10 to 50%.

The combination of compounds of the preferred embodiments mentioned above with the polymerised compounds described above causes low threshold voltages, low rotational viscosities and very good low-temperature stabilities in the LC media according to the invention at the same time as constantly high clearing points and high HR values, and allows the rapid establishment of a particularly low tilt angle (i.e. a large tilt) in PSA displays. In particular, the LC media exhibit significantly shortened response times, in particular also the grey-shade response times, in PSA displays compared with the media from the prior art.

The LC media and LC host mixtures of the present invention preferably have a nematic phase range of at least 80 K, particularly preferably at least 100 K, and a rotational viscosity ≤250 mPa·s, preferably ≤200 mPa·s, at 20° C.

In the VA-type displays according to the invention, the molecules in the layer of the LC medium in the switched-off state are aligned perpendicular to the electrode surfaces (homeotropically) or have a a tilted homeotropic alignment. On application of an electrical voltage to the electrodes, a realignment of the LC molecules takes place with the longitudinal molecular axes parallel to the electrode surfaces.

LC media according to the invention based on compounds with negative dielectric anisotropy according to the first preferred embodiment, in particular for use in displays of the PS-VA, PS-UB-FFS and SA-VA type, have a negative dielectric anisotropy $\Delta\varepsilon$, preferably from −0.5 to −10, in particular from −2.5 to −7.5, at 20° C. and 1 kHz.

The birefringence $\Delta n$ in LC media according to the invention for use in displays of the PS-VA, PS-UB-FFS and SA-VA type is preferably below 0.16, particularly preferably from 0.06 to 0.14, very particularly preferably from 0.07 to 0.12.

In the OCB-type displays according to the invention, the molecules in the layer of the LC medium have a "bend" alignment. On application of an electrical voltage, a realignment of the LC molecules takes place with the longitudinal molecular axes perpendicular to the electrode surfaces.

LC media according to the invention, based on compounds with positive dielectric anisotropy according to the second preferred embodiment, for use in displays of the PS-TN-, PS-posi-VA-, PS-IPS-, PS-FFS and SA-FFS type, preferably have a positive dielectric anisotropy $\Delta\varepsilon$ from +2 to +30, particularly preferably from +3 to +20, at 20° C. and 1 kHz.

The birefringence Δn in LC media according to the invention for use in displays of the PS-OCB type is preferably from 0.14 to 0.22, particularly preferably from 0.16 to 0.22.

The birefringence Δn in LC media according to the invention for use in displays of the PS-TN-, PS-posi-VA-, PS-IPS-, PS-FFS and SA-FFS type is preferably from 0.07 to 0.15, particularly preferably from 0.08 to 0.13.

The LC media according to the invention may also comprise further additives which are known to the person skilled in the art and are described in the literature, such as, for example, polymerisation initiators, inhibitors, stabilisers, surface-active substances or chiral dopants. These may be polymerisable or non-polymerisable. Polymerisable additives are accordingly ascribed to the polymerisable component or component A). Non-polymerisable additives are accordingly ascribed to the non-polymerisable component or component B).

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutyl-ammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE—A 22 09 127, 22 40 864, 23 21 632, 23 38 281, 24 50 088, 26 37 430 and 28 53 728.

The individual components of the preferred embodiments a)-z) of the LC media according to the invention are either known or methods for the preparation thereof can readily be derived from the prior art by the person skilled in the relevant art, since they are based on standard methods described in the literature. Corresponding compounds of the formula CY are described, for example, in EP—A-0 364 538. Corresponding compounds of the formula ZK are described, for example, in DE—A-26 36 684 and DE—A-33 21 373.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

Preferred mixture components are shown in Tables A1 and A2 below. The compounds shown in Table A1 are especially suitable for use in LC mixtures with positive dielectric anisotropy. The compounds shown in Table A2 are especially suitable for use in LC mixtures with negative dielectric anisotropy.

TABLE A1

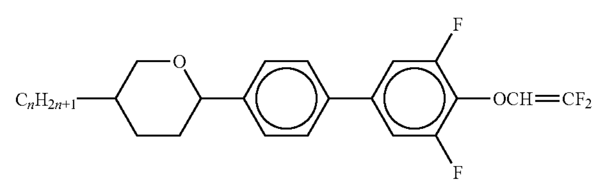

APU-n-OXF

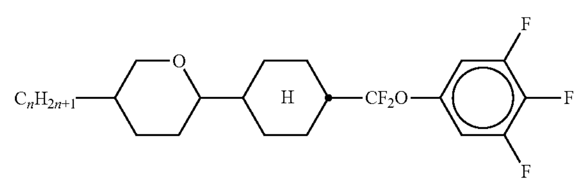

ACQU-n-F

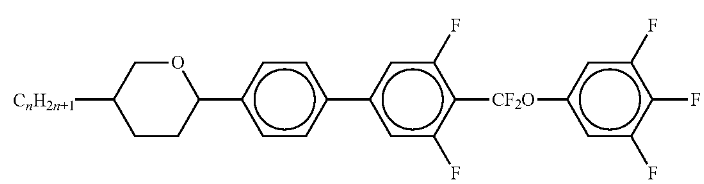

APUQU-n-F

TABLE A1-continued
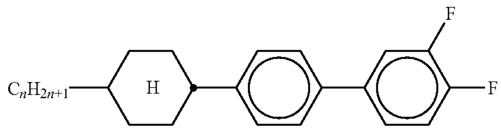
BCH-nF.F
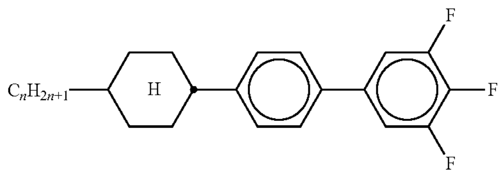
BCH-nF.F.F
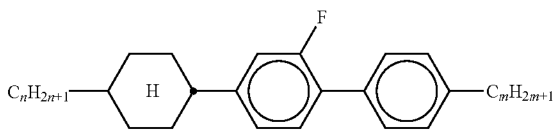
BCH-n.Fm
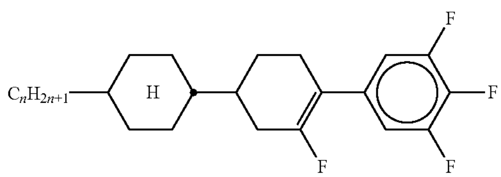
CFU-n-F
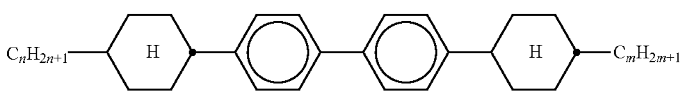
CBC-nm
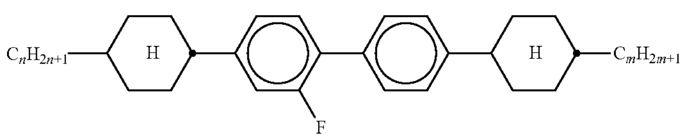
CBC-nmF
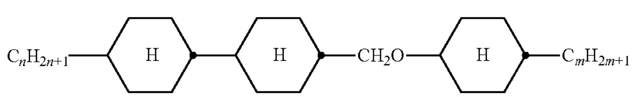
CCOC-n-m
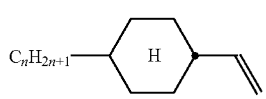
C-n-V
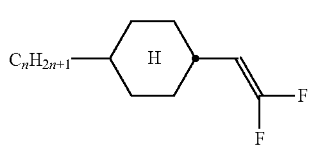
C-n-XF TABLE A1-continued
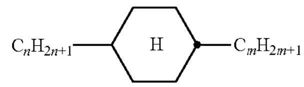
C-n-m
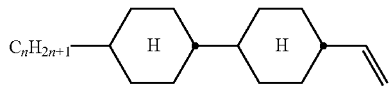
CC-n-V
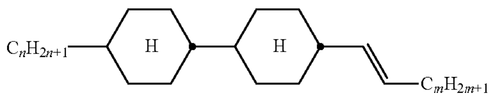
CC-n-Vm
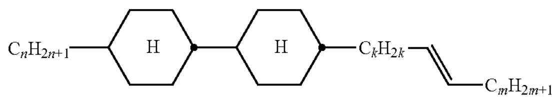
CC-n-kVm
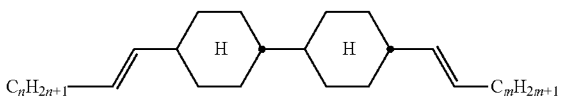
CC-nV-Vm
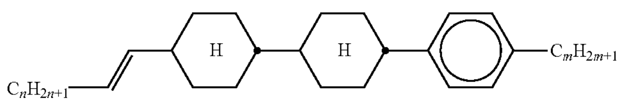
CCP-nV-m
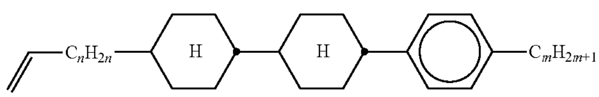
CCP-Vn-m
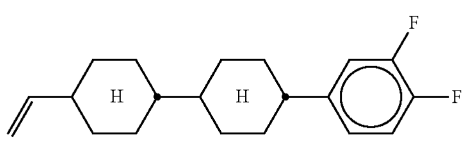
CCG-V-F
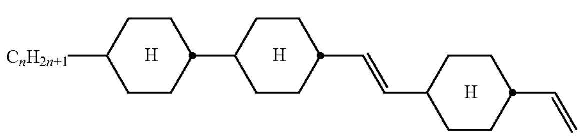
CCVC-n-V
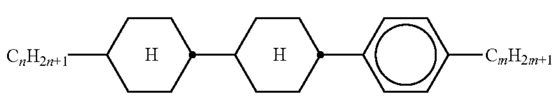
CCP-n-m
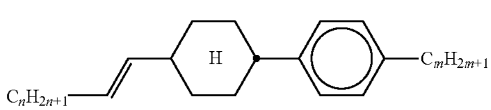
CP-nV-m TABLE A1-continued
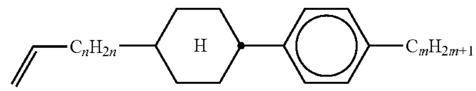
CP-Vn-m
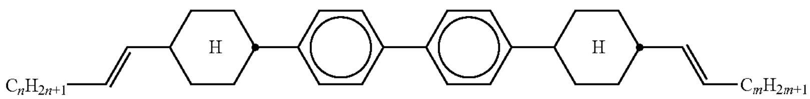
CPPC-nV-Vm
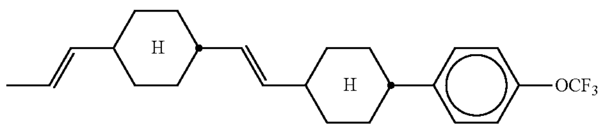
CVCP-1V-OT
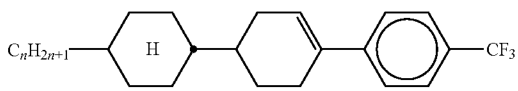
CLP-n-T
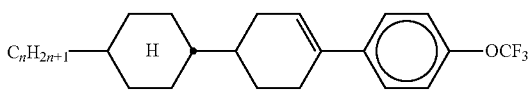
CLP-n-OT
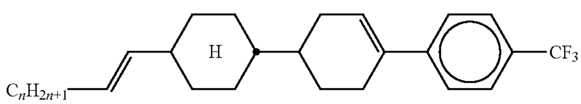
CLP-nV-T
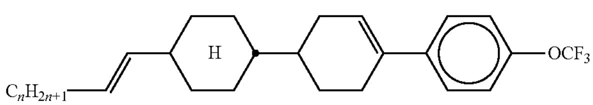
CLP-nV-OT
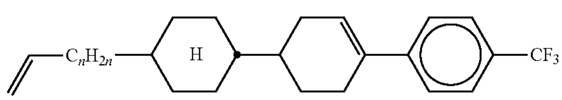
CLP-Vn-T
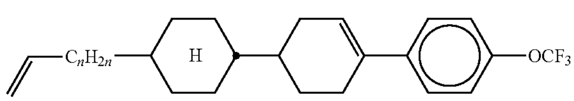
CLP-Vn-OT
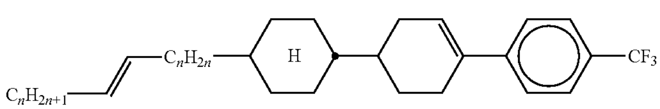
CLP-nVm-T
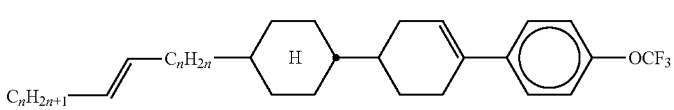
CLP-nVm-OT TABLE A1-continued
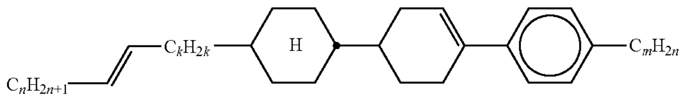
CLP-nVk-m
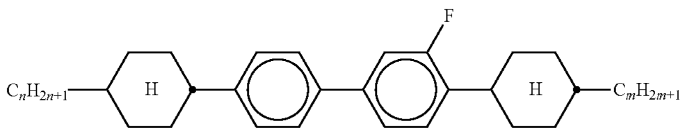
CPGP-n-m
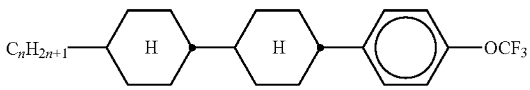
CCP-n0CF$_3$
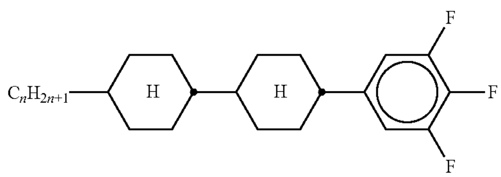
CCP-nF.F.F
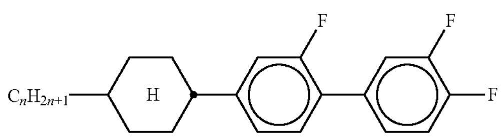
CGG-n-F
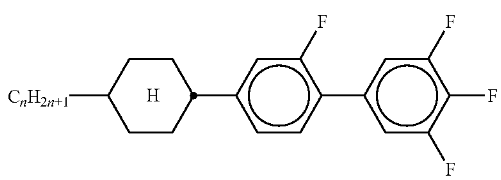
CGU-n-F
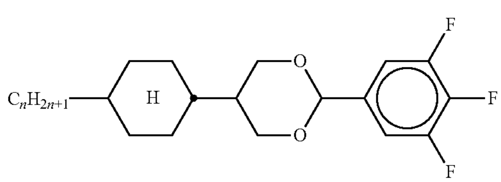
CDU-n-F
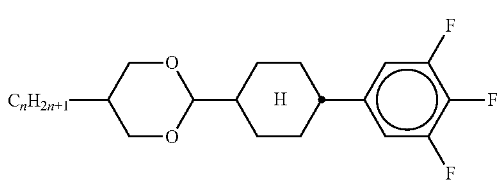
DCU-n-F TABLE A1-continued
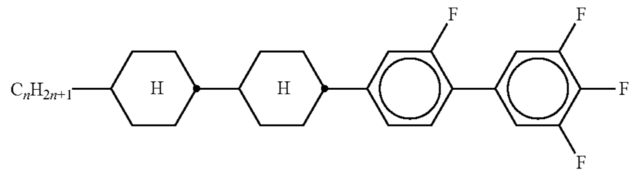
CCGU-n-F
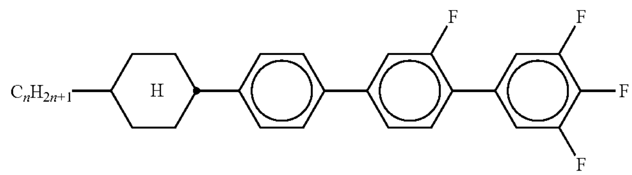
CPGU-n-F
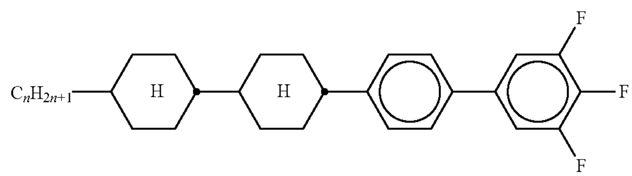
CCPU-n-F
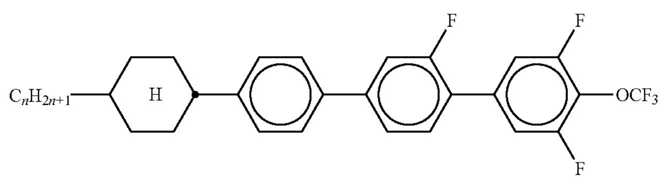
CPGU-n-OT
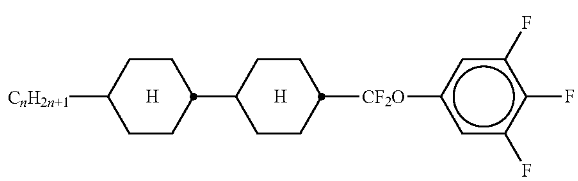
CCQU-n-F
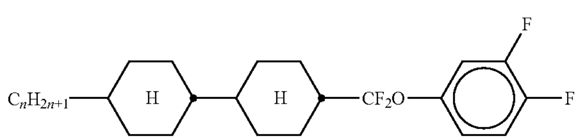
CCQG-n-F
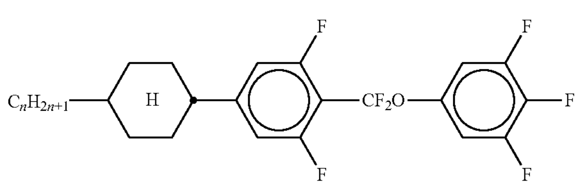
CUQU-n-F TABLE A1-continued
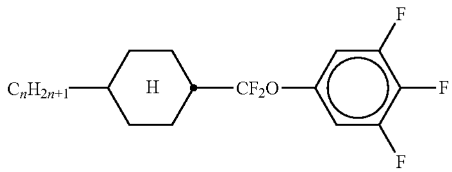
CQU-n-F
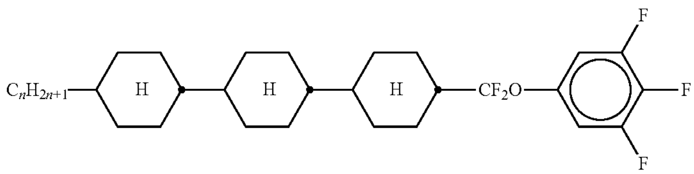
CCCQU-n-F
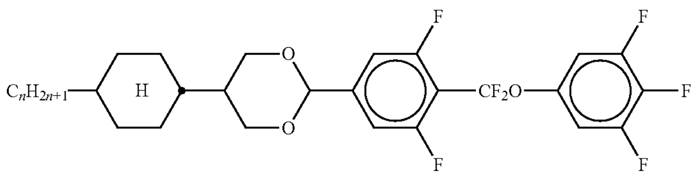
CDUQU-n-F
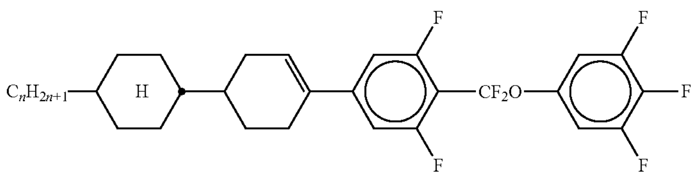
CLUQU-n-F
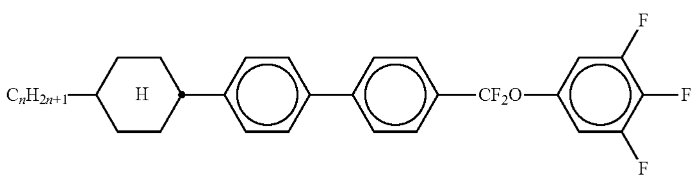
CPPQU-n-F
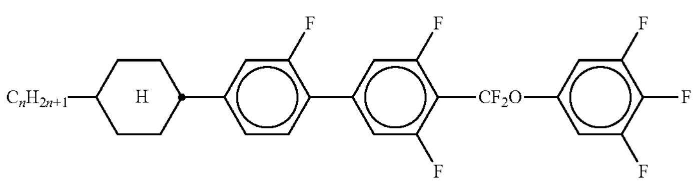
CGUQU-n-F
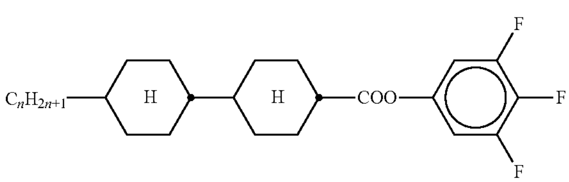
CCZU-n-F TABLE A1-continued
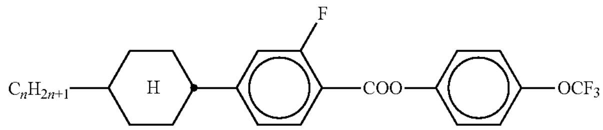
CGZP-n-OT
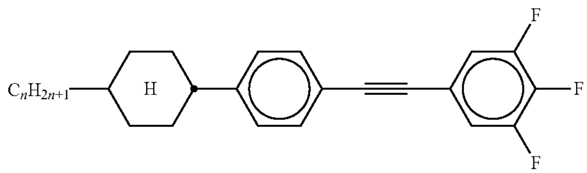
CPTU-n-F
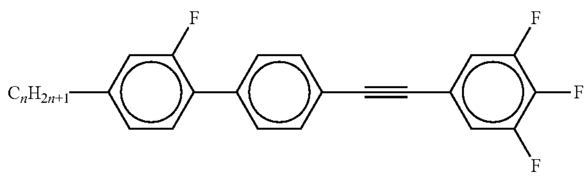
GPTU-n-F
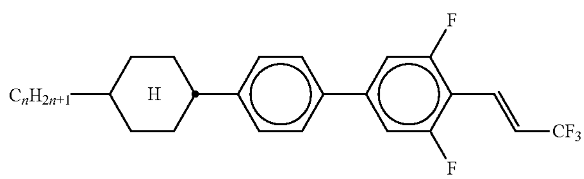
CPU-n-VT
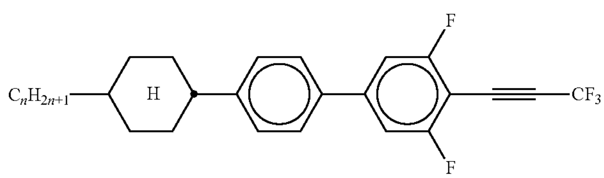
CPU-n-AT
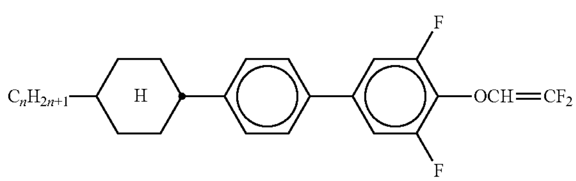
CPU-n-OXF
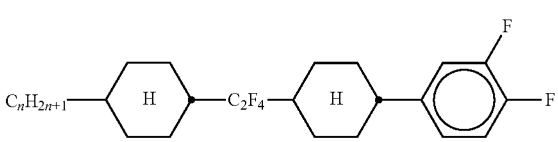
CWCG-n-F
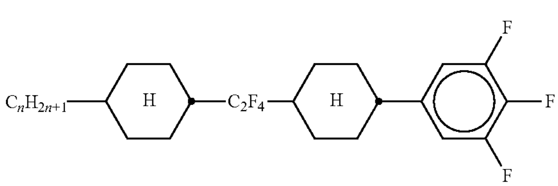
CWCU-n-F TABLE A1-continued
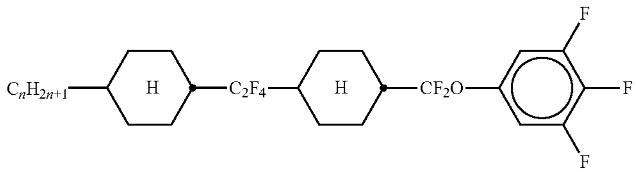
CWCQU-n-F
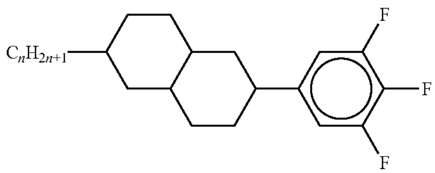
Dec-U-n-F
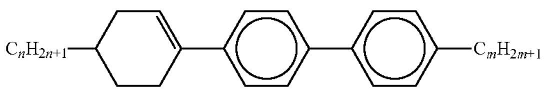
LPP-n-m
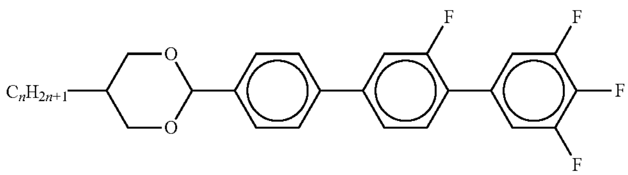
DPGU-n-F
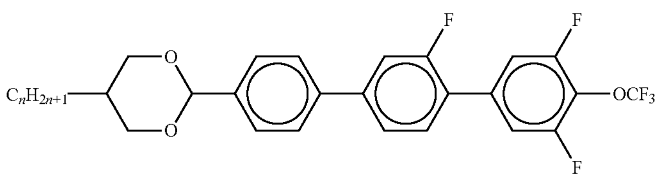
DPGU-n-OT
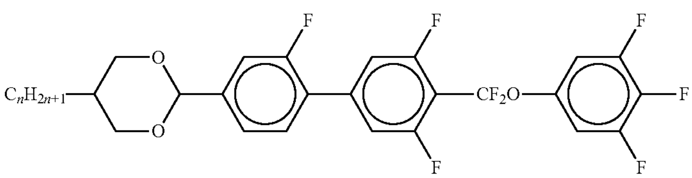
DGUQU-n-F
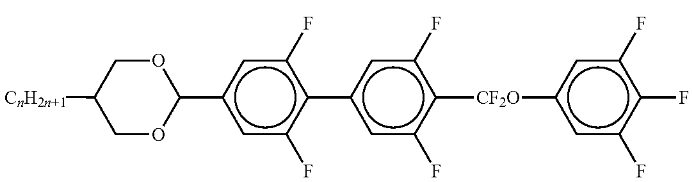
DUUQU-n-F
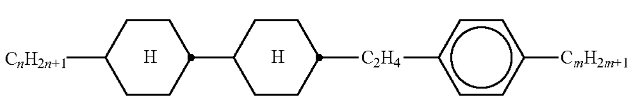
ECCP-nm TABLE A1-continued
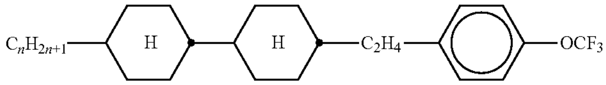
ECCP-nOCF3
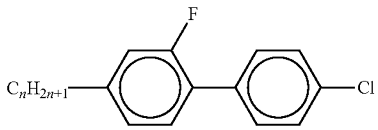
GP-n-Cl
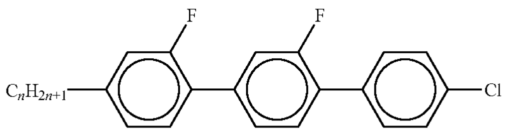
GGP-n-Cl
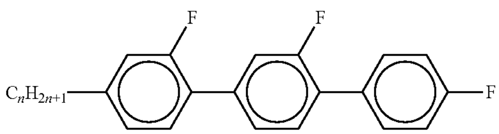
GGP-n-F
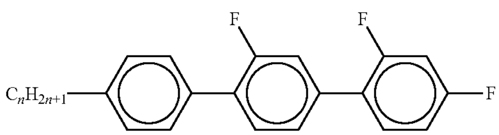
PGIGI-n-F
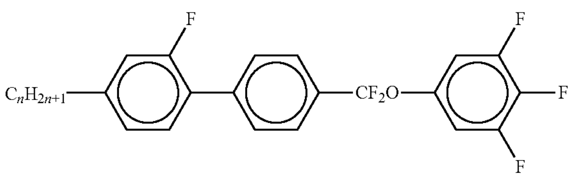
GPQU-n-F
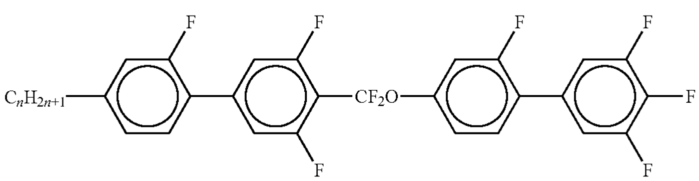
GUQGU-n-F
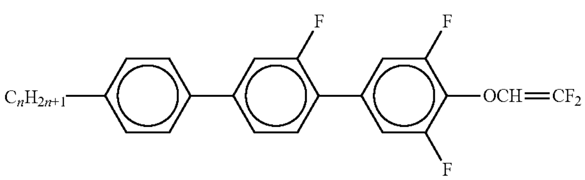
PGU-n-OXF
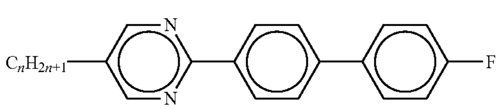
MPP-n-F TABLE A1-continued
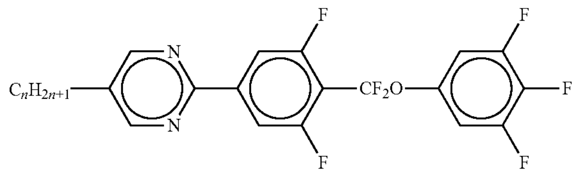
MUQU-n-F
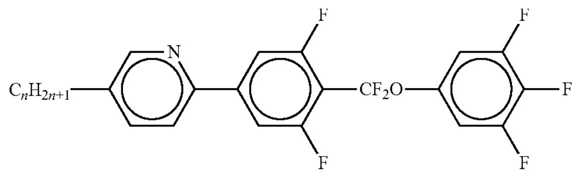
NUQU-n-F
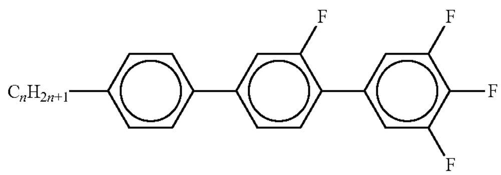
PGU-n-F
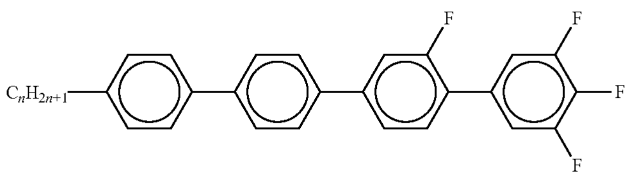
PPGU-n-F
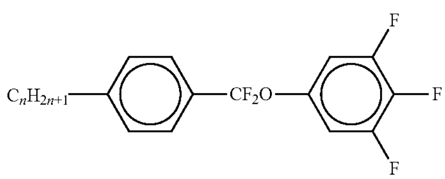
PQU-n-F
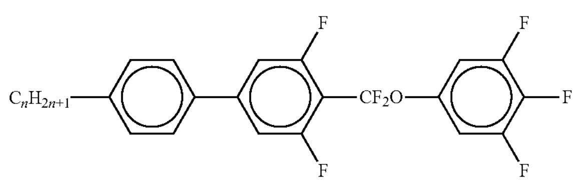
PUQU-n-F
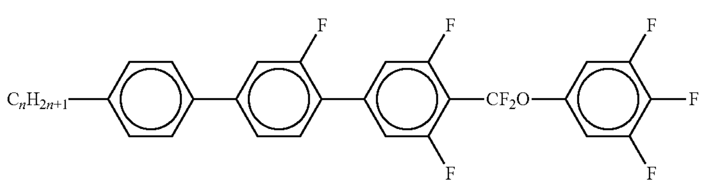
PGUQU-n-F TABLE A1-continued
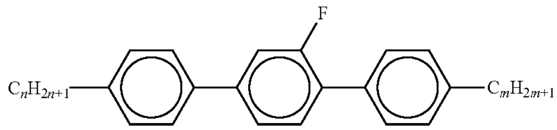
PGP-n-m
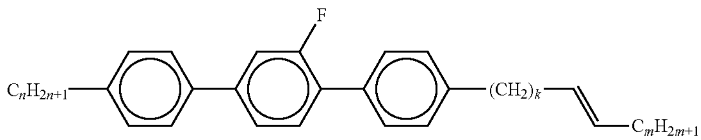
PGP-n-kVm
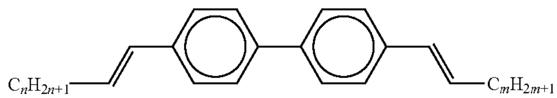
PP-nV-Vm
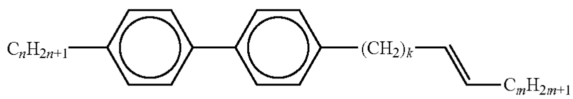
PP-n-kVm
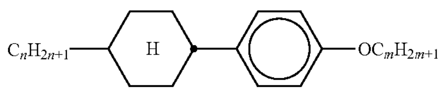
PCH-nOm
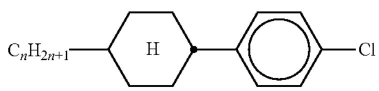
PCH-nCl
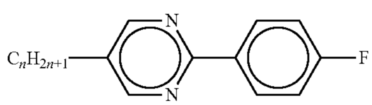
PYP-nF
In Table A1, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
TABLE A2
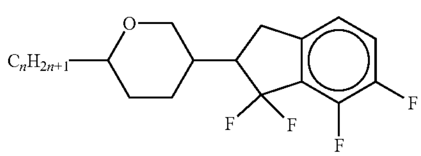
AIK-n-F
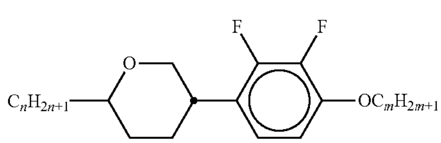
AIY-n-Om TABLE A2-continued
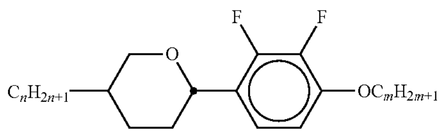
AY-n-Om
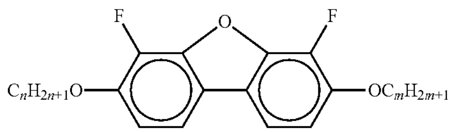
B-nO-Om
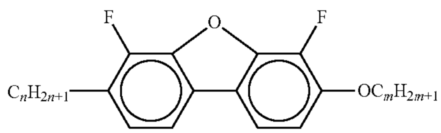
B-n-Om
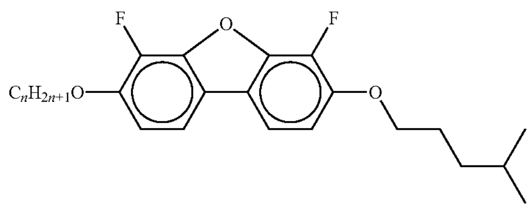
B-nO-O5i
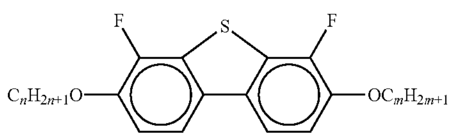
B(S)-nO-Om
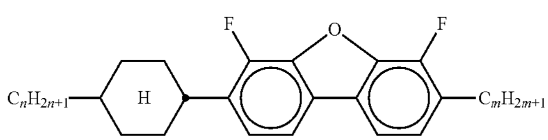
CB-n-m
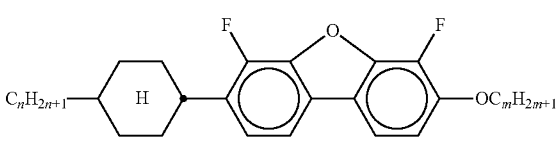
CB-n-Om
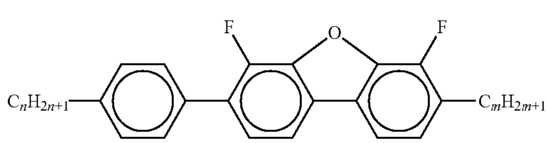
PB-n-m TABLE A2-continued
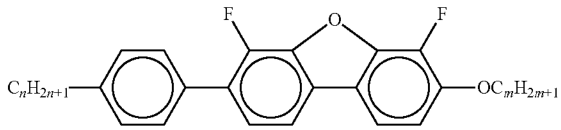
PB-n-Om
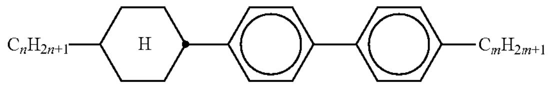
BCH-nm, CPP-n-m
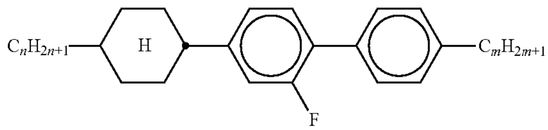
BCH-nmF
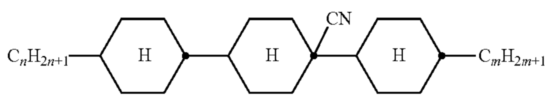
BCN-nm
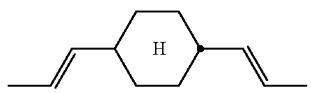
C-1V-V1
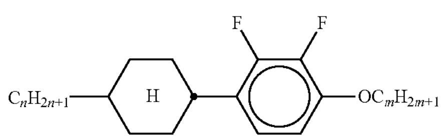
CY-n-Om
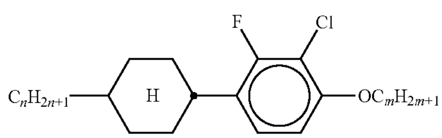
CY(F,Cl)-n-Om
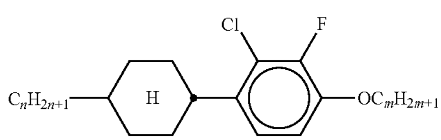
CY(Cl,F)-n-Om
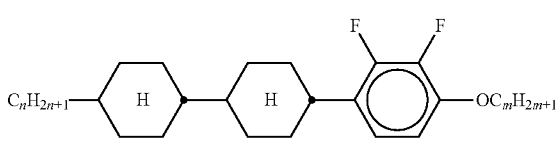
CCY-n-Om
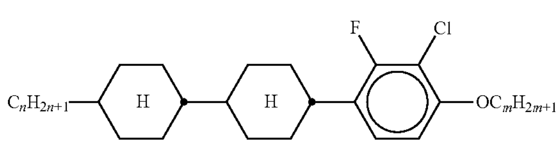
CCY(F,Cl)-n-Om TABLE A2-continued
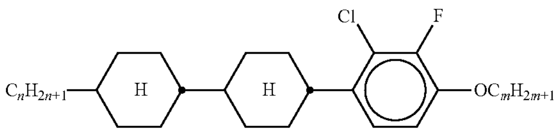
CCY(Cl,F)-n-Om
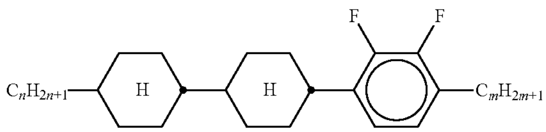
CCY-n-m
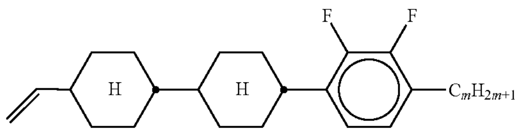
CCY-V-m
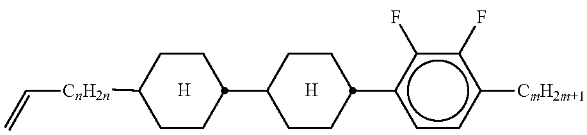
CCY-Vn-m
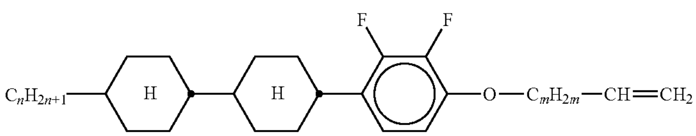
CCY-n-OmV
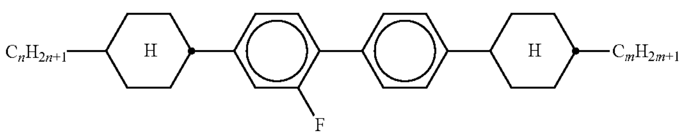
CBC-nmF
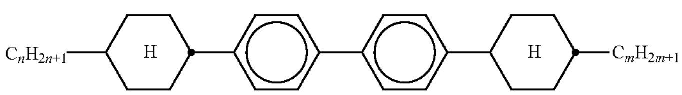
CBC-nm
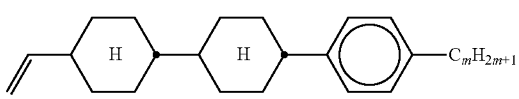
CCP-V-m
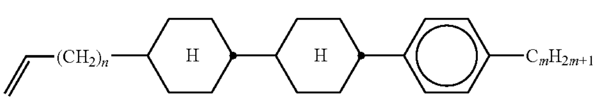
CCP-Vn-m
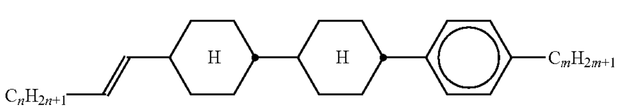
CCP-nV-m TABLE A2-continued
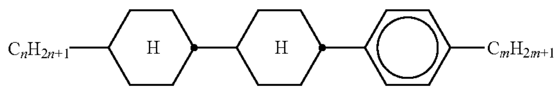
CCP-n-m
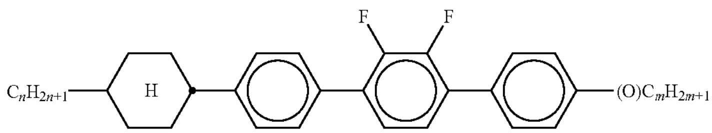
CPYP-n-(O)m
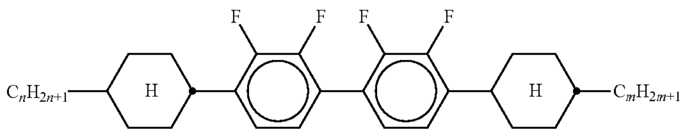
CYYC-n-m
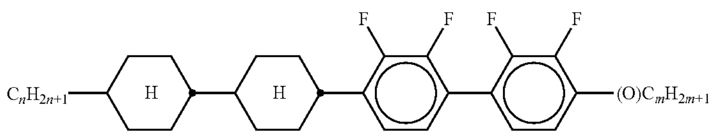
CCYY-n-(O)m
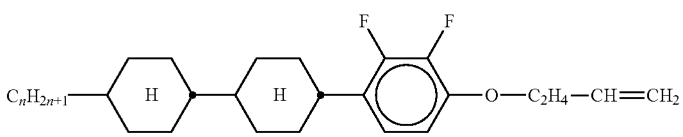
CCY-n-O2V
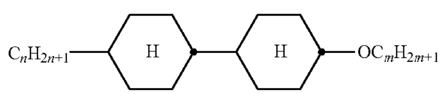
CCH-nOm, CC-n-Om
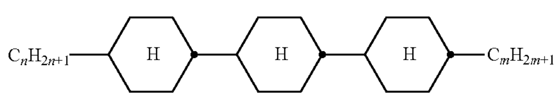
CCC-n-m
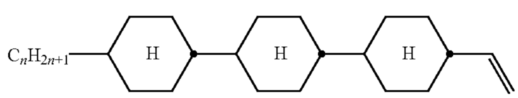
CCC-n-V
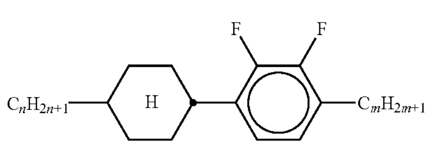
CY-n-m
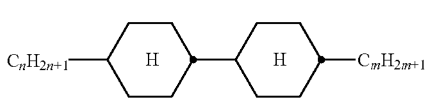
CCH-nm, CC-n-m TABLE A2-continued
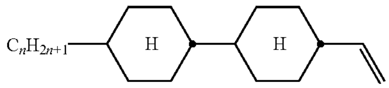
CC-n-V
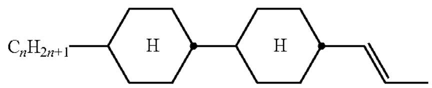
CC-n-V1
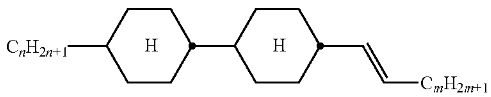
CC-n-Vm
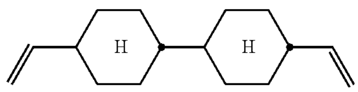
CC-V-V
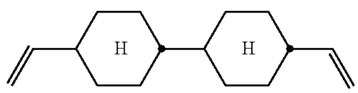
CC-V-V1
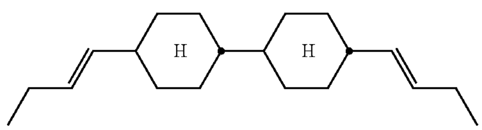
CC-2V-V2
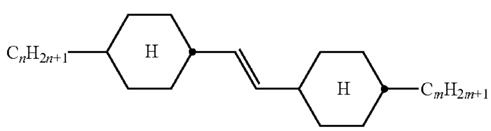
CVC-n-m
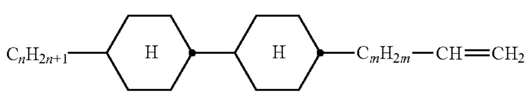
CC-n-mV
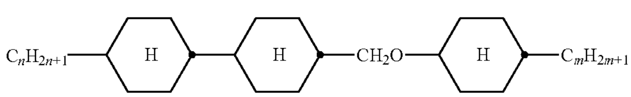
CCOC-n-m
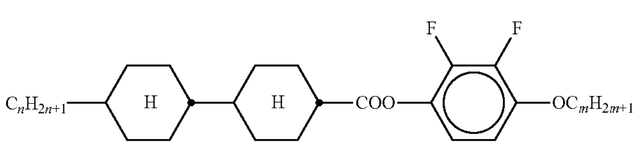
CP-nOmFF
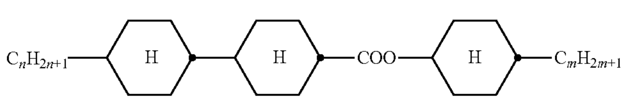
CH-nm TABLE A2-continued
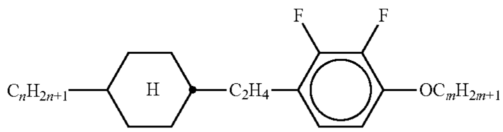
CEY-n-Om
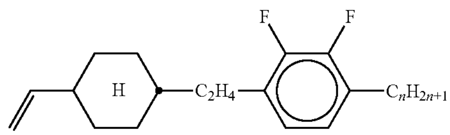
CEY-V-n
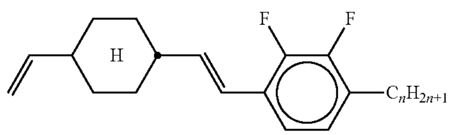
CVY-V-n
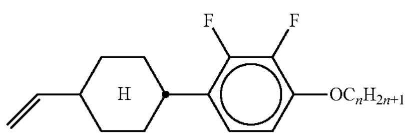
CY-V-On
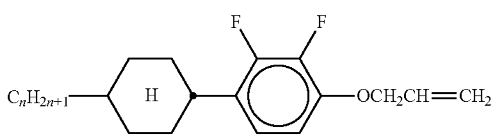
CY-n-O1V
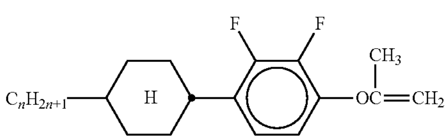
CY-n-OC($CH_3$)═$CH_2$
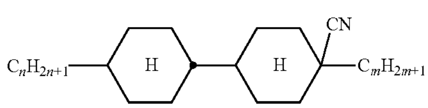
CCN-nm
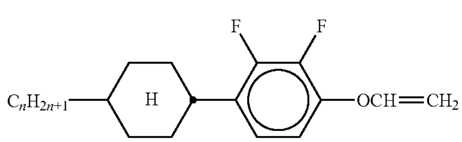
CY-n-OV
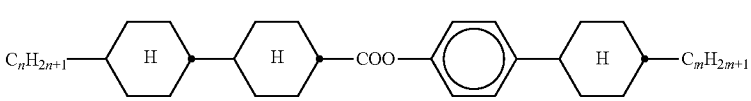
CCPC-nm TABLE A2-continued
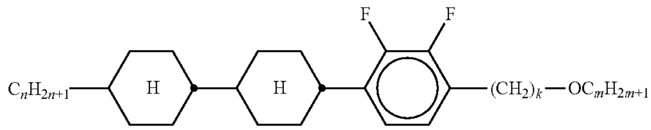
CCY-n-kOm
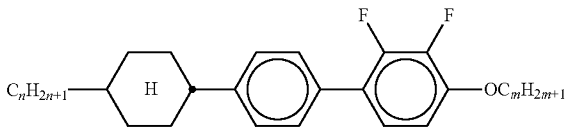
CPY-n-Om
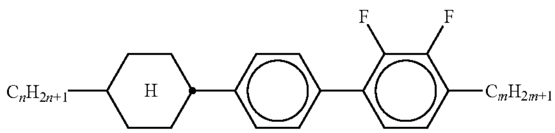
CPY-n-m
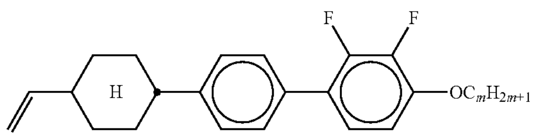
CPY-V-Om
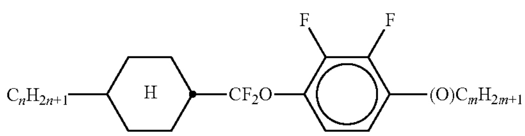
CQY-n-(O)m
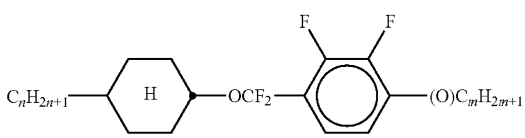
CQIY-n-(O)m
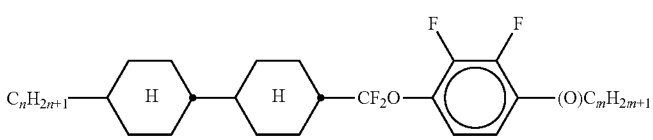
CCQY-n-(O)m
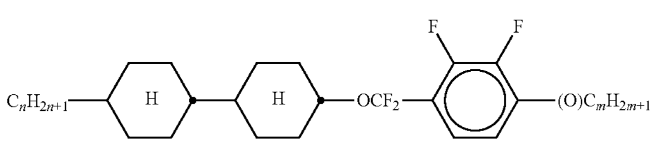
CCQIY-n-(O)m
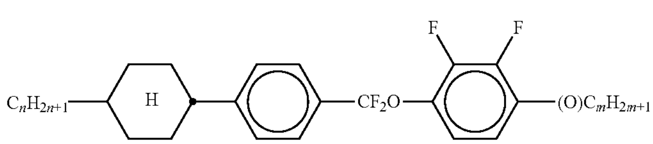
CPQY-n-(O)m TABLE A2-continued
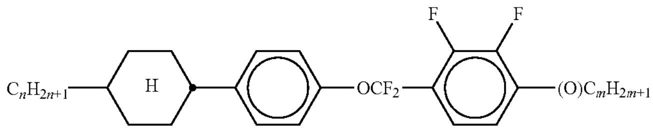
CPQIY-n-(O)m
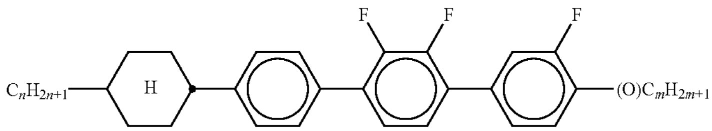
CPYG-n-(O)m
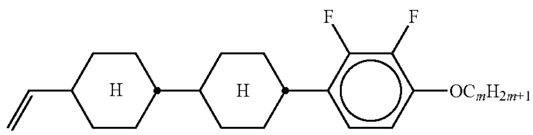
CCY-V-Om
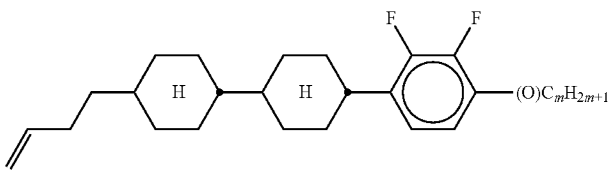
CCY-V2-(O)m
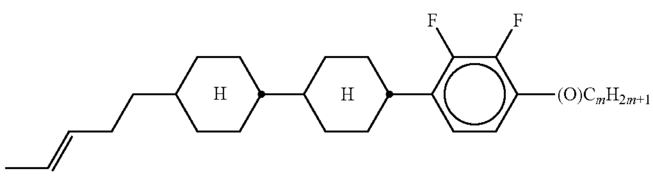
CCY-1V2-(O)m
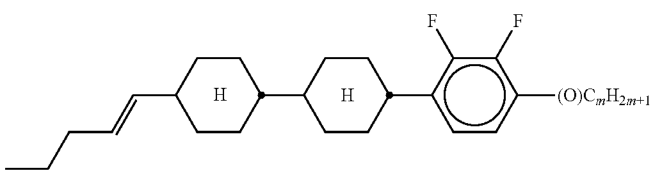
CCY-3V-(O)m
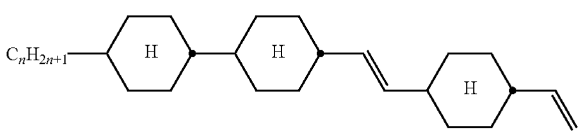
CCVC-n-V
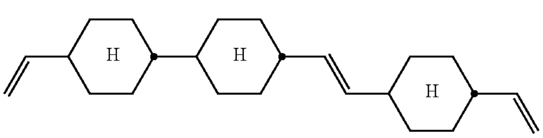
CCVC-V-V TABLE A2-continued
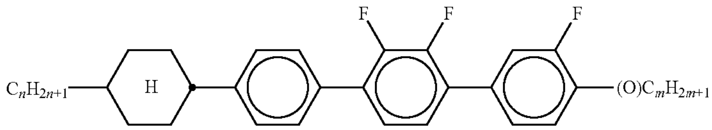
CPYG-n-(O)m
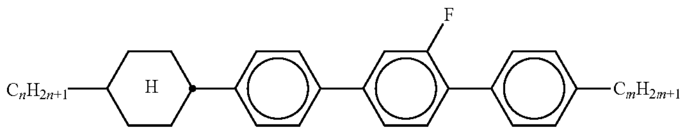
CPGP-n-m
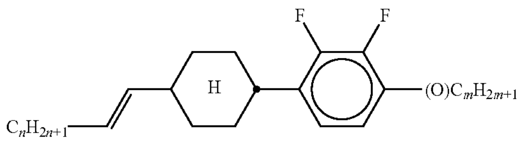
CY-nV-(O)m
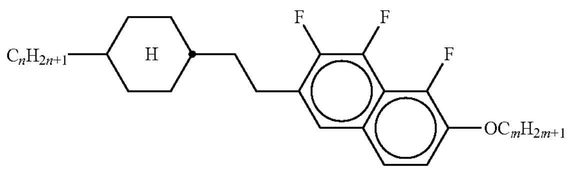
CENaph-n-Om
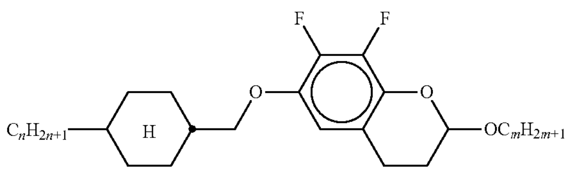
COChrom-n-Om
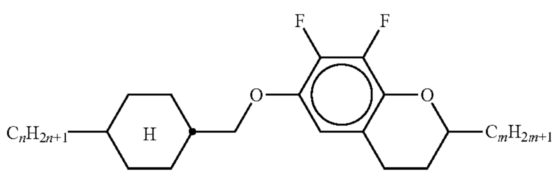
COChrom-n-m
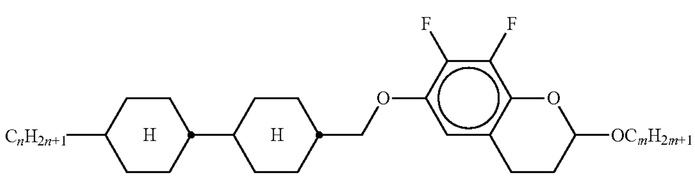
CCOChrom-n-Om
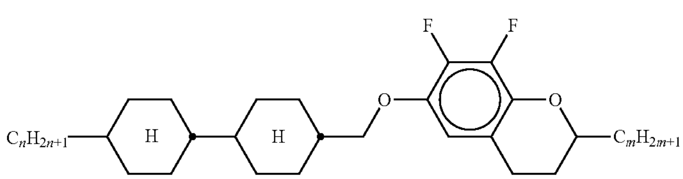
CCOChrom-n-m TABLE A2-continued
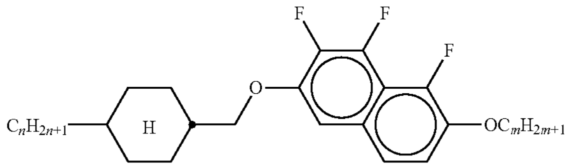
CONaph-n-Om
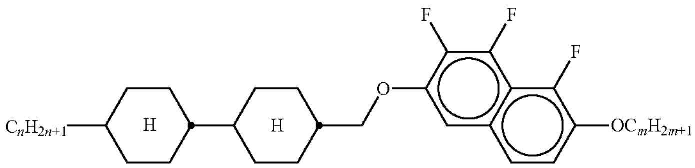
CCONaph-n-Om
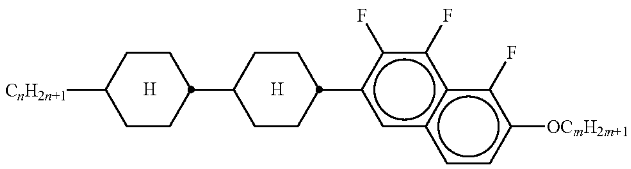
CCNaph-n-Om
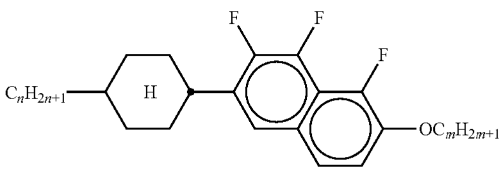
CNaph-n-Om
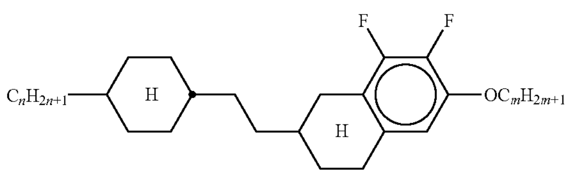
CETNaph-n-Om
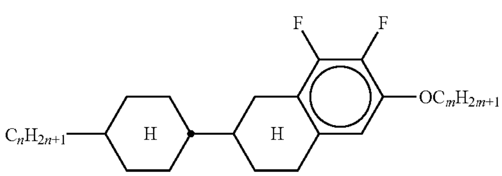
CTNaph-n-Om
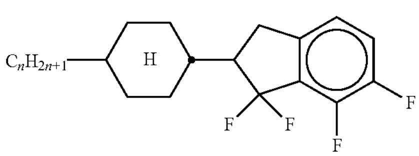
CK-n-F
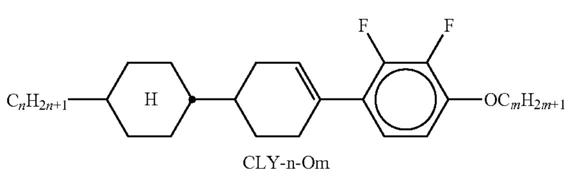
CLY-n-Om TABLE A2-continued
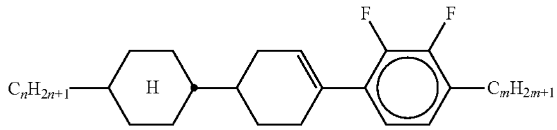
CLY-n-m
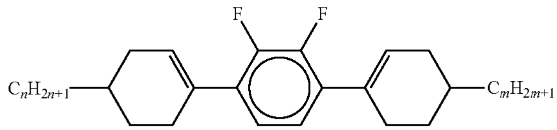
LYLI-n-m
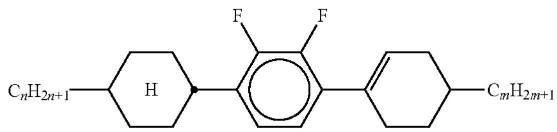
CYLI-n-m
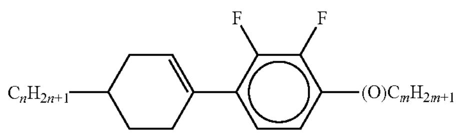
LY-n-(O)m
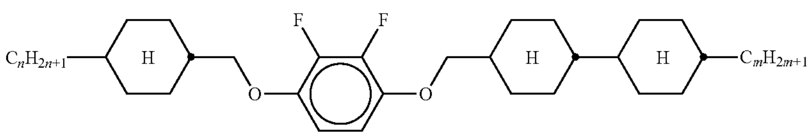
COYOICC-n-m
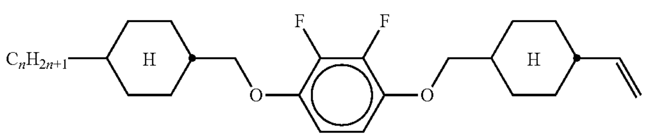
COYOIC-n-V
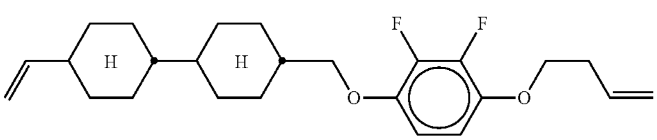
CCOY-V-O2V
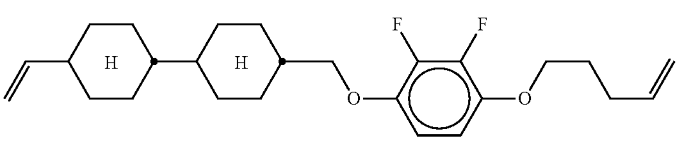
CCOY-V-O3V
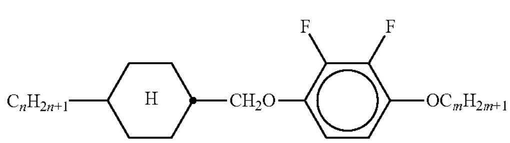
COY-n-Om TABLE A2-continued
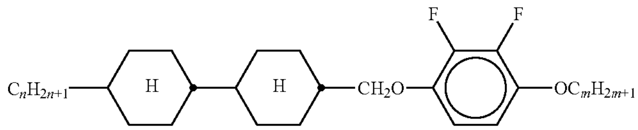
CCOY-n-Om
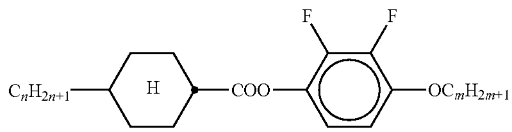
D-nOmFF
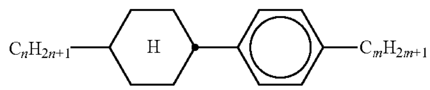
PCH-nm, CP-n-m
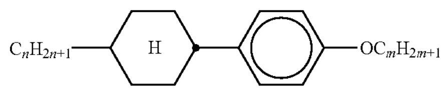
PCH-nOm, CP-n-Om
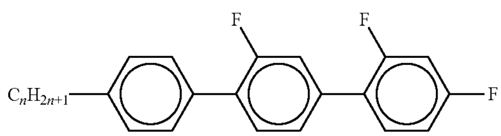
PGIGI-n-F
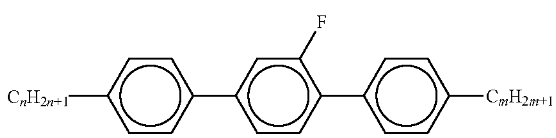
PGP-n-m
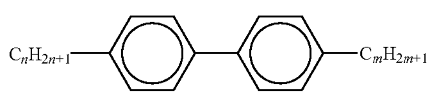
PP-n-m
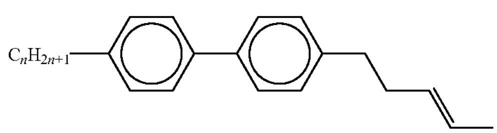
PP-n-2V1
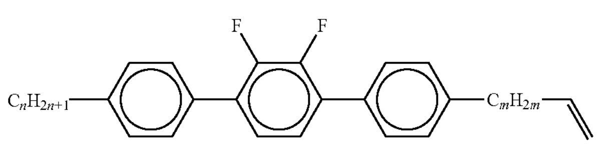
PYP-n-mV
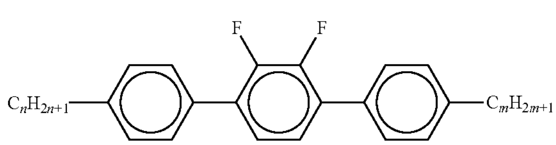
PYP-n-m TABLE A2-continued
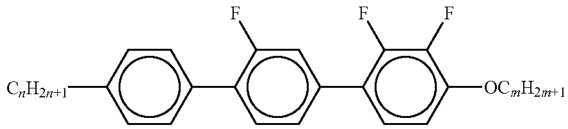
PGIY-n-Om
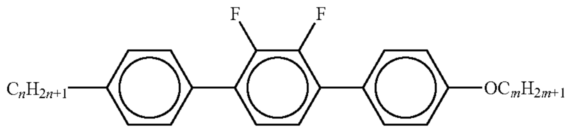
PYP-n-Om
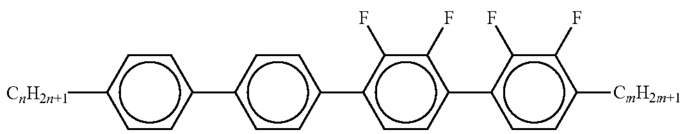
PPYY-n-m
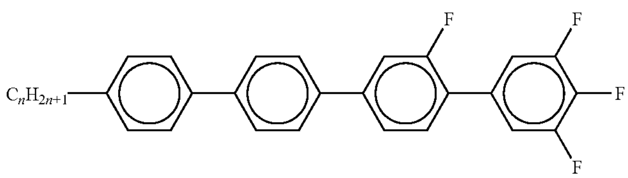
PPGU-n-F
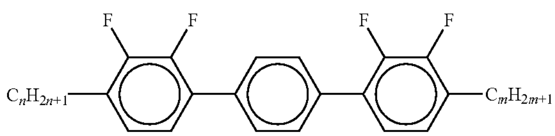
YPY-n-m
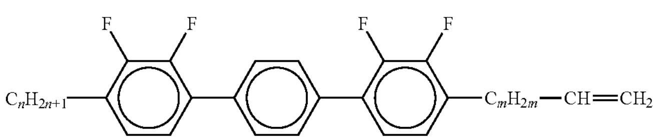
YPY-n-mV
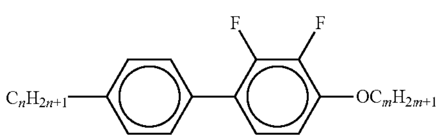
PY-n-Om
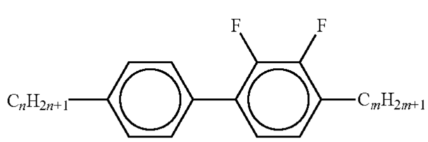
PY-n-m TABLE A2-continued
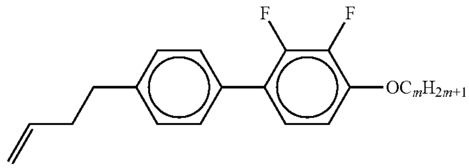
PY-V2-Om
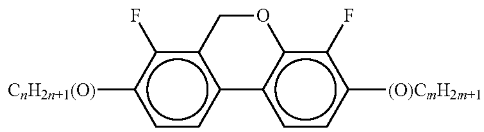
DFDBC-n(O)-(O)m
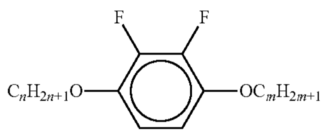
Y-nO-Om
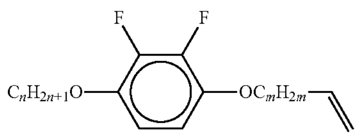
Y-nO-OmV
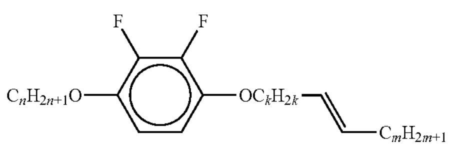
Y-nO-OkVm
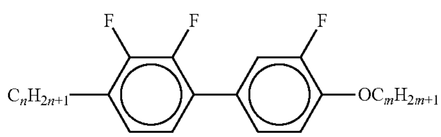
YG-n-Om
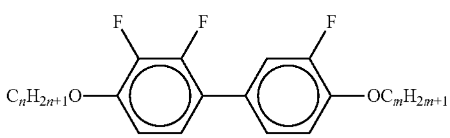
YG-nO-Om
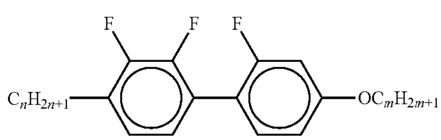
YGI-n-Om
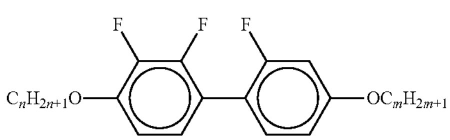
YGI-nO-Om TABLE A2-continued

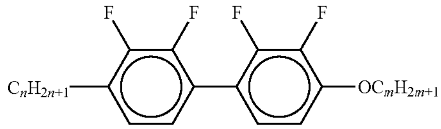

YY-n-Om

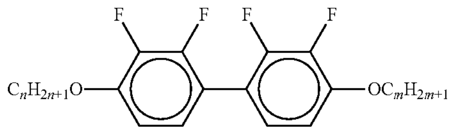

YY-nO-Om

In Table A2, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.

In a first preferred embodiment of the present invention, the LC media according to the invention, especially those with positive dielectric anisotropy, comprise one or more compounds selected from the group consisting of compounds from Table A1.

In a second preferred embodiment of the present invention, the LC media according to the invention, especially those with negative dielectric anisotropy, comprise one or more compounds selected from the group consisting of compounds from Table A2.

TABLE B

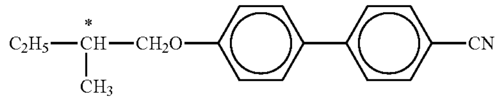

C 15

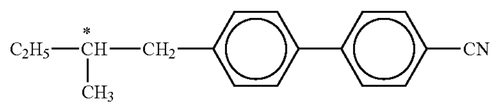

CB 15

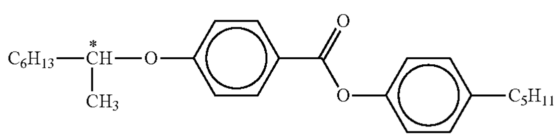

CM 21

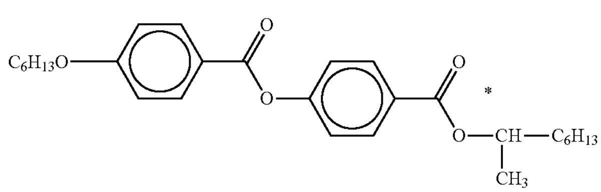

R/S-811

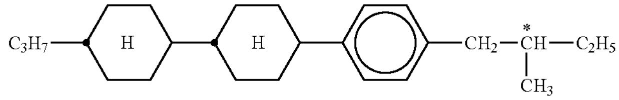

CM 44

TABLE B-continued
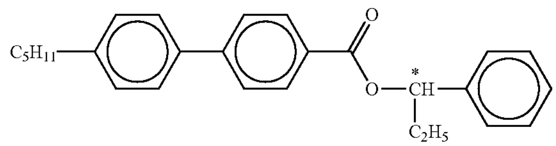
CM 45
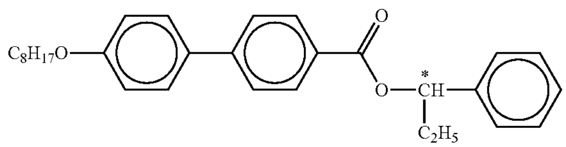
CM 47
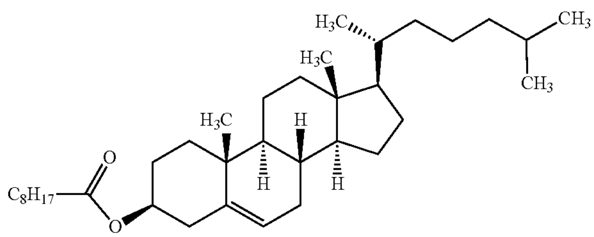
CN
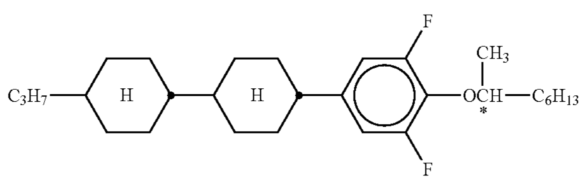
R/S-2011
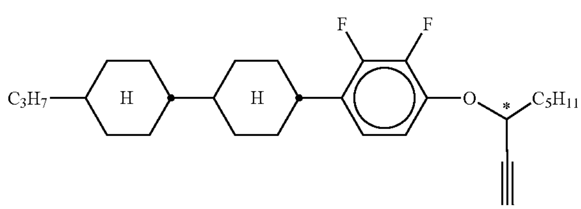
R/S-3011
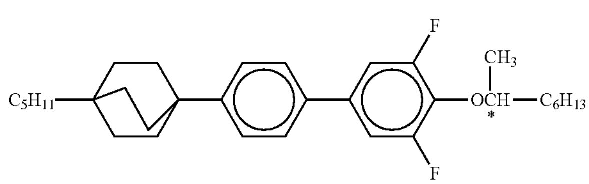
R/S-4011
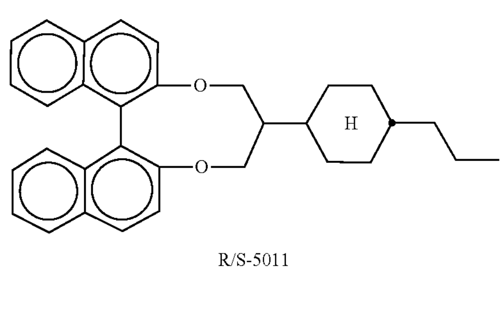
R/S-5011

TABLE B-continued

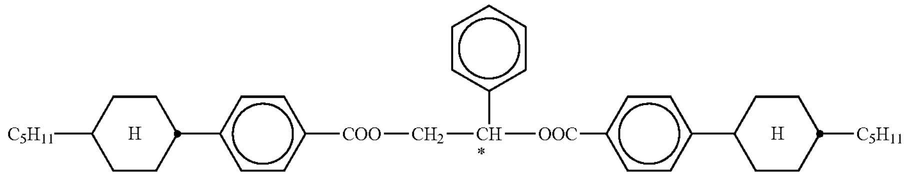

R/S-1011

Table B shows possible chiral dopants which can be added to the LC media according to the invention.

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C

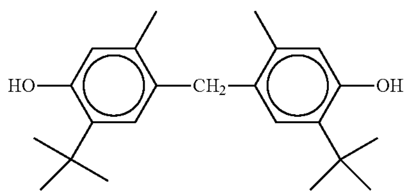

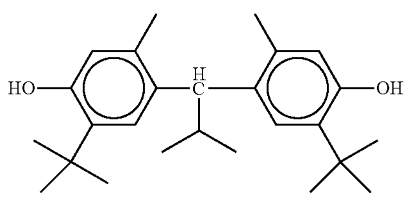

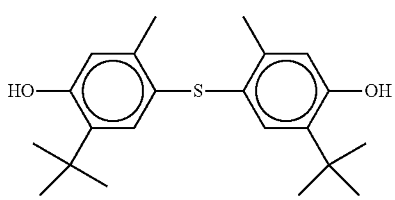

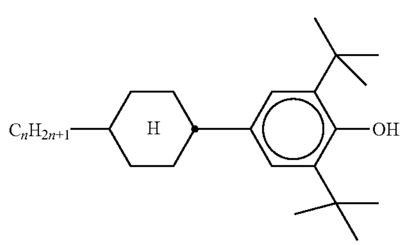

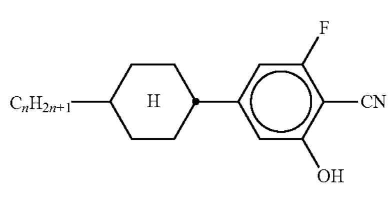

TABLE C-continued
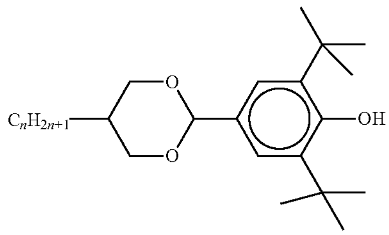
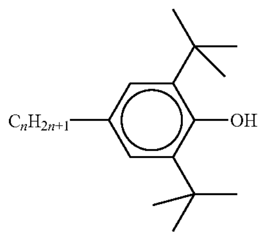
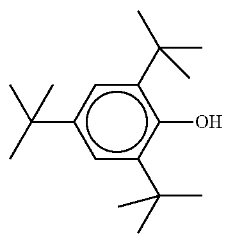
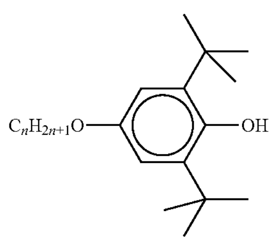
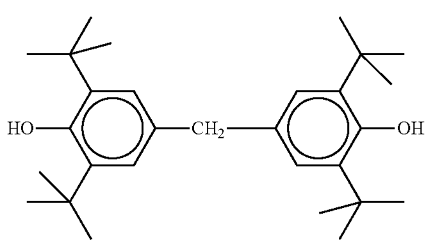
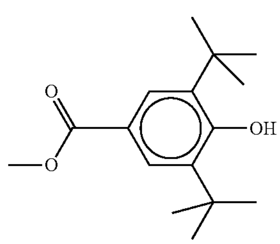

TABLE C-continued
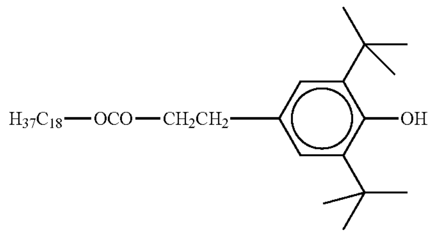
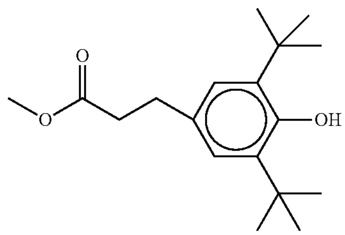
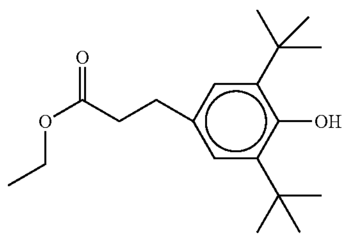
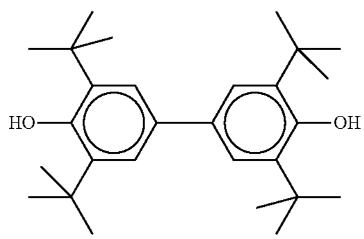
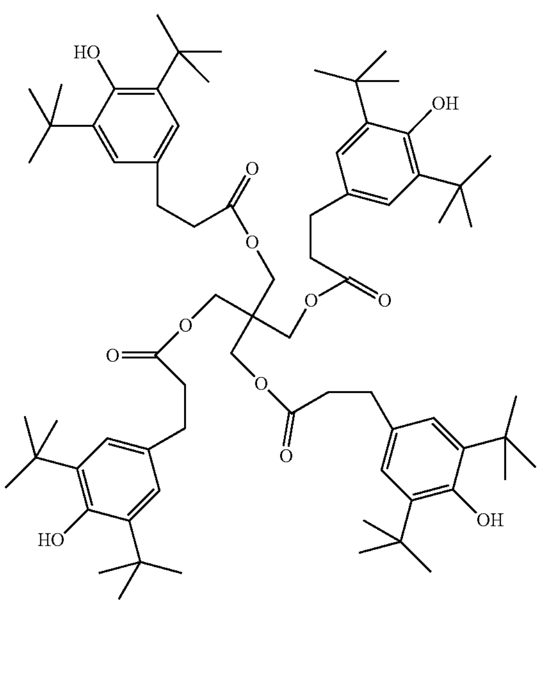 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE C-continued
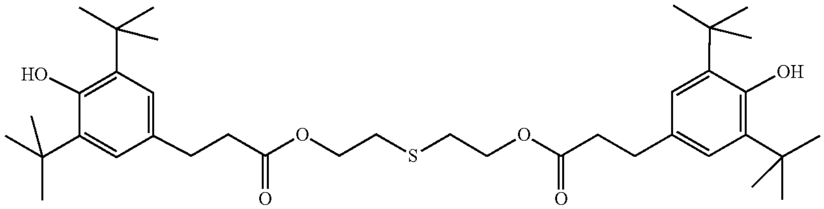 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
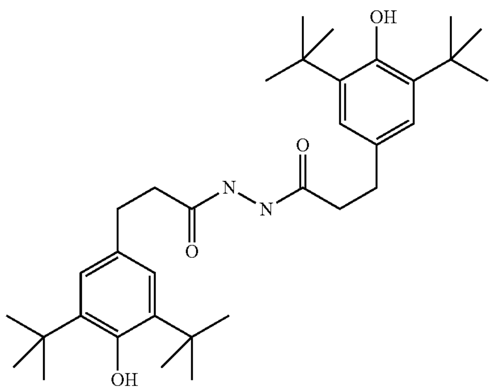
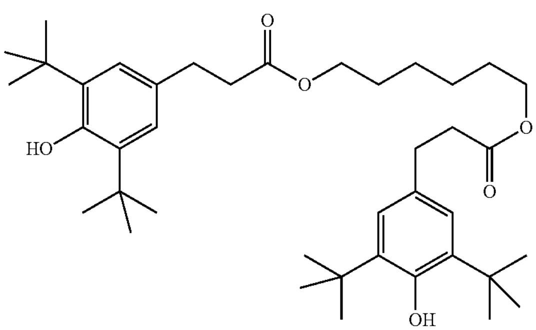 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
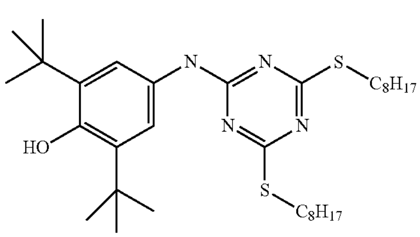

TABLE C-continued
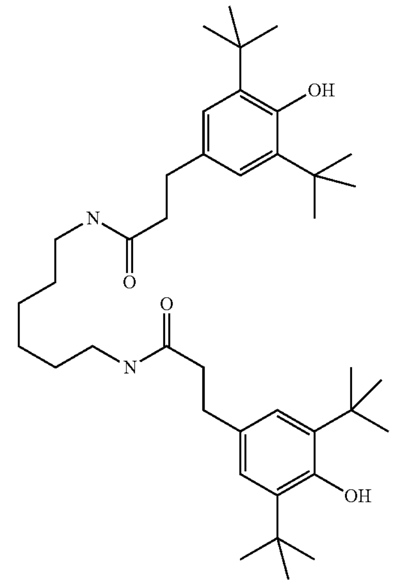
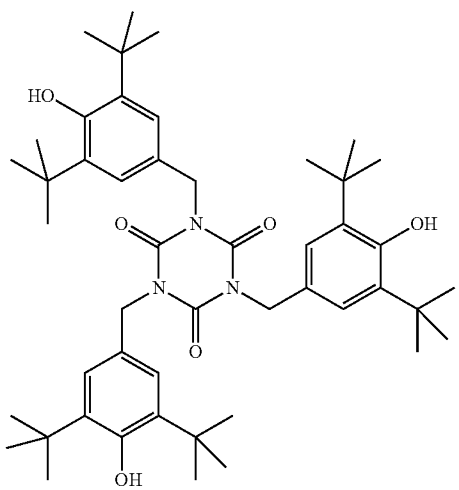 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
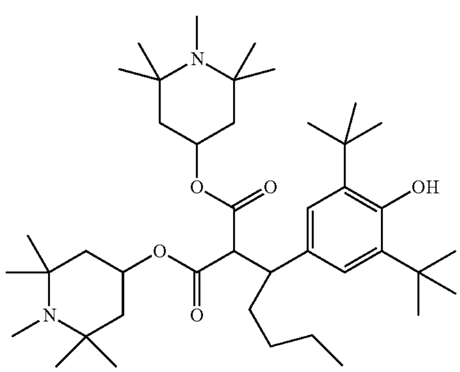 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
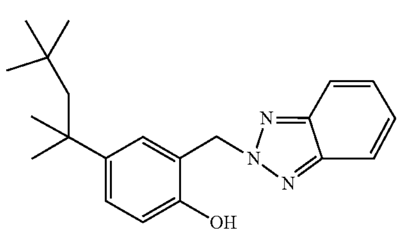 [SMILES: CC(C)(C)CC(C)(C)c1ccc(O)c(Cn2nc3ccccc3n2)c1]

TABLE C-continued
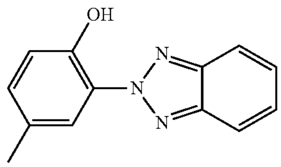
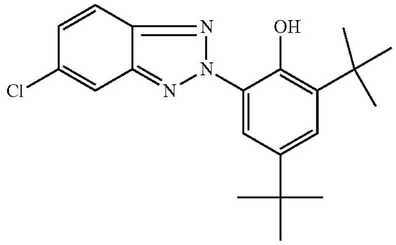 [SMILES: CC(C)(C)c1cc(-n2nc3ccc(Cl)cc3n2)c(O)c(C(C)(C)C)c1]
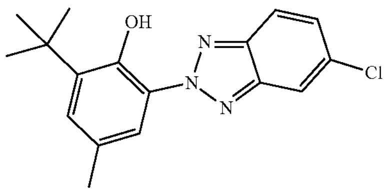 [SMILES: Cc1cc(-n2nc3ccc(Cl)cc3n2)c(O)c(C(C)(C)C)c1]
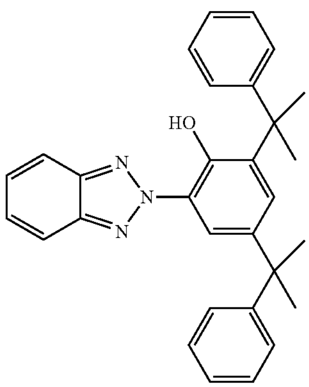 [SMILES: CC(C)(c1ccccc1)c1cc(-n2nc3ccccc3n2)c(O)c(C(C)(C)c2ccccc2)c1]
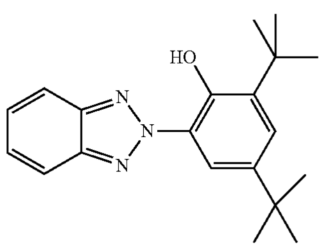 [SMILES: CC(C)(C)c1cc(-n2nc3ccccc3n2)c(O)c(C(C)(C)C)c1]
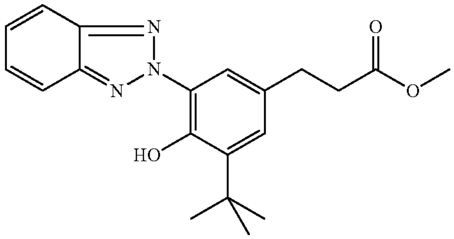 [SMILES: COC(=O)CCc1cc(-n2nc3ccccc3n2)c(O)c(C(C)(C)C)c1]

TABLE C-continued
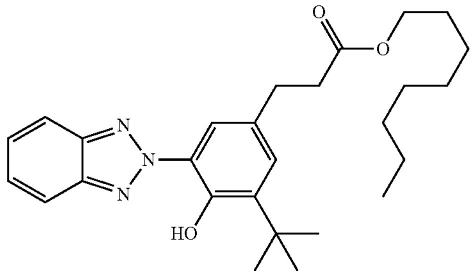 [SMILES: CCCCCCCCOC(=O)CCc1cc(-n2nc3ccccc3n2)c(O)c(C(C)(C)C)c1]
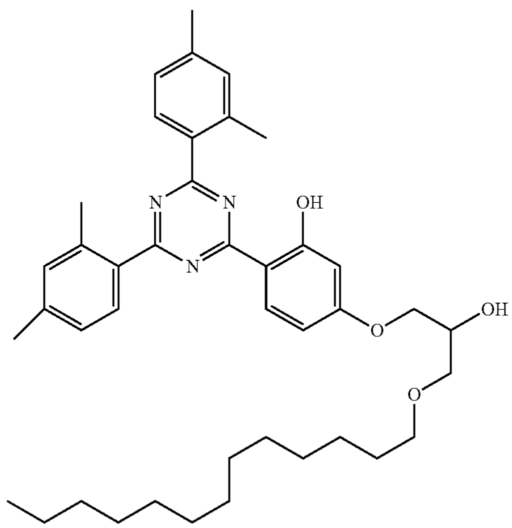 [SMILES: CCCCCCCCCCCCCOCC(O)COc1ccc(-c2nc(-c3ccc(C)cc3C)nc(-c3ccc(C)cc3C)n2)c(O)c1]
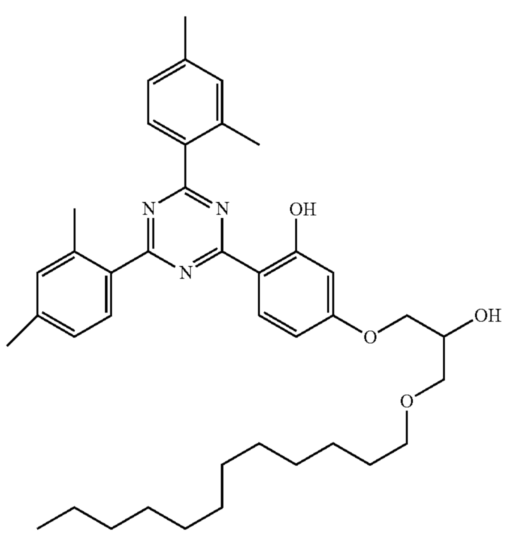 [SMILES: CCCCCCCCCCCCOCC(O)COc1ccc(-c2nc(-c3ccc(C)cc3C)nc(-c3ccc(C)cc3C)n2)c(O)c1]

TABLE C-continued
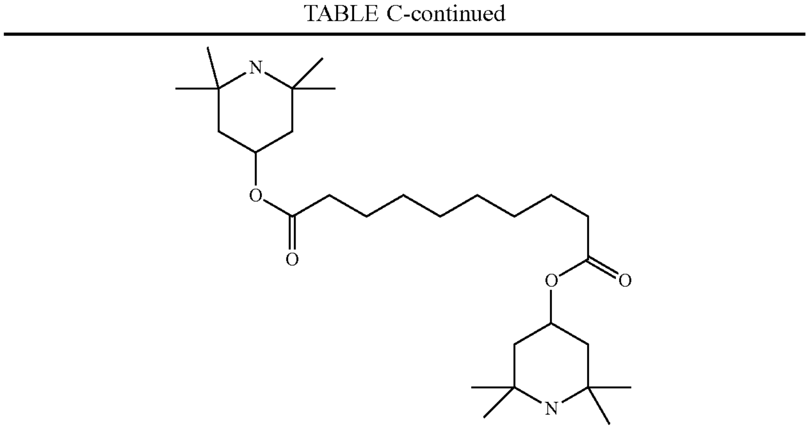
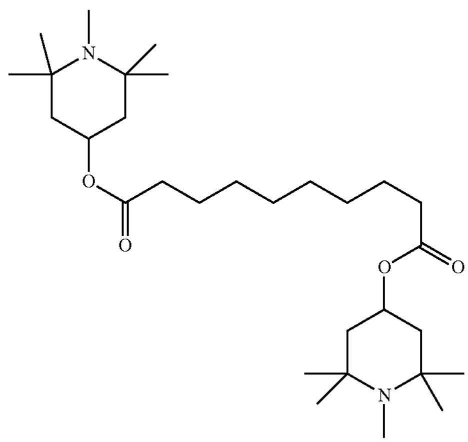
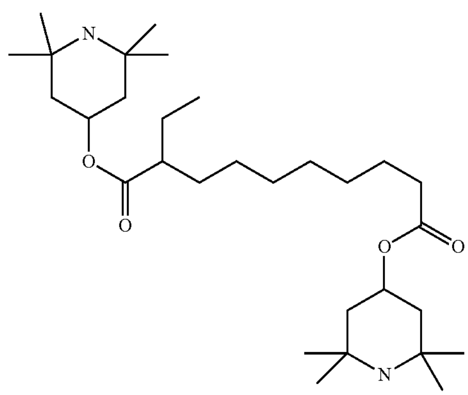
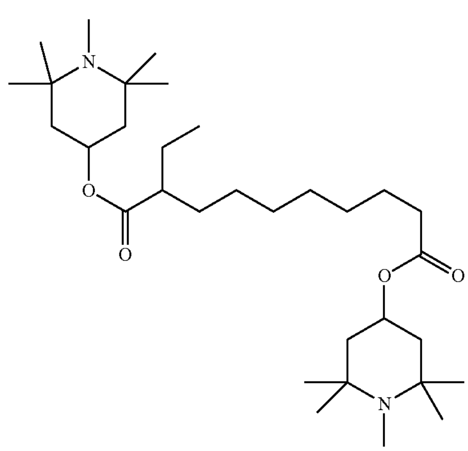

TABLE C-continued
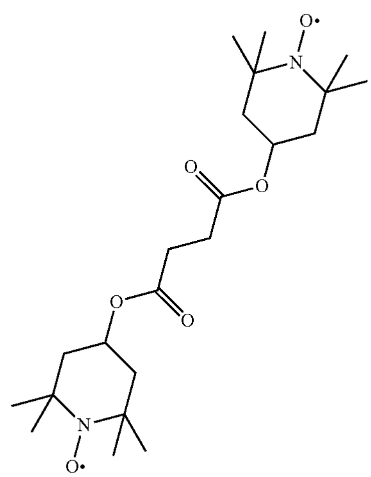
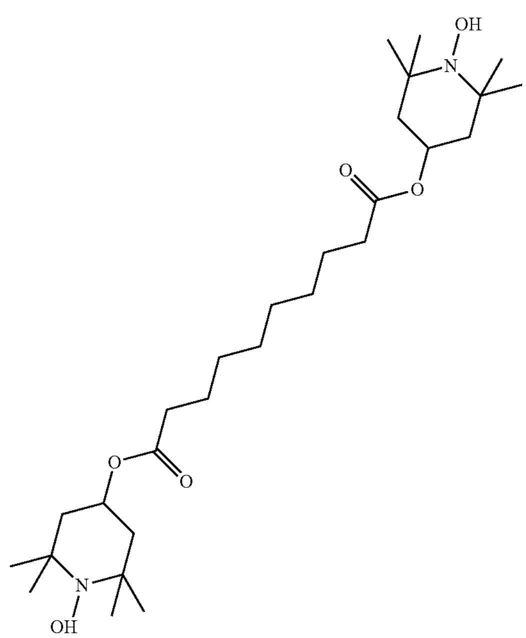

TABLE C-continued
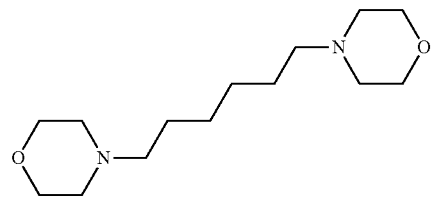
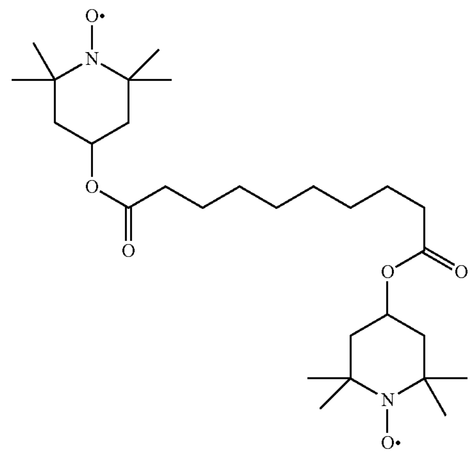
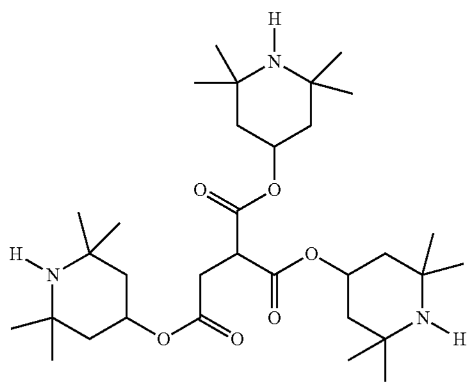
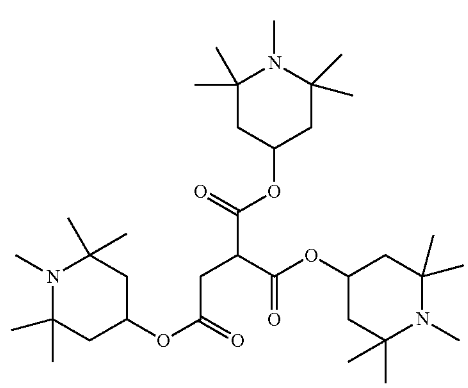

TABLE C-continued
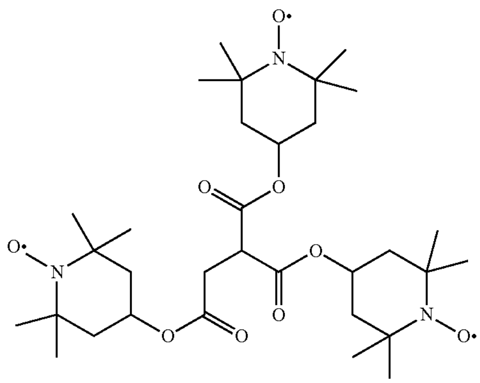
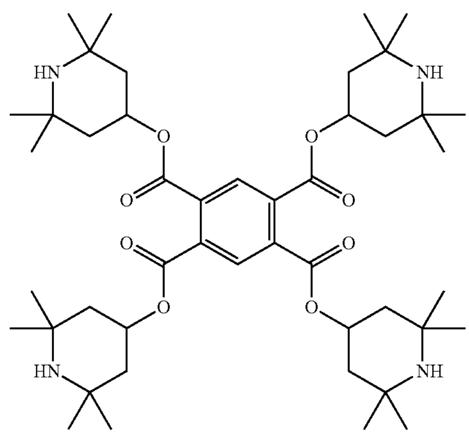
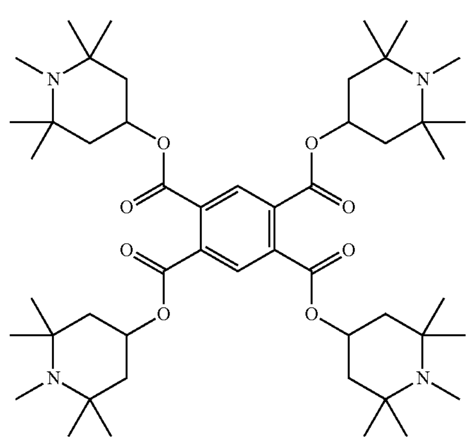

TABLE C-continued

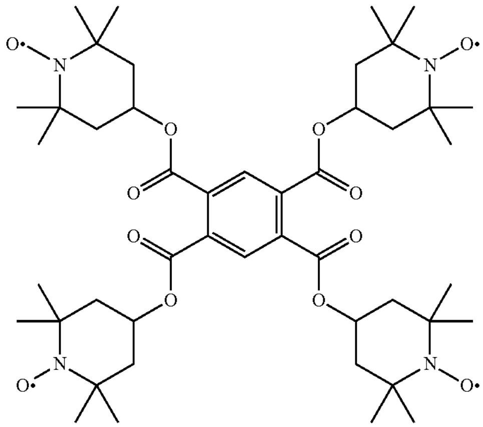

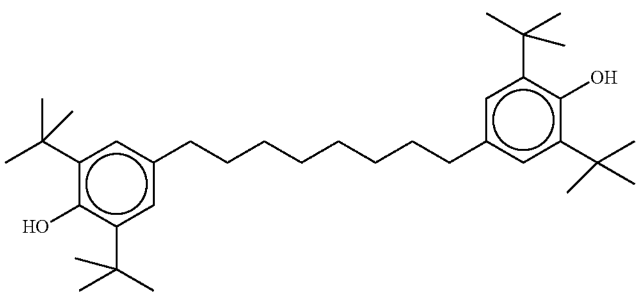

Table C shows possible stabilisers which can be added to the LC media according to the invention. Therein n denote an integer from 1 to 12, preferably 1, 2, 3, 4, 5, 6, 7 or 8, and terminal methyl groups are not shown.

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C.

TABLE D

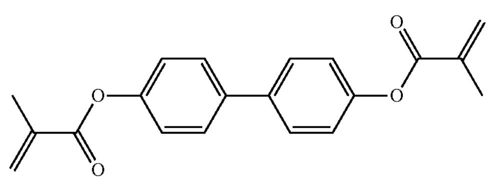 [SMILES: C=C(C)C(=O)Oc1ccc(-c2ccc(OC(=O)C(=C)C)cc2)cc1]

RM-1

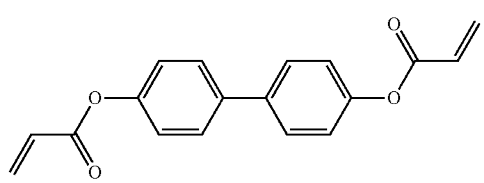

RM-2

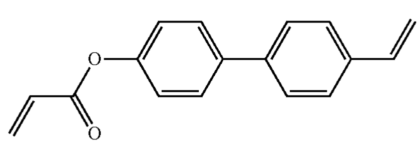 [SMILES: C=CC(=O)Oc1ccc(-c2ccc(C=C)cc2)cc1]

RM-3

TABLE D-continued
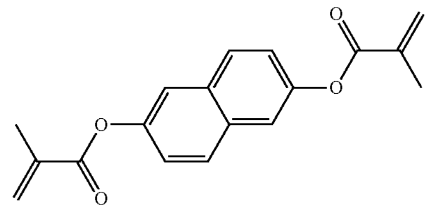 [SMILES: C=C(C)C(=O)Oc1ccc2cc(OC(=O)C(=C)C)ccc2c1]
RM-4
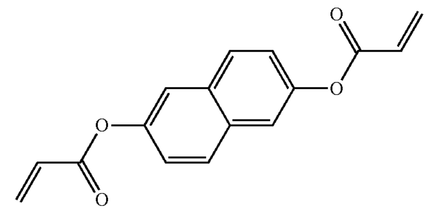 [SMILES: C=CC(=O)Oc1ccc2cc(OC(=O)C=C)ccc2c1]
RM-5
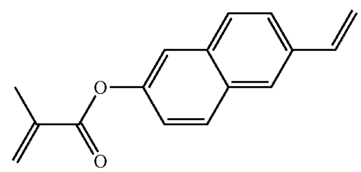 [SMILES: C=Cc1ccc2cc(OC(=O)C(=C)C)ccc2c1]
RM-6
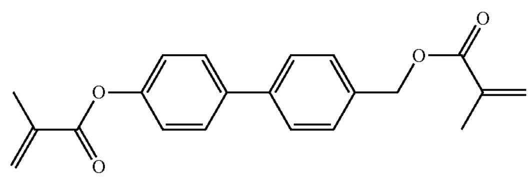 [SMILES: C=C(C)C(=O)OCc1ccc(-c2ccc(OC(=O)C(=C)C)cc2)cc1]
RM-7
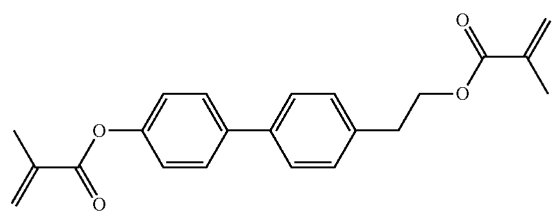 [SMILES: C=C(C)C(=O)OCCc1ccc(-c2ccc(OC(=O)C(=C)C)cc2)cc1]
RM-8
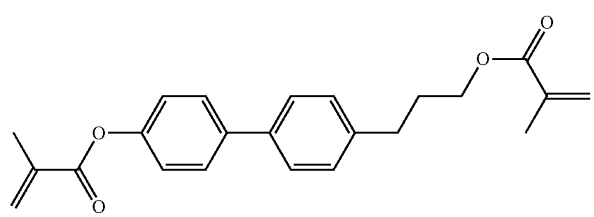 [SMILES: C=C(C)C(=O)OCCCc1ccc(-c2ccc(OC(=O)C(=C)C)cc2)cc1]
RM-9
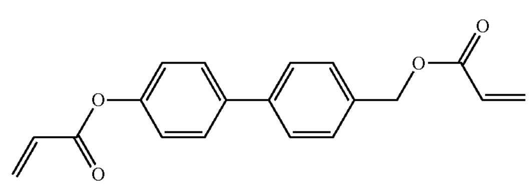 [SMILES: C=CC(=O)OCc1ccc(-c2ccc(OC(=O)C=C)cc2)cc1]
RM-10
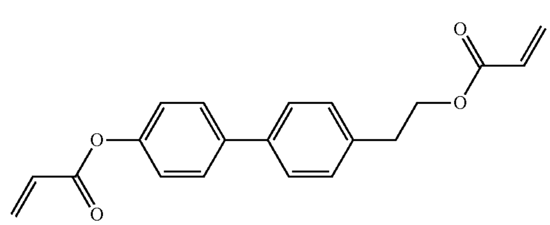 [SMILES: C=CC(=O)OCCc1ccc(-c2ccc(OC(=O)C=C)cc2)cc1]
RM-11

TABLE D-continued
RM-12
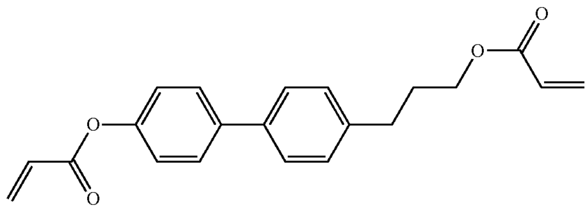 [SMILES: C=CC(=O)OCCCc1ccc(-c2ccc(OC(=O)C=C)cc2)cc1]
RM-13
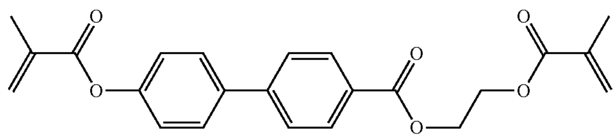
RM-14
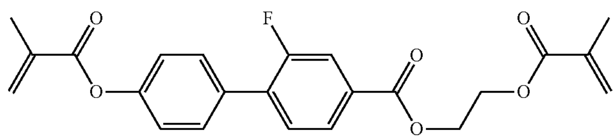 [SMILES: C=C(C)C(=O)OCCOC(=O)c1ccc(-c2ccc(OC(=O)C(=C)C)cc2)cc1]
RM-15
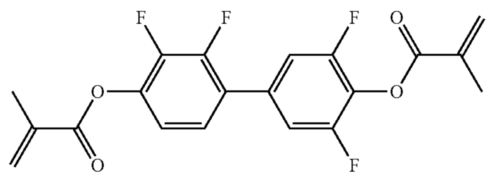 [SMILES: C=C(C)C(=O)Oc1ccc(-c2cc(F)c(OC(=O)C(=C)C)c(F)c2)c(F)c1F]
RM-16
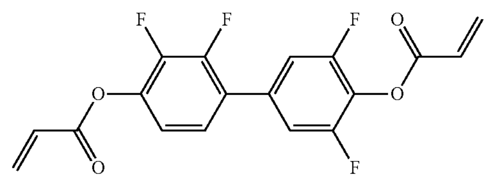
RM-17
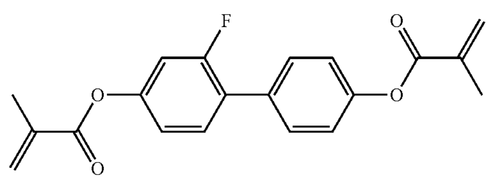
RM-18
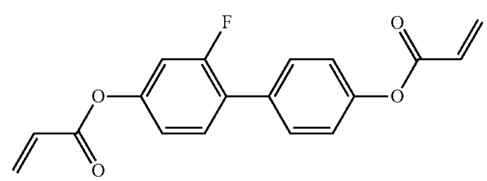 [SMILES: C=CC(=O)Oc1ccc(-c2ccc(OC(=O)C=C)cc2F)cc1]
RM-19
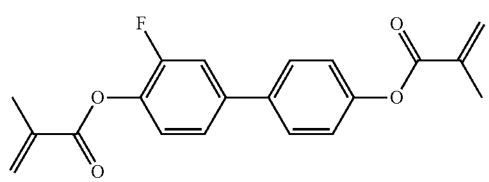
RM-20
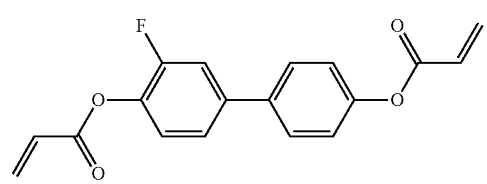 [SMILES: C=CC(=O)Oc1ccc(-c2ccc(OC(=O)C=C)c(F)c2)cc1]

TABLE D-continued
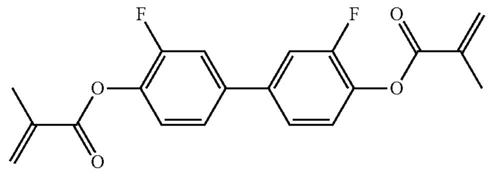 [SMILES: C=C(C)C(=O)Oc1ccc(-c2ccc(OC(=O)C(=C)C)c(F)c2)cc1F]
RM-21
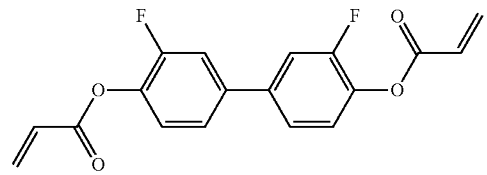 [SMILES: C=CC(=O)Oc1ccc(-c2ccc(OC(=O)C=C)c(F)c2)cc1F]
RM-22
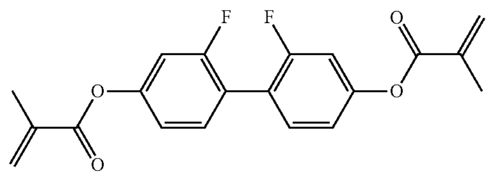 [SMILES: C=C(C)C(=O)Oc1ccc(-c2ccc(OC(=O)C(=C)C)cc2F)c(F)c1]
RM-23
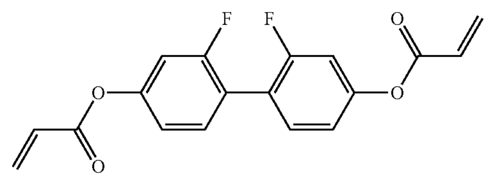
RM-24
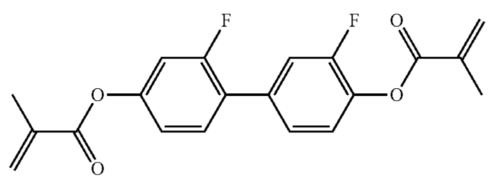
RM-25
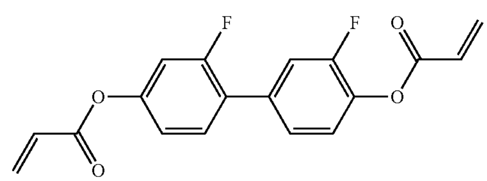
RM-26
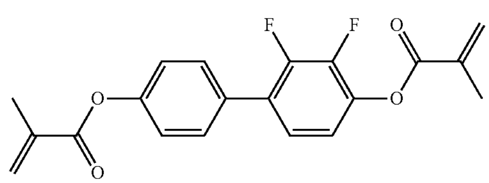 [SMILES: C=C(C)C(=O)Oc1ccc(-c2ccc(OC(=O)C(=C)C)c(F)c2F)cc1]
RM-27
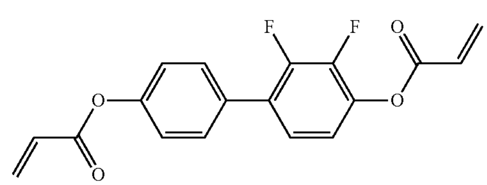 [SMILES: C=CC(=O)Oc1ccc(-c2ccc(OC(=O)C=C)c(F)c2F)cc1]
RM-28
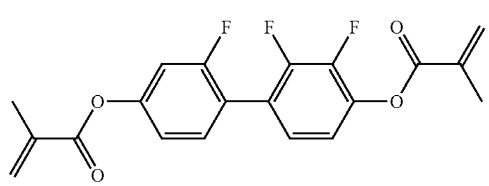
RM-29

TABLE D-continued
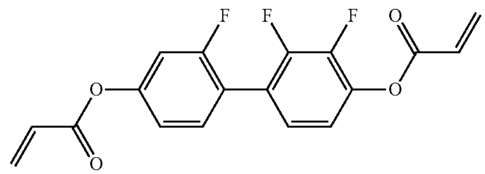 [SMILES: C=CC(=O)Oc1ccc(-c2ccc(OC(=O)C=C)c(F)c2F)c(F)c1]
RM-30
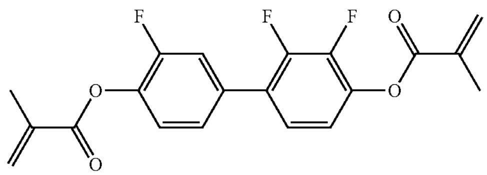 [SMILES: C=C(C)C(=O)Oc1ccc(-c2ccc(OC(=O)C(=C)C)c(F)c2F)cc1F]
RM-31
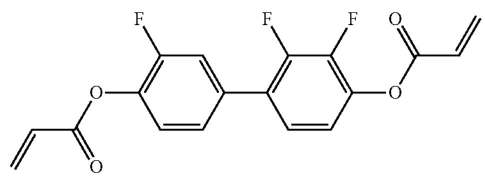
RM-32
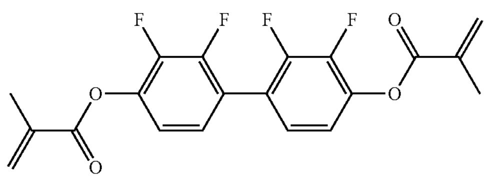 [SMILES: C=C(C)C(=O)Oc1ccc(-c2ccc(OC(=O)C(=C)C)c(F)c2F)c(F)c1F]
RM-33
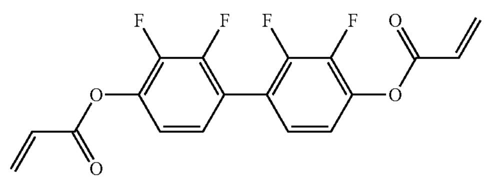 [SMILES: C=CC(=O)Oc1ccc(-c2ccc(OC(=O)C=C)c(F)c2F)c(F)c1F]
RM-34
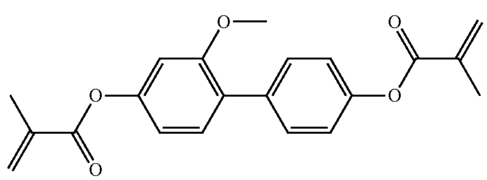 [SMILES: C=C(C)C(=O)Oc1ccc(-c2ccc(OC(=O)C(=C)C)cc2OC)cc1]
RM-35
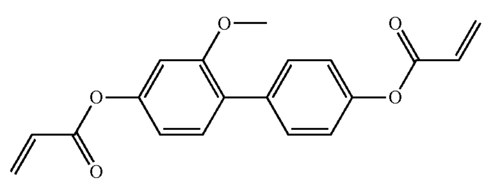 [SMILES: C=CC(=O)Oc1ccc(-c2ccc(OC(=O)C=C)cc2OC)cc1]
RM-36
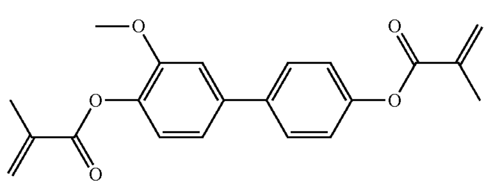 [SMILES: C=C(C)C(=O)Oc1ccc(-c2ccc(OC(=O)C(=C)C)c(OC)c2)cc1]
RM-37
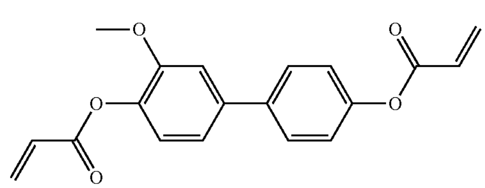
RM-38

TABLE D-continued
RM-39
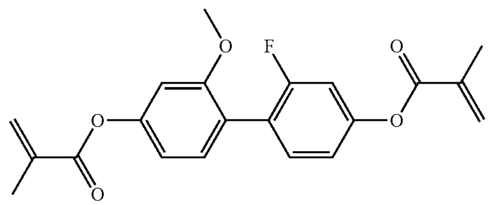 [SMILES: C=C(C)C(=O)Oc1ccc(-c2ccc(OC(=O)C(=C)C)cc2OC)c(F)c1]
RM-40
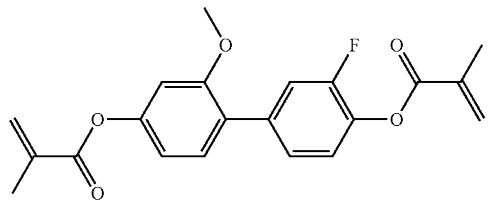 [SMILES: C=C(C)C(=O)Oc1ccc(-c2ccc(OC(=O)C(=C)C)c(F)c2)c(OC)c1]
RM-41
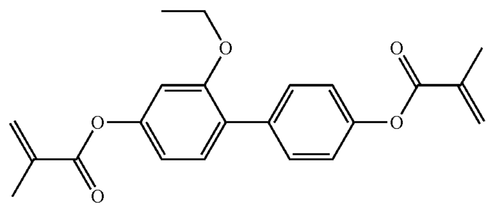 [SMILES: C=C(C)C(=O)Oc1ccc(-c2ccc(OC(=O)C(=C)C)cc2OCC)cc1]
RM-42
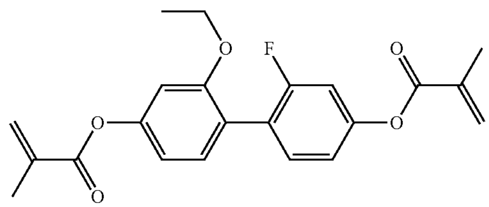 [SMILES: C=C(C)C(=O)Oc1ccc(-c2ccc(OC(=O)C(=C)C)cc2OCC)c(F)c1]
RM-43
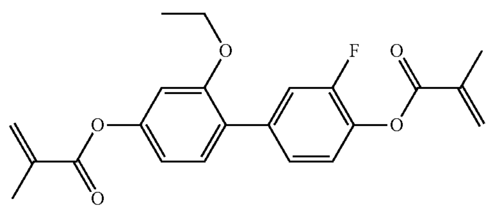 [SMILES: C=C(C)C(=O)Oc1ccc(-c2ccc(OC(=O)C(=C)C)c(F)c2)c(OCC)c1]
RM-44
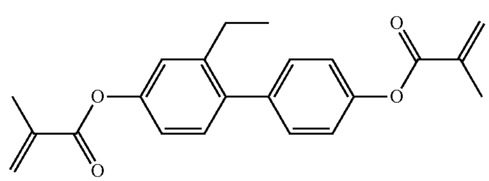 [SMILES: C=C(C)C(=O)Oc1ccc(-c2ccc(OC(=O)C(=C)C)cc2CC)cc1]
RM-45
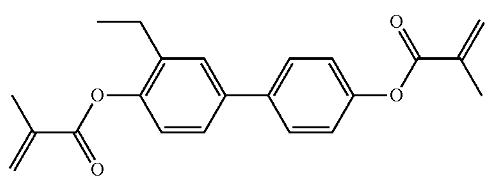
RM-46
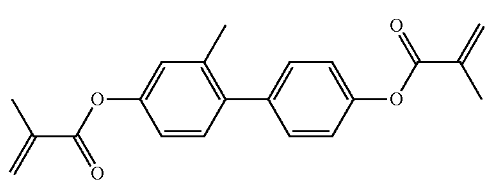

TABLE D-continued
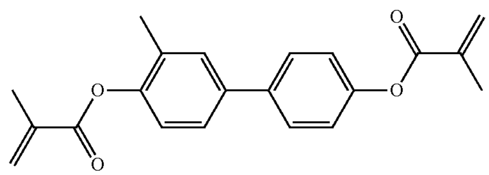 [SMILES: C=C(C)C(=O)Oc1ccc(-c2ccc(OC(=O)C(=C)C)c(C)c2)cc1]
RM-47
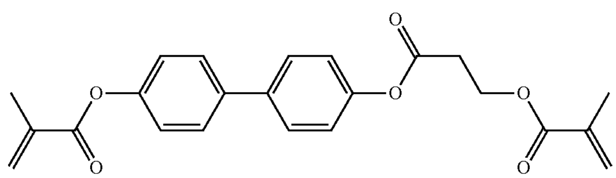 [SMILES: C=C(C)C(=O)OCCC(=O)Oc1ccc(-c2ccc(OC(=O)C(=C)C)cc2)cc1]
RM-48
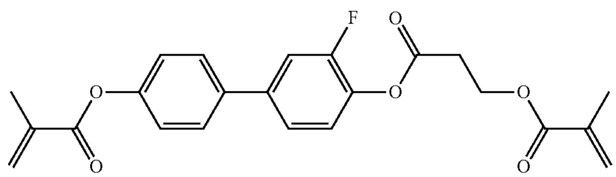 [SMILES: C=C(C)C(=O)OCCC(=O)Oc1ccc(-c2ccc(OC(=O)C(=C)C)cc2)cc1F]
RM-49
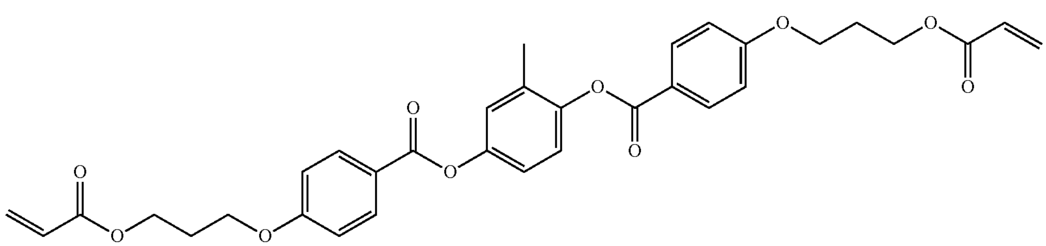
RM-50
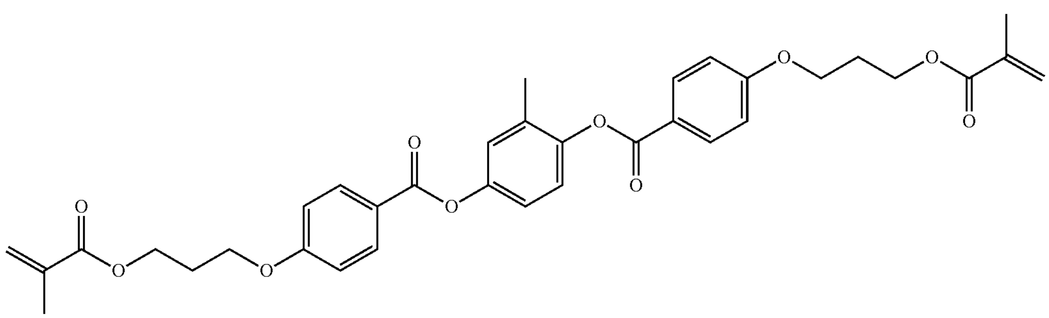 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-51
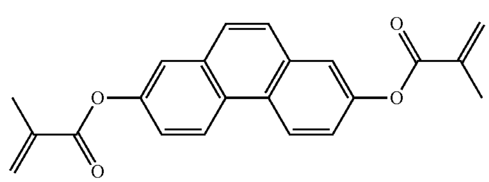
RM-52
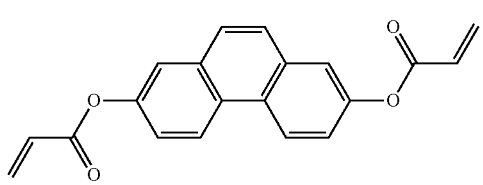 [SMILES: C=CC(=O)Oc1ccc2c(ccc3cc(OC(=O)C=C)ccc32)c1]
RM-53

TABLE D-continued
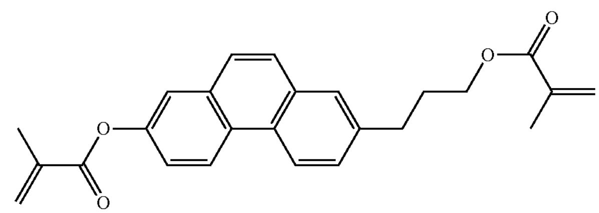 [SMILES: C=C(C)C(=O)OCCCc1ccc2c(ccc3cc(OC(=O)C(=C)C)ccc32)c1]
RM-54
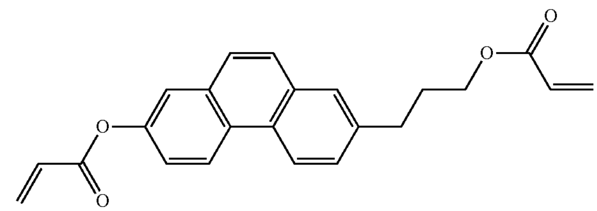 [SMILES: C=CC(=O)OCCCc1ccc2c(ccc3cc(OC(=O)C=C)ccc32)c1]
RM-55
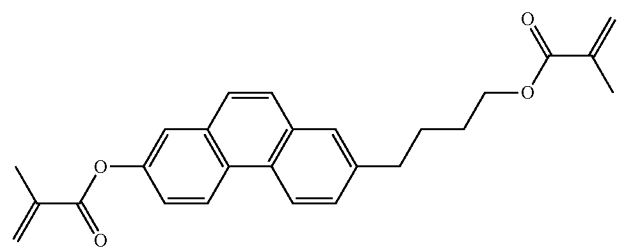 [SMILES: C=C(C)C(=O)OCCCCc1ccc2c(ccc3cc(OC(=O)C(=C)C)ccc32)c1]
RM-56
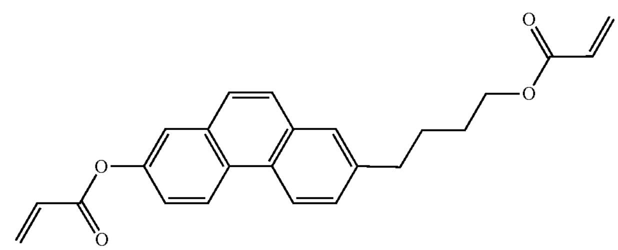 [SMILES: C=CC(=O)OCCCCc1ccc2c(ccc3cc(OC(=O)C=C)ccc32)c1]
RM-57
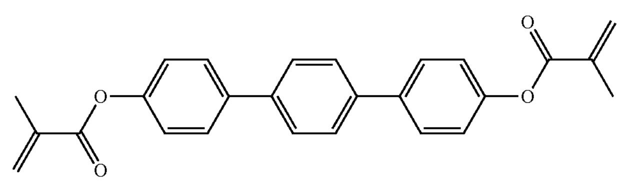 [SMILES: C=C(C)C(=O)Oc1ccc(-c2ccc(-c3ccc(OC(=O)C(=C)C)cc3)cc2)cc1]
RM-58
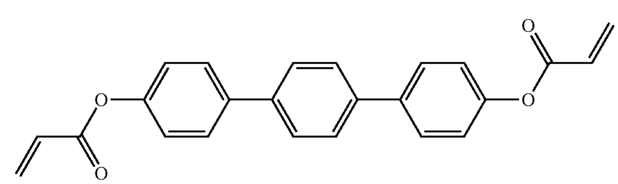
RM-59
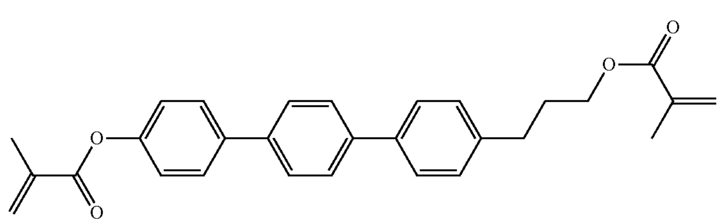 [SMILES: C=C(C)C(=O)OCCCc1ccc(-c2ccc(-c3ccc(OC(=O)C(=C)C)cc3)cc2)cc1]
RM-60

TABLE D-continued
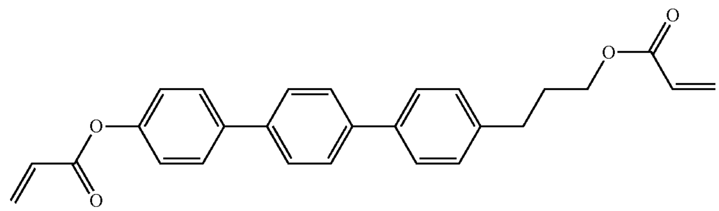 [SMILES: C=CC(=O)OCCCc1ccc(-c2ccc(-c3ccc(OC(=O)C=C)cc3)cc2)cc1]
RM-61
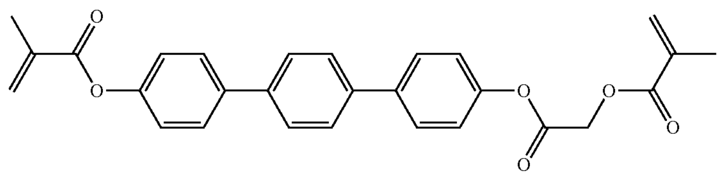 [SMILES: C=C(C)C(=O)OCC(=O)Oc1ccc(-c2ccc(-c3ccc(OC(=O)C(=C)C)cc3)cc2)cc1]
RM-62
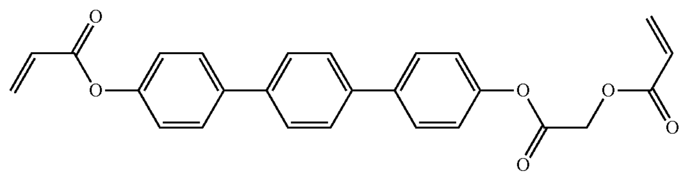 [SMILES: C=CC(=O)OCC(=O)Oc1ccc(-c2ccc(-c3ccc(OC(=O)C=C)cc3)cc2)cc1]
RM-63
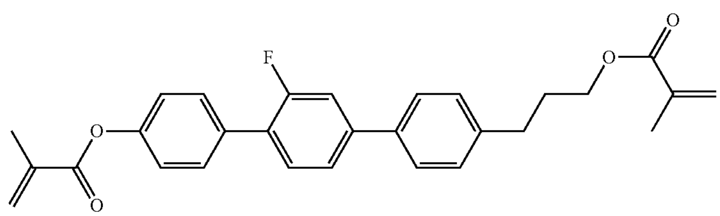 [SMILES: C=C(C)C(=O)OCCCc1ccc(-c2ccc(-c3ccc(OC(=O)C(=C)C)cc3)c(F)c2)cc1]
RM-64
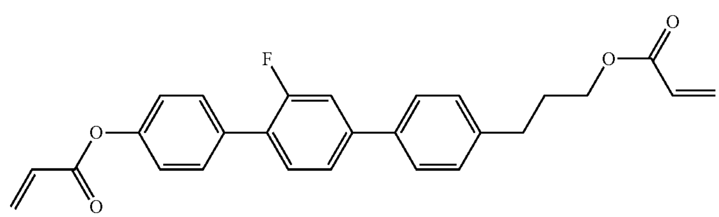
RM-65
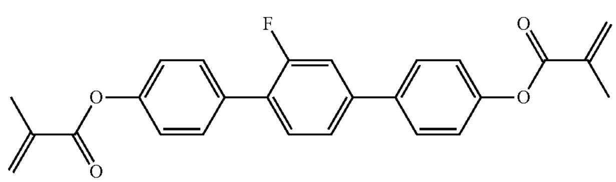 [SMILES: C=C(C)C(=O)Oc1ccc(-c2ccc(-c3ccc(OC(=O)C(=C)C)cc3)c(F)c2)cc1]
RM-66
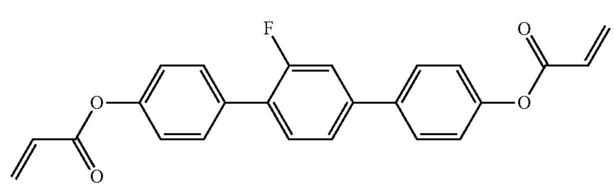 [SMILES: C=CC(=O)Oc1ccc(-c2ccc(-c3ccc(OC(=O)C=C)cc3F)cc2)cc1]
RM-67
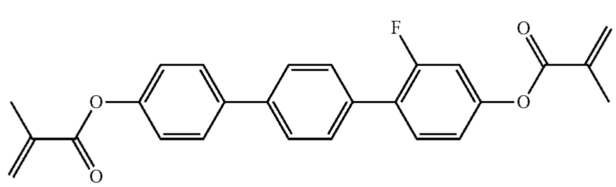
RM-68

TABLE D-continued
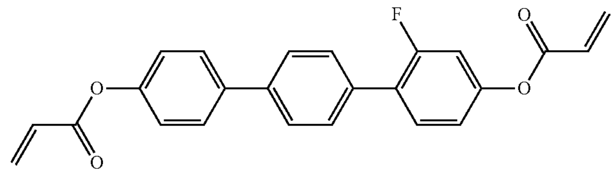
RM-69
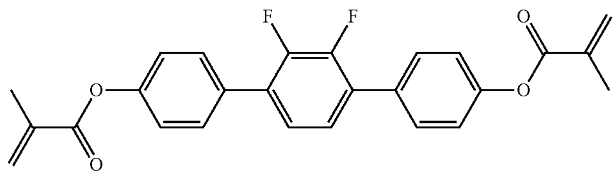
RM-70
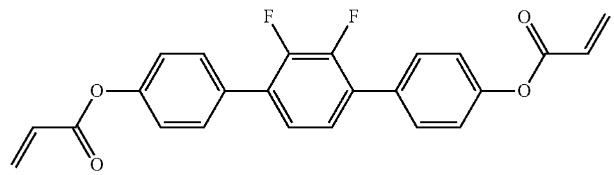 [SMILES: C=C(C)C(=O)Oc1ccc(-c2ccc(-c3ccc(OC(=O)C(=C)C)cc3)c(F)c2F)cc1]
RM-71
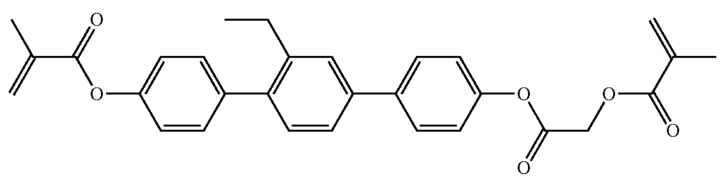 [SMILES: C=C(C)C(=O)OCC(=O)Oc1ccc(-c2ccc(-c3ccc(OC(=O)C(=C)C)cc3)c(CC)c2)cc1]
RM-72
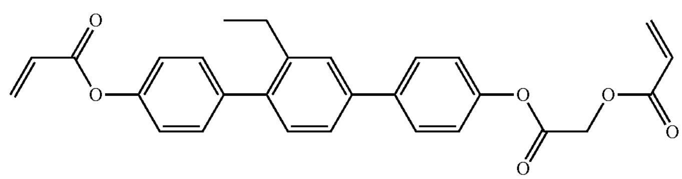 [SMILES: C=CC(=O)OCC(=O)Oc1ccc(-c2ccc(-c3ccc(OC(=O)C=C)cc3)c(CC)c2)cc1]
RM-73
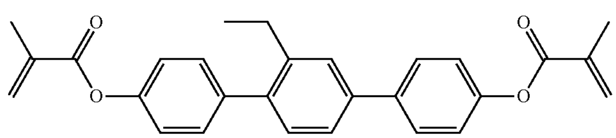 [SMILES: C=C(C)C(=O)Oc1ccc(-c2ccc(-c3ccc(OC(=O)C(=C)C)cc3)c(CC)c2)cc1]
RM-74
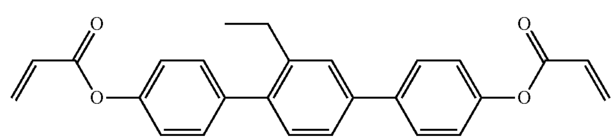 [SMILES: C=CC(=O)Oc1ccc(-c2ccc(-c3ccc(OC(=O)C=C)cc3)c(CC)c2)cc1]
RM-75
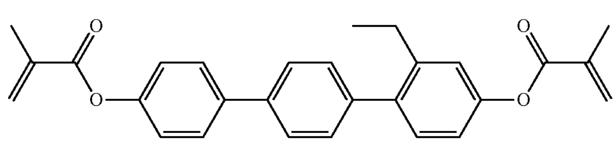 [SMILES: C=C(C)C(=O)Oc1ccc(-c2ccc(-c3ccc(OC(=O)C(=C)C)cc3CC)cc2)cc1]
RM-76
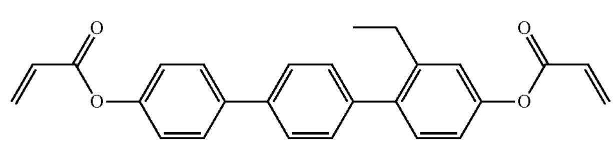 [SMILES: C=CC(=O)Oc1ccc(-c2ccc(-c3ccc(OC(=O)C=C)cc3CC)cc2)cc1]
RM-77

TABLE D-continued
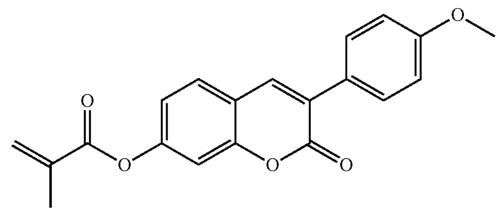 [SMILES: C=C(C)C(=O)Oc1ccc2cc(-c3ccc(OC)cc3)c(=O)oc2c1]
RM-78
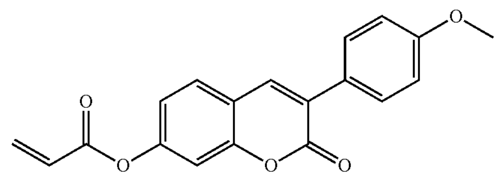 [SMILES: C=CC(=O)Oc1ccc2cc(-c3ccc(OC)cc3)c(=O)oc2c1]
RM-79
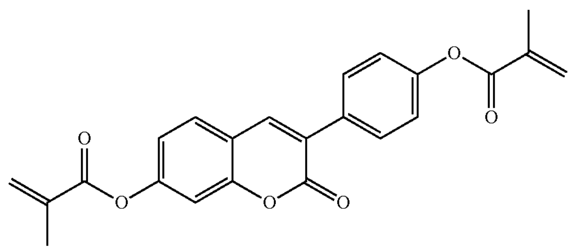 [SMILES: C=C(C)C(=O)Oc1ccc(-c2cc3ccc(OC(=O)C(=C)C)cc3oc2=O)cc1]
RM-80
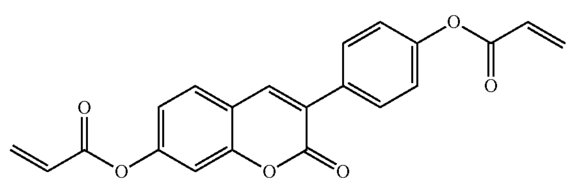 [SMILES: C=CC(=O)Oc1ccc(-c2cc3ccc(OC(=O)C=C)cc3oc2=O)cc1]
RM-81
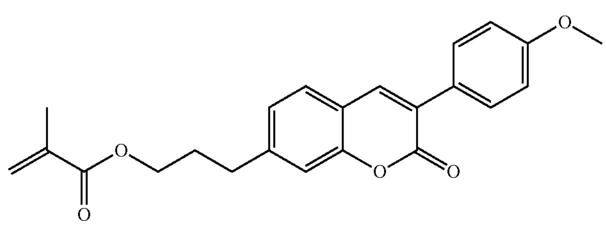 [SMILES: C=C(C)C(=O)OCCCc1ccc2cc(-c3ccc(OC)cc3)c(=O)oc2c1]
RM-82
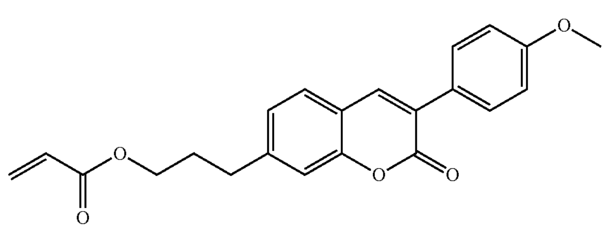 [SMILES: C=CC(=O)OCCCc1ccc2cc(-c3ccc(OC)cc3)c(=O)oc2c1]
RM-83
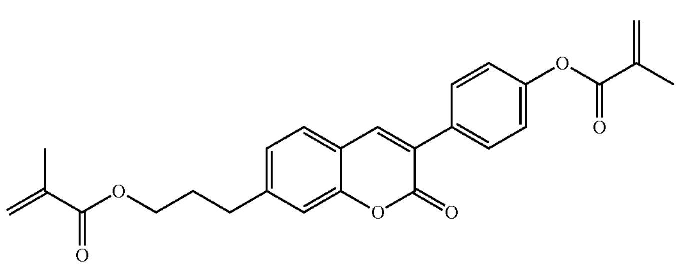 [SMILES: C=C(C)C(=O)OCCCc1ccc2cc(-c3ccc(OC(=O)C(=C)C)cc3)c(=O)oc2c1]
RM-84

TABLE D-continued
RM-85
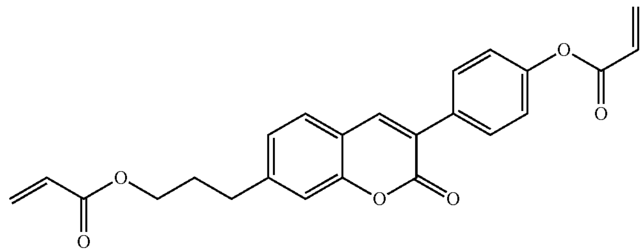 [SMILES: C=CC(=O)OCCCc1ccc2cc(-c3ccc(OC(=O)C=C)cc3)c(=O)oc2c1]
RM-86
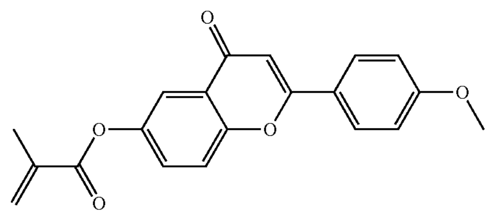 [SMILES: C=C(C)C(=O)Oc1ccc2oc(-c3ccc(OC)cc3)cc(=O)c2c1]
RM-87
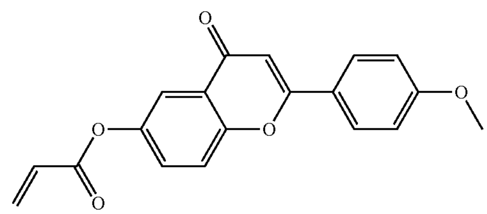 [SMILES: C=CC(=O)Oc1ccc2oc(-c3ccc(OC)cc3)cc(=O)c2c1]
RM-88
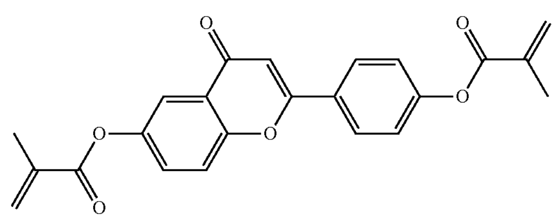 [SMILES: C=C(C)C(=O)Oc1ccc(-c2cc(=O)c3cc(OC(=O)C(=C)C)ccc3o2)cc1]
RM-89
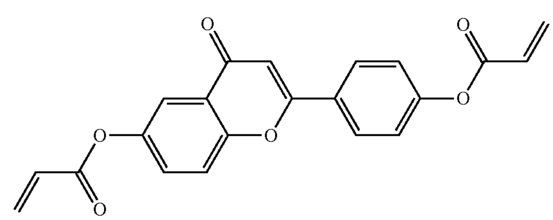 [SMILES: C=CC(=O)Oc1ccc(-c2cc(=O)c3cc(OC(=O)C=C)ccc3o2)cc1]
RM-90
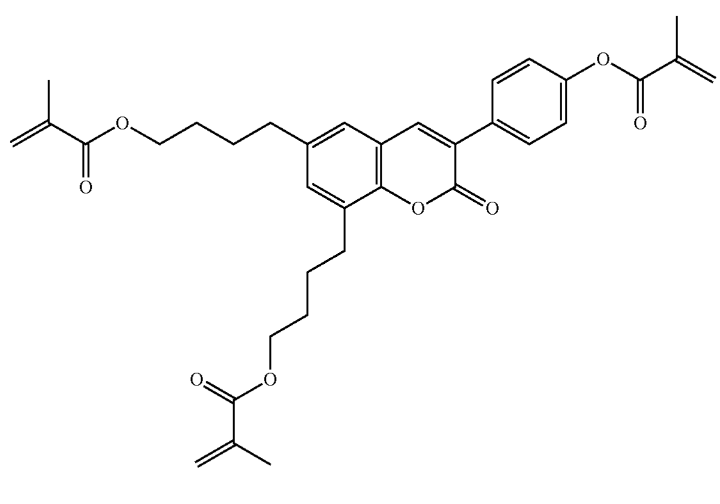 [SMILES: C=C(C)C(=O)OCCCCc1cc(CCCCOC(=O)C(=C)C)c2oc(=O)c(-c3ccc(OC(=O)C(=C)C)cc3)cc2c1]

TABLE D-continued
RM-91
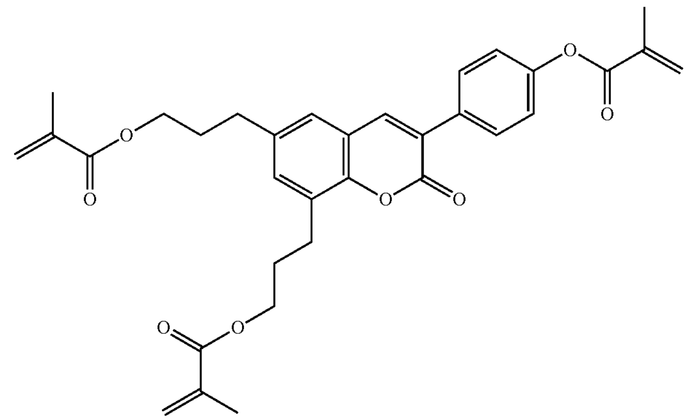 [SMILES: C=C(C)C(=O)OCCCc1cc(CCCOC(=O)C(=C)C)c2oc(=O)c(-c3ccc(OC(=O)C(=C)C)cc3)cc2c1]
RM-92
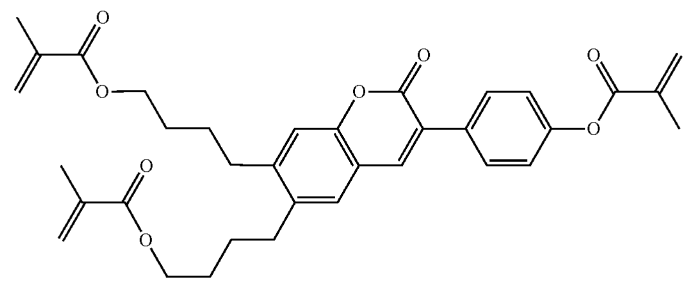 [SMILES: C=C(C)C(=O)OCCCCc1cc2cc(-c3ccc(OC(=O)C(=C)C)cc3)c(=O)oc2cc1CCCCOC(=O)C(=C)C]
RM-93
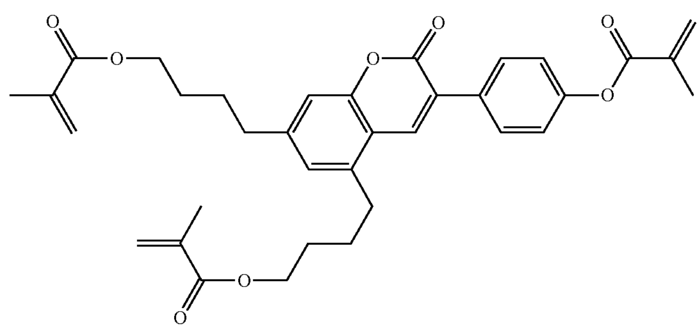 [SMILES: C=C(C)C(=O)OCCCCc1cc(CCCCOC(=O)C(=C)C)c2cc(-c3ccc(OC(=O)C(=C)C)cc3)c(=O)oc2c1]
RM-94
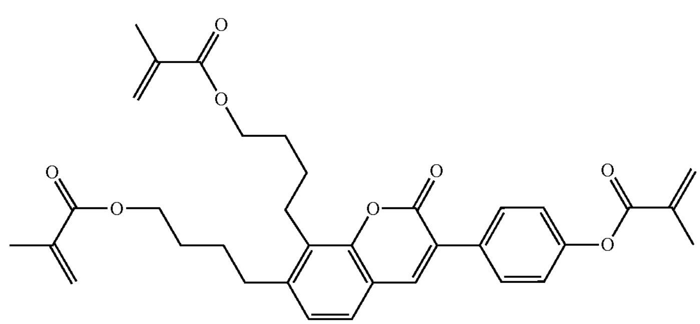 [SMILES: C=C(C)C(=O)OCCCCc1ccc2cc(-c3ccc(OC(=O)C(=C)C)cc3)c(=O)oc2c1CCCCOC(=O)C(=C)C]
RM-95
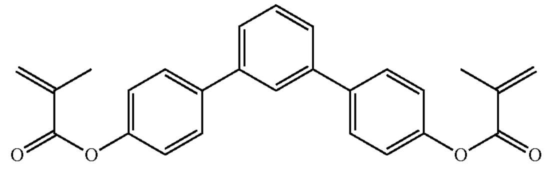 [SMILES: C=C(C)C(=O)Oc1ccc(-c2cccc(-c3ccc(OC(=O)C(=C)C)cc3)c2)cc1]

TABLE D-continued
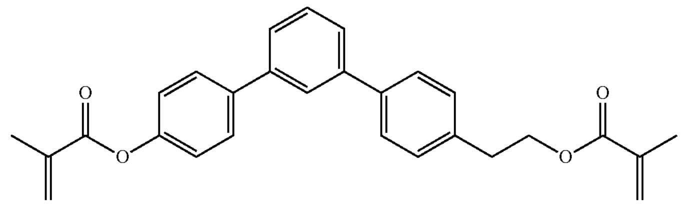 [SMILES: C=C(C)C(=O)OCCc1ccc(-c2cccc(-c3ccc(OC(=O)C(=C)C)cc3)c2)cc1]
RM-96
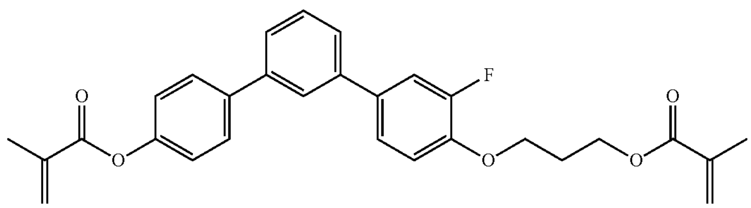 [SMILES: C=C(C)C(=O)OCCCOc1ccc(-c2cccc(-c3ccc(OC(=O)C(=C)C)cc3)c2)cc1F]
RM-97
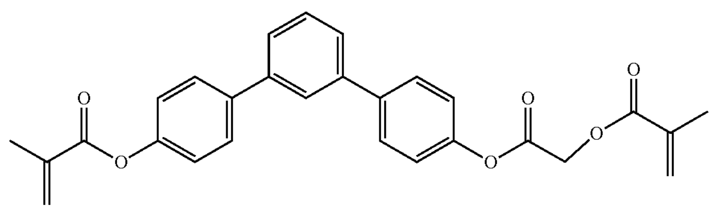 [SMILES: C=C(C)C(=O)OCC(=O)Oc1ccc(-c2cccc(-c3ccc(OC(=O)C(=C)C)cc3)c2)cc1]
RM-98
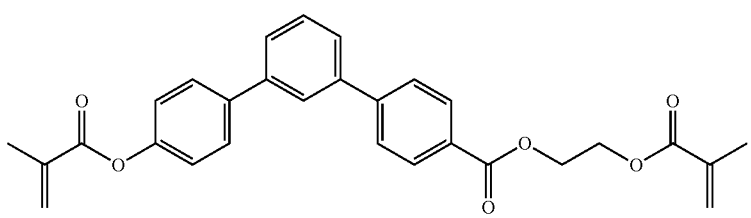 [SMILES: C=C(C)C(=O)OCCOC(=O)c1ccc(-c2cccc(-c3ccc(OC(=O)C(=C)C)cc3)c2)cc1]
RM-99
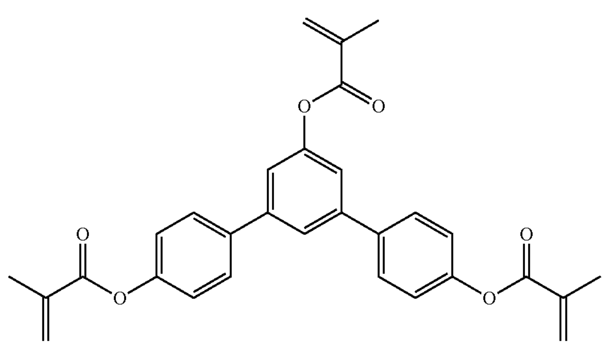 [SMILES: C=C(C)C(=O)Oc1ccc(-c2cc(OC(=O)C(=C)C)cc(-c3ccc(OC(=O)C(=C)C)cc3)c2)cc1]
RM-100
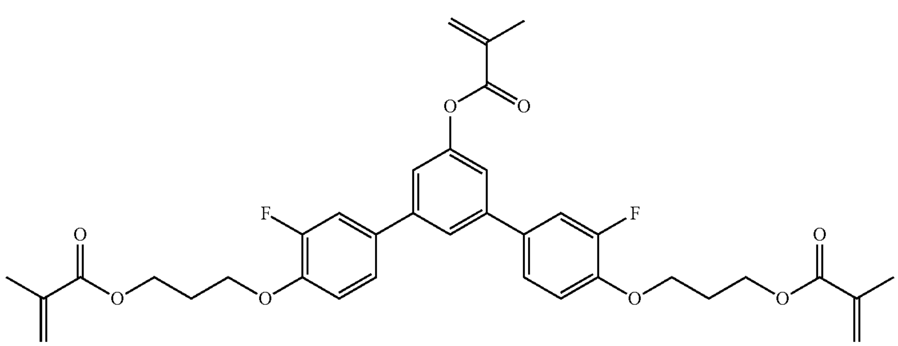 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-101

TABLE D-continued
RM-102
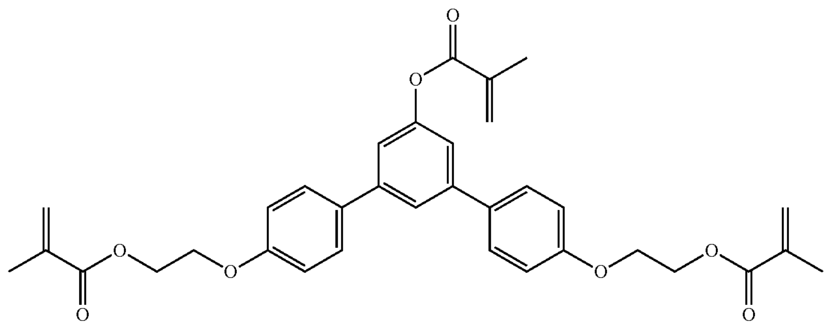 [SMILES: C=C(C)C(=O)OCCOc1ccc(-c2cc(OC(=O)C(=C)C)cc(-c3ccc(OCCOC(=O)C(=C)C)cc3)c2)cc1]
RM-103
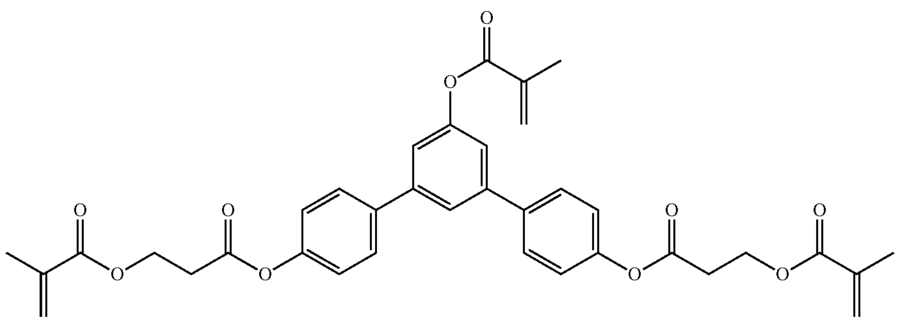 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-104
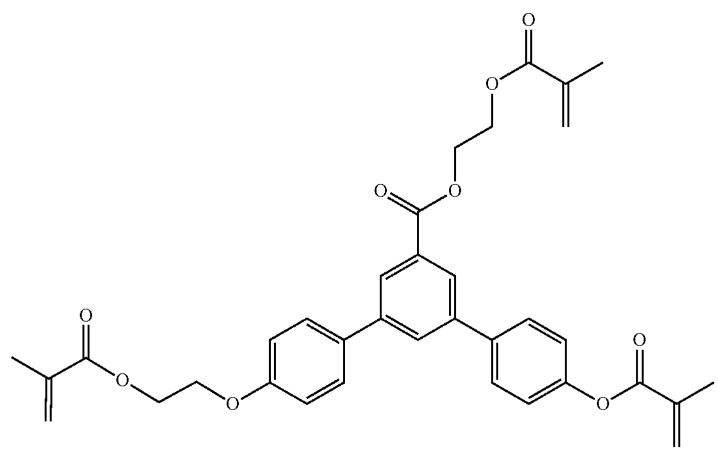 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-105
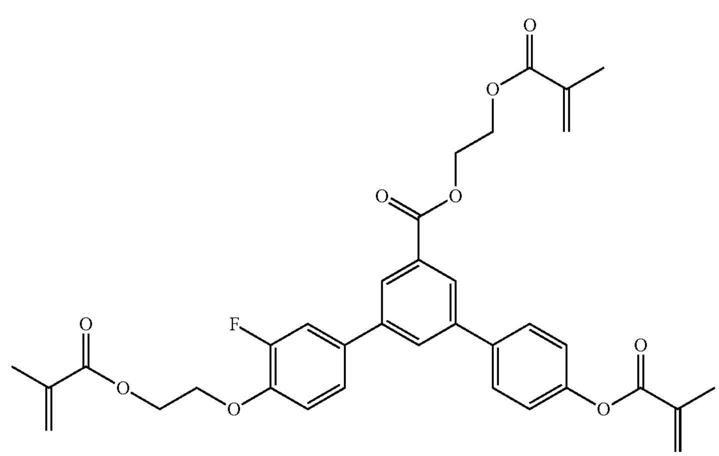 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]

TABLE D-continued
RM-106
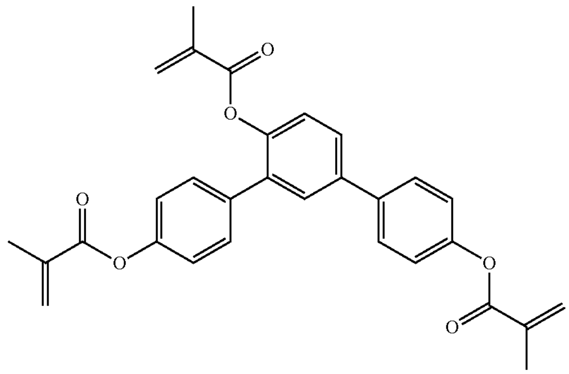 [SMILES: C=C(C)C(=O)Oc1ccc(-c2ccc(OC(=O)C(=C)C)c(-c3ccc(OC(=O)C(=C)C)cc3)c2)cc1]
RM-107
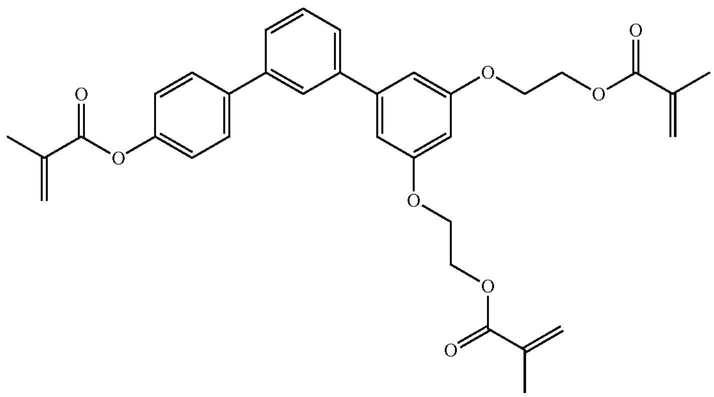 [SMILES: C=C(C)C(=O)OCCOc1cc(OCCOC(=O)C(=C)C)cc(-c2cccc(-c3ccc(OC(=O)C(=C)C)cc3)c2)c1]
RM-108
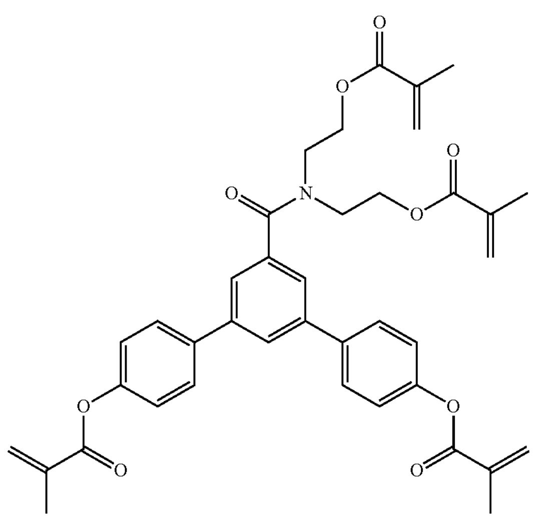 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-109
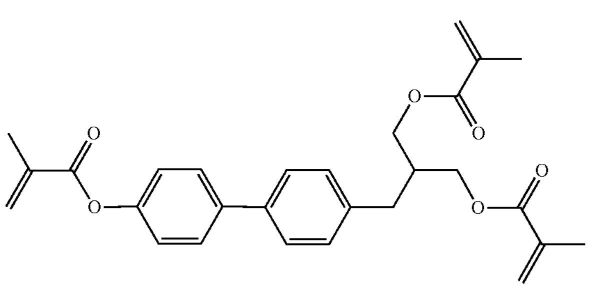 [SMILES: C=C(C)C(=O)OCC(COC(=O)C(=C)C)Cc1ccc(-c2ccc(OC(=O)C(=C)C)cc2)cc1]

TABLE D-continued
RM-110
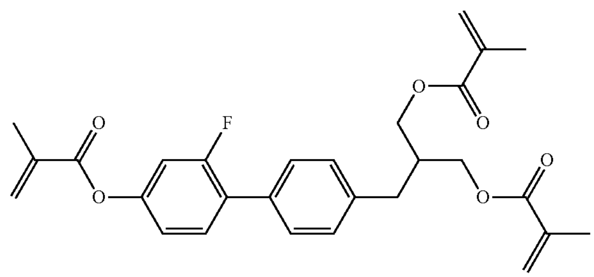 [SMILES: C=C(C)C(=O)OCC(COC(=O)C(=C)C)Cc1ccc(-c2ccc(OC(=O)C(=C)C)cc2F)cc1]
RM-111
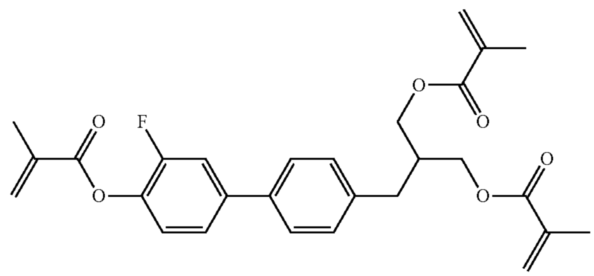 [SMILES: C=C(C)C(=O)OCC(COC(=O)C(=C)C)Cc1ccc(-c2ccc(OC(=O)C(=C)C)c(F)c2)cc1]
RM-112
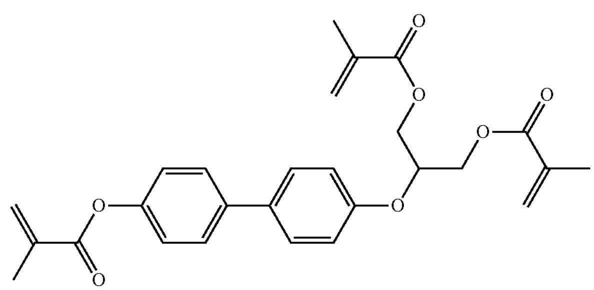 [SMILES: C=C(C)C(=O)OCC(COC(=O)C(=C)C)Oc1ccc(-c2ccc(OC(=O)C(=C)C)cc2)cc1]
RM-113
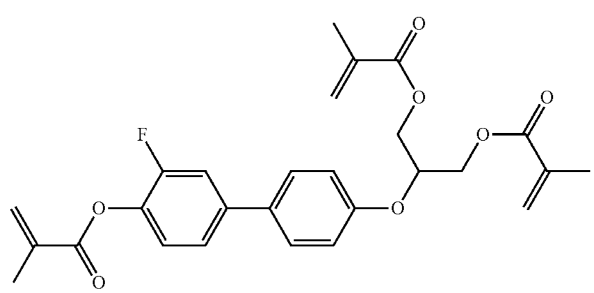 [SMILES: C=C(C)C(=O)OCC(COC(=O)C(=C)C)Oc1ccc(-c2ccc(OC(=O)C(=C)C)c(F)c2)cc1]
RM-114
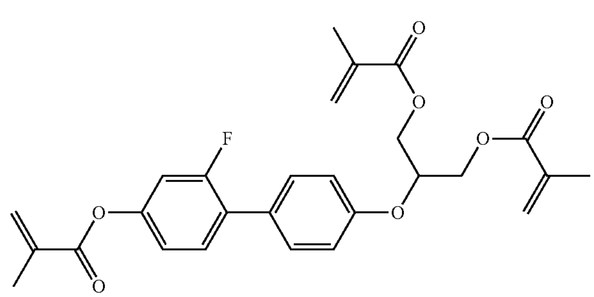 [SMILES: C=C(C)C(=O)OCC(COC(=O)C(=C)C)Oc1ccc(-c2ccc(OC(=O)C(=C)C)cc2F)cc1]

TABLE D-continued
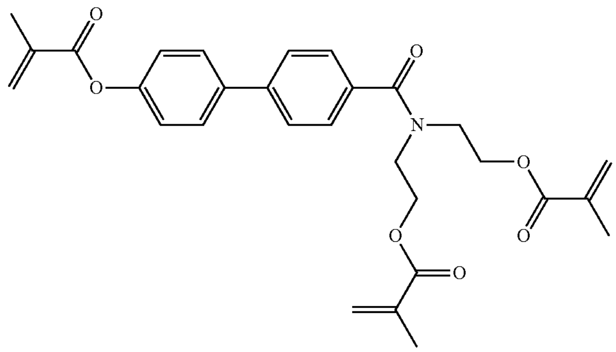 [SMILES: C=C(C)C(=O)OCCN(CCOC(=O)C(=C)C)C(=O)c1ccc(-c2ccc(OC(=O)C(=C)C)cc2)cc1]
RM-115
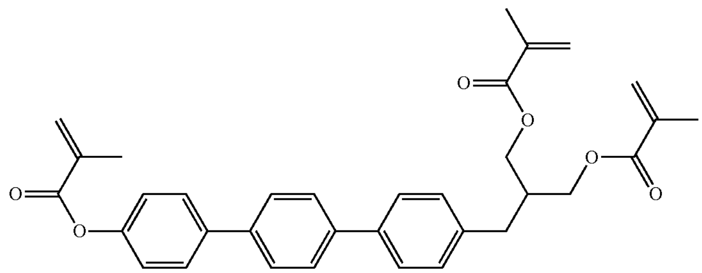 [SMILES: C=C(C)C(=O)OCC(COC(=O)C(=C)C)Cc1ccc(-c2ccc(-c3ccc(OC(=O)C(=C)C)cc3)cc2)cc1]
RM-116
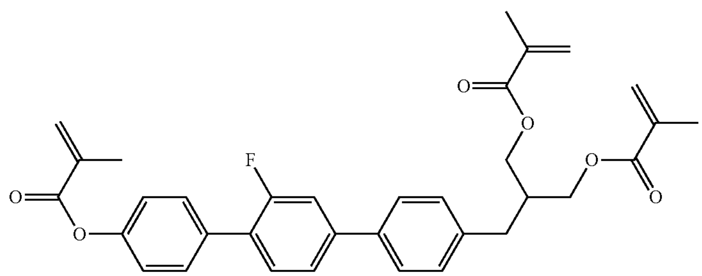 [SMILES: C=C(C)C(=O)OCC(COC(=O)C(=C)C)Cc1ccc(-c2ccc(-c3ccc(OC(=O)C(=C)C)cc3)c(F)c2)cc1]
RM-117
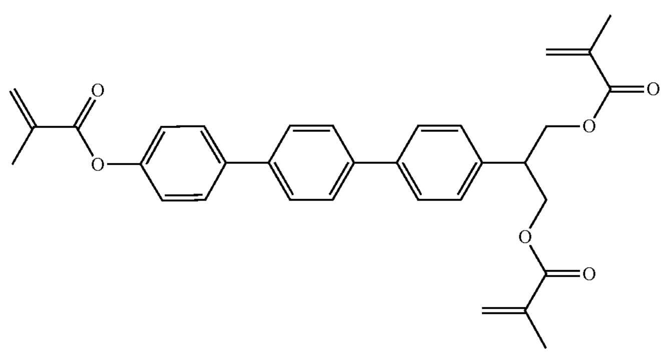
RM-118
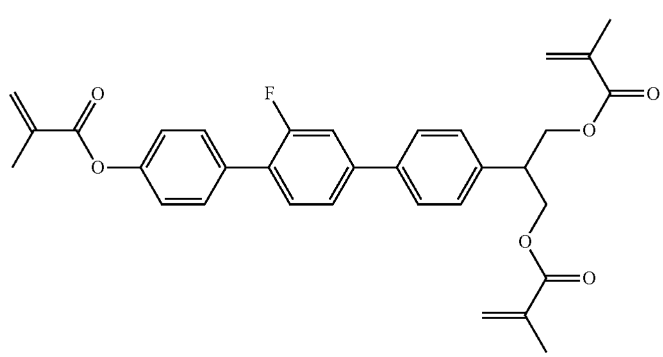 [SMILES: C=C(C)C(=O)OCC(COC(=O)C(=C)C)c1ccc(-c2ccc(-c3ccc(OC(=O)C(=C)C)cc3)c(F)c2)cc1]
RM-119

TABLE D-continued
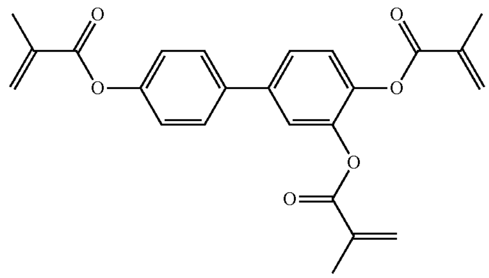 [SMILES: C=C(C)C(=O)Oc1ccc(-c2ccc(OC(=O)C(=C)C)c(OC(=O)C(=C)C)c2)cc1]
RM-120
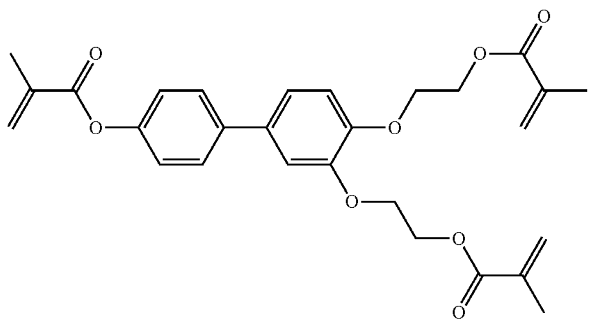 [SMILES: C=C(C)C(=O)OCCOc1ccc(-c2ccc(OC(=O)C(=C)C)cc2)cc1OCCOC(=O)C(=C)C]
RM-121
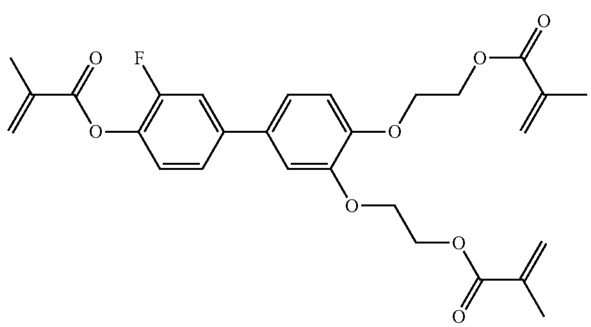 [SMILES: C=C(C)C(=O)OCCOc1ccc(-c2ccc(OC(=O)C(=C)C)c(F)c2)cc1OCCOC(=O)C(=C)C]
RM-122
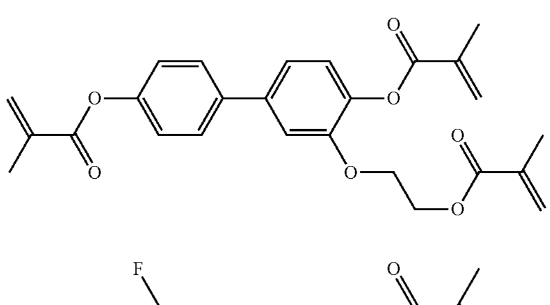
RM-123
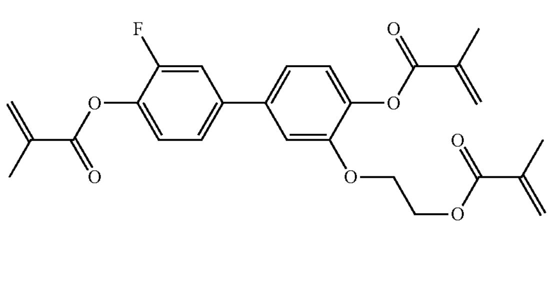 [SMILES: C=C(C)C(=O)OCCOc1cc(-c2ccc(OC(=O)C(=C)C)cc2)ccc1OC(=O)C(=C)C]
RM-124

TABLE D-continued
RM-125
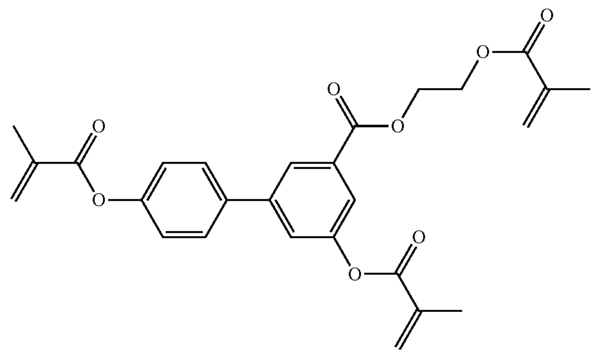 [SMILES: C=C(C)C(=O)OCCOC(=O)c1cc(OC(=O)C(=C)C)cc(-c2ccc(OC(=O)C(=C)C)cc2)c1]
RM-126
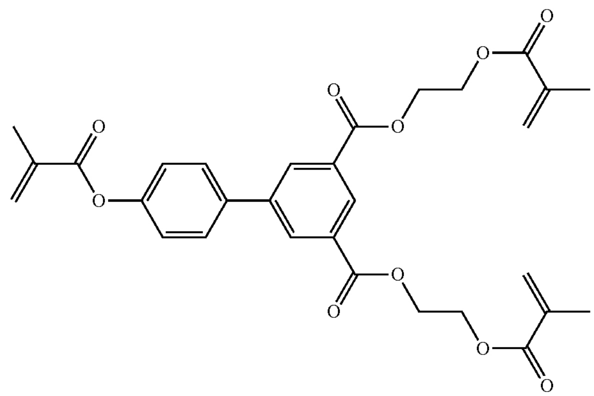 [SMILES: C=C(C)C(=O)OCCOC(=O)c1cc(C(=O)OCCOC(=O)C(=C)C)cc(-c2ccc(OC(=O)C(=C)C)cc2)c1]
RM-127
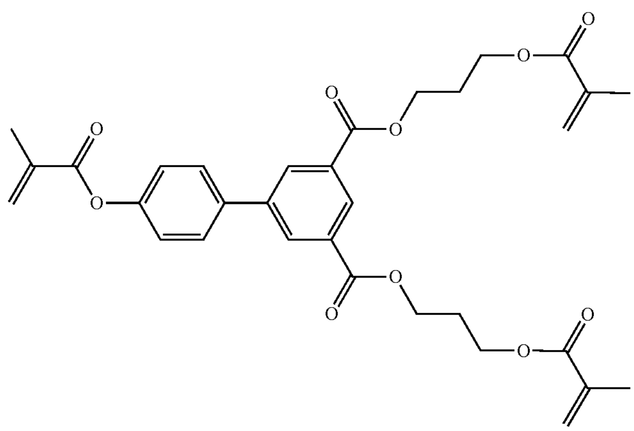 [SMILES: C=C(C)C(=O)OCCCOC(=O)c1cc(C(=O)OCCCOC(=O)C(=C)C)cc(-c2ccc(OC(=O)C(=C)C)cc2)c1]
RM-128
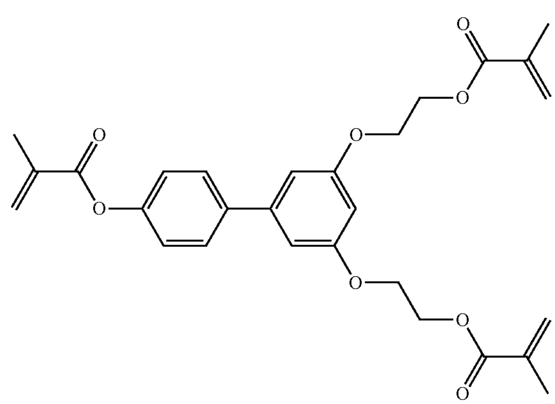 [SMILES: C=C(C)C(=O)OCCOc1cc(OCCOC(=O)C(=C)C)cc(-c2ccc(OC(=O)C(=C)C)cc2)c1]

TABLE D-continued
RM-129
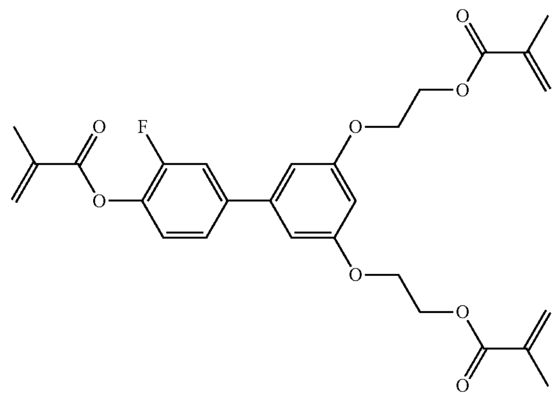 [SMILES: C=C(C)C(=O)OCCOc1cc(OCCOC(=O)C(=C)C)cc(-c2ccc(OC(=O)C(=C)C)c(F)c2)c1]
RM-130
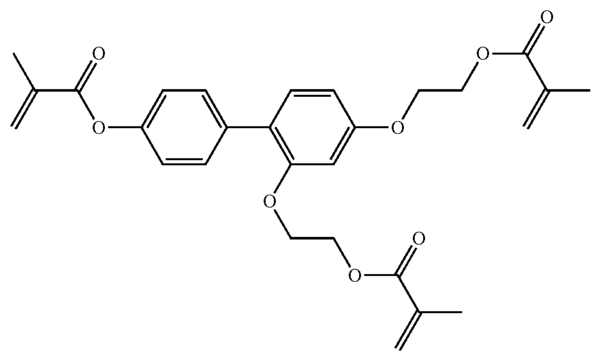 [SMILES: C=C(C)C(=O)OCCOc1ccc(-c2ccc(OC(=O)C(=C)C)cc2)c(OCCOC(=O)C(=C)C)c1]
RM-131
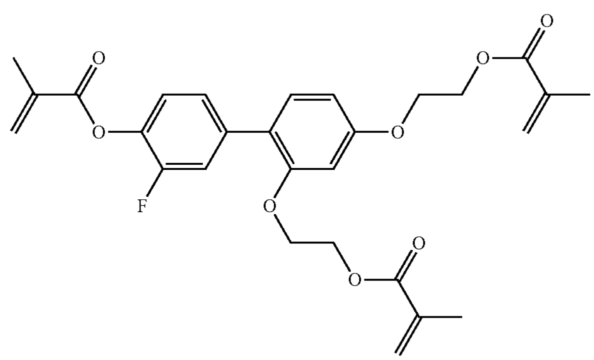 [SMILES: C=C(C)C(=O)OCCOc1ccc(-c2ccc(OC(=O)C(=C)C)c(F)c2)c(OCCOC(=O)C(=C)C)c1]
RM-132
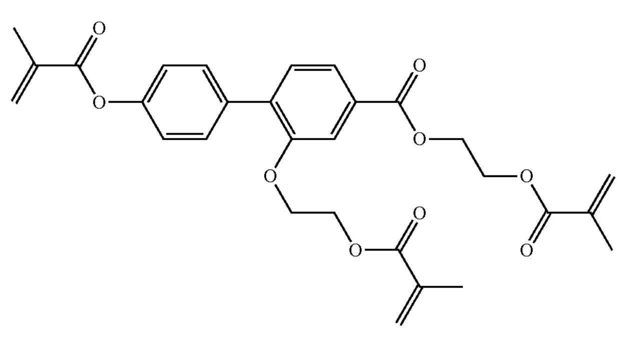 [SMILES: C=C(C)C(=O)OCCOC(=O)c1ccc(-c2ccc(OC(=O)C(=C)C)cc2)c(OCCOC(=O)C(=C)C)c1]

TABLE D-continued
RM-133
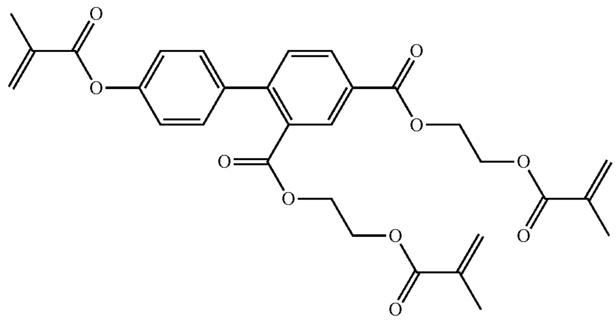 [SMILES: C=C(C)C(=O)OCCOC(=O)c1ccc(-c2ccc(OC(=O)C(=C)C)cc2)c(C(=O)OCCOC(=O)C(=C)C)c1]
RM-134
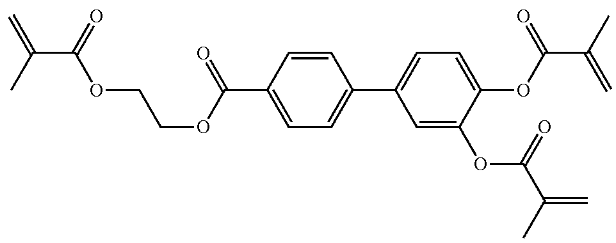 [SMILES: C=C(C)C(=O)OCCOC(=O)c1ccc(-c2ccc(OC(=O)C(=C)C)c(OC(=O)C(=C)C)c2)cc1]
RM-135
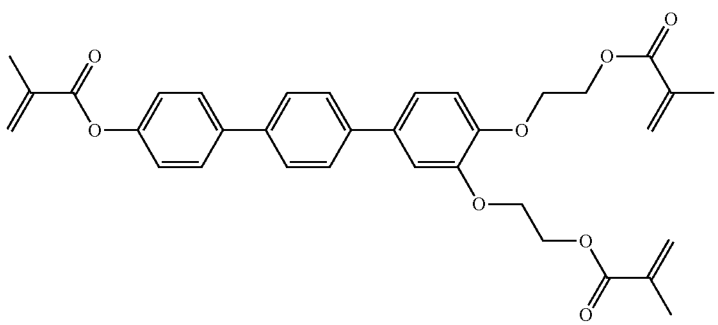 [SMILES: C=C(C)C(=O)OCCOc1ccc(-c2ccc(-c3ccc(OC(=O)C(=C)C)cc3)cc2)cc1OCCOC(=O)C(=C)C]
RM-136
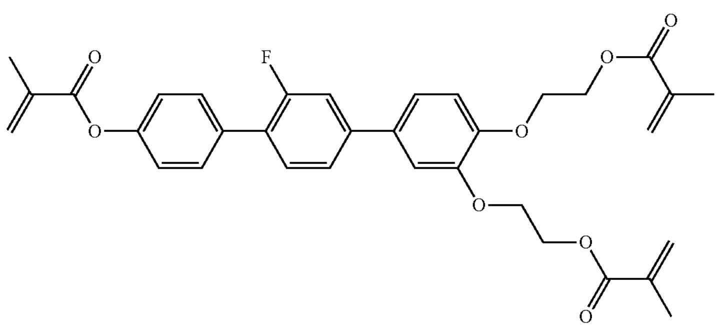 [SMILES: C=C(C)C(=O)OCCOc1ccc(-c2ccc(-c3ccc(OC(=O)C(=C)C)cc3)c(F)c2)cc1OCCOC(=O)C(=C)C]
RM-137
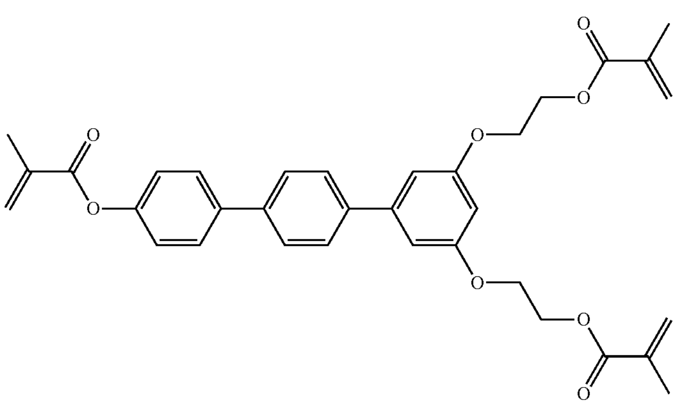 [SMILES: C=C(C)C(=O)OCCOc1cc(OCCOC(=O)C(=C)C)cc(-c2ccc(-c3ccc(OC(=O)C(=C)C)cc3)cc2)c1]

TABLE D-continued
RM-138
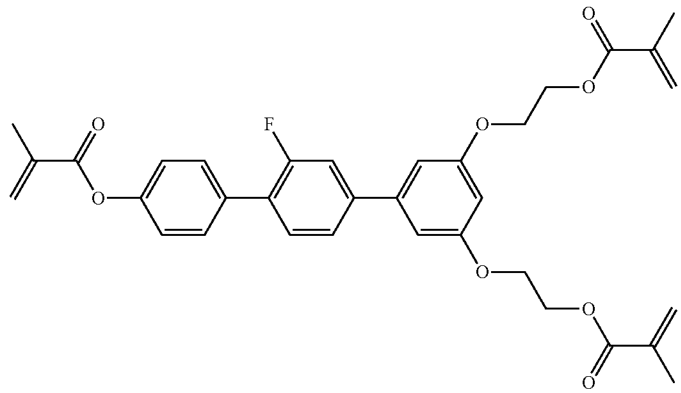 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-139
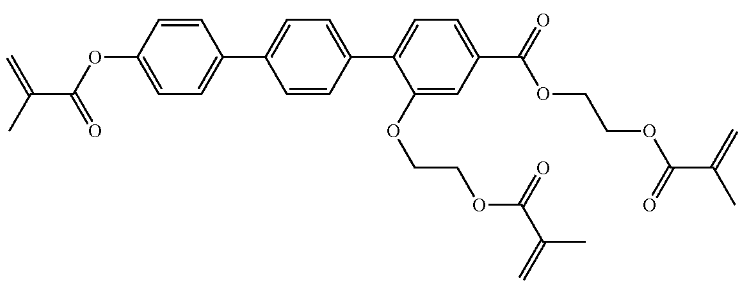 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-140
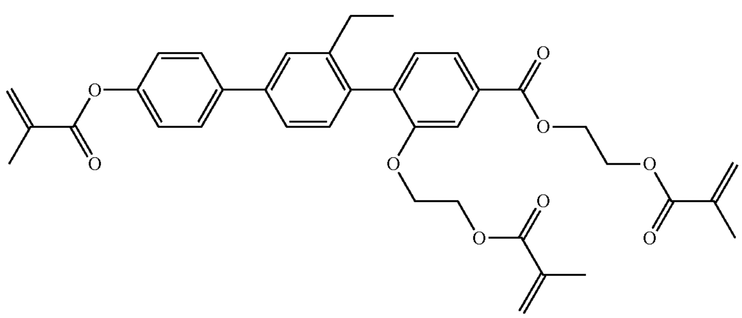 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-141
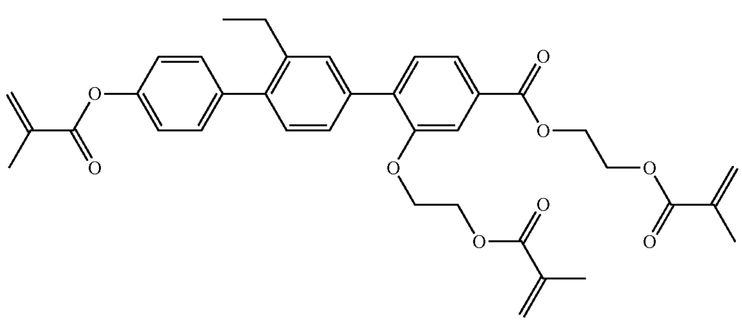 [SMILES: C=C(C)C(=O)OCCOC(=O)c1ccc(-c2ccc(-c3ccc(OC(=O)C(=C)C)cc3)c(CC)c2)c(OCCOC(=O)C(=C)C)c1]
RM-142
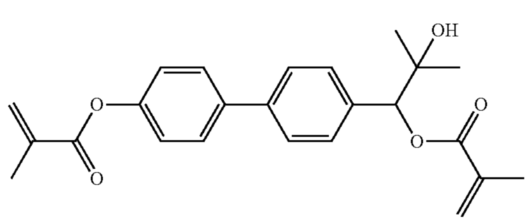

TABLE D-continued

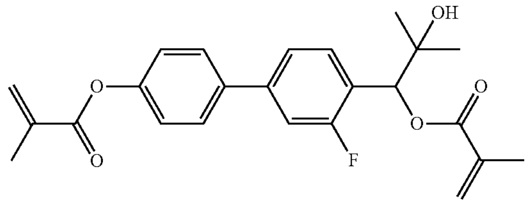 [SMILES: C=C(C)C(=O)Oc1ccc(-c2ccc(C(OC(=O)C(=C)C)C(C)(C)O)c(F)c2)cc1]
RM-143

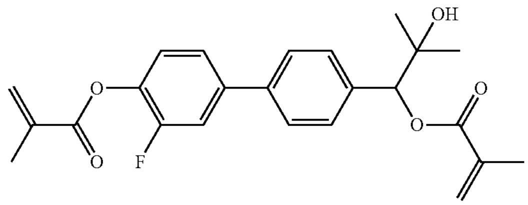 [SMILES: C=C(C)C(=O)Oc1ccc(-c2ccc(C(OC(=O)C(=C)C)C(C)(C)O)cc2)cc1F]
RM-144

Table D shows illustrative reactive mesogenic compounds which can be used in the LC media in accordance with the present invention.

In a preferred embodiment, the mixtures according to the invention comprise one or more polymerisable compounds, preferably selected from the polymerisable compounds of the formulae RM-1 to RM-144. Of these, compounds RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121 and RM-122 are particularly preferred.

TABLE E

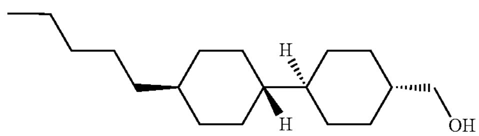 [SMILES: CCCCC[C@H]1CC[C@H]([C@H]2CC[C@H](CO)CC2)CC1]
SA-1

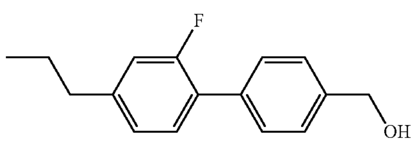 [SMILES: CCCc1ccc(-c2ccc(CO)cc2)c(F)c1]
SA-2

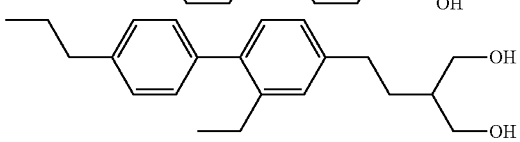
SA-3

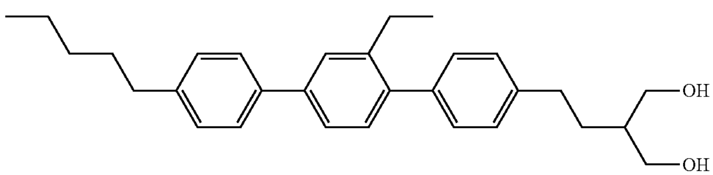 [SMILES: CCCCCc1ccc(-c2ccc(-c3ccc(CCC(CO)CO)cc3)c(CC)c2)cc1]
SA-4

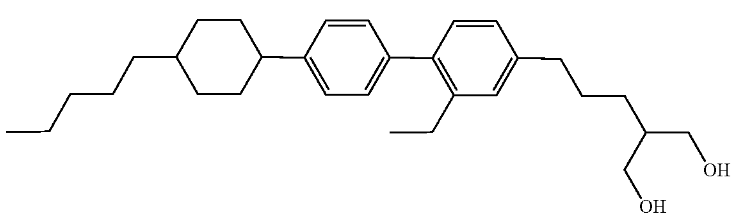 [SMILES: CCCCCC1CCC(c2ccc(-c3ccc(CCCC(CO)CO)cc3CC)cc2)CC1]
SA-5

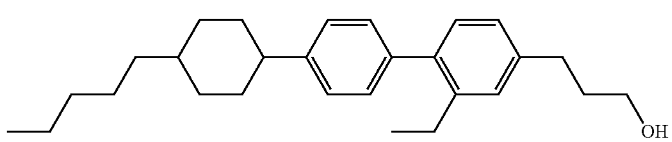 [SMILES: CCCCCC1CCC(c2ccc(-c3ccc(CCCO)cc3CC)cc2)CC1]
SA-6

TABLE E-continued
SA-7
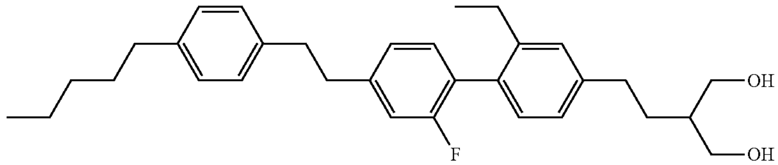 [SMILES: CCCCCc1ccc(CCc2ccc(-c3ccc(CCC(CO)CO)cc3CC)c(F)c2)cc1]
SA-8
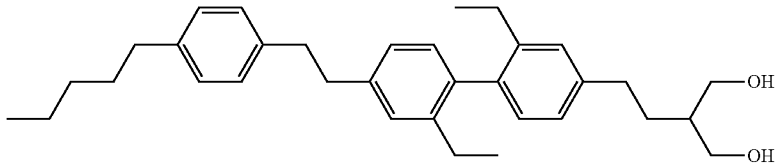 [SMILES: CCCCCc1ccc(CCc2ccc(-c3ccc(CCC(CO)CO)cc3CC)c(CC)c2)cc1]
SA-9
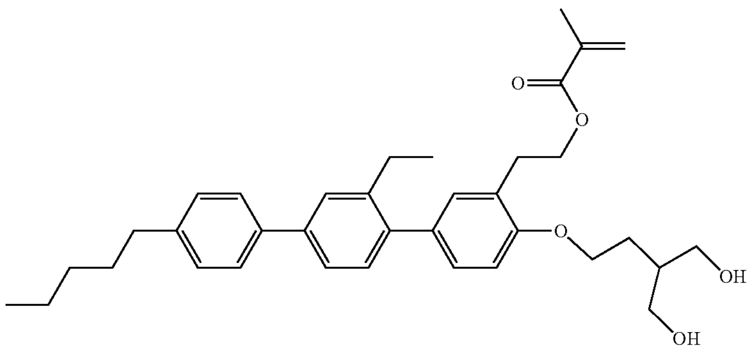 [SMILES: C=C(C)C(=O)OCCc1cc(-c2ccc(-c3ccc(CCCCC)cc3)cc2CC)ccc1OCCC(CO)CO]
SA-10
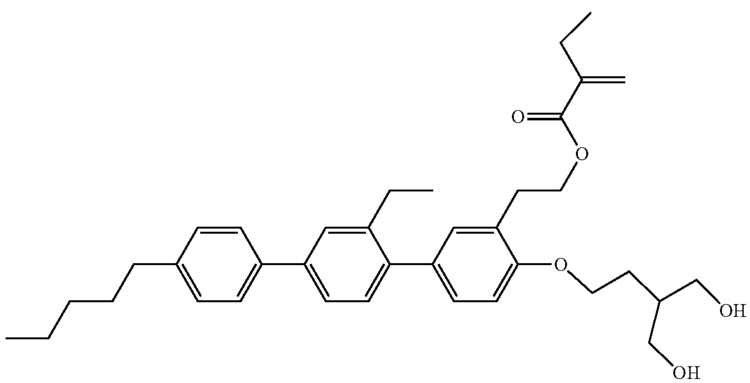 [SMILES: C=C(CC)C(=O)OCCc1cc(-c2ccc(-c3ccc(CCCCC)cc3)cc2CC)ccc1OCCC(CO)CO]
SA-11
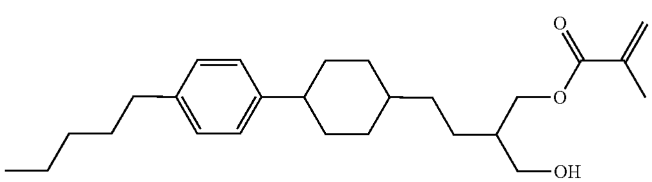 [SMILES: C=C(C)C(=O)OCC(CO)CCC1CCC(c2ccc(CCCCC)cc2)CC1]
SA-12
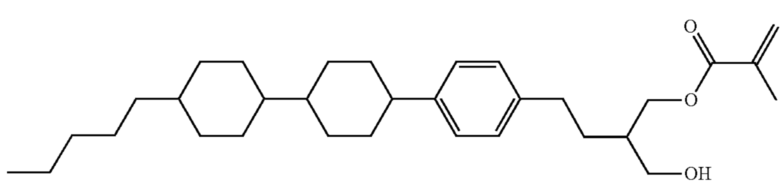 [SMILES: C=C(C)C(=O)OCC(CO)CCc1ccc(C2CCC(C3CCC(CCCCC)CC3)CC2)cc1]

TABLE E-continued
SA-13
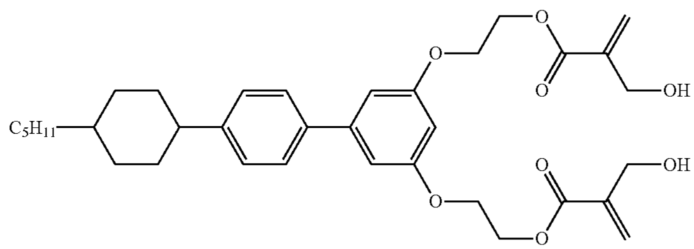
SA-14
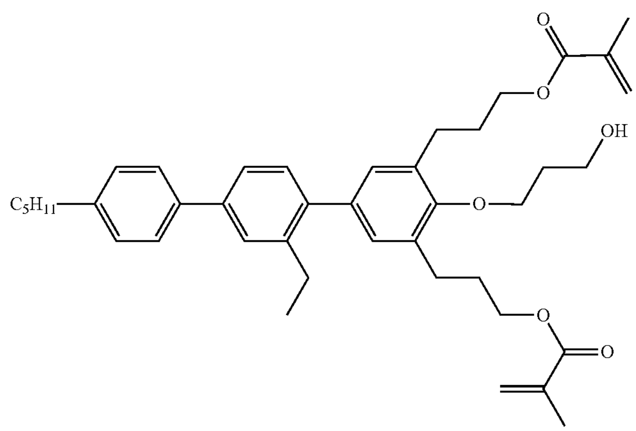
SA-15
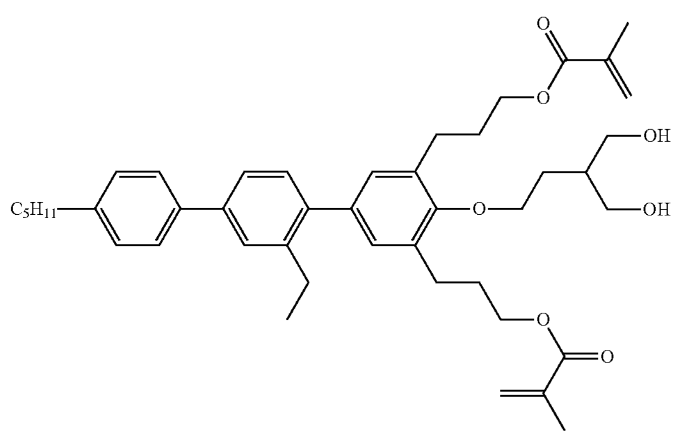
SA-16
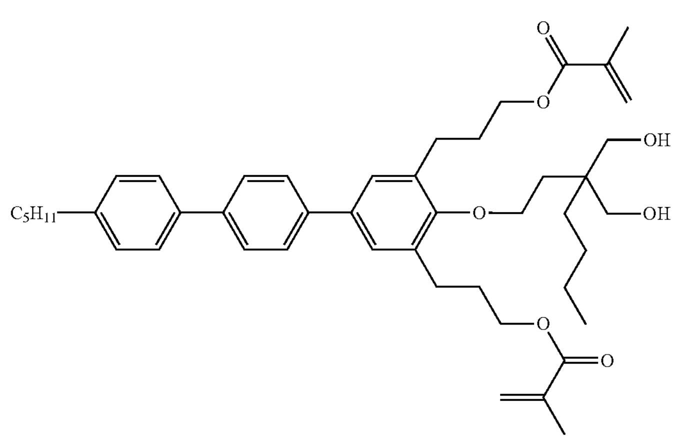

TABLE E-continued
SA-17
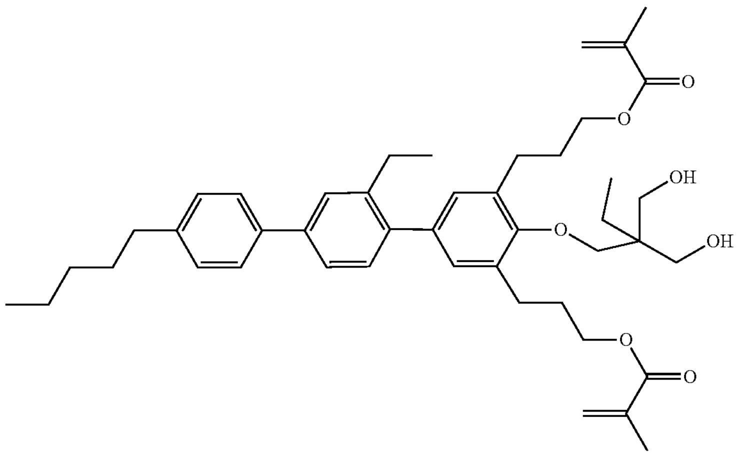 [SMILES: C=C(C)C(=O)OCCCc1cc(-c2ccc(-c3ccc(CCCCC)cc3)cc2CC)cc(CCCOC(=O)C(=C)C)c1OCC(CC)(CO)CO]
SA-18
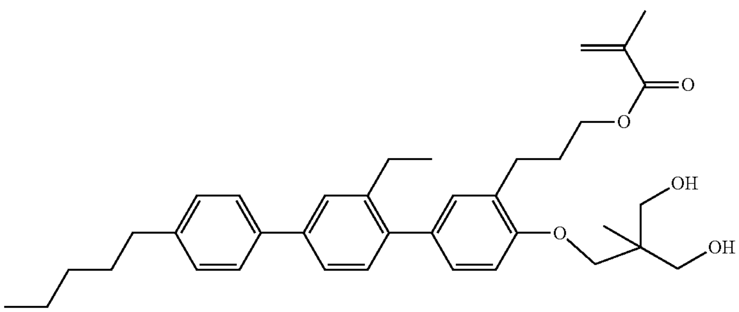 [SMILES: C=C(C)C(=O)OCCCc1cc(-c2ccc(-c3ccc(CCCCC)cc3)cc2CC)ccc1OCC(C)(CO)CO]
SA-19
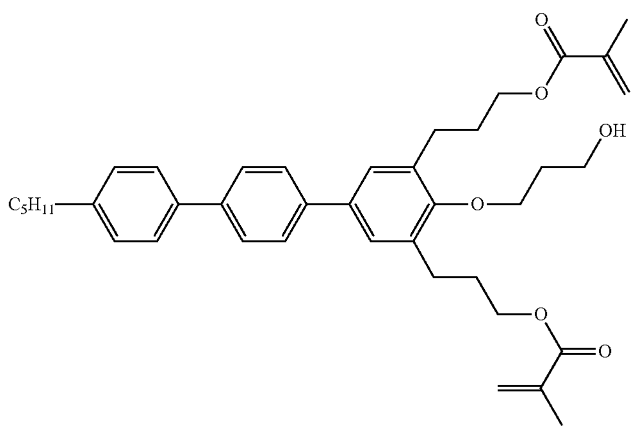
SA-20
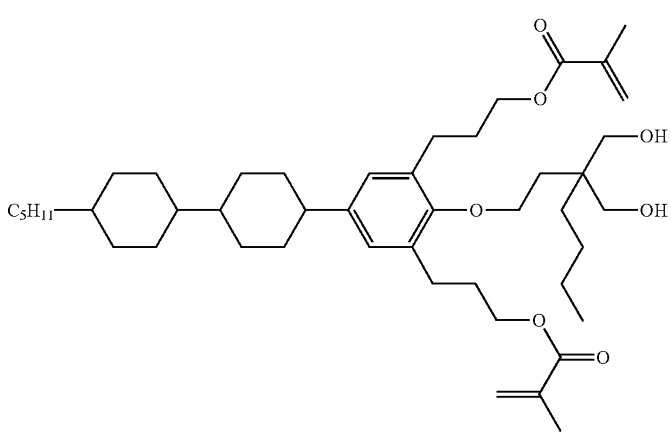

TABLE E-continued
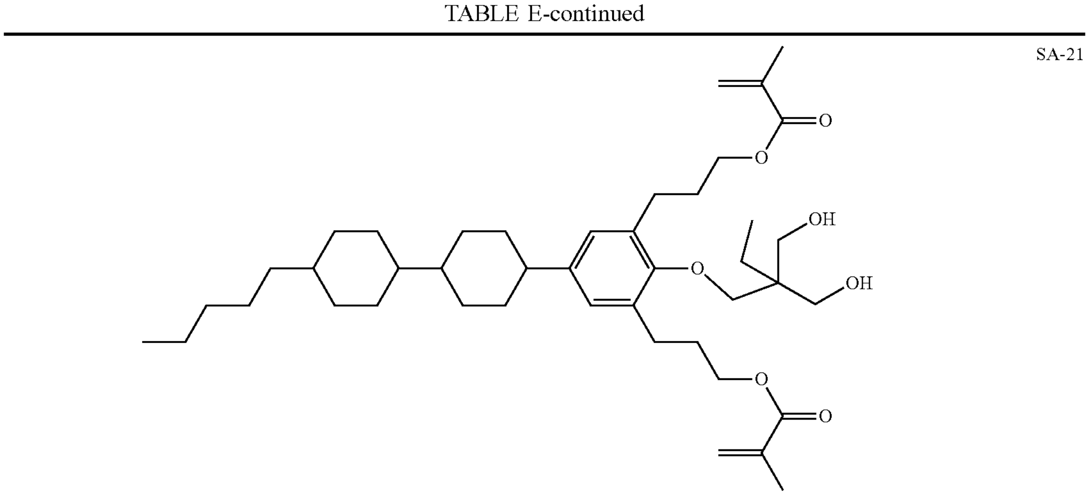
SA-21
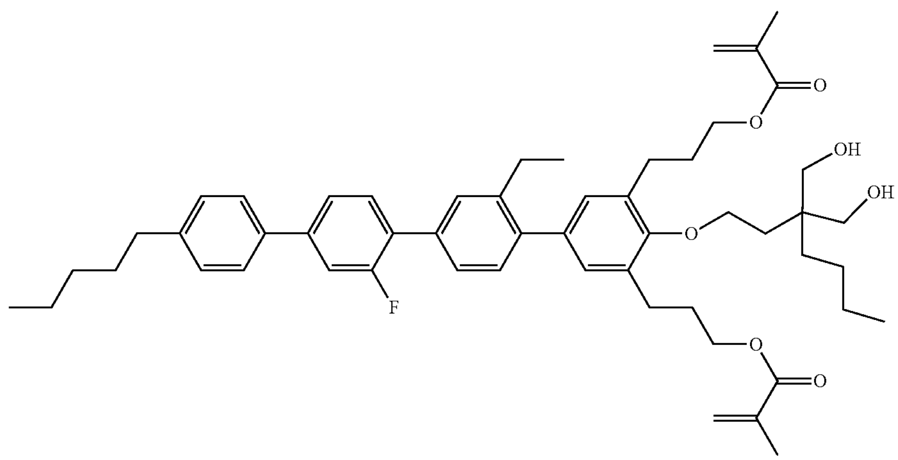 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC]
SA-22
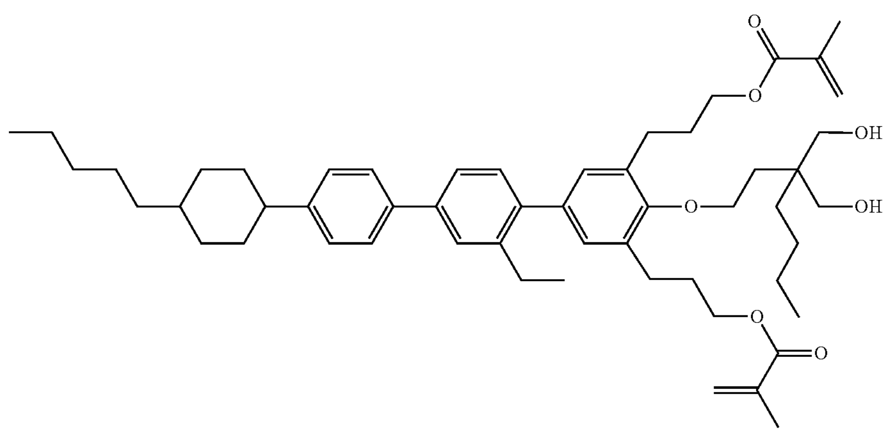 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCC]
SA-23

TABLE E-continued
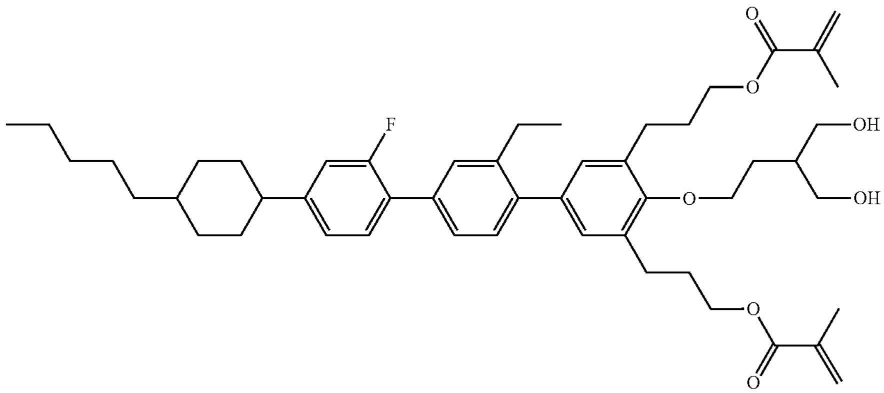 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO]
SA-24
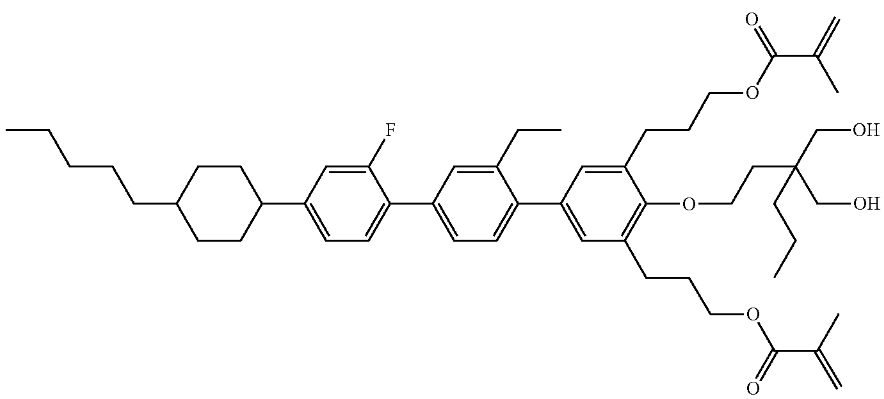 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCC]
SA-25
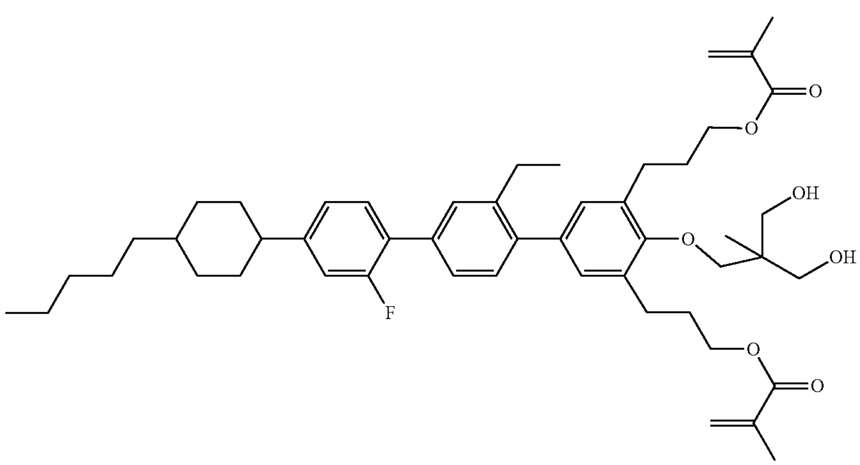 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(C)(CO)CO]
SA-26

TABLE E-continued
SA-27
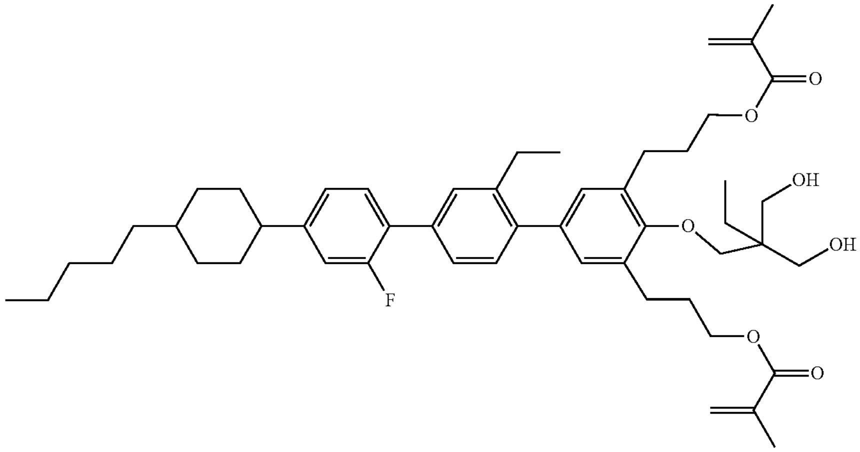 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(CC)(CO)CO]
SA-28
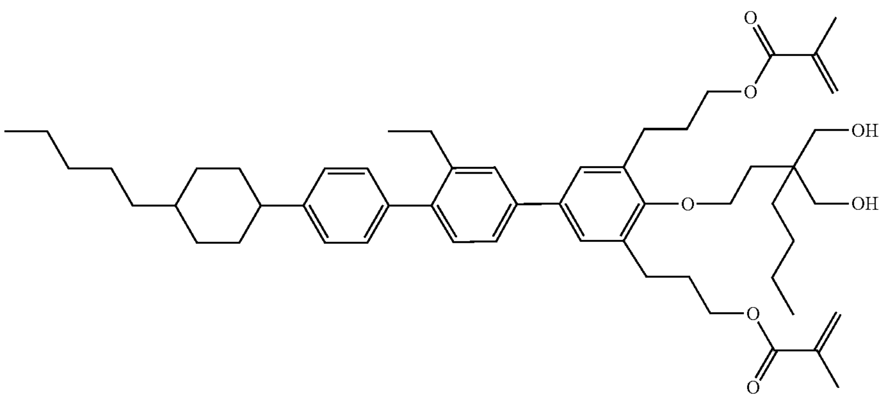 [SMILES: C=C(C)C(=O)OCCCc1cc(-c2ccc(-c3ccc(C4CCC(CCCCC)CC4)cc3)c(CC)c2)cc(CCCOC(=O)C(=C)C)c1OCCC(CO)(CO)CCCC]
SA-29
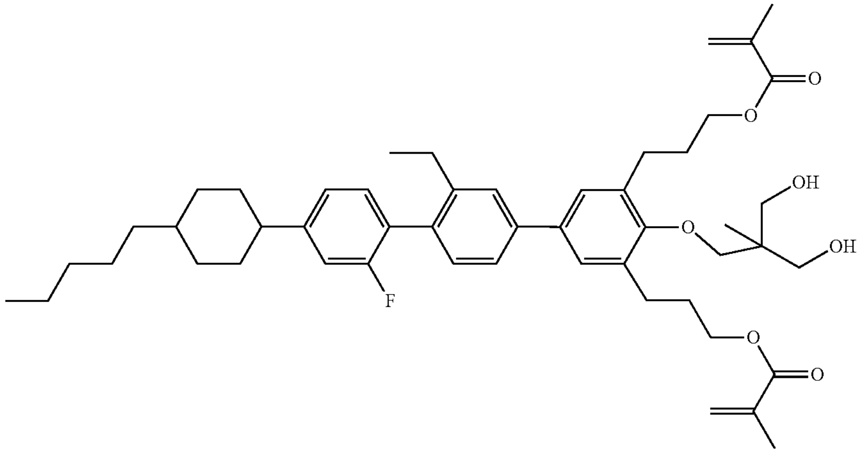 [SMILES: C=C(C)C(=O)OCCCc1cc(-c2ccc(-c3ccc(C4CCC(CCCCC)CC4)cc3F)c(CC)c2)cc(CCCOC(=O)C(=C)C)c1OCC(C)(CO)CO]

TABLE E-continued
SA-30
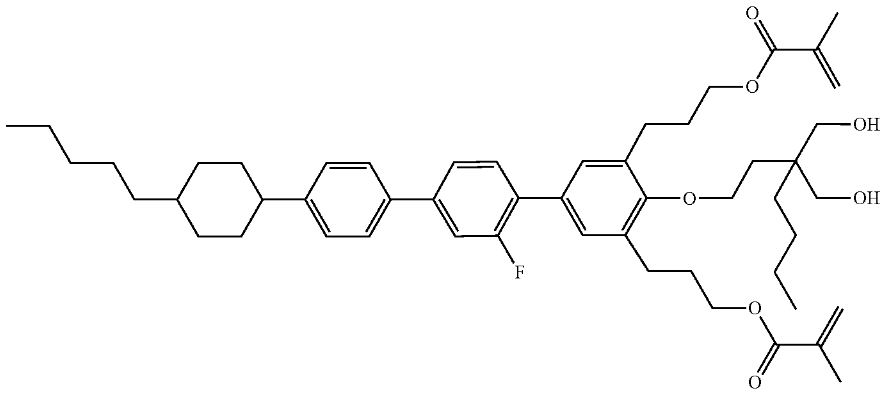 [SMILES: C=C(C)C(=O)OCCCc1cc(-c2ccc(-c3ccc(C4CCC(CCCCC)CC4)cc3)cc2F)cc(CCCOC(=O)C(=C)C)c1OCCC(CO)(CO)CCCC]
SA-31
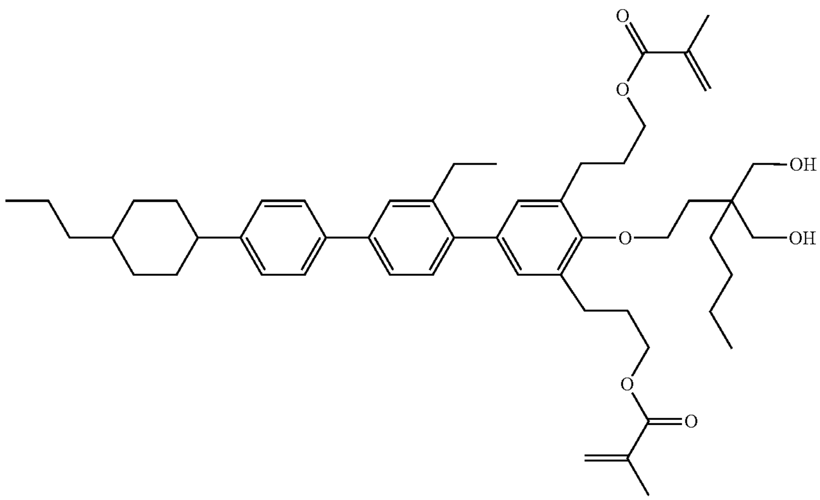 [SMILES: C=C(C)C(=O)OCCCc1cc(-c2ccc(-c3ccc(C4CCC(CCC)CC4)cc3)cc2CC)cc(CCCOC(=O)C(=C)C)c1OCCC(CO)(CO)CCCC]
SA-32
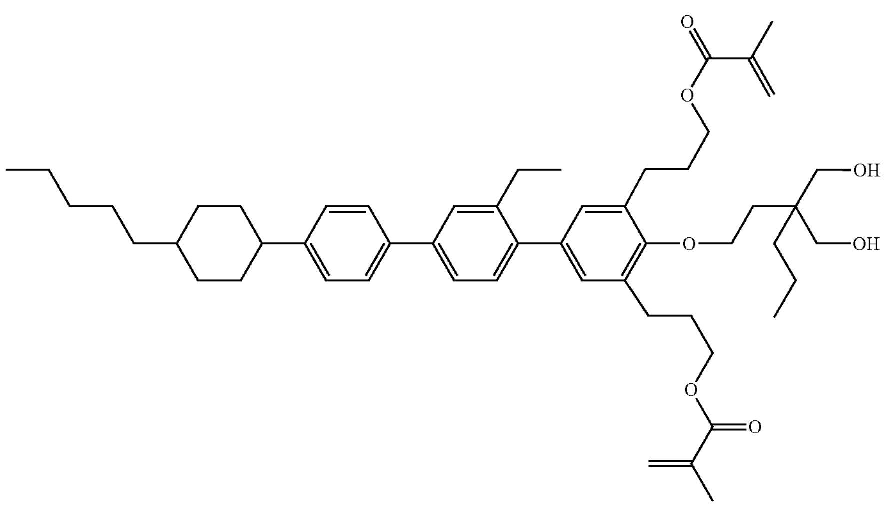 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCC]

TABLE E-continued
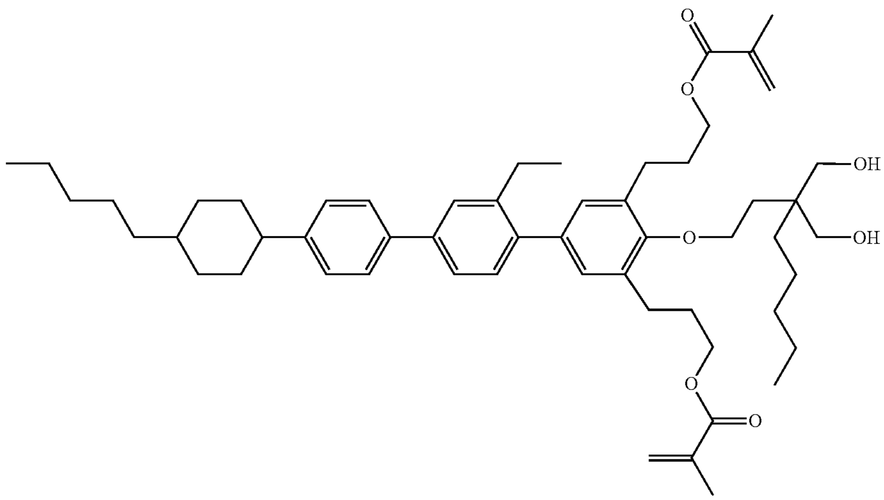 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCCC]
SA-33
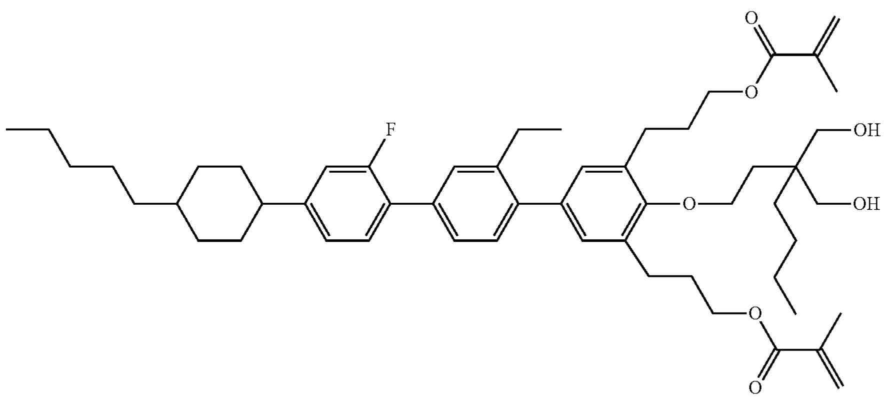 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCCC]
SA-34
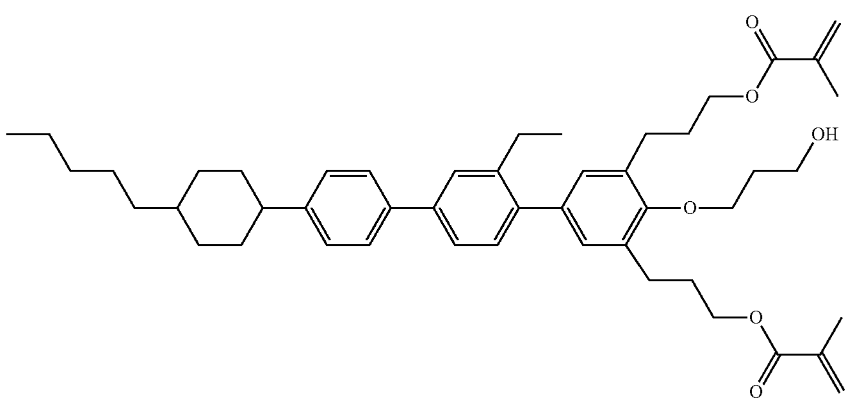 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCCO]
SA-35
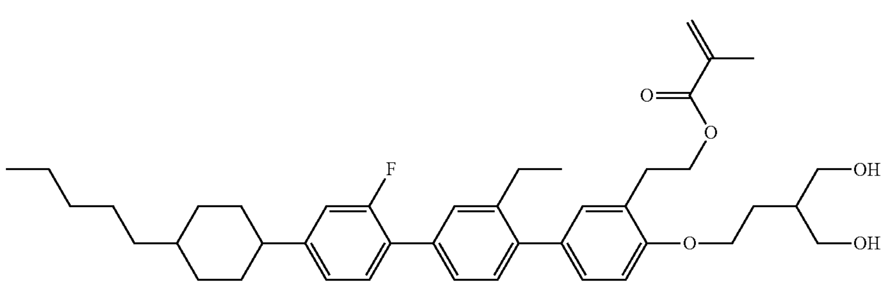 [SMILES: C=C(C)C(=O)OCCc1cc(-c2ccc(-c3ccc(C4CCC(CCCCC)CC4)cc3F)cc2CC)ccc1OCCC(CO)CO]
SA-36

TABLE E-continued
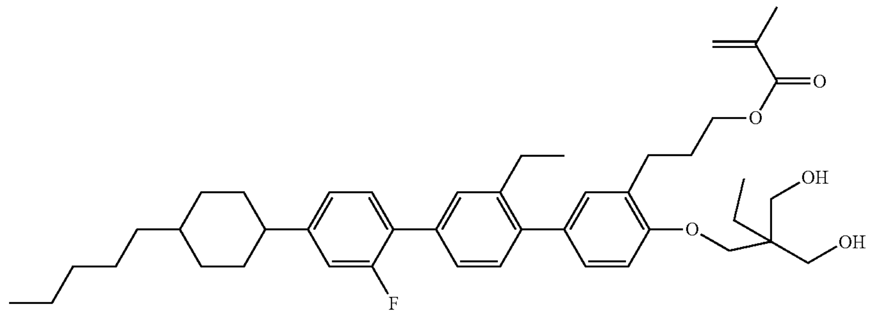 [SMILES: C=C(C)C(=O)OCCCc1cc(-c2ccc(-c3ccc(C4CCC(CCCCC)CC4)cc3F)cc2CC)ccc1OCC(CC)(CO)CO]
SA-37
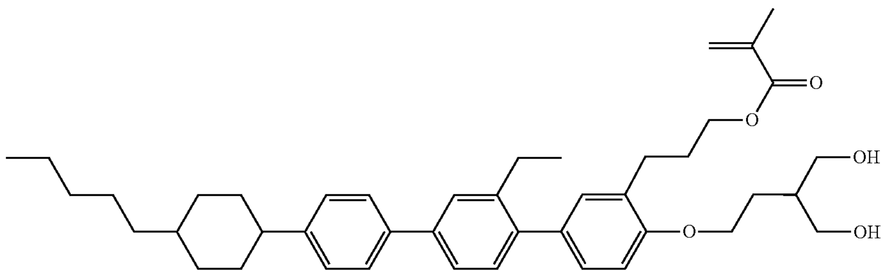 [SMILES: C=C(C)C(=O)OCCCc1cc(-c2ccc(-c3ccc(C4CCC(CCCCC)CC4)cc3)cc2CC)ccc1OCCC(CO)CO]
SA-38
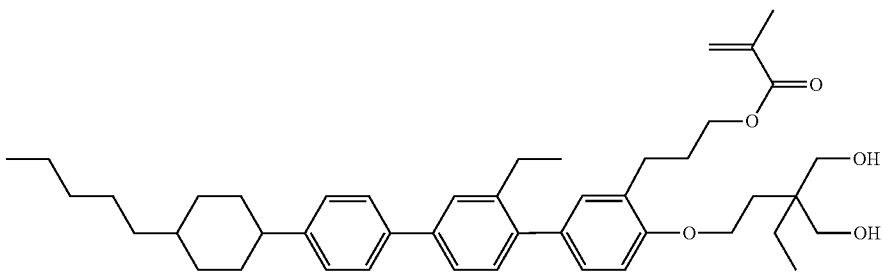 [SMILES: C=C(C)C(=O)OCCCc1cc(-c2ccc(-c3ccc(C4CCC(CCCCC)CC4)cc3)cc2CC)ccc1OCCC(CC)(CO)CO]
SA-39
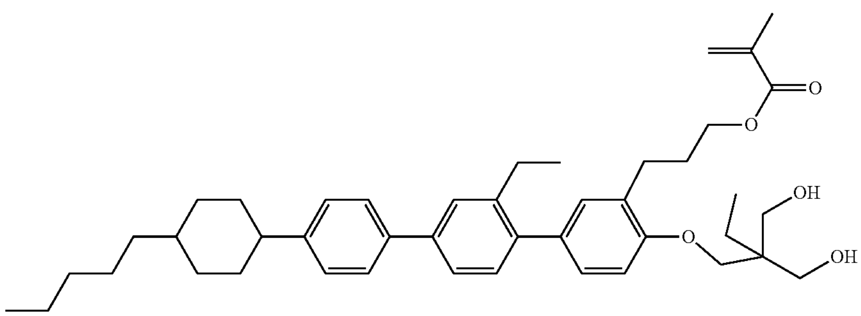 [SMILES: C=C(C)C(=O)OCCCc1cc(-c2ccc(-c3ccc(C4CCC(CCCCC)CC4)cc3)cc2CC)ccc1OCC(CC)(CO)CO]
SA-40
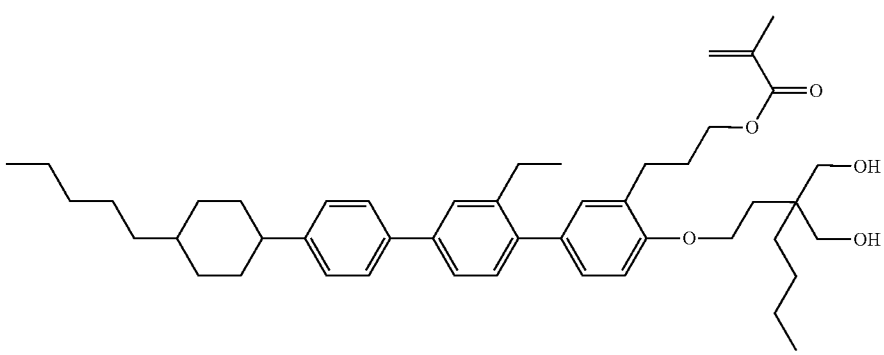 [SMILES: C=C(C)C(=O)OCCCc1cc(-c2ccc(-c3ccc(C4CCC(CCCCC)CC4)cc3)cc2CC)ccc1OCCC(CO)(CO)CCCC]
SA-41

TABLE E-continued
SA-42
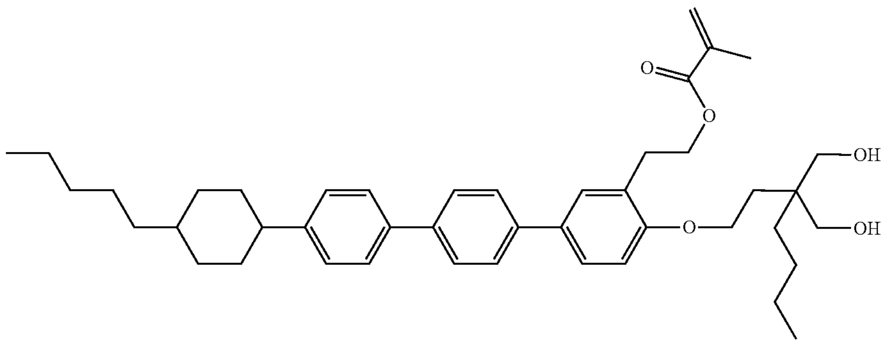 [SMILES: C=C(C)C(=O)OCCc1cc(-c2ccc(-c3ccc(C4CCC(CCCCC)CC4)cc3)cc2)ccc1OCCC(CO)(CO)CCCC]
SA-43
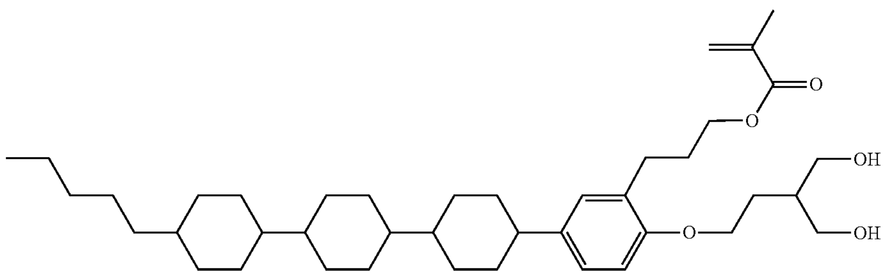 [SMILES: C=C(C)C(=O)OCCCc1cc(C2CCC(C3CCC(C4CCC(CCCCC)CC4)CC3)CC2)ccc1OCCC(CO)CO]
SA-44
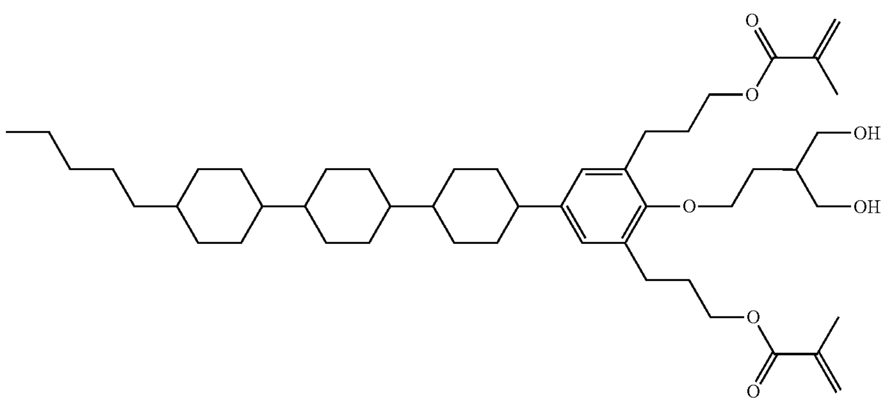 [SMILES: C=C(C)C(=O)OCCCc1cc(C2CCC(C3CCC(C4CCC(CCCCC)CC4)CC3)CC2)cc(CCCOC(=O)C(=C)C)c1OCCC(CO)CO]
SA-45
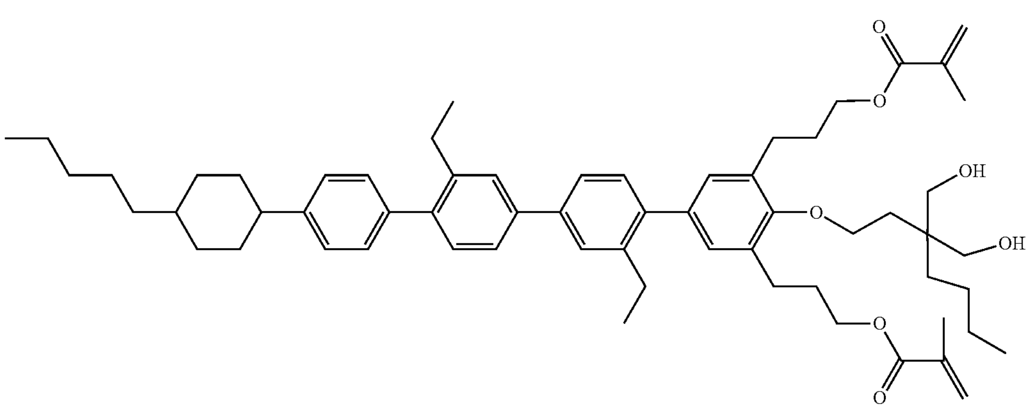 [SMILES: C=C(C)C(=O)OCCCc1cc(-c2ccc(-c3ccc(-c4ccc(C5CCC(CCCCC)CC5)cc4)c(CC)c3)cc2CC)cc(CCCOC(=O)C(=C)C)c1OCCC(CO)(CO)CCCC]

TABLE E-continued

SA-46

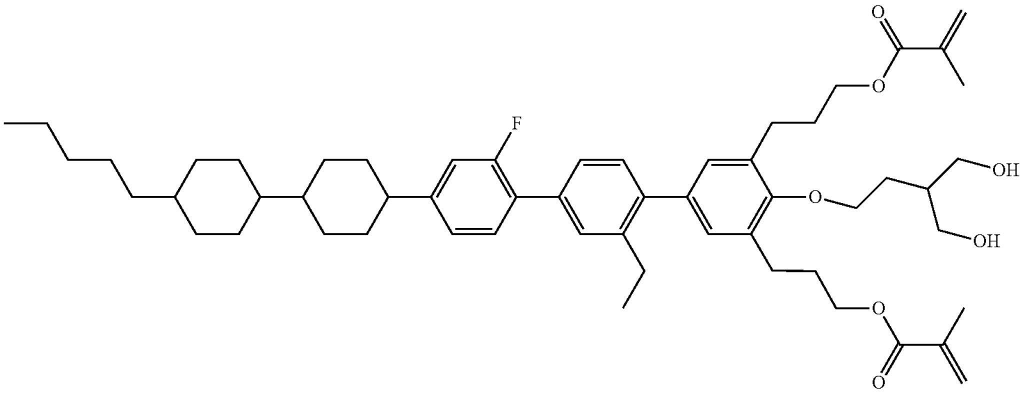 [SMILES: C=C(C)C(=O)OCCCc1cc(-c2ccc(-c3ccc(C4CCC(C5CCC(CCCCC)CC5)CC4)cc3F)cc2CC)cc(CCCOC(=O)C(=C)C)c1OCCC(CO)CO]

SA-47

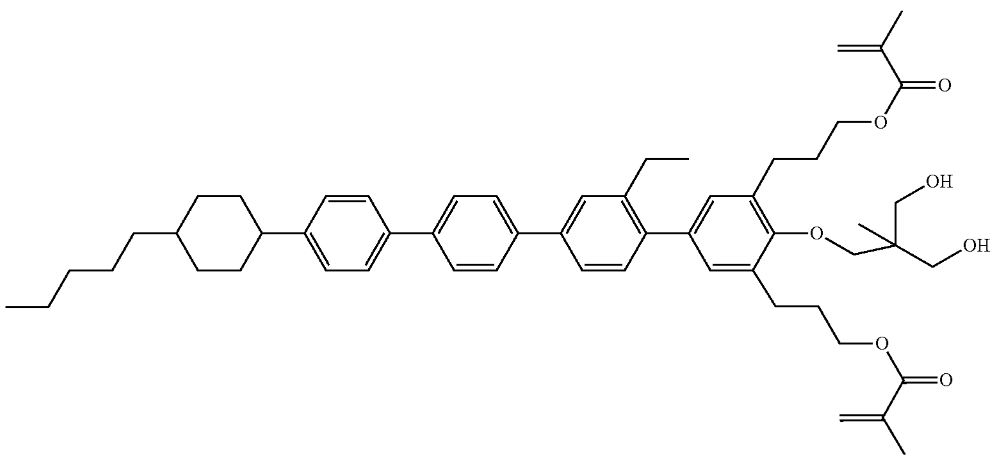 [SMILES: C=C(C)C(=O)OCCCc1cc(-c2ccc(-c3ccc(-c4ccc(C5CCC(CCCCC)CC5)cc4)cc3)cc2CC)cc(CCCOC(=O)C(=C)C)c1OCC(C)(CO)CO]

SA-48

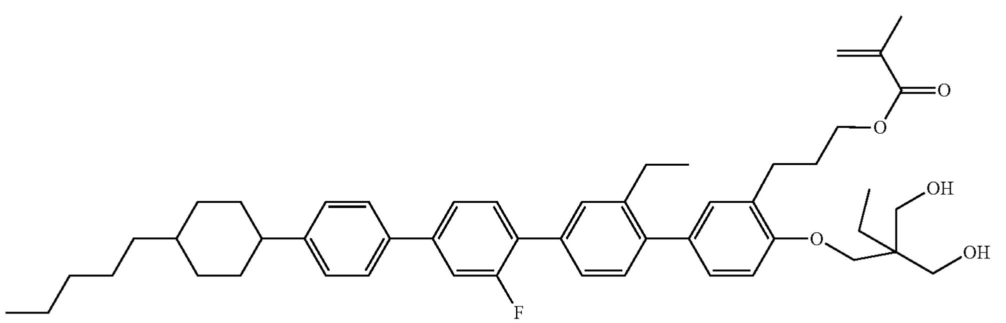 [SMILES: C=C(C)C(=O)OCCCc1cc(-c2ccc(-c3ccc(-c4ccc(C5CCC(CCCCC)CC5)cc4)cc3F)cc2CC)ccc1OCC(CC)(CO)CO]

Table E shows self-alignment additives for vertical alignment which can be used in LC media according to the present invention together with the polymerizable compounds of formula I:

In a preferred embodiment, the LC media and displays according to the present invention comprise one or more SA additives selected from formulae SA-1 to SA-48, preferably from formulae SA-14 to SA-48, very preferably from formulae SA-20 to SA-34 and SA-48 in combination with one or more RMs of formula I. Very preferred is a combination of polymerizable compound 1, 2 or 3 of Example 1 below, very preferably of polymerizable compound 3 of Example 1, with an SA additive selected from formula SA-20 to SA-34 and SA-44.

EXAMPLES

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
Δn optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
Δε dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denote melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δε at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast (Vio).

Unless stated otherwise, the process of polymerising the polymerisable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display used for measurement of the capacitive threshold voltage consists of two plane-parallel glass outer plates at a separation of 25 μm, each of which has on the inside an electrode layer and an unrubbed polyimide alignment layer on top, which effect a homeotropic edge alignment of the liquid crystal molecules.

The PSVA display or PSVA test cell used for measurement of the tilt angles consists of two plane-parallel glass outer plates at a separation of 4 μm unless stated otherwise, each of which has on the inside an electrode layer and a polyimide alignment layer on top, where the two polyimide layers are rubbed antiparallel to one another and effect a homeotropic edge alignment of the liquid crystal molecules. The SAVA display or test cell has the same structure but wherein one or both polyimide layers are omitted.

The polymerisable compounds are polymerised in the display or test cell by irradiation with UV light of defined intensity for a prespecified time, with a voltage simultaneously being applied to the display (usually 10 V to 30 V alternating current, 1 kHz). In the examples, unless indicated otherwise, a metal halide lamp and an intensity of 100 mW/cm$^2$ is used for polymerisation.

The intensity is measured using a standard meter (Hoenle UV-meter high end with UV sensor).

The tilt angle is determined using the Mueller Matrix Polarimeter "AxoScan" from Axometrics. A low value (i.e. a large deviation from the 90° angle) corresponds to a large tilt here.

Unless stated otherwise, the term "tilt angle" means the angle between the LC director and the substrate, and "LC director" means in a layer of LC molecules with uniform orientation the preferred orientation direction of the optical main axis of the LC molecules, which corresponds, in case of calamitic, uniaxially positive birefringent LC molecules, to their molecular long axis.

EXAMPLES

Mixture Examples

H1: Nematic host mixture (Δε<0)

| | | | |
|---|---|---|---|
| CPP-3-2 | 6.50% | Clearing point [° C.]: | 74.7 |
| CC-3-V1 | 8.00% | Δn (589 nm, 20° C.): | 0.1039 |
| CC-2-3 | 17.00% | Δε (1 kHz, 20° C.): | −3.0 |
| CC-3-4 | 6.50% | $\varepsilon_\parallel$ (1 kHz, 20° C.): | 3.4 |
| CCY-3-O1 | 3.50% | | |
| CCY-3-O2 | 12.50% | $K_3/K_1$ | 1.07 |
| CPY-2-O2 | 5.50% | | |
| CPY-3-O2 | 10.00% | $\gamma_1$ (20° C.) [mPa · s]: | 106 |
| CY-3-O2 | 15.50% | $V_0$ (20° C.) [V]: | 2.10 |
| PCH-3O1 | 4.50% | | |
| PP-1-2V1 | 5.00% | | |
| PY-3-O2 | 5.50% | | |

A polymerisable mixture was prepared by adding to nematic LC host mixture H1 0.5% of the reactive mesogen 1 and 0.6% of the SA-additive SA-23.

1

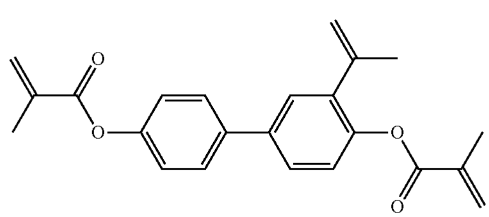

-continued

SA-23

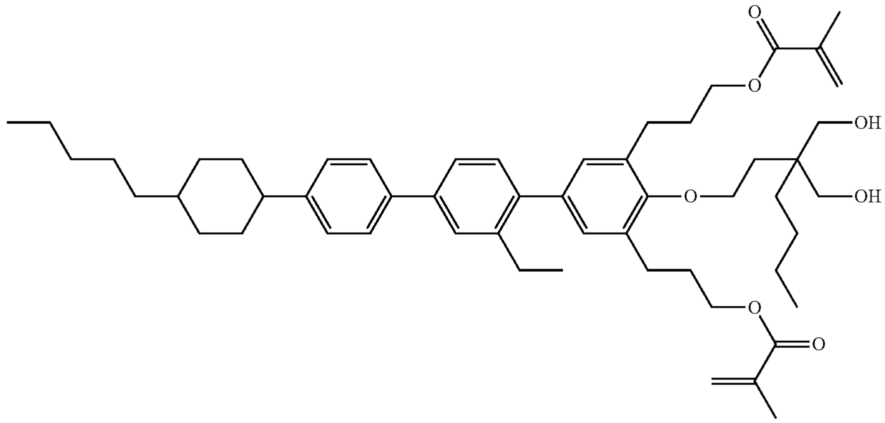

H2: Nematic host mixture (Δε<0)

| | | | |
|---|---|---|---|
| CPP-3-2 | 6.0% | Clearing point [° C.]: | 74.8 |
| CC-3-V1 | 6.0% | Δn (589 nm, 20° C.): | 0.107 |
| CC-3-4 | 9.0% | Δε (1 kHz, 20° C.): | −3.3 |
| CC-3-5 | 7.0% | $\varepsilon_{\parallel}$ (1 kHz, 20° C.): | 3.6 |
| CCP-3-1 | 8.0% | $\varepsilon_{\perp}$ (1 kHz, 20° C.): | 6.9 |
| CCP-3-3 | 3.0% | $K_1$ (20° C.) [pN]: | 14.2 |
| CCY-3-1 | 2.0% | $K_3$ (20° C.) [pN]: | 16.5 |
| CCY-3-O2 | 10.5% | $\gamma_1$ (20° C.) [mPa · s]: | 118 |
| CCY-4-O2 | 5.0% | $V_0$ (20° C.) [V]: | |
| CPY-3-O2 | 3.5% | | |
| CY-3-O2 | 14% | | |
| CP-3-O1 | 5.5% | | |
| PY-1-O4 | 6.5% | | |
| PY-3-O2 | 14% | | |

A polymerisable mixture was prepared by adding to nematic LC host mixture H2 0.4% of reactive mesogen 1.

H3: Nematic host mixture (Δε<0)

| | | | |
|---|---|---|---|
| CY-3-O2 | 15.5% | Clearing point [° C.]: | 75.1 |
| CCY-3-O3 | 8.00% | Δn (589 nm, 20° C.): | 0.098 |
| CCY-4-O2 | 10.0% | Δε (1 kHz, 20° C.): | −3.0 |
| CPY-2-O2 | 5.50% | $\varepsilon_{\parallel}$ (1 kHz, 20° C.): | 3.4 |
| CPY-3-O2 | 11.5% | $\varepsilon_{\perp}$ (1 kHz, 20° C.): | 6.4 |
| CC-3-4 | 9.25% | $K_1$ (20° C.) [pN]: | 13.1 |
| CC-2-3 | 24.5% | $K_3$ (20° C.) [pN]: | 13.3 |
| PYP-2-3 | 8.75% | $\gamma_1$ (20° C.) [mPa · s]: | 113 |
| CP-3-O1 | 7.00% | $V_0$ (20° C.) [V]: | 2.22 |

A polymerisable mixture was prepared by adding to nematic LC host mixture H3 0.5% of reactive mesogen 1 and 0.6% of SA-additive SA-23.

H4: Nematic host mixture (Δε<0)

| | | | |
|---|---|---|---|
| CY-3-O4 | 14.0% | Clearing point [° C.]: | 80.0 |
| CCY-3-O2 | 9.00% | Δn (589 nm, 20° C.): | 0.090 |
| CCY-3-O3 | 9.00% | Δε (1 kHz, 20° C.): | −3.3 |
| CPY-2-O2 | 10.0% | $\varepsilon_{\parallel}$ (1 kHz, 20° C.): | 3.4 |
| CPY-3-O2 | 10.0% | $\varepsilon_{\perp}$ (1 kHz, 20° C.): | 6.7 |
| CCY-3-1 | 8.00% | $K_1$ (20° C.) [pN]: | 15.1 |
| CC-3-4 | 9.00% | $K_3$ (20° C.) [pN]: | 14.6 |
| CC-3-5 | 6.00% | $\gamma_1$ (20° C.) [mPa · s]: | 140 |
| CP-5-3 | 10.0% | $V_0$ (20° C.) [V]: | 2.23 |
| CC-3-O1 | 6.00% | | |
| CC-3-O3 | 9.00% | | |

A polymerisable mixture was prepared by adding to nematic LC host mixture H4 0.3% of the reactive mesogen 2 and 100 ppm of stabiliser S1-1.

2

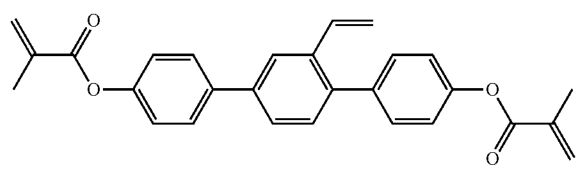

S1-1

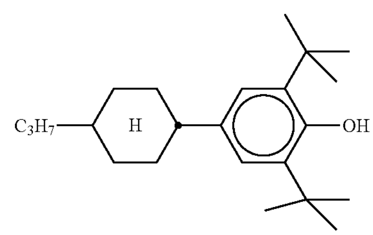

H5: Nematic host mixture (Δε<0)

| | | | |
|---|---|---|---|
| CC-3-V1 | 9.00% | Clearing point [° C.]: | 74.7 |
| CC-2-3 | 18.0% | Δn (589 nm, 20° C.): | 0.098 |
| CC-3-4 | 3.00% | Δε (1 kHz, 20° C.): | −3.4 |
| CC-3-5 | 7.00% | $\varepsilon_{\parallel}$ (1 kHz, 20° C.): | 3.5 |
| CCP-3-1 | 5.50% | $\varepsilon_{\perp}$ (1 kHz, 20° C.): | 6.9 |
| CCY-3-O2 | 11.5% | $K_1$ (20° C.) [pN]: | 14.9 |
| CPY-2-O2 | 8.00% | $K_3$ (20° C.) [pN]: | 15.9 |
| CPY-3-O2 | 11.0% | $\gamma_1$ (20° C.) [mPa · s]: | 108 |
| CY-3-O2 | 15.5% | $V_0$ (20° C.) [V]: | 2.28 |
| PY-3-O2 | 11.5% | | |

A polymerisable mixture was prepared by adding to nematic LC host mixture H5 0.3% of the reactive mesogen 3.

3

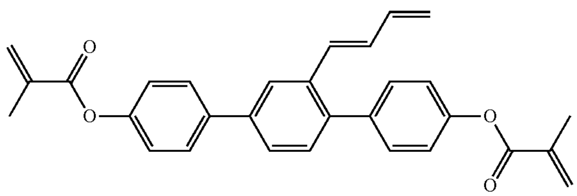

H6: Nematic host mixture (Δε<0)

| | | | |
|---|---|---|---|
| CC-3-V | 37.5% | Clearing point [° C.]: | 74.8 |
| CC-3-V1 | 2.00% | Δn (589 nm, 20° C.): | 0.099 |
| CCY-4-O2 | 14.5% | Δε (1 kHz, 20° C.): | −2.9 |
| CPY-2-O2 | 10.5% | $\varepsilon_{\parallel}$ (1 kHz, 20° C.): | 3.7 |
| CPY-3-O2 | 9.50% | $\varepsilon_{\perp}$ (1 kHz, 20° C.): | 6.6 |
| CY-3-O2 | 15.0% | $K_1$ (20° C.) [pN]: | 12.2 |
| CY-3-O4 | 4.50% | $K_3$ (20° C.) [pN]: | 13.4 |
| PYP-2-4 | 5.50% | $\gamma_1$ (20° C.) [mPa · s]: | 92 |
| PPGU-3-F | 1.00% | $V_0$ (20° C.) [V]: | 2.28 |

A polymerisable mixture was prepared by adding to nematic LC host mixture H6 0.5% of the reactive mesogen 4 and 0.6% of SA-additive SA-23.

4

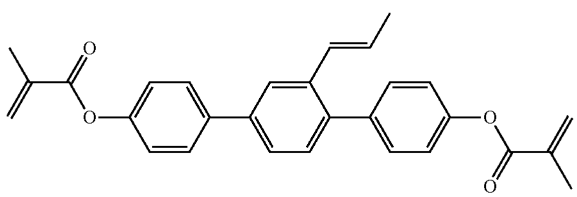

H7: Nematic host mixture (Δε<0)

| | | | |
|---|---|---|---|
| CC-2-3 | 20.0% | Clearing point [° C.]: | 74.8 |
| CC-3-O1 | 6.00% | Δn (589 nm, 20° C.): | 0.105 |
| CC-3-4 | 6.00% | Δε (1 kHz, 20° C.): | −3.2 |
| CCP-3-1 | 3.00% | $\varepsilon_{\parallel}$ (1 kHz, 20° C.): | 3.5 |
| CCY-3-O2 | 11.0% | $\varepsilon_{\perp}$ (1 kHz, 20° C.): | 6.8 |
| CPY-2-O2 | 12.0% | $K_1$ (20° C.) [pN]: | 12.7 |
| CPY-3-O2 | 11.0% | $K_3$ (20° C.) [pN]: | 13.6 |
| CY-3-O2 | 14.0% | $\gamma_1$ (20° C.) [mPa · s]: | 120 |
| CY-3-O4 | 4.00% | $V_0$ (20° C.) [V]: | 2.16 |
| CP-3-O1 | 4.00% | | |
| PYP-2-3 | 9.00% | | |

A polymerisable mixture was prepared by adding to nematic LC host mixture H7 1.0% of reactive mesogen 1, 0.6% of SA-additive SA-23, and 50 ppm of stabiliser S2-1

S2-1

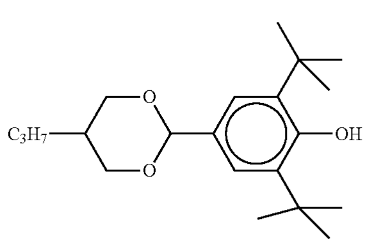

H8: Nematic host mixture (Δε<0)

| | | | |
|---|---|---|---|
| CC-4-V | 17.0% | Clearing point [° C.]: | 106.1 |
| CCP-V-1 | 15.0% | Δn (589 nm, 20° C.): | 0.120 |
| CCEPC-3-3 | 2.50% | Δε (1 kHz, 20° C.): | −3.6 |
| CCY-3-O2 | 4.00% | $\varepsilon_{\parallel}$ (1 kHz, 20° C.): | 3.5 |
| CCY-3-O3 | 5.00% | $\varepsilon_{\perp}$ (1 kHz, 20° C.): | 7.0 |
| CCY-4-O2 | 5.00% | $K_1$ (20° C.) [pN]: | 16.8 |
| CLY-3-O2 | 3.50% | $K_3$ (20° C.) [pN]: | 17.3 |
| CLY-3-O3 | 2.00% | $\gamma_1$ (20° C.) [mPa · s]: | 207 |
| CPY-2-O2 | 8.00% | $V_0$ (20° C.) [V]: | 2.33 |
| CPY-3-O2 | 10.0% | | |
| CY-3-O4 | 17.0% | | |
| PYP-2-3 | 11.0% | | |

A polymerisable mixture was prepared by adding to nematic LC host mixture H8 0.3% of reactive mesogen 5.

H9: Nematic host mixture (Δε<0)

| | | | |
|---|---|---|---|
| CY-3-O2 | 15.0% | Clearing point [° C.]: | 75.5 |
| CCY-4-O2 | 9.50% | Δn (589 nm, 20° C.): | 0.108 |
| CCY-5-O2 | 5.00% | Δε (1 kHz, 20° C.): | −3.0 |
| CPY-2-O2 | 9.00% | $\varepsilon_{\parallel}$ (1 kHz, 20° C.): | 3.5 |
| CPY-3-O2 | 9.00% | $\varepsilon_{\perp}$ (1 kHz, 20° C.): | 6.5 |
| CC-3-4 | 9.00% | $K_1$ (20° C.) [pN]: | 12.9 |
| CC-2-3 | 22.0% | $K_3$ (20° C.) [pN]: | 13.0 |
| PYP-2-3 | 7.00% | $\gamma_1$ (20° C.) [mPa · s]: | 115 |
| PYP-2-4 | 7.50% | $V_0$ (20° C.) [V]: | 2.20 |
| CP-3-O1 | 7.00% | | |

A polymerisable mixture was prepared by adding to nematic LC host mixture H9 1.0% of the reactive mesogen 5 and 0.6% of SA-additive SA-23.

5

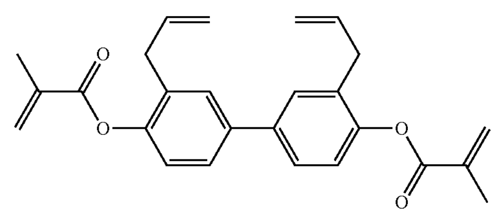

H10: Nematic host mixture (Δε<0)

| | | | |
|---|---|---|---|
| CY-3-O2 | 15.0% | Clearing point [° C.]: | 74.7 |
| CY-5-O2 | 6.50% | Δn (589 nm, 20° C.): | 0.108 |
| CCY-3-O2 | 11.0% | Δε (1 kHz, 20° C.): | −3.0 |
| CPY-2-O2 | 5.50% | $\varepsilon_{\parallel}$ (1 kHz, 20° C.): | 3.6 |
| CPY-3-O2 | 10.5% | $\varepsilon_{\perp}$ (1 kHz, 20° C.): | 6.6 |
| CC-3-V | 28.5% | $K_1$ (20° C.) [pN]: | 12.9 |
| CC-3-V1 | 10.0% | $K_3$ (20° C.) [pN]: | 15.7 |
| PYP-2-3 | 12.5% | $\gamma_1$ (20° C.) [mPa · s]: | 97 |
| PPGU-3-F | 0.50% | $V_0$ (20° C.) [V]: | 2.42 |

A polymerisable mixture was prepared by adding to nematic LC host mixture H10 0.4% of reactive mesogen 5 and 100 ppm of stabiliser S3-1

S3-1

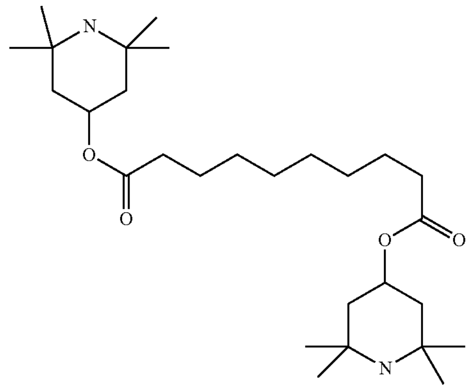

H11: Nematic host mixture (Δε<0)

| | | | |
|---|---|---|---|
| CC-3-5 | 9.50% | Clearing point [° C.]: | 79.1 |
| CC-5-O1 | 5.00% | Δn (589 nm, 20° C.): | 0.091 |
| CCY-2-1 | 9.50% | Δε (1 kHz, 20° C.): | −3.6 |
| CCY-3-1 | 10.5% | $\varepsilon_{\parallel}$ (1 kHz, 20° C.): | 3.5 |
| CCY-3-O2 | 10.5% | $\varepsilon_{\perp}$ (1 kHz, 20° C.): | 7.1 |
| CCY-5-O2 | 9.50% | $K_1$ (20° C.) [pN]: | 14.6 |
| CPY-2-O2 | 12.0% | $K_3$ (20° C.) [pN]: | 14.5 |
| CY-3-O4 | 9.00% | $\gamma_1$ (20° C.) [mPa · s]: | 178 |
| CY-5-O4 | 11.0% | $V_0$ (20° C.) [V]: | 2.12 |
| CP-5-3 | 13.5% | | |

A polymerisable mixture was prepared by adding to nematic LC host mixture H11 0.5% of reactive mesogen 1 and 0.6% of SA-additive SA-23.

H12: Nematic host mixture (Δε<0)

| | | | |
|---|---|---|---|
| CPP-3-2 | 4.00% | Clearing point [° C.]: | 74.8 |
| CC-3-V1 | 8.00% | Δn (589 nm, 20° C.): | 0.106 |
| CC-2-3 | 13.0% | Δε (1 kHz, 20° C.): | −3.5 |
| CC-3-4 | 7.00% | $\varepsilon_{\parallel}$ (1 kHz, 20° C.): | 3.6 |
| CC-3-5 | 7.00% | $\varepsilon_{\perp}$ (1 kHz, 20° C.): | 7.1 |
| CCY-3-O2 | 13.0% | $K_1$ (20° C.) [pN]: | 14.8 |
| CPY-2-O2 | 7.00% | $K_3$ (20° C.) [pN]: | 15.8 |
| CPY-3-O2 | 12.0% | $\gamma_1$ (20° C.) [mPa · s]: | 115 |
| CY-3-O2 | 12.0% | $V_0$ (20° C.) [V]: | 2.23 |
| CP-3-O1 | 2.00% | | |
| PY-3-O2 | 15.0% | | |

A polymerisable mixture was prepared by adding to nematic LC host mixture H12 0.3% of reactive mesogen 1.

H13: Nematic host mixture (Δε<0)

| | | | |
|---|---|---|---|
| CY-3-O4 | 22.0% | Clearing point [° C.]: | 86.9 |
| CY-5-O4 | 12.0% | Δn (589 nm, 20° C.): | 0.111 |
| CCY-3-O2 | 6.00% | Δε (1 kHz, 20° C.): | −4.9 |
| CCY-3-O3 | 6.00% | $\varepsilon_{\parallel}$ (1 kHz, 20° C.): | 3.8 |
| CCY-4-O2 | 6.00% | $\varepsilon_{\perp}$ (1 kHz, 20° C.): | 8.7 |
| CPY-2-O2 | 10.0% | $K_1$ (20° C.) [pN]: | 14.9 |
| CPY-3-O2 | 10.0% | $K_3$ (20° C.) [pN]: | 15.9 |
| PYP-2-3 | 7.00% | $\gamma_1$ (20° C.) [mPa · s]: | 222 |
| CC-3-V1 | 7.00% | $V_0$ (20° C.) [V]: | 1.91 |
| CC-5-V | 10.0% | | |
| CCEPC-3-3 | 2.00% | | |
| CCEPC-3-5 | 2.00% | | |

A polymerisable mixture was prepared by adding to nematic LC host mixture H13 0.5% of reactive mesogen 3 and 0.6% of SA-additive SA-23.

H14: Nematic host mixture (Δε<0)

| | | | |
|---|---|---|---|
| CY-3-O4 | 12.0% | Clearing point [° C.]: | 86.0 |
| CY-5-O2 | 10.0% | Δn (589 nm, 20° C.): | 0.110 |
| CY-5-O4 | 8.00% | Δε (1 kHz, 20° C.): | −5.0 |
| CCY-3-O2 | 8.00% | $\varepsilon_{\parallel}$ (1 kHz, 20° C.): | 3.8 |
| CCY-4-O2 | 7.00% | $\varepsilon_{\perp}$ (1 kHz, 20° C.): | 8.8 |
| CCY-5-O2 | 6.00% | $K_1$ (20° C.) [pN]: | 14.7 |
| CCY-2-1 | 8.00% | $K_3$ (20° C.) [pN]: | 16.0 |
| CCY-3-1 | 7.00% | $\gamma_1$ (20° C.) [mPa · s]: | 250 |
| CPY-3-O2 | 9.00% | $V_0$ (20° C.) [V]: | 1.90 |
| CPY-3-O2 | 9.00% | | |
| CPP-3-2 | 6.00% | | |
| CP-5-3 | 10.0% | | |

A polymerisable mixture was prepared by adding to nematic LC host mixture H14 1.0% of reactive mesogen 1 and 0.6% of SA-additive SA-23.

H15: Nematic host mixture (Δε<0)

| | | | |
|---|---|---|---|
| CC-3-V1 | 10.25% | Clearing point [° C.]: | 74.7 |
| CC-2-3 | 18.5% | Δn (589 nm, 20° C.): | 0.103 |
| CC-3-5 | 6.75% | Δε (1 kHz, 20° C.): | −3.1 |
| CCP-3-1 | 6.00% | $\varepsilon_{\parallel}$ (1 kHz, 20° C.): | 3.4 |
| CCY-3-1 | 2.50% | $\varepsilon_{\perp}$ (1 kHz, 20° C.): | 6.4 |
| CCY-3-O2 | 12.0% | $K_1$ (20° C.) [pN]: | 15.4 |
| CPY-2-O2 | 6.00% | $K_3$ (20° C.) [pN]: | 16.8 |
| CPY-3-O2 | 9.75% | $\gamma_1$ (20° C.) [mPa · s]: | 104 |
| CY-3-O2 | 11.5% | $V_0$ (20° C.) [V]: | 2.46 |
| PP-1-2V1 | 3.75% | | |
| PY-3-O2 | 13.0% | | |

A polymerisable mixture was prepared by adding to nematic LC host mixture H15 0.4% of reactive mesogen 1 and 100 ppm of stabiliser S3-2.

S3-2

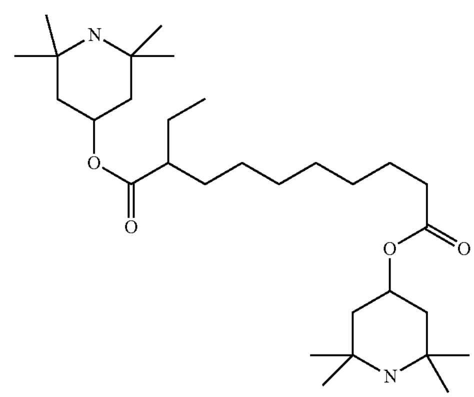

H16: Nematic host mixture (Δε<0)

| | | | |
|---|---|---|---|
| CC-3-V | 27.5% | Clearing point [° C.]: | 74.7 |
| CC-3-V1 | 10.0% | Δn (589 nm, 20° C.): | 0.104 |
| CC-3-5 | 8.00% | Δε (1 kHz, 20° C.): | −3.0 |
| CCY-3-O2 | 9.25% | $\varepsilon_{\parallel}$ (1 kHz, 20° C.): | 3.4 |
| CLY-3-O2 | 10.0% | $\varepsilon_{\perp}$ (1 kHz, 20° C.): | 6.4 |
| CPY-3-O2 | 11.75% | $K_1$ (20° C.) [pN]: | 15.3 |
| PY-3-O2 | 14.0% | $K_3$ (20° C.) [pN]: | 16.2 |
| PY-4-O2 | 9.00% | $\gamma_1$ (20° C.) [mPa · s]: | 88 |
| PYP-2-4 | 0.50% | $V_0$ (20° C.) [V]: | 2.44 |

A polymerisable mixture was prepared by adding to nematic LC host mixture H16 0.5% of reactive mesogen 2 and 0.6% of SA-additive SA-23.

H17: Nematic host mixture (Δε<0)

| | | | |
|---|---|---|---|
| CPP-3-2 | 6.50% | Clearing point [° C.]: | 74.7 |
| CC-3-V1 | 8.00% | Δn (589 nm, 20° C.): | 0.104 |
| CC-2-3 | 17.0% | Δε (1 kHz, 20° C.): | −3.0 |
| CC-3-4 | 6.50% | $\varepsilon_{\parallel}$ (1 kHz, 20° C.): | 3.4 |
| CCY-3-O1 | 3.50% | $\varepsilon_{\perp}$ (1 kHz, 20° C.): | 6.3 |
| CCY-3-O2 | 12.5% | $K_1$ (20° C.) [pN]: | 14.8 |
| CPY-2-O2 | 5.50% | $K_3$ (20° C.) [pN]: | 15.8 |
| CPY-3-O2 | 10.0% | $\gamma_1$ (20° C.) [mPa · s]: | 106 |
| CY-3-O2 | 15.5% | | |
| CP-3-O1 | 4.50% | | |
| PP-1-2V1 | 5.00% | | |
| PY-3-O2 | 5.50% | | |

A polymerisable mixture was prepared by adding to nematic LC host mixture H17 0.5% of reactive mesogen 3 and 0.6% of SA-additive SA-23.

A polymerisable mixture was prepared by adding to nematic LC host mixture H17 0.3% of the reactive mesogen C1 of prior art and 0.015% of the stabiliser S1-1. To this polymerisable mixture were added 0.9% of the SA-additive SA-23, 0.4% of the reactive mesogen 2, and 0.5% of the reactive mesogen 6 to form a mixture according to the present invention.

C1

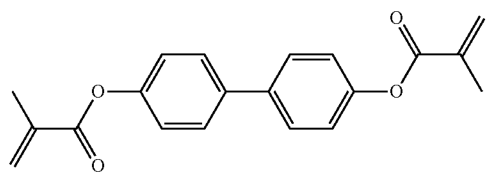

6

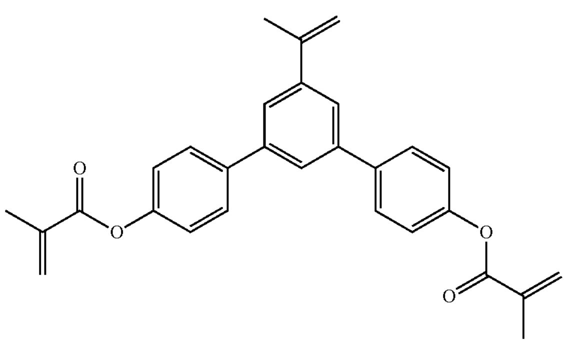

H18: Nematic host mixture (Δε<0)

| | | | |
|---|---|---|---|
| CPP-3-2 | 10.5% | Clearing point [° C.]: | 74.5 |
| CC-3-4 | 9.0% | Δn (589 nm, 20° C.): | 0.104 |
| CC-3-5 | 9.0% | Δε (1 kHz, 20° C.): | −3.4 |
| CCP-3-1 | 8.0% | $\varepsilon_{\parallel}$ (1 kHz, 20° C.): | 3.7 |
| CCY-3-O2 | 9.5% | $\varepsilon_{\perp}$ (1 kHz, 20° C.): | 7 |
| CCY-4-O2 | 5.5% | $K_1$ (20° C.) [pN]: | 14 |
| CPY-3-O2 | 5.5% | $K_3$ (20° C.) [pN]: | 15.7 |
| CY-3-O2 | 15% | $\gamma_1$ (20° C.) [mPa · s]: | 128 |
| CY-5-O2 | 5.0% | | |
| CP-3-O1 | 7.0% | | |
| PY-3-O2 | 16% | | |

A polymerisable mixture was prepared by adding to nematic LC host mixture H18 0.3% of reactive mesogen 1 and 50 ppm of stabiliser S1-1.

H19: Nematic host mixture (Δε>0)

| | | | |
|---|---|---|---|
| CC-4-V | 10.0% | Clearing point [° C.]: | 77.0 |
| CC-5-V | 13.5% | Δn (589 nm, 20° C.): | 0.113 |
| PGU-3-F | 6.50% | Δε (1 kHz, 20° C.): | 19.2 |
| ACQU-2-F | 10.0% | $\varepsilon_{\parallel}$ (1 kHz, 20° C.): | 23.8 |
| ACQU-3-F | 12.0% | $\varepsilon_{\perp}$ (1 kHz, 20° C.): | 4.6 |
| PUQU-3-F | 11.0% | $K_1$ (20° C.) [pN]: | 11.5 |
| CCP-V-1 | 12.0% | $K_3$ (20° C.) [pN]: | 11.1 |
| APUQU-2-F | 6.00% | $\gamma_1$ (20° C.) [mPa · s]: | 122 |
| APUQU-3-F | 7.00% | $V_0$ (20° C.) [V]: | 0.81 |
| PGUQU-3-F | 8.00% | | |
| CPGU-3-OT | 4.00% | | |

A polymerisable mixture was prepared by adding to nematic LC host mixture H19 1.0% of reactive mesogen 1, 0.6% of SA-additive SA-23 and 50 ppm of stabiliser S3-3.

S3-3

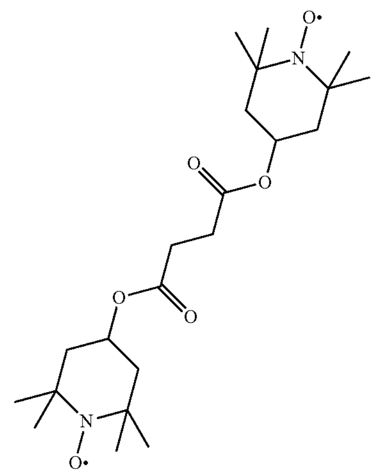

H20: Nematic host mixture (Δε>0)

| | | | |
|---|---|---|---|
| PGU-2-F | 3.50% | Clearing point [° C.]: | 77.0 |
| PGU-3-F | 7.00% | Δn (589 nm, 20° C.): | 0.105 |
| CC-3-V1 | 15.0% | Δε (1 kHz, 20° C.): | 7.2 |
| CC-4-V | 18.0% | $\varepsilon_{\parallel}$ (1 kHz, 20° C.): | 10.3 |
| CC-5-V | 20.0% | $\varepsilon_{\perp}$ (1 kHz, 20° C.): | 3.1 |
| CCP-V-1 | 6.00% | $K_1$ (20° C.) [pN]: | 15.3 |
| APUQU-3-F | 15.0% | $K_3$ (20° C.) [pN]: | 13.5 |
| PUQU-3-F | 5.50% | $\gamma_1$ (20° C.) [mPa · s]: | 63 |
| PGP-2-4 | 3.00% | $V_0$ (20° C.) [V]: | 1.53 |
| CPP-3-2 | 7.00% | | |

A polymerisable mixture was prepared by adding to nematic LC host mixture $H_2O$ 0.3% of reactive mesogen 2 and 100 ppm of stabiliser S1-1.

H21: Nematic host mixture (Δε>0)

| | | | |
|---|---|---|---|
| APUQU-2-F | 6.00% | Clearing point [° C.]: | 74.0 |
| APUQU-3-F | 12.0% | Δn (589 nm, 20° C.): | 0.120 |
| PUQU-3-F | 18.0% | Δε (1 kHz, 20° C.): | 17.4 |
| CPGU-3-OT | 9.00% | $\varepsilon_{\parallel}$ (1 kHz, 20° C.): | 22.0 |
| CCGU-3-F | 3.00% | $\varepsilon_{\perp}$ (1 kHz, 20° C.): | 4.5 |
| CPU-3-F | 14.0% | $K_1$ (20° C.) [pN]: | 10.1 |
| CCQU-3-F | 10.0% | $K_3$ (20° C.) [pN]: | 10.8 |
| CC-3-V | 25.0% | $\gamma_1$ (20° C.) [mPa · s]: | 111 |
| PGP-2-2V | 3.00% | $V_0$ (20° C.) [V]: | 0.80 |

A polymerisable mixture was prepared by adding to nematic LC host mixture H21 0.5% of reactive mesogen 1, 0.6% of SA-additive SA-23, and 50 ppm of stabiliser S1-1.

H22: Nematic host mixture (Δε>0)

| | | | |
|---|---|---|---|
| PUQU-3-F | 15.0% | Clearing point [° C.]: | 74.3 |
| APUQU-2-F | 5.00% | Δn (589 nm, 20° C.): | 0.120 |
| APUQU-3-F | 12.0% | Δε (1 kHz, 20° C.): | 14.9 |
| CCQU-3-F | 11.0% | $ε_{\parallel}$ (1 kHz, 20° C.): | 19.1 |
| CCQU-5-F | 1.50% | $ε_{\perp}$ (1 kHz, 20° C.): | 4.3 |
| CPGU-3-OT | 5.00% | $K_1$ (20° C.) [pN]: | 11.2 |
| CPP-3-OT | 4.50% | $K_3$ (20° C.) [pN]: | 10.8 |
| CGU-3-F | 10.0% | $γ_1$ (20° C.) [mPa · s]: | 98 |
| PGP-2-3 | 1.50% | $V_0$ (20° C.) [V]: | 0.91 |
| PGP-2-2V | 8.00% | | |
| CC-3-V | 26.5% | | |

A polymerisable mixture was prepared by adding to nematic LC host mixture H22 1.0% of reactive mesogen 3 and 0.6% of SA-additive SA-23.

H23: Nematic host mixture (Δε>0)

| | | | |
|---|---|---|---|
| CCQU-3-F | 9.00% | Clearing point [° C.]: | 94.5 |
| CCQU-5-F | 9.00% | Δn (589 nm, 20° C.): | 0.121 |
| PUQU-3-F | 16.0% | Δε (1 kHz, 20° C.): | 20.4 |
| APUQU-2-F | 8.00% | $ε_{\parallel}$ (1 kHz, 20° C.): | 24.7 |
| APUQU-3-F | 9.00% | $ε_{\perp}$ (1 kHz, 20° C.): | 4.3 |
| PGUQU-3-F | 8.00% | $K_1$ (20° C.) [pN]: | 12.1 |
| CPGU-3-OT | 7.00% | $K_3$ (20° C.) [pN]: | 13.9 |
| CC-4-V | 18.0% | $γ_1$ (20° C.) [mPa · s]: | 163 |
| CC-5-V | 5.00% | $V_0$ (20° C.) [V]: | 0.81 |
| CCP-V-1 | 6.00% | | |
| CCEPC-3-3 | 3.00% | | |
| PPGU-3-F | 2.00% | | |

A polymerisable mixture was prepared by adding to nematic LC host mixture H23 0.4% of reactive mesogen 2.

H24: Nematic host mixture (Δε>0)

| | | | |
|---|---|---|---|
| CC-3-V | 28.50% | Clearing point [° C.]: | 85.6 |
| CCP-V-1 | 3.00% | Δn (589 nm, 20° C.): | 0.121 |
| CCEPC-3-3 | 2.00% | Δε (1 kHz, 20° C.): | 19.5 |
| PGU-2-F | 4.00% | $ε_{\parallel}$ (1 kHz, 20° C.): | 23.8 |
| CCQU-3-F | 8.00% | $ε_{\perp}$ (1 kHz, 20° C.): | 4.3 |
| CCQU-5-F | 6.00% | $K_1$ (20° C.) [pN]: | 11.6 |
| CCGU-3-F | 3.00% | $K_3$ (20° C.) [pN]: | 12.7 |
| PUQU-2-F | 2.00% | $γ_1$ (20° C.) [mPa · s]: | 126 |
| PUQU-3-F | 10.0% | $V_0$ (20° C.) [V]: | 0.81 |
| APUQU-2-F | 6.00% | | |
| APUQU-3-F | 9.00% | | |
| PGUQU-3-F | 5.00% | | |
| PGUQU-4-F | 5.00% | | |
| PGUQU-5-F | 4.00% | | |
| CPGU-3-OT | 4.00% | | |
| PPGU-3-F | 0.50% | | |

A polymerisable mixture was prepared by adding to nematic LC host mixture H24 0.6% of reactive mesogen 2 and 0.6% of SA-additive SA-23.

H25: Nematic host mixture (Δε<0)

| | | | |
|---|---|---|---|
| CC-3-V1 | 9.00% | Clearing point [° C.]: | 74.6 |
| CC-3-O1 | 3.50% | Δn (589 nm, 20° C.): | 0.0984 |
| CC-3-4 | 8.00% | Δε (1 kHz, 20° C.): | −3.6 |
| CC-3-5 | 8.00% | $ε_{\parallel}$ (1 kHz, 20° C.): | 3.6 |
| CCP-3-1 | 6.00% | $ε_{\perp}$ (1 kHz, 20° C.): | 7.1 |
| CCY-3-O1 | 6.50% | $K_1$ (20° C.) [pN]: | 14.1 |
| CCY-3-O2 | 12.5% | $K_3$ (20° C.) [pN]: | 17 |
| CPY-3-O2 | 10.0% | $γ_1$ (20° C.) [mPa · s]: | 119 |
| CY-3-O2 | 15.5% | $V_0$ (20° C.) [V]: | 2.31 |
| CP-3-O1 | 8.5% | | |
| PY-3-O2 | 12.5% | | |

A polymerisable mixture was prepared by adding to nematic LC host mixture H25 1.0% of reactive mesogen 1, 0.6% of SA-additive SA-23, and 50 ppm of stabiliser S2-1.

H26: Nematic host mixture (Δε<0)

| | | | |
|---|---|---|---|
| CC-3-5 | 9.50% | Clearing point [° C.]: | 79.1 |
| CC-5-O1 | 5.00% | Δn (589 nm, 20° C.): | 0.0911 |
| CCY-2-1 | 9.50% | Δε (1 kHz, 20° C.): | −3.6 |
| CCY-3-1 | 10.5% | $ε_{\parallel}$ (1 kHz, 20° C.): | 3.5 |
| CCY-3-O2 | 10.5% | $ε_{\perp}$ (1 kHz, 20° C.): | 7.1 |
| CCY-5-O2 | 9.50% | $K_1$ (20° C.) [pN]: | 14.6 |
| CPY-2-O2 | 12.0% | $K_3$ (20° C.) [pN]: | 14.5 |
| CY-3-O4 | 9.00% | $γ_1$ (20° C.) [mPa · s]: | 178 |
| CY-5-O4 | 11.0% | $V_0$ (20° C.) [V]: | 2.12 |
| CP-5-3 | 13.5% | | |

A polymerisable mixture was prepared by adding to nematic LC host mixture H26 0.5% of reactive mesogen 1 and 0.6% of SA-additive SA-23.

H27: Nematic host mixture (Δε<0)

| | | | |
|---|---|---|---|
| CC-3-V | 37.5% | Clearing point [° C.]: | 74.8 |
| CC-3-V1 | 2.00% | Δn (589 nm, 20° C.): | 0.0987 |
| CCY-4-O2 | 14.5% | Δε (1 kHz, 20° C.): | −2.9 |
| CPY-2-O2 | 10.5% | $ε_{\parallel}$ (1 kHz, 20° C.): | 3.7 |
| CPY-3-O2 | 9.5% | $ε_{\perp}$ (1 kHz, 20° C.): | 6.6 |
| CY-3-O2 | 15.0% | $K_1$ (20° C.) [pN]: | 12.2 |
| CY-3-O4 | 4.50% | $K_3$ (20° C.) [pN]: | 13.4 |
| PYP-2-4 | 5.50% | $γ_1$ (20° C.) [mPa · s]: | 92 |
| PPGU-3-F | 1.00% | $V_0$ (20° C.) [V]: | 2.28 |

H28: Nematic host mixture (Δε<0)

| | | | |
|---|---|---|---|
| CC-3-V | 37.5% | Clearing point [° C.]: | 75.4 |
| CC-5-O1 | 2.00% | Δn (589 nm, 20° C.): | 0.1034 |
| CCY-3-O2 | 12.0% | Δε (1 kHz, 20° C.): | −3.3 |
| CCY-3-O3 | 6.50% | $ε_{\parallel}$ (1 kHz, 20° C.): | 3.6 |
| CPY-2-O2 | 12.0% | $ε_{\perp}$ (1 kHz, 20° C.): | 6.9 |
| CPY-3-O2 | 10.0% | $K_1$ (20° C.) [pN]: | 13.4 |
| CY-3-O2 | 2.00% | $K_3$ (20° C.) [pN]: | 15 |
| PY-3-O2 | 16.0% | $γ_1$ (20° C.) [mPa · s]: | 95 |
| CP-3-O1 | 2.00% | $V_0$ (20° C.) [V]: | 2.24 |

A polymerisable mixture was prepared by adding to nematic LC host mixture H28 0.4% of reactive mesogen 1 and 100 ppm of stabiliser S2-1.

H29: Nematic host mixture (Δε<0)

| | | | |
|---|---|---|---|
| CC-3-V | 22.5% | Clearing point [° C.]: | 74.8 |
| CC-3-V1 | 9.75% | Δn (589 nm, 20° C.): | 0.1027 |
| CC-1-3 | 0.75% | Δε (1 kHz, 20° C.): | −3.2 |
| CC-3-4 | 5.5% | $ε_{\parallel}$ (1 kHz, 20° C.): | 3.5 |
| CC-3-5 | 4.00% | $ε_{\perp}$ (1 kHz, 20° C.): | 6.8 |
| CCY-3-O1 | 10% | $K_1$ (20° C.) [pN]: | 14.4 |
| CCY-3-O2 | 12% | $K_3$ (20° C.) [pN]: | 15.2 |
| CPY-2-O2 | 10% | $γ_1$ (20° C.) [mPa · s]: | |
| CPY-3-O2 | 2.0% | $V_0$ (20° C.) [V]: | 2.29 |
| CY-3-O2 | 0.5% | | |
| PP-1-2V1 | 0.25% | | |
| PY-1-O4 | 4.25% | | |
| PY-3-O2 | 17% | | |
| PYP-2-3 | 1.5% | | |

A polymerisable mixture was prepared by adding to nematic LC host mixture H29 0.5% of reactive mesogen 1 and 0.6% of SA-additive SA-23.

H30: Nematic host mixture (Δε<0)

| | | | |
|---|---|---|---|
| CPP-3-2 | 4.0% | Clearing point [° C.]: | 74.6 |
| CC-3-V | 10% | Δn (589 nm, 20° C.): | 0.099 |
| CC-3-V1 | 8.5% | Δε (1 kHz, 20° C.): | −3.4 |
| CC-3-4 | 4.5% | $\varepsilon_{\parallel}$ (1 kHz, 20° C.): | 3.6 |
| CC-3-5 | 8.0% | $\varepsilon_{\perp}$ (1 kHz, 20° C.): | 7 |
| CCP-3-1 | 4.25% | $K_1$ (20° C.) [pN]: | 14.2 |
| CCY-3-O1 | 6.5% | $K_3$ (20° C.) [pN]: | 15.9 |
| CCY-3-O2 | 12.75% | $\gamma_1$ (20° C.) [mPa · s]: | 108 |
| CCY-4-O2 | 6.0% | $V_0$ (20° C.) [V]: | 2.28 |
| CY-3-O2 | 15.5% | | |
| CP-3-O1 | 2.0% | | |
| PY-3-O2 | 16% | | |
| PYP-2-3 | 2.0% | | |

A polymerisable mixture was prepared by adding to nematic LC host mixture H30 0.3% of reactive mesogen 1.

H31: Nematic host mixture (Δε<0)

| | | | |
|---|---|---|---|
| CC-3-V | 15% | Clearing point [° C.]: | 74.4 |
| CC-3-V1 | 9.0% | Δn (589 nm, 20° C.): | 0.1086 |
| CC-2-3 | 8.0% | Δε (1 kHz, 20° C.): | −3.2 |
| CC-3-4 | 7.5% | $\varepsilon_{\parallel}$ (1 kHz, 20° C.): | 3.5 |
| CCY-3-O2 | 10% | $\varepsilon_{\perp}$ (1 kHz, 20° C.): | 6.7 |
| CCY-5-O2 | 8.0% | $K_1$ (20° C.) [pN]: | 14.3 |
| CPY-2-O2 | 3.0% | $K_3$ (20° C.) [pN]: | 15.7 |
| CPY-3-O2 | 8.5% | $\gamma_1$ (20° C.) [mPa · s]: | 102 |
| CY-3-O2 | 7.0% | $V_0$ (20° C.) [V]: | 2.33 |
| PY-3-O2 | 16% | | |
| PYP-2-3 | 8.0% | | |

A polymerisable mixture was prepared by adding to nematic LC host mixture H31 0.5% of reactive mesogen 1, 0.6% of SA-additive SA-23, and 50 ppm of stabiliser S2-1.

H32: Nematic host mixture (Δε<0)

| | | | |
|---|---|---|---|
| CPP-3-2 | 6.0% | Clearing point [° C.]: | 75.2 |
| CC-3-O1 | 4.0% | Δn (589 nm, 20° C.): | 0.1095 |
| CC-3-4 | 9.0% | Δε (1 kHz, 20° C.): | −3.1 |
| CC-3-5 | 9.0% | $\varepsilon_{\parallel}$ (1 kHz, 20° C.): | 3.6 |
| CCP-3-1 | 8.0% | $\varepsilon_{\perp}$ (1 kHz, 20° C.): | 6.7 |
| CCP-3-3 | 1.0% | $K_1$ (20° C.) [pN]: | 13.8 |
| CCY-3-O2 | 12% | $K_3$ (20° C.) [pN]: | 16.5 |
| CLY-3-O2 | 1.0% | $\gamma_1$ (20° C.) [mPa · s]: | 119 |
| CPY-3-O2 | 11% | $V_0$ (20° C.) [V]: | 2.41 |
| CY-3-O2 | 9.5% | | |
| CP-3-O1 | 11.5% | | |
| PY-3-O2 | 18% | | |

A polymerisable mixture was prepared by adding to nematic LC host mixture H32 0.5% of reactive mesogen 2 and 0.6% of SA-additive SA-23.

H33: Nematic host mixture (Δε<0)

| | | | |
|---|---|---|---|
| CPP-3-2 | 3.0% | Clearing point [° C.]: | 75.2 |
| CC-3-V1 | 9.0% | Δn (589 nm, 20° C.): | 0.1098 |
| CC-3-O1 | 2.5% | Δε (1 kHz, 20° C.): | −3.1 |
| CC-3-4 | 9.0% | $\varepsilon_{\parallel}$ (1 kHz, 20° C.): | 3.6 |
| CC-3-5 | 9.0% | $\varepsilon_{\perp}$ (1 kHz, 20° C.): | 6.7 |
| CCP-3-1 | 7.5% | $K_1$ (20° C.) [pN]: | 14.6 |
| CCP-V2-1 | 5.0% | $K_3$ (20° C.) [pN]: | 16.6 |
| CCY-3-O2 | 4.0% | $\gamma_1$ (20° C.) [mPa · s]: | 114 |
| CPY-2-O2 | 5.5% | $V_0$ (20° C.) [V]: | 2.43 |
| CPY-3-O2 | 10.5% | | |
| CY-3-O2 | 15% | | |
| CP-3-O1 | 1.5% | | |
| PY-3-O2 | 18% | | |
| PPGU-3-F | 0.5% | | |

A polymerisable mixture was prepared by adding to nematic LC host mixture H33 0.5% of reactive mesogen 1 and 0.6% of SA-additive SA-23.

H34: Nematic host mixture (Δε<0)

| | | | |
|---|---|---|---|
| CPP-3-2 | 8.5% | Clearing point [° C.]: | 74.7 |
| CC-3-V1 | 9.0% | Δn (589 nm, 20° C.): | 0.1097 |
| CC-3-O1 | 2.0% | Δε (1 kHz, 20° C.): | −3.1 |
| CC-3-4 | 9.0% | $\varepsilon_{\parallel}$ (1 kHz, 20° C.): | 3.5 |
| CC-3-5 | 9.0% | $\varepsilon_{\perp}$ (1 kHz, 20° C.): | 6.6 |
| CCP-3-1 | 2.5% | $K_1$ (20° C.) [pN]: | 14.2 |
| CCP-V2-1 | 5.0% | $K_3$ (20° C.) [pN]: | 16.6 |
| CCY-3-O2 | 7.5% | $\gamma_1$ (20° C.) [mPa · s]: | 112 |
| CLY-3-O2 | 1.0% | $V_0$ (20° C.) [V]: | 2.44 |
| CPY-3-O2 | 10.5% | | |
| CY-3-O2 | 15% | | |
| CP-3-O1 | 3.0% | | |
| PY-3-O2 | 18% | | |

A polymerisable mixture was prepared by adding to nematic LC host mixture H34 0.6% of reactive mesogen 3 and 0.6% of SA-additive SA-23.

H35: Nematic host mixture (Δε<0)

| | | | |
|---|---|---|---|
| B-2O-O5 | 4.0% | Clearing point [° C.]: | 75 |
| CPP-3-2 | 2.0% | Δn (589 nm, 20° C.): | 0.1094 |
| CC-3-O1 | 5.0% | Δε (1 kHz, 20° C.): | −3.1 |
| CC-3-4 | 9.0% | $\varepsilon_{\parallel}$ (1 kHz, 20° C.): | 3.6 |
| CC-3-5 | 9.0% | $\varepsilon_{\perp}$ (1 kHz, 20° C.): | 6.7 |
| CCP-3-1 | 8.0% | $K_1$ (20° C.) [pN]: | 13.9 |
| CCP-3-3 | 5.0% | $K_3$ (20° C.) [pN]: | 16.4 |
| CCY-3-O2 | 11.5% | $\gamma_1$ (20° C.) [mPa · s]: | 117 |
| CLY-3-O2 | 1.0% | $V_0$ (20° C.) [V]: | 2.42 |
| CPY-3-O2 | 10.5% | | |
| CY-3-O2 | 2.0% | | |
| CP-3-O1 | 15% | | |
| PY-3-O2 | 18% | | |

A polymerisable mixture was prepared by adding to nematic LC host mixture H35 0.3% of reactive mesogen 3 and 100 ppm of stabiliser S1-1.

H36: Nematic host mixture (Δε<0)

| | | | |
|---|---|---|---|
| CPP-3-2 | 7.5% | Clearing point [° C.]: | 74.8 |
| CC-3-V1 | 9.0% | Δn (589 nm, 20° C.): | 0.1098 |
| CC-3-O1 | 1.5% | Δε (1 kHz, 20° C.): | −3.1 |
| CC-3-4 | 9.0% | $\varepsilon_{\parallel}$ (1 kHz, 20° C.): | 3.5 |
| CC-3-5 | 9.0% | $\varepsilon_{\perp}$ (1 kHz, 20° C.): | 6.6 |
| CCP-3-1 | 4.0% | $K_1$ (20° C.) [pN]: | 14.4 |
| CCP-V2-1 | 5.0% | $K_3$ (20° C.) [pN]: | 16.6 |
| CCY-3-O2 | 7.0% | $\gamma_1$ (20° C.) [mPa · s]: | 112 |
| CPY-2-O2 | 2.0% | $V_0$ (20° C.) [V]: | 2.44 |
| CPY-3-O2 | 10% | | |
| CY-3-O2 | 15% | | |
| CP-3-O1 | 3.0% | | |
| PY-3-O2 | 18% | | |

A polymerisable mixture was prepared by adding to nematic LC host mixture H36 0.3% of reactive mesogen 1 and 100 ppm of stabiliser S1-1.

H37: Nematic host mixture (Δε<0)

| | | | |
|---|---|---|---|
| CY-3-O2 | 10% | Clearing point [° C.]: | 100 |
| CY-3-O4 | 20% | Δn (589 nm, 20° C.): | 0.0865 |
| CY-5-O4 | 20% | Δε (1 kHz, 20° C.): | −5.4 |
| CCY-3-O2 | 6.0% | $\varepsilon_{\parallel}$ (1 kHz, 20° C.): | 3.9 |
| CCY-3-O3 | 6.0% | $\varepsilon_{\perp}$ (1 kHz, 20° C.): | 9.3 |
| CCY-4-O2 | 6.0% | $K_1$ (20° C.) [pN]: | 15.6 |
| CCY-5-O2 | 6.0% | $K_3$ (20° C.) [pN]: | 16.6 |
| CCZC-3-3 | 3.0% | $\gamma_1$ (20° C.) [mPa · s]: | 347 |
| CCZC-3-5 | 3.5% | $V_0$ (20° C.) [V]: | 1.84 |
| CCZC-4-3 | 3.5% | | |
| CCZC-4-5 | 3.5% | | |
| CCEPC-3-3 | 4.0% | | |
| CCEPC-3-4 | 4.5% | | |
| CCEPC-3-5 | 4.0% | | |

A polymerisable mixture was prepared by adding to nematic LC host mixture H37 0.5% of reactive mesogen 2, 0.6% of SA-additive SA-23, and 50 ppm of stabiliser S3-1.

H38: Nematic host mixture (Δε<0)

| | | | |
|---|---|---|---|
| Y-4O-O4 | 12.5% | Clearing point [° C.]: | 105 |
| CY-3-O4 | 5.0% | Δn (589 nm, 20° C.): | 0.0868 |
| CY-5-O4 | 18% | Δε (1 kHz, 20° C.): | −5.4 |
| CCY-3-O1 | 4.0% | $\varepsilon_{\parallel}$ (1 kHz, 20° C.): | 4.2 |
| CCY-3-O2 | 6.0% | $\varepsilon_{\perp}$ (1 kHz, 20° C.): | 9.6 |
| CCY-3-O3 | 6.0% | $K_1$ (20° C.) [pN]: | 16.7 |
| CCY-4-O2 | 6.0% | $K_3$ (20° C.) [pN]: | 16.5 |
| CCY-5-O2 | 6.0% | $\gamma_1$ (20° C.) [mPa · s]: | |
| CPY-3-O2 | 4.5% | $V_0$ (20° C.) [V]: | 1.85 |
| CCZC-3-3 | 4.0% | | |
| CCZC-3-5 | 4.0% | | |
| CCZC-4-3 | 4.0% | | |
| CCZC-4-5 | 4.0% | | |
| CCOC-3-3 | 2.0% | | |
| CCOC-4-3 | 2.0% | | |
| CCEPC-3-3 | 4.0% | | |
| CCEPC-3-4 | 4.0% | | |
| CCEPC-3-5 | 4.0% | | |

A polymerisable mixture was prepared by adding to nematic LC host mixture H38 0.5% of reactive mesogen 1 and 0.6% of SA-additive SA-23.

H39: Nematic host mixture (Δε<0)

| | | | |
|---|---|---|---|
| Y-4O-O4 | 3.0% | Clearing point [° C.]: | 108 |
| CY-3-O4 | 8.0% | Δn (589 nm, 20° C.): | 0.1096 |
| CCY-3-O1 | 4.0% | Δε (1 kHz, 20° C.): | −2.4 |
| CCY-3-O2 | 6.0% | $\varepsilon_{\parallel}$ (1 kHz, 20° C.): | 3.2 |
| CCY-3-O3 | 6.0% | $\varepsilon_{\perp}$ (1 kHz, 20° C.): | 5.6 |
| CPY-2-O2 | 8.0% | $K_1$ (20° C.) [pN]: | 16.3 |
| CPY-3-O2 | 8.0% | $K_3$ (20° C.) [pN]: | 18.9 |
| CP-3-O1 | 5.5% | $\gamma_1$ (20° C.) [mPa · s]: | |
| CC-4-V | 15% | $V_0$ (20° C.) [V]: | 2.99 |
| CC-3-V1 | 5.5% | | |
| CCP-V-1 | 13% | | |
| CCP-V2-1 | 13% | | |
| CPTP-3-O1 | 5.0% | | |

A polymerisable mixture was prepared by adding to nematic LC host mixture H39 1.0% of reactive mesogen 2 and 0.6% of SA-additive SA-23.

H40: Nematic host mixture (Δε<0)

| | | | |
|---|---|---|---|
| CY-3-O4 | 16% | Clearing point [° C.]: | 109 |
| CCY-3-O1 | 4.0% | Δn (589 nm, 20° C.): | 0.0854 |
| CCY-3-O2 | 6.0% | Δε (1 kHz, 20° C.): | −2.3 |
| CCY-3-O3 | 6.0% | $\varepsilon_{\parallel}$ (1 kHz, 20° C.): | 3.1 |
| CCY-4-O2 | 6.0% | $\varepsilon_{\perp}$ (1 kHz, 20° C.): | 5.4 |
| CCY-5-O2 | 5.0% | $K_1$ (20° C.) [pN]: | 16.3 |

-continued

| | | | |
|---|---|---|---|
| CC-3-O1 | 6.0% | $K_3$ (20° C.) [pN]: | 19.4 |
| CC-4-V | 15% | $\gamma_1$ (20° C.) [mPa · s]: | |
| CC-3-V1 | 6.0% | $V_0$ (20° C.) [V]: | 3.08 |
| CCP-V-1 | 13% | | |
| CCP-V2-1 | 13% | | |
| CCEPC-3-3 | 4.0% | | |

A polymerisable mixture was prepared by adding to nematic LC host mixture H40 0.5% of reactive mesogen 1 and 0.6% of SA-additive SA-23.

H41: Nematic host mixture (Δε<0)

| | | | |
|---|---|---|---|
| Y-4O-O4 | 10% | Clearing point [° C.]: | 107 |
| CY-3-O2 | 7.0% | Δn (589 nm, 20° C.): | 0.1104 |
| CY-3-O4 | 15% | Δε (1 kHz, 20° C.): | −6 |
| CCY-3-O1 | 4.0% | $\varepsilon_{\parallel}$ (1 kHz, 20° C.): | 4.3 |
| CCY-3-O2 | 6.0% | $\varepsilon_{\perp}$ (1 kHz, 20° C.): | 10.3 |
| CCY-3-O3 | 6.0% | $K_1$ (20° C.) [pN]: | 15.7 |
| CCY-4-O2 | 6.0% | $K_3$ (20° C.) [pN]: | 19.1 |
| CCY-5-O2 | 6.0% | $\gamma_1$ (20° C.) [mPa · s]: | |
| CPY-2-O2 | 9.0% | $V_0$ (20° C.) [V]: | 1.88 |
| CPY-3-O2 | 9.0% | | |
| CCP-V-1 | 8.5% | | |
| CCEPC-3-3 | 4.0% | | |
| CCEPC-3-4 | 4.0% | | |
| CCEPC-3-5 | 3.5% | | |
| CGPC-3-3 | 2.0% | | |

A polymerisable mixture was prepared by adding to nematic LC host mixture H41 0.3% of reactive mesogen 1 and 100 ppm of stabiliser S1-1.

H42: Nematic host mixture (Δε<0)

| | | | |
|---|---|---|---|
| Y-4O-O4 | 10% | Clearing point [° C.]: | 108 |
| CY-3-O2 | 4.0% | Δn (589 nm, 20° C.): | 0.1403 |
| CY-3-O4 | 15% | Δε (1 kHz, 20° C.): | −6.4 |
| CCY-3-O1 | 4.0% | $\varepsilon_{\parallel}$ (1 kHz, 20° C.): | 4.3 |
| CCY-3-O2 | 6.0% | $\varepsilon_{\perp}$ (1 kHz, 20° C.): | 10.7 |
| CCY-3-O3 | 6.0% | $K_1$ (20° C.) [pN]: | 16.8 |
| CCY-4-O2 | 6.0% | $K_3$ (20° C.) [pN]: | 20.5 |
| CLY-3-O2 | 5.0% | $\gamma_1$ (20° C.) [mPa · s]: | |
| CPY-2-O2 | 5.0% | $V_0$ (20° C.) [V]: | 1.89 |
| CPY-3-O2 | 5.0% | | |
| PTY-3-O2 | 10% | | |
| PTY-5-O2 | 10% | | |
| CCP-V-1 | 7.0% | | |
| CCP-V2-1 | 7.0% | | |

A polymerisable mixture was prepared by adding to nematic LC host mixture H42 1.0% of reactive mesogen 3, 0.6% of SA-additive SA-23, and 50 ppm of stabiliser S3-2.

H43: Nematic host mixture (Δε<0)

| | | | |
|---|---|---|---|
| Y-4O-O4 | 10% | Clearing point [° C.]: | 109 |
| CCY-3-O1 | 5.0% | Δn (589 nm, 20° C.): | 0.1405 |
| PTY-3-O2 | 3.0% | Δε (1 kHz, 20° C.): | −2 |
| PTY-3-O2 | 10% | $\varepsilon_{\parallel}$ (1 kHz, 20° C.): | 3.4 |
| PTY-5-O2 | 10% | $\varepsilon_{\perp}$ (1 kHz, 20° C.): | 5.4 |
| CP-3-O1 | 4.0% | $K_1$ (20° C.) [pN]: | 16.5 |
| CC-4-V | 15% | $K_3$ (20° C.) [pN]: | 19.9 |
| CC-3-V1 | 8.0% | $\gamma_1$ (20° C.) [mPa · s]: | |
| CCP-V-1 | 13% | $V_0$ (20° C.) [V]: | 3.34 |
| CCP-V2-1 | 13% | | |
| CPTP-3-1 | 4.5% | | |
| CPTP-3-2 | 4.5% | | |

A polymerisable mixture was prepared by adding to nematic LC host mixture H43 0.6% of reactive mesogen 1 and 0.6% of SA-additive SA-23.

H44: Nematic host mixture (Δε<0)

| | | | |
|---|---|---|---|
| CY-3-O4 | 13% | Clearing point [° C.]: | 107 |
| CCY-3-O1 | 4.0% | Δn (589 nm, 20° C.): | 0.082 |
| CCY-3-O2 | 5.0% | Δε (1 kHz, 20° C.): | −2 |
| CCY-3-O3 | 5.0% | $\varepsilon_{\parallel}$ (1 kHz, 20° C.): | 3 |
| CCY-4-O2 | 5.0% | $\varepsilon_{\perp}$ (1 kHz, 20° C.): | 5 |
| CCY-5-O2 | 5.0% | $K_1$ (20° C.) [pN]: | 16.3 |
| CC-3-O1 | 13% | $K_3$ (20° C.) [pN]: | 19.2 |
| CC-4-V | 12% | $\gamma_1$ (20° C.) [mPa · s]: | |
| CC-3-V1 | 6.0% | $V_0$ (20° C.) [V]: | 3.29 |
| CCP-V-1 | 13% | | |
| CCP-V2-1 | 13% | | |
| CCZC-3-3 | 3.0% | | |
| CCEPC-3-3 | 3.0% | | |

A polymerisable mixture was prepared by adding to nematic LC host mixture H44 0.5% of reactive mesogen 2 and 0.6% of SA-additive SA-23.

H45: Nematic host mixture (Δε<0)

| | | | |
|---|---|---|---|
| Y-4O-O4 | 5.0% | Clearing point [° C.]: | 107 |
| CY-3-O4 | 15% | Δn (589 nm, 20° C.): | 0.0821 |
| CY-5-O4 | 14.5% | Δε (1 kHz, 20° C.): | −4.5 |
| CCY-3-O1 | 5.0% | $\varepsilon_{\parallel}$ (1 kHz, 20° C.): | 3.7 |
| CCY-3-O2 | 6.0% | $\varepsilon_{\perp}$ (1 kHz, 20° C.): | 8.2 |
| CCY-3-O3 | 6.0% | $K_1$ (20° C.) [pN]: | 16 |
| CCY-4-O2 | 6.0% | $K_3$ (20° C.) [pN]: | 17 |
| CCY-5-O2 | 6.0% | $\gamma_1$ (20° C.) [mPa · s]: | |
| CC-4-V | 8.5% | $V_0$ (20° C.) [V]: | 2.04 |
| CCZC-3-3 | 3.0% | | |
| CCZC-3-5 | 3.0% | | |
| CCZC-4-3 | 3.0% | | |
| CCZC-4-5 | 3.0% | | |
| CCOC-3-3 | 4.0% | | |
| CCEPC-3-3 | 4.0% | | |
| CCEPC-3-4 | 4.0% | | |
| CCEPC-3-5 | 4.0% | | |

A polymerisable mixture was prepared by adding to nematic LC host mixture H45 0.5% of reactive mesogen 1 and 0.6% of SA-additive SA-23.

H46: Nematic host mixture (Δε<0)

| | | | |
|---|---|---|---|
| B-2O-O5 | 4.0% | Clearing point [° C.]: | 75 |
| CPP-3-2 | 4.5% | Δn (589 nm, 20° C.): | 0.1095 |
| CC-3-V1 | 9.0% | Δε (1 kHz, 20° C.): | −3.1 |
| CC-3-O1 | 3.0% | $\varepsilon_{\parallel}$ (1 kHz, 20° C.): | 3.6 |
| CC-3-4 | 9.0% | $\varepsilon_{\perp}$ (1 kHz, 20° C.): | 6.7 |
| CC-3-5 | 9.0% | $K_1$ (20° C.) [pN]: | 14.5 |
| CCP-3-1 | 8.0% | $K_3$ (20° C.) [pN]: | 16.7 |
| CCP-V2-1 | 5.0% | $\gamma_1$ (20° C.) [mPa · s]: | 109 |
| CCY-3-O2 | 6.0% | $V_0$ (20° C.) [V]: | 2.43 |
| CPY-3-O2 | 10.5% | | |
| CY-3-O2 | 9.5% | | |
| CP-3-O1 | 4.5% | | |
| PY-3-O2 | 18% | | |

A polymerisable mixture was prepared by adding to nematic LC host mixture H46 0.6% of reactive mesogen 2 and 0.6% of SA-additive SA-23.

H47: Nematic host mixture (Δε<0)

| | | | |
|---|---|---|---|
| B-2O-O5 | 4.0% | Clearing point [° C.]: | 75.2 |
| CPP-3-2 | 12% | Δn (589 nm, 20° C.): | 0.1101 |
| CC-3-V1 | 9.0% | Δε (1 kHz, 20° C.): | −3.1 |
| CC-3-5 | 5.5% | $\varepsilon_{\parallel}$ (1 kHz, 20° C.): | 3.6 |
| CCP-3-1 | 5.5% | $\varepsilon_{\perp}$ (1 kHz, 20° C.): | 6.7 |
| CCP-V2-1 | 5.0% | $K_1$ (20° C.) [pN]: | 13 |
| CCY-3-O2 | 4.0% | $K_3$ (20° C.) [pN]: | 16.3 |
| CLY-3-O2 | 1.0% | $\gamma_1$ (20° C.) [mPa · s]: | 121 |
| CPY-2-O2 | 2.5% | $V_0$ (20° C.) [V]: | 2.39 |
| CPY-3-O2 | 10.5% | | |
| CY-3-O2 | 15% | | |
| CY-3-O4 | 11% | | |
| CP-3-O1 | 15% | | |

A polymerisable mixture was prepared by adding to nematic LC host mixture H47 0.5% of reactive mesogen 1 and 0.6% of SA-additive SA-23.

USE EXAMPLES

Use Example A

A1) Host Mixture

H48: Nematic Host Mixture (Δε<0)

| | | | |
|---|---|---|---|
| BCH-32 | 6.50% | cl. p. | 74.7° C. |
| CC-3-V1 | 8.00% | Δη | 0.1039 |
| CCH-23 | 17.00% | Δε | −3.0 |
| CCH-34 | 6.50% | $\varepsilon_{\parallel}$ | 3.4 |
| CCY-3-O1 | 3.50% | $K_1$ | 14.8 |
| CCY-3-O2 | 12.50% | $K_3$ | 15.8 |
| CPY-2-O2 | 5.50% | $\gamma_1$ | 106 mPa s |
| CPY-3-O2 | 10.00% | | |
| CY-3-O2 | 15.50% | | |
| PCH-301 | 4.50% | | |
| PP-1-2V1 | 5.00% | | |
| PY-3-O2 | 5.50% | | |

A2) Polymerisable Mixtures P11-P15, PC11

Polymerisable mixtures P11-P15 were prepared by adding to nematic LC host mixture H48 one of reactive mesogens 1-3 in different concentrations and further adding SA-additive SA-23.

For comparison purposes the polymerisable mixture PC11 was prepared by adding to nematic LC host mixture H48 the reactive mesogen C1 of prior art and SA-additive SA-23.

C1

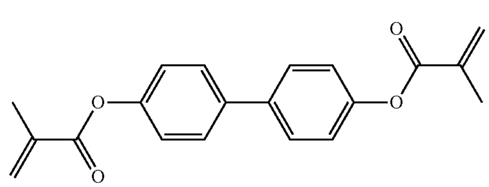

1

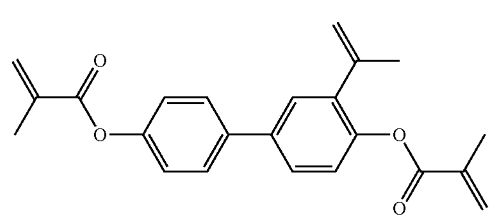

-continued

2

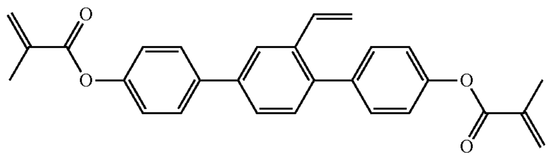

3

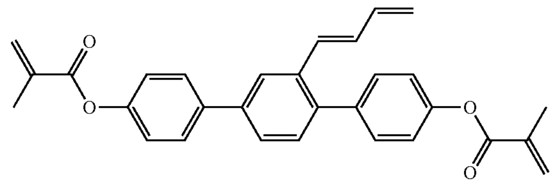

SA-23

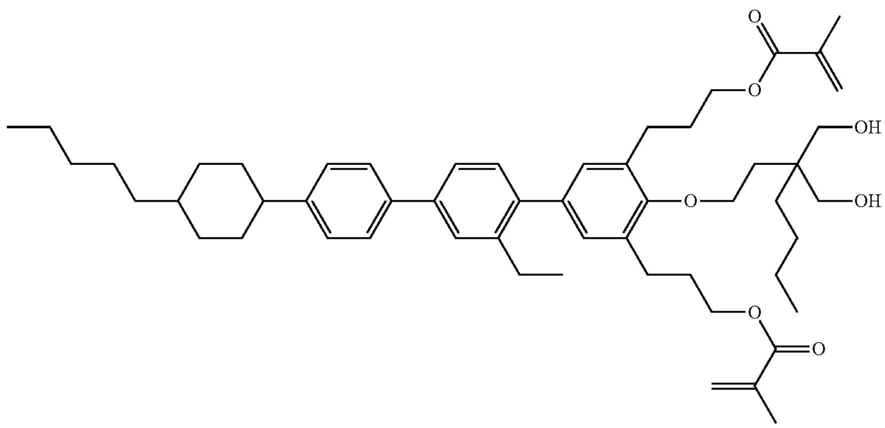

The compositions of the individual polymerisable mixtures are shown in Table 1.

TABLE 1

| Polymerisable mixture composition | | | | | | |
|---|---|---|---|---|---|---|
| Mix. No. | PC11 | P11 | P12 | P13 | P14 | P15 |
| LC Host | H48 | H48 | H48 | H48 | H48 | H48 |
| RM | C1 | 1 | 1 | 2 | 2 | 3 |
| wt. % RM | 0.3% | 0.5% | 1.0% | 0.5% | 1.0% | 0.5% |
| wt. % SA-23 | 0.6% | 0.6% | 0.6% | 0.6% | 0.6% | 0.6% |

A3) Test Cells

The individual polymerisable mixtures from Table 1 were filled into SA-VA test cells, the polymerisable compounds were photopolymerised by UV exposure under application of a voltage of 0 V.

The test cells used were SA-VA resinBM cells without PI. Afterwards the test cells were irradiated by UV light in two steps:

UV1: UV irradiation at 100 mW/cm$^2$ (measured with Hönle 365 nm Sensor). Lamp type: Hönle MH lamp UV—A Cube 2000. Cut-off filter 320 nm. Applied voltage 0 V. Temperature 40° C. Irradiation time 2 min.

UV2: C-Type fluorescent UV lamp, room temperature, 120 min.

The total reflectivity averaged over wavelengths between 400 nm and 700 nm after UV exposure was measured for each polymerised mixture with a spectral photometer CM-700d (Konica Minolta). The results are shown in Table 2.

TABLE 2

| Reflectivity | | | | | | |
|---|---|---|---|---|---|---|
| Mix. No. | PC11 | P11 | P12 | P13 | P14 | P15 |
| Reflectivity after UV | 10.3 | 9.6 | 9.4 | 976 | 9.5 | 9.5 |

It can be seen that the polymerisable LC media P11-P15 according to the present invention, which contain the reactive mesogen 1, 2 or 3 of formula I, show a reduced reflectivity compared to the polymerisable LC medium PC11 which contains reactive mesogen C1 according to prior art.

The polymerisable LC media P11-P15 are therefore especially suitable for use in polymer stabilised SA-VA-displays

Use Example B

B1) Host Mixture

H49: Nematic host mixture ($\Delta\varepsilon$<0)

| | | | |
|---|---|---|---|
| CCH-501 | 9.00% | cl. p. | 70.0° C. |
| CCH-35 | 14.00% | $\Delta\eta$ | 0.0825 |
| PCH-53 | 8.00% | $\Delta\varepsilon$ | −3.5 |

-continued

| | | | |
|---|---|---|---|
| CY-3-O4 | 14.00% | $\varepsilon_{\parallel}$ | 3.5 |
| CY-5-O4 | 13.00% | $K_3/K_1$ | 1.00 |
| CCY-2-1 | 9.00% | $\gamma_1$ | 141 mPa s |
| CCY-3-1 | 9.00% | $V_0$ | 2.10 V |
| CCY-3-O2 | 8.00% | | |
| CCY-5-O2 | 8.00% | | |
| CPY-2-O2 | 8.00% | | |

B2) Polymerisable mixtures P22, P23, PC21

Polymerisable mixtures P22 and P23 according to the present invention were prepared by adding reactive mesogens 2 or 3 to nematic LC host mixture H49, respectively.

For comparison purpose, the polymerisable mixture PC21 was prepared by adding reactive mesogen C1 of prior art to nematic LC host mixture H49.

The compositions of the individual polymerisable mixtures are shown in Table 3.

TABLE 3

| Polymerisable mixture composition | | | |
|---|---|---|---|
| Mix. No. | PC21 | P22 | P23 |
| LC Host | H49 | H49 | H49 |
| RM | C1 | 2 | 3 |
| wt. % RM | 0.3% | 0.3% | 0.3% |

B3) Test Cells

The individual polymerisable mixtures from Table 3 were filled into test cells, the RM was photopolymerised by UV exposure under application of a voltage, leading to generation of a tilt angle, and several properties like VHR before and after UV stress, tilt angle generation and residual RM content were measured.

VHR

The VHR of the polymerisable LC media was measured at 100° C. with application of a voltage of 1 V/60 Hz before and after UV illumination. The sun-test consists of 2 h illumination by a Xenon lamp type Atlas Suntest CPS+ with a light intensity of 765 $W/m^2$ at 20° C.

Light stress usually causes the decrease of VHR in LC mixtures, therefore the smaller the absolute decrease of VHR value after stress, the better performance for display applications. The results are shown in Table 4.

TABLE 4

| VHR | | |
|---|---|---|
| Mixture | VHR (%) Initial | VHR (%) 2 h suntest |
| PC21 | 98.2 | 97.6 |
| P22 | 98.8 | 98.5 |
| P23 | 99.2 | 98.5 |

From Table 4 it can be seen that the VHR values of the polymerisable LC media P22 and P23 according to the present invention, which contain the reactive mesogen 2 or 3 of formula I, are higher compared to the polymerisable LC medium PC21 which contains reactive mesogen C1 according to prior art.

Tilt Angle

The UV photopolymerization was carried out by illumination under a metal halide lamp (UC cube 2000) using a 320 nm long pass filter and a light intensity of 100 $mW/cm^2$. The test cells were given at least 12 hours to relax before the final tilt angle was measured and calculated with an Axometrics AxoScan®.

The results are shown in Table 5.

TABLE 5

| Tilt angle | | | | | | | |
|---|---|---|---|---|---|---|---|
| Mixture | UV Time/sec | 0 | 30 | 60 | 120 | 240 | 360 |
| PC21 | Tilt/° | 89.6 | 89.7 | 89.7 | 84.9 | 79.8 | 77.5 |
| P22 | | 88.9 | 89.1 | 88.2 | 76.6 | 71.1 | 70.2 |
| P23 | | 89.6 | 89.7 | 89.7 | 86.5 | 78.7 | 74.1 |

It can be seen that the tilt angles generated in the mixtures with reactive mesogens 2 and 3 are comparable to or lower than in the mixtures with reactive mesogen C1.

From Table 5 it can be seen that the tilt angles generated in the polymerisable LC media P22 and P23 according to the present invention, which contain the reactive mesogen 2 or 3 of formula I, are comparable to or lower (meaning stronger tilt) than the tilt angles generated in the polymerisable LC medium PC21 which contains reactive mesogen C1 according to prior art.

Residual RM

The residual content of unpolymerised RM (in % by weight) in the mixture was determined after UV photopolymerisation. The smaller the residual RM content after a given time interval, the faster the polymerization. For this purpose the polymerisable mixtures were filled in test cells and polymerised as described above. After photopolymerisation the test cells were opened, and the mixture was dissolved and rinsed out of the test cell with 2 ml ethyl methyl ketone and analyzed by High Performance Liquid Chromatography (HPLC).

The results are shown in Table 6.

TABLE 6

| residual RM | | | | | |
|---|---|---|---|---|---|
| Mixture | UV Time/sec | 0 | 120 | 240 | 360 |
| PC21 | residual RM/% | 0.300 | 0.264 | 0.203 | 0.173 |
| P22 | | 0.300 | 0.178 | 0.058 | 0.017 |
| P23 | | 0.300 | — | 0.034 | 0.000 |

From Table 6 it can be seen that the polymerisation in the polymerisable LC media P22 and P23 according to the present invention, which contain the reactive mesogen 2 or 3 of formula I, is faster and more complete, with less amount of residual monomer, compared to the polymerisable LC medium PC21 which contains reactive mesogen C1 according to prior art.

The polymerisable LC media P22 and P23 are therefore especially suitable for use in PS-VA-displays.

Use Example C

C1) Polymerisable mixtures P16-P110

Polymerisable mixtures P16-P110 were prepared by adding to nematic LC host mixture H48 various combinations of reactive mesogens 1-3 in different concentrations and further adding SA-additive SA-23.

TABLE 7

| Polymerisable mixture composition | | | | | | |
|---|---|---|---|---|---|---|
| Mix. No. | PC11 | P16 | P17 | P18 | P19 | P110 |
| LC Host | H48 | H48 | H48 | H48 | H48 | H48 |
| $1^{st}$ RM | C1 | C1 | 1 | 2 | C1 | 2 |
| wt. % $1^{st}$ RM | 0.3% | 0.4% | 0.6% | 1 | 0.5% | 0.5% |
| $2^{nd}$ RM | — | 1 | 2 | 3 | 1 | 1 |
| wt. % $2^{nd}$ RM | — | 0.6% | 0.4% | 1% | 1.5% | 1.5% |
| wt. % SA-23 | 0.6% | 0.6% | 0.6% | 0.6% | 0.6% | 0.6% |

C2) Test Cells

The individual polymerisable mixtures from Table 7 were filled into SA-VA resinBM cells without P1. The RMs and additives were photopolymerised by UV exposure as described in Example 1. The reflectivity of the cells was measured after the UV exposure and is shown in Table 8.

TABLE 8

| Reflectivity | | | | | | |
|---|---|---|---|---|---|---|
| Mix. No. | PC11 | P16 | P17 | P18 | P19 | P110 |
| Reflectivity after UV | 11.1 | 10.4 | 10.2 | 9.6 | 9.6 | 10.0 |

It can be seen that the polymerisable LC media P161-P110 according to the present invention, which contain at least one reactive mesogen 1, 2 or 3 of formula I, show significantly lower reflectivity after UV exposure, compared to the polymerisable LC medium PC11 which does only contain reactive mesogen C1 according to prior art.

The polymerisable LC media P16-P110 are therefore especially suitable for use in polymer stabilised SA-VA-displays.

Use Example D

D1) Polymerisable mixtures P111, P112

Polymerisable mixtures P111 and P112 were prepared by adding to nematic LC host mixture H48 various combinations of reactive mesogens C1, 2 and 4 in different concentrations and further adding SA-additive SA-23.

4

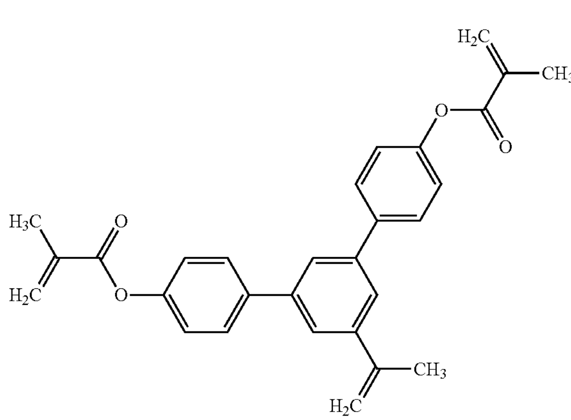

TABLE 9

| Polymerisable mixture composition | | | |
|---|---|---|---|
| Mix. No. | PC11 | P111 | P112 |
| LC Host | H48 | H48 | H48 |
| RM | 0.3% C1 | 1.0% 4 | 0.3% C1<br>0.3% 2<br>0.5% 4 |
| SA-23 | 0.6% | 0.6% | 0.6% |

The individual polymerisable mixtures from Table 9 were filled into SA-VA resinBM cells without P1. The RMs and additives were photopolymerised by UV exposure as described in Example 1. The reflectivity of the cells was measured after the UV exposure and is shown in Table 10.

TABLE 10

| Reflectivity | | | |
|---|---|---|---|
| Mix. No. | PC11 | P111 | P112 |
| Reflectivity after UV | 11.1 | 10.3 | 9.8 |

It can be seen that the polymerisable LC media P111-P112 according to the present invention, which contain various combinations of the reactive mesogen 2, 4 of formula I, show significantly lower reflectivity after UV exposure, compared to the polymerisable LC medium PC11 which does only contain reactive mesogen C1 according to prior art.

The invention claimed is:

1. An LC medium comprising a polymerisable component A) comprising, one or more polymerisable compounds, wherein at least one of said polymerisable compounds is a compound of formula I, a liquid-crystalline component B), wherein said a liquid-crystalline component B is a LC host mixture comprising one or more mesogenic or liquid-crystalline compounds, optionally one or more additives selected from the group consisting of self-alignment additives for vertical alignment of formula II and stabilizers $$P\text{-}Sp—A^1\text{-}(Z^1—A^2)_z\text{-}R^b \quad \text{I}$$

$$MES\text{-}R^a \quad \text{II}$$

wherein the individual radicals, independently of each other and on each occurrence identically or differently, have the following meanings $R^b$ P-Sp- or R, R is F, Cl, —CN or a straight chain alkyl having 1 to 25 C atoms, or a branched or cyclic alkyl having 3 to 25 C atoms, wherein one or more non-adjacent $CH_2$-groups are optionally replaced by —O—, —S—, —CO—, —CO—O—, —O—CO—, or —O—CO—O— in such a manner that O- and/or S-atoms are not directly connected with each other, and wherein one or more H atoms are each optionally replaced by F or Cl, P is selected from the group consisting of vinyloxy, acrylate, methacrylate, fluoroacrylate, chloroacrylate, oxetane and epoxide, Sp is a spacer group which is optionally substituted by P, or a single bond, $A^1$ $A^2$ are a monocyclic or polycyclic aromatic or heteroaromatic group with 4 to 20 ring atoms, which is optionally substituted by one or more groups L, A or P-Sp-, wherein the compounds of formula I contain at least one group $A^1$ or $A^2$ that is substituted by at least one group A, $Z^1$ is —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —CH═CF—, —CF═CH—, —C≡C—, —CH═CH—CO—O—, —O—CO—CH═CH—, —$CH_2$—$CH_2$—CO—O—, —O—CO—$CH_2$—$CH_2$—, —$CR^0R^{00}$—, or a single bond, $R^0$, $R^{00}$ are H or alkyl having 1 to 12 C atoms, A is —CH═$CH_2$, —$CH_2$—CH═$CH_2$, —CH═CH—$CH_3$, —CH═CH—CH═$CH_2$ or —C($CH_3$)═$CH_2$, L is F, Cl, —CN, P-Sp- or a straight chain alkyl having 3 to 25 C atoms, or a branched or cyclic alkyl having 3 to 25 C atoms, wherein one or more non-adjacent $CH_2$-groups are optionally replaced by —O—, —S—, —CO—, —CO—O—, —O—CO—, —O—CO—O-in such a manner that O- and/or S-atoms are not directly connected with each other, and wherein one or more H atoms are each optionally replaced by P-Sp-, F or Cl, z is 0, 1, 2 or 3, n1 is 1, 2, 3 or 4, MES is a calamitic mesogenic group containing two or more rings, which are connected directly or indirectly to each other or which are condensed to each other, which are optionally substituted and which mesogenic group is optionally substituted additionally by one or more polymerizable groups, which are connected to MES directly or via a spacer, and $R^a$ a polar anchor group, residing in a terminal position of the calamitic mesogenic group MES which comprises at least one carbon atom and at least one group selected from —OH, —SH, —COOH, —CHO or primary or secondary amine function, which optionally contains one or two polymerizable groups P, wherein —$A^1$-($Z^1$—$A^2$)$_z$- in formula I denotes benzene, biphenylene, p-terphenylene (1,4-diphenylbenzene), m-terphenylene (1,3-diphenylbenzene), naphthylene, 2-phenyl-naphthylene, phenanthrene, anthracene, dibenzofuran or dibenzothiophene, all of which are optionally substituted by one or more groups A, L or P-Sp- and are at least monosubstituted by A.

2. The LC medium according to claim 1, wherein for the compounds of formula I, $A^1$ and $A^2$ denote benzene, naphthalene, phenanthrene or anthracene, which is optionally substituted by one or more groups A, L or P-Sp-, and wherein at least one group $A^1$ or $A^2$ is substituted by at least one group A, or $A^1$, $A^2$ and $Z^1$ together form a fused aromatic or heteroaromatic group with 8 to 30 ring atoms which is optionally substituted by one or more groups A, L or P-Sp- and is at least monosubstituted by A.

3. The LC medium according to claim 1, wherein the group —$A^1$-($Z^1$—$A^2$)$_z$- in formula I is selected from the following subformulae

A1

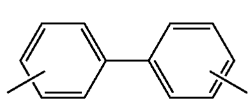

A2

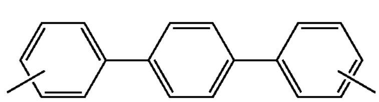

-continued

A3

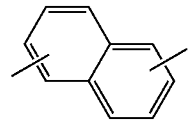

A4

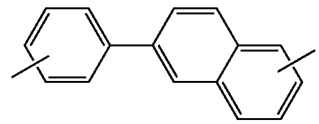

A5

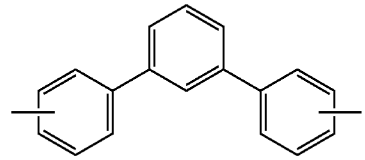

A6

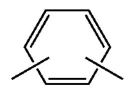

wherein the benzene rings are optionally further substituted by one or more groups A, L or P-Sp- as defined for formula I, and at least one benzene ring is substituted by at least one group A as defined for formula I.

4. The LC medium according to claim 1, wherein the compounds of formula I are selected from the following subformulae:

I1

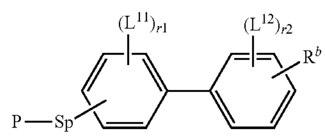

I2

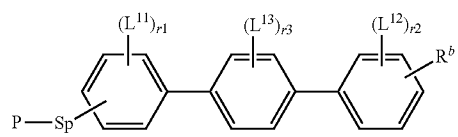

I3

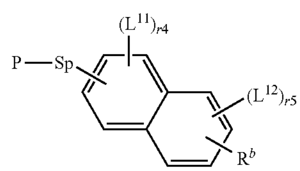

I4a

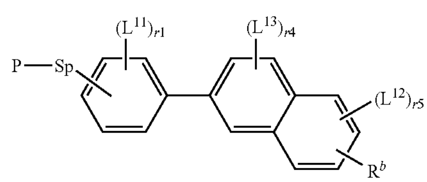

I4b

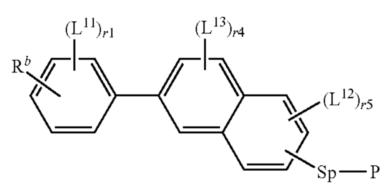

-continued

I5

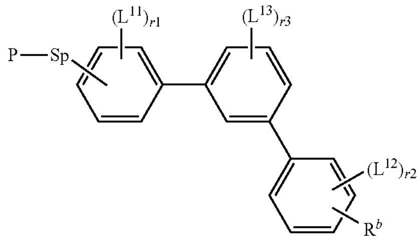

I6

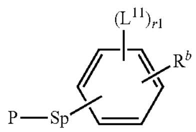

wherein the individual radicals, independently of each other, and on each occurrence identically or differently, have the following meanings A, P, Sp, $R^b$ have one of the meanings given for formula I, $L^{11}$, $L^{12}$, $L^{13}$ are L or A, r1, r2, r3 are 0, 1, 2, 3 or 4, wherein r1+r2+r3 ≥1, r4, r5 are 0, 1, 2 or 3, wherein in formula I3 r4+r5 ≥1 and in formula I4a and I4b r1+r4+r5≥1, wherein the compounds contain at least a group $L^{11}$, $L^{12}$ or $L^{13}$ that is A.

5. The LC medium according to claim 4, wherein the compounds of formula I are selected from the following subformulae:

I1A

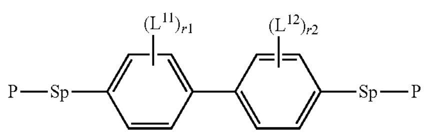

I1B

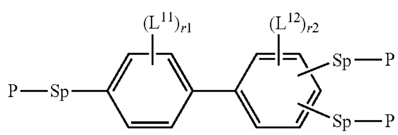

I1C

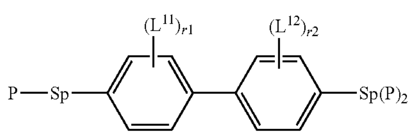

I2A

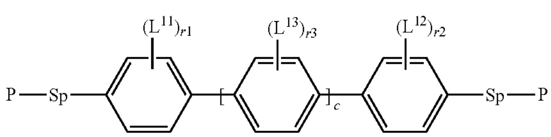

I2B

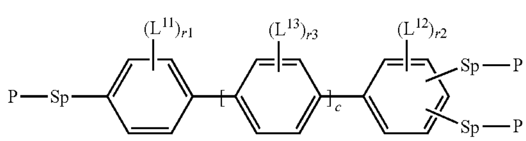

-continued

I2C

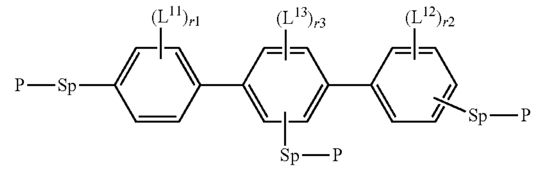

I2D

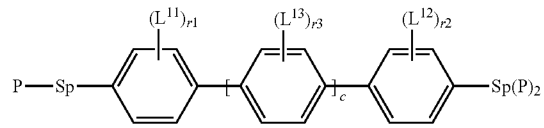

I3A

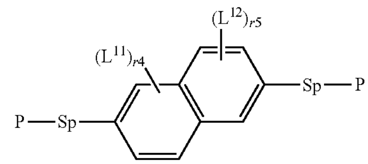

I3B

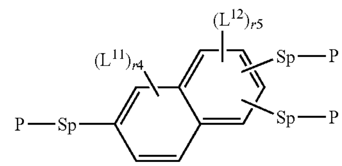

I3C

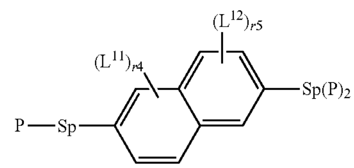

I4A

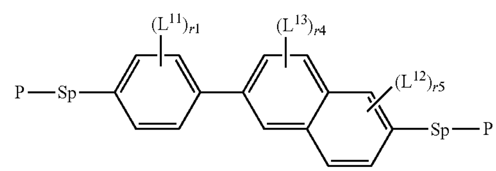

I4B

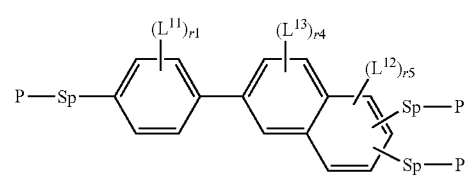

I4C

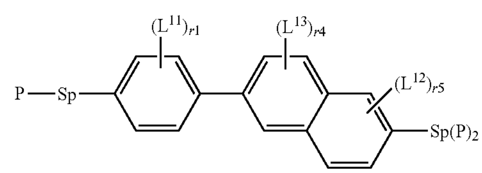

I4D

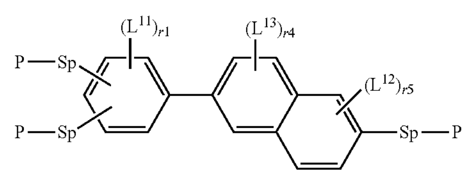

-continued

I4E

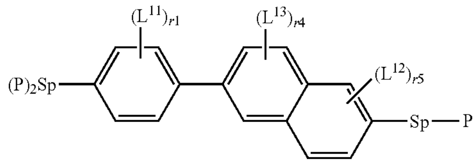

I5A

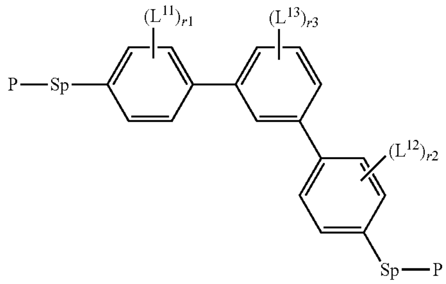

I5B

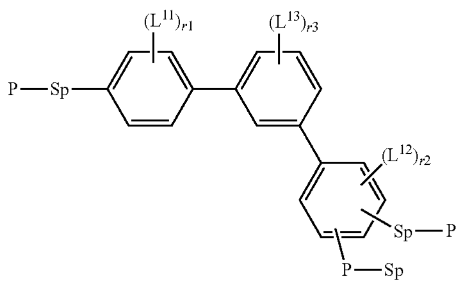

I5C

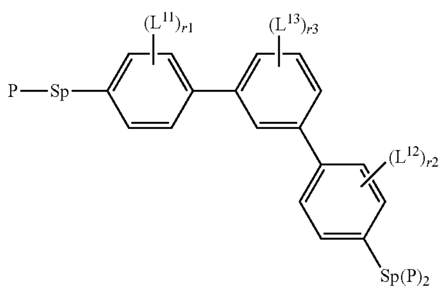

I5D

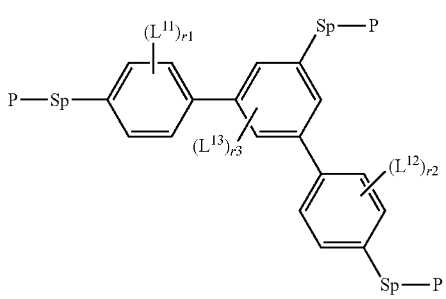

I6A

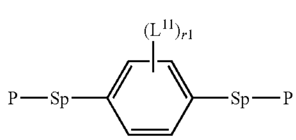

I6B

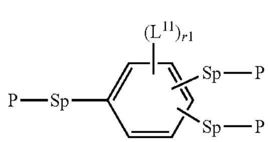

-continued

I6C

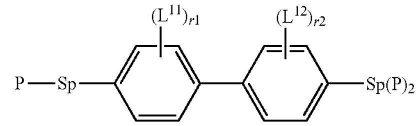

wherein P, Sp, $L^{11-13}$ and r1-r5 have the meanings given for formula I, $Sp(P)_2$ denotes a spacer group Sp that is substituted by two polymerisable groups P at identical or different positions, wherein r1+r2+r3≥1, in formula I3 r4+r5≥1, and in formula I4A to I4E r1+r4+r5≥1, and wherein the compounds contain at least a group $L^{11}$, $L^{12}$ or $L^{13}$ that is A.

6. The LC medium according to claim 1, wherein the compounds of formula I are selected from the following subformulae:

I1A-1

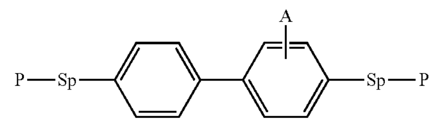

I1A-2

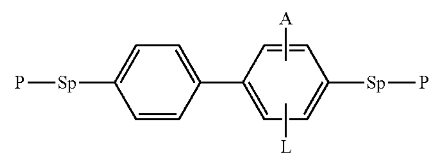

I1A-3

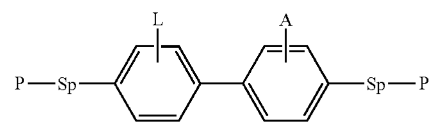

I1A-4

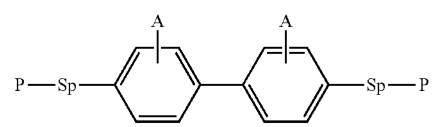

I1A-5

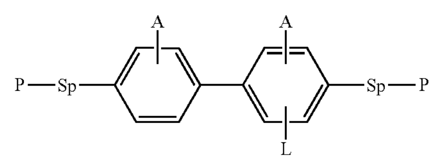

I1A-6

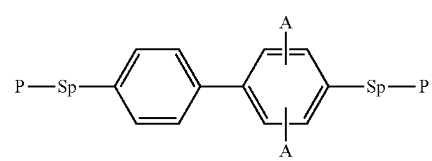

I1A-7

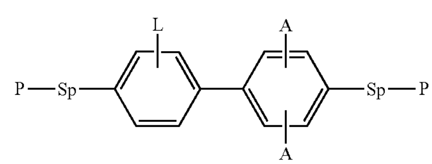

I1B-1

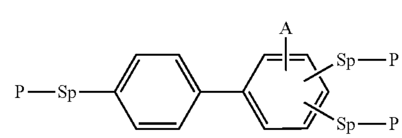

-continued
I1B-2
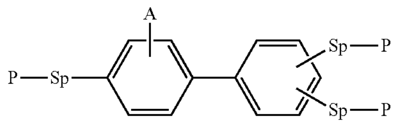
I1B-3
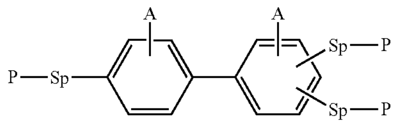
I1B-4
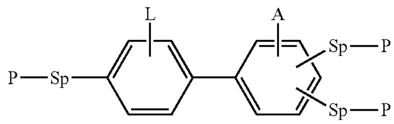
I1B-5
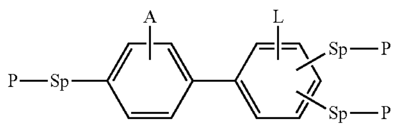
I1B-6
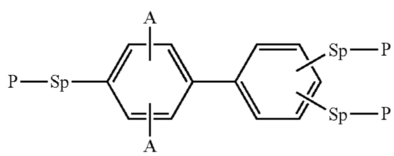
I1B-7
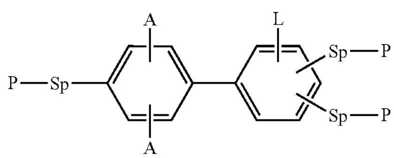
I1B-8
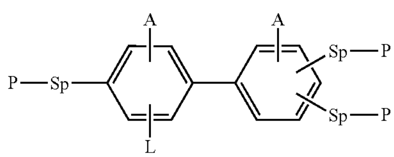
I1C-1
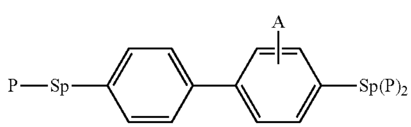
I1C-2
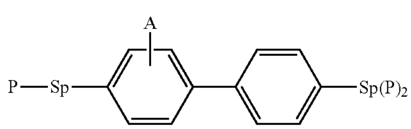
I1C-3
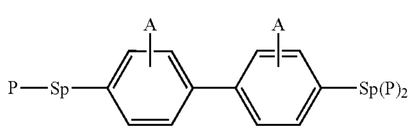
I1C-4
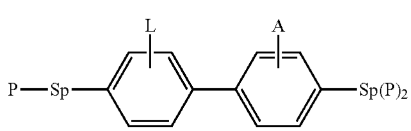
-continued
I1C-5
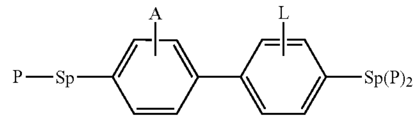
I1C-6
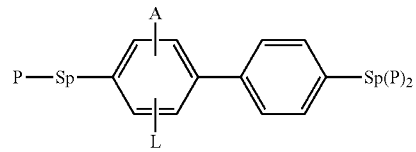
I1C-7
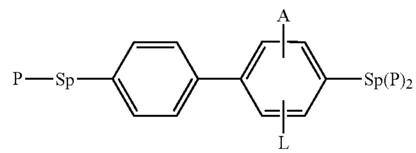
I1C-8
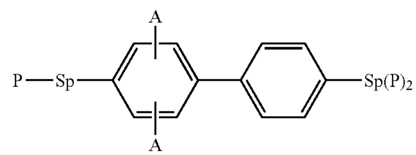
I1C-9
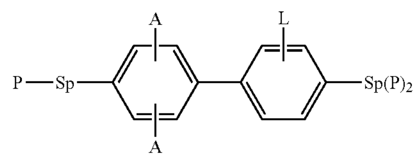
I1C-10
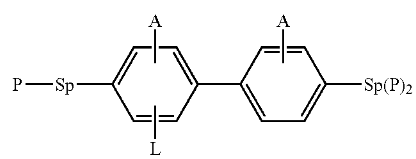
I1C-11
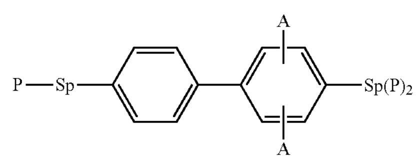
I1C-12
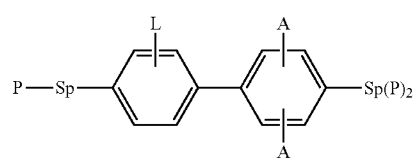
I1C-13
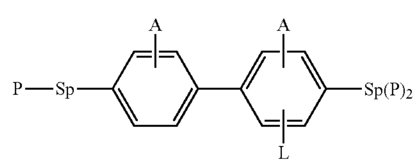
I1D-1
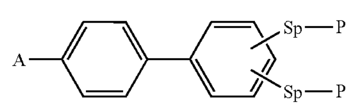

-continued
I1D-2
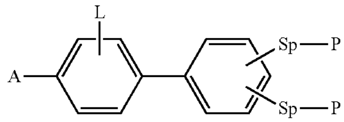
I1D-3
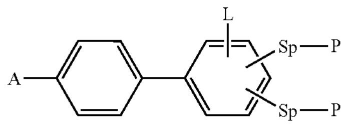
I1D-4
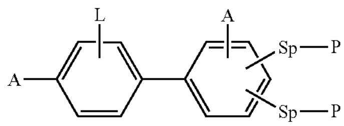
I1D-5
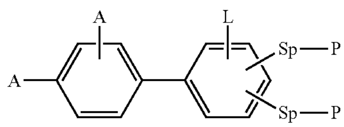
I2A-1
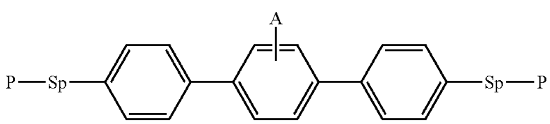
I2A-2
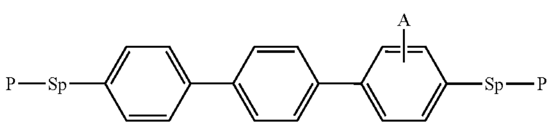
I2A-3
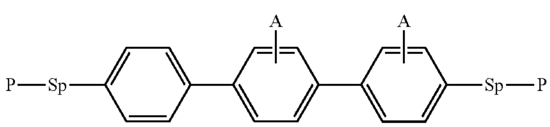
I2A-4
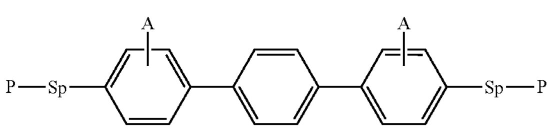
I2A-5
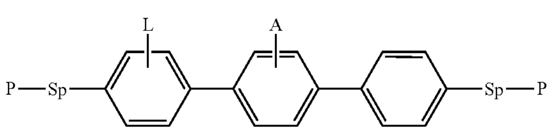
I2A-6
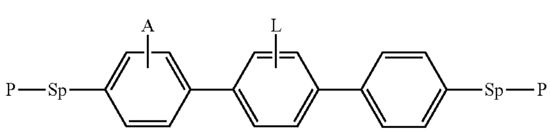
I2A-7
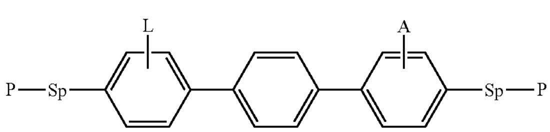
-continued
I2A-8
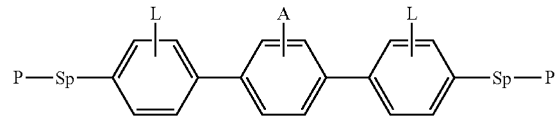
I2A-9
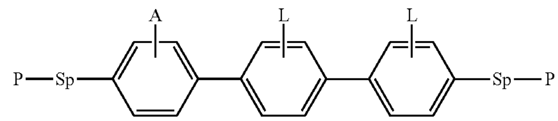
I2A-10
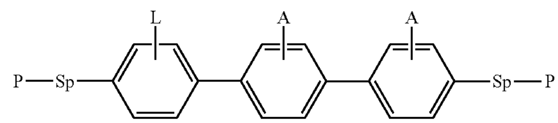
I2A-11
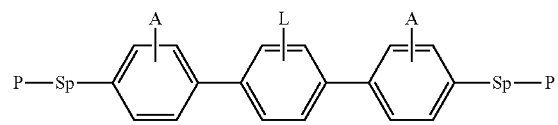
I2A-12
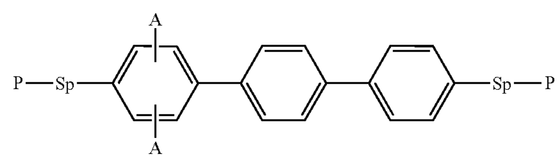
I2A-13
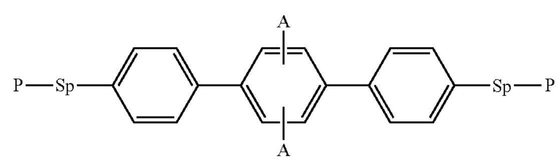
I2A-14
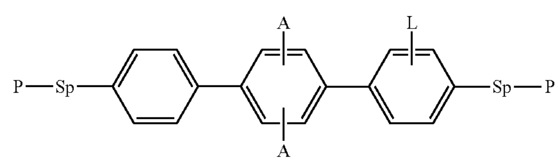
I2A-15
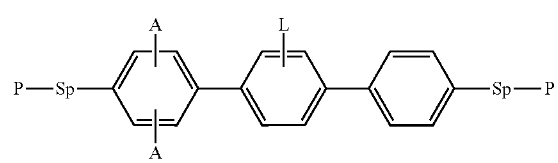
I2A-16
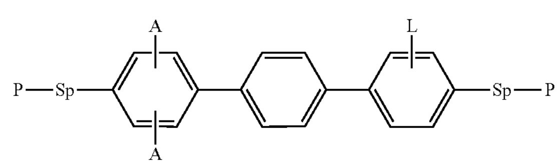

-continued
I2A-17
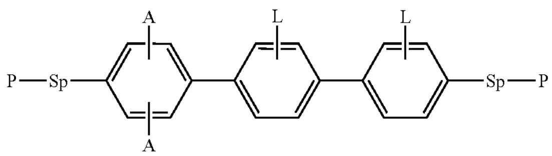
I2A-18
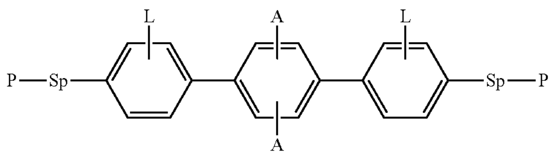
I2B-1
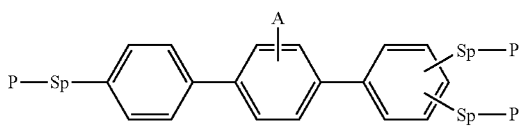
I2B-2
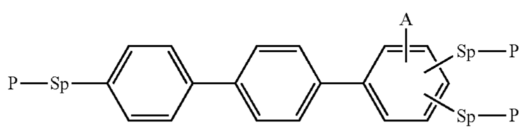
I2B-3
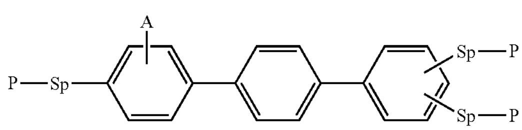
I2B-4
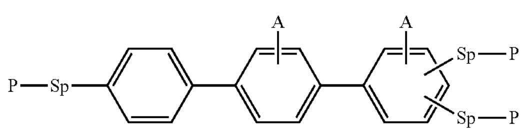
I2B-5
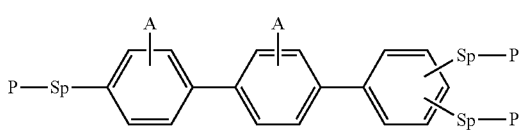
I2B-6
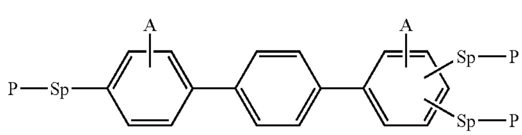
I2B-7
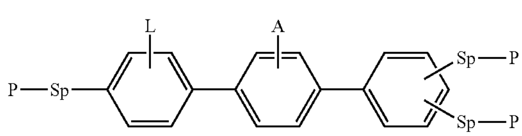
I2B-8
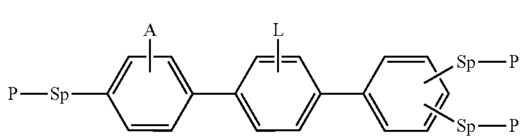
-continued
I2B-9
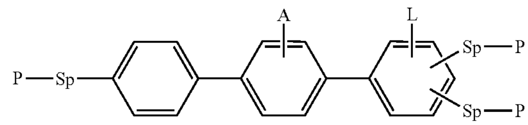
I2B-10
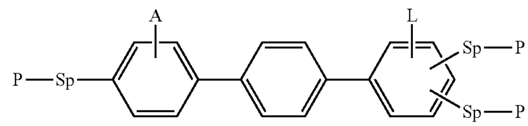
I2B-11
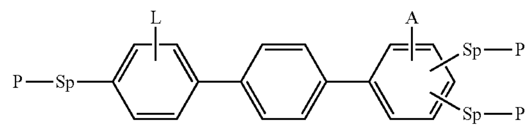
I2B-12
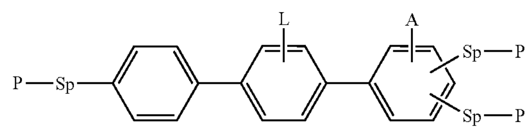
I2B-13
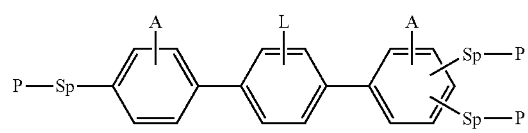
I2B-14
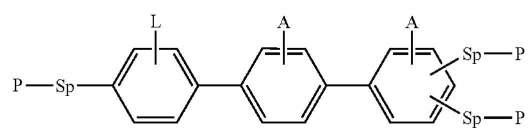
I2B-15
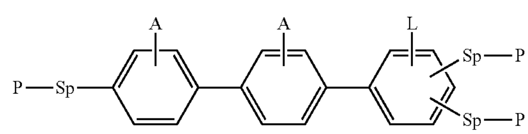
I2B-16
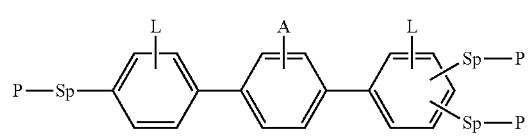
I2B-16
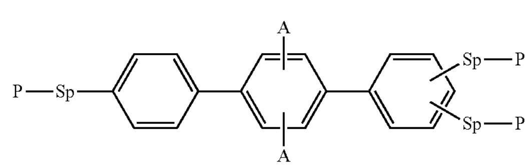
I2B-17
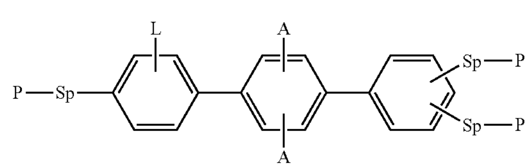

-continued
I2B-18
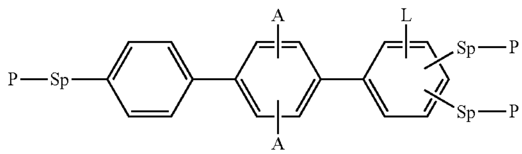
I2B-19
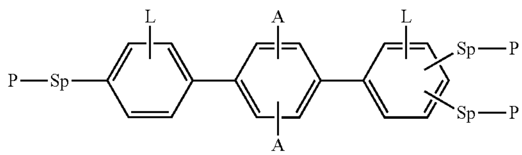
I2B-20
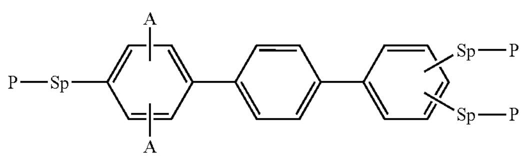
I2B-21
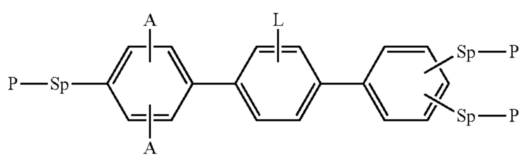
I2B-22
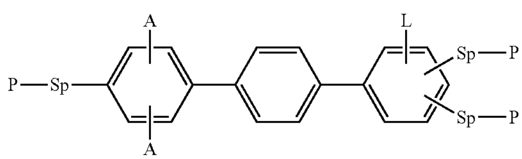
I2B-23
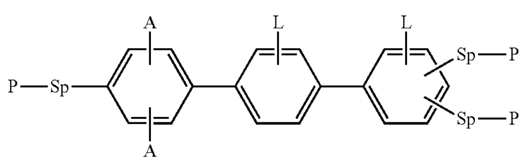
I2C-1
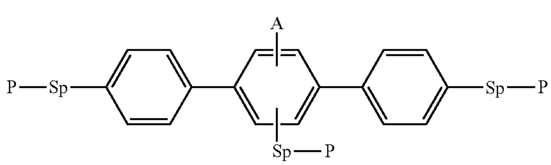
I2C-2
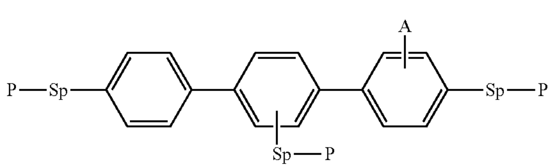
I2C-3
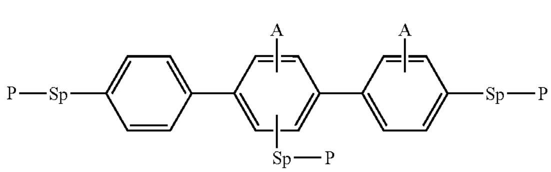
-continued
I2C-4
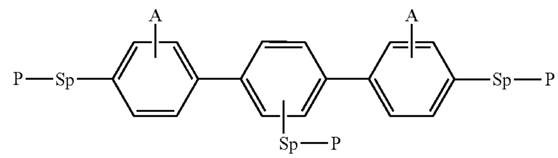
I2C-5
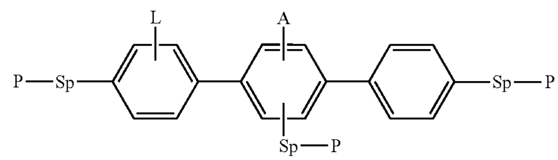
I2C-6
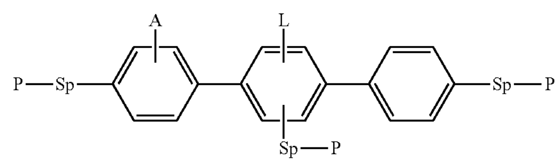
I2C-7
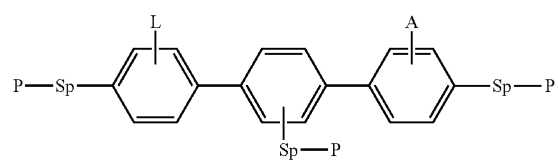
I2C-8
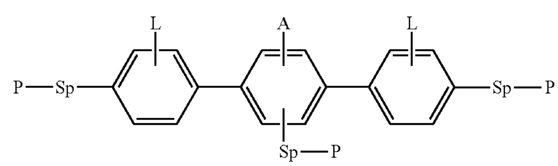
I2C-9
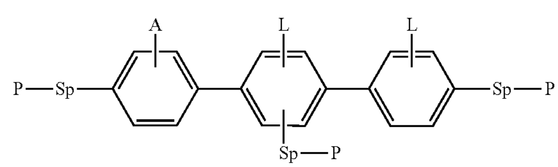
I2C-10
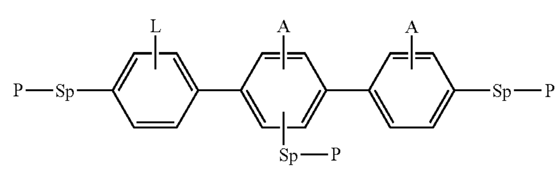
I2C-11
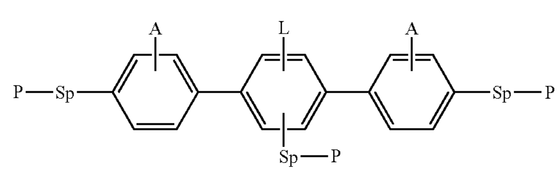

-continued
I2C-12
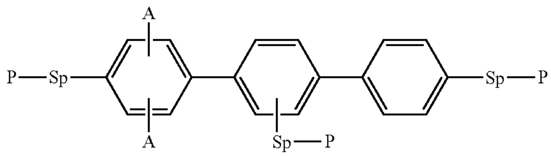
I2C-13
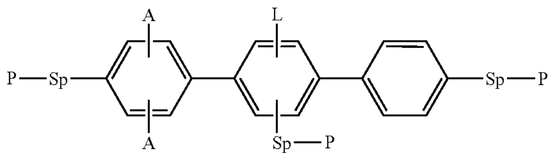
I2C-14
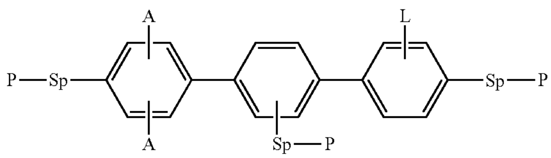
I2C-15
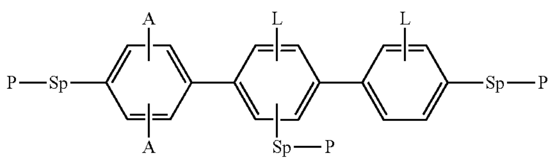
I2D-1
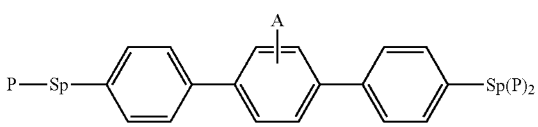
I2D-2
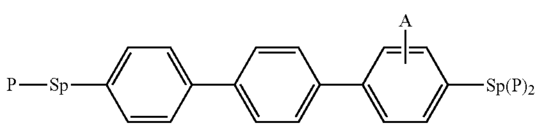
I2D-3
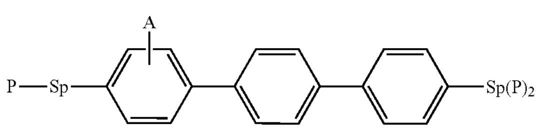
I2D-4
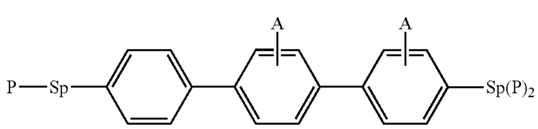
I2D-5
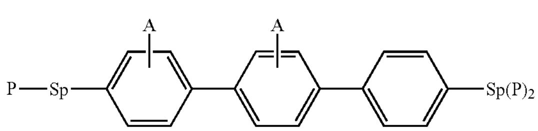
I2D-6
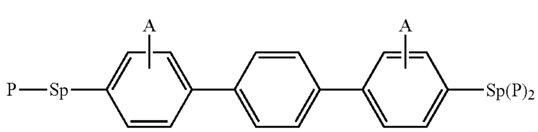
-continued
I2D-7
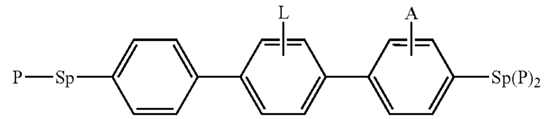
I2D-8
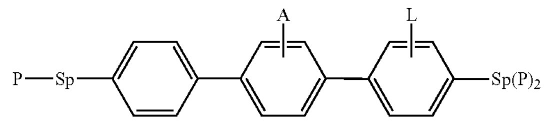
I2D-9
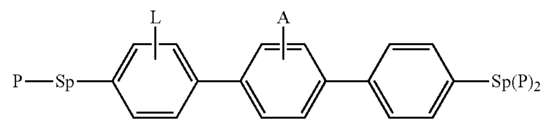
I2D-10
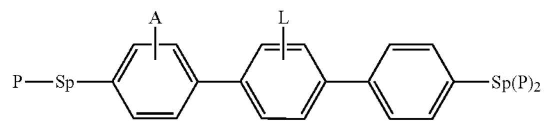
I2D-11
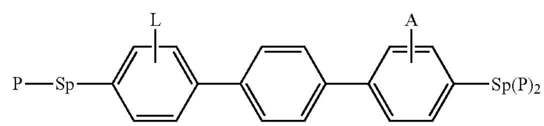
I2D-12
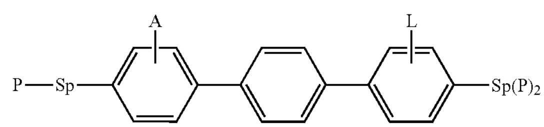
I2D-13
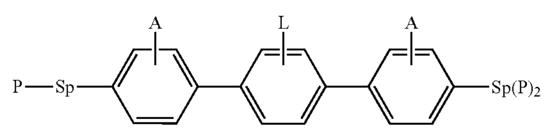
I2D-14
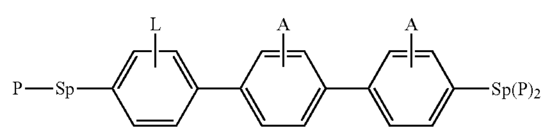
I2D-15
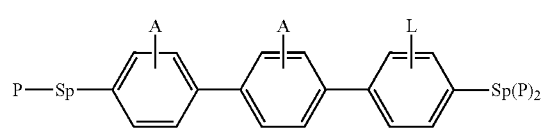
I2D-16
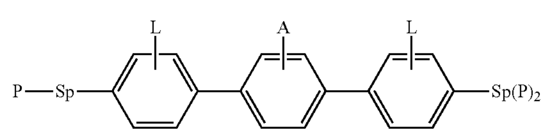

-continued
I2D-17
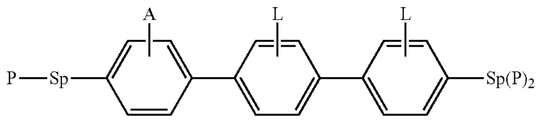
I2D-18
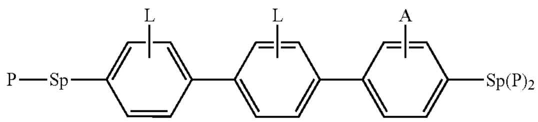
I2D-19
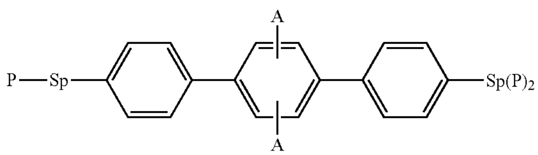
I2D-20
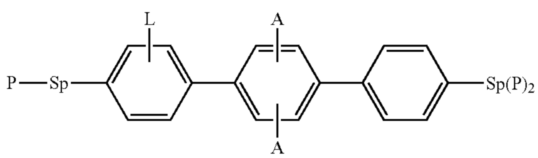
I2D-21
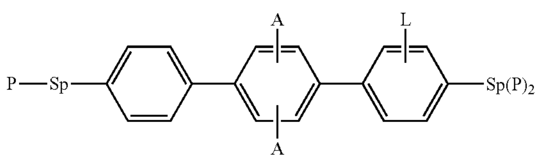
I2D-22
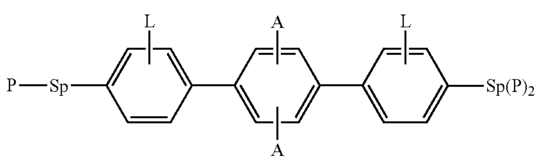
I2D-23
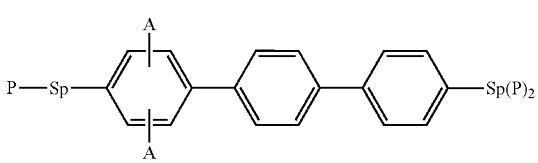
I2D-24
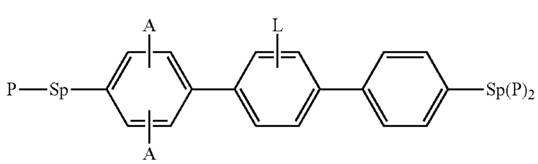
I2D-25
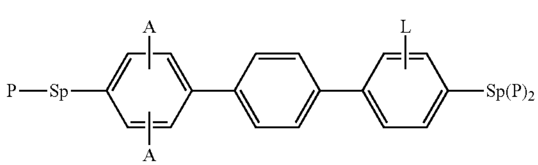
-continued
I2D-26
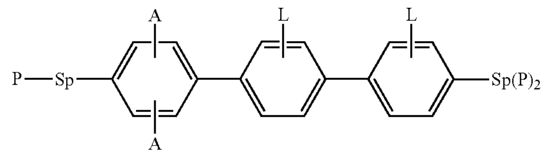
I2D-27
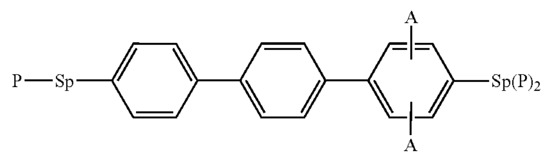
I2D-28
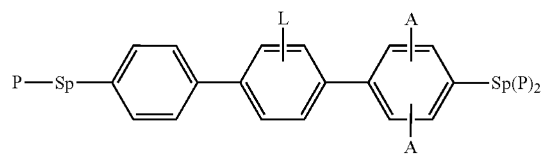
I2D-29
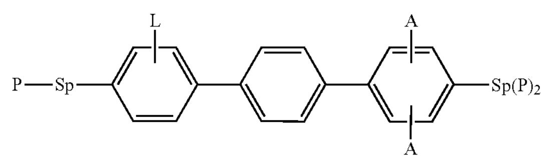
I2D-30
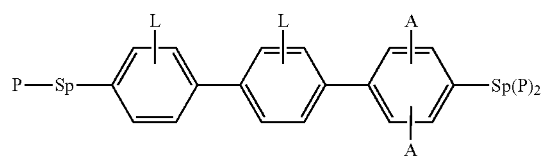
I3A-1
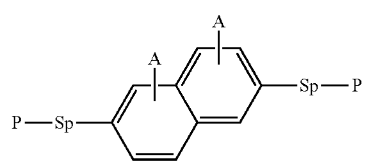
I3A-2
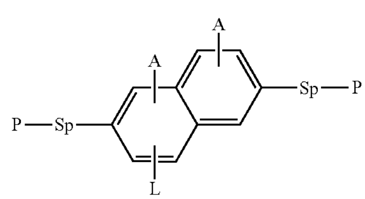
I3B-1
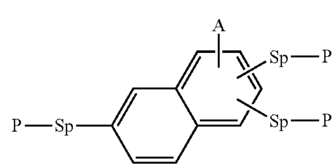
I3B-2
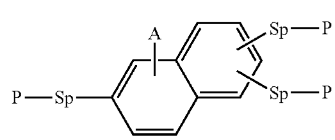

-continued
I3B-3
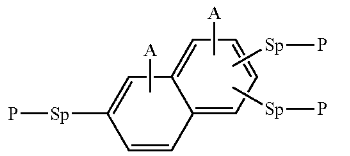
I3B-4
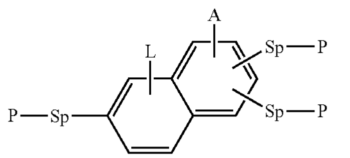
I3B-5
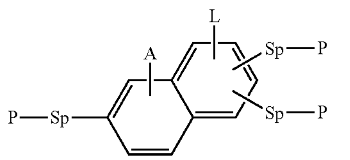
I3C-1
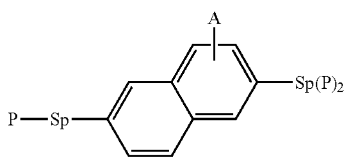
I3C-2
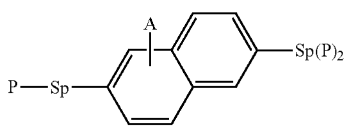
I3C-3
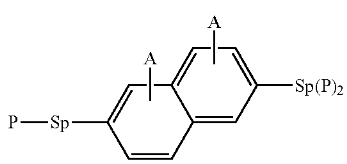
I3C-4
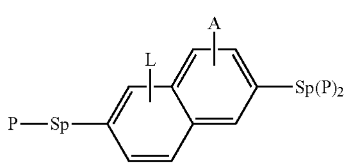
I3C-5
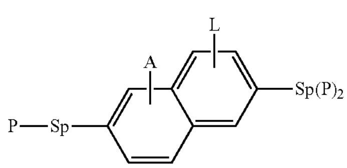
I4A-1
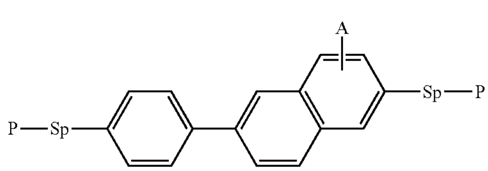
I4A-2
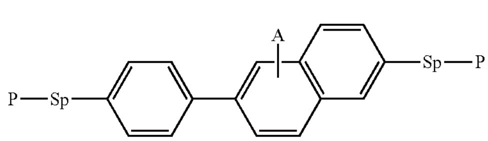
-continued
I4A-3
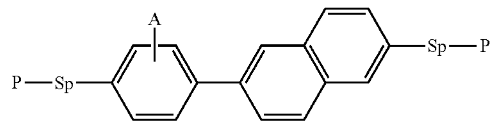
I4A-4
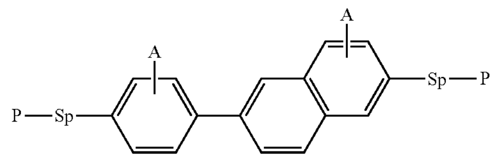
I4A-5
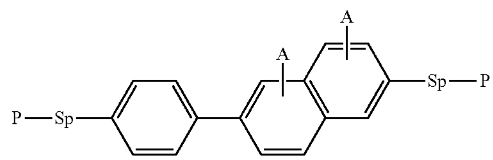
I4A-6
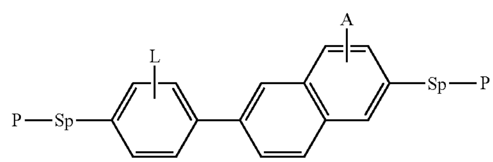
I4A-7
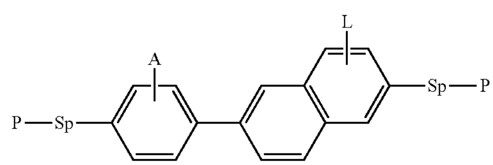
I4A-8
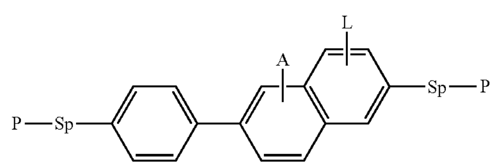
I4A-9
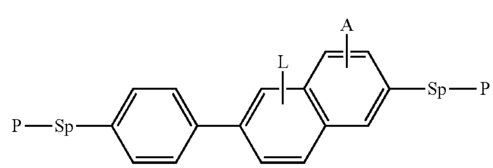
I4A-10
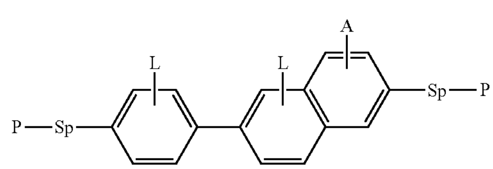
I4A-11
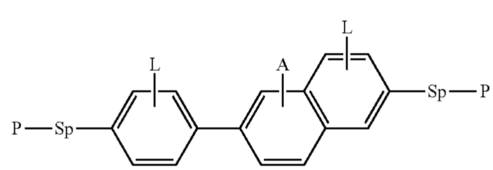

I4A-12
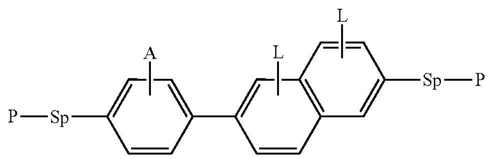
I4A-13
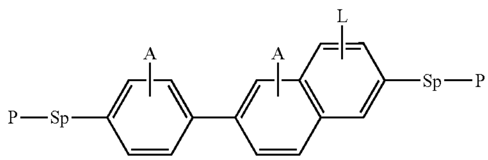
I4A-14
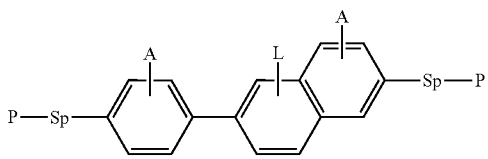
I4A-15
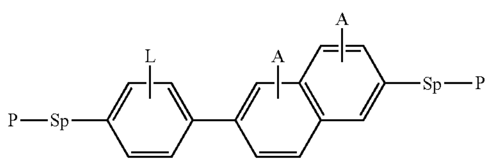
I4A-16
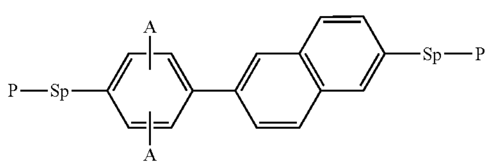
I4A-17
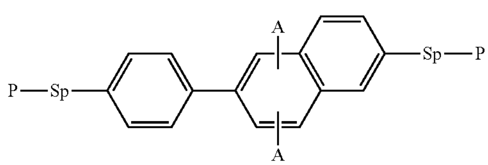
I4A-18
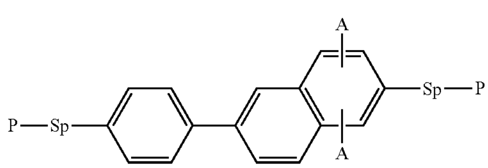
I4A-19
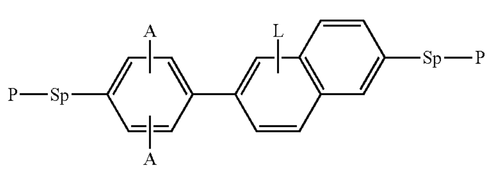
I4A-20
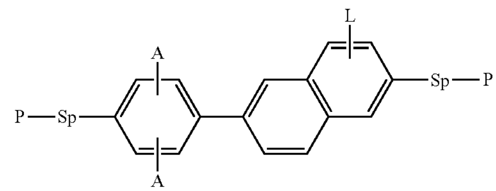
I4A-21
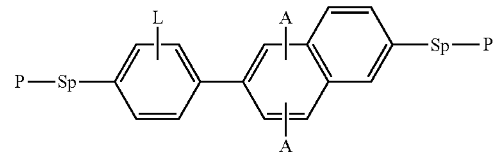
I4A-22
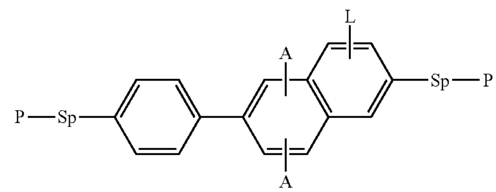
I4A-23
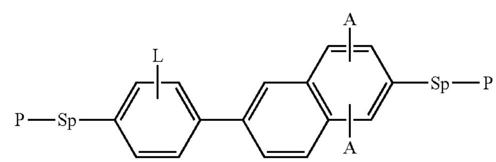
I4A-24
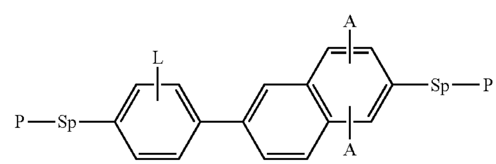
I4A-25
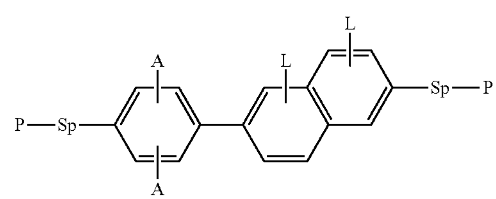
I4A-26
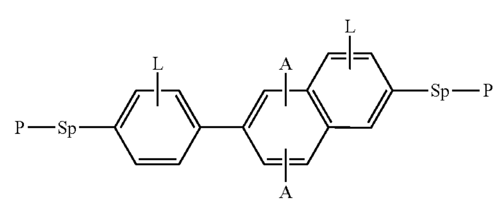
I4A-27
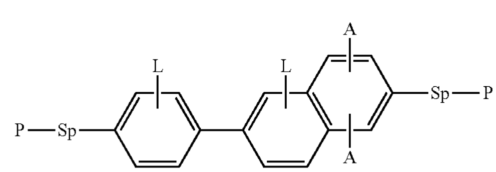

I4B-1
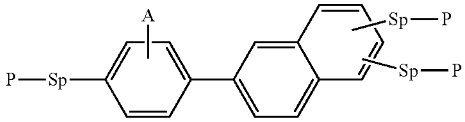
I4B-2
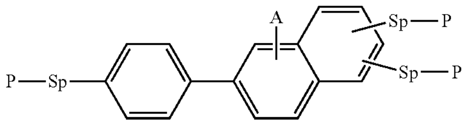
I4B-3
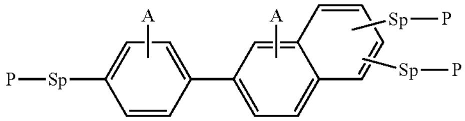
I4B-4
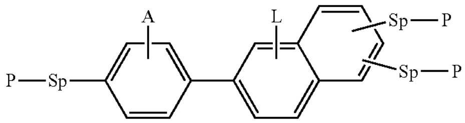
I4B-5
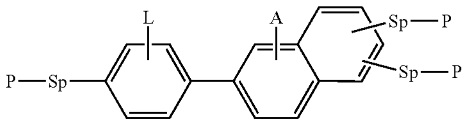
I4B-6
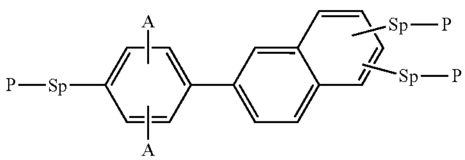
I4B-7
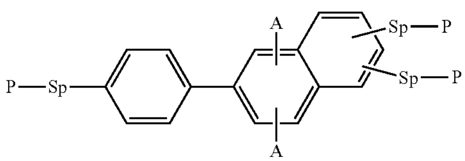
I4B-8
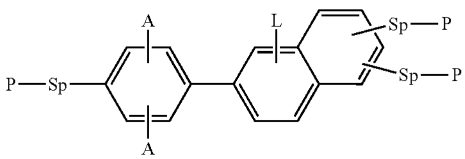
I4B-9
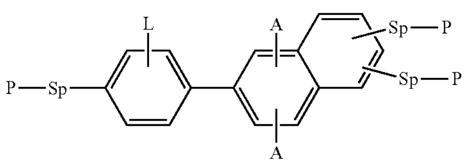
I4C-1
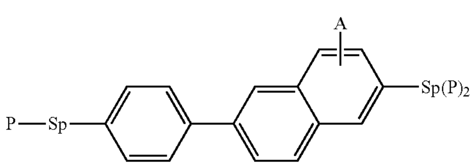
I4C-2
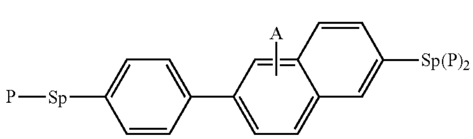
I4C-3
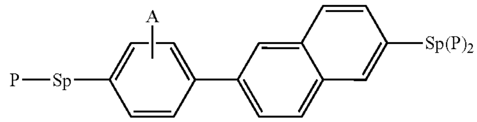
I4C-4
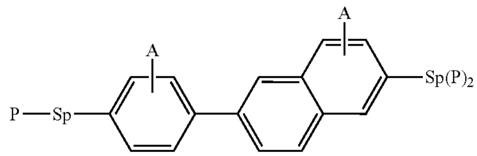
I4C-5
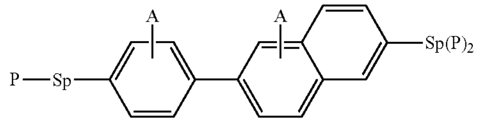
I4C-6
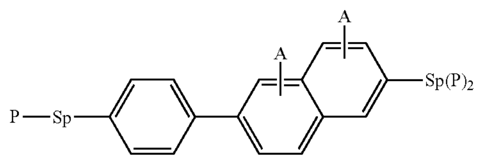
I4C-7
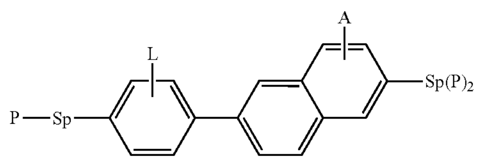
I4C-8
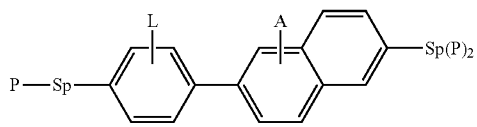
I4C-9
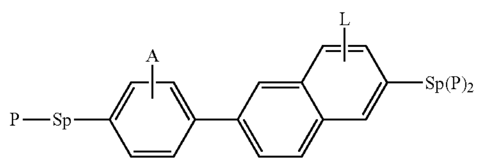
I4C-10
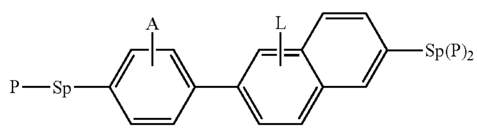
I4C-11
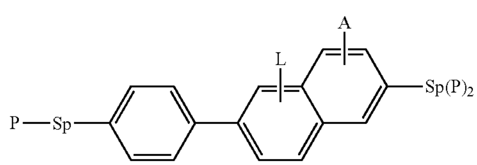
I4C-12
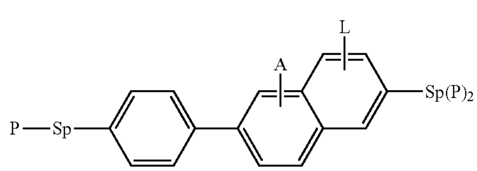

-continued
I4C-13
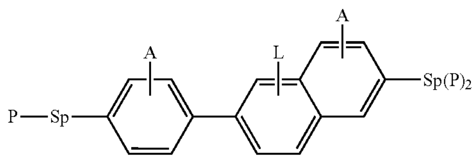
I4C-14
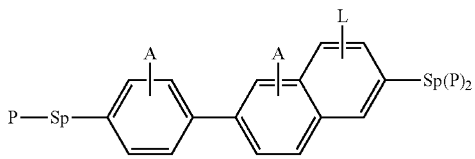
I4C-15
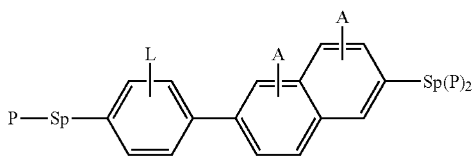
I4C-16
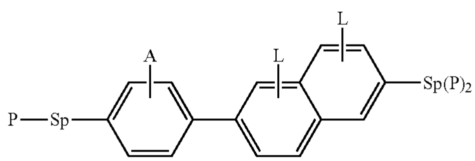
I4C-17
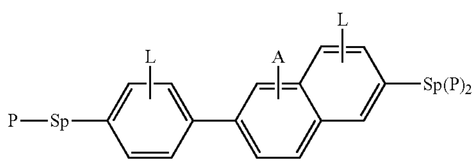
I4C-18
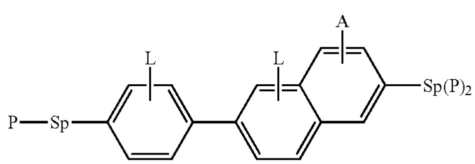
I4C-19
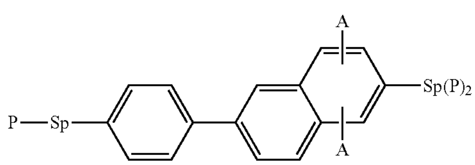
I4C-20
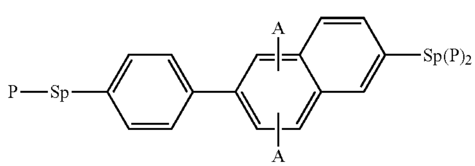
-continued
I4C-21
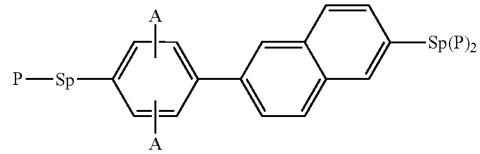
I4C-22
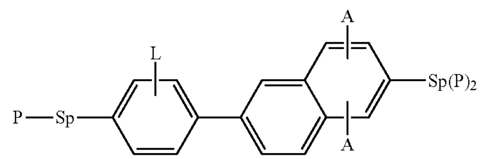
I4C-23
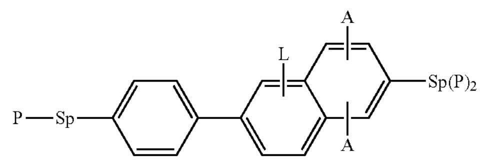
I4C-24
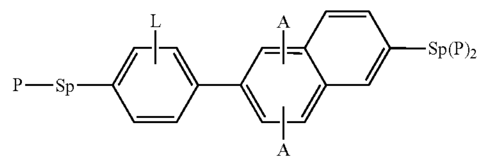
I4C-25
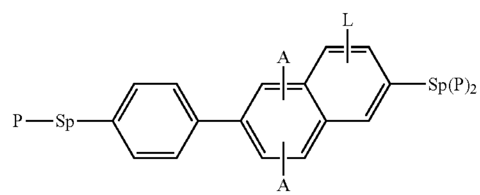
I4C-26
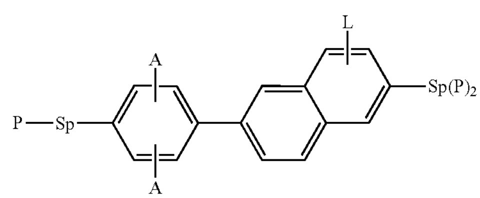
I4C-27
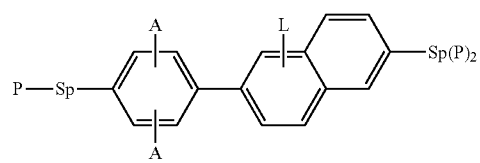
I4C-28
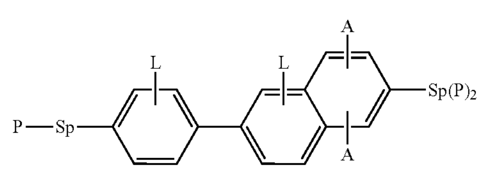

-continued
I4C-29
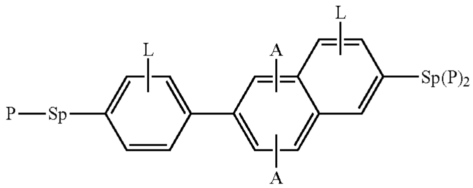
I4C-30
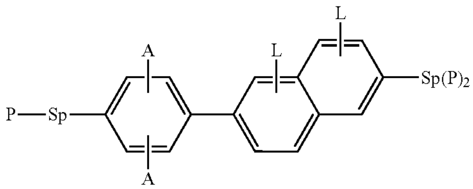
I4D-1
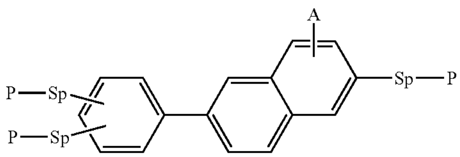
I4D-2
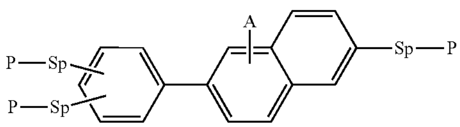
I4D-3
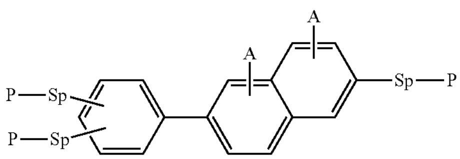
I4D-4
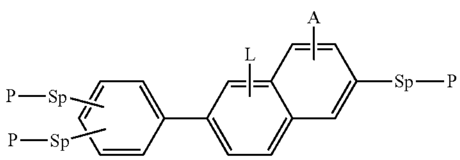
I4D-5
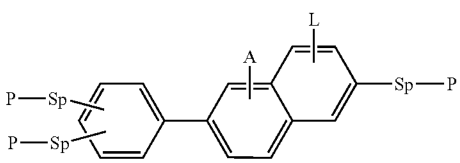
I4D-6
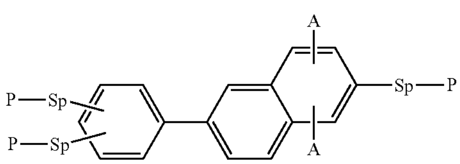
I4D-7
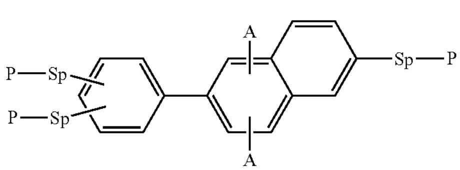
-continued
I4D-8
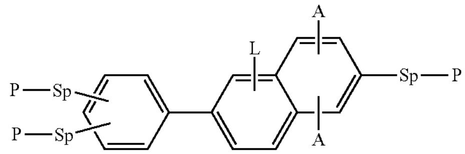
I4D-9
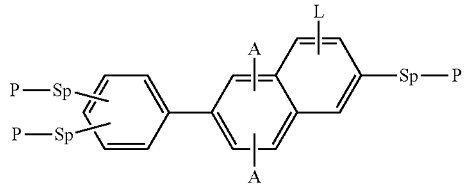
I4E-1
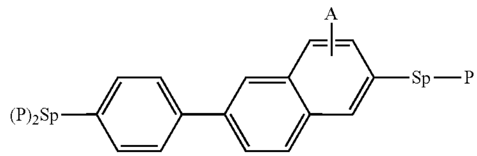
I4E-2
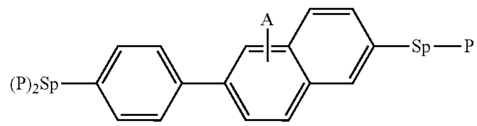
I4E-3
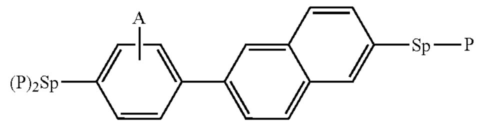
I4E-4
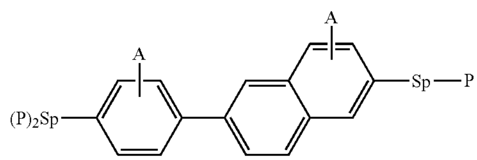
I4E-5
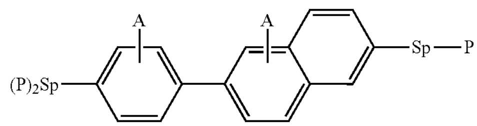
I4E-6
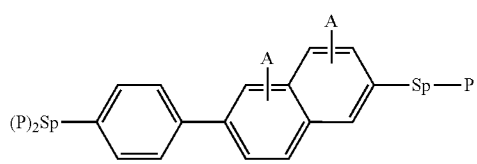
I4E-7
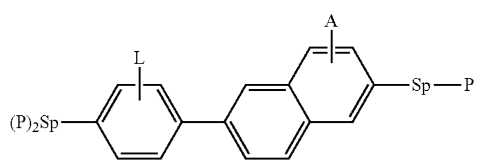
I4E-8
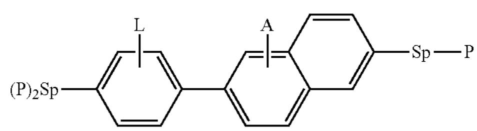

-continued
I4E-9
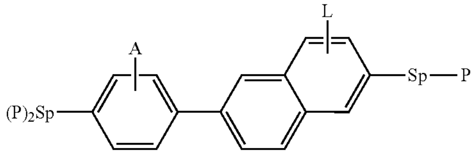
I4E-10
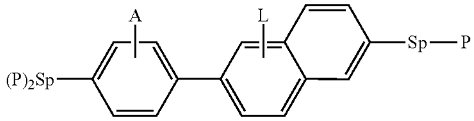
I4E-11
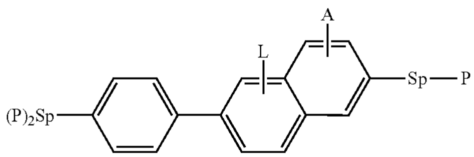
I4E-12
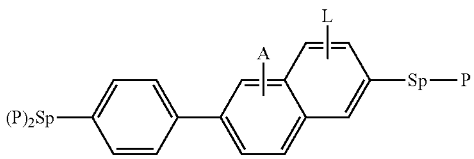
I4E-13
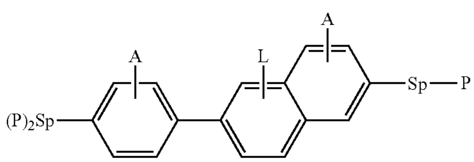
I4E-14
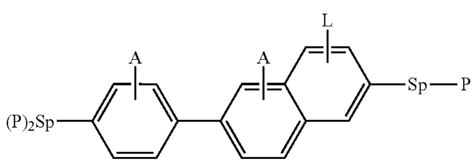
I4E-15
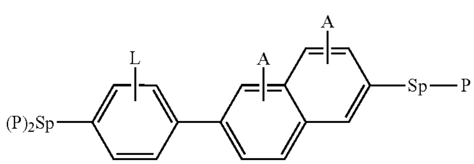
I4E-16
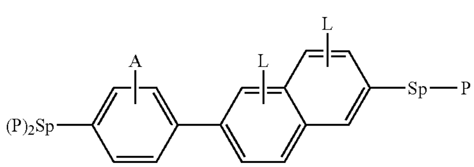
I4E-17
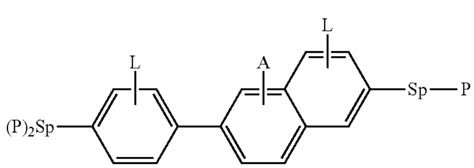
-continued
I4E-18
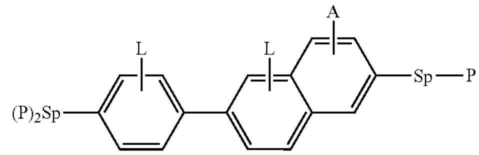
I4E-19
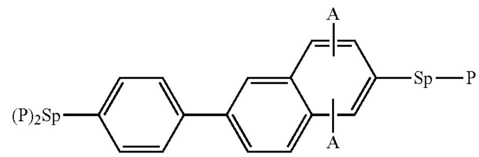
I4E-20
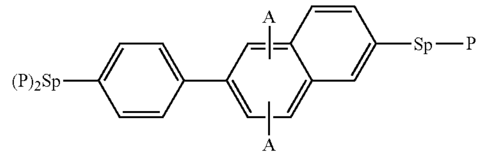
I4E-21
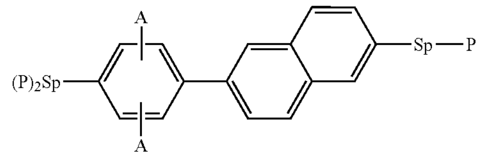
I4E-22
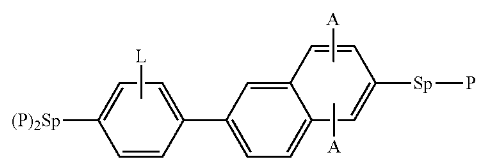
I4E-23
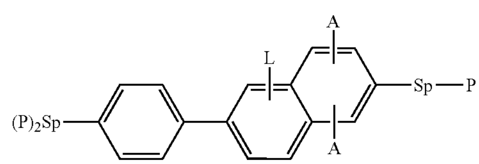
I4E-24
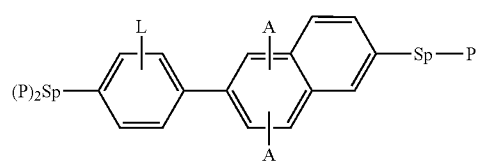
I4E-25
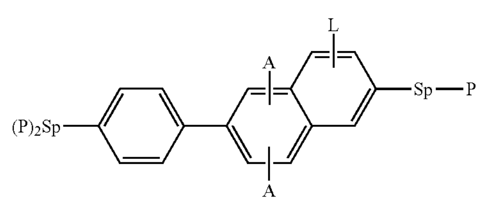

-continued
I4E-26
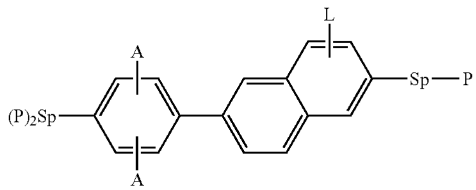
I4E-27
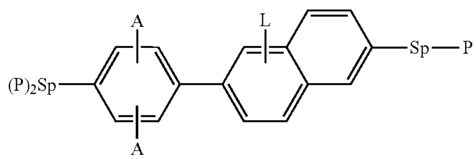
I4E-28
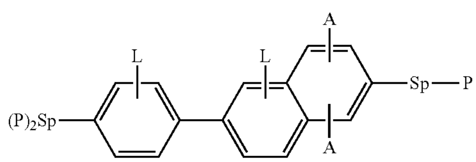
I4E-29
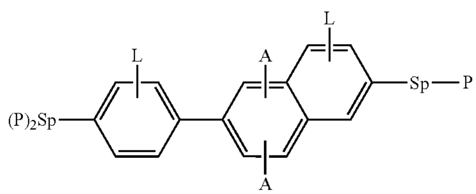
I4E-30
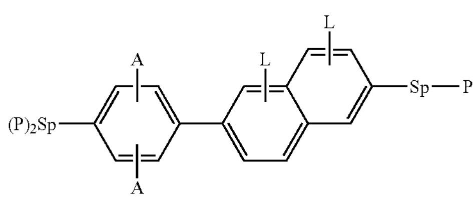
I5A-1
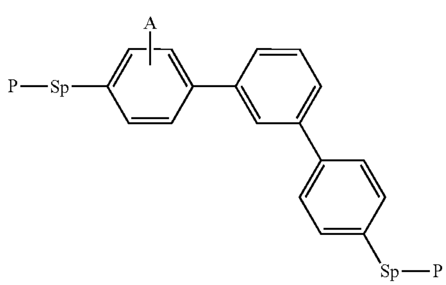
I5A-2
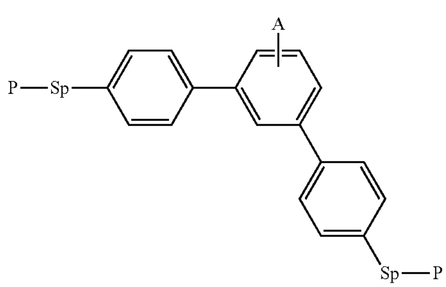
-continued
I5A-3
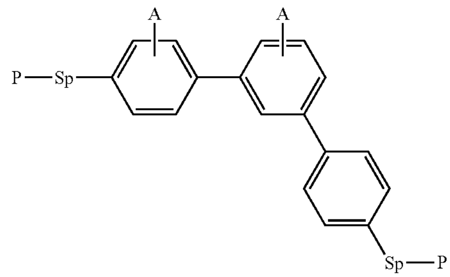
I5A-4
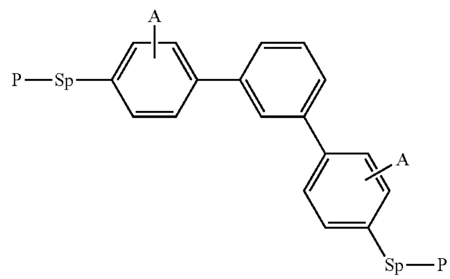
I5A-5
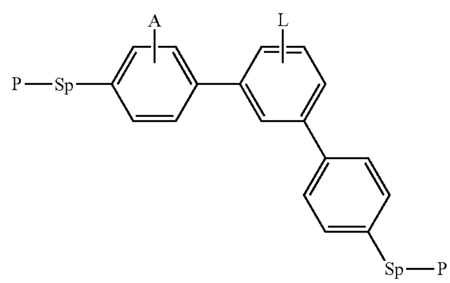
I5A-6
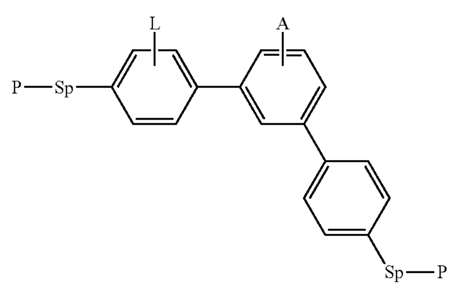
I5A-7
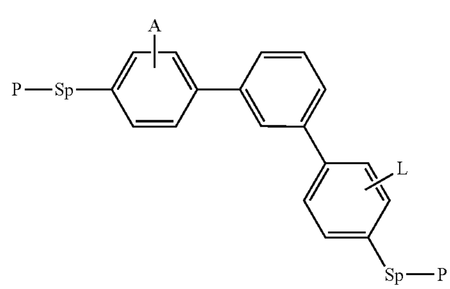

-continued
I5A-8
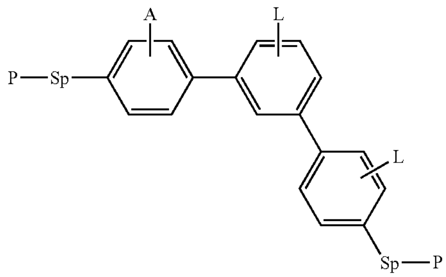
I5A-9
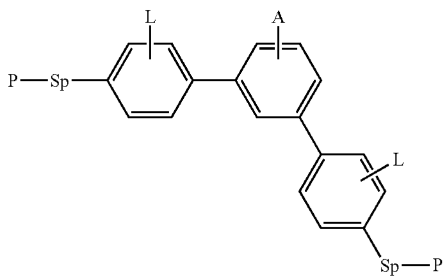
I5A-10
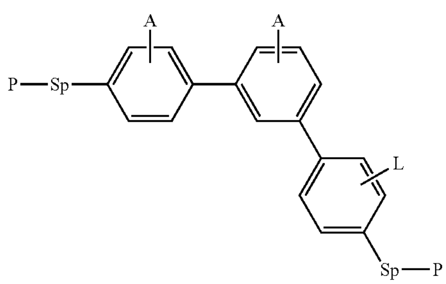
I5A-11
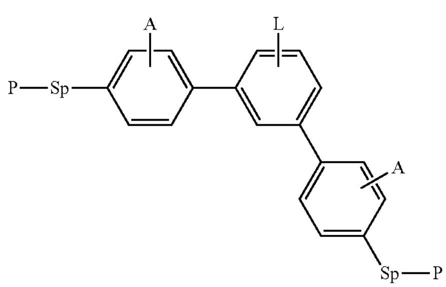
I5A-12
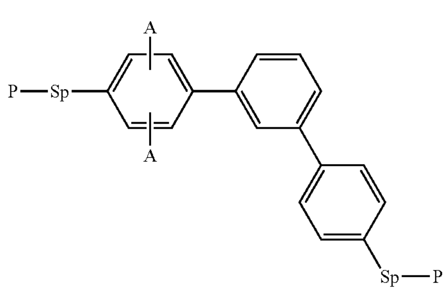
-continued
I5A-13
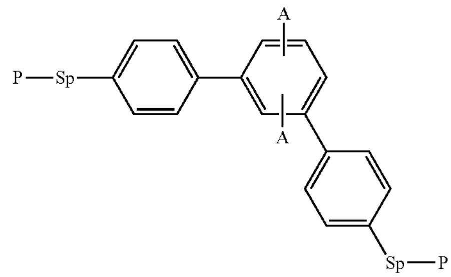
I5A-14
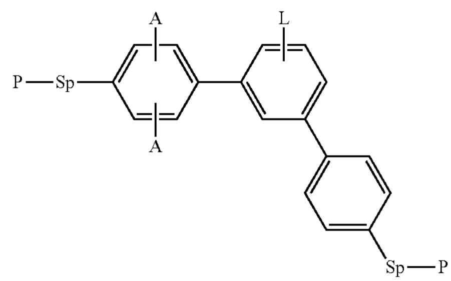
I5A-15
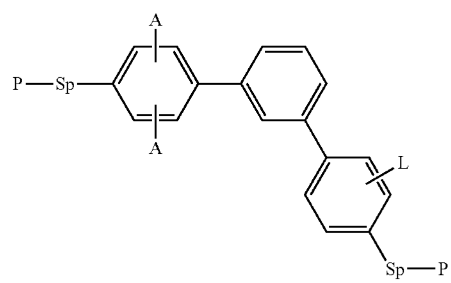
I5A-16
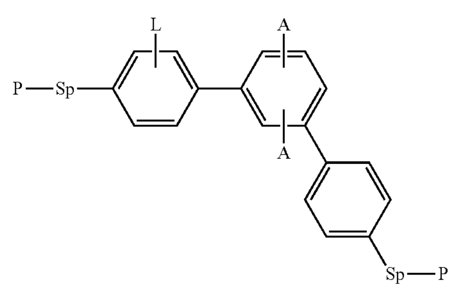
I5A-17
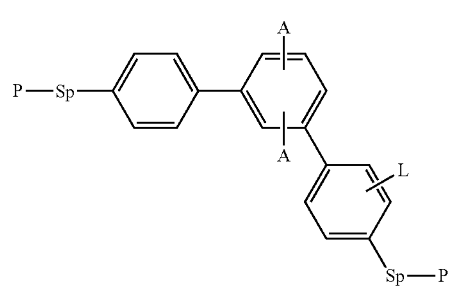

I5A-18
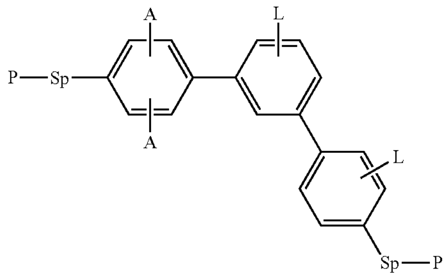
I5A-19
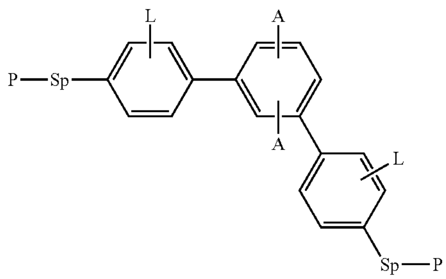
I5B-1
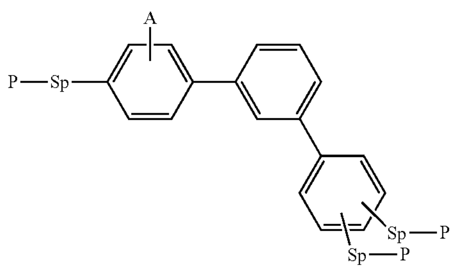
I5B-2
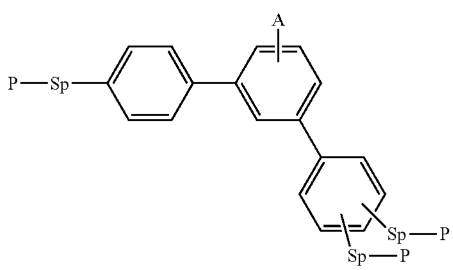
I5B-3
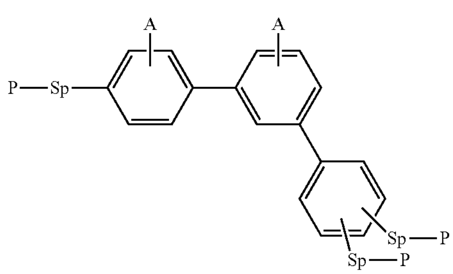
I5B-4
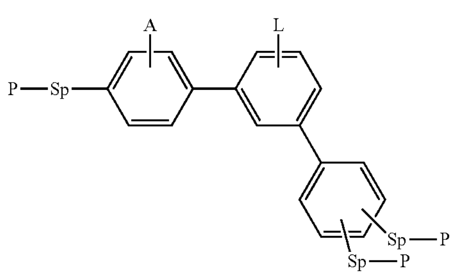
I5B-5
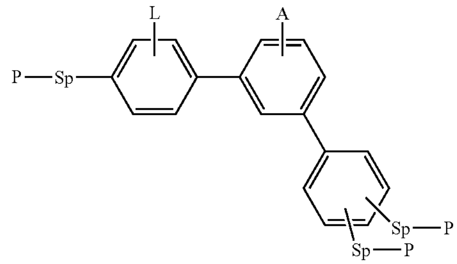
I5B-6
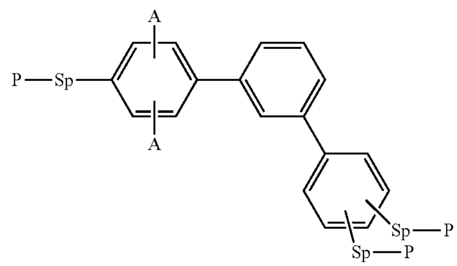
I5B-7
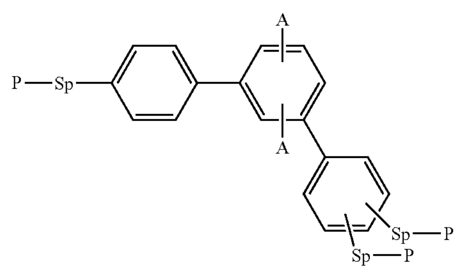
I5B-8
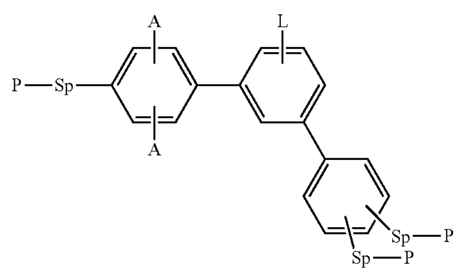
I5B-9
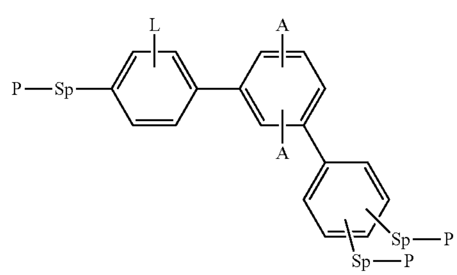
I5C-1
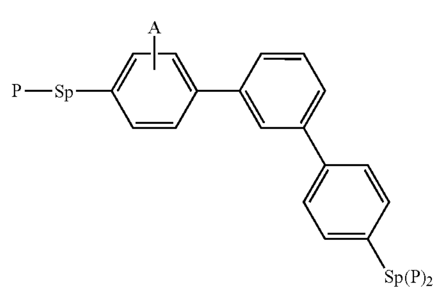

-continued
I5C-2
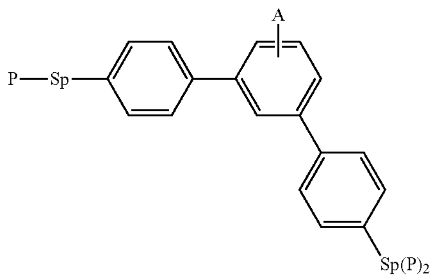
I5C-3
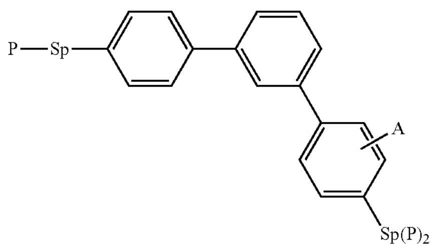
I5C-4
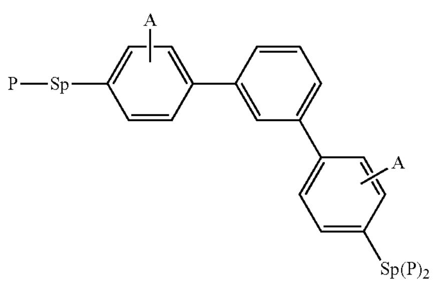
I5C-5
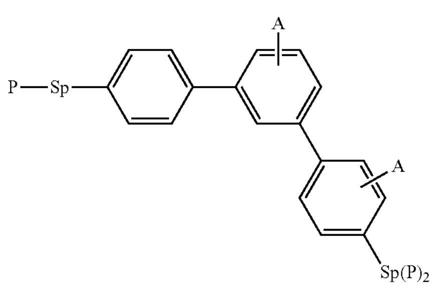
I5C-6
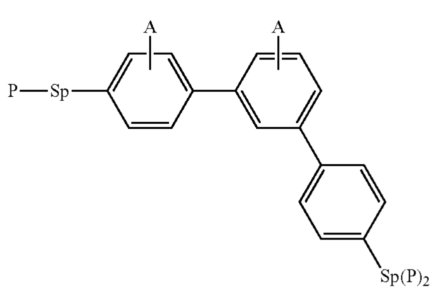
-continued
I5C-7
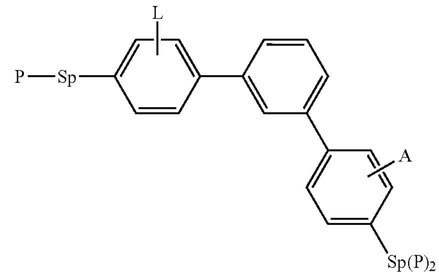
I5C-8
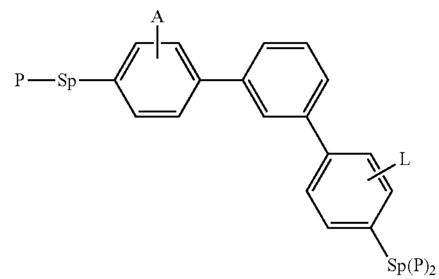
I5C-9
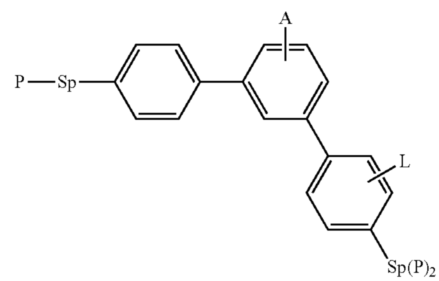
I5C-10
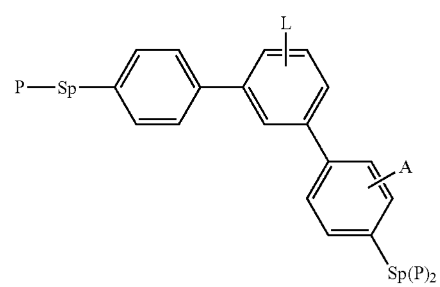
I5C-11
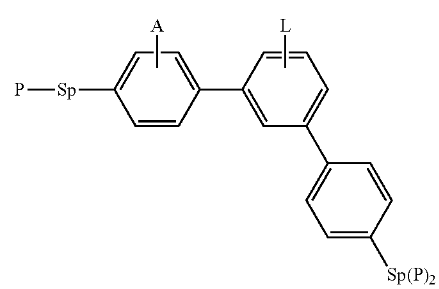

-continued
I5C-12
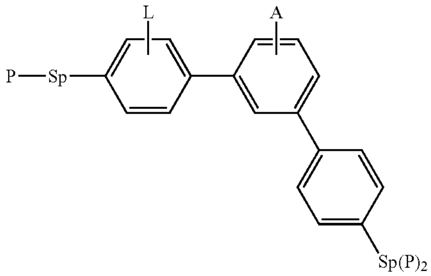
I5C-13
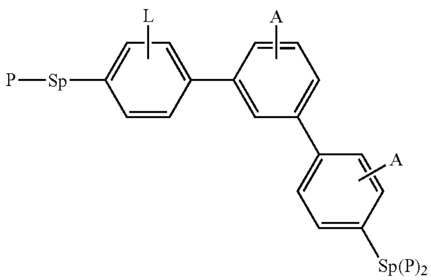
I5C-14
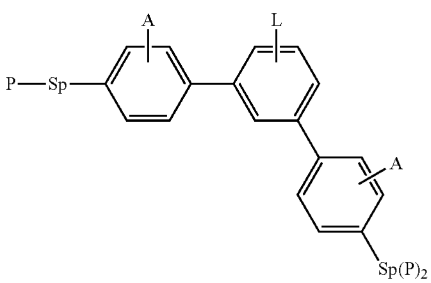
I5C-15
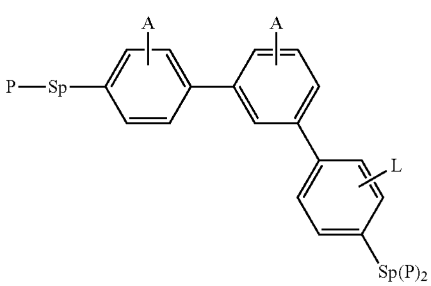
I5C-16
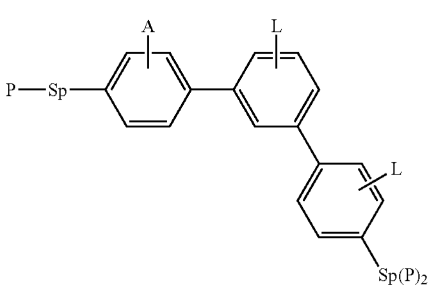
-continued
I5C-17
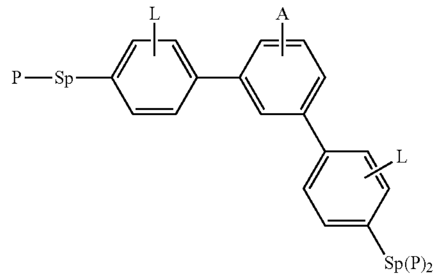
I5C-18
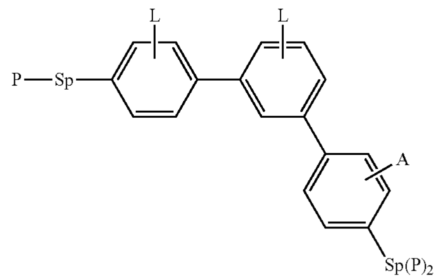
I5C-19
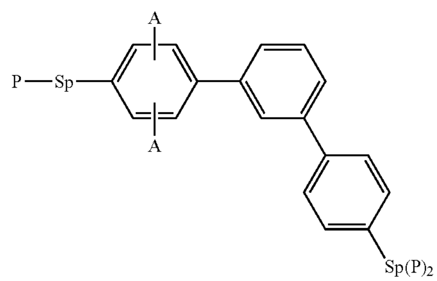
I5C-20
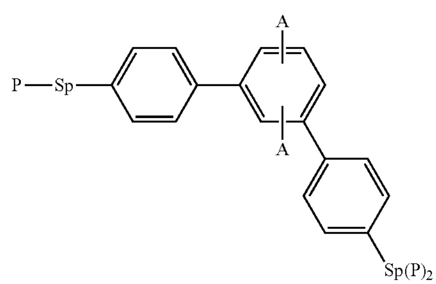
I5C-21
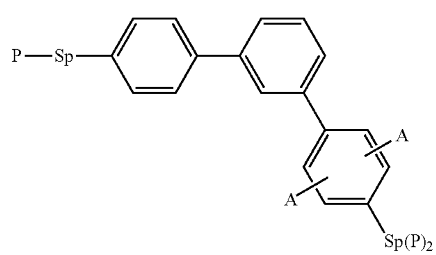

-continued
I5C-22
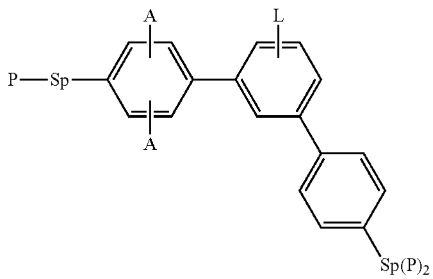
I5C-23
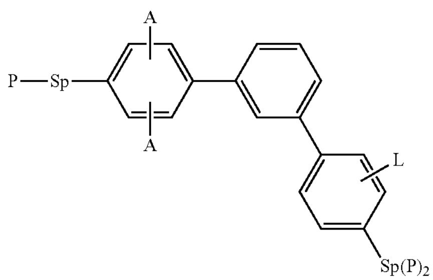
I5C-24
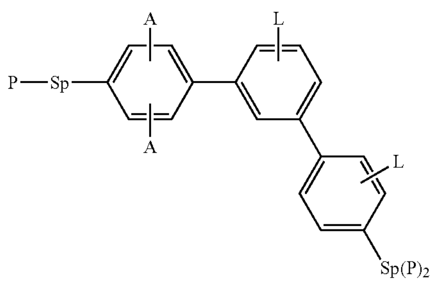
I5C-25
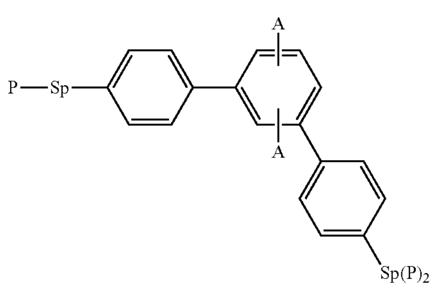
I5C-26
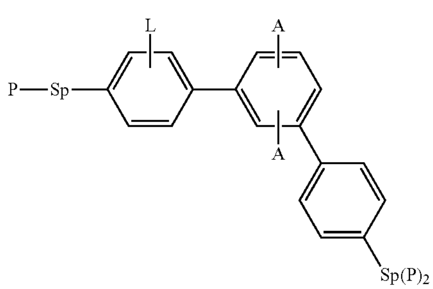
-continued
I5C-27
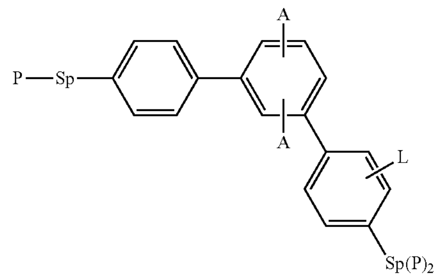
I5C-28
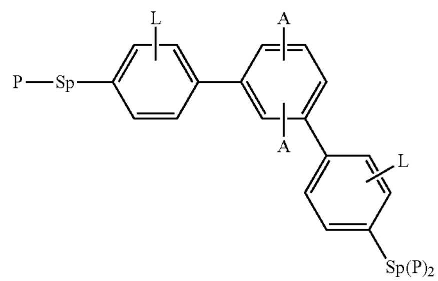
I5D-1
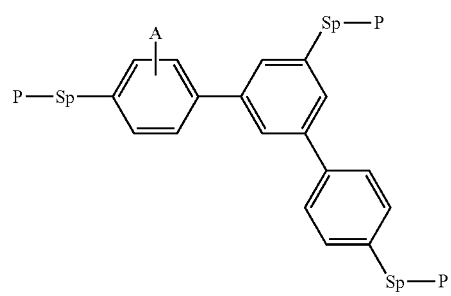
I5D-2
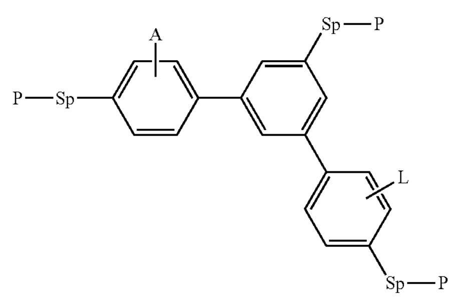
I5D-3
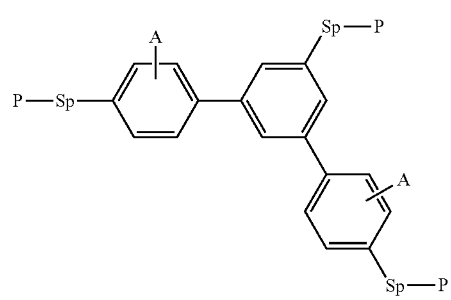

-continued
I5D-4
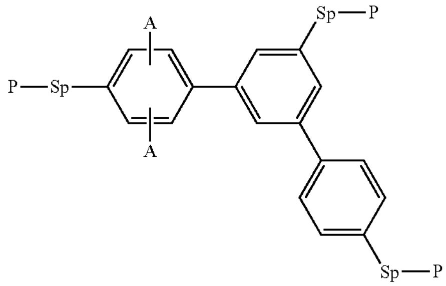
I5D-5
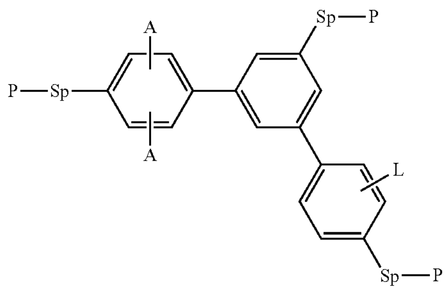
I6A-1
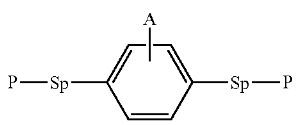
IA6-2
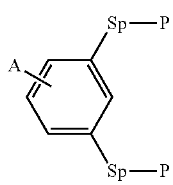
IA6-3
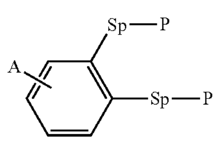
I6A-4
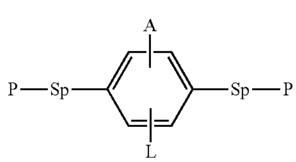
IA6-5
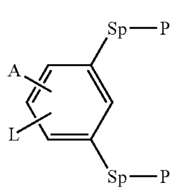
IA6-6
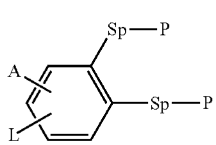
-continued
IA6-7
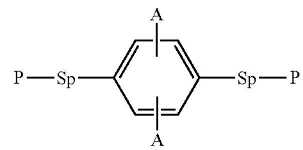
IA6-8
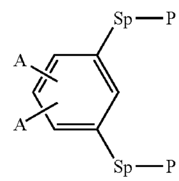
IA6-9
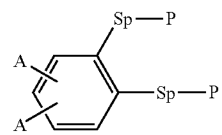
I6B-10
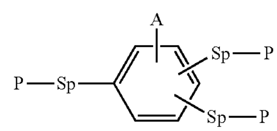
I6B-12
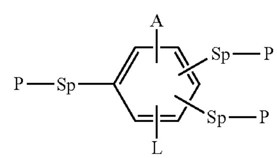
I6B-1
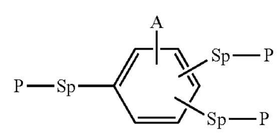
I6B-2
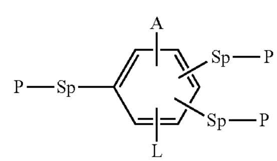
I6B-3
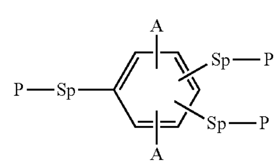
I6C-1
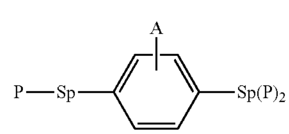
I6C-2
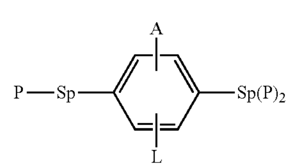

-continued

I6C-3

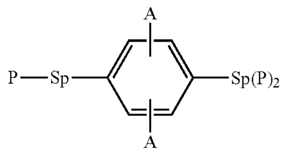

wherein P, Sp, A and L have the meanings given for formula I and $Sp(P)_2$ denotes a spacer group Sp that is substituted by two polymerisable groups P at identical or different positions.

7. The LC medium according to claim 1, wherein Sp, Sp' and Sp" in the compounds of formula I, when being different from a single bond, are selected from —$(CH_2)_{p1}$—, —O—$(CH_2)_{p1}$—, —O—CO—$(CH_2)_{p1}$, or —CO—O—$(CH_2)_{p1}$, wherein p1 is 2, 3, 4, 5 or 6, and, if Sp is —O—$(CH_2)_{p1}$—, —O—CO—$(CH_2)_{p1}$ or —CO—O—$(CH_2)_{p1}$ the O-atom or CO-group, respectively, is linked to the benzene ring.

8. The LC medium according to claim 1, which comprises one or more self-alignment additives of formula H selected from formula IIa $$R^{21}\text{-}[A^{22}\text{-}Z^{22}]_{m2}—A^{22}\text{-}R^a \qquad \text{IIa}$$

in which $A^{21}$, $A^{22}$ each, independently of one another, denote an aromatic, heteroaromatic, alicyclic or heterocyclic group, which may also contain fused rings, and which may also be mono- or polysubstituted by a group $L^{12}$ or -Sp-P, $L^{12}$ in each case, independently of one another, denote F, Cl, Br, I, —CN, —$NO_2$, —NCO, —NCS, —OCN, —SCN, —C(═O)N$(R^0)_2$, —C(═O)$R^0$, optionally substituted silyl, optionally substituted aryl or cycloalkyl having 3 to 20 C atoms, or straight-chain alkyl, alkoxy, alkylcarbonyl, alkoxycarbonyl, alkylcarbonyloxy or alkoxycarbonyloxy having up to 1 to 25 C atoms or a branched allyl, alkoxy, alkylcarbonyl, alkoxycarbonyl, alkylcarbonyloxy or alkoxycarbonyloxy having 3 to 25 C atoms, in which one or more H atoms may each be replaced by F or Cl, P denote a polymerizable group, Sp denote a spacer group or a single bond, $Z^{22}$ in each case, independently of one another, denote a single bond, —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —C≡C—, —CH═CH—COO—, —OCO—CH═CH—, —$(CR^0R^{00})_{n1}$—, —CH(—Sp-P)—, —$CH_2$CH(—Sp-P)—, or —CH(—Sp-P)CH(—Sp-P)—, n1 denote 1, 2, 3 or 4, m2 denote 1, 2, 3, 4, 5 or 6, $R^0$ in each case, independently of one another, denote alkyl having 1 to 12 C atoms, $R^{00}$ in each case, independently of one another, denote H or alkyl having 1 to 12 C atoms, $R^{21}$ independently of one another, denote H, halogen, straight-chain alkyl having 1 to 25 C atoms, or a branched or cyclic alkyl having 3 to 25 C atoms, in which one or more non-adjacent $CH_2$ groups may each be replaced by —O—, —S—, —CO—, —CO—O—, —O—CO—, or —O—CO—O-in such a way that O and/or S atoms are not linked directly to one another and in which one or more H atoms may each be replaced by F or Cl, or a group P-Sp-, and $R^a$ denote a polar anchor group having at least one group selected from —OH, —$NH_2$, $NHR^{22}$, C(O)OH and —CHO, where $R^{22}$ denote alkyl having 1 to 12 C atoms.

9. The LC medium according to claim 1, where for the compounds of formula II the polar anchor group $R^a$ is selected from the following formulae

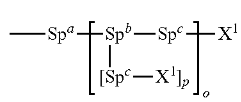

or

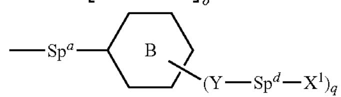

wherein p denotes 1 or 2, q denotes 2 or 3,

B denotes a substituted or unsubstituted ring system or condensed ring system,

Y on each occurrence identically or differently denotes —O—, —S—, —C(O)—, —C(O)O—, —OC(O)—, —$NR^{11}$- or a single bond, denotes 0 or 1, $X^1$ on each occurrence identically or differently denotes H, alkyl, fluoroalkyl, OH, $NH_2$, $NHR^{22}$, $NR^{22}{}_2$, $OR^{22}$, C(O)OH, or —CHO, where at least one group $X^1$ denotes a radical selected from —OH, —$NH_2$, $NHR^{22}$, C(O)OH and —CHO, $R^{22}$ denotes alkyl having 1 to 12 C atoms, $Sp^a$, $Sp^c$, $Sp^d$ each, independently of one another, denote a spacer group or a single bond, and $Sp^b$ denotes a tri- or tetravalent group.

10. The LC medium according to claim 1, wherein said self-alignment additive for vertical alignment comprises one or more polymerizable groups P-Sp-.

11. The LC medium according to claim 8, wherein said self-alignment additive for vertical alignment is selected from the following formulae

II-A

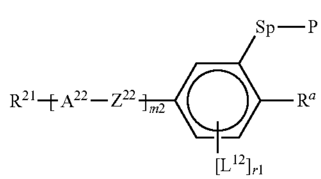

II-B

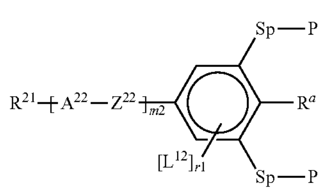

II-C

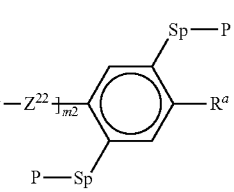

-continued

II-D

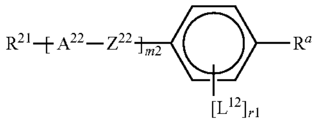

in which $R^{21}$, $R^a$, $A^{22}$, $Z^{22}$, Sp, P and $L^{12}$ have the meanings given for formula IIa, m2 independently is 1, 2 or 3, and r1 independently is 0, 1, 2, 3, or 4.

12. The LC medium according to claim 1, wherein for formula II, the polar anchor group Ra is selected from the following formulae

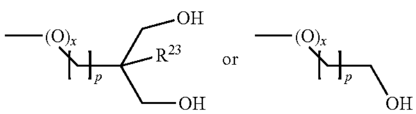

wherein p is 1, 2, 3, 4, 5 or 6, x is 1 or 0, and $R^{23}$ is H, methyl, ethyl, n-propyl, i-propyl, n-butyl, tert-butyl, n-pentyl, or $—CH_2CH_2$-tert-butyl.

13. The LC medium according to claim 1, which comprises one or more compounds of formulae CY and/or PY:

CY

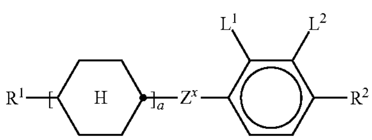

PY

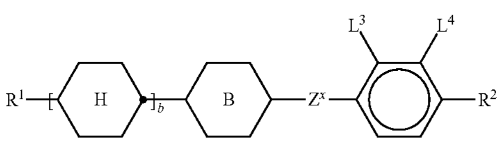

in which the individual radicals have the following meanings:

a denotes 1 or 2, b denotes 0 or 1,

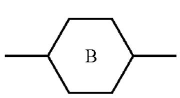

denotes

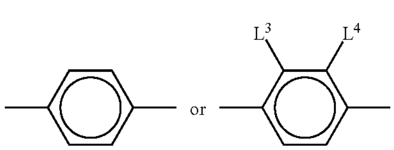

$R^1$ and $R^2$ each, independently of one another, denote alkyl having 1 to 12 C atoms, where one or two non-adjacent $CH_2$ groups may be replaced by —O—, —CH═CH—, —CO—, —O—CO- or —CO—O-in such a way that O atoms are not linked directly to one another, $Z^X$ denotes —CH═CH—, $—CH_2O—$, $—OCH_2—$, $—CF_2O—$, $—OCF_2—$, —O—, $—CH_2—$, $—CH_2CH_2$- or a single bond, $L^{1-4}$ each, independently of one another, denote F, Cl, $OCF_3$, $CF_3$, $CH_3$, $CH_2F$, or $CHF_2$.

14. The LC medium according to claim 1, which comprises one or more compounds selected from the following formulae:

AN

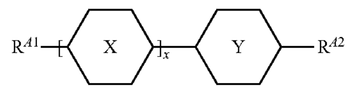

AY

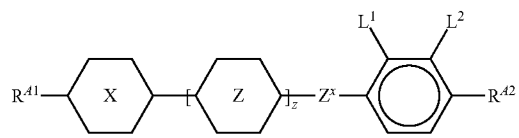

in which the individual radicals, on each occurrence identically or differently, each, independently of one another, have the following meaning:

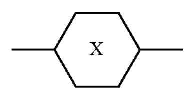

is

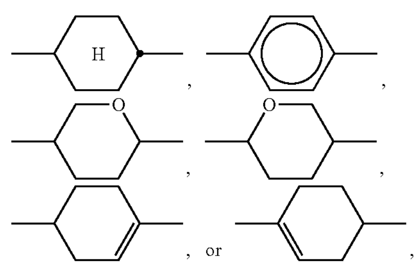

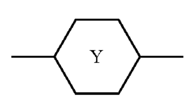

is

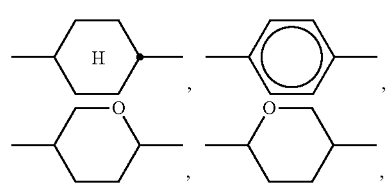

-continued

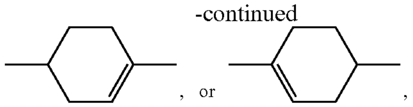

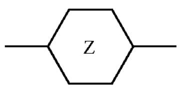

is

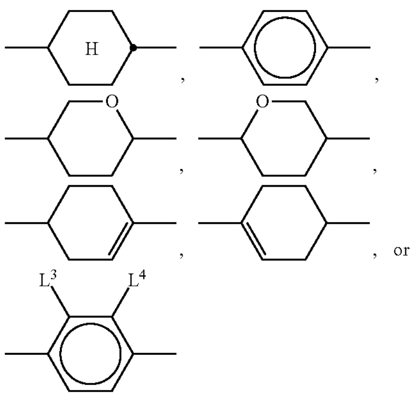

$R^{A1}$ is alkenyl having 2 to 9 C atoms or, if at least one of the rings X, Y and Z denotes cyclohexenyl, also one of the meanings of $R^{A2}$, $R^{A2}$ is alkyl having 1 to 12 C atoms, in which one or two non-adjacent $CH_2$ groups may be replaced by —O—, —CH═CH—, —CO—, —OCO— or —COO-in such a way that O atoms are not linked directly to one another, $Z^x$ is —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$—, or a single bond $L^{1-4}$ are each, independently of one another, H, F, Cl, $OCF_3$, $CF_3$, $CH_3$, $CH_2F$ or $CHF_2H$, x is 1 or 2, and z 0 or 1.

15. The LC medium according to claim 1, which comprises one or more compounds of following formula:

ZK

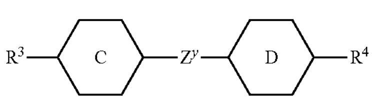

in which the individual radicals have the following meanings:

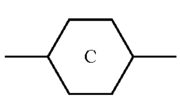

denotes

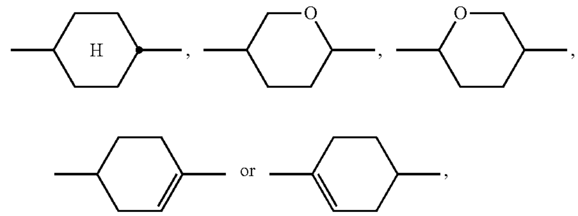

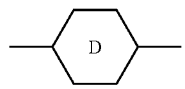

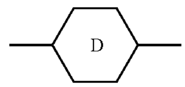

denotes

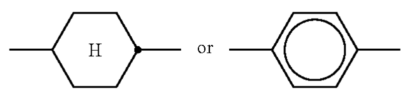

$R^3$ and $R^4$ each, independently of one another, denote alkyl having 1 to 12 C atoms, in which one or two non-adjacent $CH_2$ groups may be replaced by —O—, —CH═CH—, —CO—, —O—CO- or —CO—O-in such a way that O atoms are not linked directly to one another, and $Z^y$ denotes —$CH_2CH_2$—, —CH═CH—, —$CF_2O$—, —$OCF_2$—, —$CH_2O$—, —$OCH_2$—, —COO—, —OCO—, —$C_2F_4$—, —CF═CF— or a single bond.

16. The LC medium according to claim 1, which comprises one or more stabilisers selected from the group consisting of the following formulae

S1

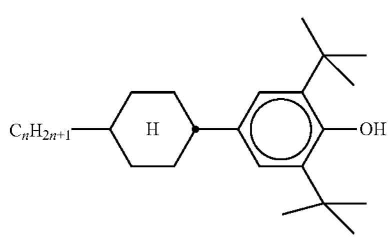

S2

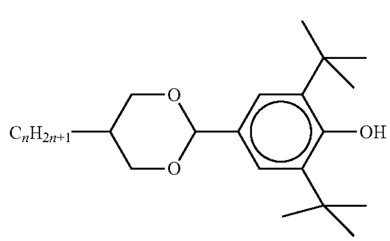

-continued

S3

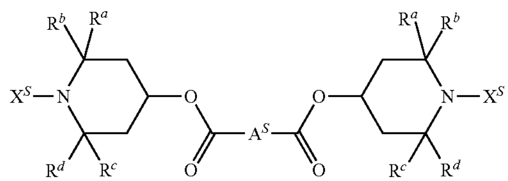

wherein the individual radicals, independently of each other and on each occurrence identically or differently, have the following meanings $R^{a-d}$ are straight-chain or branched alkyl with up to 10 C atoms, $X^s$ is H, $CH_3$, OH or O*, $A^s$ is a straight-chain alkylene with 1 to 20 C atoms, or a branched or cyclic alkylene with 3 to 20 C atoms which is optionally substituted, and n is an integer from 1 to 6.

17. The LC medium according to claim 1, wherein the polymerisable compounds of formula I and of optional compounds of formula II are polymerised.

18. A process of preparing an LC medium according to claim 1, comprising mixing one or more mesogenic or liquid-crystalline compounds of component B) with one or more compounds of formula I of component A) and optionally with one or more compounds of formula II, and optionally with further liquid-crystalline compounds and/or additives, and optionally polymerising the polymerisable compounds of formula I and of optional compounds of formula II.

19. An LC display comprising the LC medium according to claim 1.

20. The LC display of claim 19, which is a PSA or polymer stabilised SA display.

21. The LC display of claim 20, which is a PS-VA, PS-OCB, PS-IPS, PS-FFS, PS-UB-FFS, PS-posi-VA, PS-TN, polymer stabilised SA-VA or polymer stabilised SA-FFS display.

22. The LC display of claim 20, which comprises two substrates, at least one which is transparent to light, an electrode provided on each substrate or two electrodes provided on only one of the substrates, and located between the substrates a layer of an LC medium according to claim 1, wherein the polymerisable compounds are polymerised between the substrates of the display.

23. A process for the production of an LC display according to claim 22, comprising the steps of providing an LC medium between the substrates of the display, and polymerising the polymerisable compounds.

24. An LC medium comprising a polymerisable component A) comprising, one or more polymerisable compounds, wherein at least one of said polymerisable compounds is a compound of the formula I5A-2:

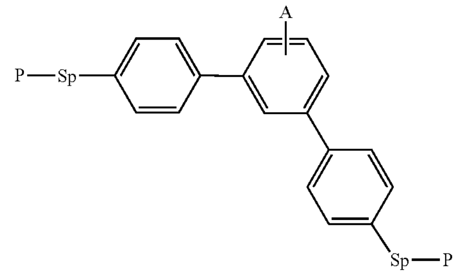

a liquid-crystalline component B), wherein said a liquid-crystalline component B is a LC host mixture comprising one or more mesogenic or liquid-crystalline compounds, optionally one or more additives selected from the group consisting of self-alignment additives for vertical alignment of formula II and stabilizers $$\text{MES-R}^a \qquad \text{II}$$

wherein the individual radicals, independently of each other and on each occurrence identically or differently, have the following meanings:

P is a polymerisable group,

Sp is a spacer group which is optionally substituted by P, or a single bond, $A^1$, $A^2$ are a monocyclic or polycyclic aromatic or heteroaromatic group with 4 to 20 ring atoms, which is optionally substituted by one or more groups L, A or P-Sp-, A is alkenyl with 2 to 7 C-atoms, L is F, Cl, -CN, P-Sp- or a straight chain alkyl having 1 to 25 C atoms, or a branched or cyclic alkyl having from 3 to 25 C atoms, wherein one or more non-adjacent $CH_2$-groups are optionally replaced by —O—, —S—, —CO—, —CO—O—, —O—CO—, or —O—CO—O— in such a manner that O- and/or S-atoms are not directly connected with each other, and wherein one or more H atoms are each optionally replaced by P-Sp-, F or Cl, MES is a calamitic mesogenic group containing two or more rings, which are connected directly or indirectly to each other or which are condensed to each other, which are optionally substituted and which mesogenic group is optionally substituted additionally by one or more polymerizable groups, which are connected to MES directly or via a spacer, and $R^a$ is a polar anchor group, residing in a terminal position of the calamitic mesogenic group MES which comprises at least one carbon atom and at least one group selected from —OH, —SH, —COOH, —CHO or primary or secondary amine function, which optionally contains one or two polymerizable groups P.

25. A LC medium comprising a polymerisable component A) comprising, one or more polymerisable compounds, wherein at least one of said polymerisable compounds is a compound of formula I, a liquid-crystalline component B), wherein said liquid-crystalline component B is a LC host mixture comprising one or more mesogenic or liquid-crystalline compounds, at least one additional polymerizable compound (C) selected from formulae M1 to M32, M1
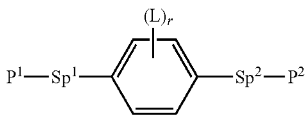
M2
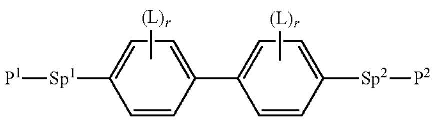
M3
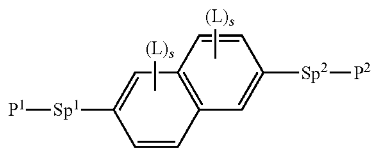
M4
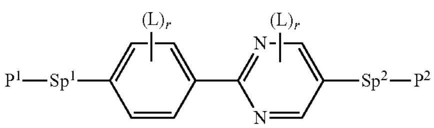
M5
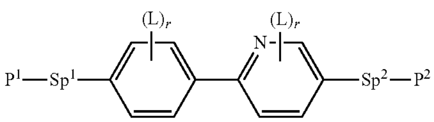
M6
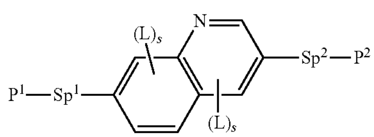
M7
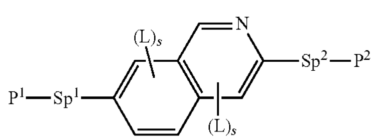
M8
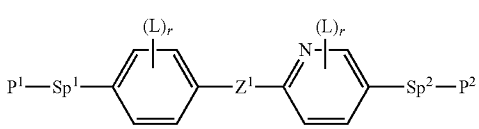
M9
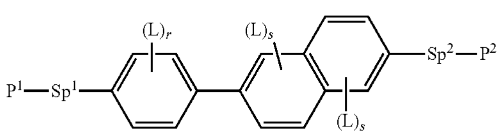
M10
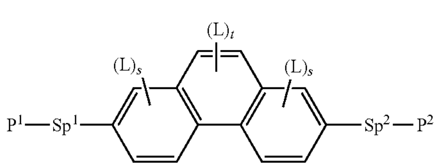
M11
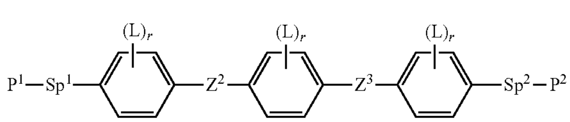
-continued
M12
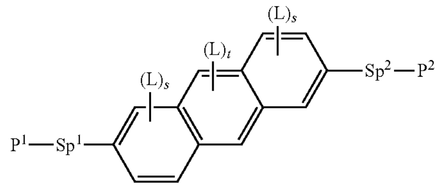
M13
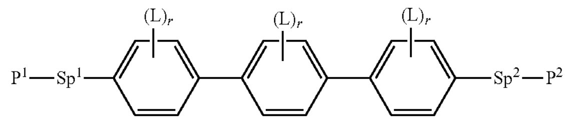
M14
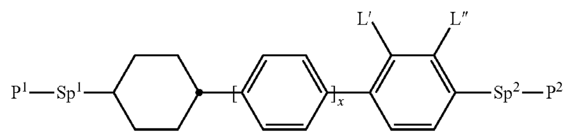
M15
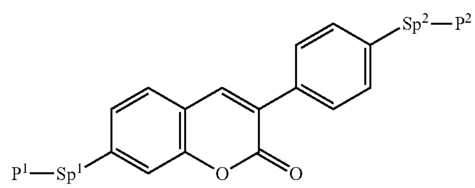
M16
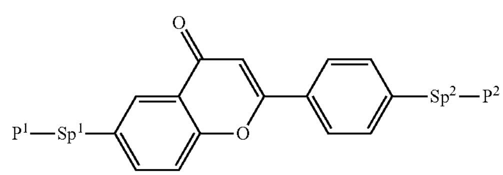
M17
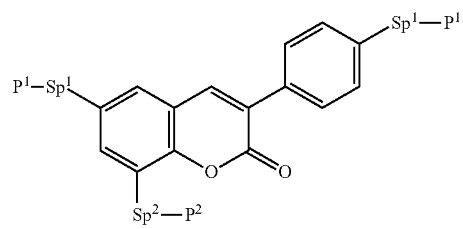
M18
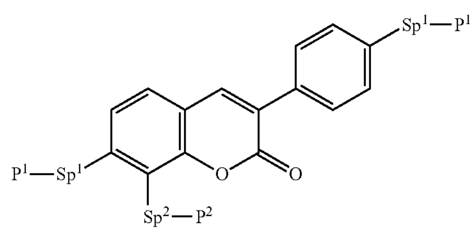
M19
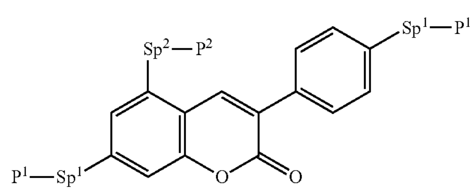

-continued

M20

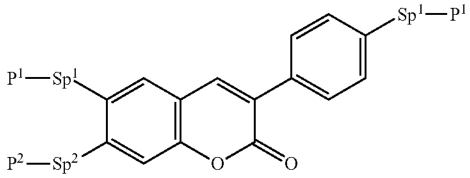

M21

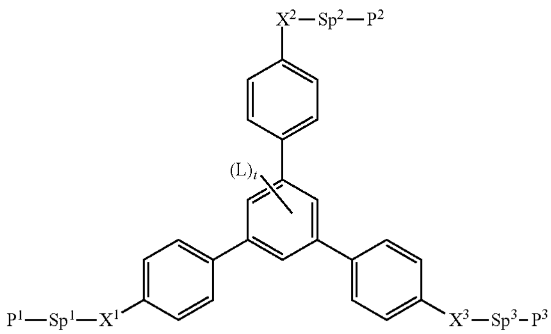

M22

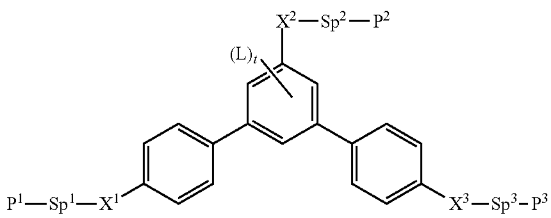

M23

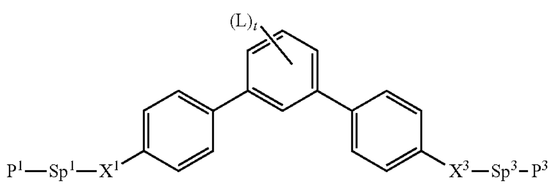

M24

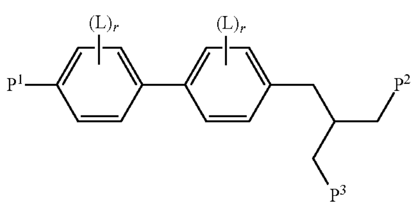

M25

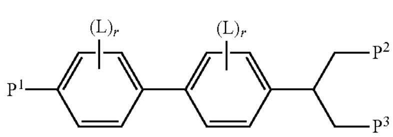

M26

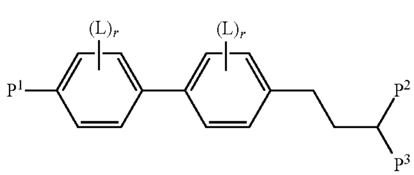

-continued

M27

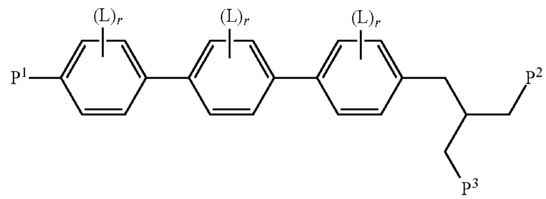

M28

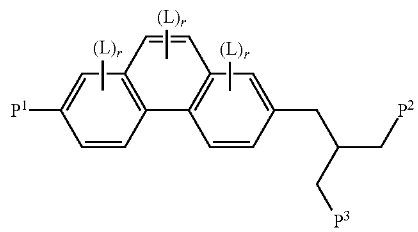

M29

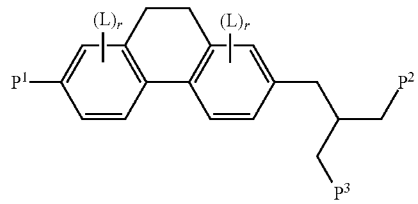

M30

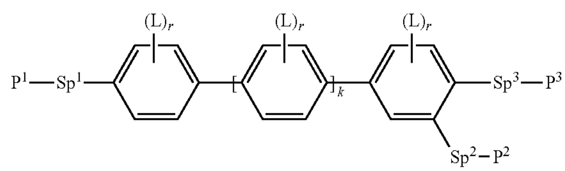

M31

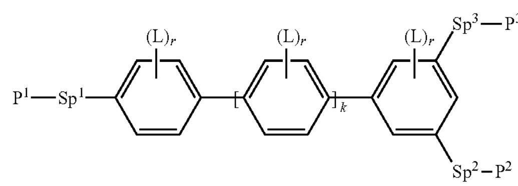

M32

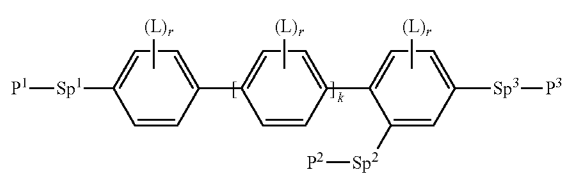

in which the individual radicals have the following meanings:

$P^1$, $P^2$ and $P^3$ each, independently of one another, denote an acrylate or methacrylate group, $Sp^1$, $Sp^2$ and $Sp^3$ each, independently of one another, denote a single bond or a spacer group having one of the meanings below for Sp, in which p1 is an integer from 1 to 12, where one or more of the radicals $P^1$-$Sp^1$-, $P^1$-$Sp^2$- and $P^3$-$Sp^3$- may denote $R^{aa}$, with the proviso that at least one of the radicals, $P^1$-$Sp^1$-, $P^2$-$Sp^2$ and $P^3$-$Sp^3$- present is different from $R^{aa}$, $R^{aa}$ denotes H, F, Cl, CN or a straight-chain alkyl having 1 to 25 C atoms or a branched alkyl having 3 to 25 C atoms, in which one or more non-adjacent $CH_2$ groups may each be replaced, independently of one another, by $C(R^0){=}C(R^{00})$-, —C≡C—, —N($R^0$)—, —O—, —S—, —CO—, —CO—O—, —O—CO—, or —O—CO—O-in such a way that O and/or S atoms are not linked directly to one another, and in which one or more H atoms may be replaced by F, Cl, CN or $P^1$-$Sp^1$-, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms where the alkenyl and alkynyl radicals have at least two C atoms and any branched radicals have at least three C atoms, $R^0$, $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, —O—CO- or a single bond, $Z^1$ denotes —O—, —CO—, —C($R^yR^z$)- or —$CF_2CF_2$—, $Z^2$ and $Z^3$ each, independently of one another, denote —CO—O—, —O—CO—, —$CH_2O$—, —$OCH_2$—, —$CF_2O$—, —$OCF_2$— or —$(CH_2)_n$-, where n is 2, 3 or 4, L on each occurrence, identically or differently, denotes F, Cl, CN or a straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, where the alkenyl and alkynyl radicals have at least two C atoms and any branched radicals have at least three C atoms, L' and L" each, independently of one another, denote H, F or Cl, k denotes 0 or 1, r denotes 0, 1, 2, 3 or 4, s denotes 0, 1, 2 or 3, t denotes 0, 1 or 2, x denotes 0 or 1 and optionally one or more additives selected from the group consisting of self-alignment additives for vertical alignment of formula II and stabilizers $$P\text{-}Sp\text{—}A^1\text{-}(Z^1\text{—}A^2)_z\text{-}R^b \quad \text{I}$$

$$MES\text{-}R^a \quad \text{II}$$

wherein the individual radicals, independently of each other and on each occurrence identically or differently, have the following meanings $R^b$ is P-Sp- or R, R is F, Cl, —CN or a straight chain alkyl having 1 to 25 C atoms, or a branched or cyclic alkyl having from 3 to 25 C atoms, wherein one or more non-adjacent $CH_2$-groups are optionally replaced by —O—, —S—, —CO—, —CO—O—, —O—CO—, or —O—CO—O-in such a manner that O- and/or S-atoms are not directly connected with each other, and wherein one or more H atoms are each optionally replaced by F or Cl, P is a polymerisable group, Sp is a spacer group which is optionally substituted by P, or a single bond, $A^1$, $A^2$ are a monocyclic or polycyclic aromatic or heteroaromatic group with 4 to 20 ring atoms, which is optionally substituted by one or more groups L, A or P-Sp-, wherein the compounds of formula I contain at least one group $A^1$ or $A^2$ that is substituted by at least one group A, $Z^1$ is —O—, —S—, —CO—, —CO—O—, —O—CO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$-, —$CF_2CH_2$—, —$CH_2CF_2$—, —$(CF_2)_{n1}$-, —CH═CH—, —CF═CF—, —CH═CF—, —CF═CH—, —C≡C—, —CH═CH—CO—O—, —O—CO—, —CH═CH—, —$CH_2$—$CH_2$—CO—O—, -O—CO—$CH_2$—$CH_2$—, —$CR^0R^{00}$-, or a single bond, $R^0$, $R^{00}$ is H or alkyl having 1 to 12 C atoms, A is alkenyl with 2 to 7 C-atoms, L is F, Cl, -CN, P-Sp- or a straight chain alkyl having 1 to 25 C atoms, or a branched or cyclic alkyl having 3 to 25 C atoms, wherein one or more non-adjacent $CH_2$-groups are optionally replaced by —O—, —S—, —CO—, —CO—O—, —O—CO—, or —O—CO—O-in such a manner that O- and/or S-atoms are not directly connected with each other, and wherein one or more H atoms are each optionally replaced by P-Sp-, F or Cl, z is 0, 1, 2 or 3, n1 is 1, 2, 3 or 4, MES is a calamitic mesogenic group containing two or more rings, which are connected directly or indirectly to each other or which are condensed to each other, which are optionally substituted and which mesogenic group is optionally substituted additionally by one or more polymerizable groups, which are connected to MES directly or via a spacer, and $R^a$ is a polar anchor group, residing in a terminal position of the calamitic mesogenic group MES which comprises at least one carbon atom and at least one group selected from —OH, —SH, —COOH, —CHO or primary or secondary amine function, which optionally contains one or two polymerizable groups P.

26. The LC medium of claim 25 wherein the at least one additional polymerizable compound (C) is selected from the group consisting of RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121 and RM-122.

27. The LC medium of claim 25 wherein the at least one additional polymerizable compound (C) is selected from formulae M2, M13, M17, M22, M23, M24, M30, M31 and M32.

* * * * *